US012511269B2

(12) United States Patent
Dvorak et al.

(10) Patent No.: US 12,511,269 B2
(45) Date of Patent: Dec. 30, 2025

(54) METHODS AND SYSTEMS FOR FLEXIBLY LINKING SPREADSHEET CELL MOVEMENTS AND FORMULAS

(71) Applicant: Adaptam Inc., Palo Alto, CA (US)

(72) Inventors: Robert E. Dvorak, Portola Valley, CA (US); Yuriy Garin, San Carlos, CA (US); Alexey Verkhovskiy, Calgary (CA)

(73) Assignee: Adaptam Inc., Palo Alto, CA (US)

( * ) Notice: Subject to any disclaimer, the term of this patent is extended or adjusted under 35 U.S.C. 154(b) by 0 days.

(21) Appl. No.: 18/542,510

(22) Filed: Dec. 15, 2023

(65) Prior Publication Data

US 2024/0202168 A1 Jun. 20, 2024

Related U.S. Application Data

(60) Provisional application No. 63/433,408, filed on Dec. 16, 2022.

(51) Int. Cl.
*G06F 16/21* (2019.01)

(52) U.S. Cl.
CPC .................................. *G06F 16/211* (2019.01)

(58) Field of Classification Search
CPC ..................................................... G06F 16/211
See application file for complete search history.

(56) References Cited

U.S. PATENT DOCUMENTS

| | | | | |
|---|---|---|---|---|
| 8,726,143 | B2 | 5/2014 | Simkhay et al. | |
| 10,311,141 | B1 | 6/2019 | Olkin | |
| 10,503,822 | B1 * | 12/2019 | Spencer | G06F 40/197 |
| 11,657,217 | B2 | 5/2023 | Dvorak | |
| 11,699,032 | B2 | 7/2023 | Shirolkar et al. | |
| 11,972,204 | B2 | 4/2024 | Dvorak | |
| 11,977,835 | B2 | 5/2024 | Dvorak | |
| 2002/0118221 | A1 | 8/2002 | Hudson et al. | |
| 2004/0103366 | A1 | 5/2004 | Peyton-Jones et al. | |
| 2005/0010862 | A1 | 1/2005 | Bauchot | |
| 2006/0101013 | A1 | 5/2006 | Kenney et al. | |

(Continued)

FOREIGN PATENT DOCUMENTS

| | | | |
|---|---|---|---|
| AU | 2005202721 | A1 | 4/2006 |
| JP | 3853827 | B1 | 12/2006 |

(Continued)

OTHER PUBLICATIONS

U.S. Appl. No. 16/031,339, filed Jul. 10, 2018, U.S. Pat. No. 11,182,548, Nov. 23, 2021, Issued.
U.S. Appl. No. 16/031,379, filed Jul. 10, 2018 Jun. 7, 2022, U.S. Pat. No. 11,354,494, Jun. 7, 2022, Issued.
U.S. Appl. No. 16/031,759, filed Jul. 10, 2018, U.S. Pat. No. 11,017,165, May 25, 2021, Issued.

(Continued)

*Primary Examiner* — Dangelino N Gortayo
(74) *Attorney, Agent, or Firm* — HAYNES BEFFEL & WOLFELD LLP; Ernest J. Beffel, Jr.

(57) ABSTRACT

The disclosed technology creates a set of technologies that formulaically and/or positionally link cell(s) to spreadsheet functions or capabilities that flex the number of cells they instantiate. Thereby automatically altering the cell formula and/or the cell position reflecting those linked/connected flex range changes. Automatically ensuring no overlap of linked/connected cells and automatically adjusting linked/connected formulas for the referenced flex changes.

28 Claims, 149 Drawing Sheets
(129 of 149 Drawing Sheet(s) Filed in Color)

(56) References Cited

U.S. PATENT DOCUMENTS

| | | | | |
|---|---|---|---|---|
| 2006/0282818 | A1 | 12/2006 | DeSpain | |
| 2007/0244672 | A1 | 10/2007 | Kjaer | |
| 2008/0244091 | A1 | 10/2008 | Moore et al. | |
| 2011/0197118 | A1 | 8/2011 | Williamson | |
| 2013/0073939 | A1 | 3/2013 | Honsowetz | |
| 2014/0047385 | A1 | 2/2014 | Ruble et al. | |
| 2015/0169532 | A1 | 6/2015 | Otero et al. | |
| 2015/0199328 | A1 | 7/2015 | Danziger et al. | |
| 2015/0363478 | A1* | 12/2015 | Haynes | G06Q 10/06 707/610 |
| 2015/0378979 | A1* | 12/2015 | Hirzel | G06F 40/18 715/220 |
| 2016/0055139 | A1 | 2/2016 | Creason et al. | |
| 2017/0228358 | A1 | 8/2017 | Hirzel et al. | |
| 2019/0034400 | A1 | 1/2019 | Alda | |
| 2019/0340219 | A1 | 11/2019 | Schoedl | |
| 2021/0397420 | A1* | 12/2021 | Stachura | G06F 40/186 |
| 2024/0069988 | A1 | 2/2024 | Patel et al. | |

FOREIGN PATENT DOCUMENTS

| | | | |
|---|---|---|---|
| JP | 2016218747 | A | 12/2016 |
| WO | 2005043406 | A2 | 5/2005 |
| WO | 2005045725 | A2 | 5/2005 |
| WO | 2007046326 | A1 | 4/2007 |

OTHER PUBLICATIONS

U.S. Appl. No. 16/191,402, filed Nov. 14, 2018, U.S. Pat. No. 11,036,929, Jun. 15, 2021, Issued.

U.S. Appl. No. 17/359,430, filed Jun. 25, 2021, U.S. Pat. No. 11,836,444, Dec. 5, 2023, Issued.

U.S. Appl. No. 17/359,418, filed Jun. 25, 2021, U.S. Pat. No. 11,657,217, May 23, 2023, Issued.

U.S. Appl. No. 17/384,404, filed Jul. 23, 2021, 20220027555, Jan. 27, 2022, Allowed.

U.S. Appl. No. 17/374,898, filed Jul. 13, 2021, U.S. Pat. No. 11,694,023, Jul. 4, 2023, Issued.

U.S. Appl. No. 17/374,901, filed Jul. 13, 2021, U.S. Pat. No. 11,972,204, Apr. 30, 2024, Issued.

U.S. Appl. No. 17/752,814, filed May 24, 2022, U.S. Pat. No. 11,977,835, May 7, 2024, Issued.

U.S. Appl. No. 17/903,934, filed Sep. 6, 2022, U.S. Pat. No. 12,050,859, Jul. 30, 2024, Issued.

U.S. Appl. No. 17/988,641, filed Nov. 16, 2022, 20230153518, May 18, 2023, Pending.

U.S. Appl. No. 18/074,301, filed Dec. 2, 2022, 20230177751, Jun. 8, 2023, Pending.

U.S. Appl. No. 18/142,560, filed May 2, 2023 Nov. 2, 2023, 20230351104, Nov. 2, 2023, Allowed.

U.S. Appl. No. 18/142,557, filed May 2, 2023, 2023036756, Nov. 16, 2023, Pending.

U.S. Appl. No. 18/765,168, filed Jul. 5, 2024.

* cited by examiner

FIG. 6A
Prior Art
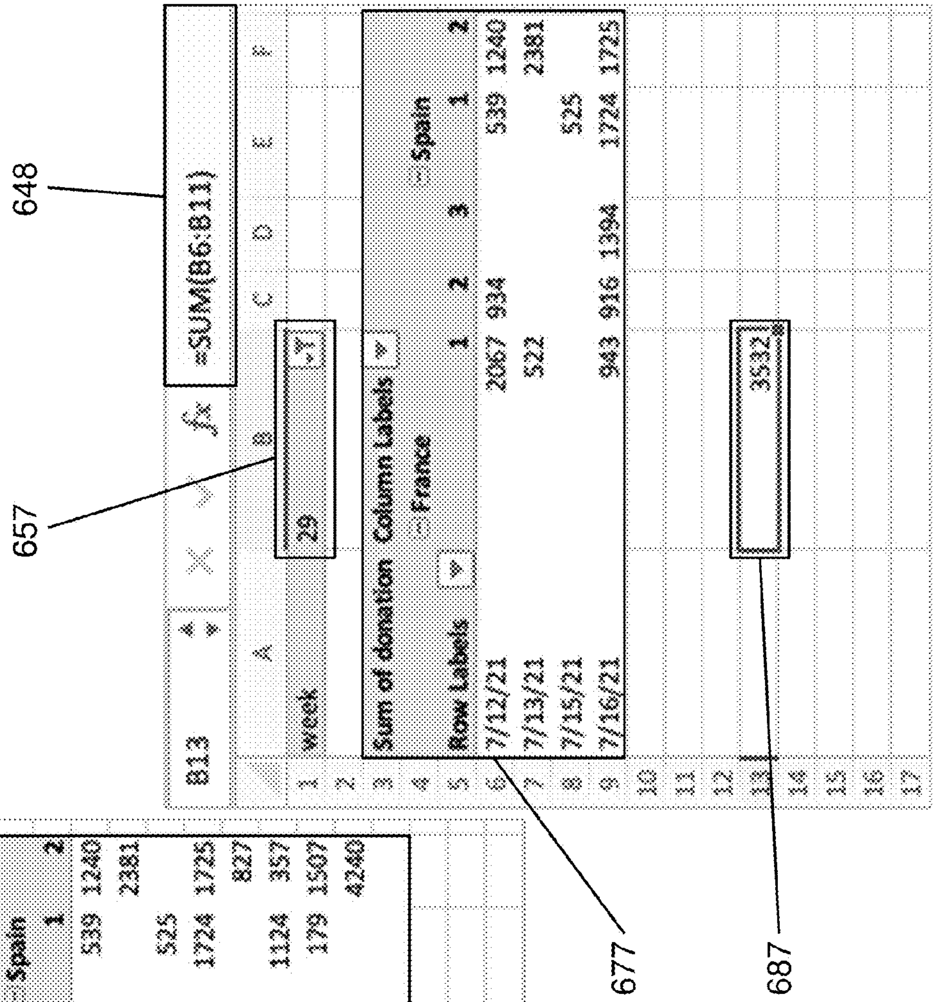
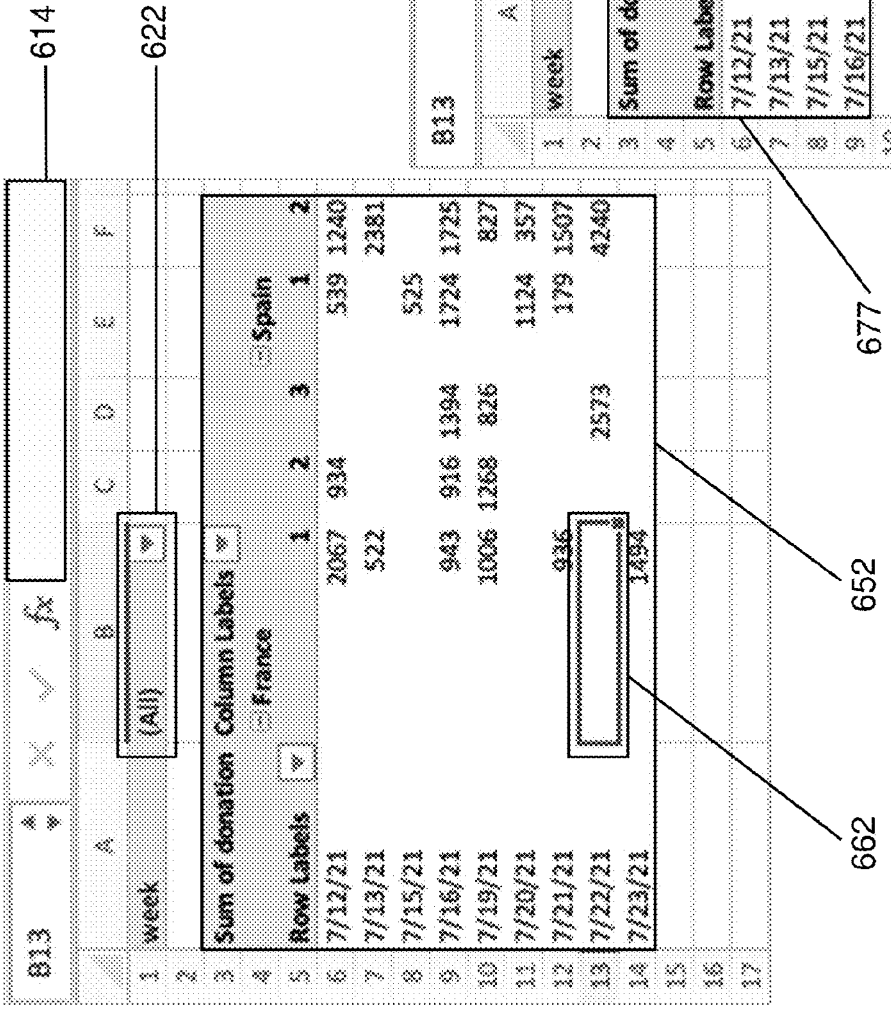
FIG. 6B
Prior Art 4315
4323
4326
4335
4345
4343
4346
4365
4361
4373
4376
4385
4393
4396
F4
=SUM(A4:D4)
LINK
=SUM(A4:D4)
LINK[FLEX_BOTH(A4:D4)]
Donations
date =
1/3/19
Individual donations
$100.00
$150.00
$175.00
$500.00
$925.00

| | A | B | C | D | E | F | G | H | I | J | K | M | N |
|---|---|---|---|---|---|---|---|---|---|---|---|---|---|
| 1 | Donor analyses | | | | | | | | | Total net donations: | $16,834.06 | | |
| 2 | | start date = | 1/1/19 | | end date = | 1/3/19 | | | | | | | |
| 3 | Donations | | | | | Fees | | | | Net donations | | | |
| 4 | States: | CA | FL | NY | TX | CA | FL | NY | TX | CA | FL | NY | TX |
| 5 | Dates | | | | | | | | | | | | |
| 6 | 1/1/19 | $3,200.00 | | $2,350.00 | | $29.[illegible]4 | | $25.14 | | $3,170.[illegible]6 | | $2,324.86 | |
| 7 | 1/2/19 | | $2,500.00 | $500.00 | | | $25.75 | $6.25 | | | $2,474.25 | $493.75 | |
| 8 | 1/3/19 | $1,950.00 | $1,200.00 | $1,845.00 | $3,460.00 | $19.50 | $13.20 | $18.45 | $33.21 | $1,930.50 | $1,186.80 | $1,826.55 | $3,426.79 |
| 9 | | | | | | | | | | | | | |
| 10 | | | | | | | | | | | | | |
| 11 | Ethnicity | | | | | | | | | | | | |
| 12 | Ethnic: | COUNT( donations): | SUM( donations): | | | Largest Donation by State | | | | Demographics | | | |
| 13 | Asian | 5 | $2,650.00 | | | CA | $2,250.00 | | | Gender: | Female | Male | Other |
| 14 | Black | 3 | $1,950.00 | | | FL | $1,000.00 | | | Age: | | | |
| 15 | Hispanic | 5 | $2,850.00 | | | NY | $950.00 | | | 0 - 29 | 4 | 2 | 1 |
| 16 | Other | 4 | $1,050.00 | | | TX | $1,200.00 | | | 30 - 44 | 5 | 3 | 2 |
| 17 | White | 10 | $8,505.00 | | | | | | | 45 - 60 | 3 | 1 | |
| 18 | | | | | | | | | | 60 ... | 4 | 2 | |
| 19 | | | | | | | | | | | | | |
| 20 | | | | | | | | | | | | | |
| 21 | Donations source | | | | | | | | | | | | |
| 22 | Source: | COUNT( donations): | SUM( donations): | | | Largest Donation by Source | | | | Fees by type | | | |
| 23 | In person | 5 | $7,500.00 | | | In person | $2,250.00 | | | Bank | $86.99 | | |
| 24 | Mail | 3 | $2,100.00 | | | Mail | $650.00 | | | Credit card | $83.95 | | |
| 25 | Online | 19 | $7,405.00 | | | Online | $375.00 | | | | | | |

FIG. 117

FIG. 143

Example automatic movement linkage/connection setup tie breaking ruleset

1. If there is one tied flex area above, direct link to it and if not;
2. If there is more than one tied flex area above the area, direct link to the tied area farthest to the left and if not;
3. If there is one tied flex area to the left, direct link to it and if not;
4. If there is more than one tied flex area to the left, direct link to the tied area highest up and if not;
5. If there is one tied flex area to the right, direct link to it and if not;
6. If there is more than one tied flex area to the right, direct link to the tied area highest up and if not;
7. Direct link to the tie area farthest to the left.

| Example Range and Array functions | |
|---|---|
| | |
| **Function** | **Function classification** |
| AGGREGATE | Math and trigonometry |
| AVEDEV | Statistical |
| AVERAGE | Statistical |
| COUNT | Statistical |
| COVAR | Statistical |
| COVARIANCE | Statistical |
| GEOMEAN | Statistical |
| HARMEAN | Statistical |
| LARGE | Statistical |
| MAX | Statistical |
| MEDIAN | Statistical |
| MIN | Statistical |
| MODE | Statistical |
| PERCENTILE | Statistical |
| QUARTILE | Statistical |
| RANK | Statistical |
| SMALL | Statistical |
| STDEV | Statistical |
| SUBTOTAL | Math and trigonometry |
| SUM | Math and trigonometry |
| T.DIST | Statistical |
| T.TEST | Statistical |
| Z.TEST | Statistical |

FIG. 144

14900
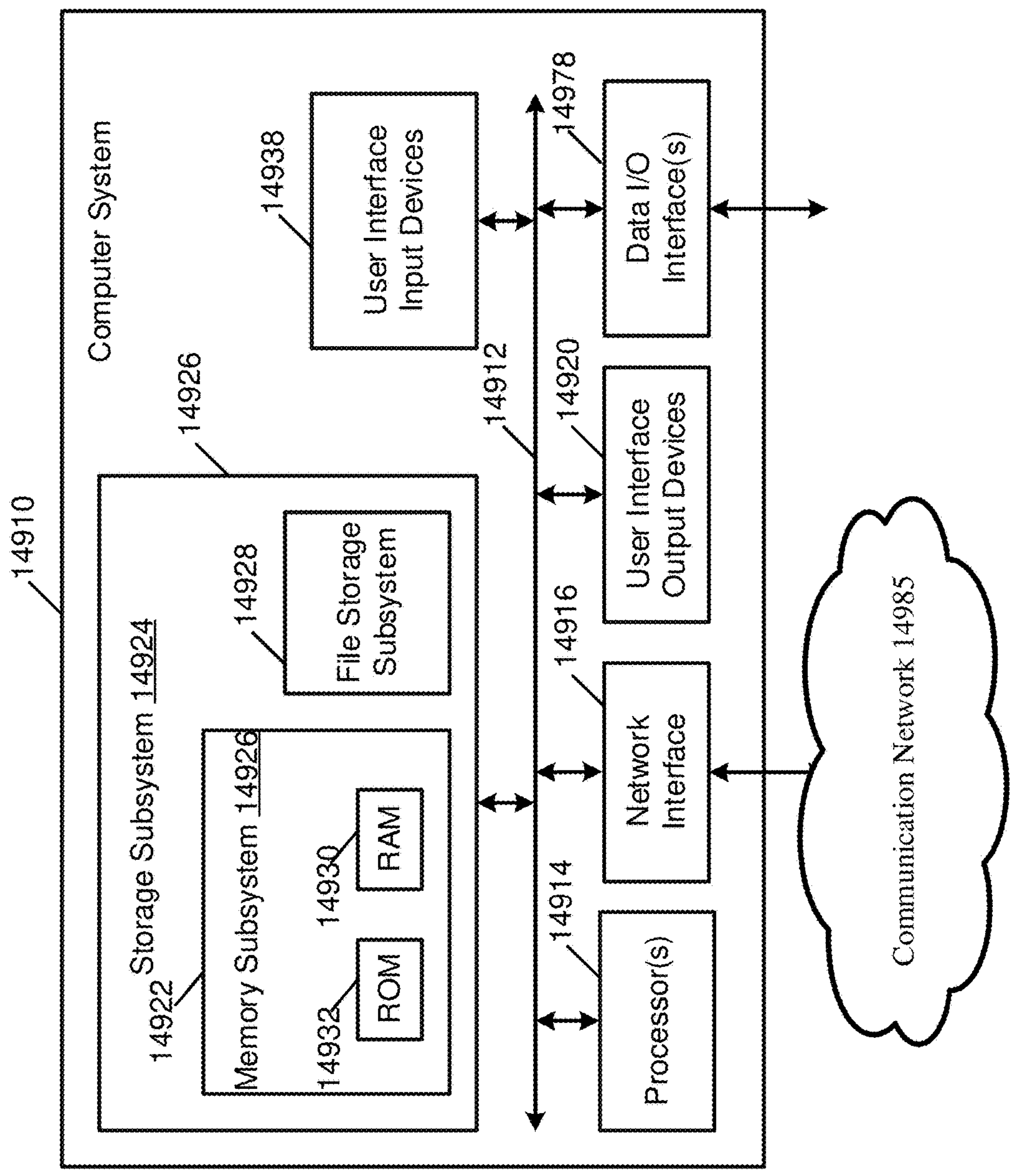
Fig. 149 Computer System

METHODS AND SYSTEMS FOR FLEXIBLY LINKING SPREADSHEET CELL MOVEMENTS AND FORMULAS

CROSS REFERENCE

This application claims priority to and the benefit of U.S. Provisional Application No. 63/433,408, titled "Methods and Systems For Flexibly Linking Spreadsheet Cell Movements and Formulas," filed 16 Dec. 2022.

RELATED APPLICATIONS

This application is related to and incorporates by reference the following applications:

U.S. application Ser. No. 18/142,560, titled "Methods and Systems for Spreadsheet Function and Flex Copy-Paste Control of Formatting and Use of Selection List Panels," filed 2 May 2023 which the claims benefit of U.S. Provisional Application No. 63/337,576, filed 2 May 2022.

This application is also related to and incorporates by reference the following applications:

U.S. application Ser. No. 16/031,339, titled "Methods and Systems for Providing Selective Multi-Way Replication and Atomization of Cell Blocks and Other Elements in Spreadsheets and Presentations," filed 10 Jul. 2018, now U.S. Pat. No. 11,182,548, issued 23 Nov. 2021, which claims the benefit of U.S. Provisional Application No. 62/530,835, filed 10 Jul. 2017.

U.S. application Ser. No. 16/031,379, titled "Methods and Systems for Connecting a Spreadsheet to External Data Sources with Formulaic Specification of Data Retrieval," filed 10 Jul. 2018, now U.S. Pat. No. 11,354,494, issued 7 Jun. 2022, which claims the benefit of U.S. Provisional Application No. 62/530,786, filed 10 Jul. 2017.

U.S. application Ser. No. 16/031,759, titled "Methods and Systems for Connecting A Spreadsheet to External Data Sources with Temporal Replication of Cell Blocks," filed 10 Jul. 2018, now U.S. Pat. No. 11,017,165, issued 25 May 2021, which claims the benefit of U.S. Provisional Patent Application No. 62/530,794, filed 10 Jul. 2017.

U.S. application Ser. No. 16/191,402, titled "Methods and Systems for Connecting A Spreadsheet to External Data Sources with Ordered Formulaic Specification of Data Retrieved," filed 14 Nov. 2018, now U.S. Pat. No. 11,036, 929, issued 15 Jun. 2021, which claims the benefit of U.S. Provisional Patent Application No. 62/586,719, filed on Nov. 15, 2017.

U.S. application Ser. No. 17/359,430, titled "Methods and Systems for Constructing a Complex Formula in a Spreadsheet Cell," filed 25 Jun. 2021, which claims the benefit of U.S. Provisional Patent Application No. 63/044,990, filed 26 Jun. 2020.

U.S. application Ser. No. 17/359,418, titled "Methods and Systems for Presenting Drop-Down, Pop-Up or Other Presentation of a Multi-Value Data Set in a Spreadsheet Cell," filed 25 Jun. 2021, which claims the benefit of U.S. Provisional Patent Application No. 63/044,989, filed 26 Jun. 2020.

U.S. application Ser. No. 17/384,404, titled "Method and System for Improved Spreadsheet Charts," filed 23 Jul. 2021, which claims the benefit of U.S. Provisional Patent Application No. 63/055,581, filed 23 Jul. 2020.

U.S. application Ser. No. 17/374,898, titled "Method and System for Improved Spreadsheet Analytical Functioning," filed 13 Jul. 2021, which claims the benefit of U.S. Provisional Patent Application No. 63/051,280, filed 13 Jul. 2020.

U.S. application Ser. No. 17/374,901, titled "Method and System for Improved Ordering of Output from Spreadsheet Analytical Functions," filed 13 Jul. 2021, which claims the benefit of U.S. Provisional Patent Application No. 63/051, 283, filed 13 Jul. 2020.

U.S. application Ser. No. 17/752,814, titled "Method And System for Spreadsheet Error Identification and Avoidance," filed 24 May 2022 which claims the benefit of U.S. Provisional Patent Application No. 63/192,475, filed 24 May 2021.

U.S. application Ser. No. 17/903,934, titled "Method and System for Improved 2d Ordering of Output from Spreadsheet Analytical Functions," filed 6 Sep. 2022 which claims the benefit of U.S. Provisional Patent Application No. 63/240,828, filed 3 Sep. 2021.

U.S. application Ser. No. 17/988,641, titled "Methods and Systems for Sorting Spreadsheet Cells with Formulas," filed 16 Nov. 2022 which claims the benefit of U.S. Provisional Application No. 63/285,945, filed 17 Nov. 2021.

U.S. application Ser. No. 18/074,301, titled "Method and System for Improved Visualization of Charts in Spreadsheets," filed 2 Dec. 2022 which claims the benefit of U.S. Provisional Patent Application No. 63/25,945, filed 3 Dec. 2021.

U.S. application Ser. No. 18/142,557, titled "Methods and Systems for Bucketing Values in Spreadsheet Functions," filed 2 May 2023 which claims the benefit of U.S. Provisional Application No. 63/337,572, filed 2 May 2022.

U.S. Provisional Application No. 63/525,138, titled "Methods And Systems For Specifying and Using in Spreadsheet Cell Formulas Joins Between Data Sets," filed 5 Jul. 2023.

U.S. Provisional Application No. 63/529,135, titled "Methods and Systems For Specifying and Using Joins Between Data Sets in a Spreadsheet Data Visualizer," filed 26 Jul. 2023.

BACKGROUND

Today's spreadsheets have both functions (e.g., FILTER) and capabilities (e.g., PivotTable) which flex (expand or contract) the range of cells that they populate through input changes. Our technologies have further expanded those spreadsheet functions (e.g., WRITE_CALC_2D) and capabilities (e.g., flex copy paste) that flex, making it even more attractive for users to connect analytics and helpful labelling to flexes, align or connect multiple flexes and collocate multiple flexing analytics within a worksheet. However, the downside of these actions with today's technologies is that flex changes are not automatically accounted for in connected formulas or content in adjacent cells resulting in formula errors and/or flex expansion overlap errors.

Accordingly, an opportunity arises to link formula or locational content so that flex changes are automatically accommodated in connected formulas and moving adjacent cell content thereby avoiding formula and overlap errors as well as coordinating analytic content for good visual presentation post flex changes.

SUMMARY

The disclosed technology creates a set of technologies that formulaically and/or positionally (movement wise) link to flexes (functions or capabilities that can alter the cells they instantiate), thereby automatically altering the cell formula and/or the cell position reflecting the flex cell instantiation (population) change. Thus, automatically avoiding those flex driven formula and overlapping content errors.

Embodiments of the disclosed technology automatically adjust the location and/or formula of a cell based on its connection to range flexing functions (e.g., FILTER, WRITE_V) and/or range flexing capabilities (PivotTable, flex copy paste). Where the flexing is one- or two-dimensional, where the flexing connection is to the entire flexing range, a segment of the flexing range or a cell within the flexing range. Where the connection is direct or in-direct and may connect to multiple flexing ranges.

In embodiments of the disclosed technology the positional linkage/connection retains spatial relationships post movement, while in other embodiments handling more complicated flexing situations our technology preserves aspects of the spatial relationships. Some embodiments move linked/connected areas applying different movement sequences and movement cushions. Other embodiments preserve alignments of connected areas with different spacing. While other embodiments of our movement linkage/connection technology coordinate in different ways the post movement spatial relationships of the linked/connected areas.

In embodiments of the disclosed technology the linkage(s)/connection(s) to the flexing range is manually set by the user. In other embodiments the connection(s) is automatically done by our spreadsheet application formulaically and/or positionally with some hybrid situations where the linkage/connection is automatically set and then manually altered (e.g., alignments). In all those embodiments the connection(s)/linkage(s) can be removed through user action.

Embodiments of our technology ensure the formulaic linkages work in all situations (e.g., when blank or null values are involved or other data nearby) and do not require the user to alter their normal functional formulas with additional functions (e.g., OFFSET and COUNT) to attempt to automatically accommodate flex cell instantiation (population) changes.

Embodiments of the disclosed technology record the coordinated connection(s)/linkage(s) visibly or invisibly in the cell formula. Where the user can formulaically, through spreadsheet cell visuals (e.g., color coded outlines), or through a UI panel see the connection/linkage settings.

Particular aspects of the technology disclosed are described in the claims, specification, and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fec.

The color drawings also may be available in PAIR via the Supplemental Content tab.

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIGS. 1A, 1B, 1C and 1D examples prior art of insert and delete driven movement in a spreadsheet.

Figure 1A:
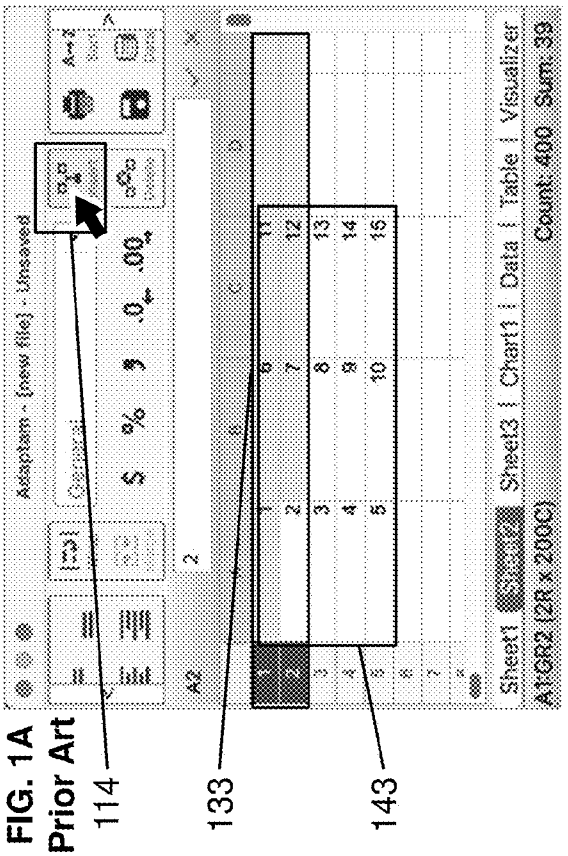
FIG. 1A Prior Art
Figure 1B:
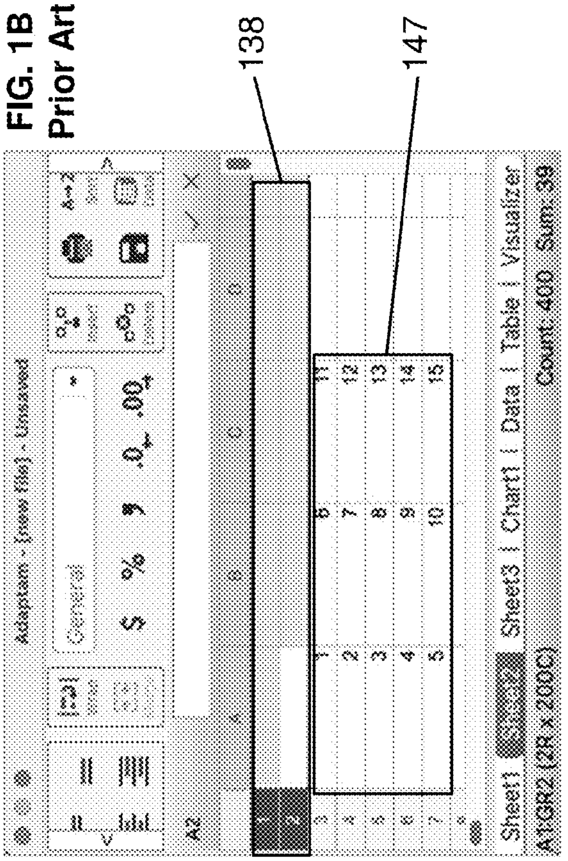
FIG. 1B Prior Art
Figure 1C:
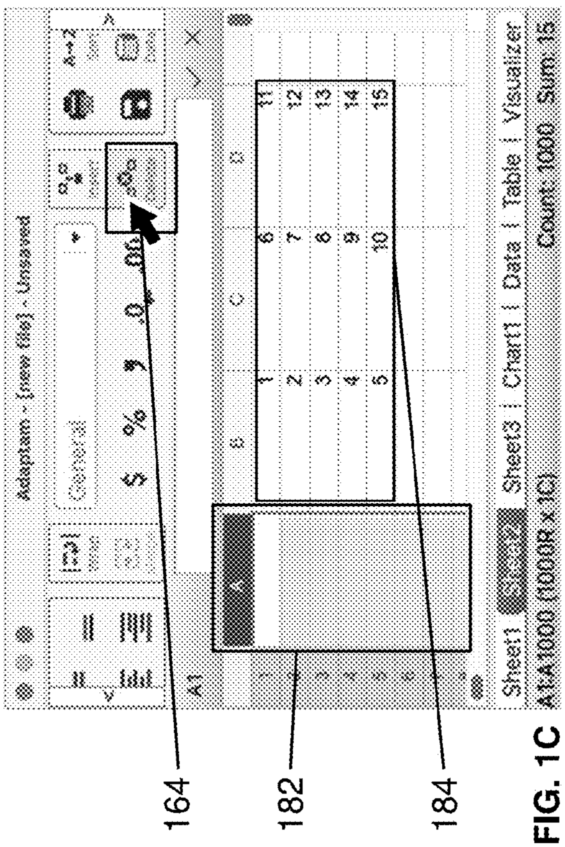
FIG. 1C Prior Art
Figure 1D:
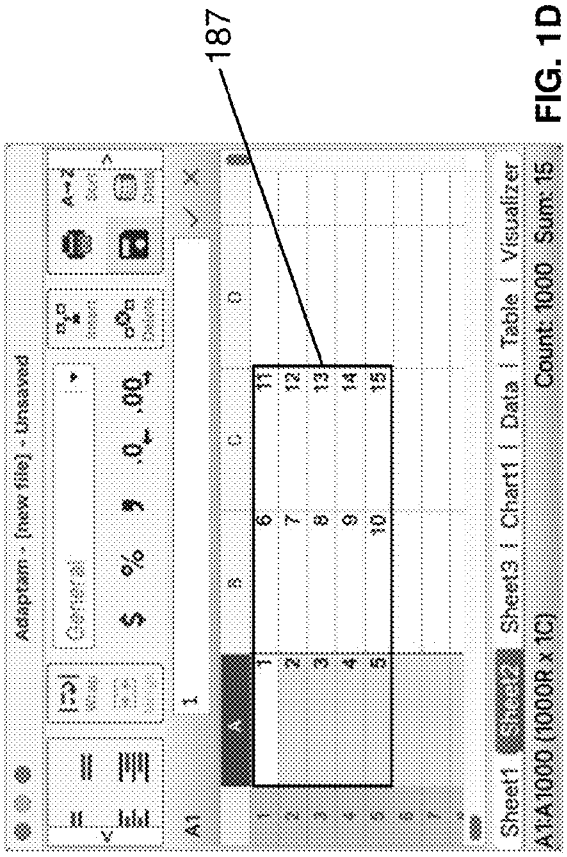
FIG. 1D Prior Art
Figure 2B:
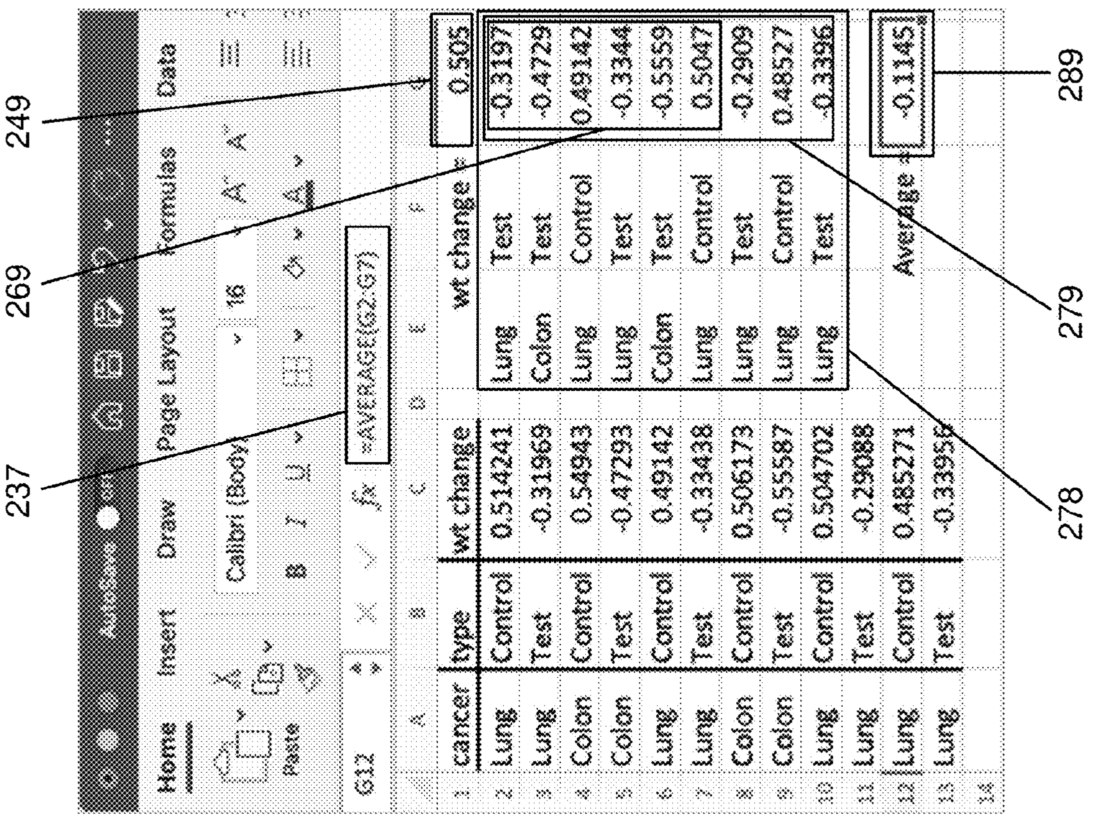
FIG. 2B Prior Art
Figure 2A:
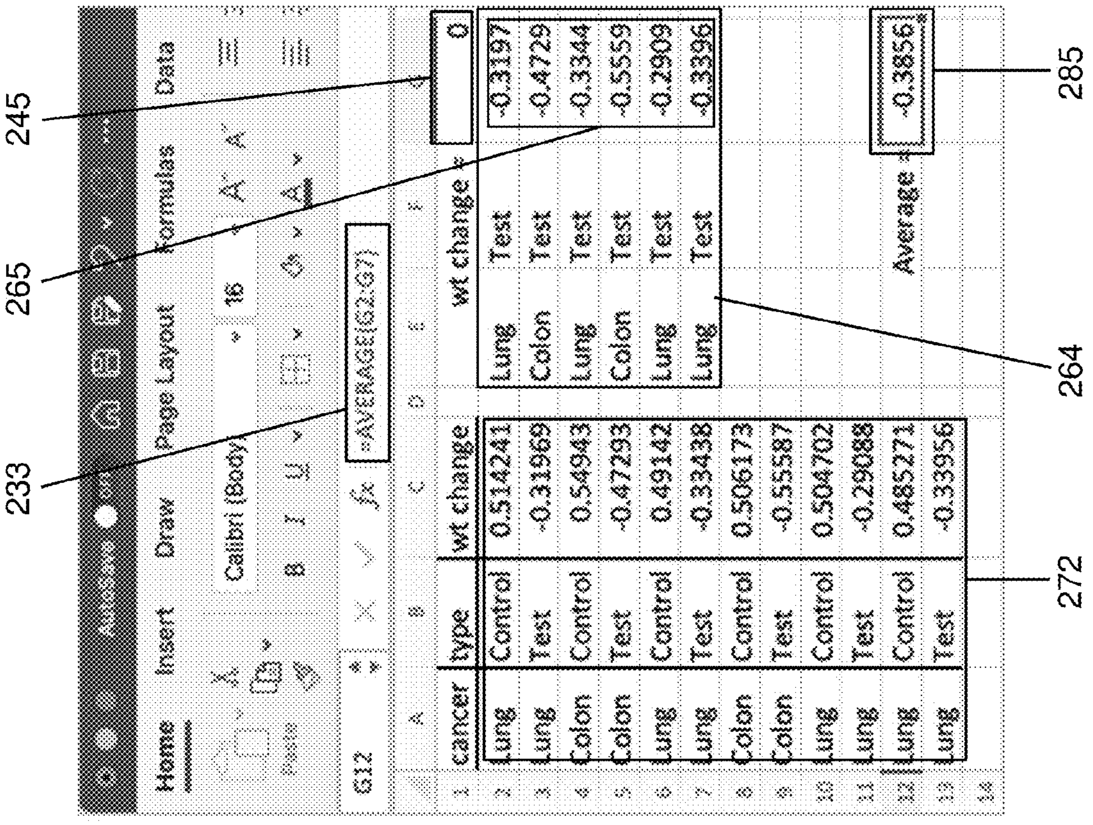
FIG. 2A Prior Art

FIGS. 2A and 2B examples a FILTER function instantiating a flex range of cells in Microsoft Excel.

Figure 3A:
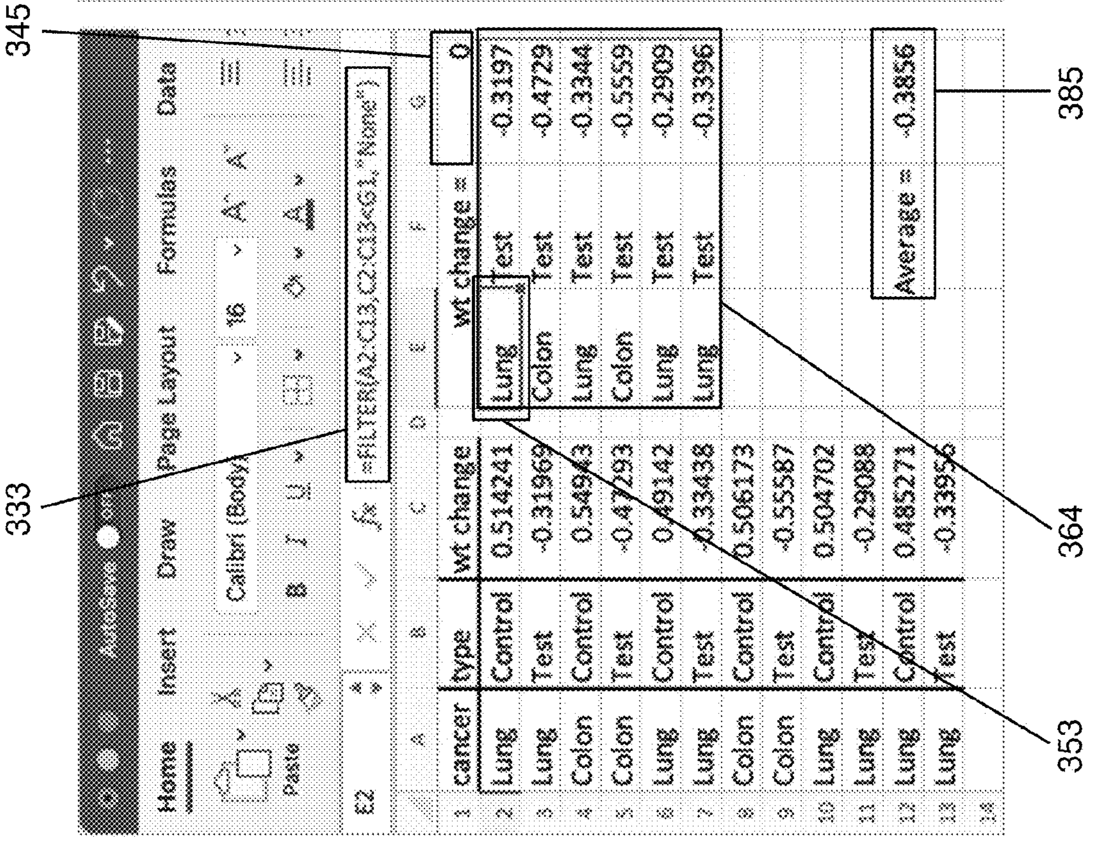
FIG. 3A Prior Art
Figure 3B:
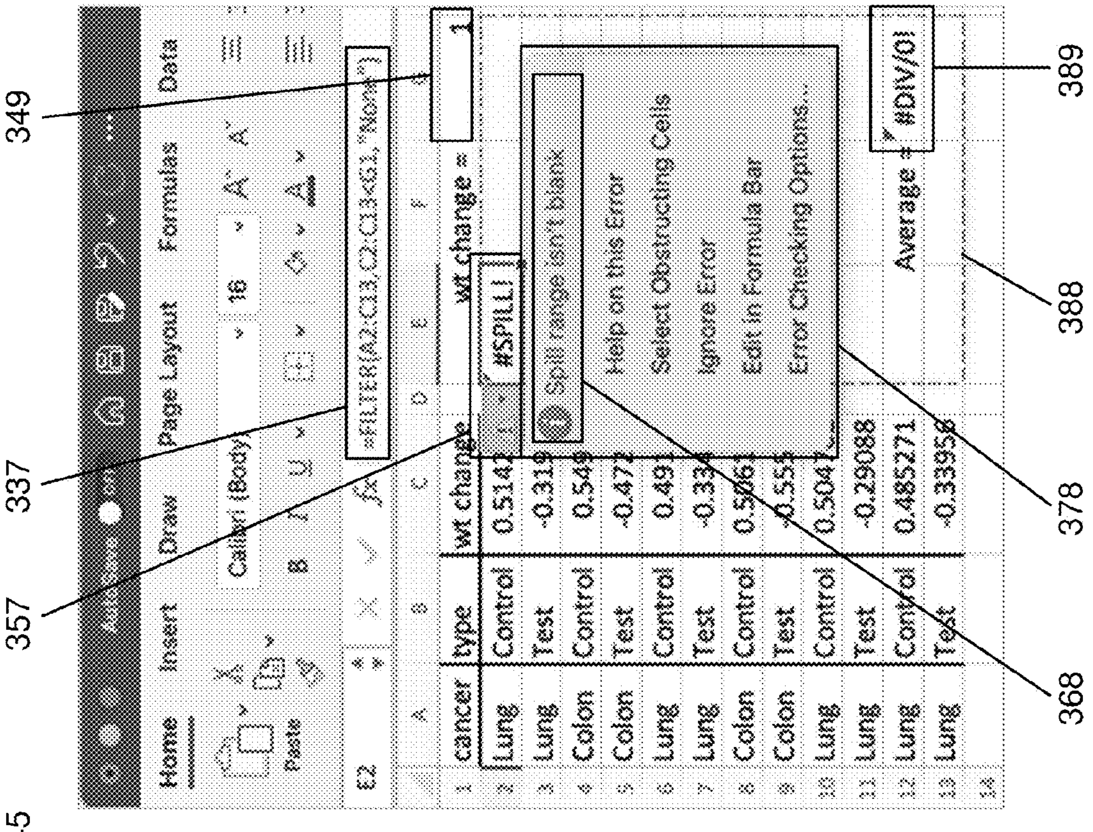
FIG. 3B Prior Art

FIGS. 3A and 3B examples the inability today's spreadsheets (e.g., Microsoft Excel) to automatically adjust the spatial relationship of cells in the path of the flexes to avoid overlaps.

FIGS. 4A, 4B, 5A, 5B, 6A, 6B, 7A, 7B, 7C, 8A, and FIG. 8B examples the lack of formulaic and spatial relationship (movement) linkage/connection abilities of Microsoft Excel and Google Sheets spreadsheet PivotTable capabilities.

FIGS. 9A, 9B, 9C, 9D, 10A, and FIG. 10B example deficiencies (i.e., multiple added functions, range limitations, blank value handling problems, and range overextension problems) in the current spreadsheets approaches to formulaic linkage/connection.

FIGS. 11A, 11B, 11C, 12A, and 12B example the greater complexity and additional errors in current spreadsheets of linking/connecting functions to two-dimensionally flexing functions or capabilities.

FIGS. 13A, 13B, 13C, and 13D examples our spreadsheet 'flex copy paste' and 'WRITE_H' range flexing abilities.

FIGS. 14A, 14B, 14C, and 14D examples a SUM function formula cell with and without our formula linkage/connection technology.

FIGS. 15A, 15B, 15C, and 15D examples a text field at the end of a 'flex copy paste' range with and without our movement linkage/connection technology.

FIGS. 16A, 16B, 16C, and 16D examples a SUM function cell formula within the 'flex copy paste' instantiation range with and without our formula and movement linkage/connection technology.

FIGS. 17A, 17B, 17C, and 17D examples the impact of a capability flex on a combination of one cell with our movement linkage/connection technology and one cell with our formula and movement linkage/connection technology compared to cells without the technology.

FIGS. 18A, 18B, 18C, 18D, 19A, 19B, 19C, and 19D examples our linkage/connection technology connected to 'WRITE_H' functional flexes.

Figure 20A:
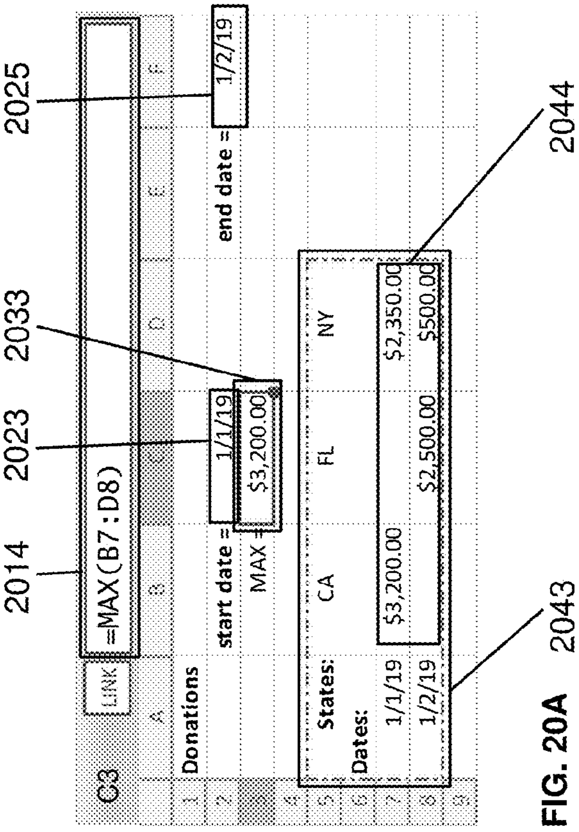
Figure 20B:
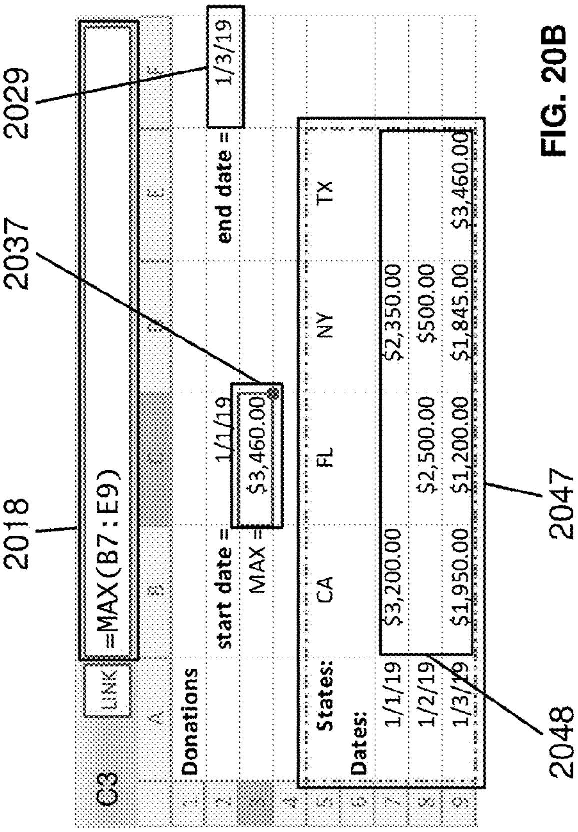

FIGS. 20A and 20B examples formula only linkages/connections to a two-dimensional 'WRITE' function.

Figure 20C:
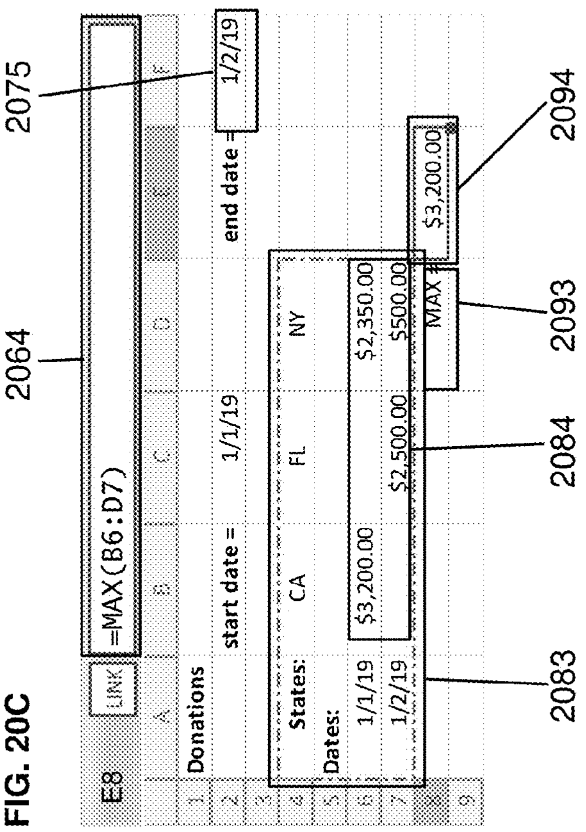
Figure 20D:
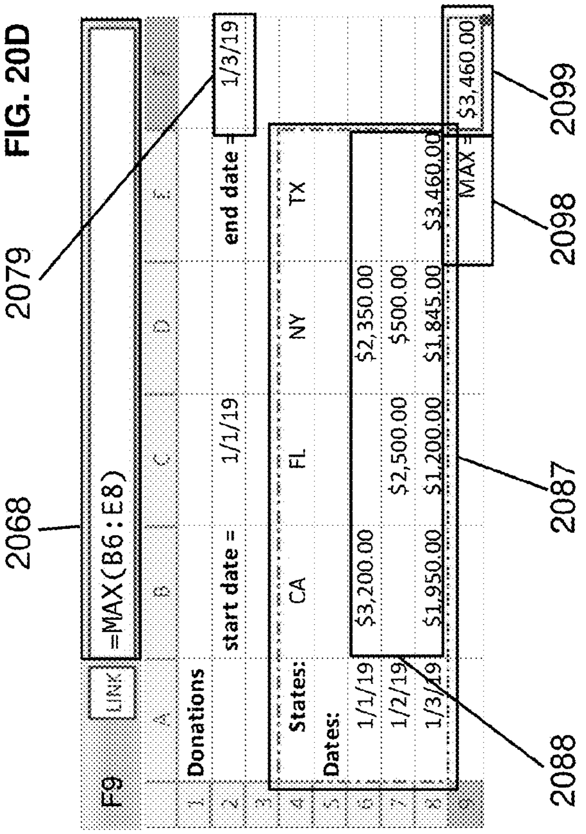

FIGS. 20C and 20D examples movement only and movement and formula (both) linkages/connections to a two-dimensional 'WRITE' function.

Figure 21B:
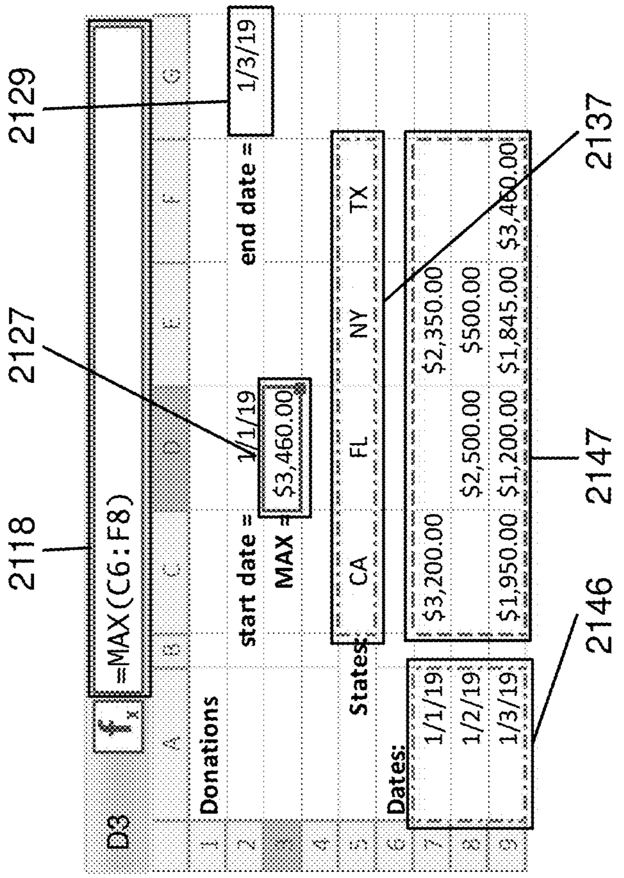
Figure 21A:
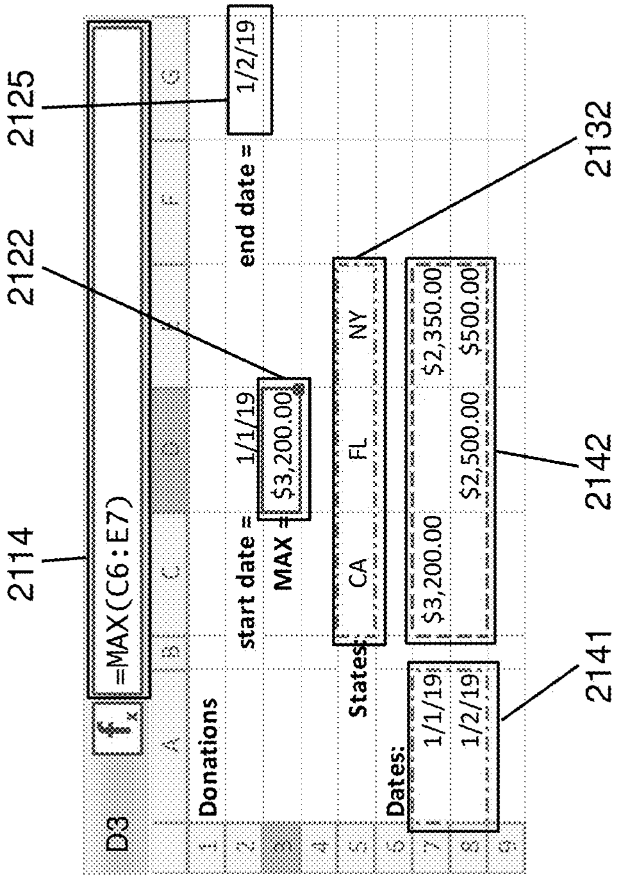

FIGS. 21A and 21B examples formula only linkages/connections to a two-dimensional 'flex copy paste' function connected to two 'WRITE' functions.

FIGS. 22A, 22B, 22C, and 22D examples our movement and formula and movement only linkage/connection technology connected to a two-dimensionally flexing 'flex copy paste' connected to two 'WRITE' functions.

FIGS. 23A, 23B, 23C, and 23D examples our two-way (expansion and contraction adjustment) and one-way (expansion only adjustment) movement linkage/connection technologies for a cell not in the path of the flex.

FIGS. 24A, 24B, 24C, and 24D examples our one-way (flex expansion only) and two-way (flex expansion and contraction) movement technologies working for a cell that is movement linked/connected and never in the path of the flex.

FIGS. 25A, 25B, 25C, and 25D examples our one-way (flex expansion) and two-way (flex expansion and contraction) technologies working for a cell never in the path of the flex that is both movement and formula linked/connected.

FIGS. 26A, 26B, 27A, 27B, 28A, and 28B examples different types of our linkage/connection technology connected to a PivotTable flex capability.

Figure 29A:
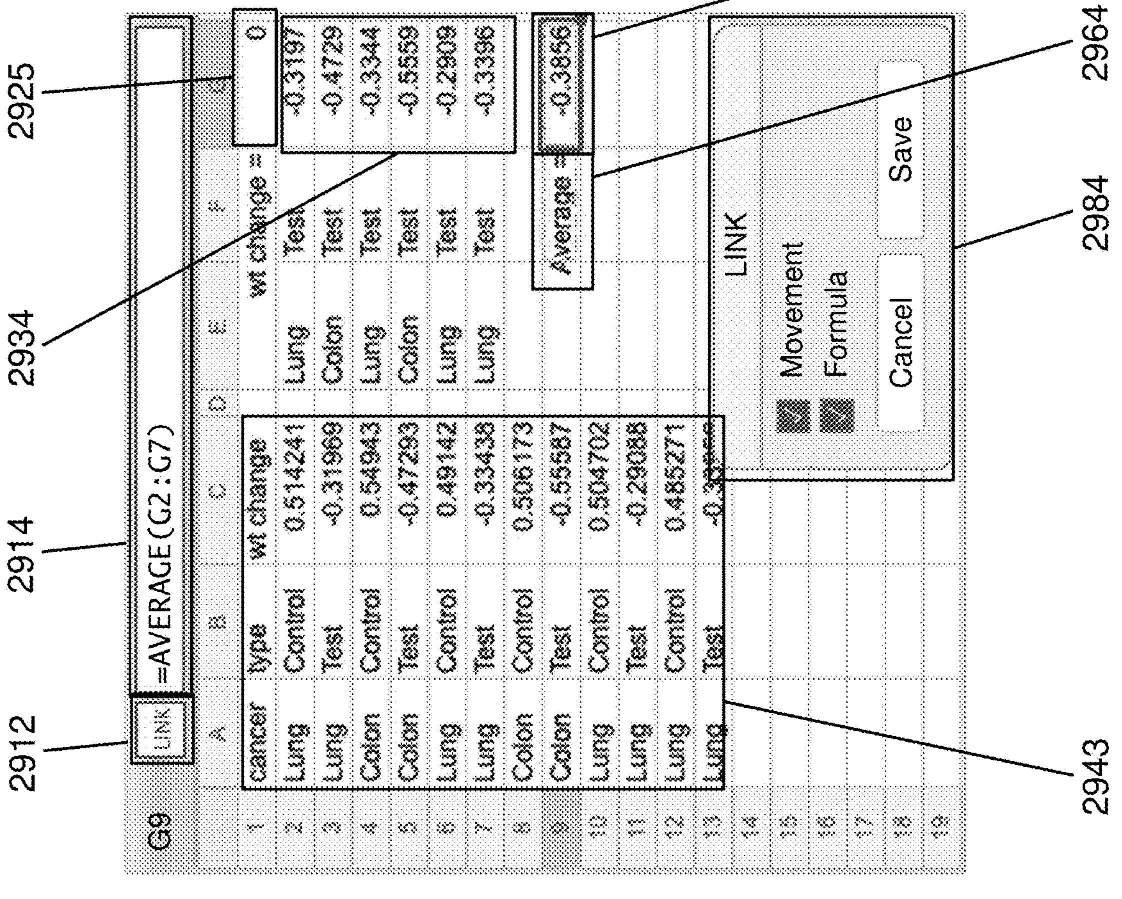
Figure 29B:
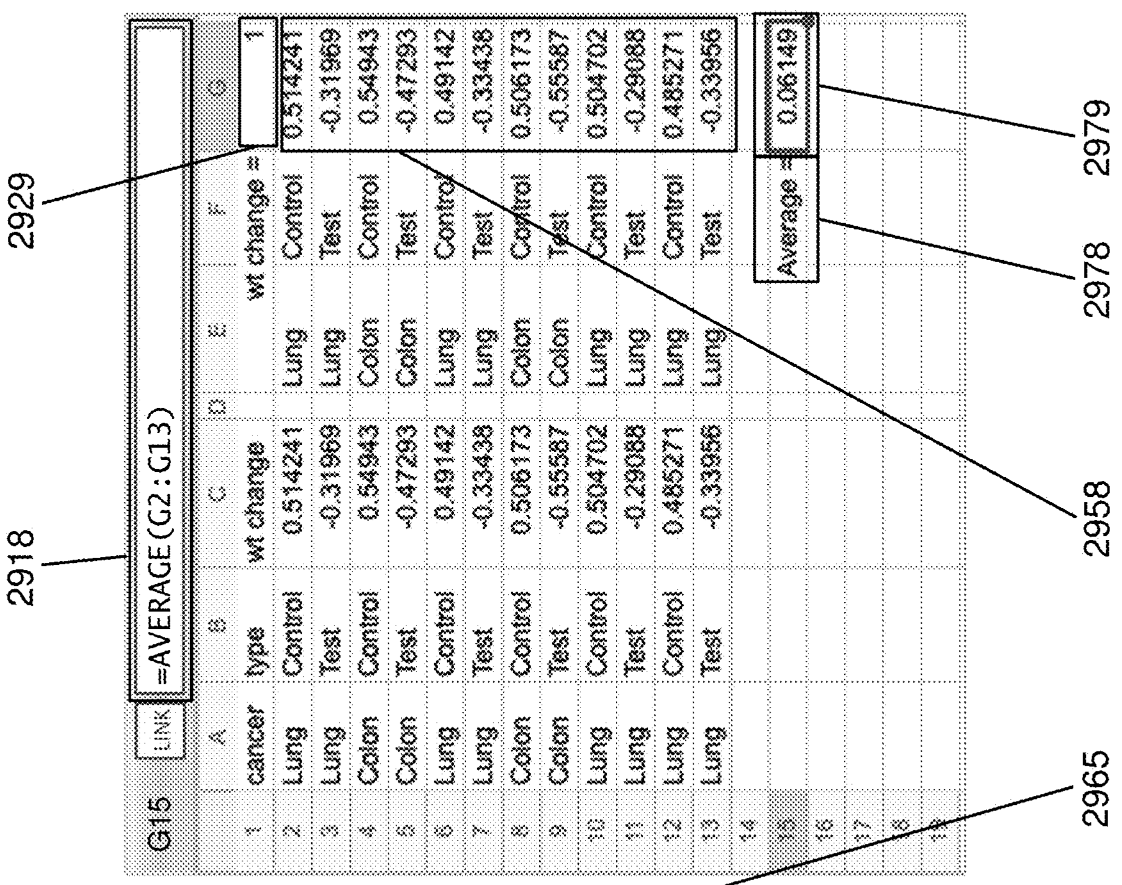

FIG. 29A and FIG. 29B example a combination of a positionally movement only and a formula and positional movement linkage/connection to a FILTER function flex range in our technology.

Figure 30A:
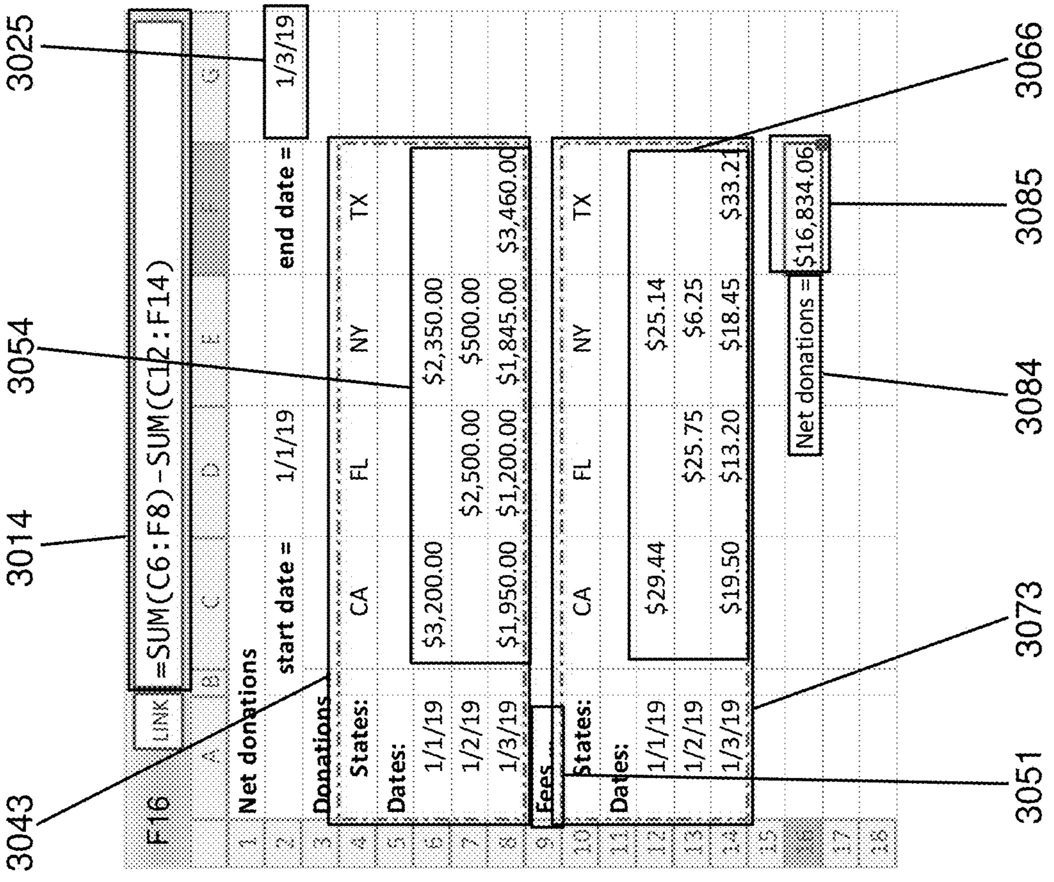
Figure 30B:
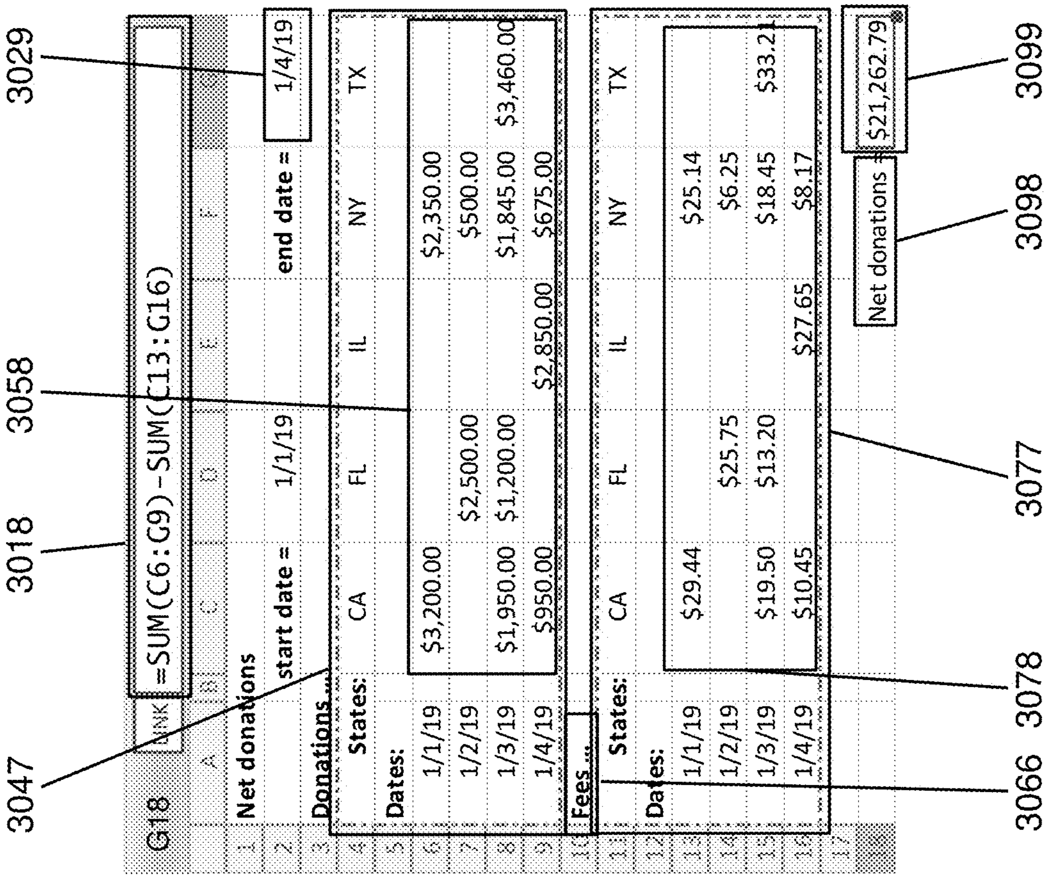

FIGS. 30A and 30B example two 'WRITE_CALC_2D' formulas, two text cells and one calculation cell that have been directly and indirectly cascading linked/connected by our technology.

Figure 31B:
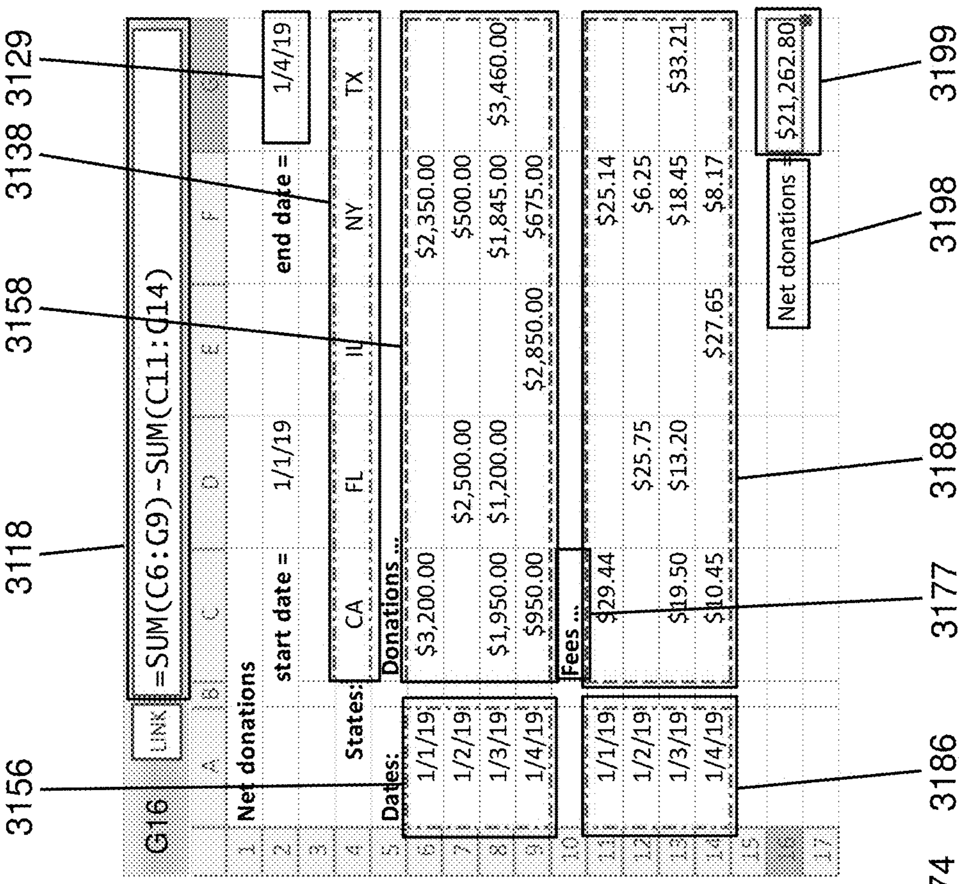
Figure 31A:
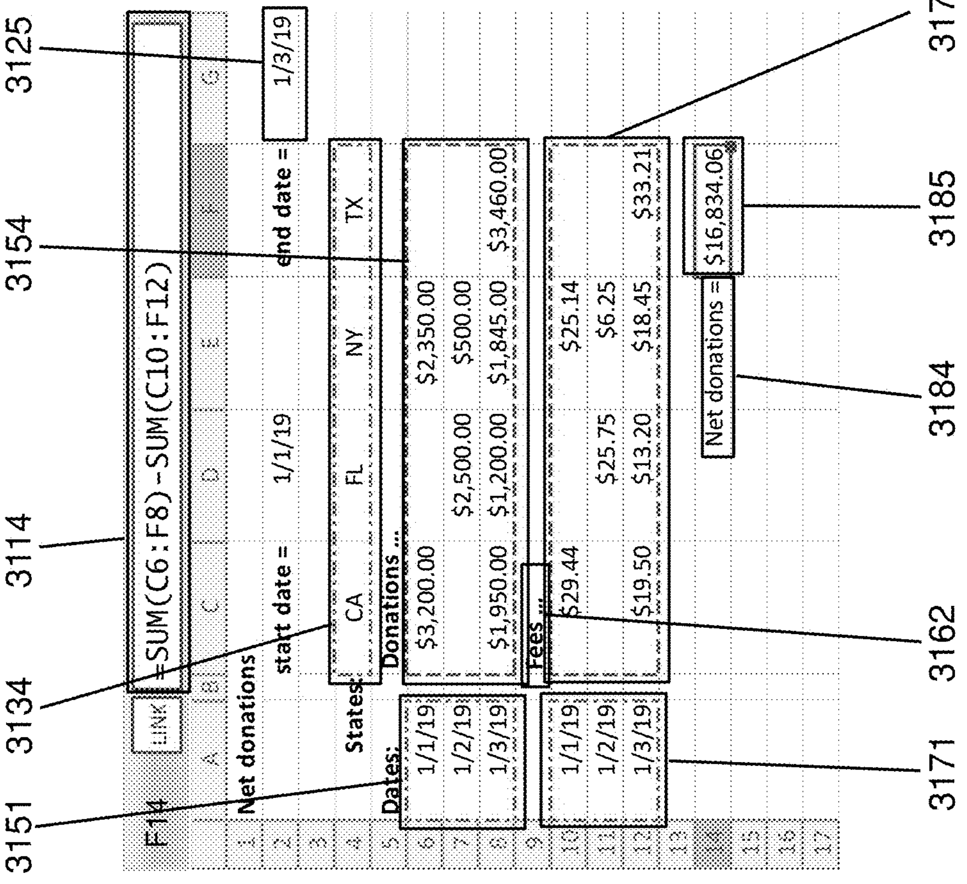

FIGS. 31A and 31B example two flex copy paste capabilities, three WRITE functions, two text cells and one multiple SUM calculation cell that have been directly and/or cascading movement linked/connected by our technology.

Figure 32B:
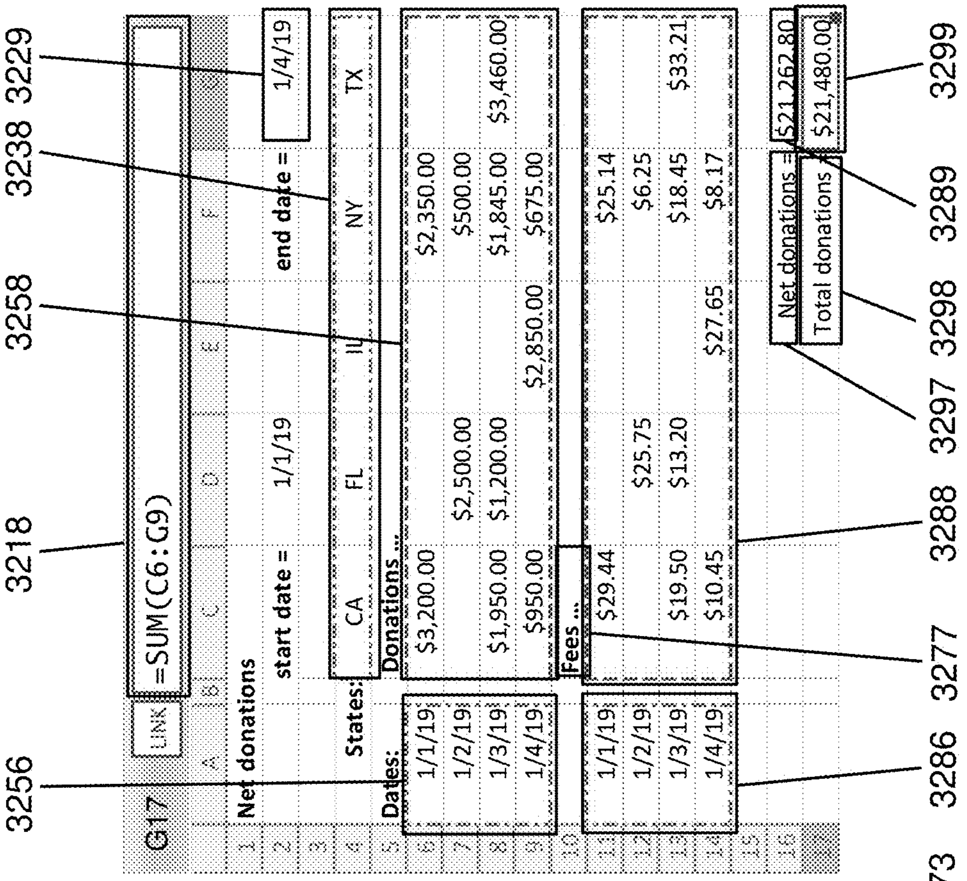
Figure 32A:
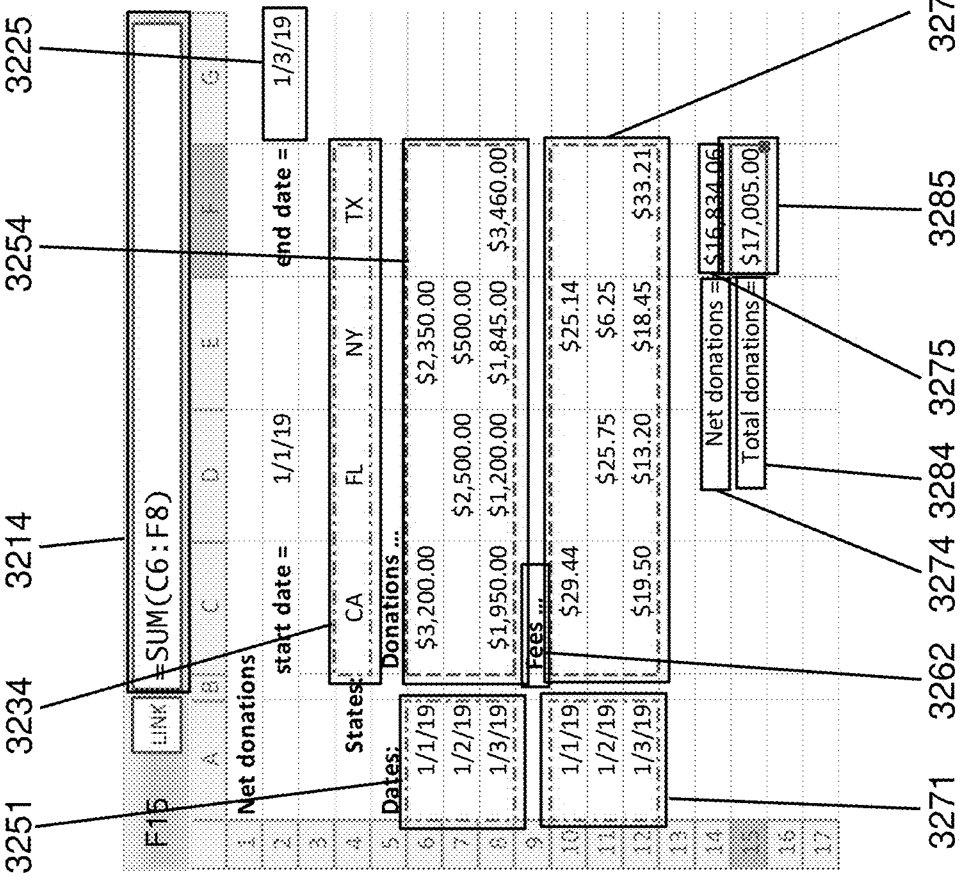

FIGS. 32A and 32B example the direct and indirect movement in unison of four individual cells movement linked/connected to multiple flex areas.

Figures 33A, 33B:
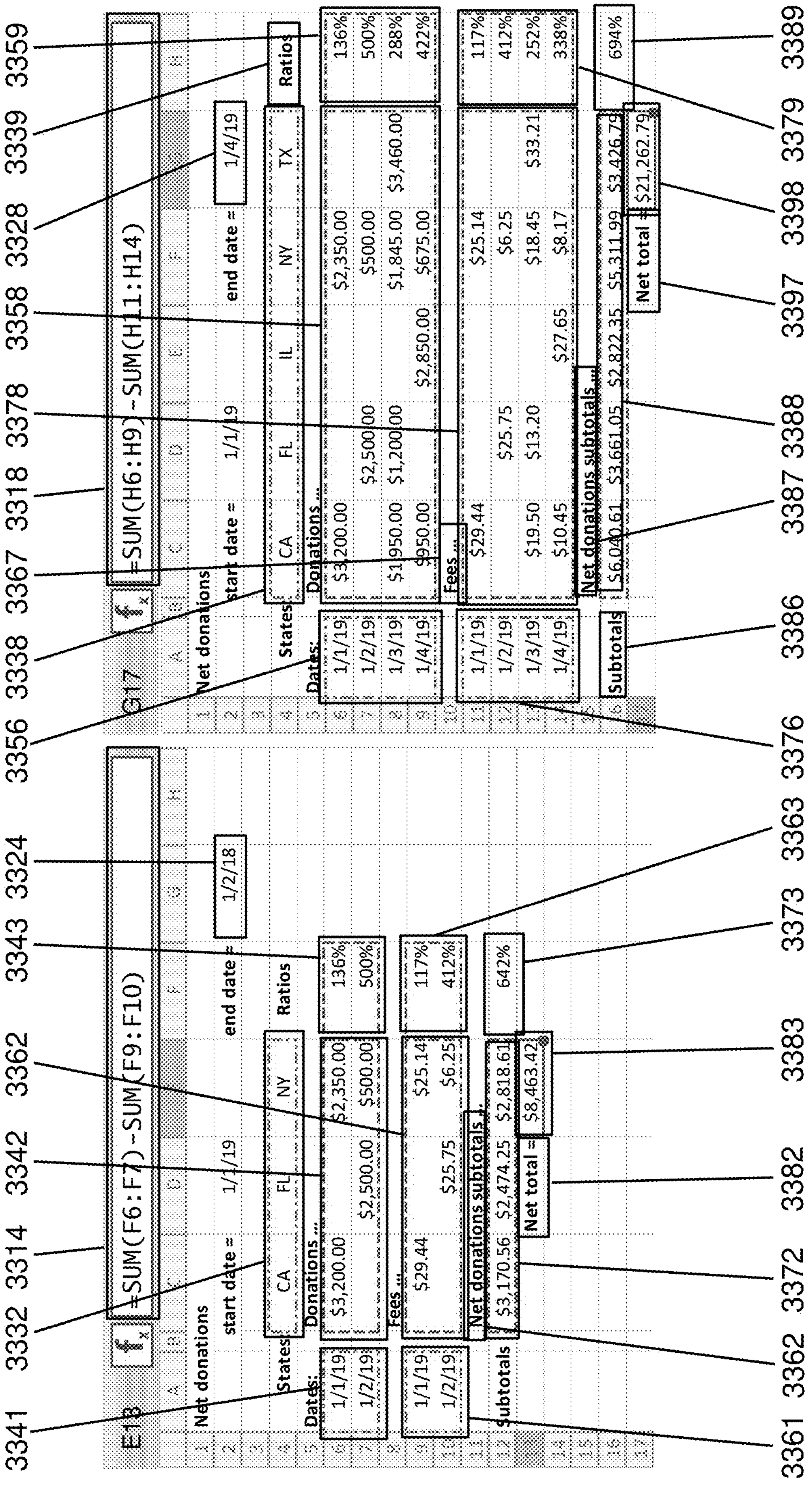

FIGS. 33A and 33B example multiple 'flex copy pastes', multiple 'WRITEs' multiple text fields and multiple SUM calculation cells, some side-by-side others spatially offset, some directly linked/connected with others indirectly cascading linked/connected by our technology.

Figure 34A:
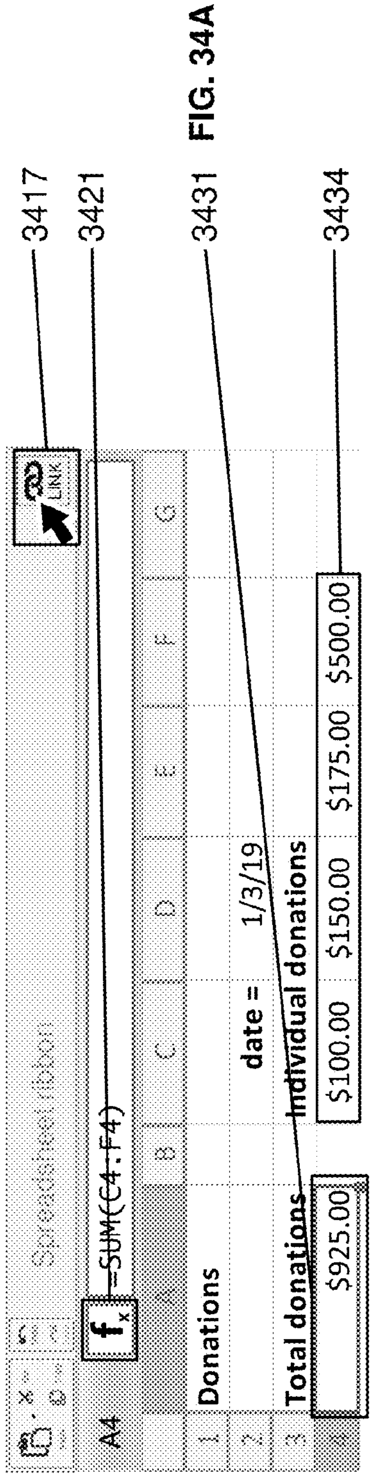
Figure 34B:
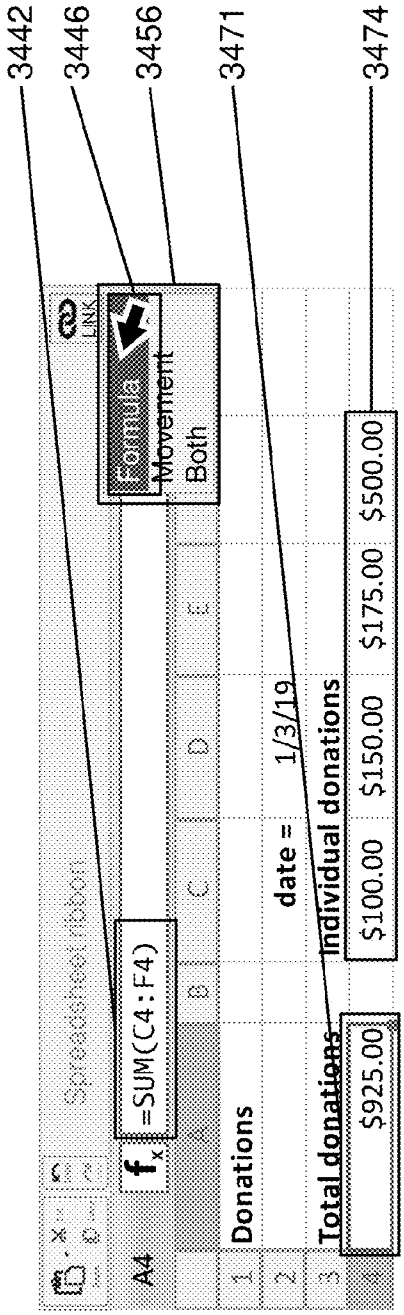
Figure 34C:
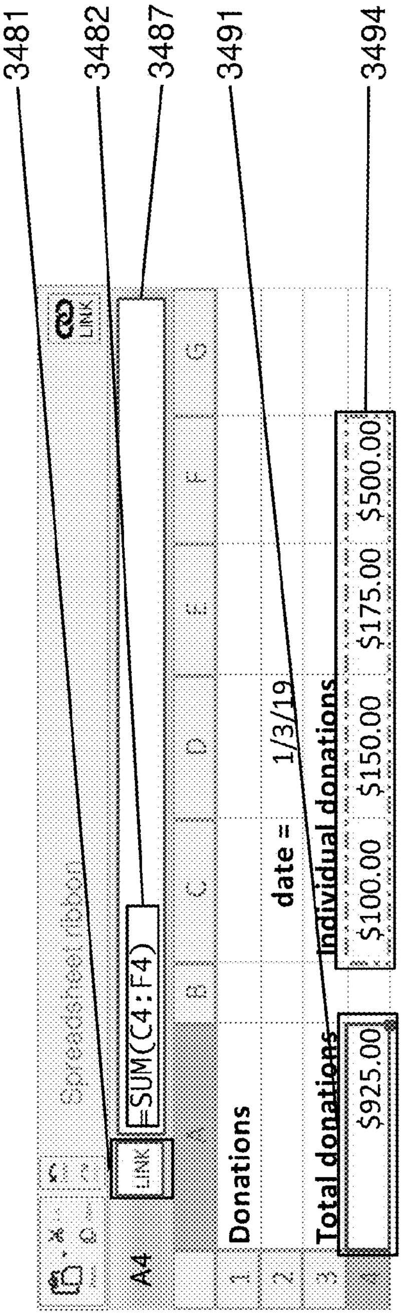

FIGS. 34A, 34B, and 34C examples manual linkage/connection setup via a ribbon button triggered popup selection panel, that instantiates a formula with invisible linkage/connection arguments.

Figure 35A:
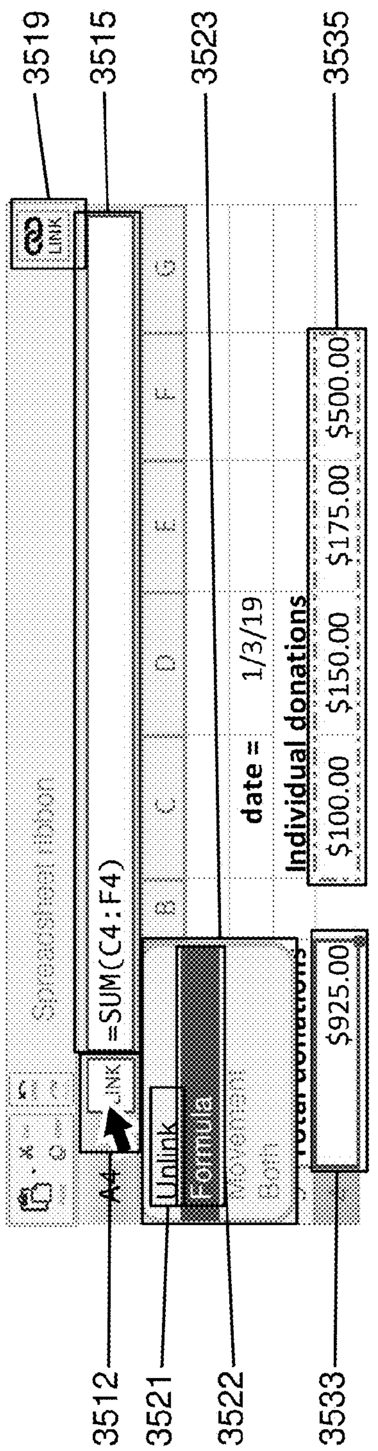
Figure 35B:
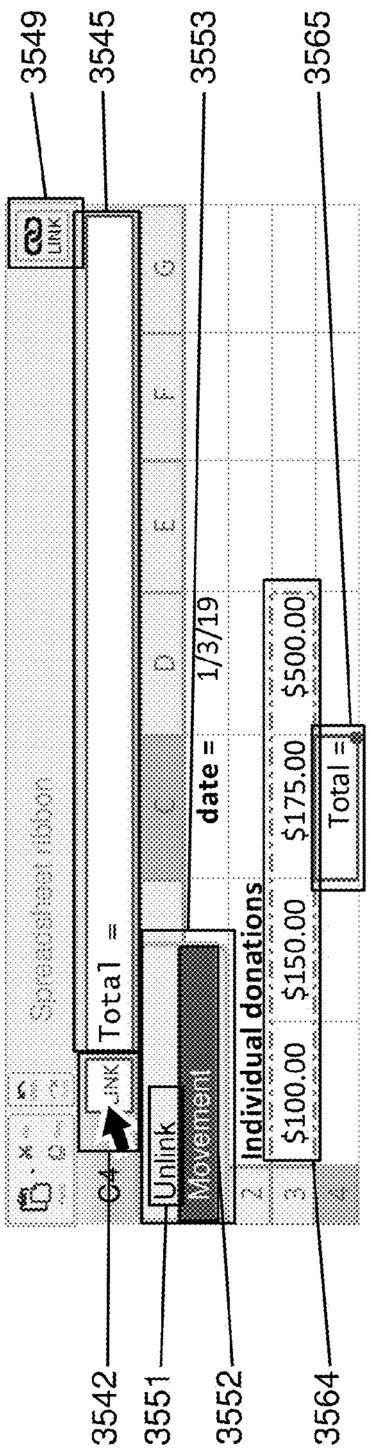
Figure 35C:
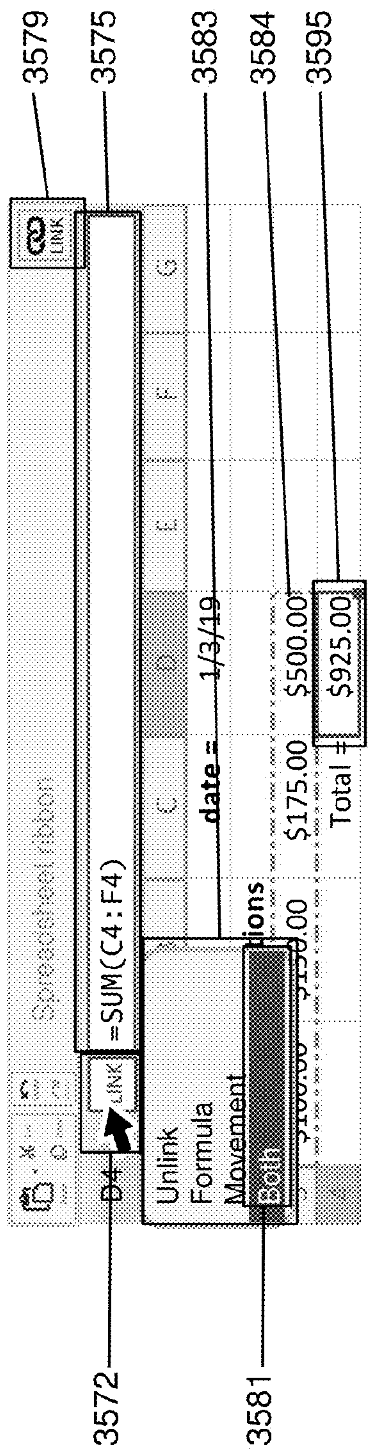

FIGS. 35A, 35B, and 35C examples approaches for changing our formulaic, movement and both formulaic and movement linkages/connections.

Figure 36A:
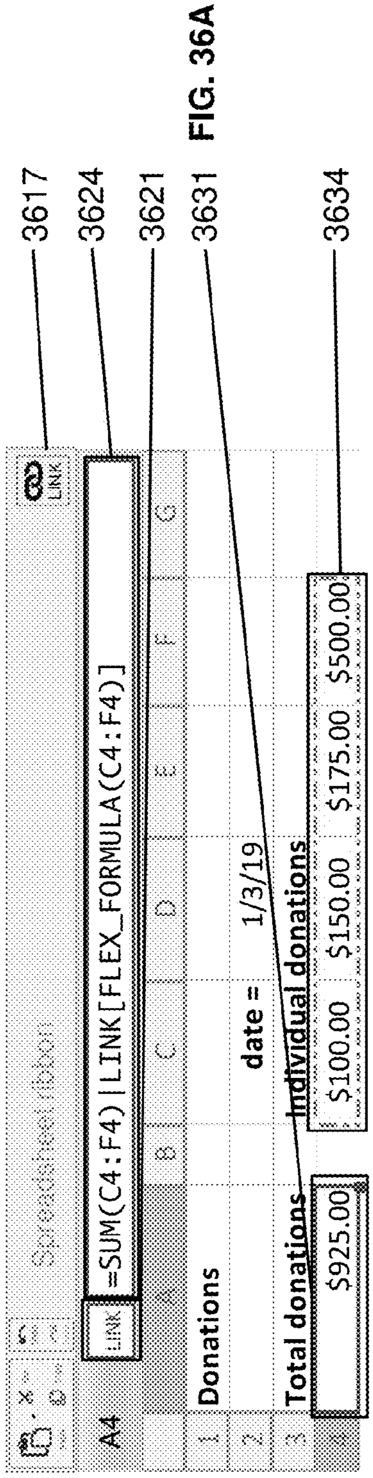
Figure 36B:
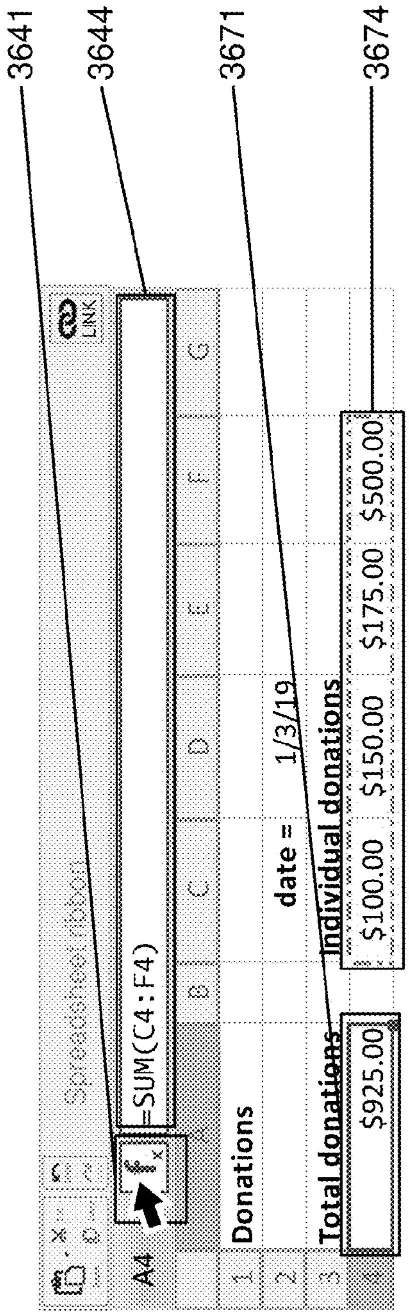
Figure 36C:
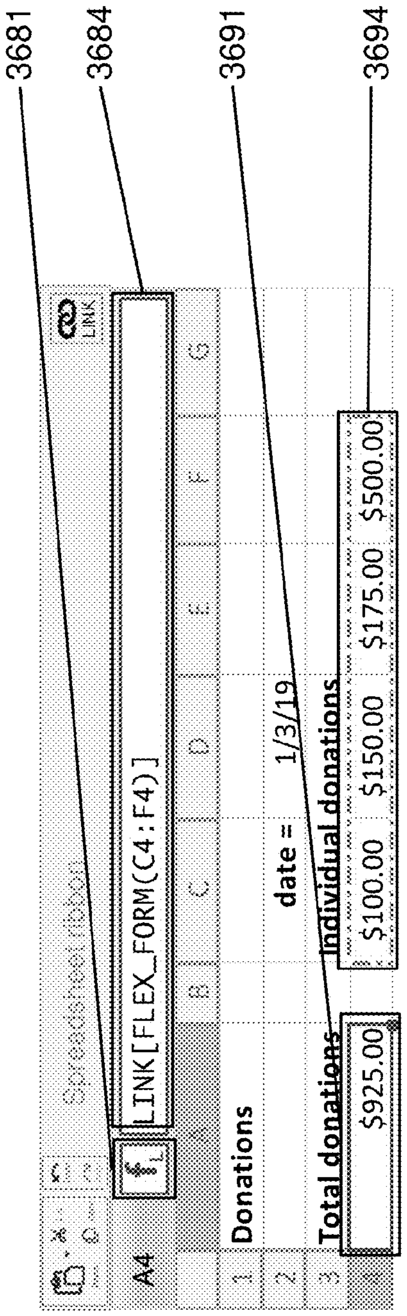

FIGS. 36A, 36B, and 36C examples different embodiment of a manual link/connect setup delivering visible link arguments in two different ways (directly into the formula or into a separate formula).

Figures 37A, 37B, 37C:
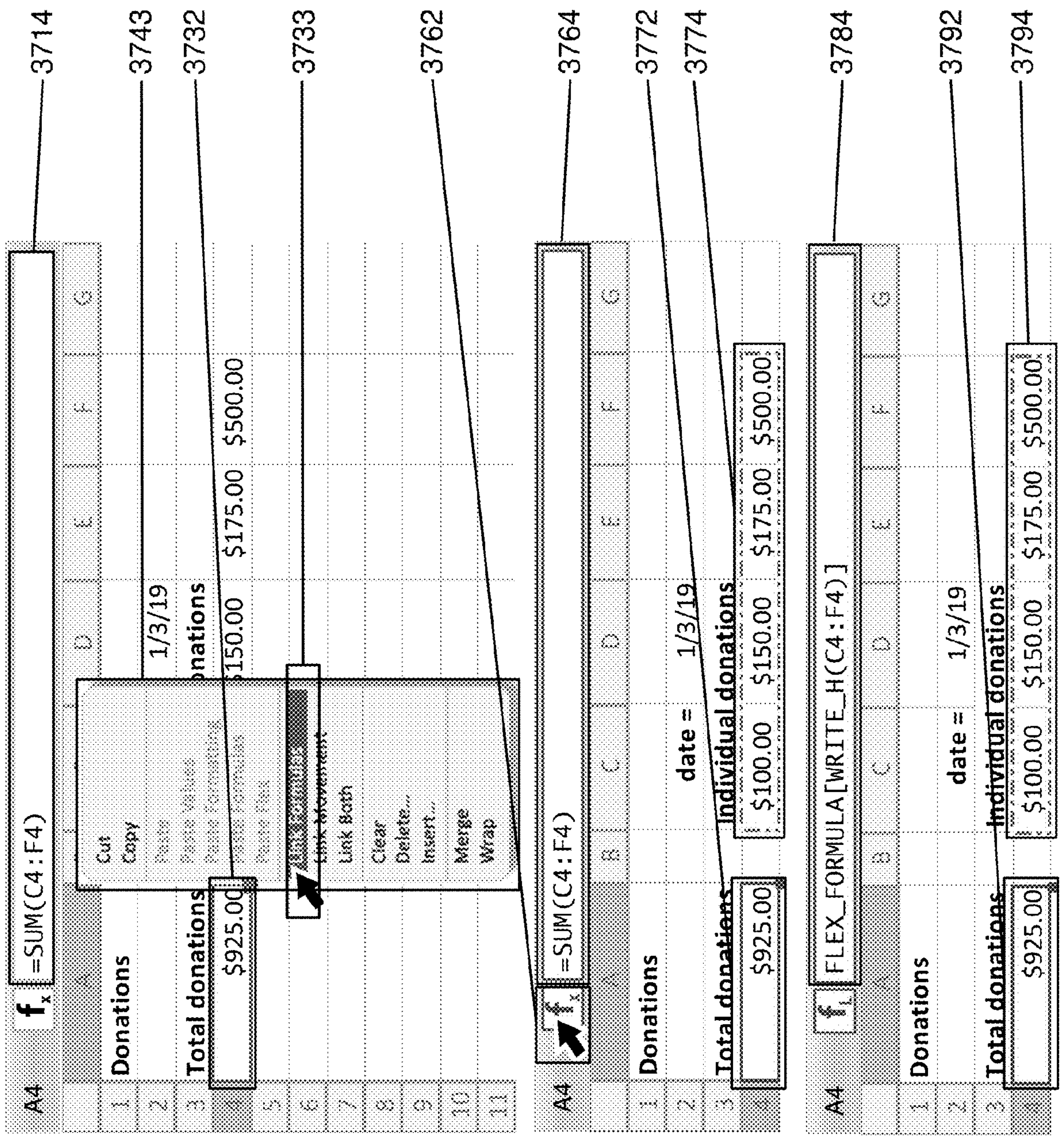

FIGS. 37A, 37B, and 37C examples a menu link/connection setup embodiment paired with our switchable (regular and separate link argument formula) visible link/connect arguments.

FIGS. 38A, 38B, 38C, and 38D examples a menu triggered link setup for a movement only link/connection with invisible link arguments connecting to a specific segment location within a flex range.

FIGS. 39A, 39B, 39C, and 39D examples the removal of a link/connection by removing the separate formula link argument.

Figure 40A:
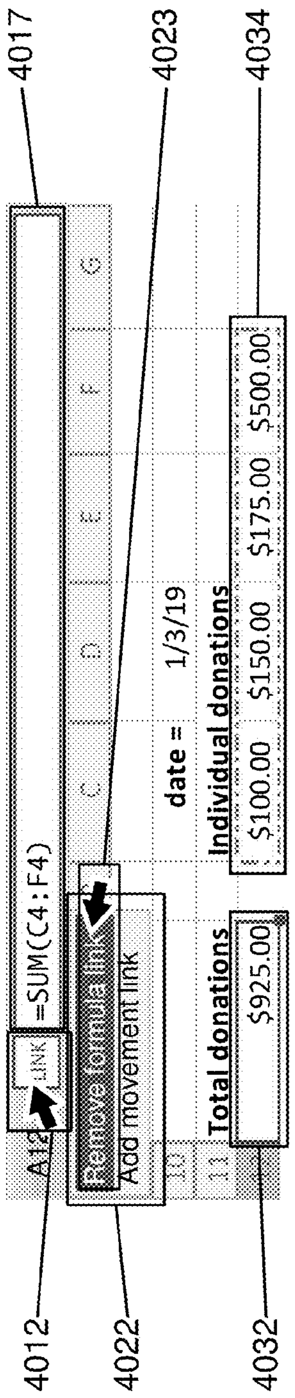
Figure 40B:
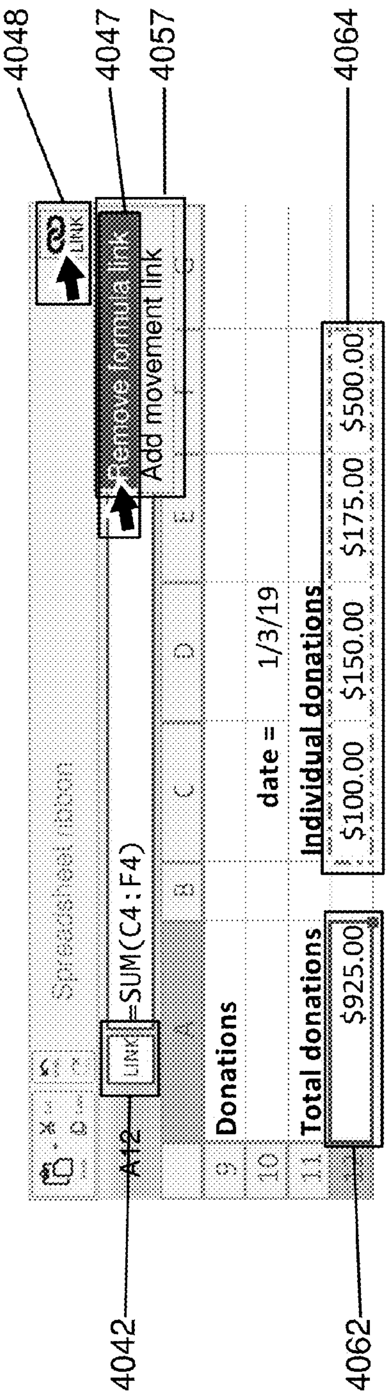
Figure 40C:
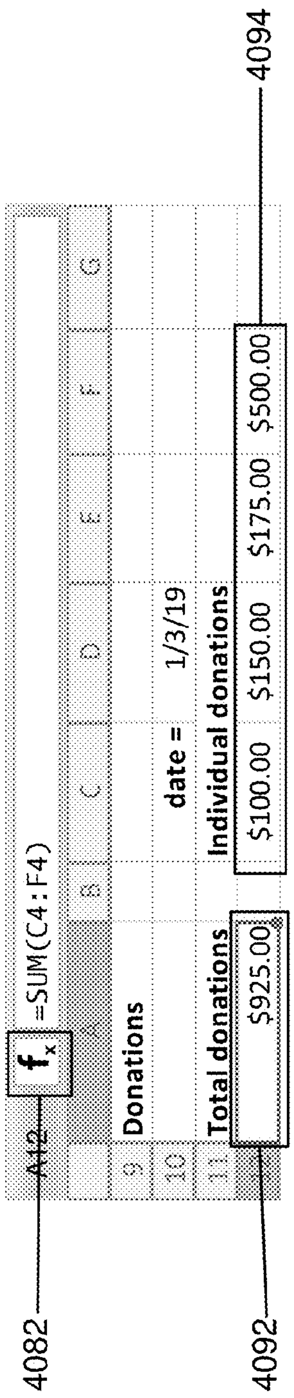

FIGS. 40A, 40B, and 40C examples the removal of an invisible argument link using a selector popup triggered by a formula bar 'LINK' button or a ribbon 'LINK' button.

Figure 41A:
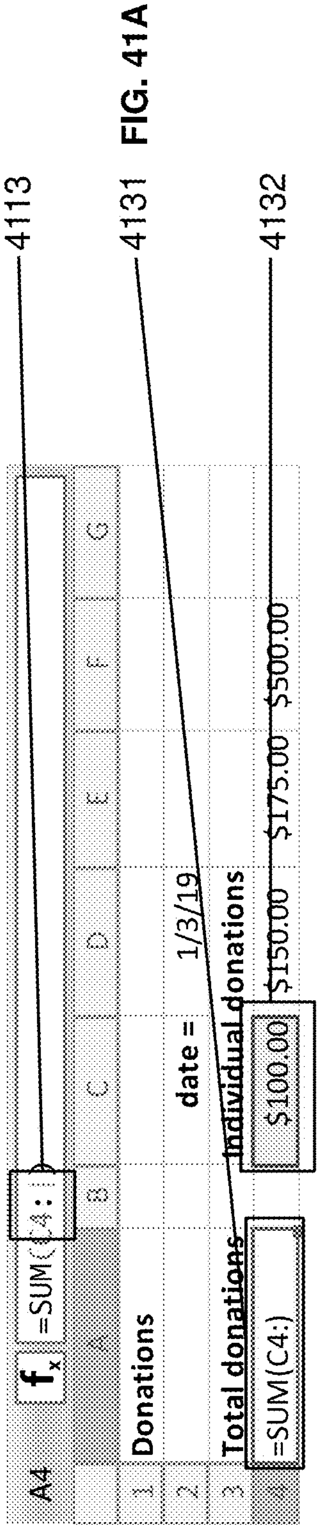
Figure 41B:
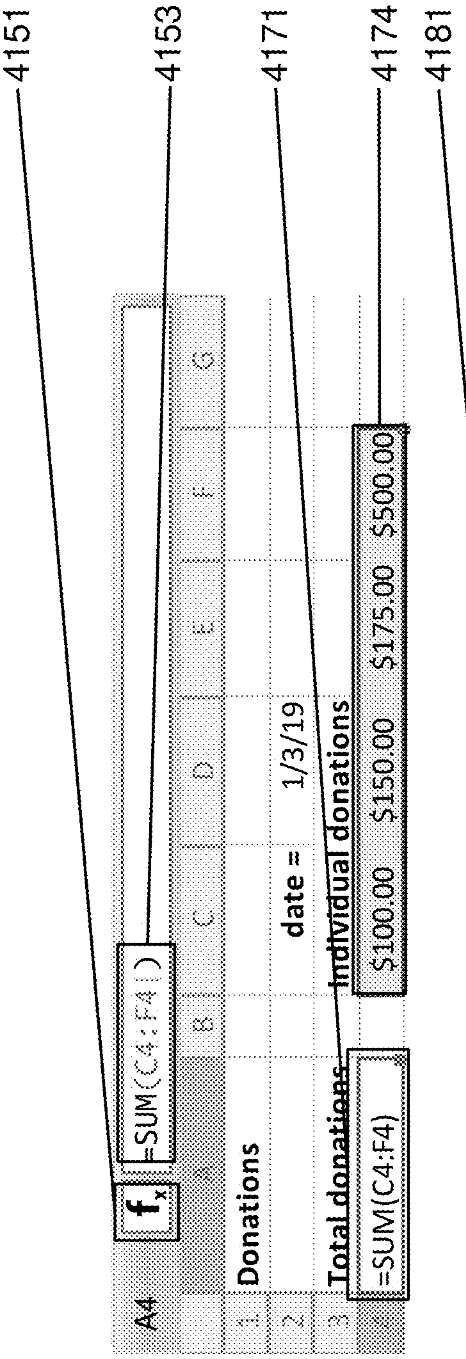
Figure 41C:
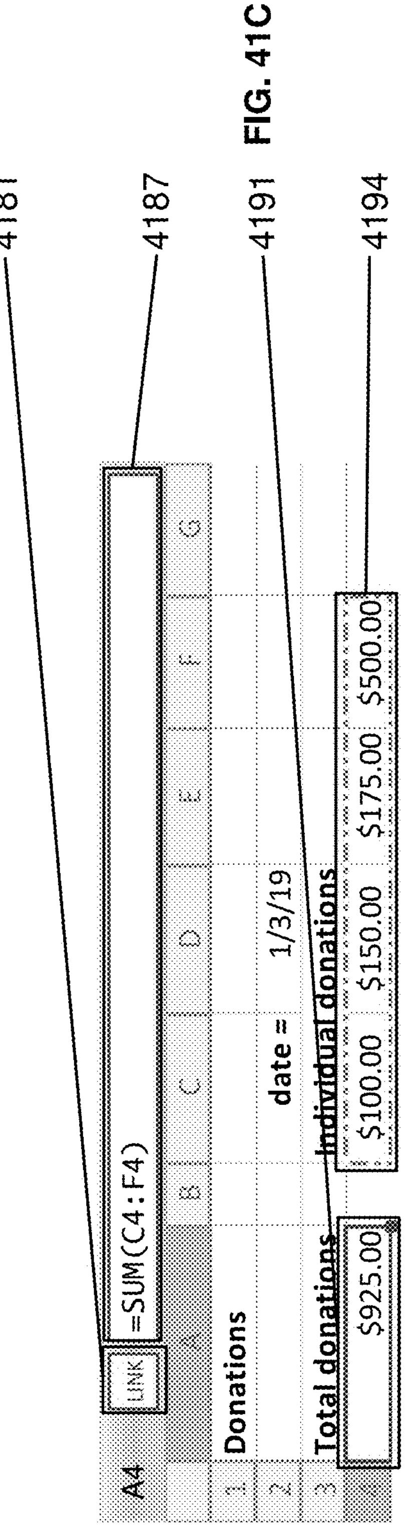

FIGS. 41A, 41B, and 41C examples an automatic setup of a formulaic link/connect connected to a one-dimensional 'flex copy paste' with an invisible link/connect argument.

Figure 42A:
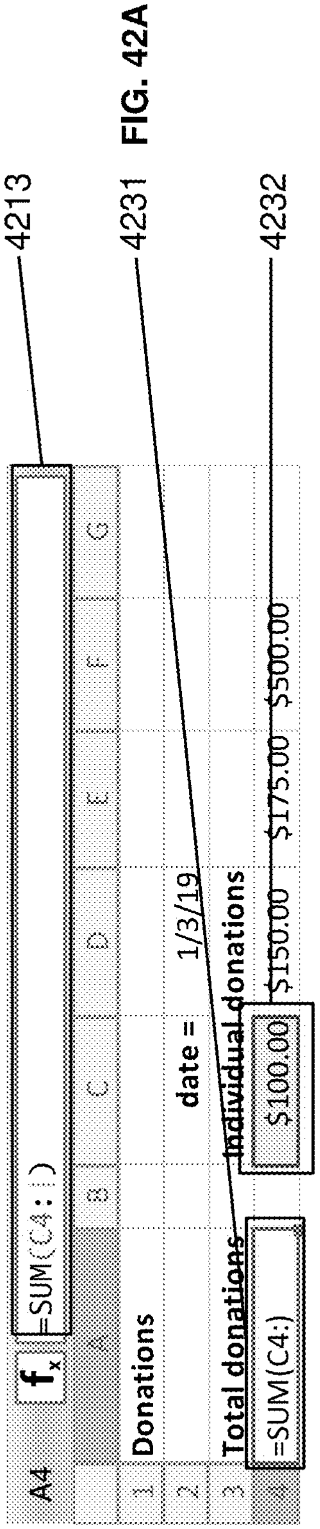
Figure 42B:
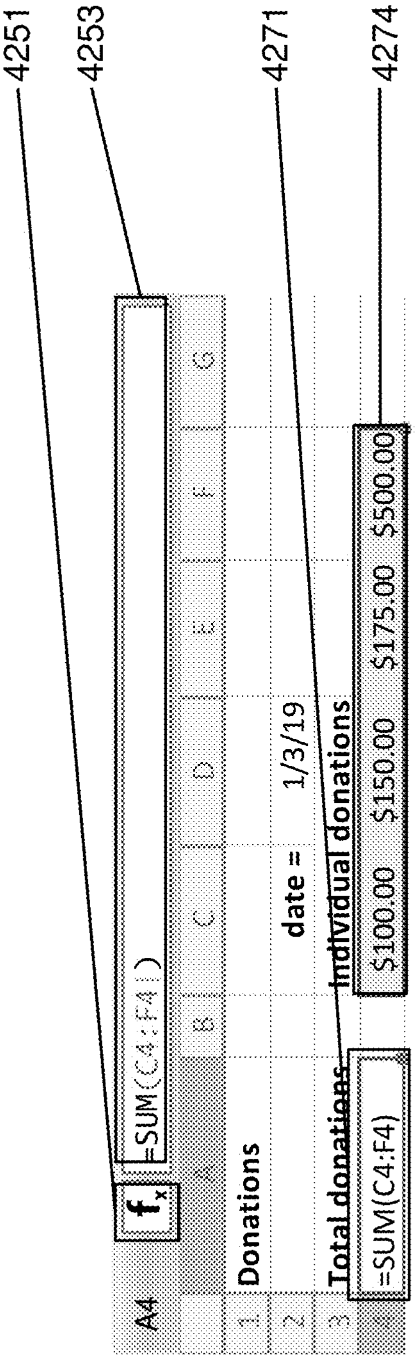
Figure 42C:
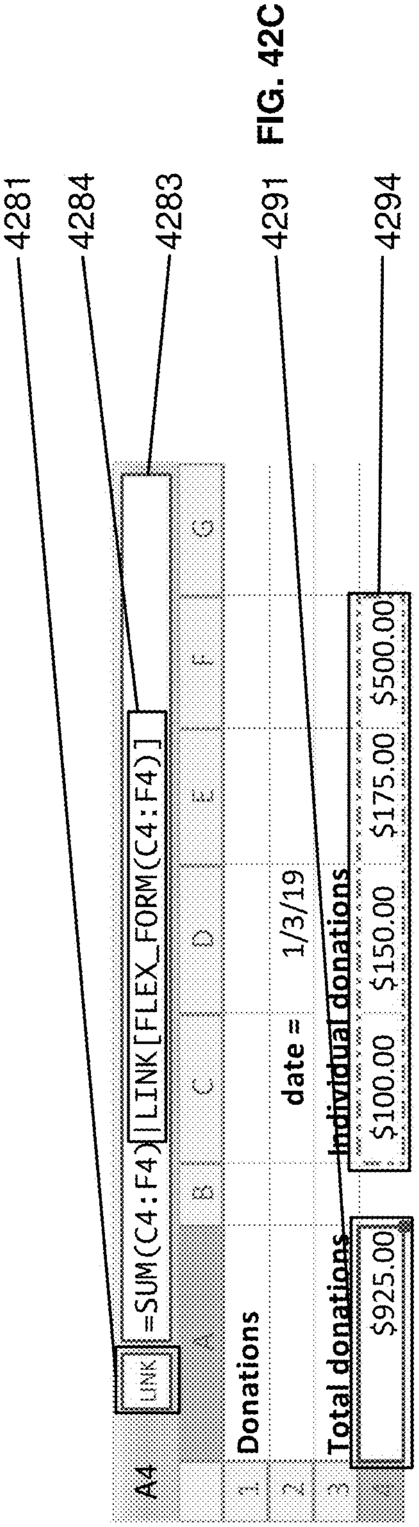

FIGS. 42A, 42B, and 42C examples an automatic set up of a formulaic link/connect in our technology to a one-dimensional 'flex copy paste' delivering a visible link/connect argument.

FIGS. 43A, 43B, 43C, and 43D examples an automatic set up of a formulaic and movement link/connect to a one-dimensional 'flex copy paste' with a visible linkage/connection argument and another exampling a separately visible (switchable) linkage/connection argument.

FIGS. 44A, 44B, 44C, and 44D examples an automatic set up of a movement link/connect to a one-dimensional 'flex copy paste' with a visible linkage/connection argument and another exampling a separately visible (switchable) linkage/connection argument.

FIGS. 45A, 45B, 45C, and 45D examples an automatic set up of a formulaic link/connect to a one-dimensional 'flex copy paste' with a separately visible (switchable) linkage/connection argument.

FIGS. 46A, 46B, 46C, and 46D examples an automatic set up of a movement link/connection to a WRITE with an invisible link/connect argument and its usage.

Figure 47B:
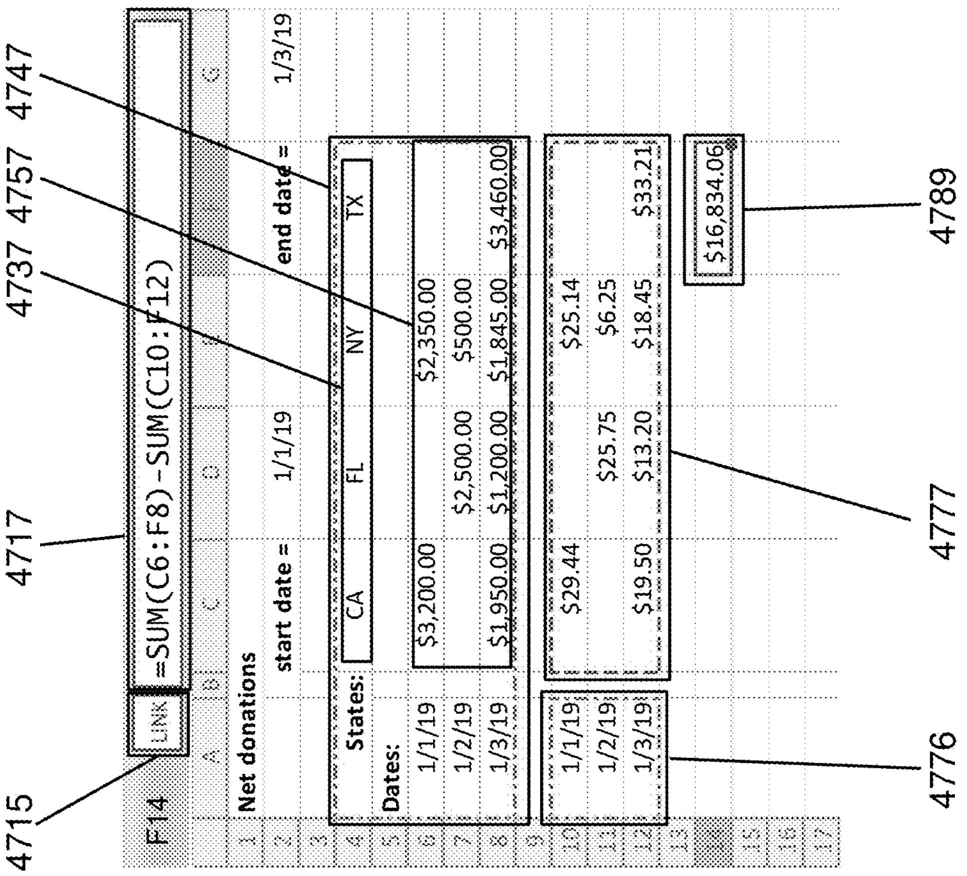
Figure 47A:
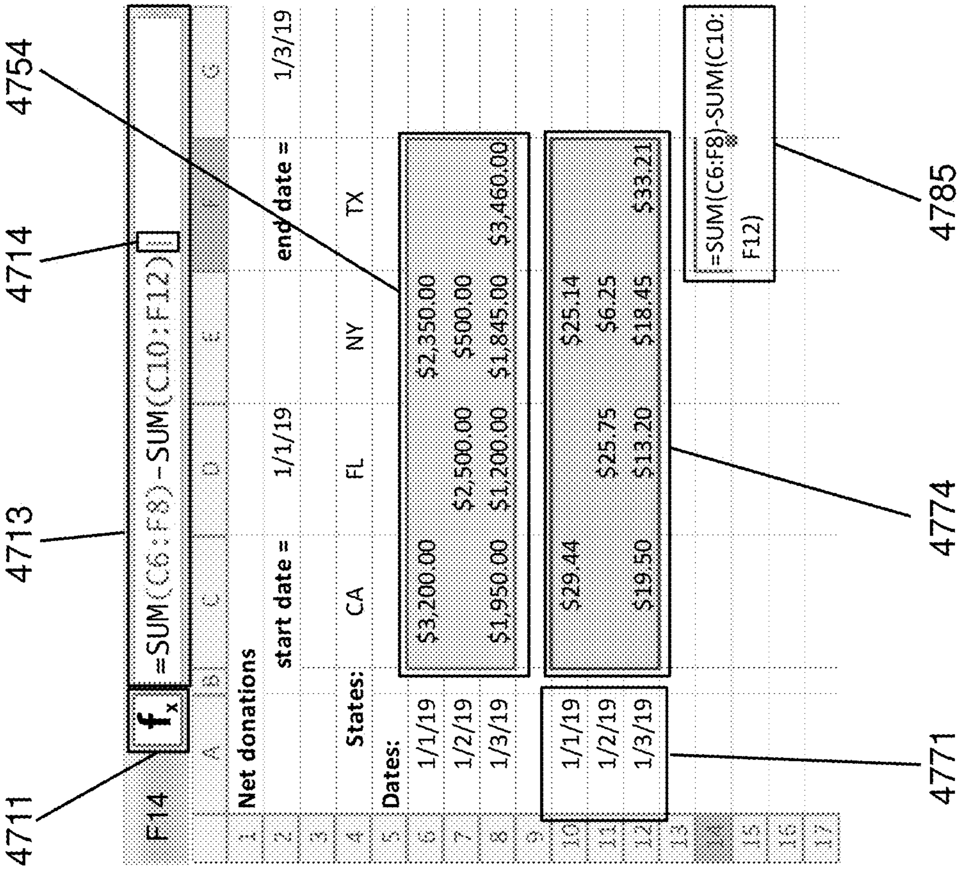

FIGS. 47A and 47B examples the simultaneous automatic set up of a formula link/connect connection to two flex ranges (one a capability and the other a function) and a movement link/connect to three different flex ranges (i.e., two different types of 'WRITEs' and one 'flex copy paste'), all done with invisible linkage arguments.

Figure 48B:
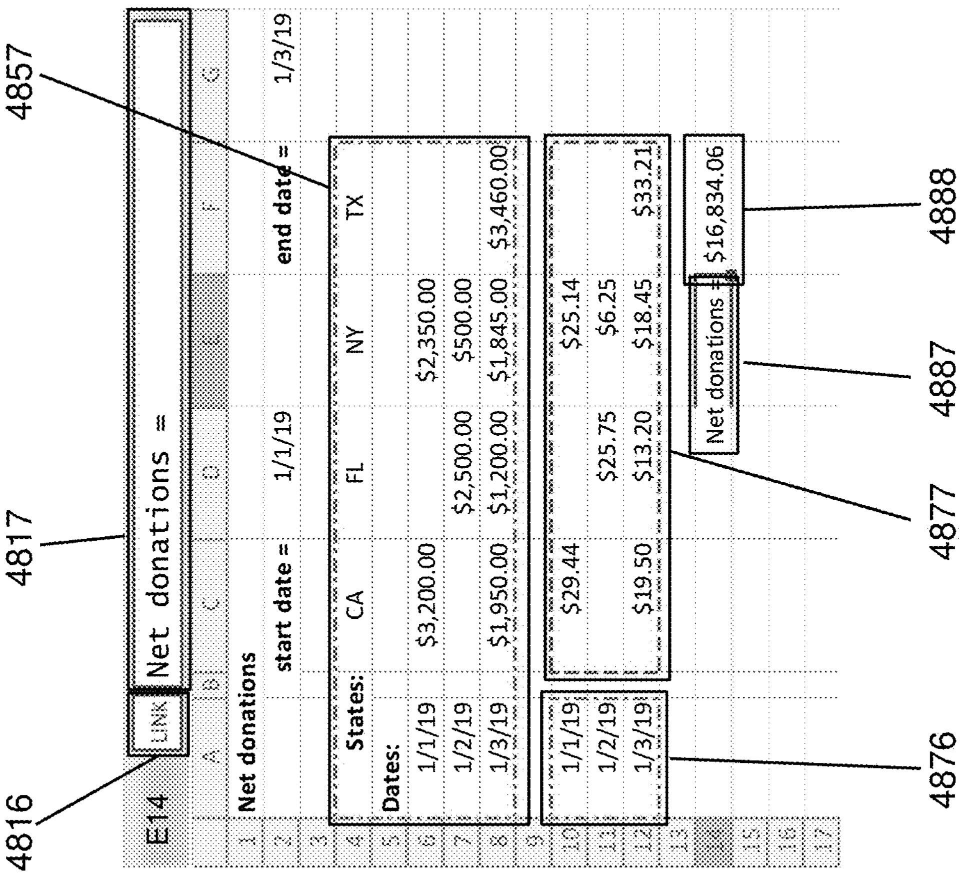
Figure 48A:
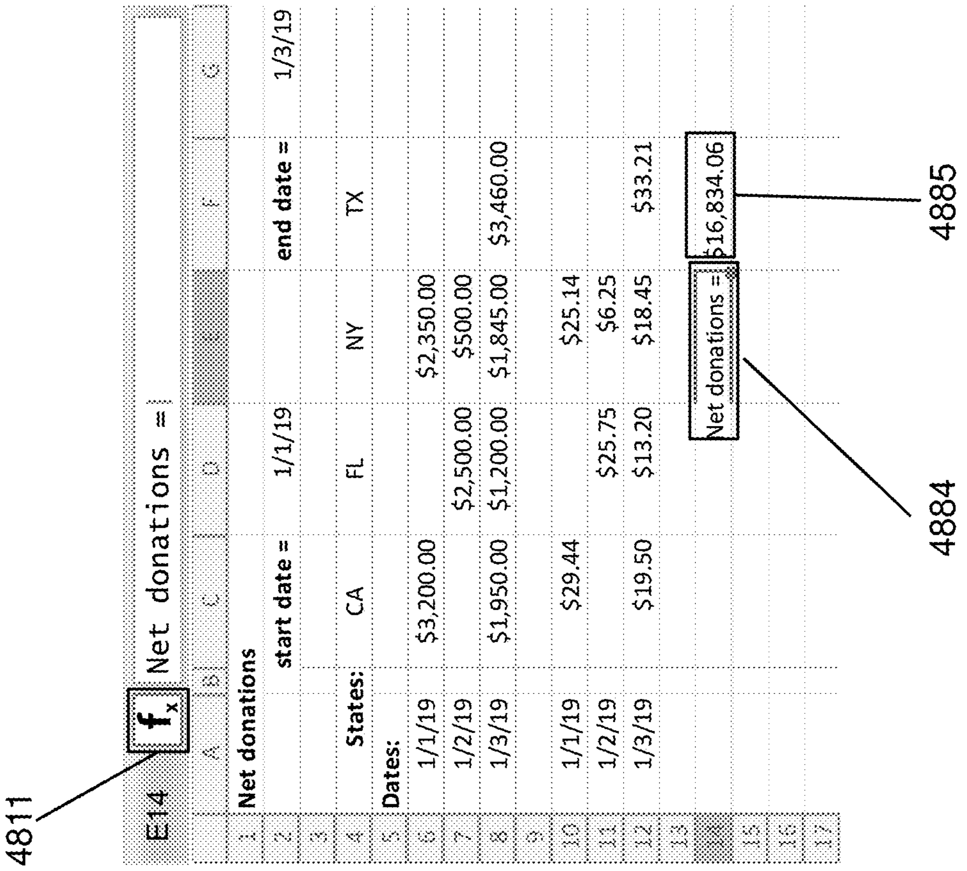

FIGS. 48A and 48B examples the automatic set up of a movement link/connect cell to three flex ranges (i.e., two different types of 'WRITEs' and one 'flex copy paste') with invisible link/connect arguments.

FIGS. 49A, 49B, 49C, 50A, and 50B example an additional UI driven approach for removing automatically set up links/connections through a new variant of UNDO.

Figure 51:
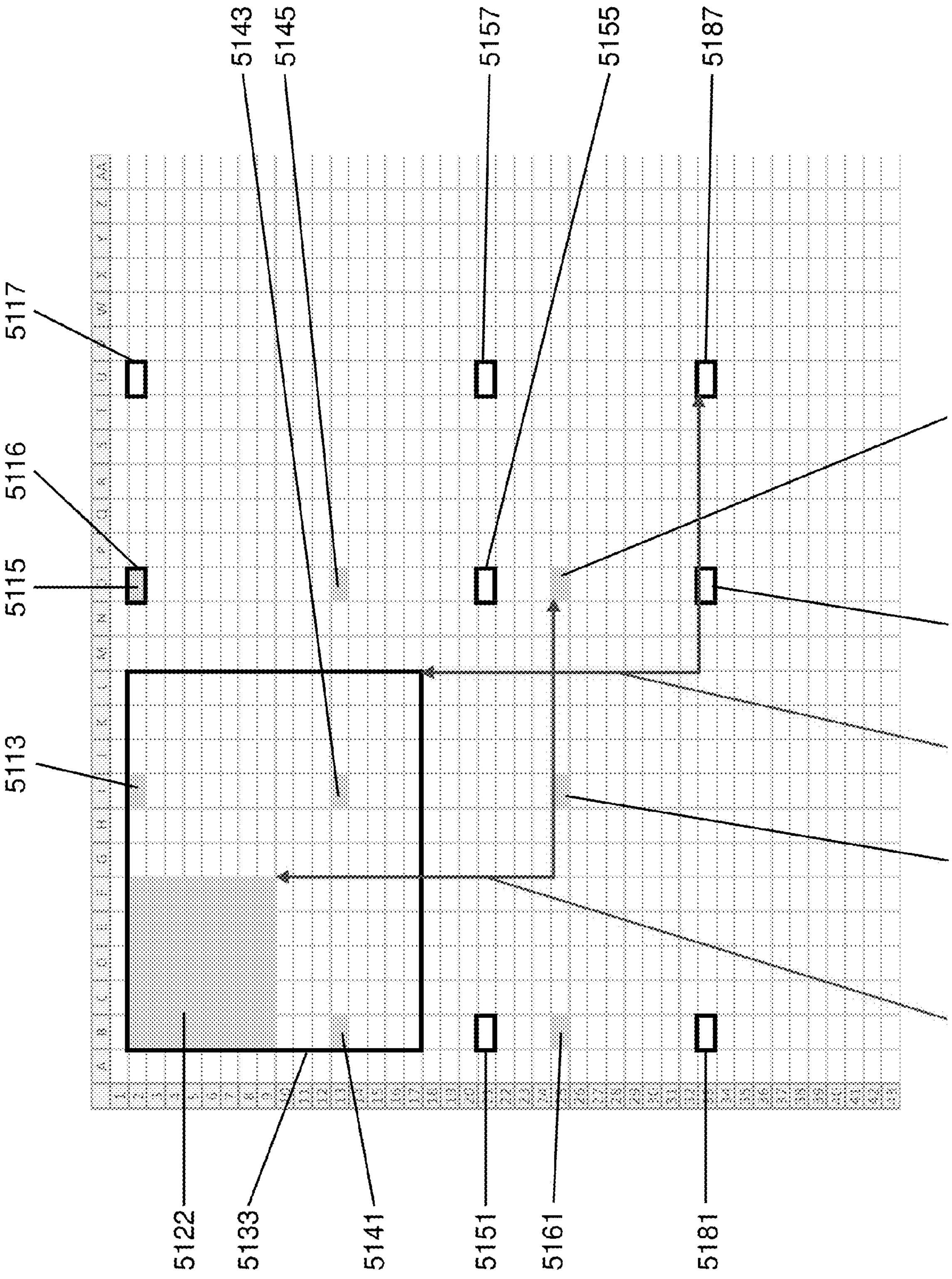

FIG. 51 conceptually examples a single flex range with movement linkages/connections to eight cells pre and post flex.

Figure 52:
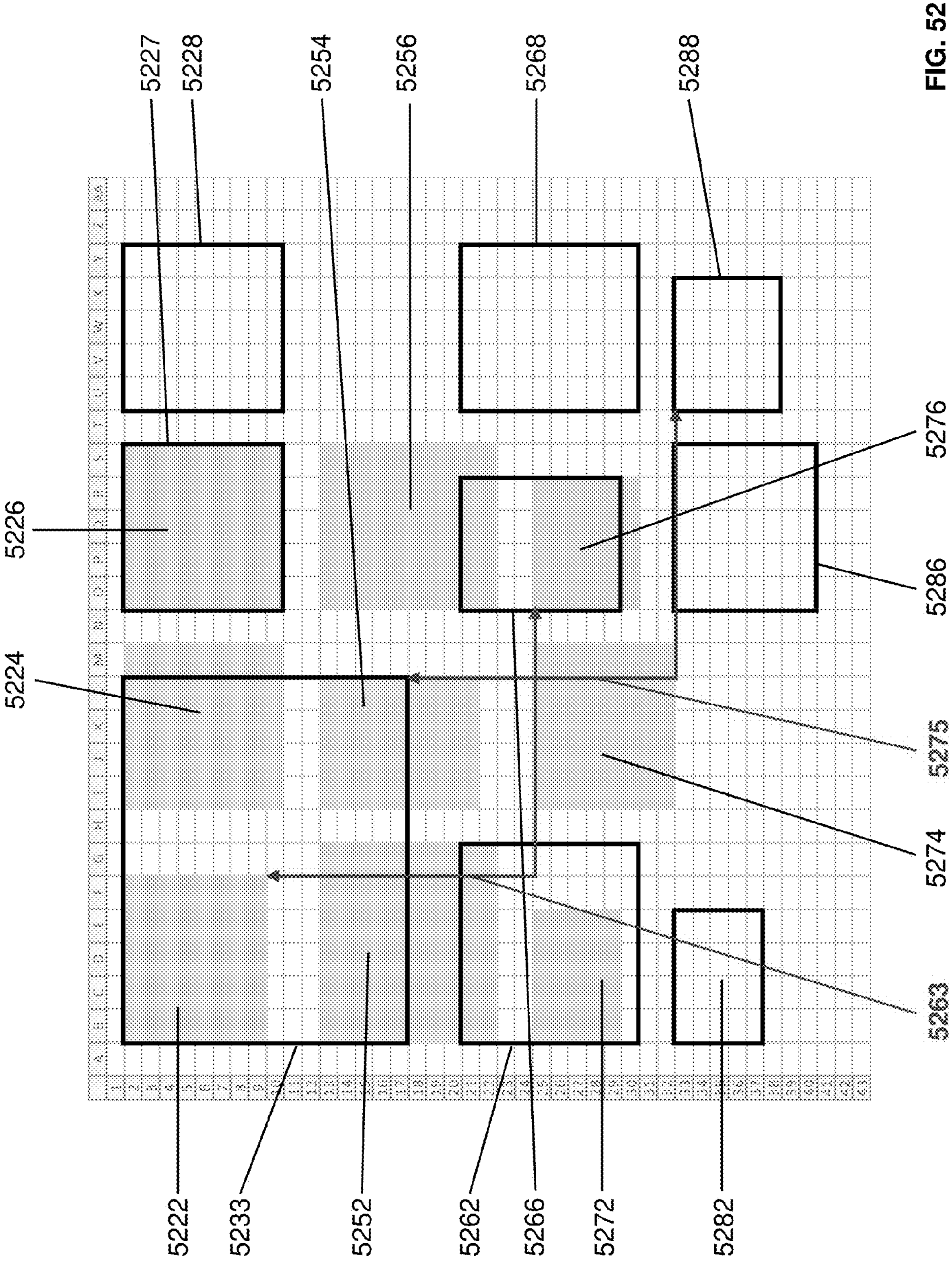

FIG. 52 conceptually examples a flex range with movement linkages/connections to eight other flex ranges pre and post flex.

Figure 53B:
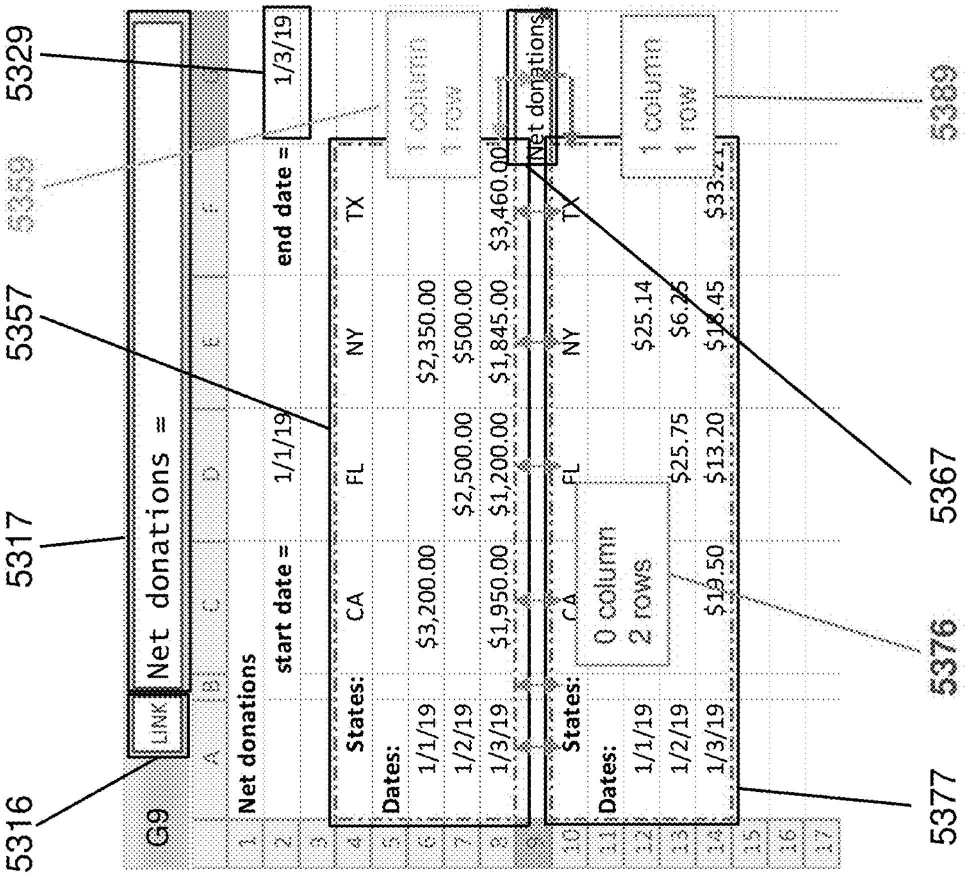
Figure 53A:
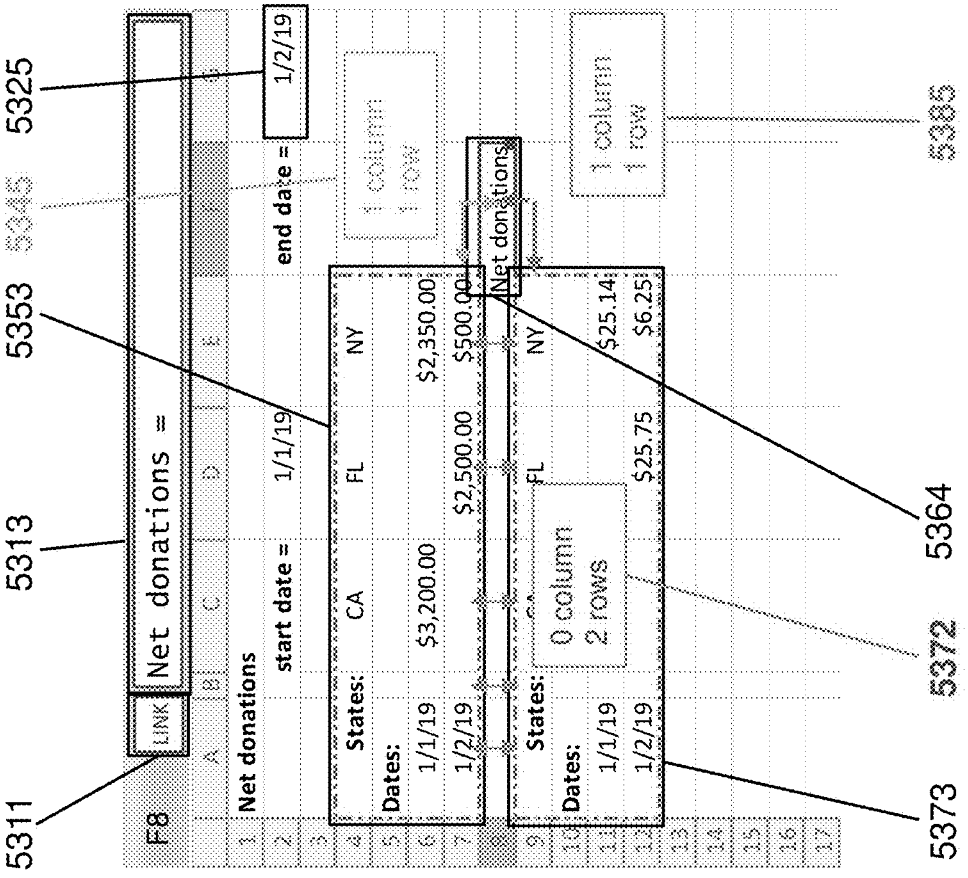

FIGS. 53A and 53B example the movement linkage of two different flex areas and a relocatable cell retaining post-flex the pre-flex row and column relative spatial relationships between both flexes and between both flexes and the relocatable cell.

Figure 54B:
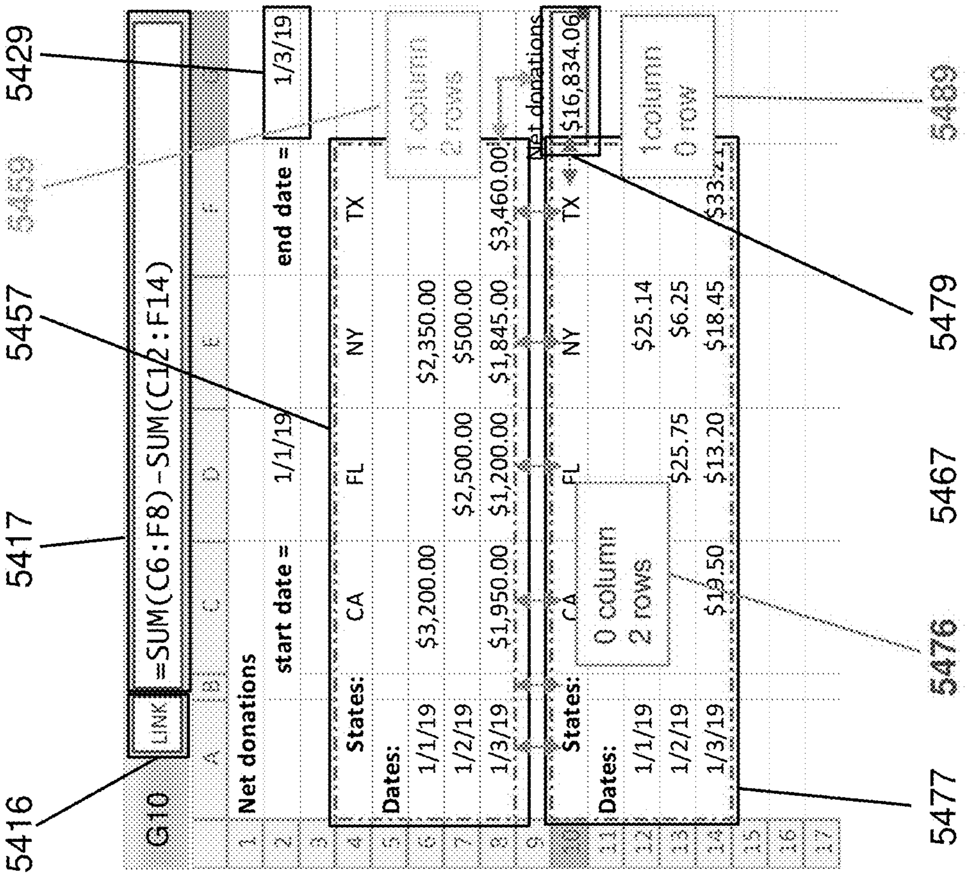
Figure 54A:
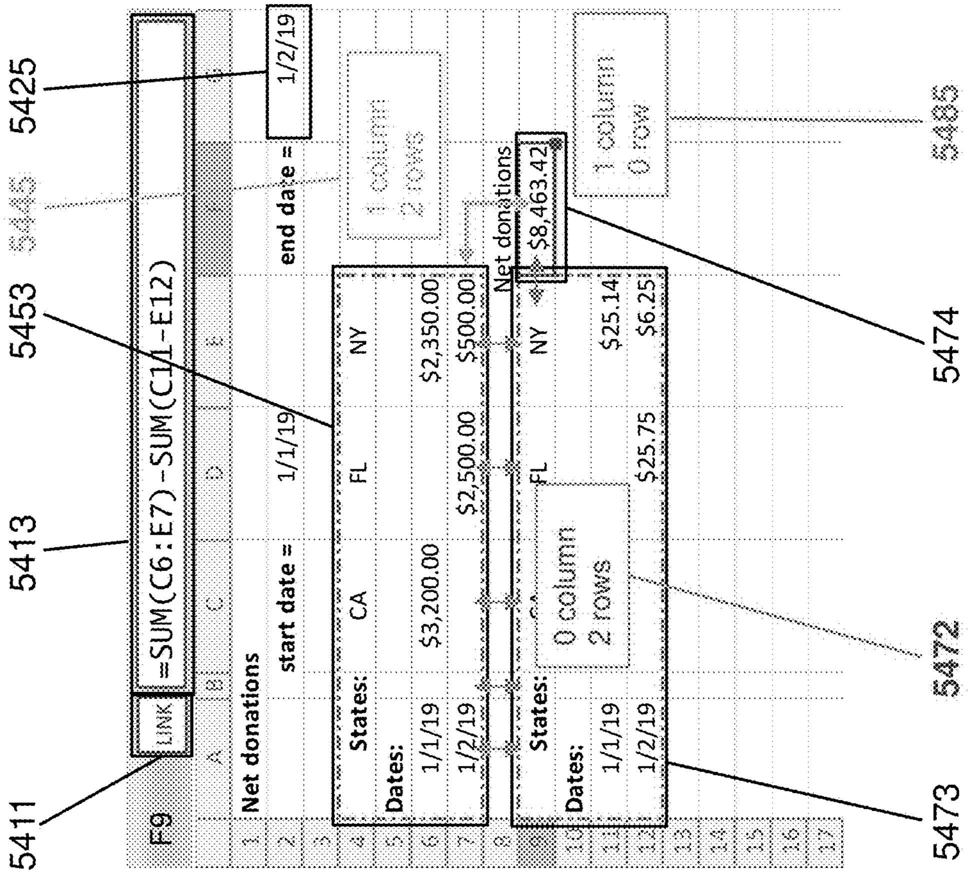

FIGS. 54A and 54B example the combined formula and movement linkage of two different flex areas and a relocatable cell retaining post-flex the pre-flex row and column relative spatial relationships between both flexes and between both flexes and the relocatable cell.

Figure 55:
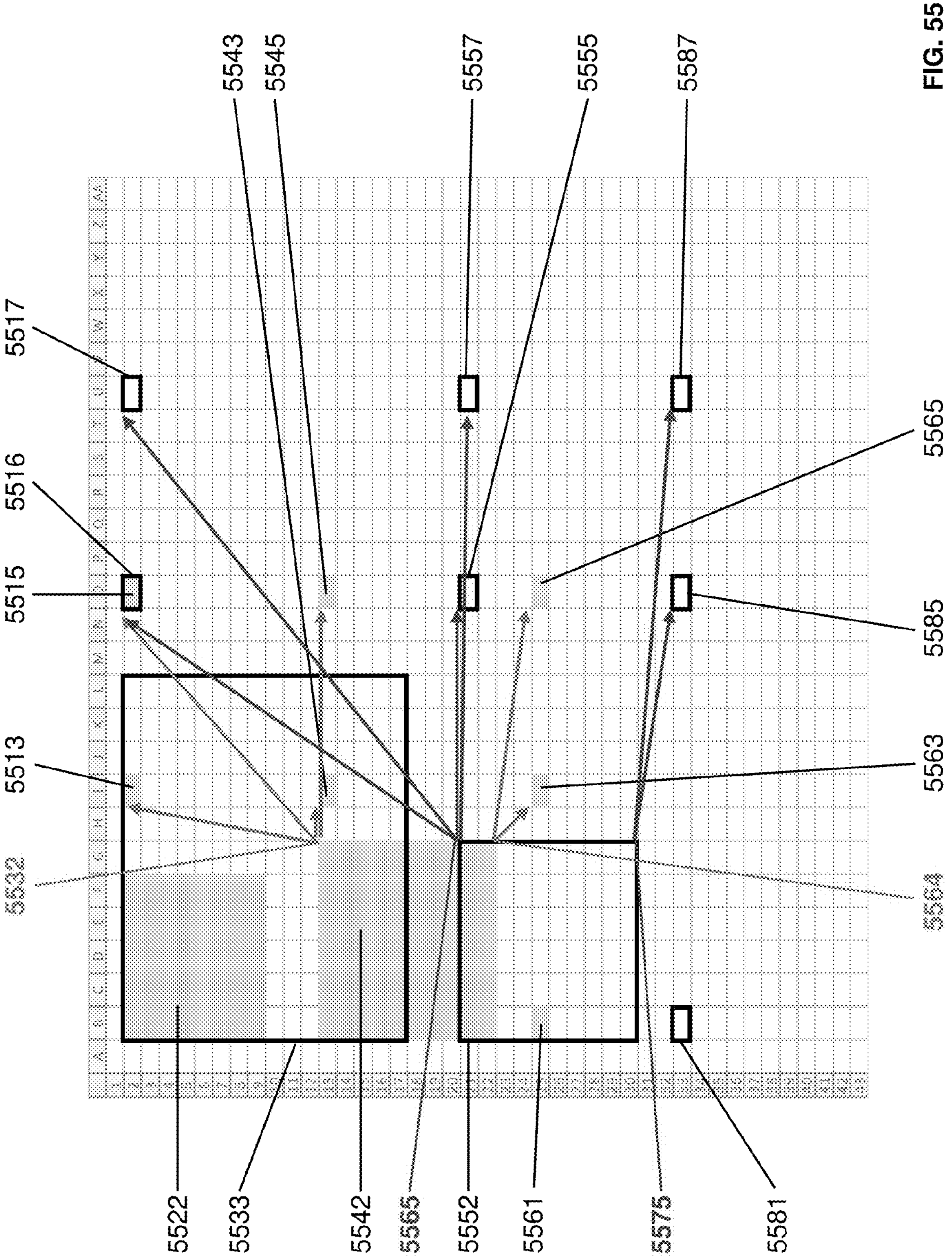

FIG. 55 conceptually examples two flex ranges with movement linkages/connections to each other and seven cells pre and post flex one of the flex ranges flexing.

Figure 56:
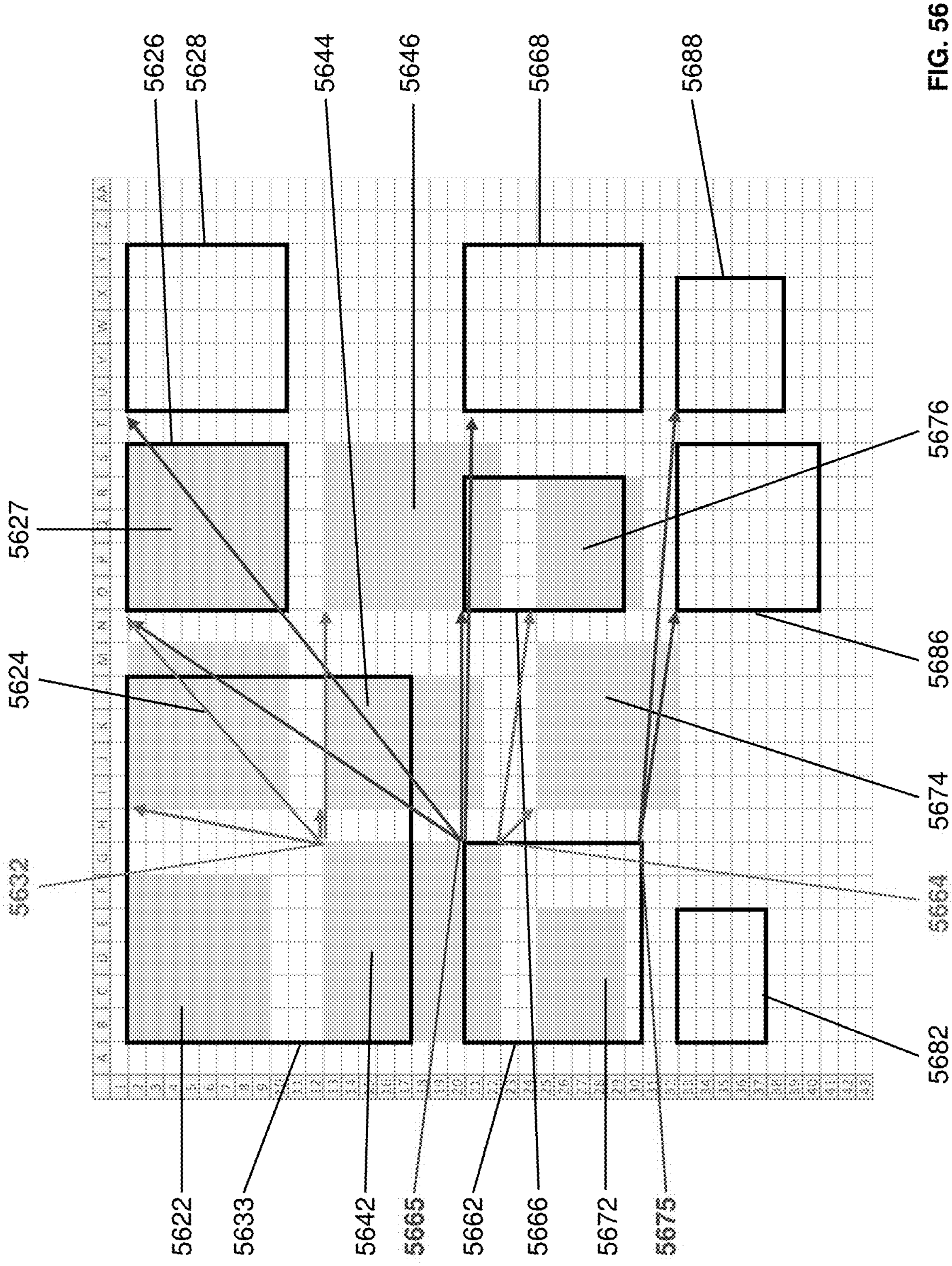

FIG. 56 conceptually examples nine flex ranges with movement linkages/connections to each other pre and post flex with one of the flex ranges flexing.

Figure 57:
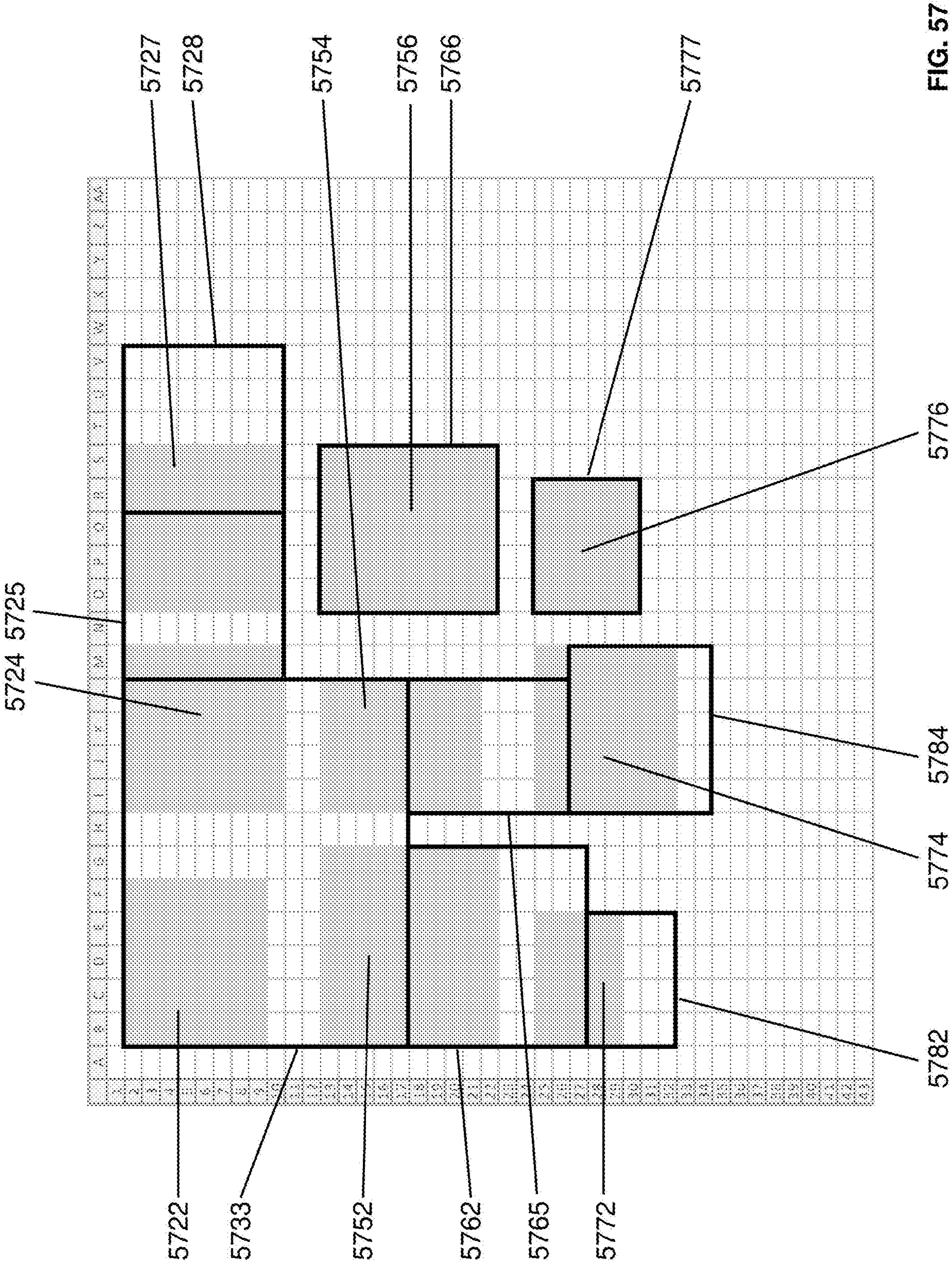

FIG. 57 examples a movement linked/connected embodiment where the flex displaces any overlapping areas with a down and then across ordered progression.

Figure 58:
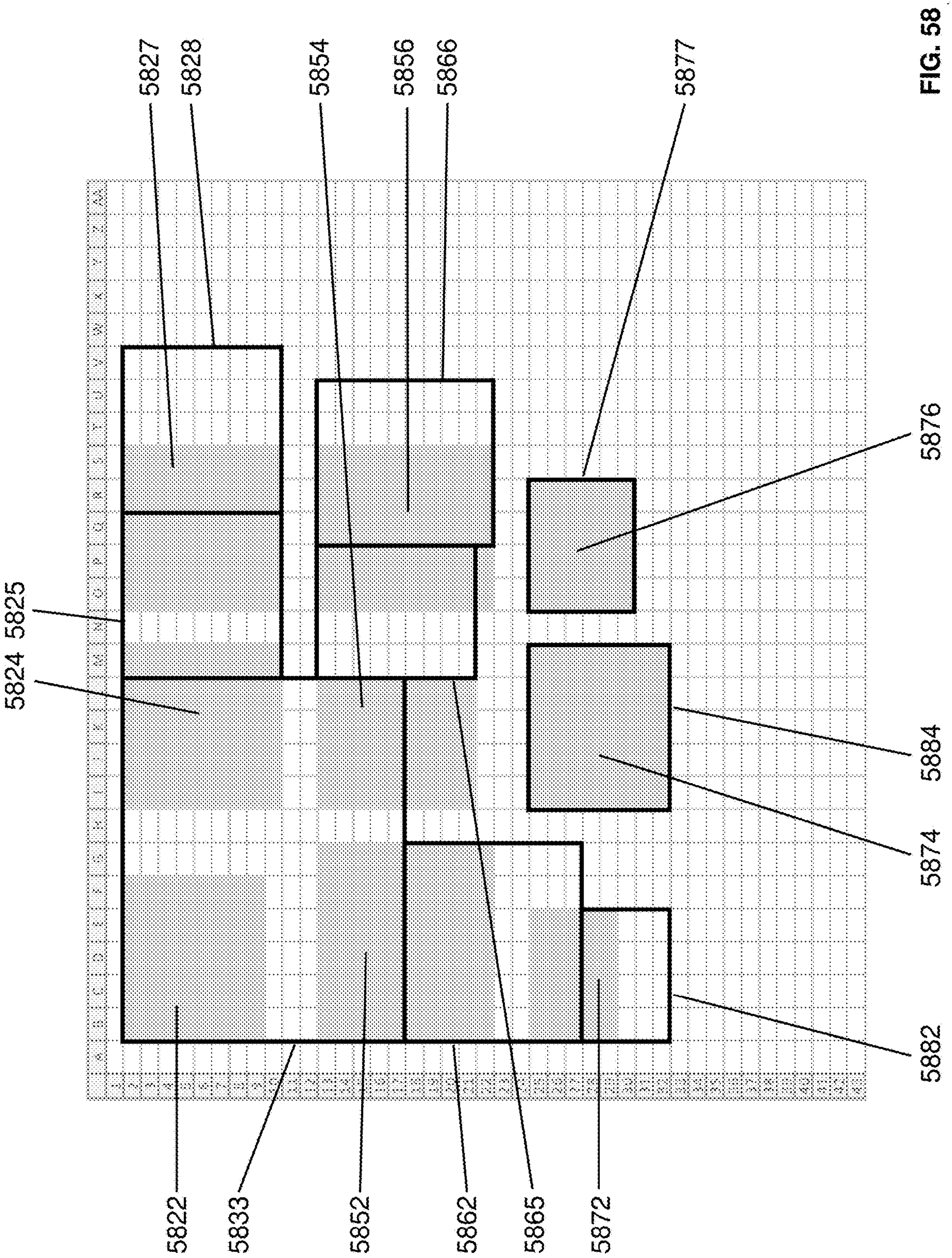

FIG. 58 examples an ordered progression movement linked/connected embodiment where the flex displaces any overlapping areas with no cell cushion with an across then down ordered progression.

Figure 59:
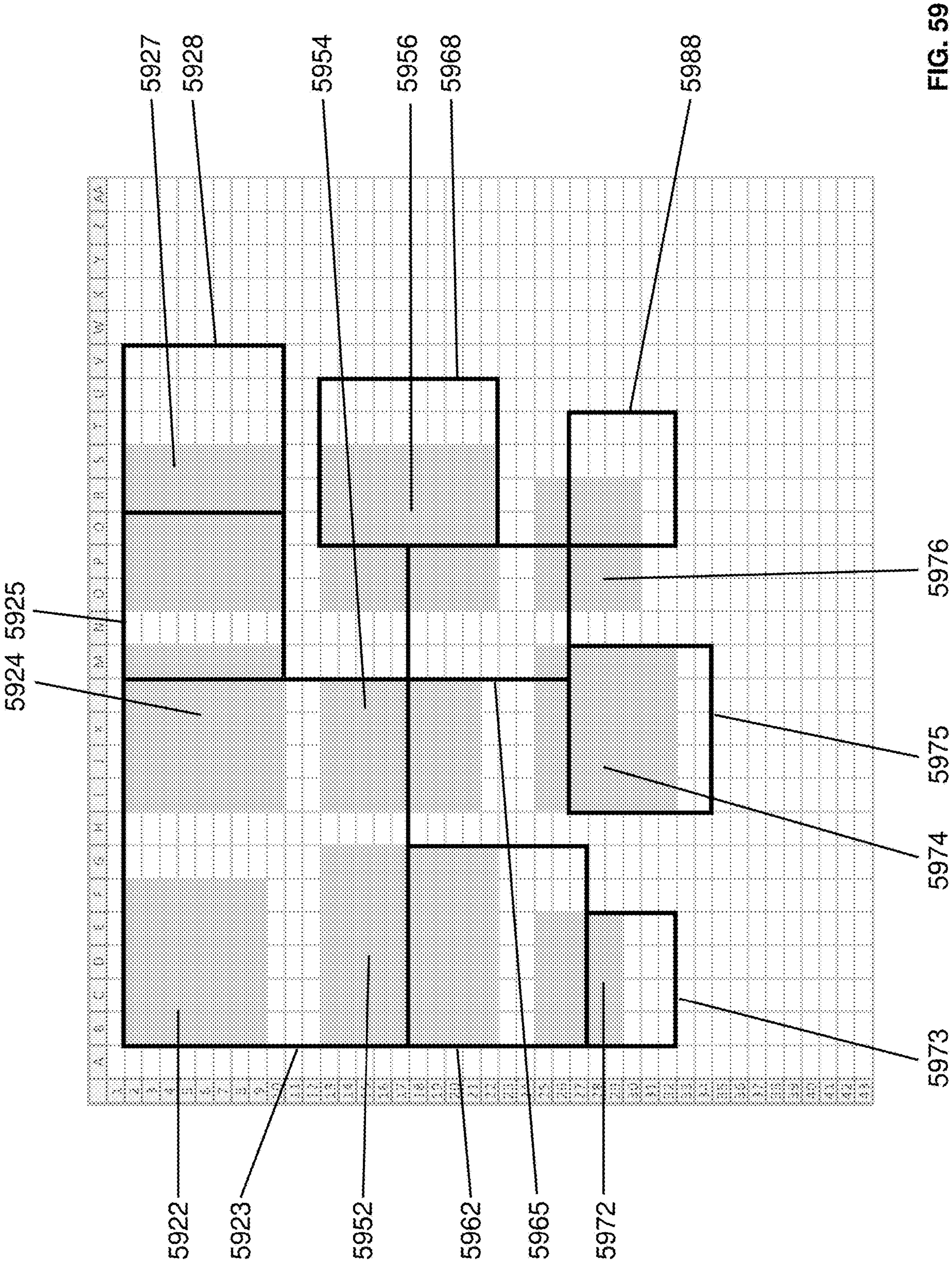

FIG. 59 examples an ordered progression movement linked/connected embodiment where the flex displaces any overlapping areas with no cushion with a simultaneous across and down ordered progression.

Figure 60C:
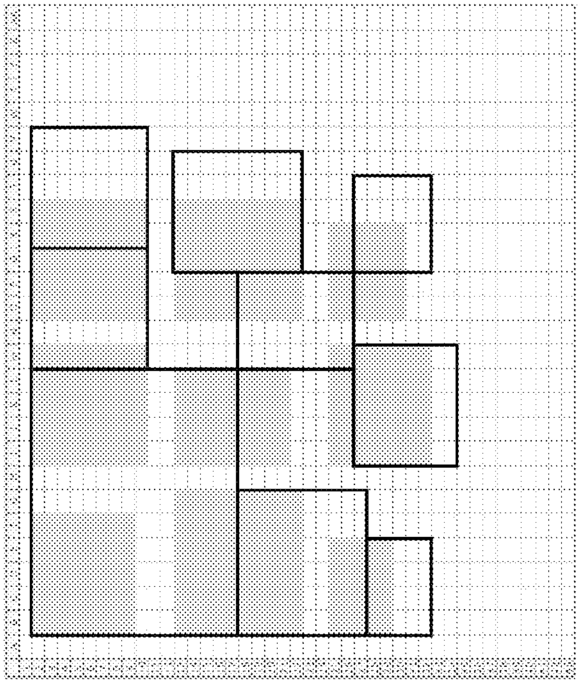
Figure 60A:
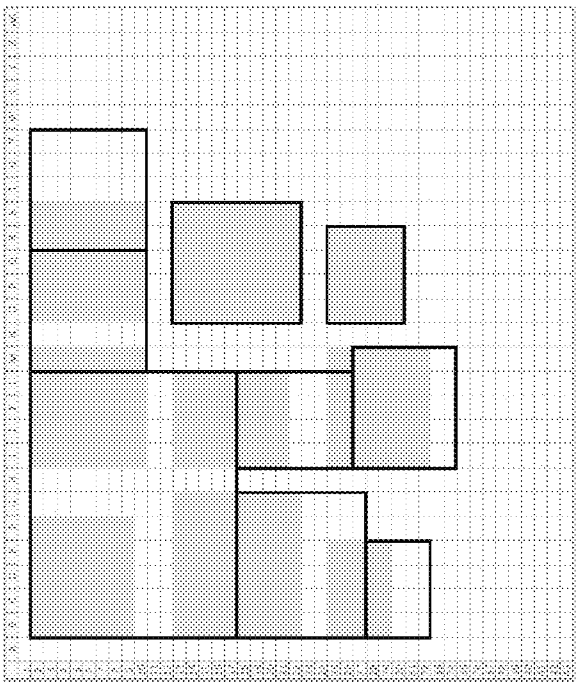
Figure 60B:
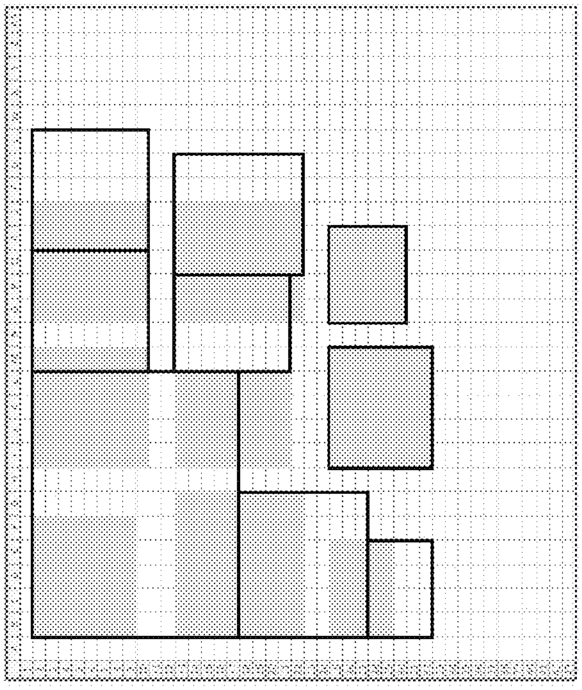

FIGS. 60A, 60B, and 60C shows side-by-side the impact of the different displacement progression orders exampled in FIGS. 57, 58, and 59.

Figure 61:
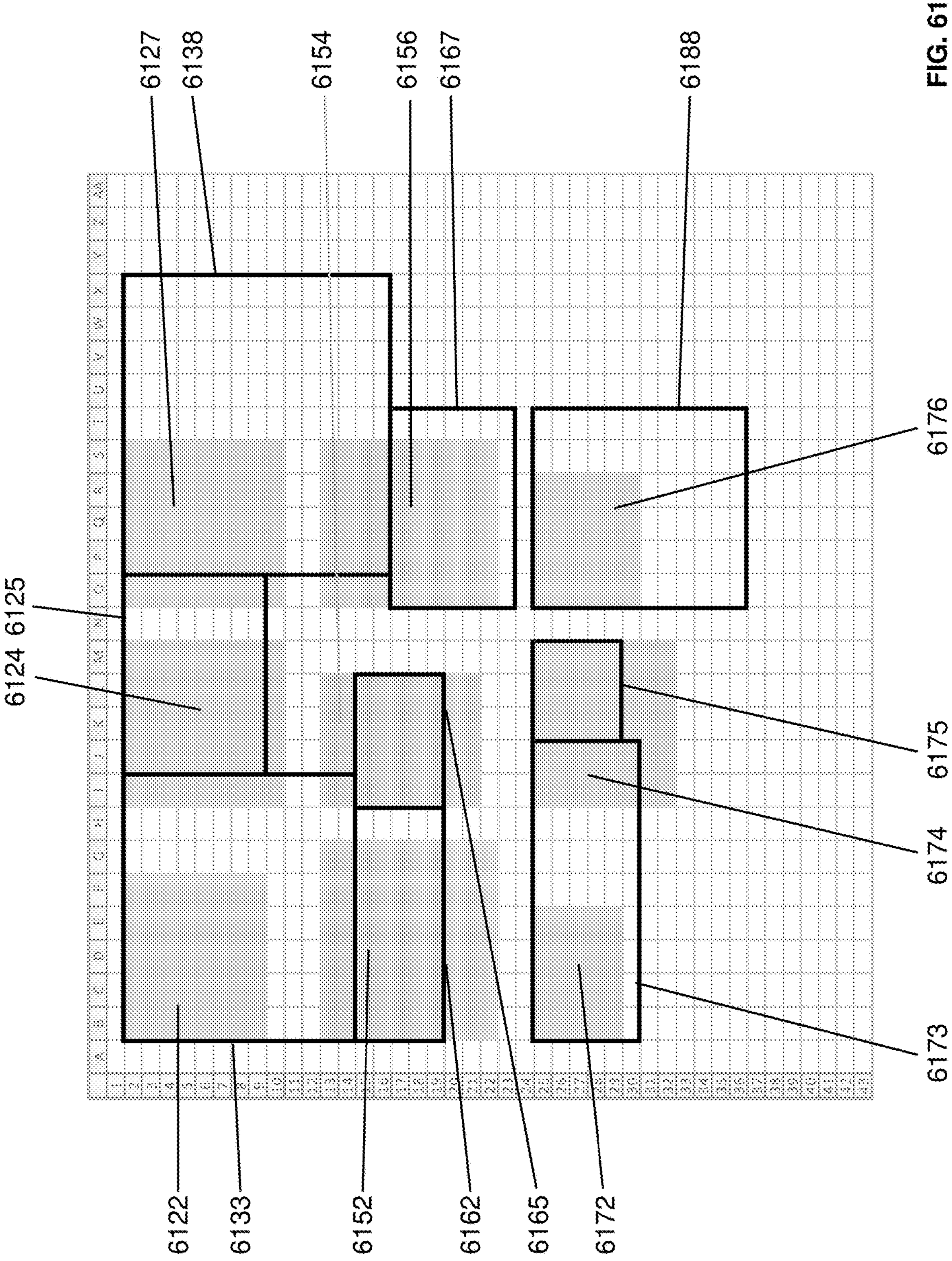

FIG. 61 examples a movement linked/connected embodiment of nine flex areas where the simultaneous flex of all nine flex areas displaces any overlapping areas with a down then across ordered progression.

FIGS. 62, 63A, 63B, and 63C example different ordered progression linked/connected movement down and across embodiments with a one cell cushion.

FIGS. 64A, 64B, 65, 66, 67, 68A, 68B, 69, and 70 example different embodiments of our alignment coordinated movement linkage/connection technology.

FIGS. 71A, 71B, 72A, 72B, 73A, and 73B examples the setup and use of our vertical and horizontal alignment coordinated movement link/connect technology in a more detailed example displaying all the cell contents.

Figure 74A:
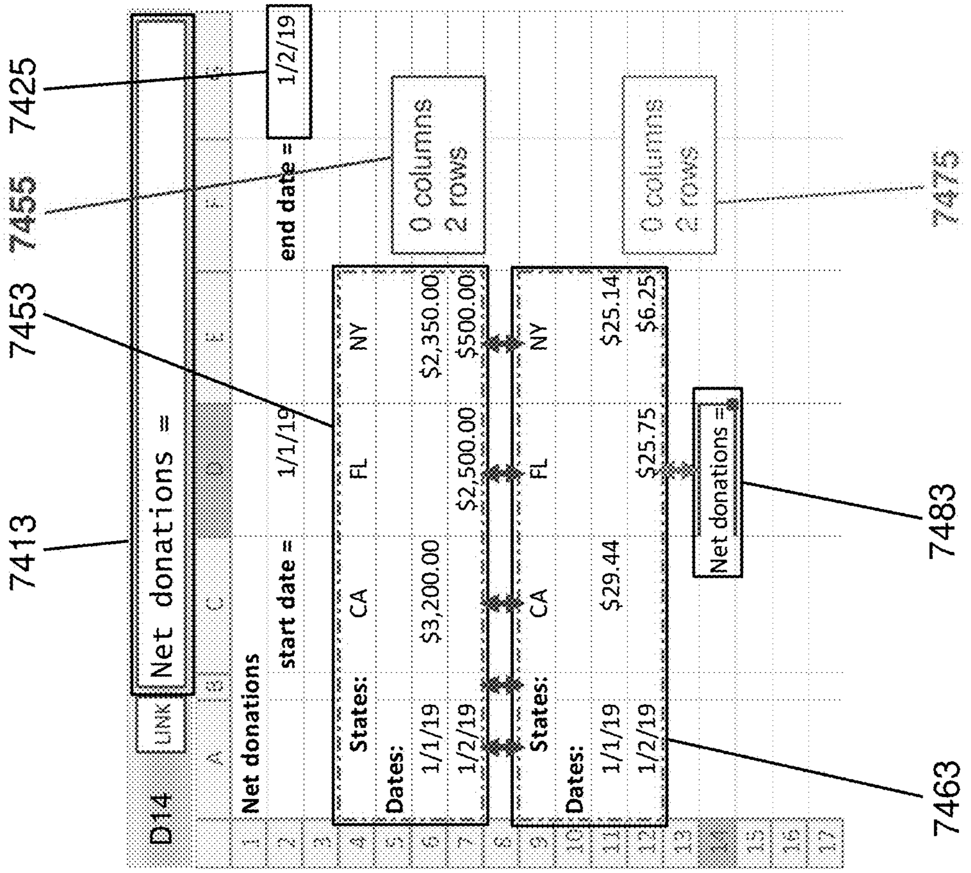
Figure 74B:
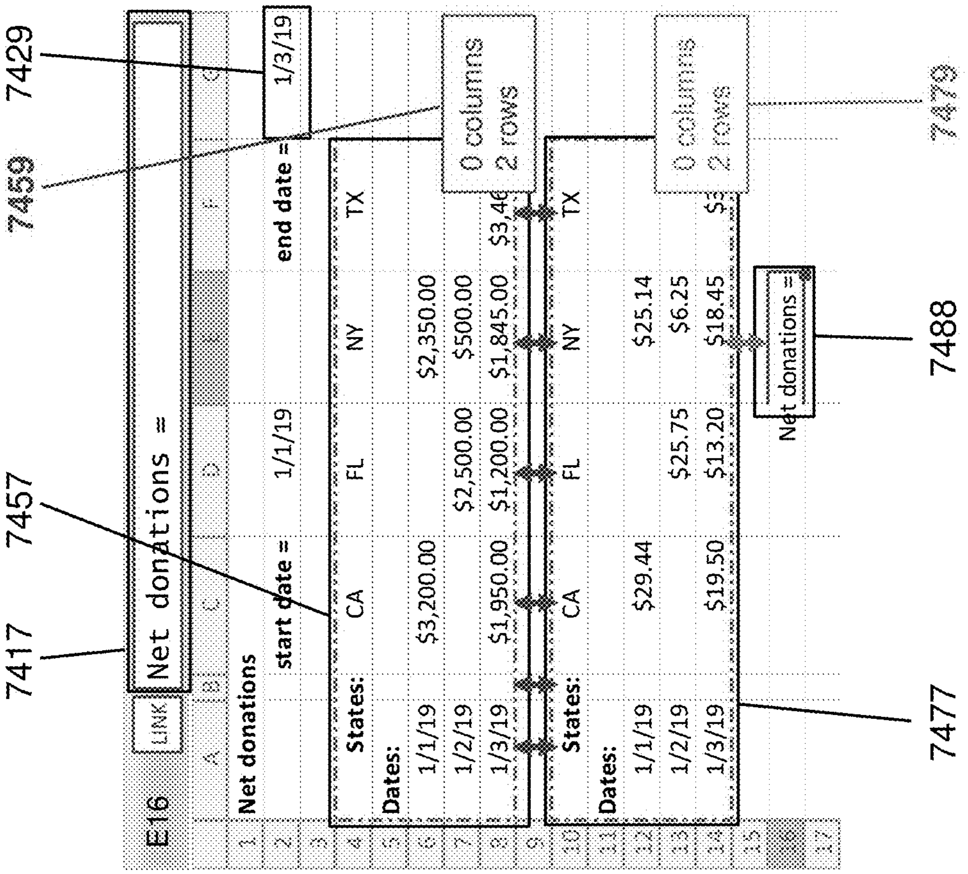

FIGS. 74A and 74B examples our movement link/connect technology automatically retaining both the row and column relative spatial relationships of directly linked areas while cascading movements from the indirectly linked areas.

Figure 75B:
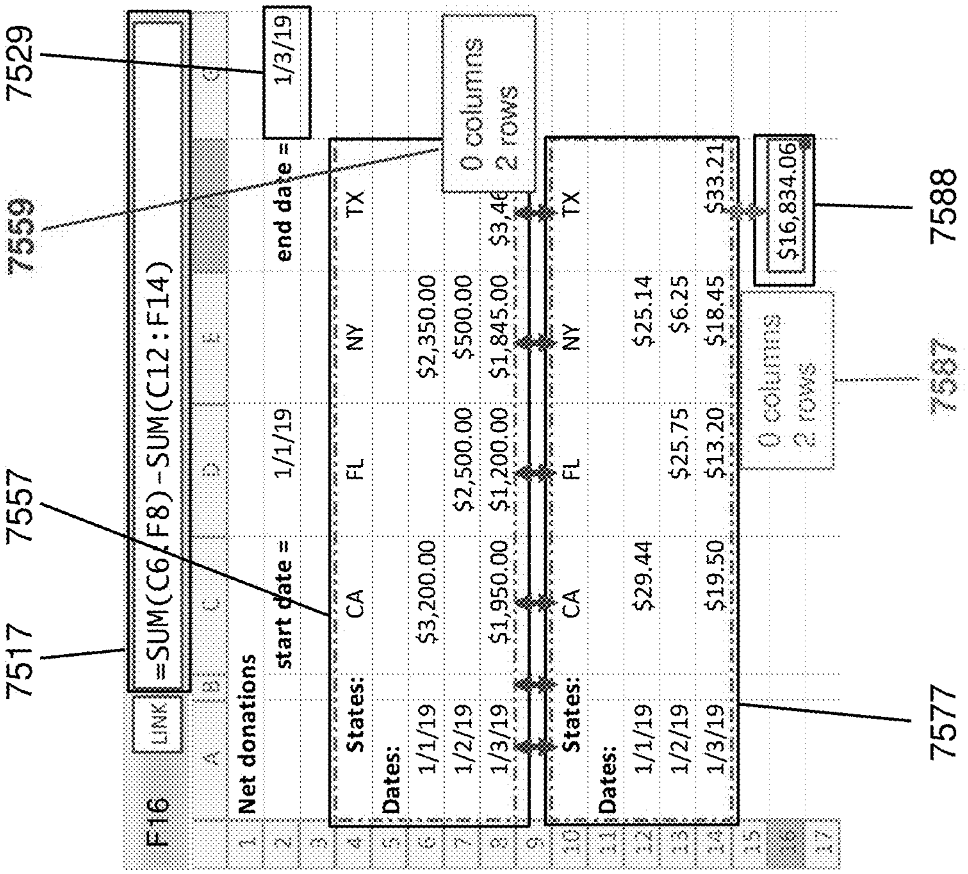
Figure 75A:
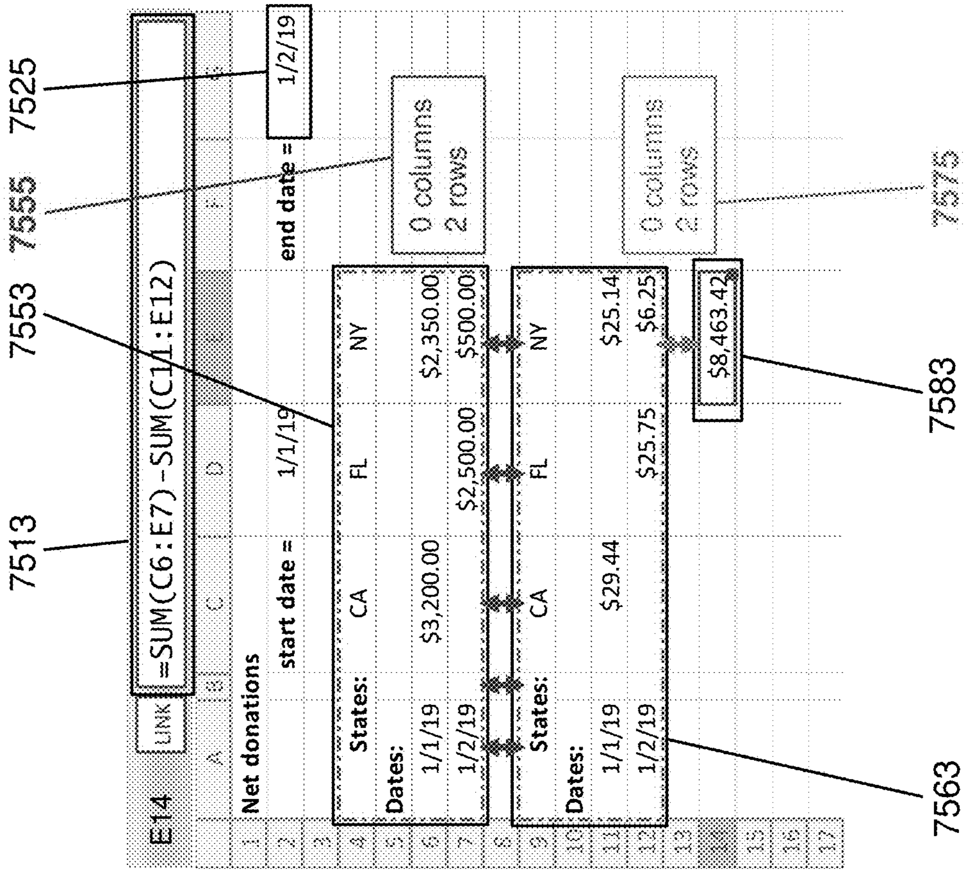

FIGS. 75A and 75B example our direct and indirect linked/connected movement technology working for a combined formula and movement linkage/connection.

Figure 76A:
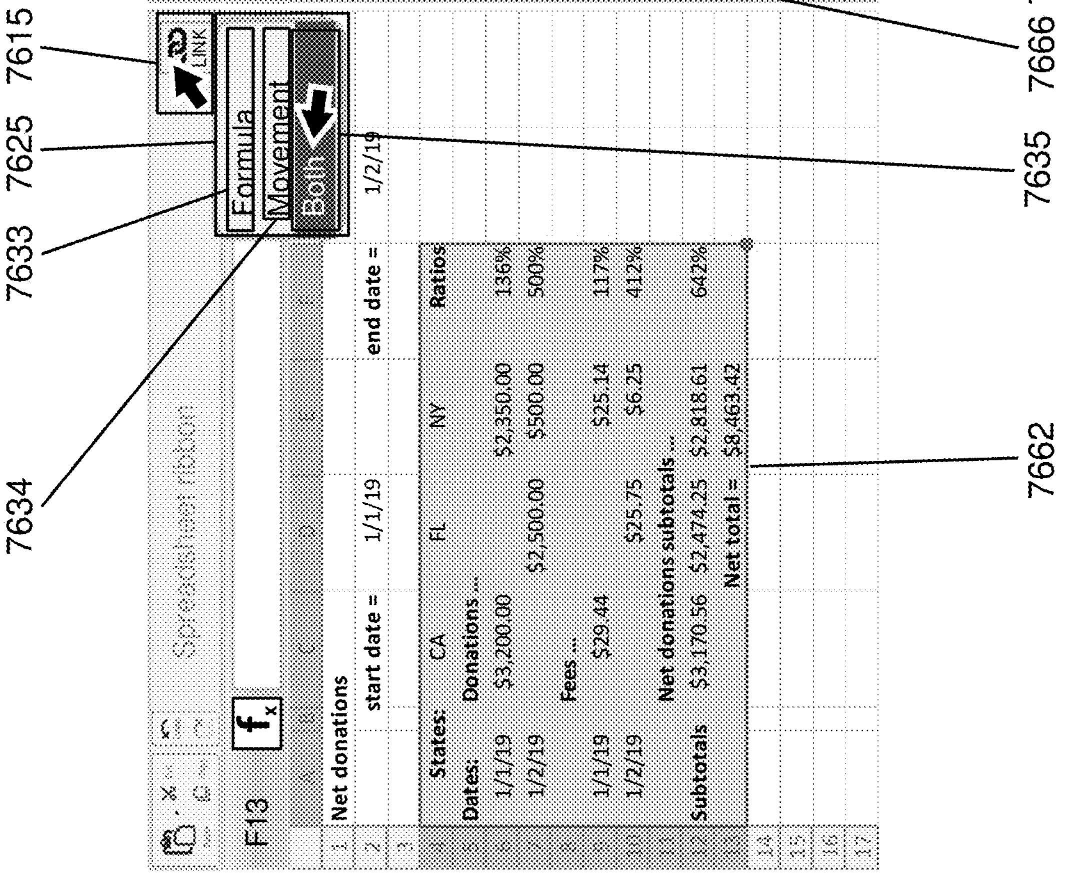
Figure 76B:
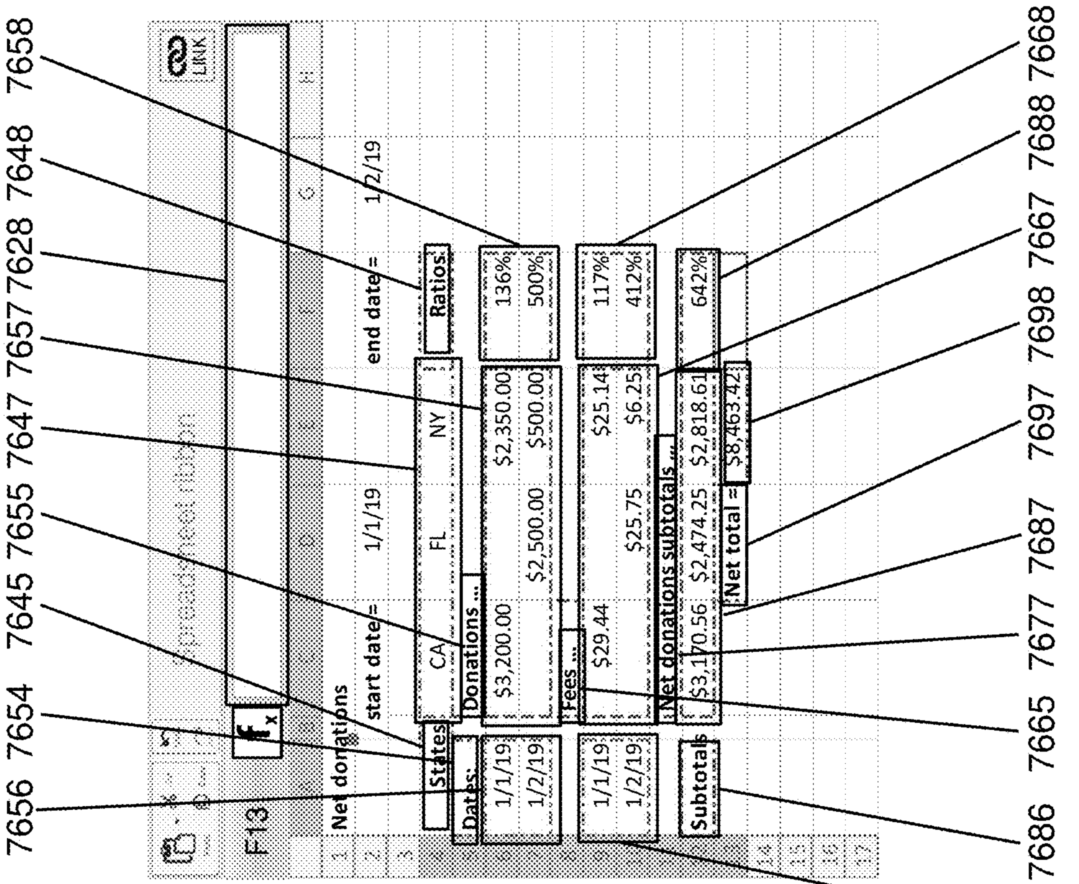

FIGS. 76A and 76B examples a semi-automatic setup where user selects a range of cells for linkage/connection and our system then determines the direct movement linkages/connections for eight flexes, seven text cells and two calculation cells employing linkage logic like that exampled in FIG. 143.

Figure 77B:
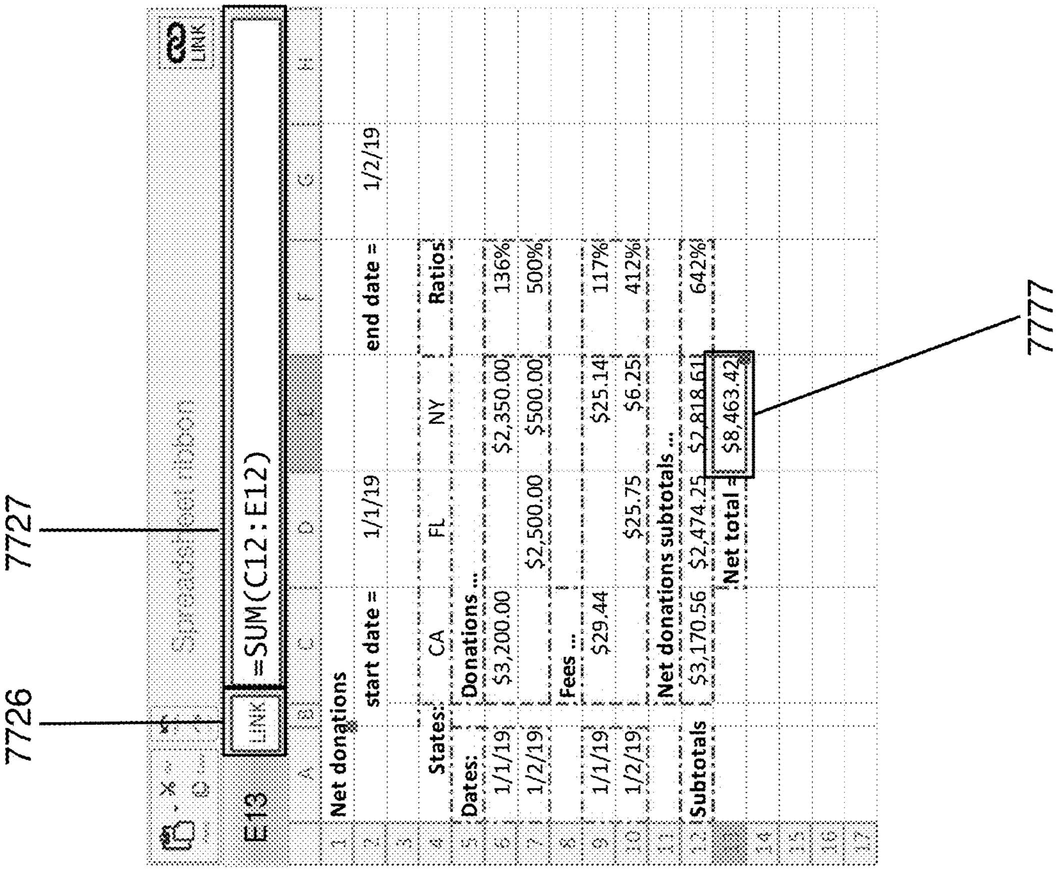
Figure 77A:
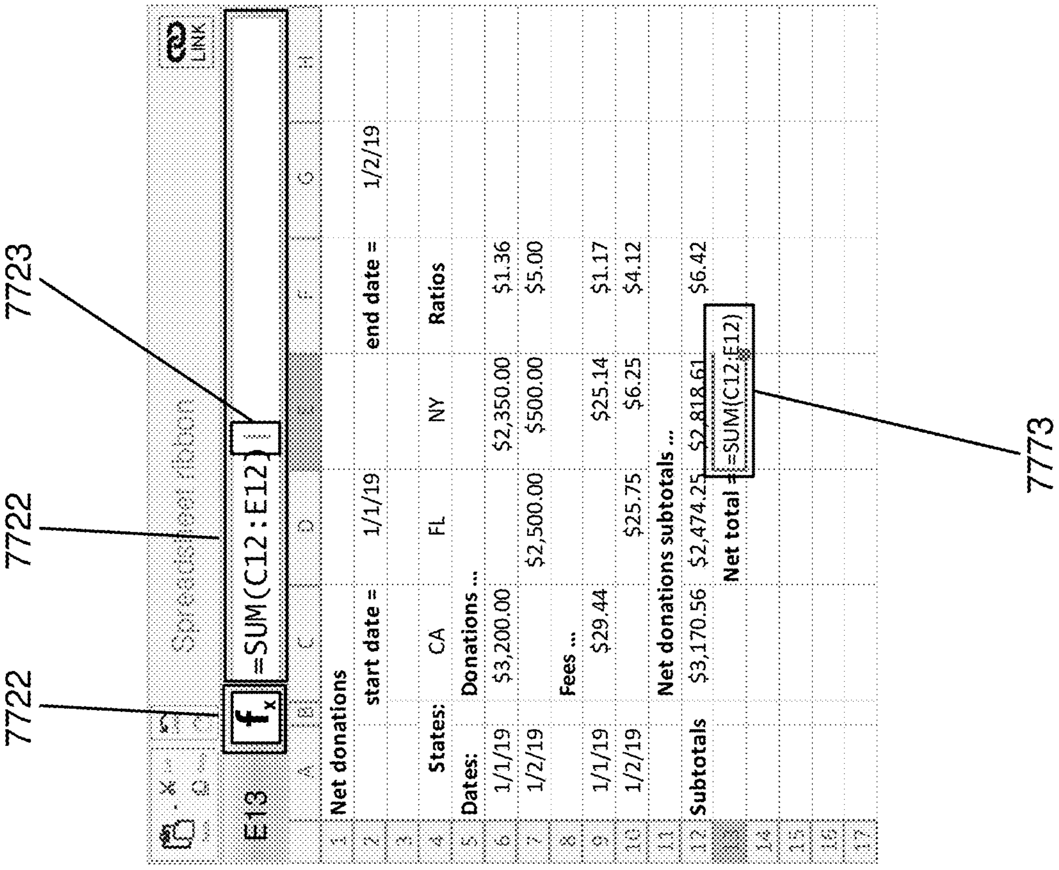

FIGS. 77A and 77B examples the automatic setup of both formula and direct and indirect movement links/connections employing linkage logic like that exampled in FIG. 143.

Figure 78B:
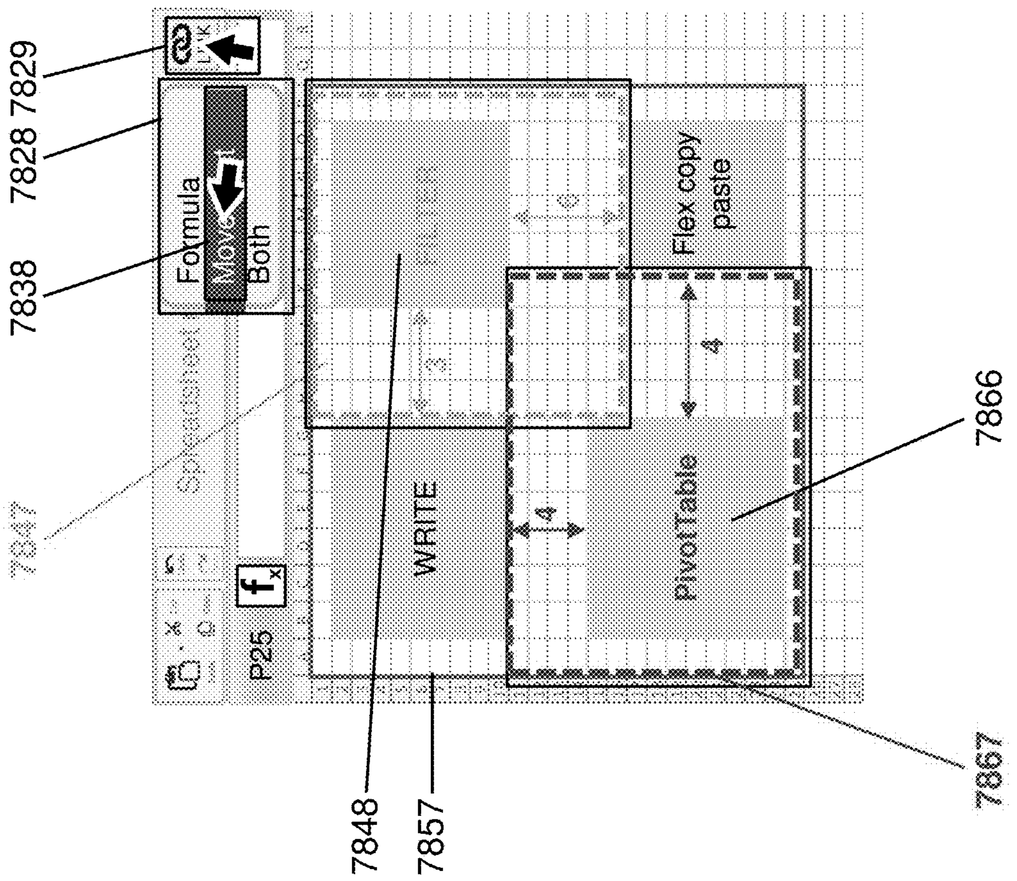
Figure 78A:
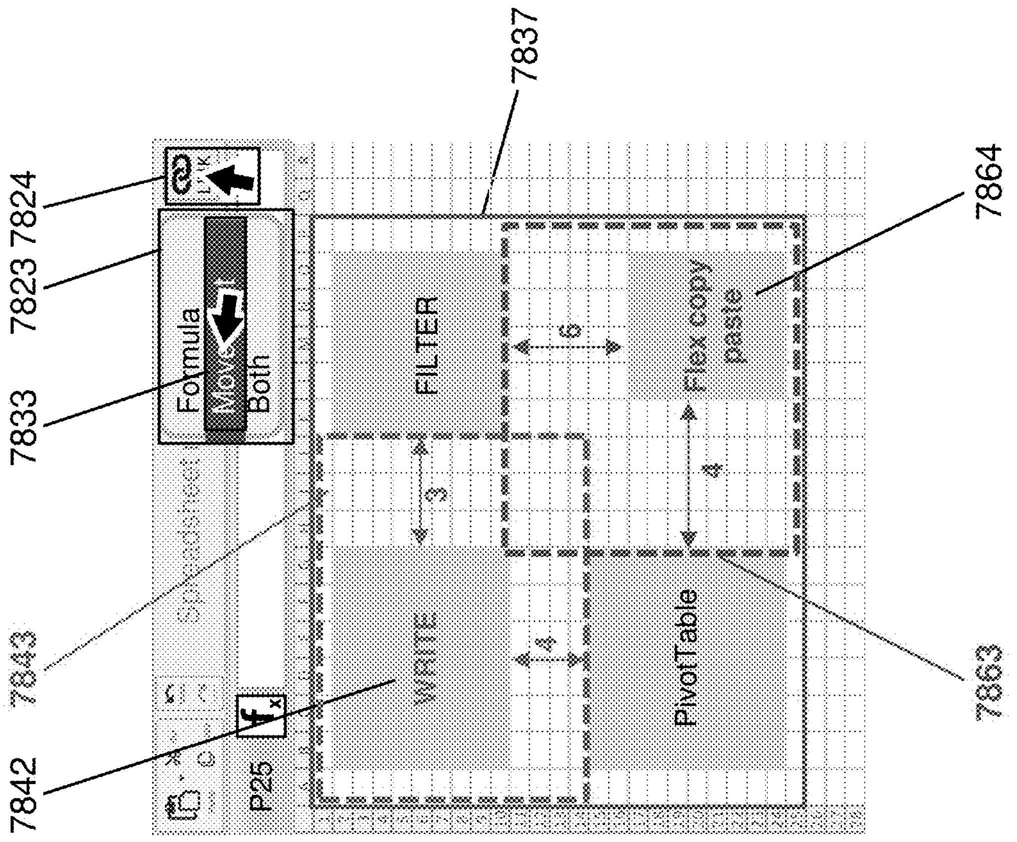

FIGS. 78A and 78B example the invisible bumpers (boundary borders) around the four gray shaded flex functions/capabilities bumper movement linked/connected with our technology.

Figures 79A, 79B, 79C:
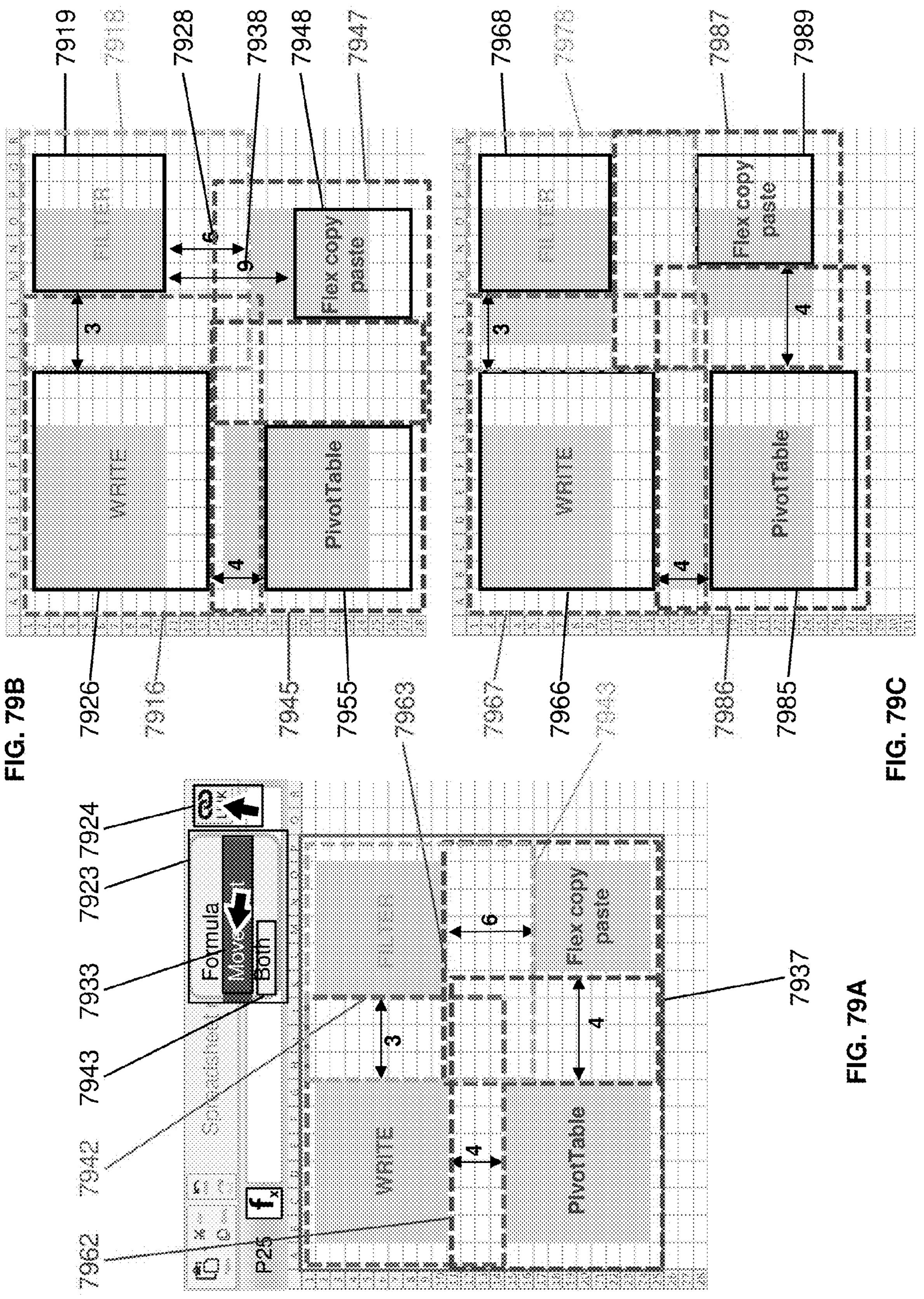

FIGS. 79A, 79B and 79C illustratively examples the bumper setup of FIG. 78A and FIG. 78B and two different flex outcomes resulting from different flexes.

Figure 80B:
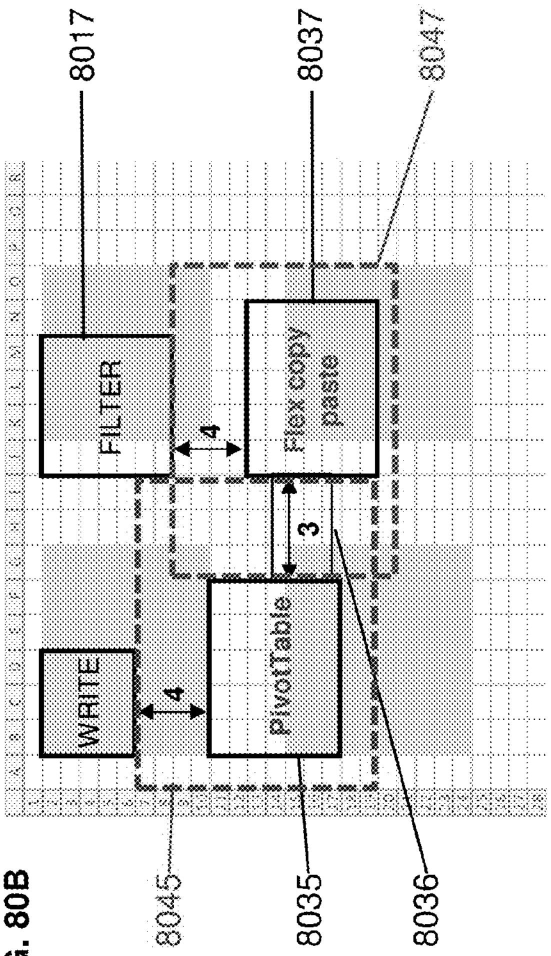
Figure 80C:
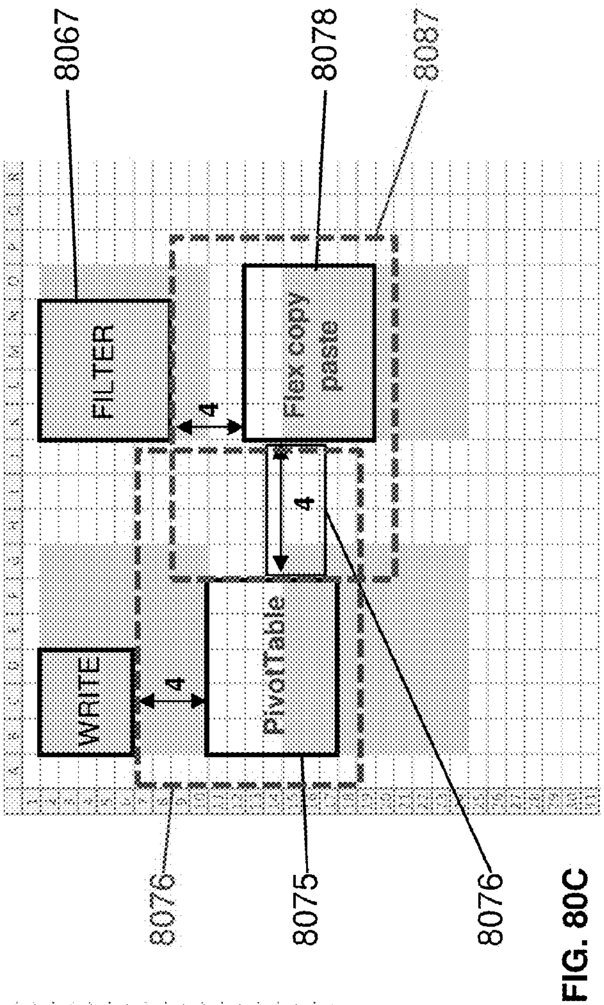
Figure 80A:
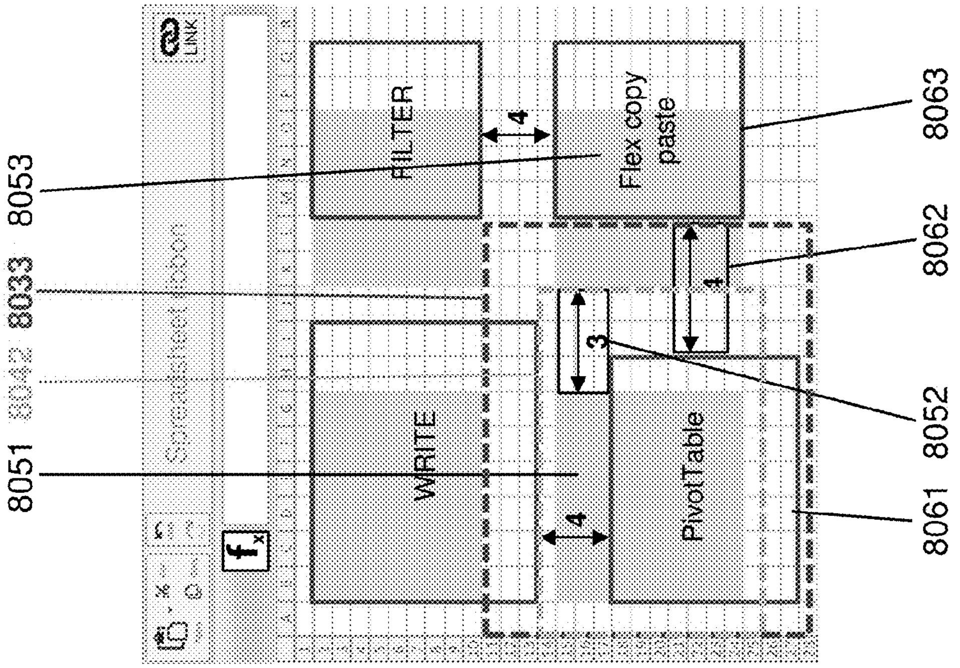

FIGS. 80A, 80B, and 80C examples the difference on a flex outcome of our bumper driven coordinated movement approach using originally set "bumper" distances versus more recently resized "bumper" distances.

FIGS. 81A, 81B, 81C, 82A, 82B, 82C, 82D, 83A, 83B, 83C, and 83D example the impact of flex progressive order with 'bumper' coordinated movement in our link/connect technology.

Figure 84B:
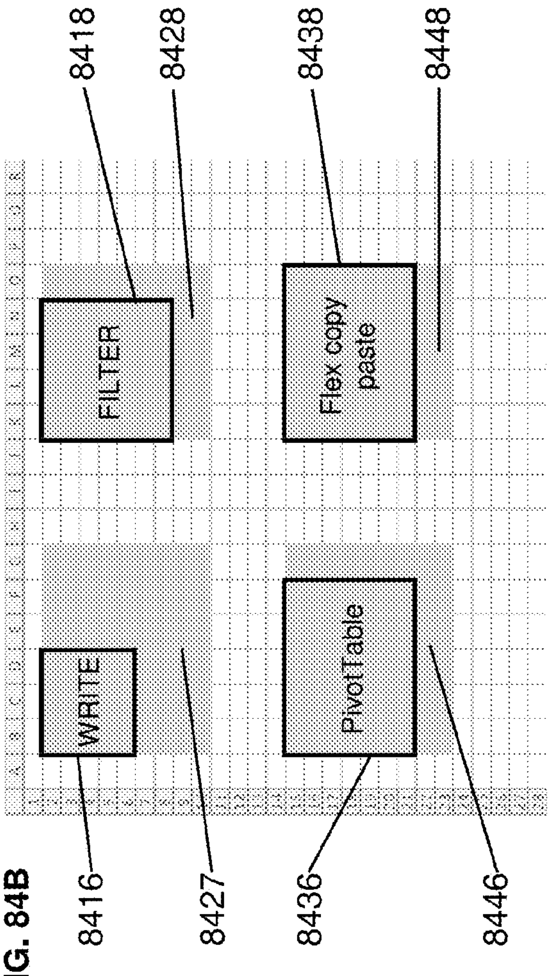
Figure 84C:
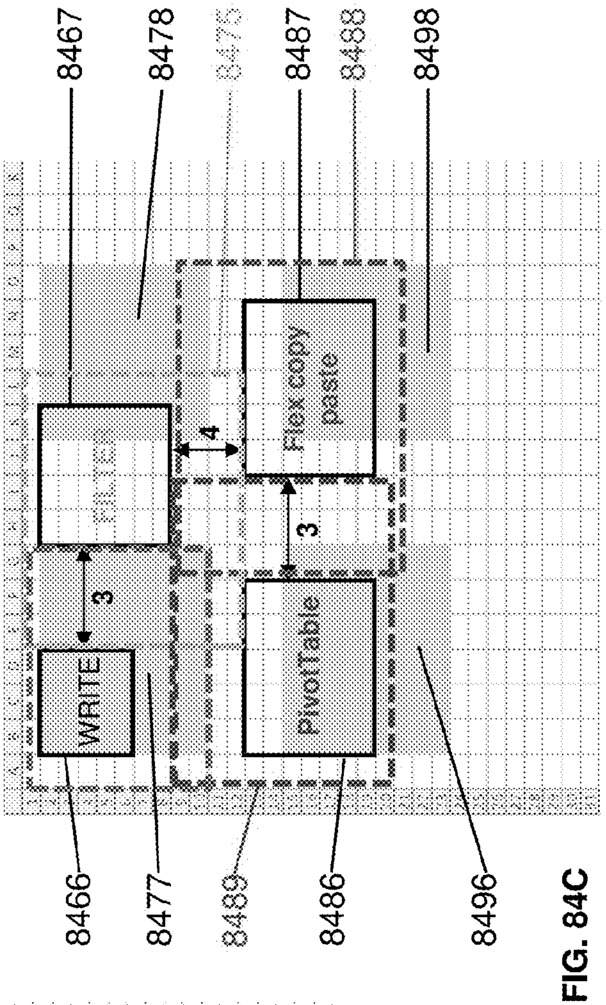
Figure 84A:
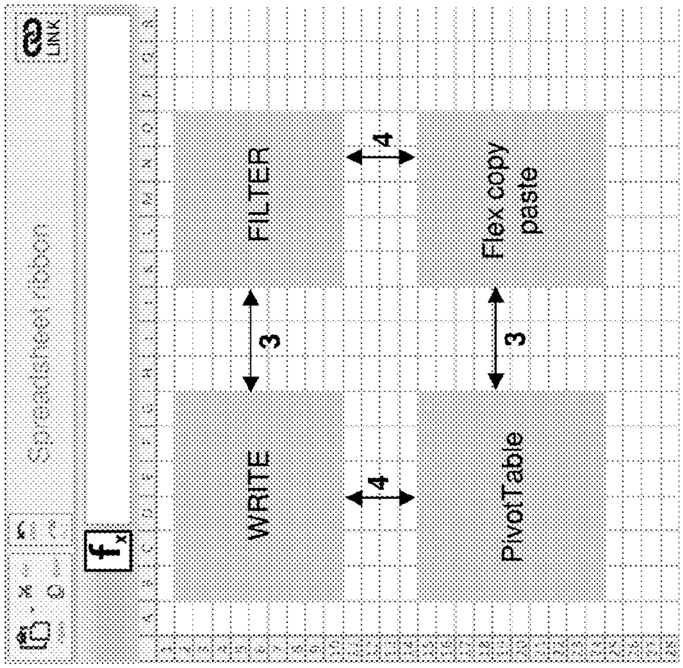

FIGS. 84A, 84B, and 84C examples the difference of our technology using our one-way versus two-way "bumper" movement linkage/connect technology.

Figure 85B:
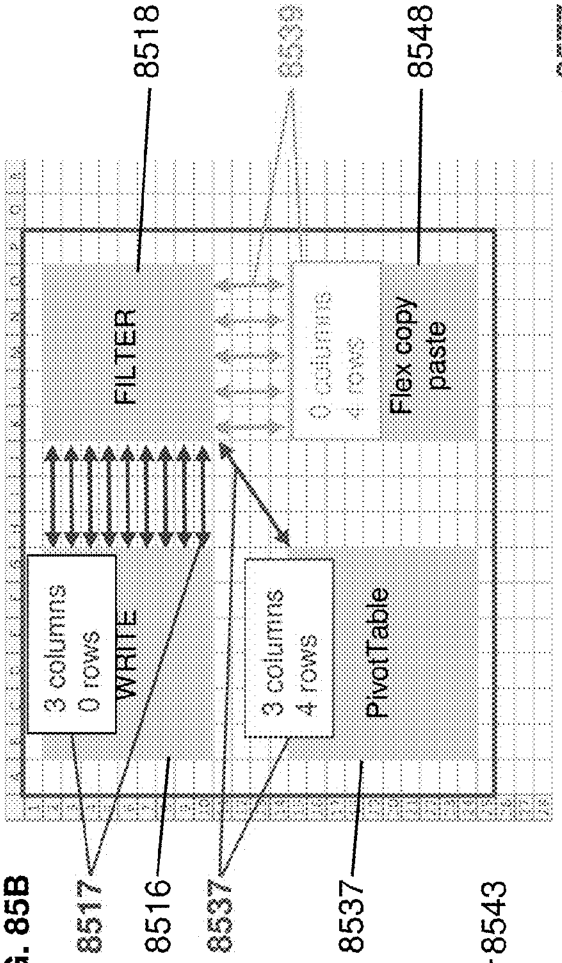
Figure 85C:
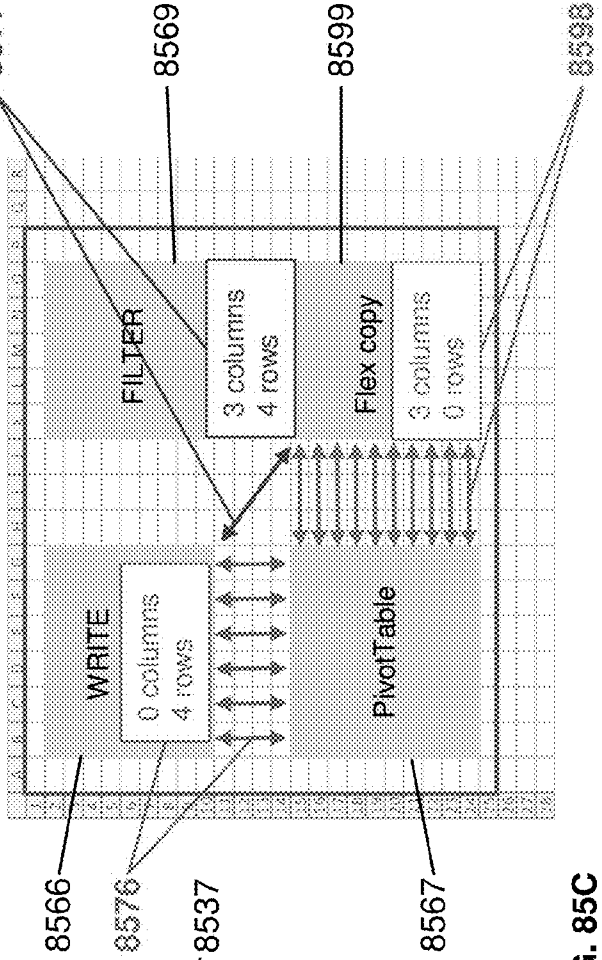
Figure 85A:
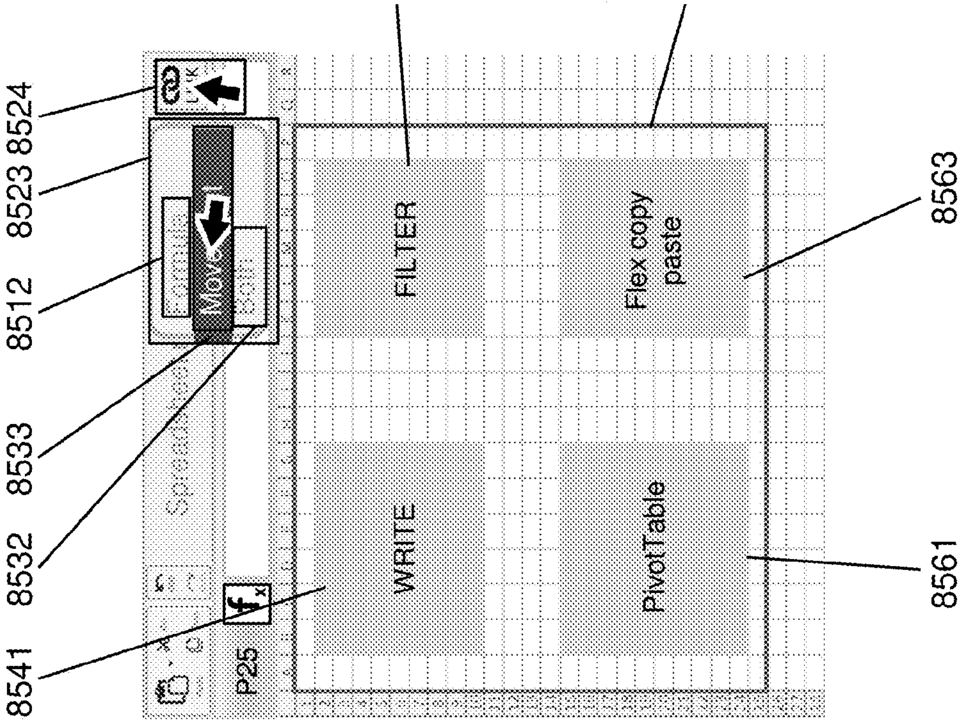

FIGS. 85A, 85B, and 85C illustratively examples the closest cells linkage/connection relative row and column spatial relationships pre-flex for the 'Movement' linkage of four flex-ranges (areas).

Figures 86A, 86B, 86C, 86D, 86E:
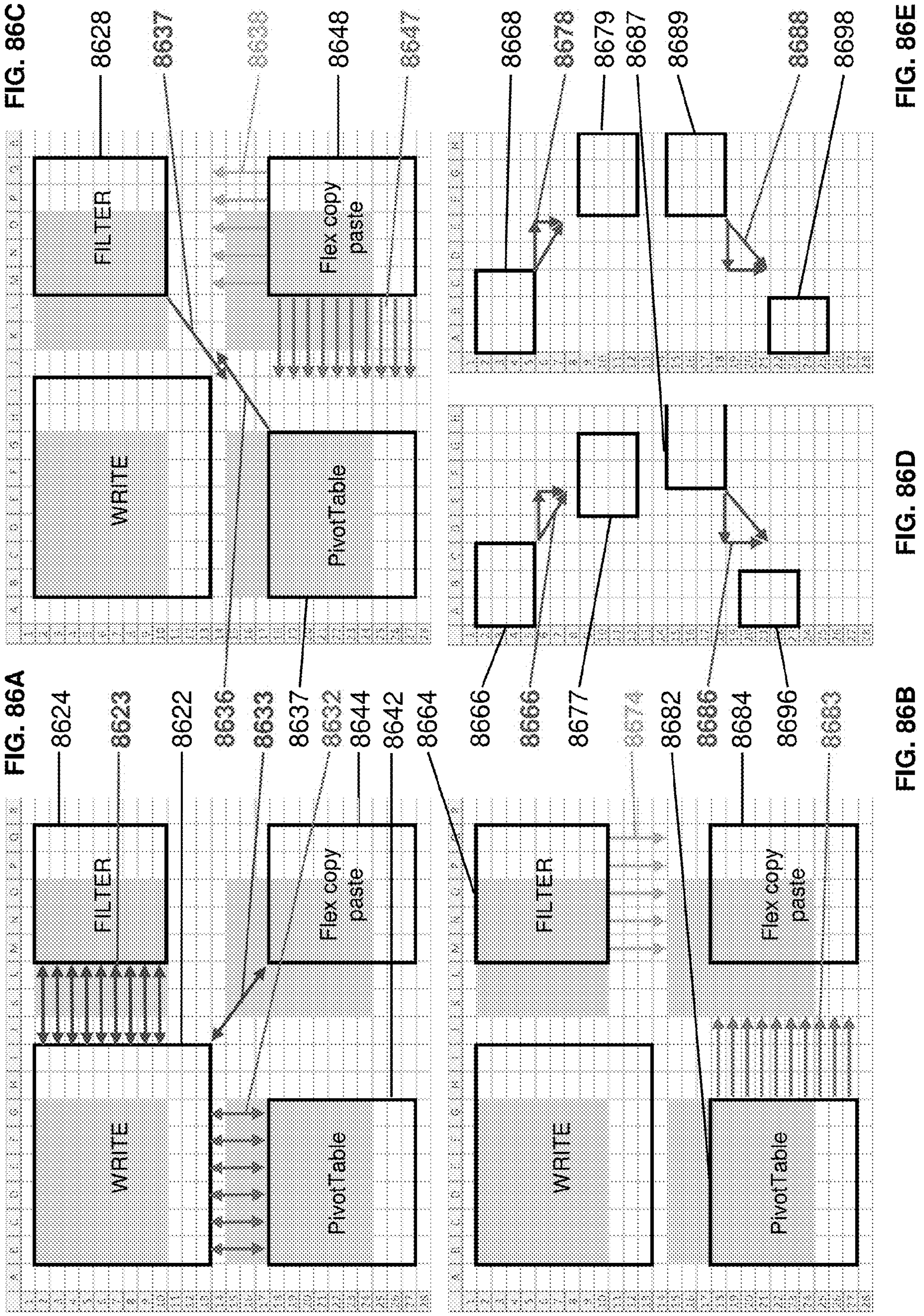

FIGS. 86A, 86B, and 86C illustratively examples how a flex of the 'WRITE' area works in our closest distance movement linkage technology showing each of the closest cell relative spatial relationships post-flex.

FIGS. 86D and 86E examples two somewhat less obvious examples of how the minimum relative spatial distance works on both dimensions for our closest distance movement linkage technology.

Figure 87B:
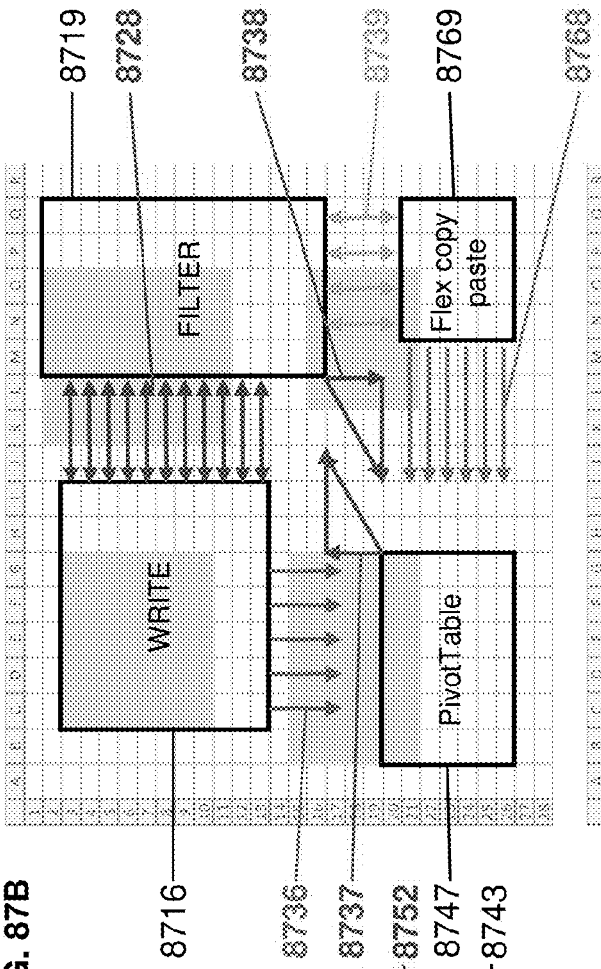
Figure 87C:
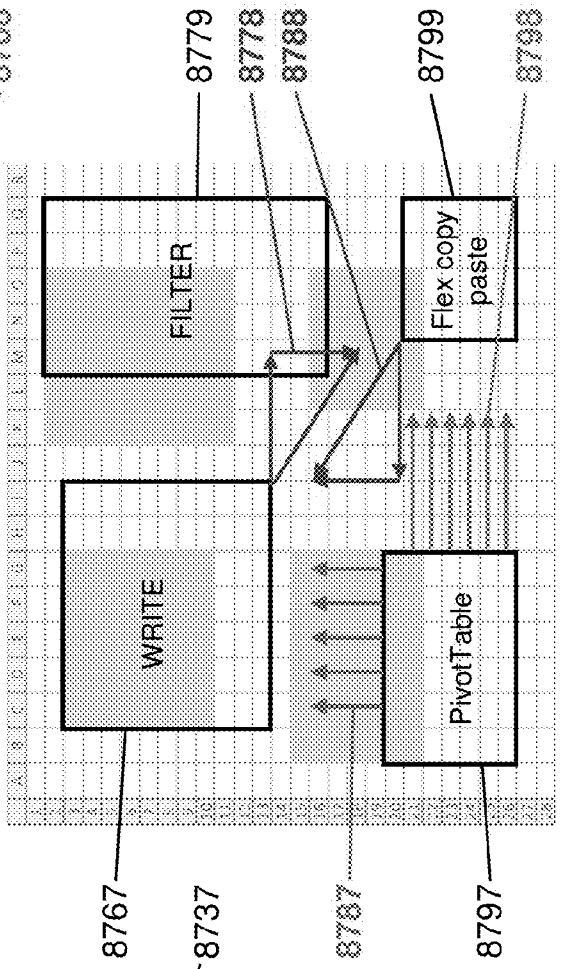
Figure 87A:
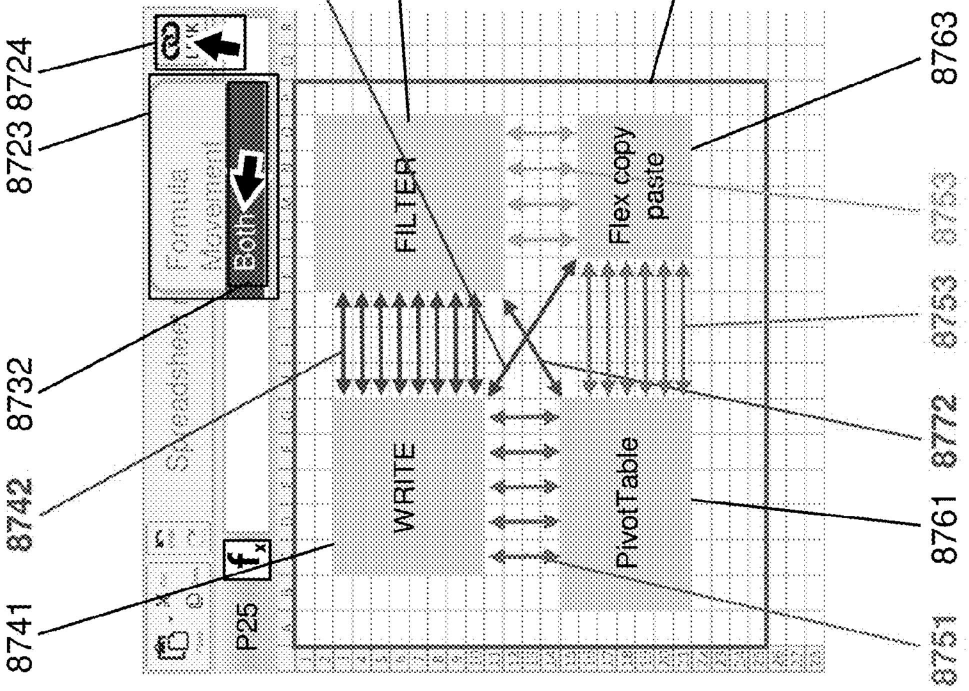

FIGS. 87A, 87B, and 87C examples multiple flexes, which could be simultaneous or sequential using our closest distance movement link/connect technology.

Figure 88:
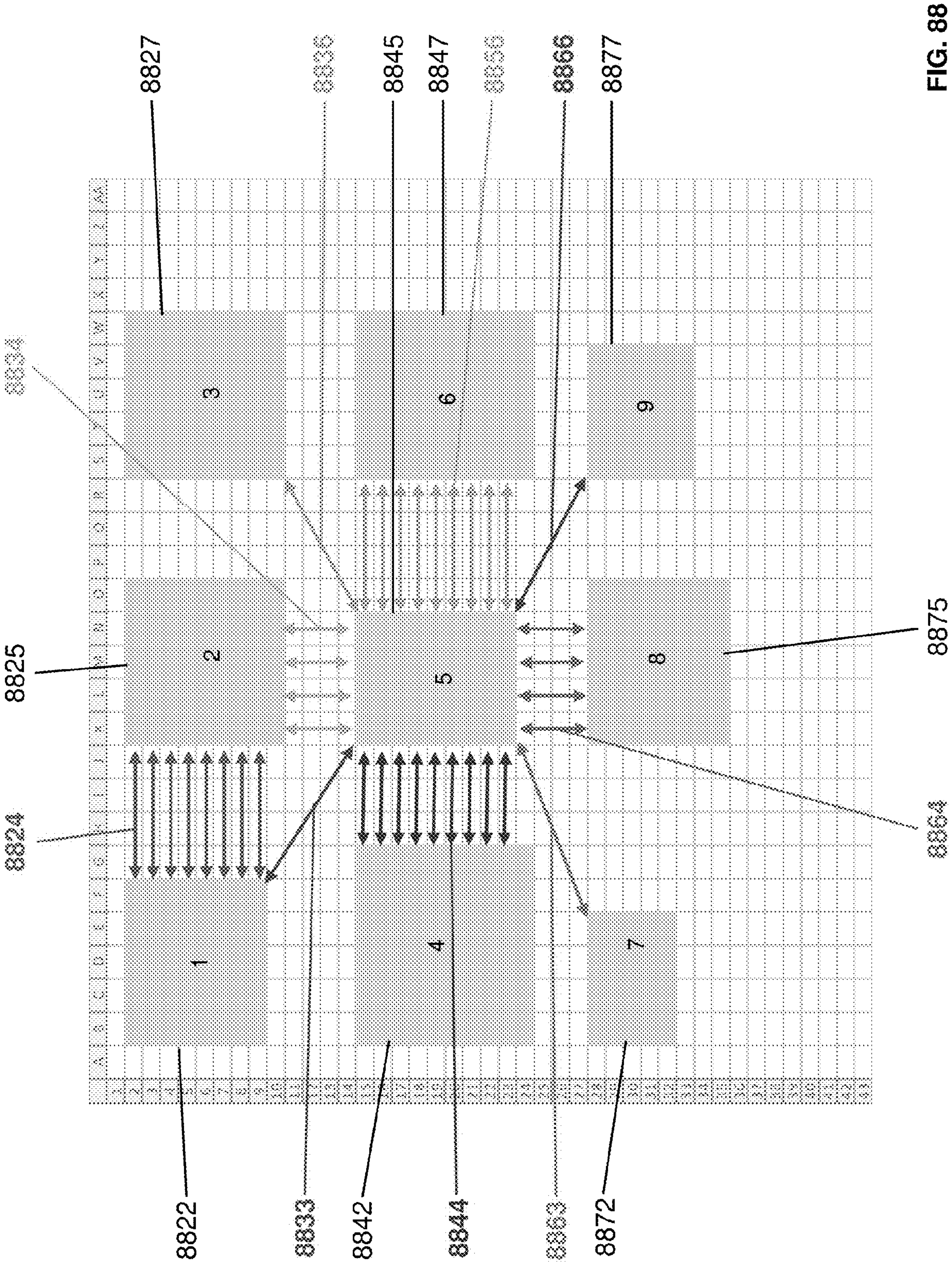

FIG. 88 illustratively examples eight flex areas which have been closest distance movement linked/connected to a flex area with our technology.

Figure 89:
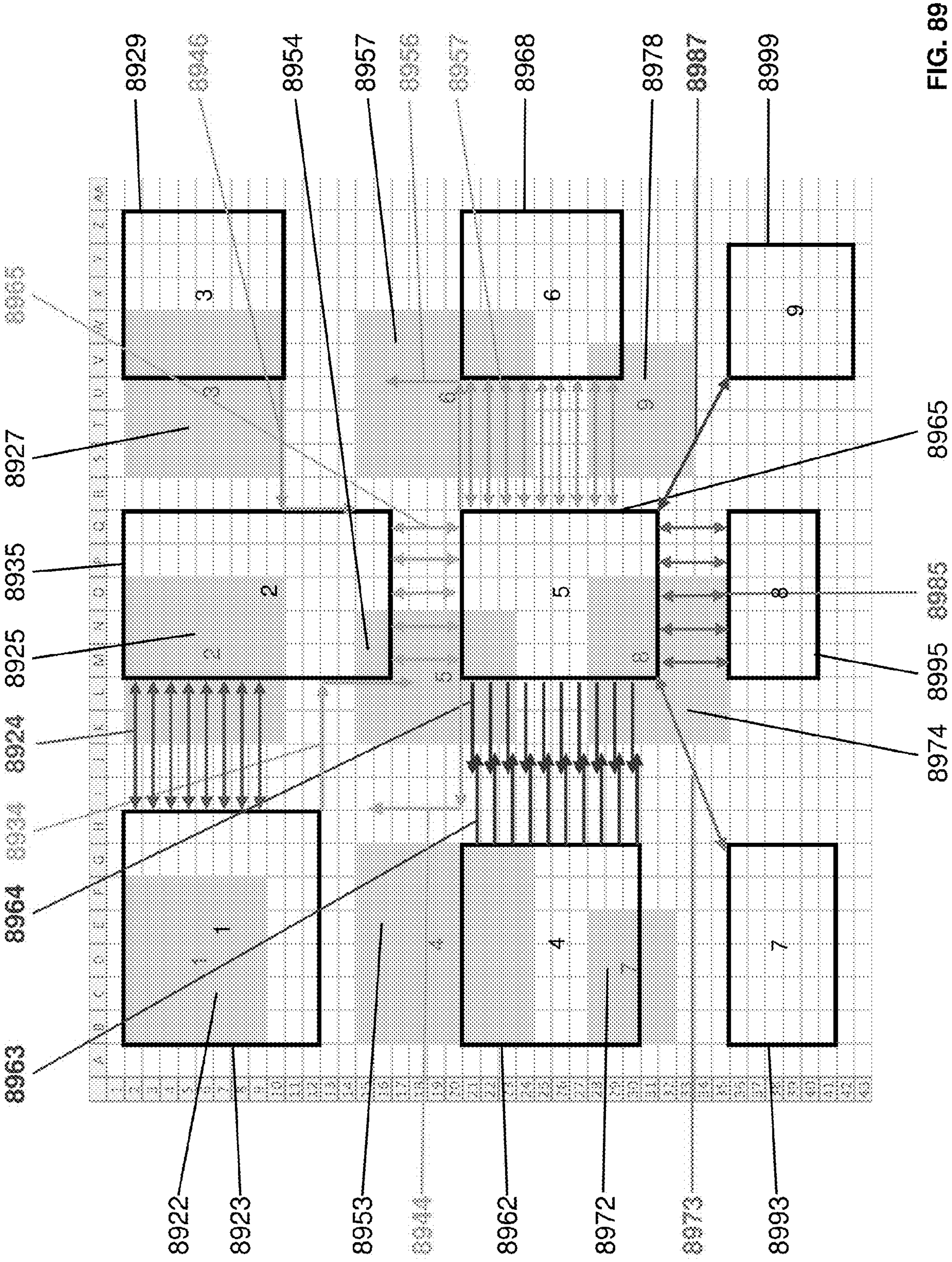
Figure 90:
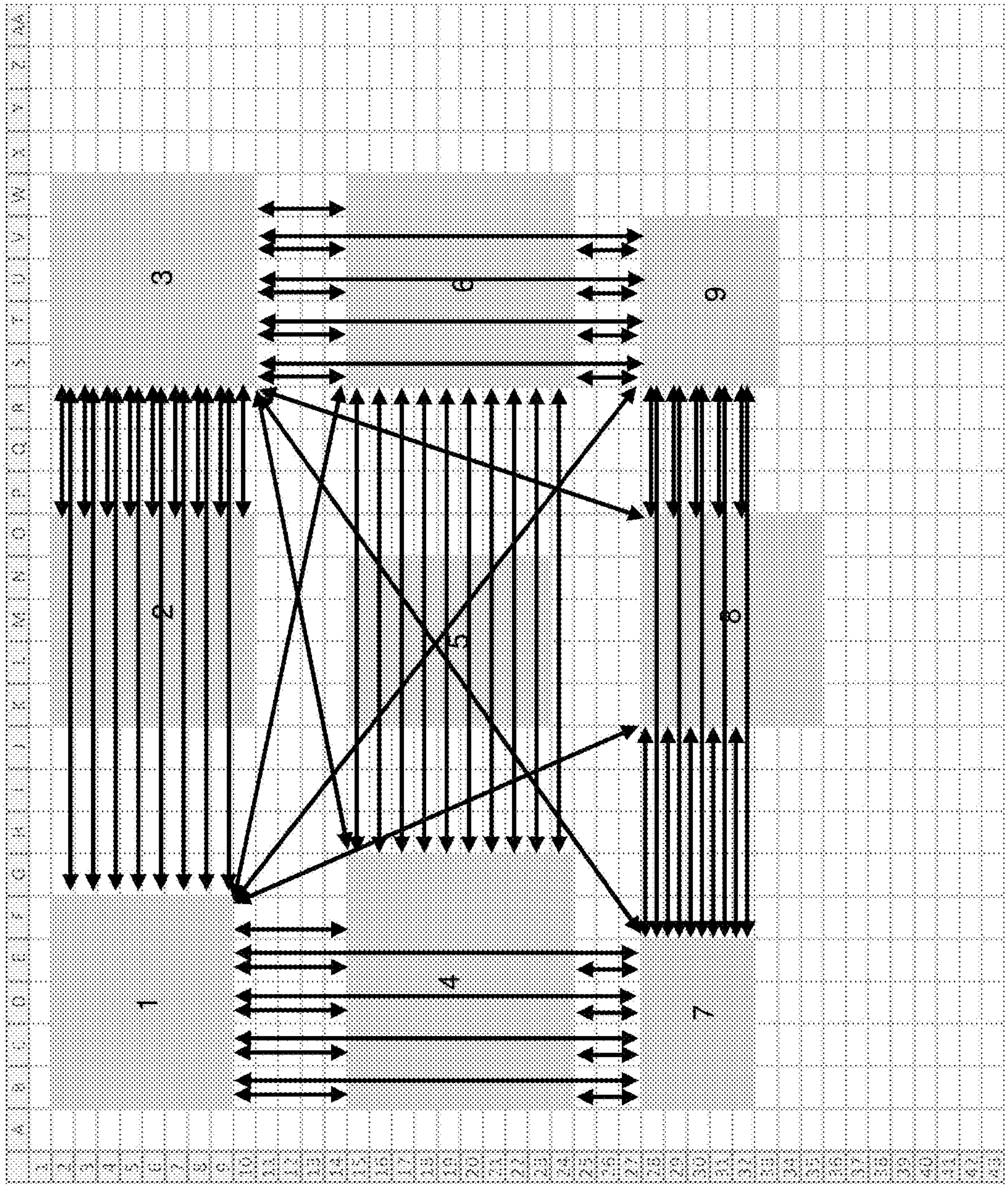

FIG. 89 examples a simultaneous flex of seven of the nine flex areas in FIG. 88 and the impact on the closed distance movement linkages/connections illustrated in FIG. 88.

FIGS. 90, 91, 92, and 93 illustratively examples the pre-flexes and post-flexes shortest distance movement linkage/connection relative spatial distances not shown in FIG. 88 and FIG. 89.

FIGS. 94, 95, 96, 97, 98, and 99 examples our closest distance movement linkage technology handling nine flex areas starting and automatically maintaining vertically and horizontally non-straight aligned relationships.

Figure 100:
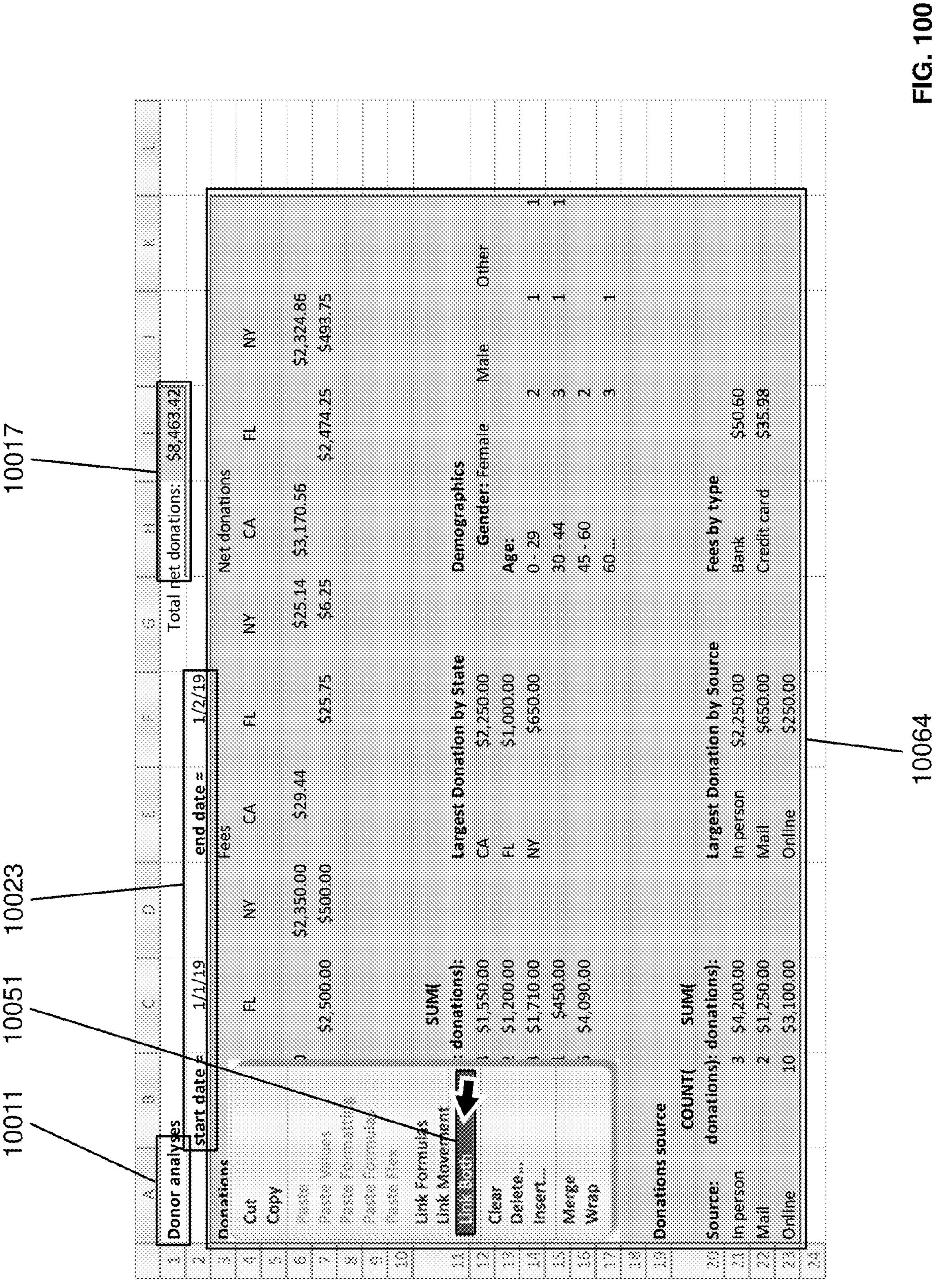

FIG. 100 examples the manual movement and formula links/connects setups for all but a few cells in our spreadsheet worksheet containing many flex ranges and individual cells (with content).

Figure 101:
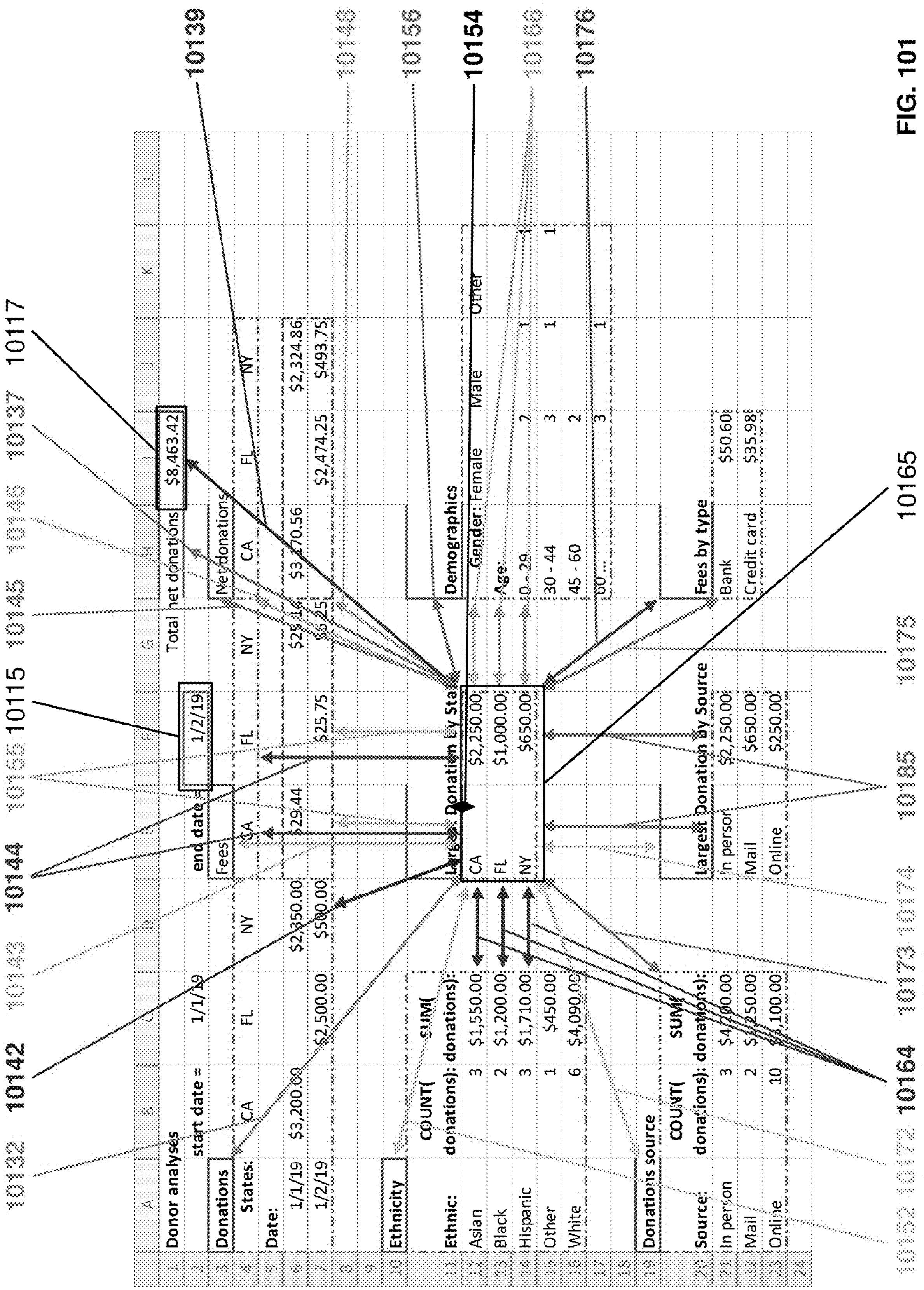

FIG. 101 illustratively examples the closest distance movement linkage/connection relative spatial relationships between a flex range and all the other cells or flex ranges linked/connected.

Figure 102:
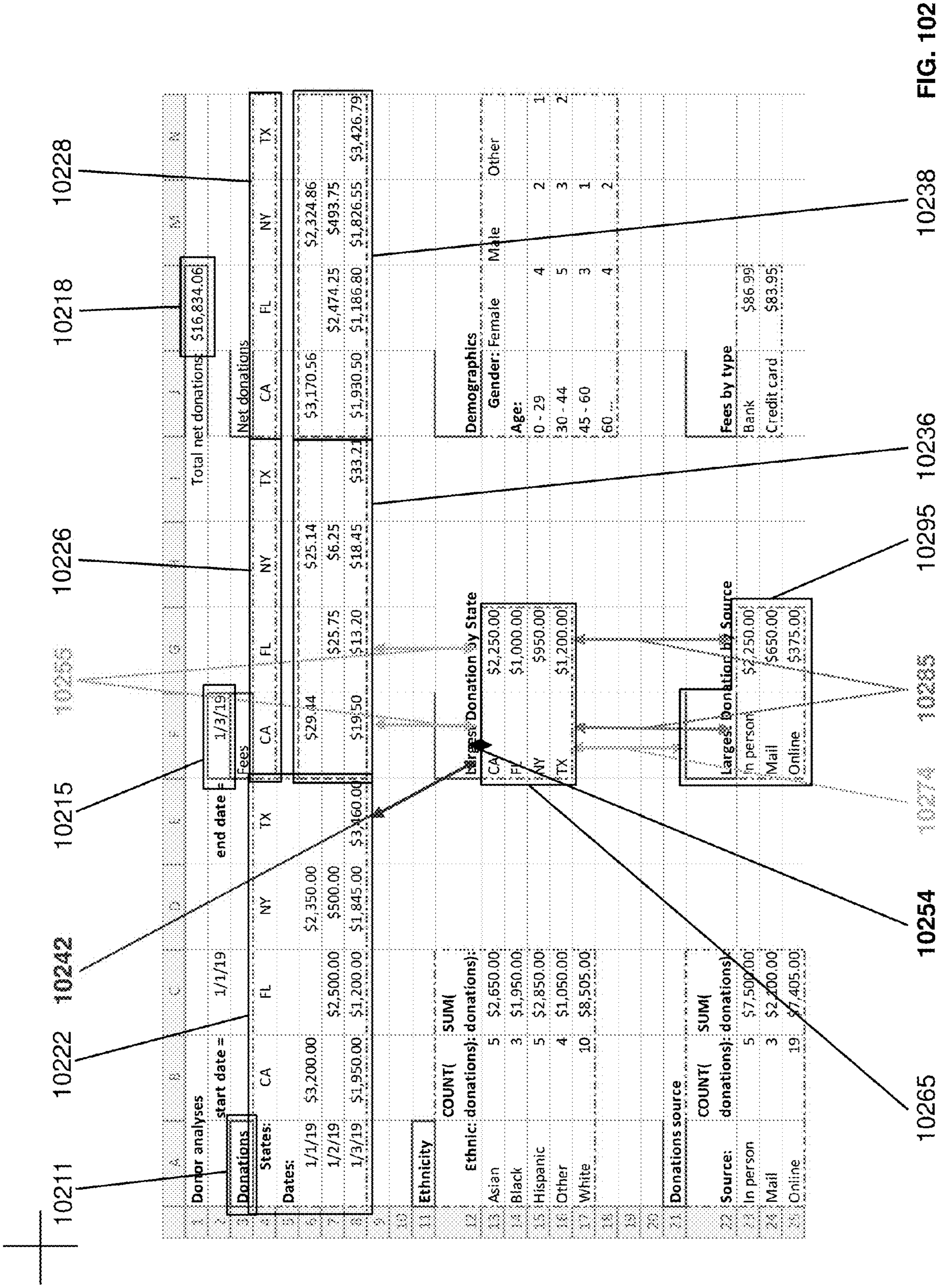

FIG. 102 examples the post-flexes double arrows closest distance movement linkage/connection relative spatial relationships for the flex area exampled in depth pre-flex in FIG. 101.

Figure 103:
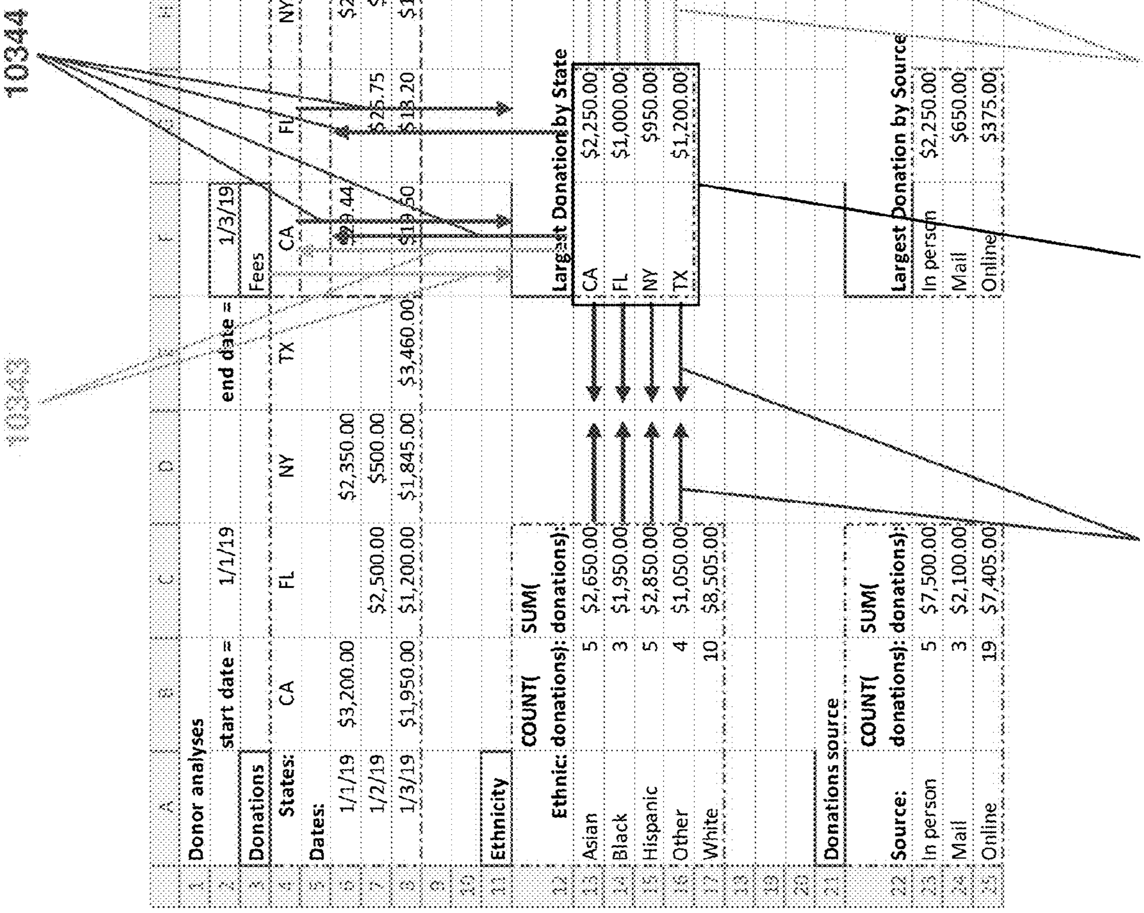

FIG. 103 examples the post-flexes single arrow straight up and down or across closest distance movement linkage/connection relative spatial for the flex area exampled in depth pre-flex in FIG. 101.

Figure 104:
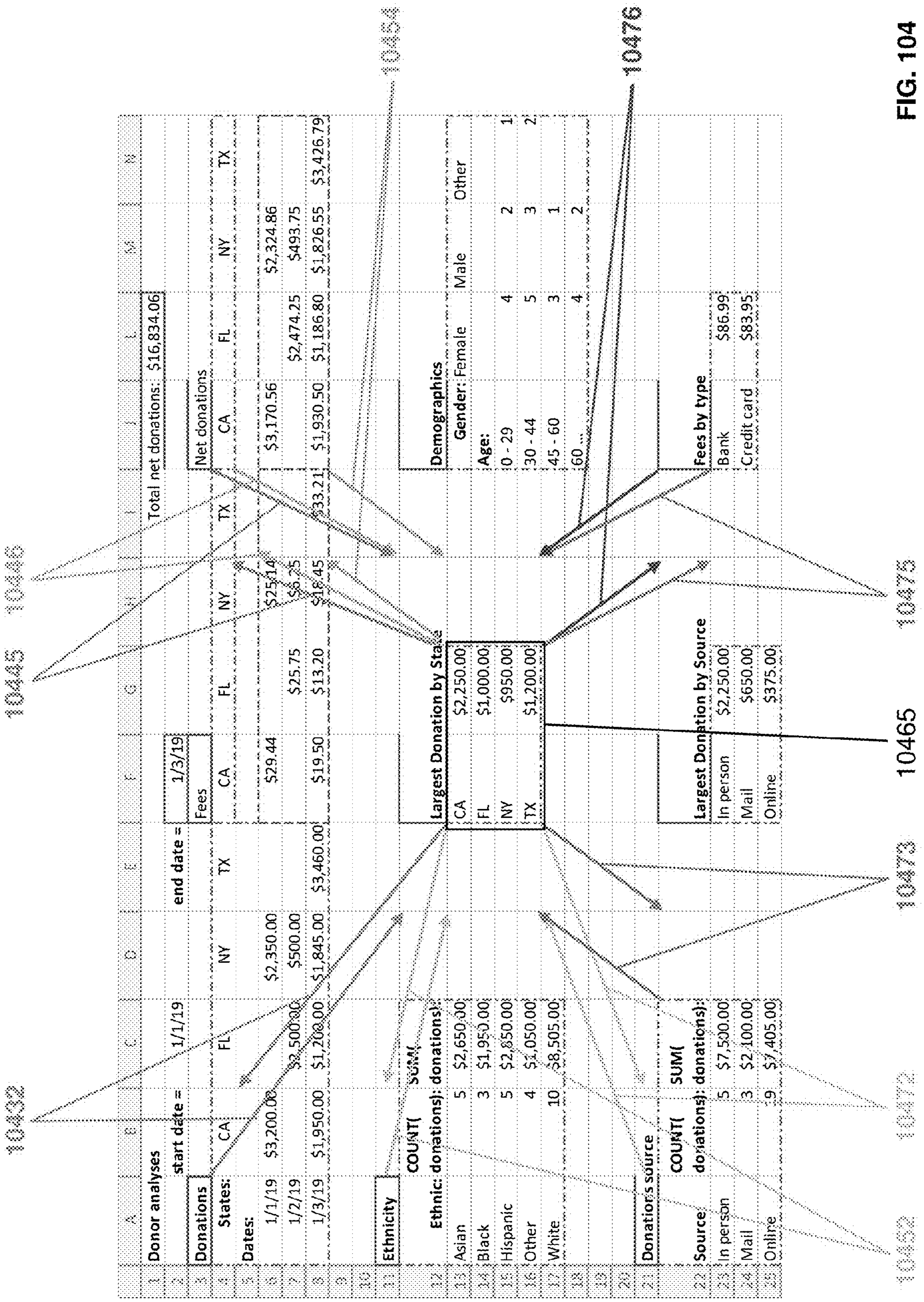
Figure 105:
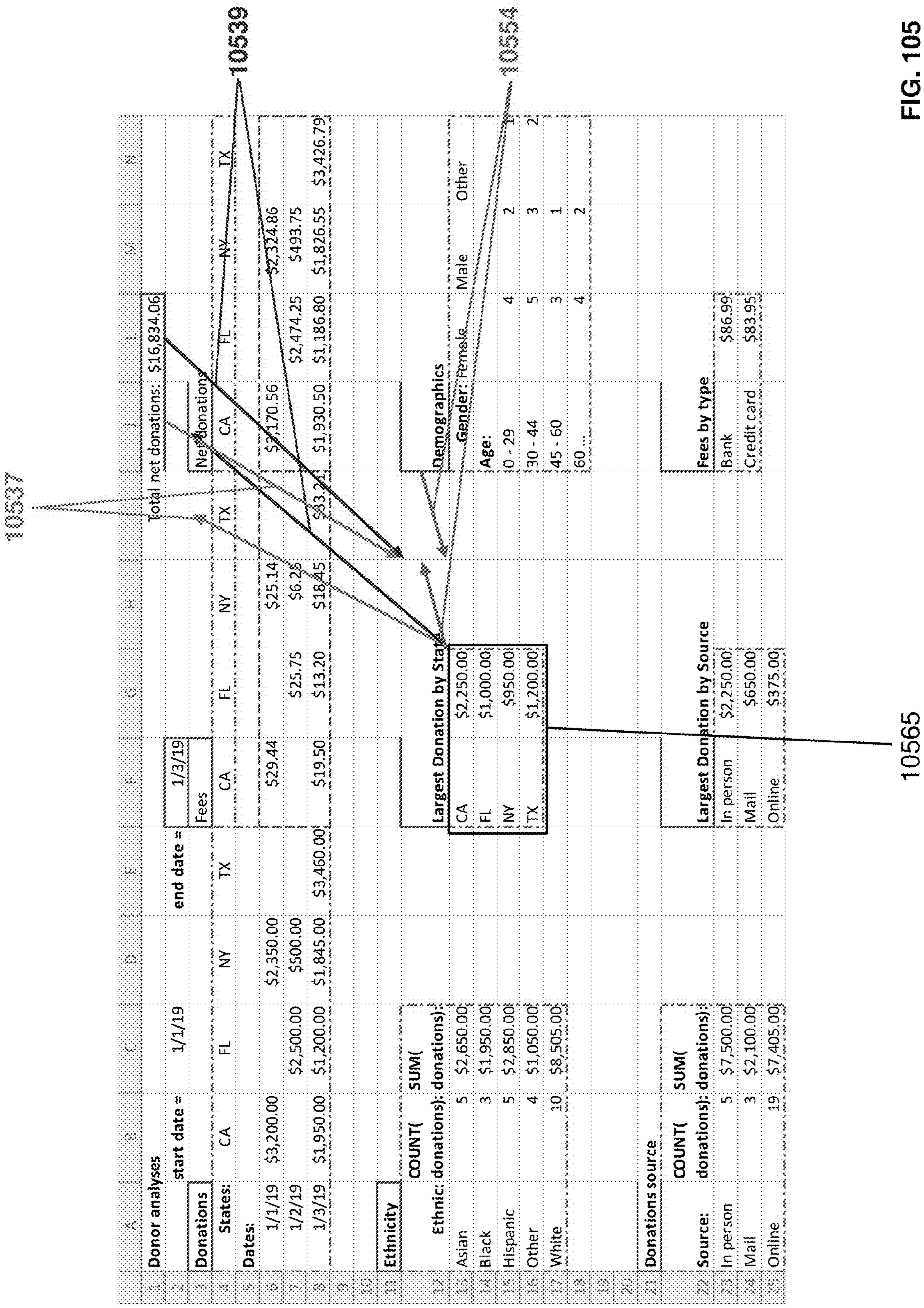

FIG. 104 and FIG. 105 examples the other post-flexes tangential closest distance movement linkage/connection relative spatial relationships for the flex area exampled in depth pre-flex in FIG. 101.

FIGS. 106, 107, 108, 109, 110, and 111 illustratively example most of the additional pre-flexes closest distance movement linkage/connection relative spatial relationships not shown in FIG. 101.

FIGS. 112, 113, 114, 115, 116, 117, 118, 119, 120, 121, 122, 123, 124, 125, 126, 127, and 128 illustratively example additional post-flexes closest distance movement linkage/connection relative spatial relationships not shown in FIGS. 102, 103, 104, and 105.

FIGS. 129A, 129B, 130A, and 130B examples how a first linkage/connection group and successive linkage setups (groupings) can alter the automatic positional linked/connected movement upon flexing.

Figure 131A:
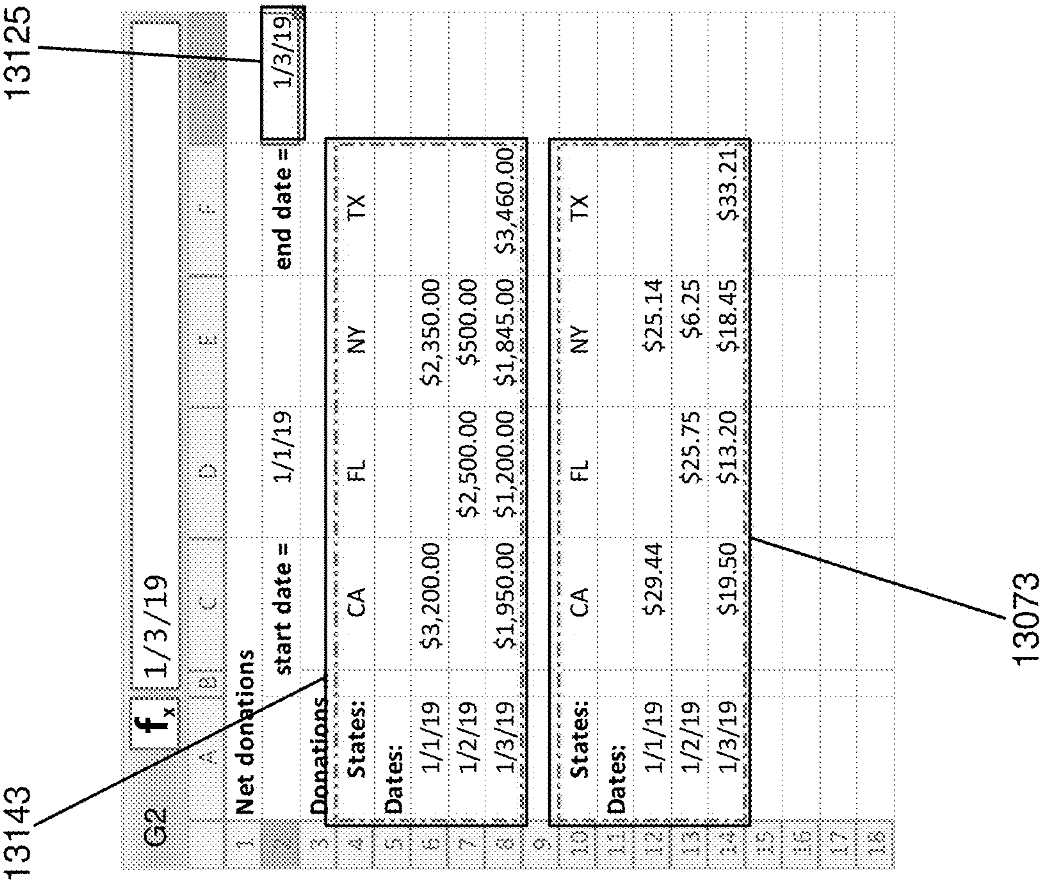
Figure 131B:
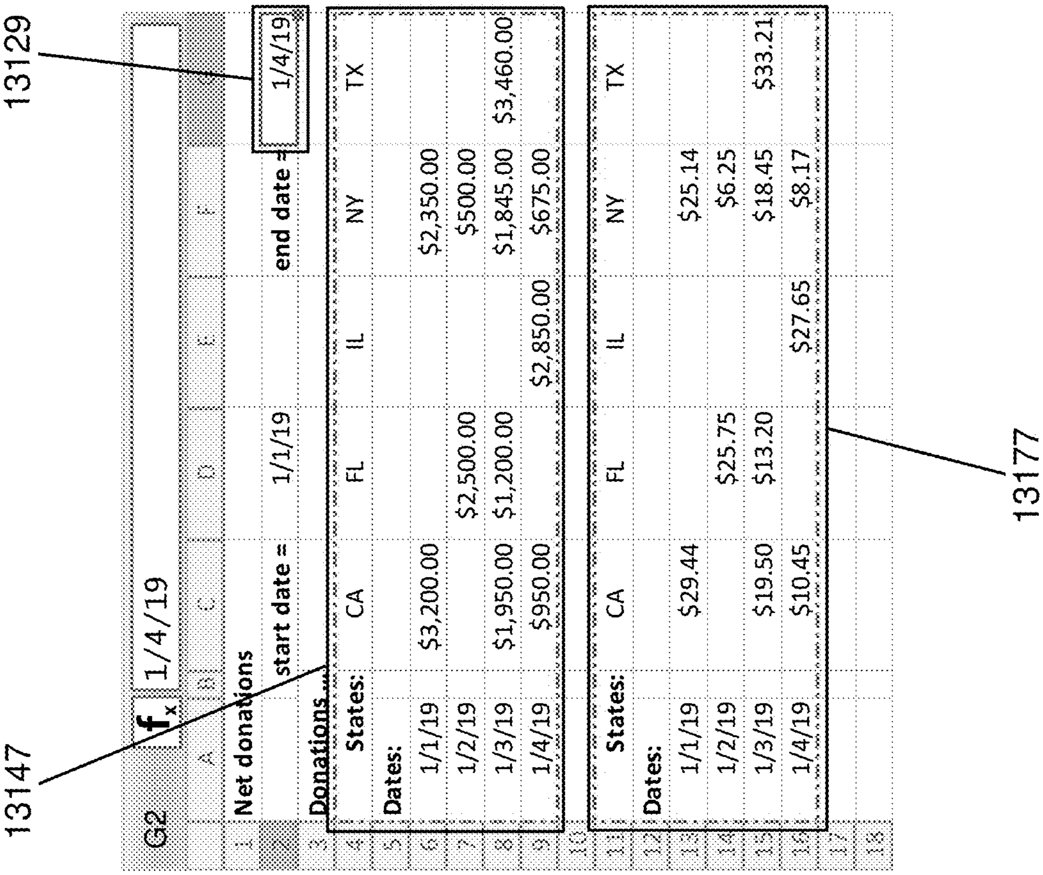

FIGS. 131A and 131B examples movement only linkages/connections between two flex ranges maintaining their relative spatial positioning.

Figure 68A:
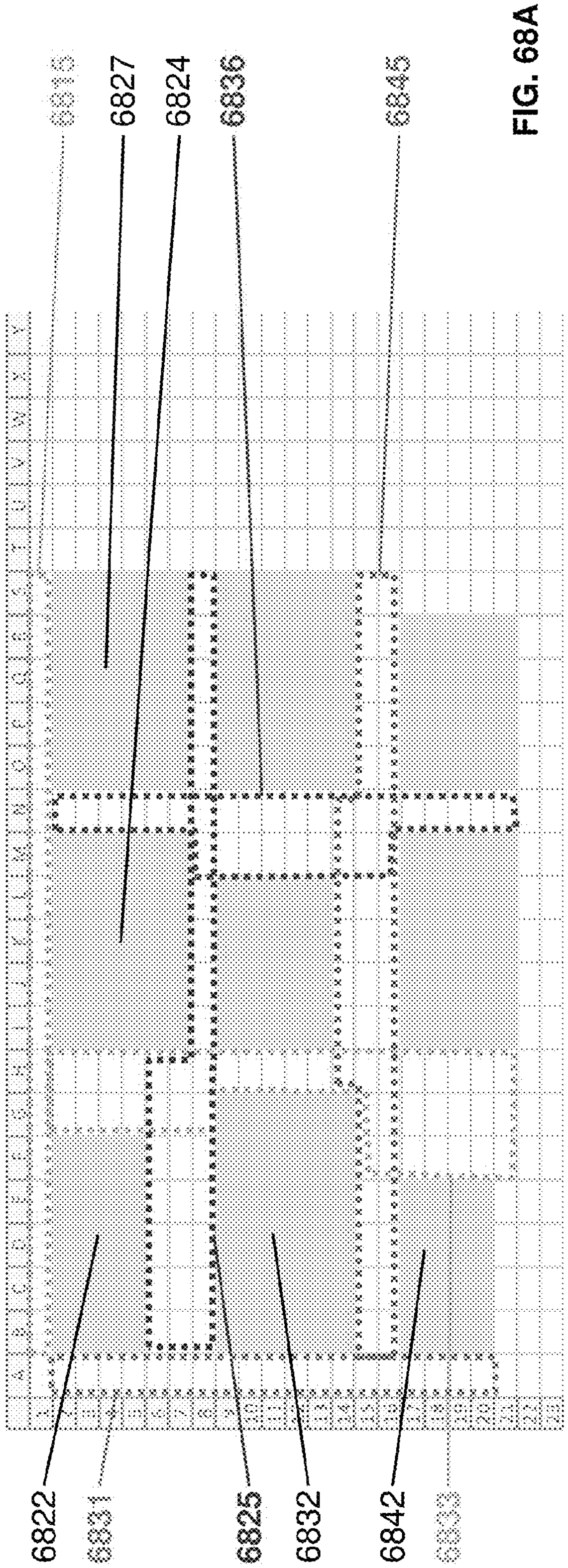
Figure 68B:
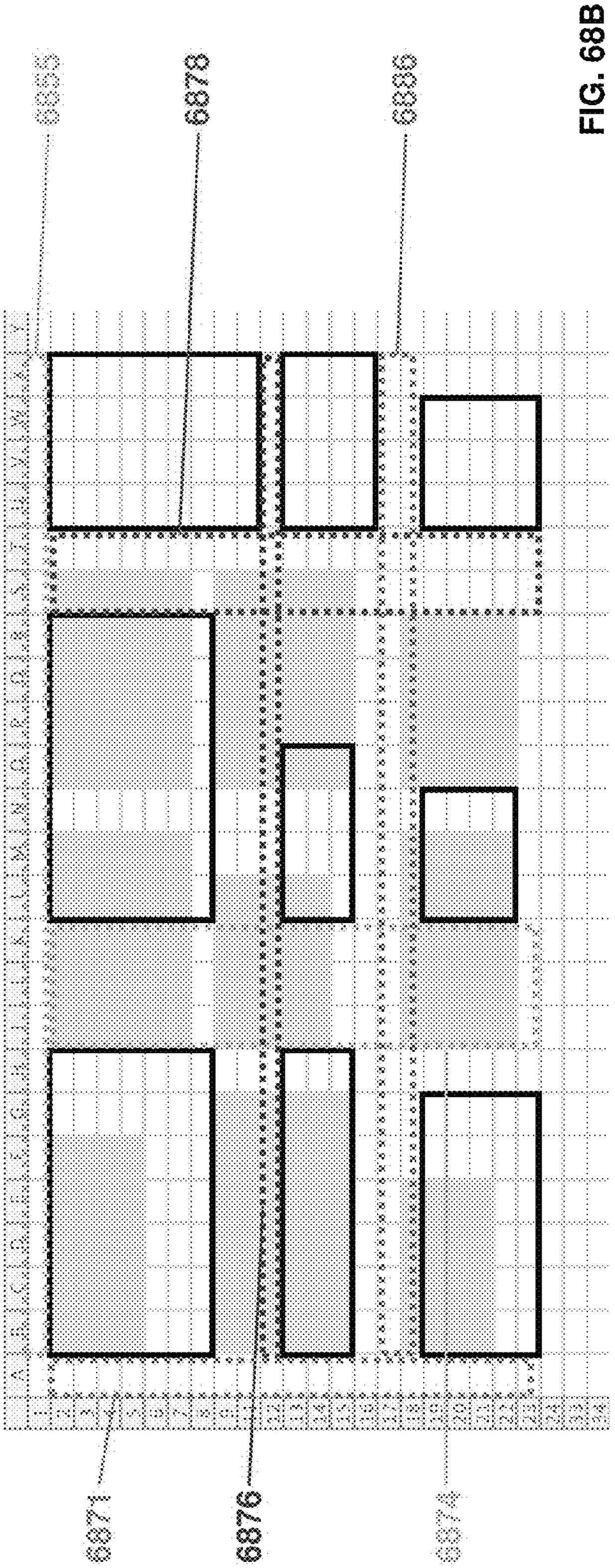
Figure 132A:
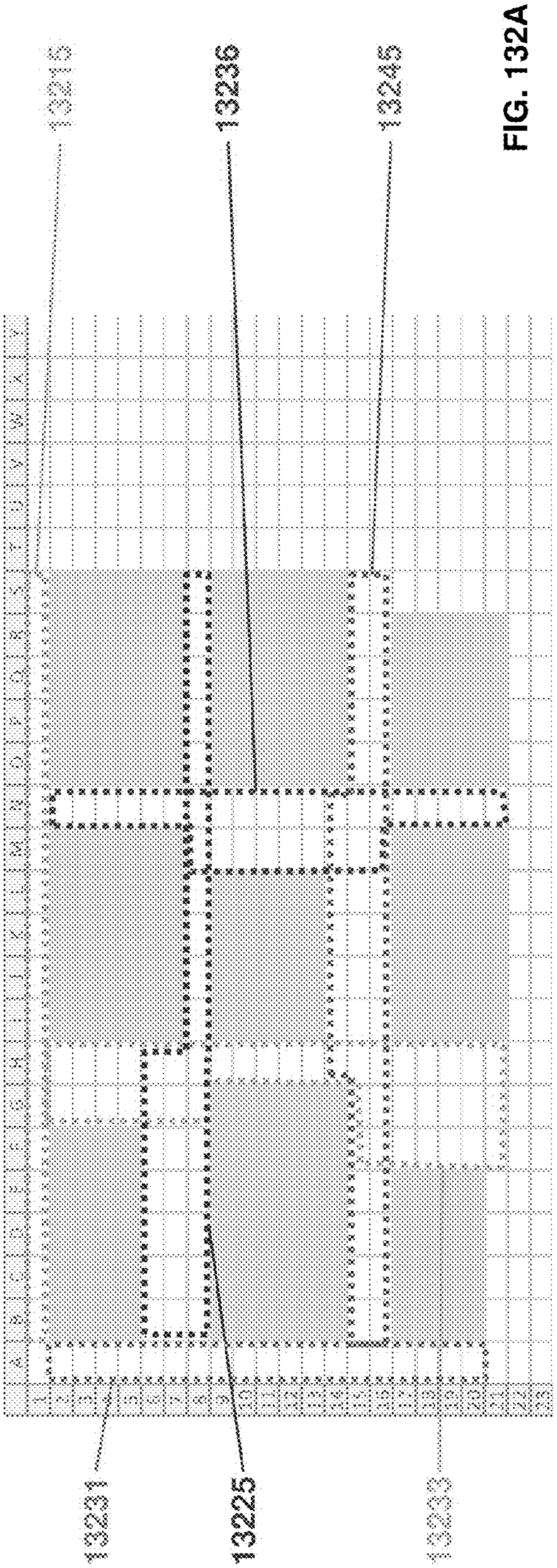
Figure 132B:
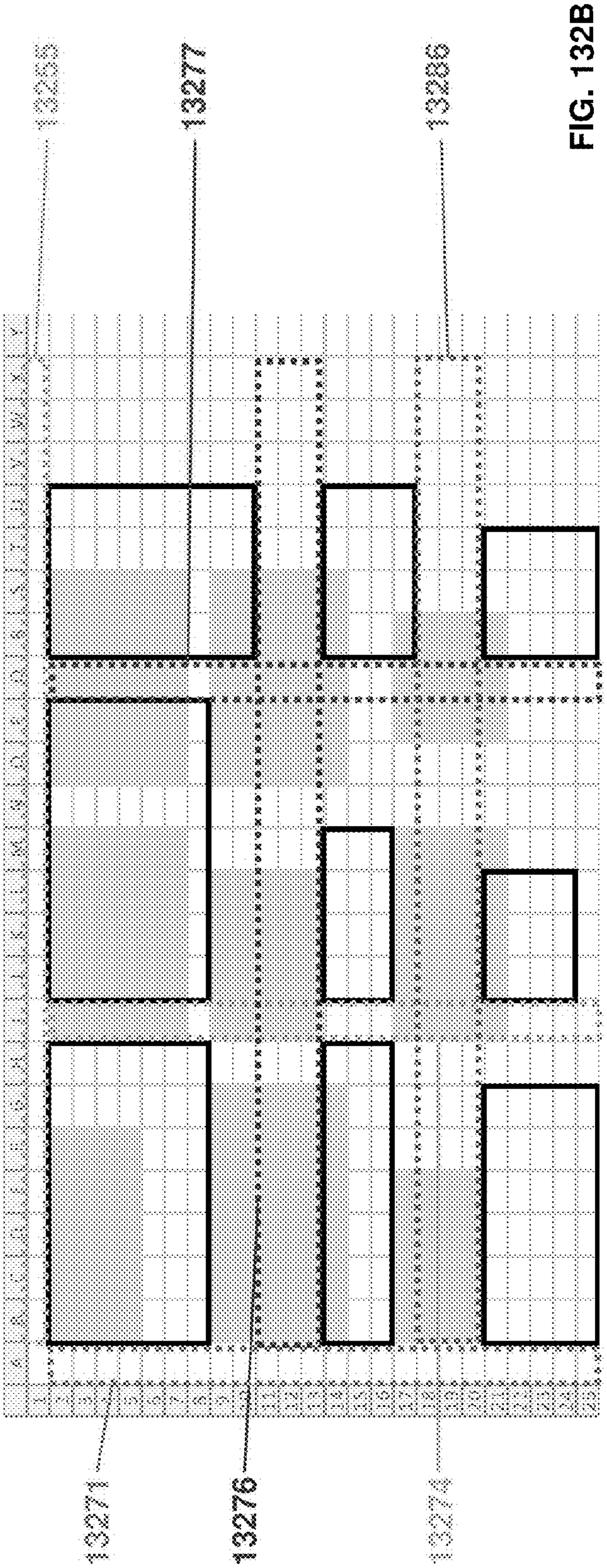

FIGS. 132A and 132B examples the same cell row or column separation distances as FIG. 68A and FIG. 68B but with different maximum and minimum selections by the user or default settings within the application.

Figure 133B:
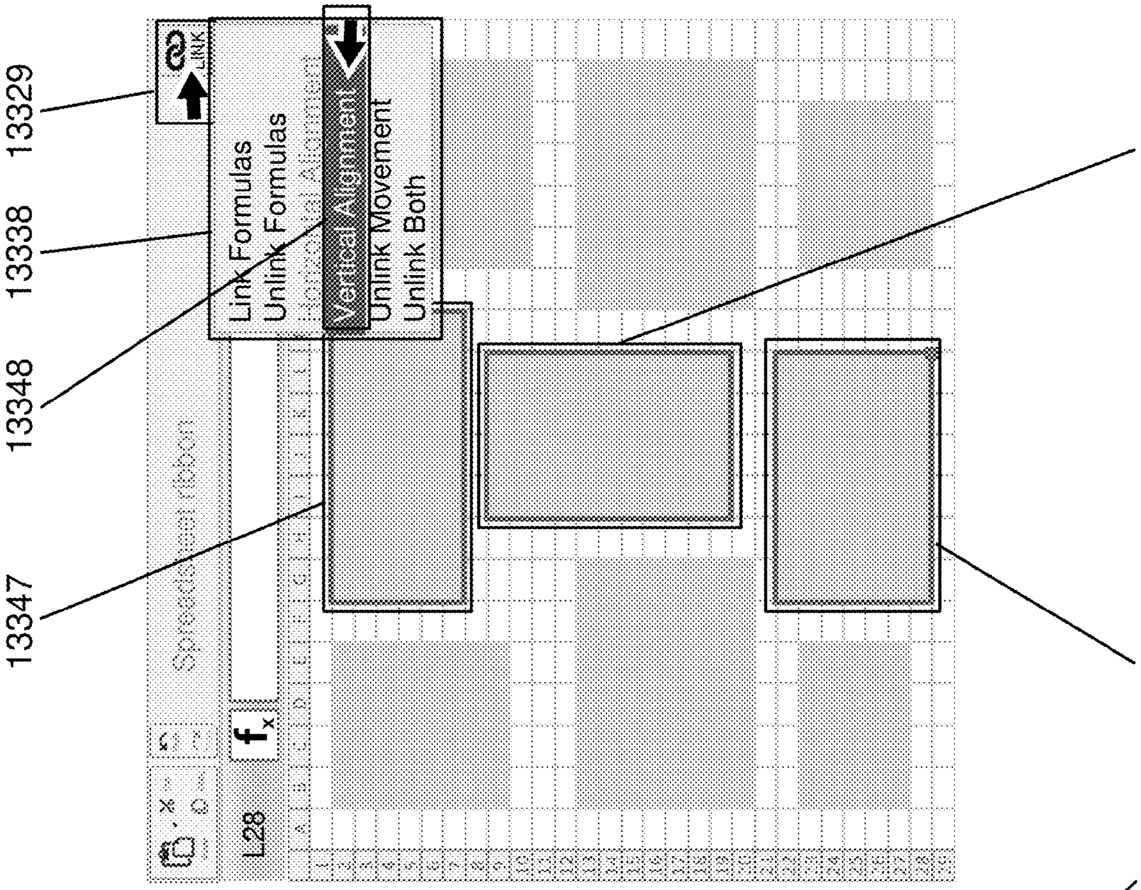
Figure 133A:
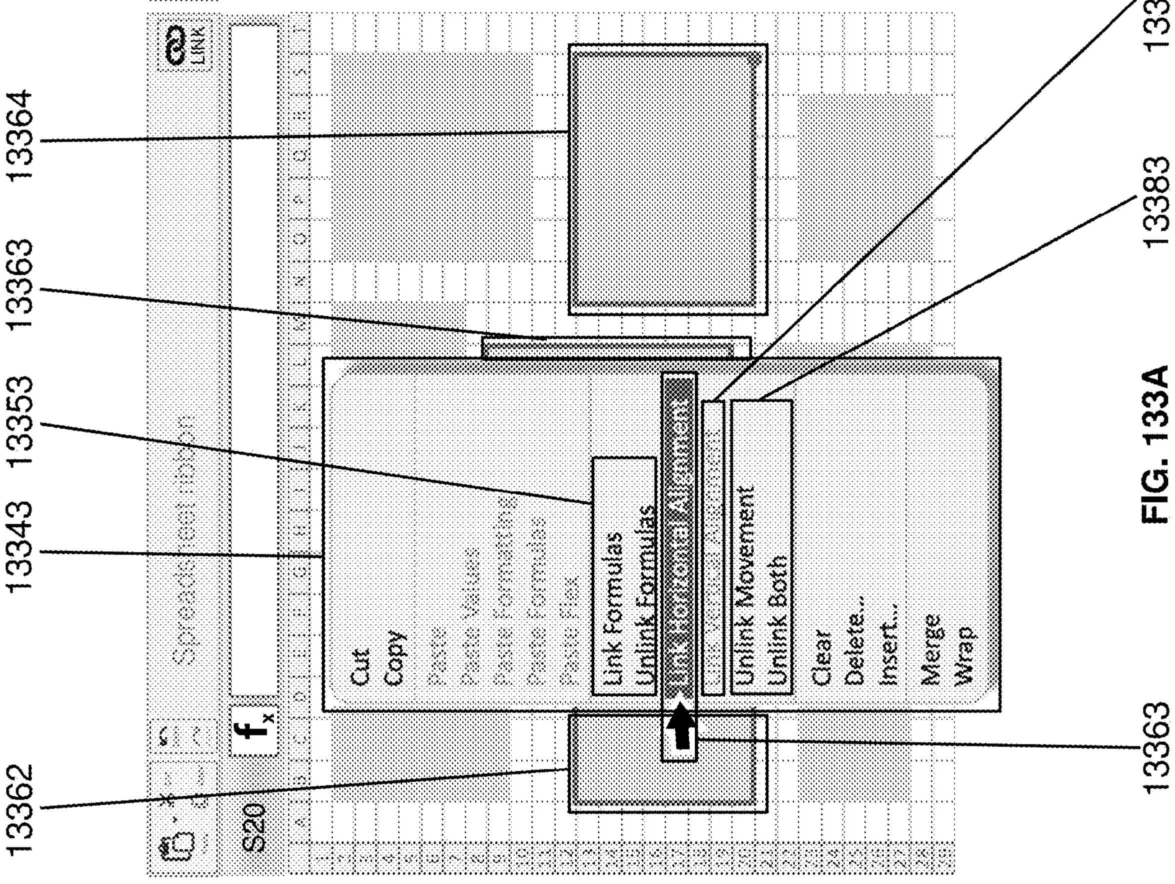

FIGS. 133A and 133B example different manual ways in our technology to horizontally and vertically link imperfectly aligned areas together for flex movements.

Figure 134B:
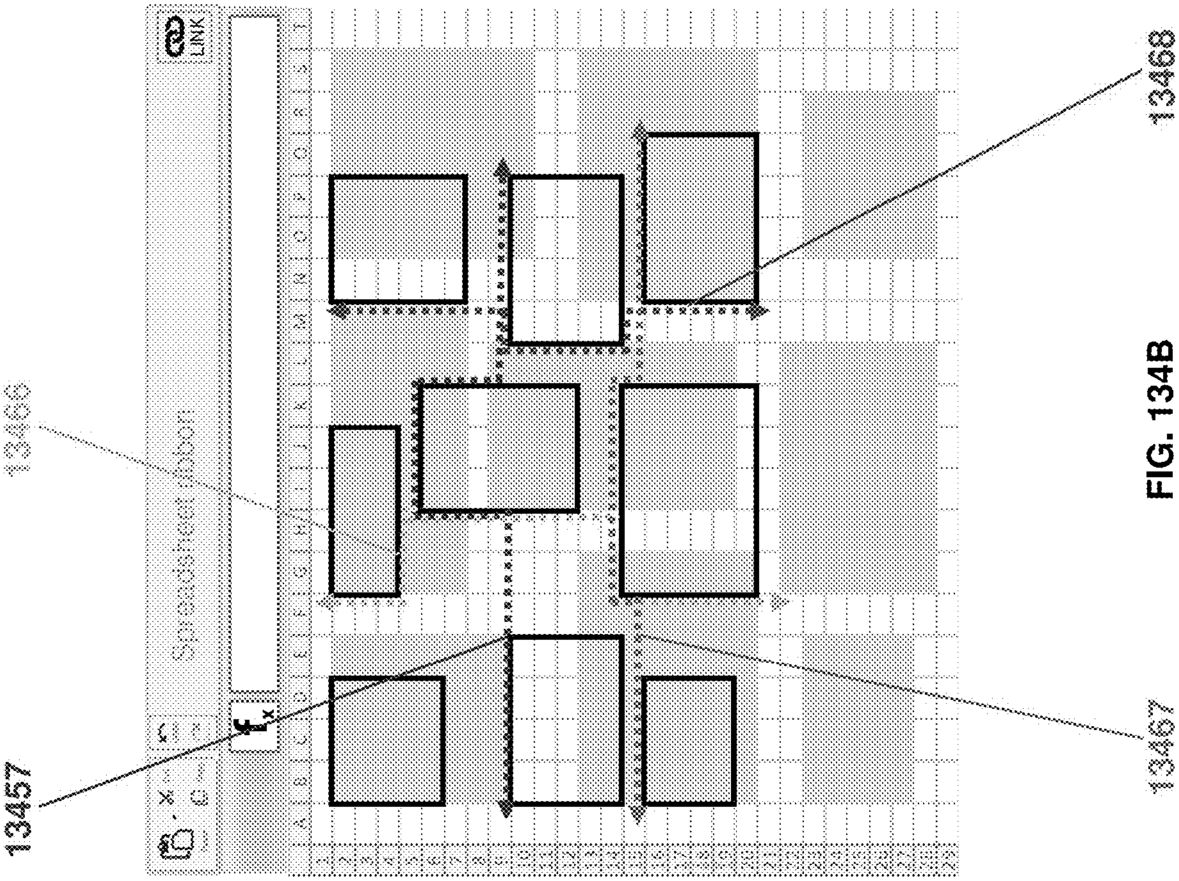
Figure 134A:
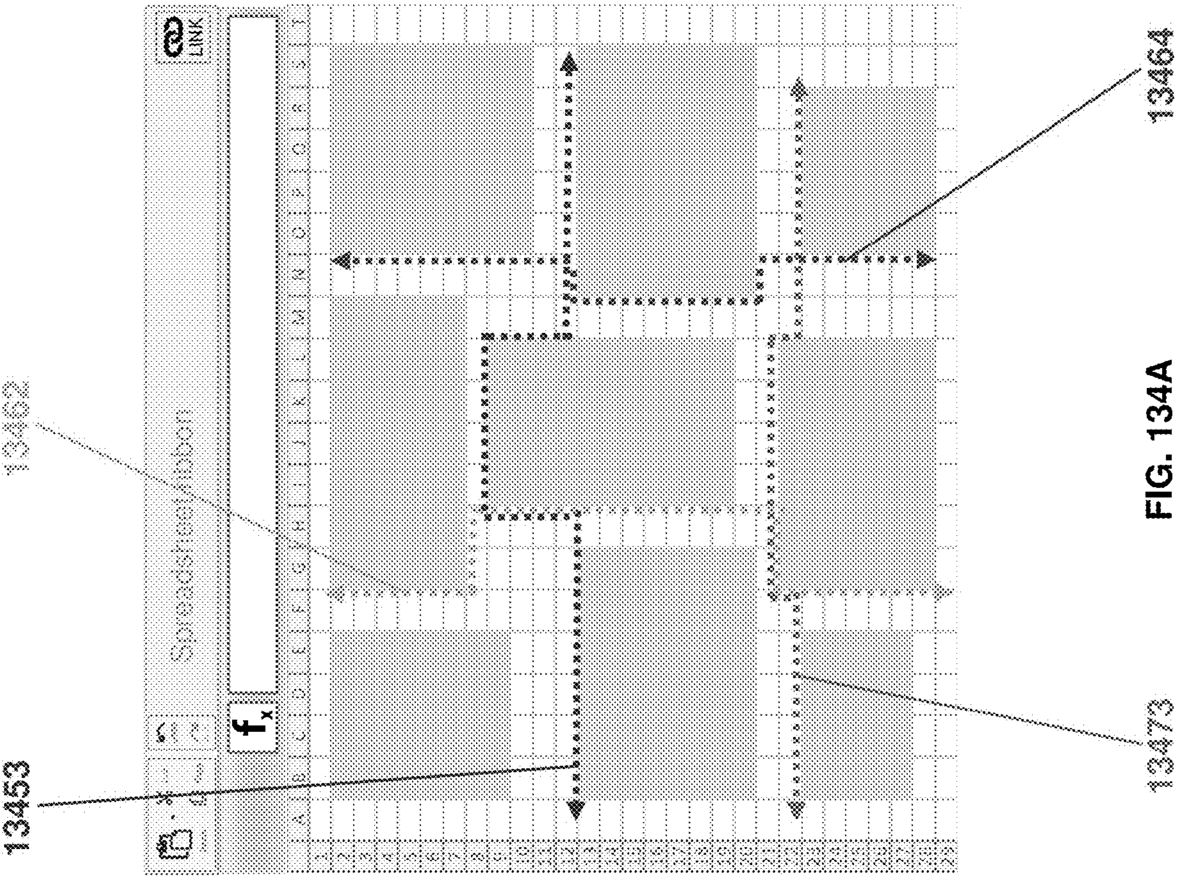

FIGS. 134A and 134B examples two vertical and two horizontal movement link/connect alignments which retain their aligned one cell minimum cushion during flex contractions.

Figure 135B:
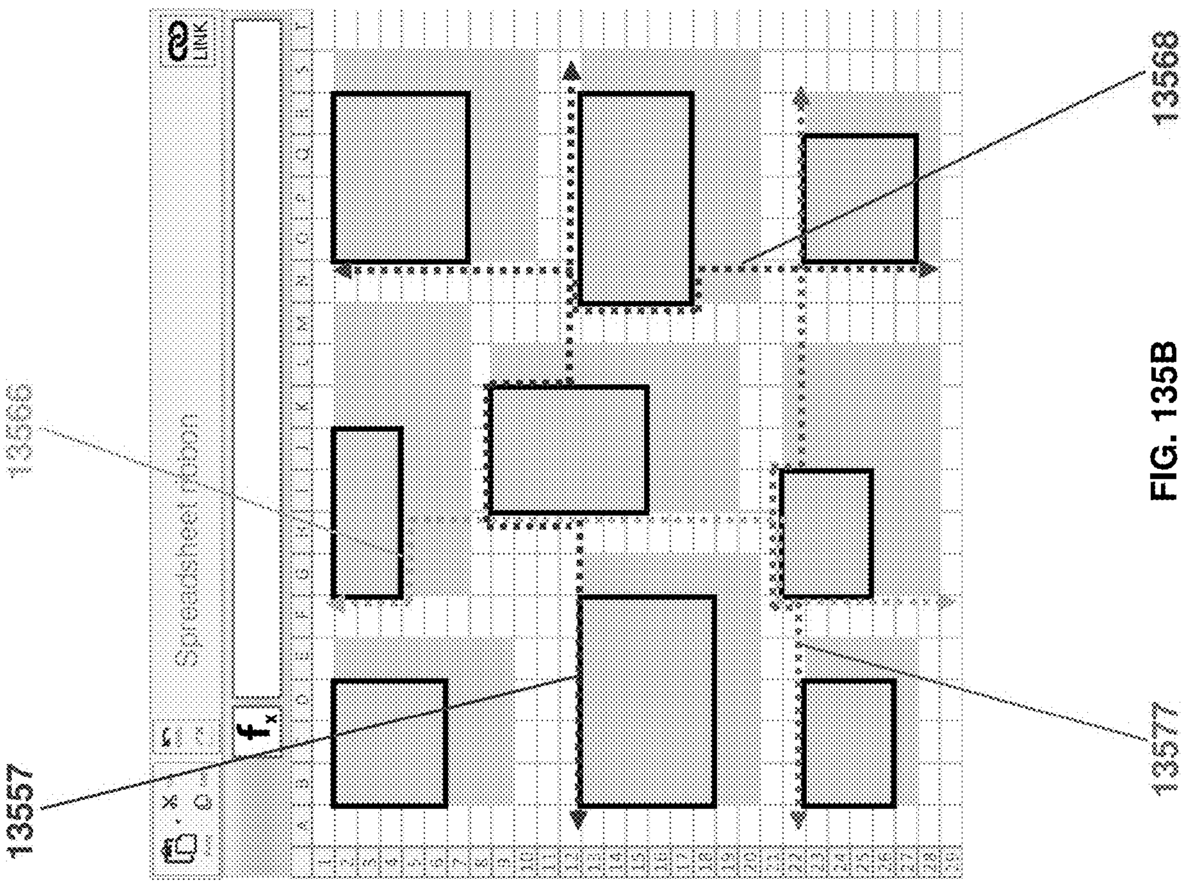
Figure 135A:
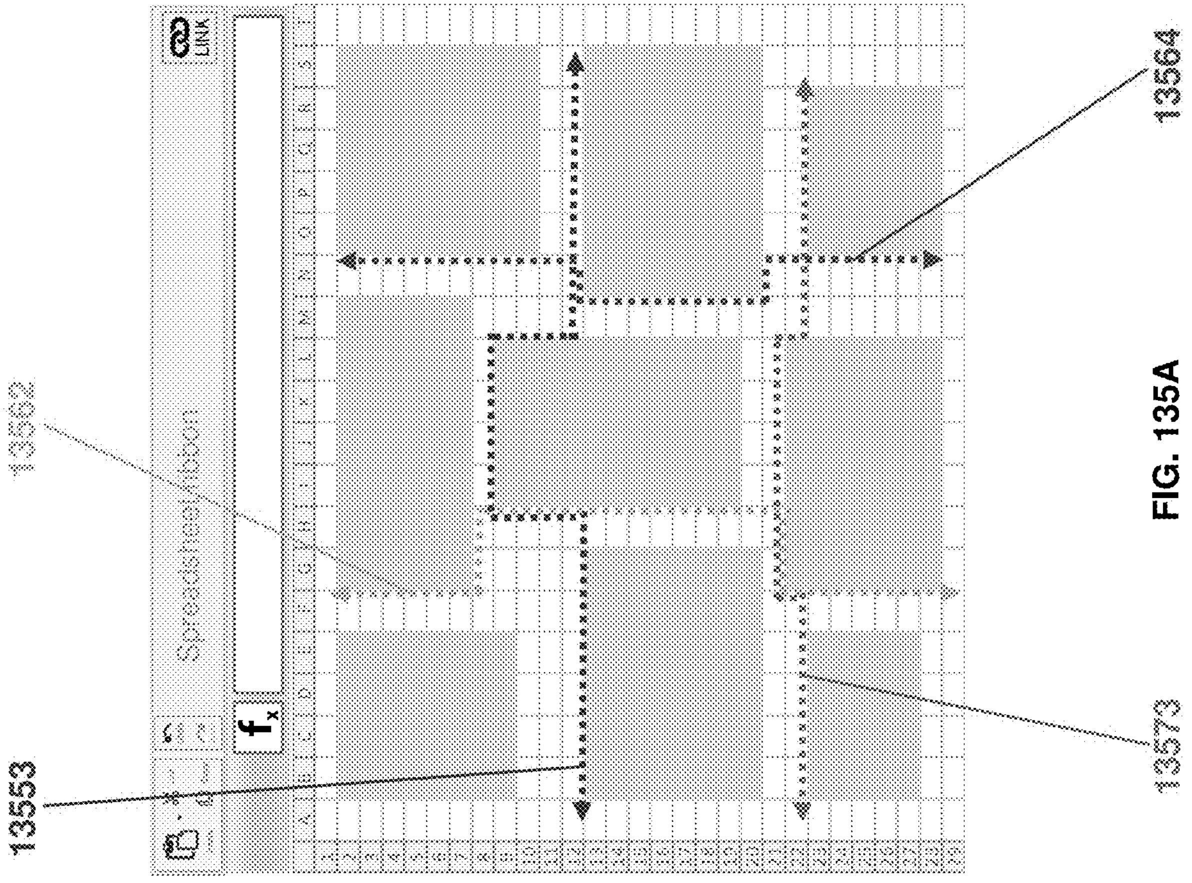

FIGS. 135A and 135B examples two vertical and two horizontal movement link/connect alignments which retain their alignment but not their separation distance during flex contractions.

Figure 136B:
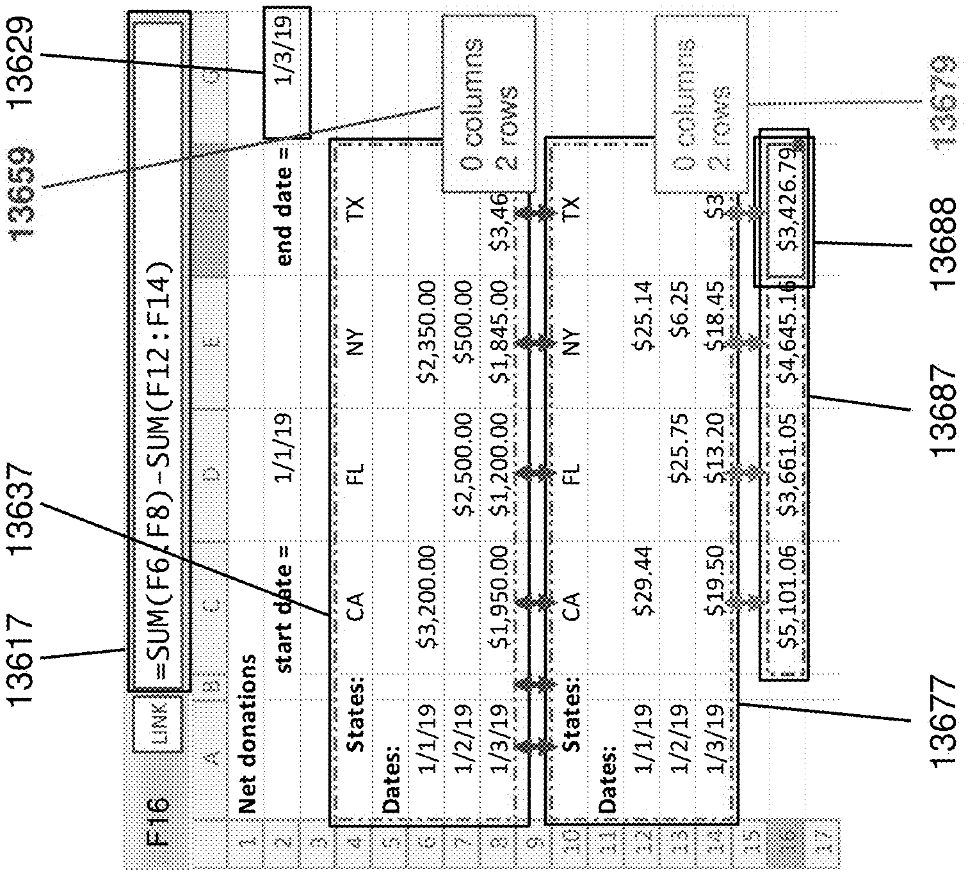
Figure 136A:
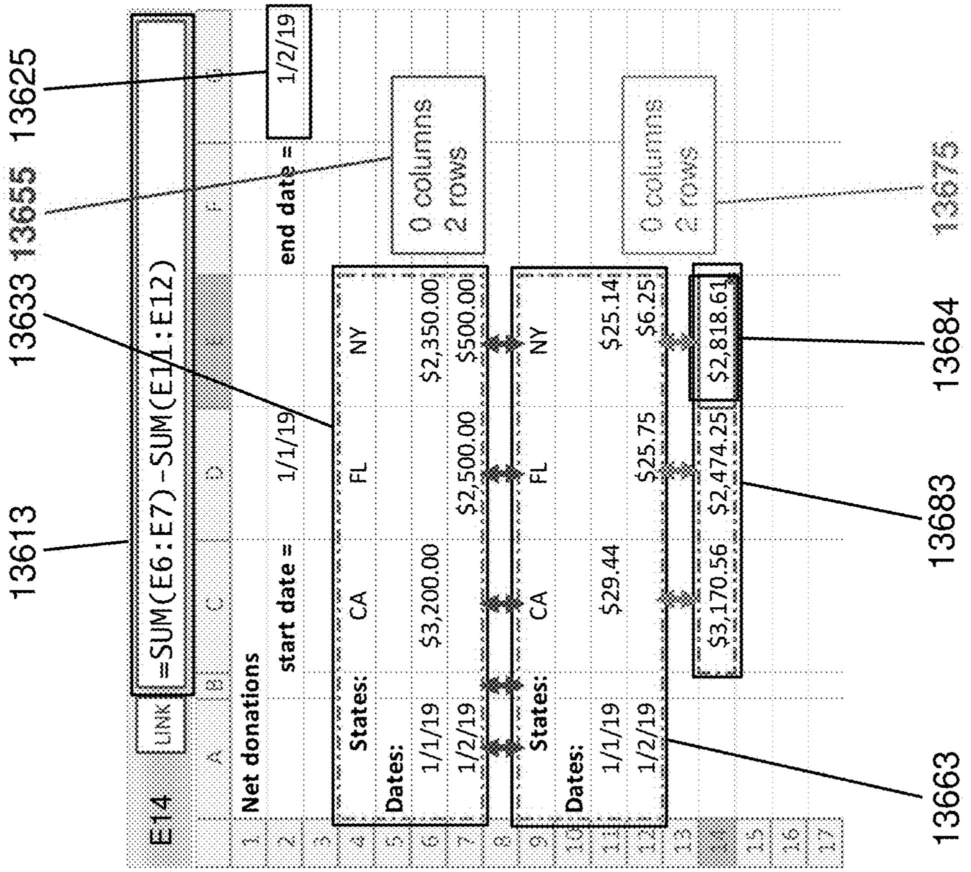

FIGS. 136A and 136B example our direct and indirect linked/connected movement technology working for a combined formula and movement linkage/connection where the indirectly linked area is a flex range.

Figure 137B:
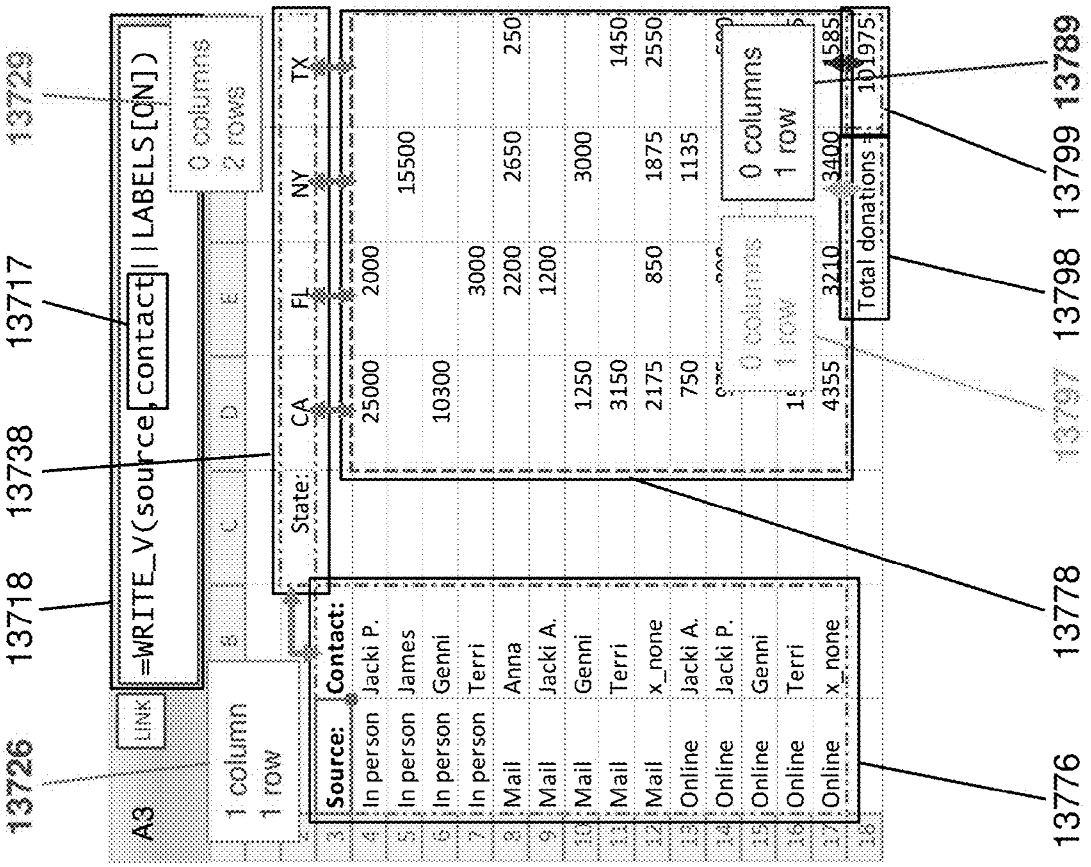
Figure 137A:
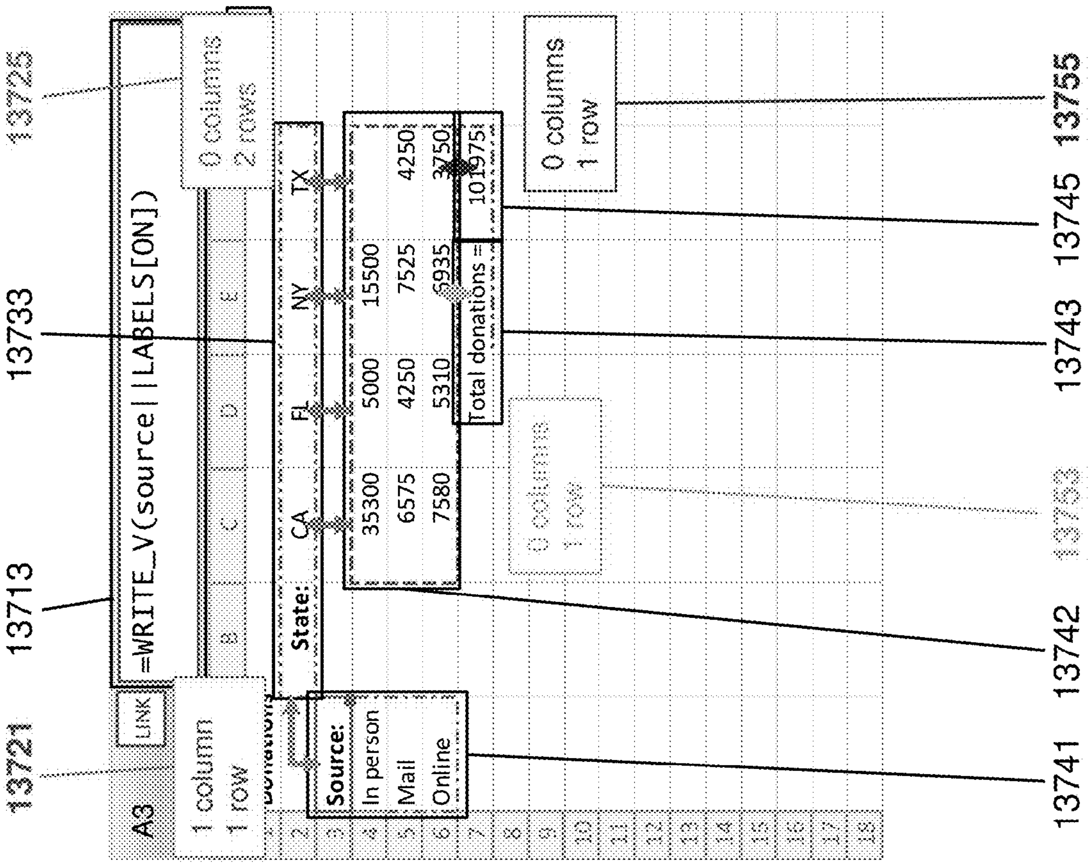

FIGS. 137A and 137B example four different movement linkages where one of the linked cells is both movement and formula linked/connected.

Figures 138A, 138B, 138C:
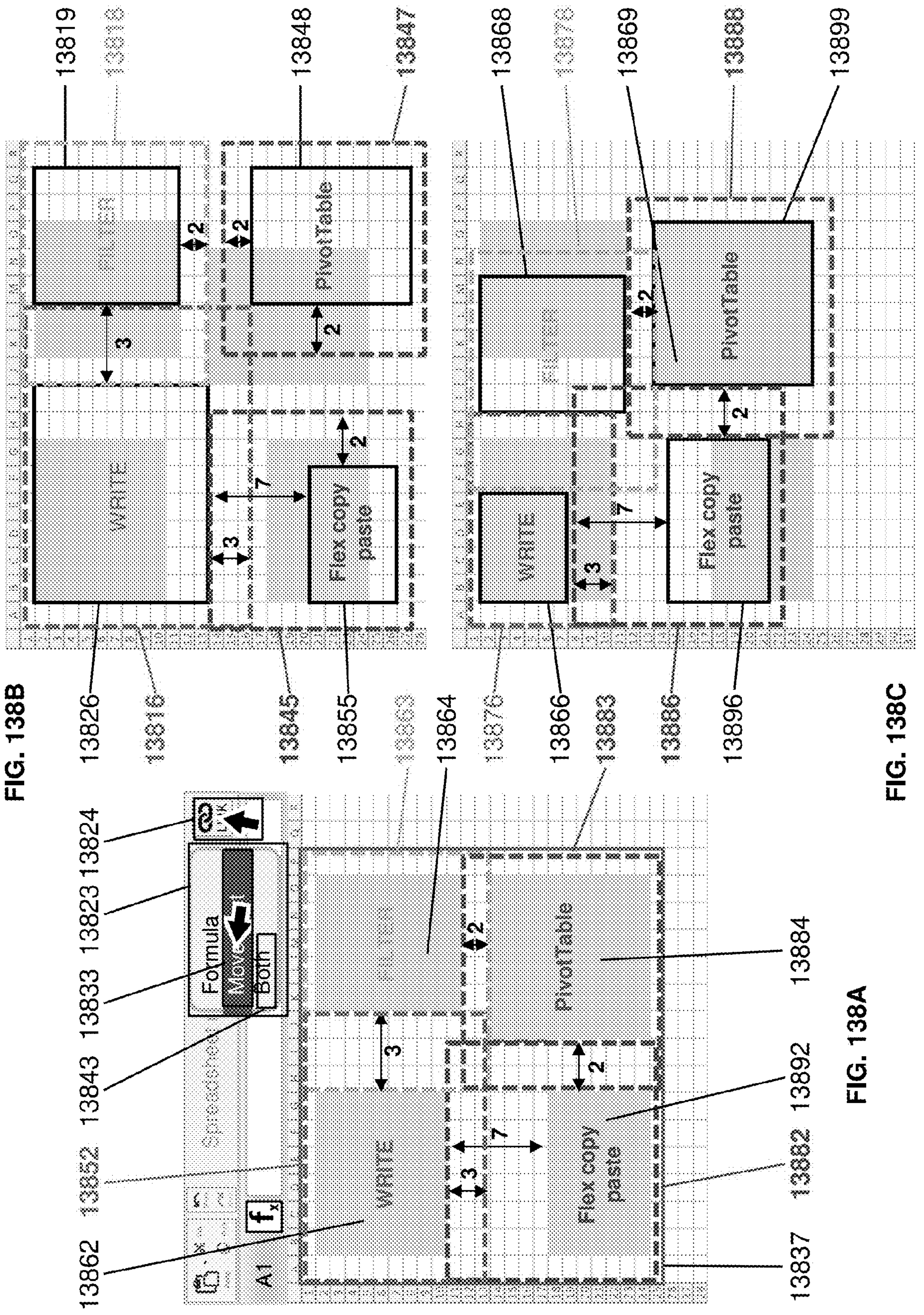

FIGS. 138A, 138B, and 138C example our 'bumper' movement linkage/connection technology working for a mixture of flex contraction and expansions.

Figure 139B:
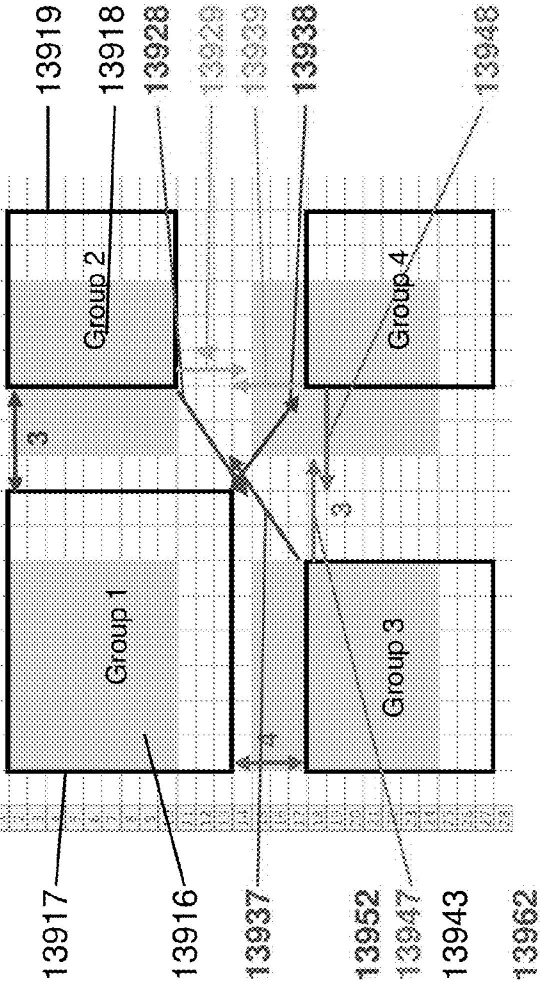
Figure 139C:
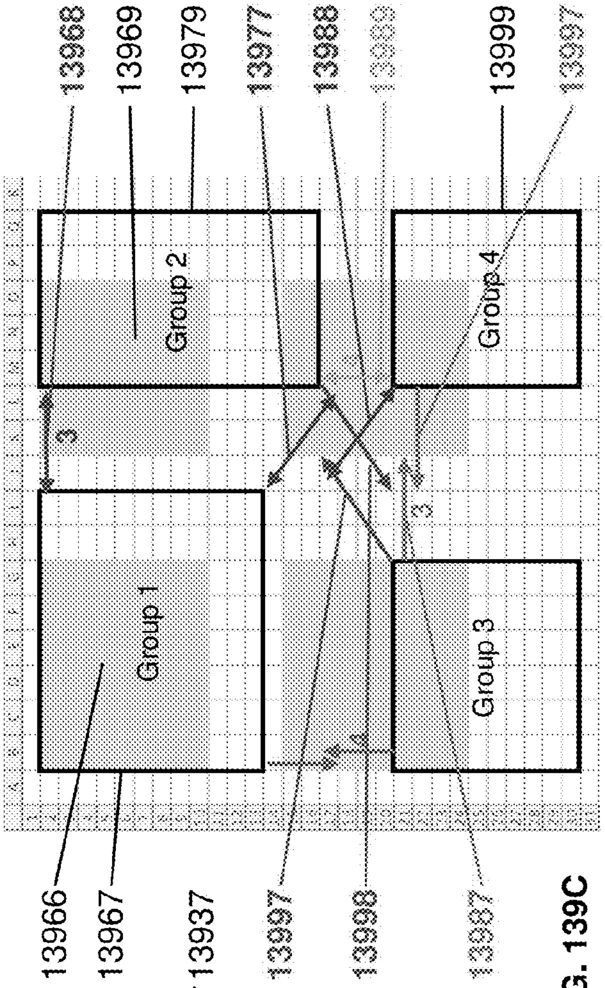
Figure 139A:
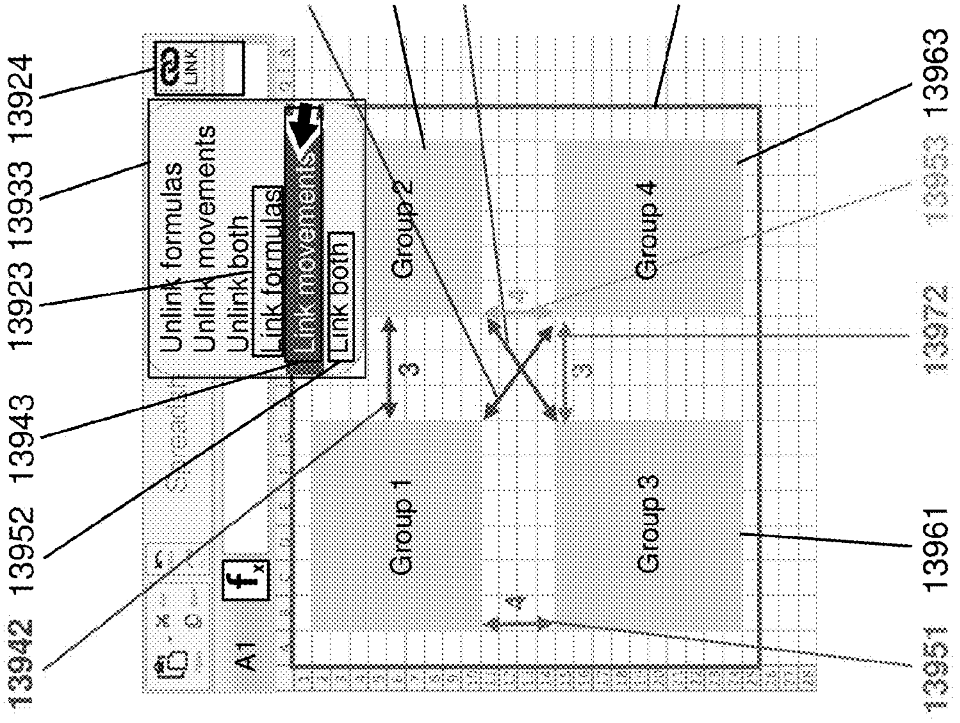

FIGS. 139A, 139B, and 139C examples the simultaneous application of movement linkages to four groups (which have no pre-existing across group linkages) at one time in our technology and then their flexing response in two different situations.

Figure 140B:
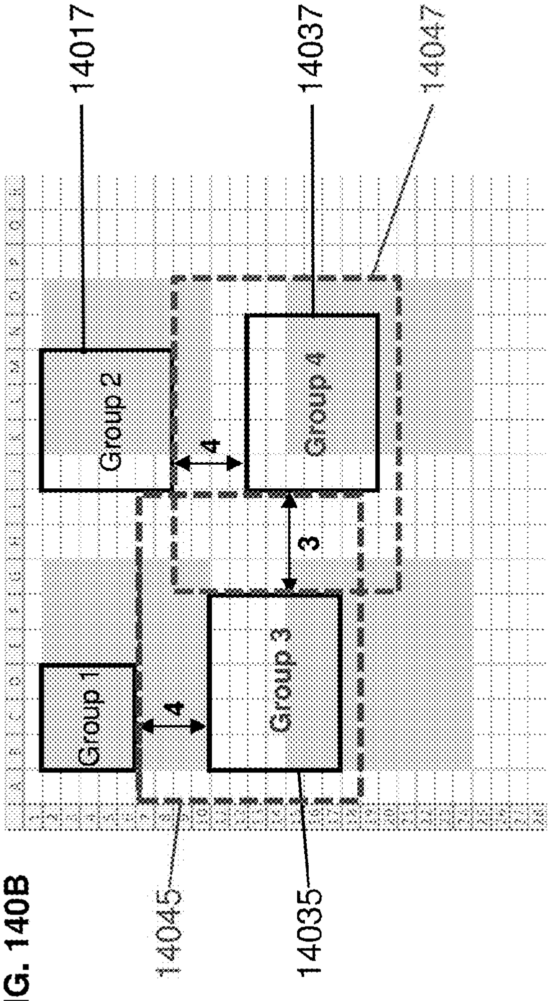
Figure 140C:
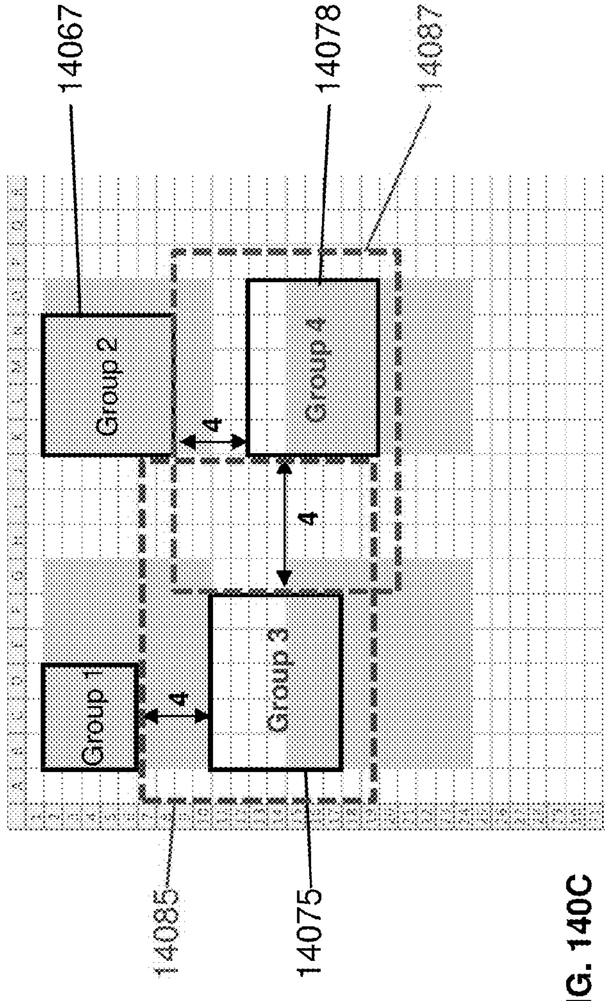
Figure 140A:
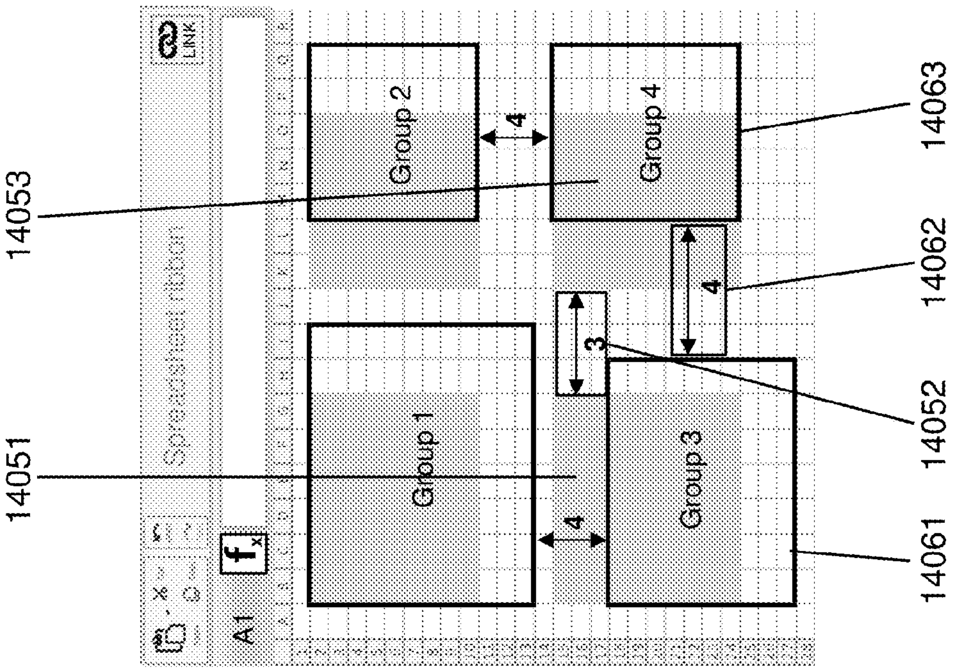
Figure 141B:
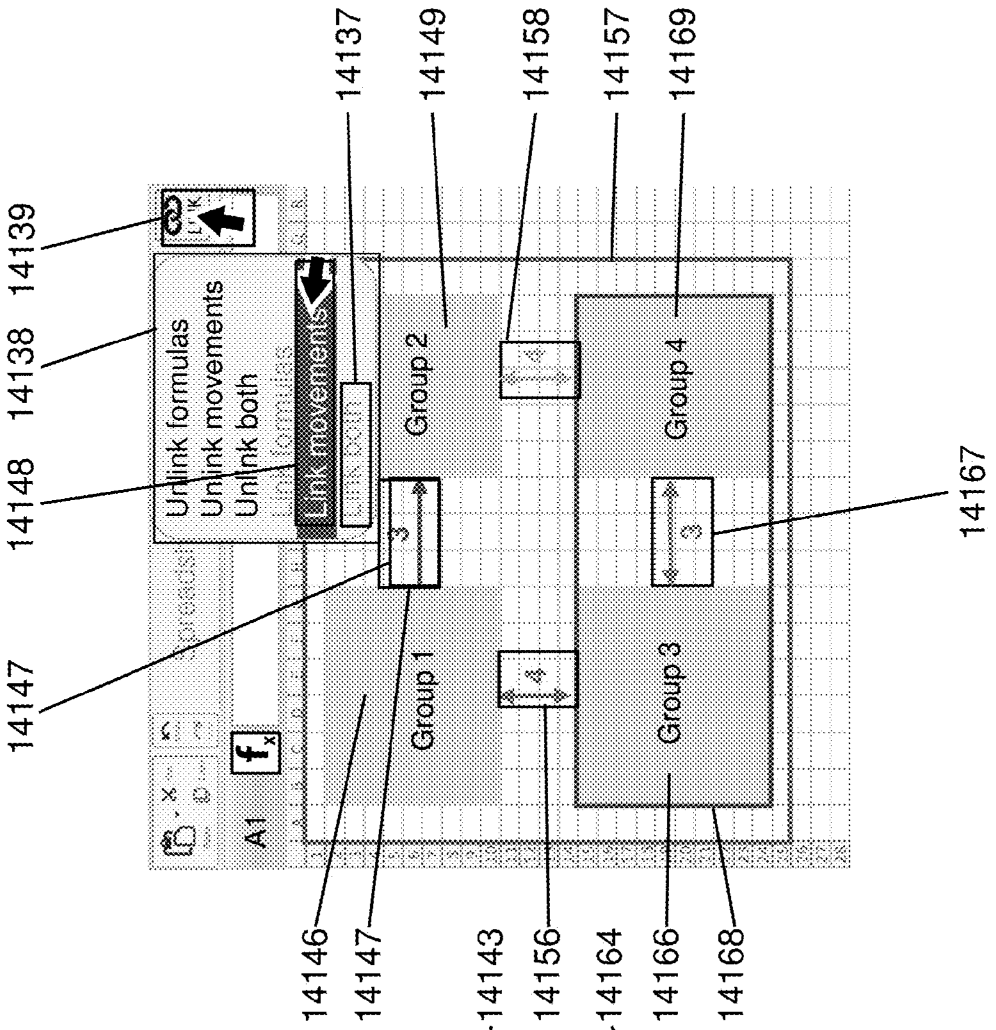
Figure 141A:
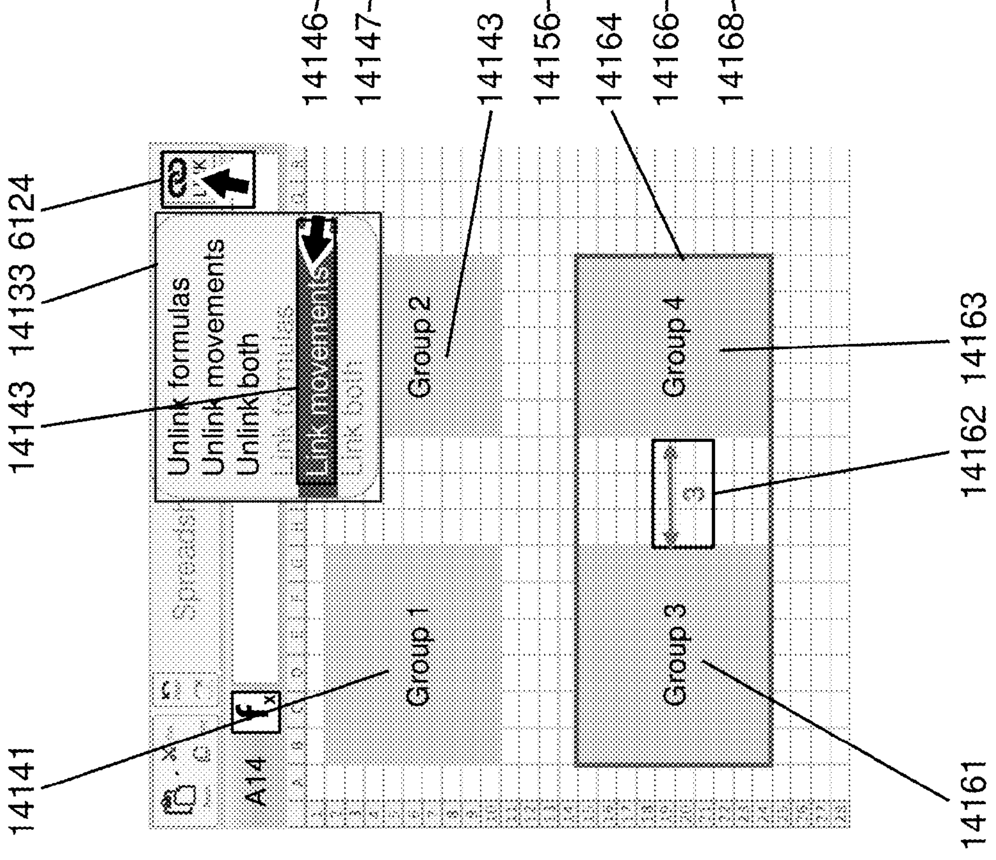

FIGS. 140A, 140B, and 140C example the post-flex difference between using the originally set "bumper" distances between groups versus using a resize after a previous flex set "bumper" distance.

FIGS. 141A, 141B, 142A, and 142B examples how successive group linkage setups can alter the automatic positional linked/connected movement upon flexing.

FIG. 143 examples an automatic movement linkage/connection setup tie breaking ruleset.

FIG. 144 examples prebuilt spreadsheet range and array functions supported by our formula linkage/connection technology.

Figure 145B:
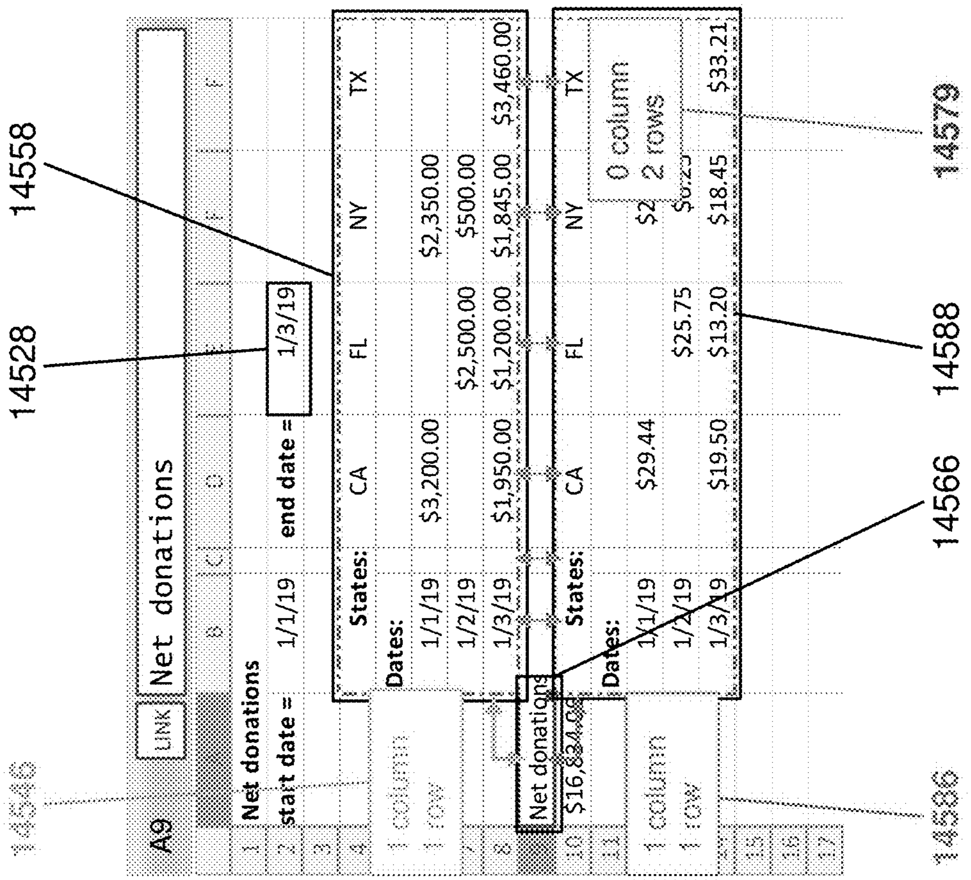
Figure 145A:
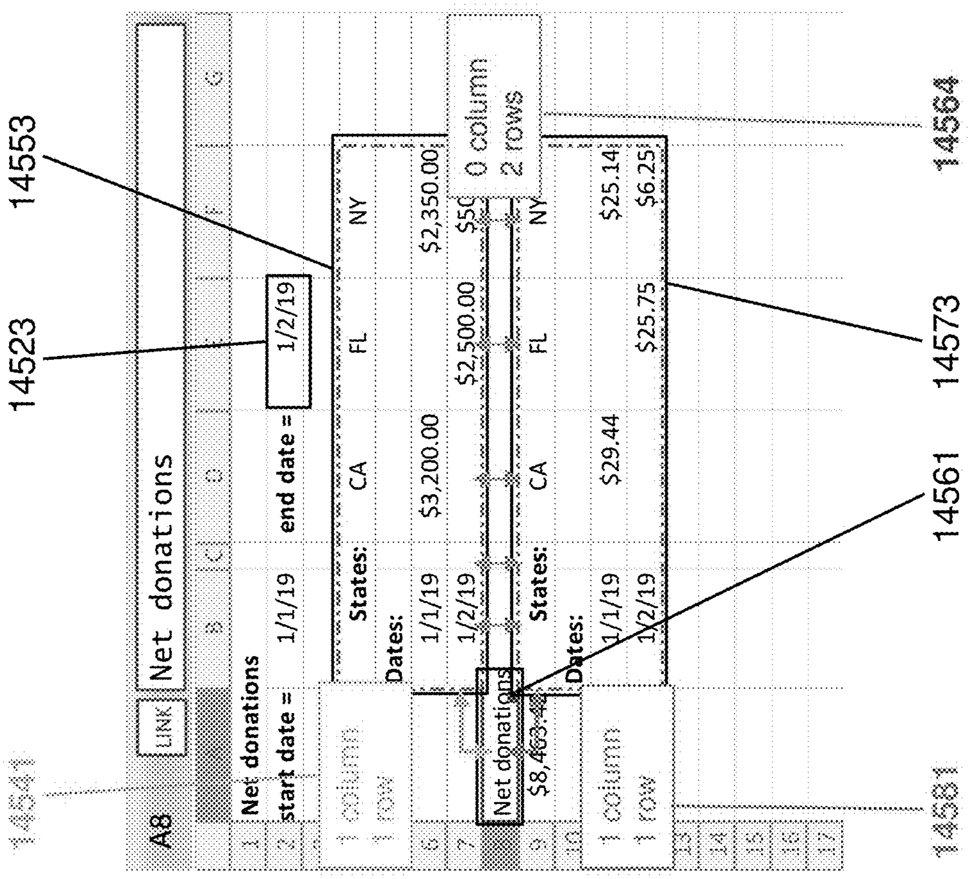

FIGS. 145A and 145B examples the combined movement and formula linkage of two different flex areas and a relocatable cell nearby but not in the flex expansion or shrinkage paths retaining post-flex the pre-flex row and column relative spatial relationships between both flexes and between both flexes and the relocatable cell.

Figure 146A:
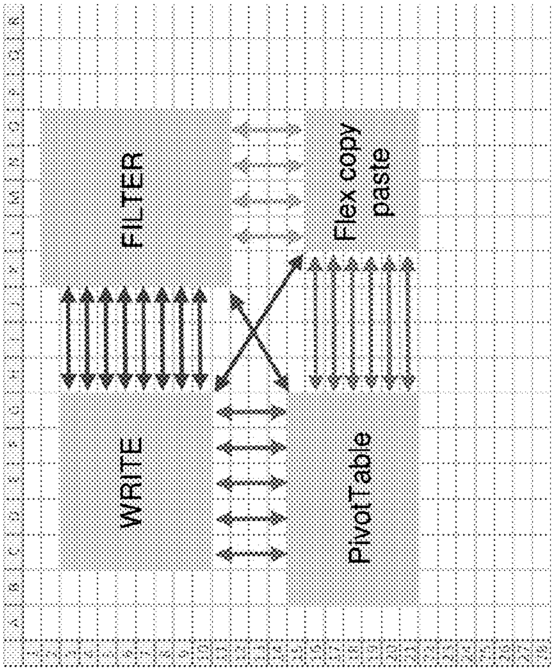
Figure 146B:
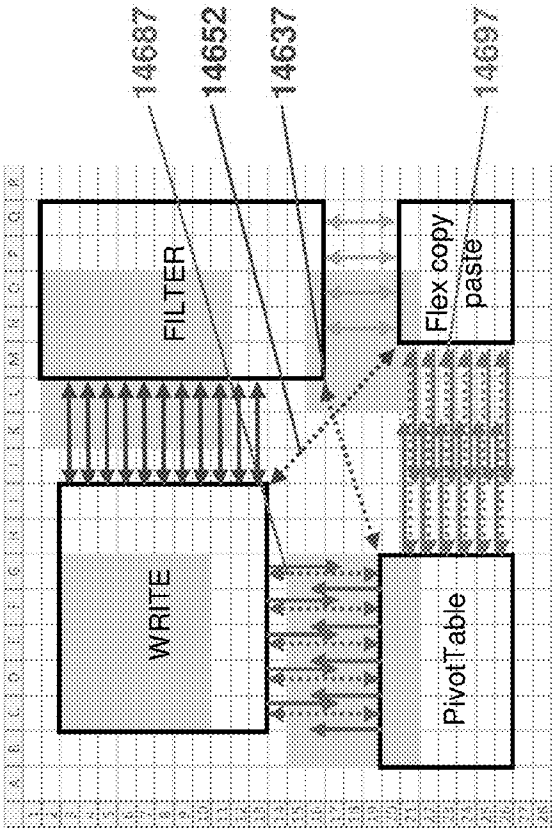
Figure 146C:
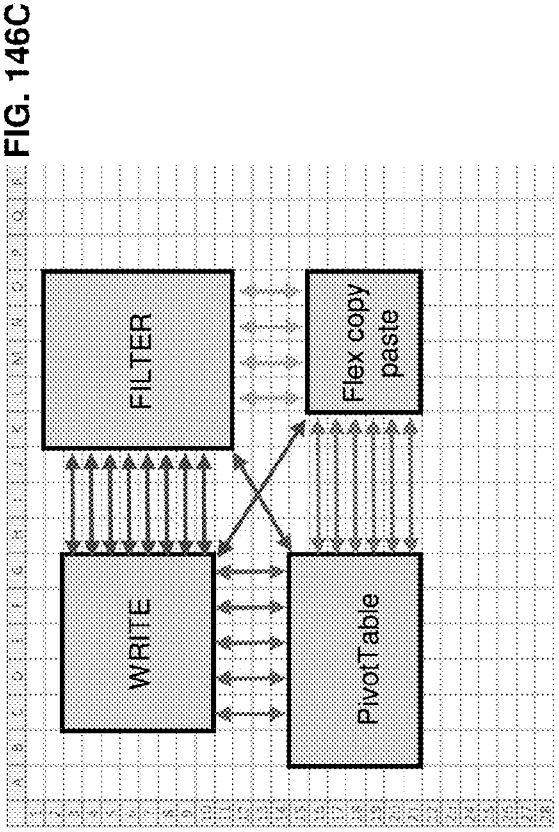

FIGS. 146A, 146B, and 146C examples our closest relative spatial distances technology using the closest relative spatial distances when the linkage/connection was setup (not changing with flexes).

Figure 146D:
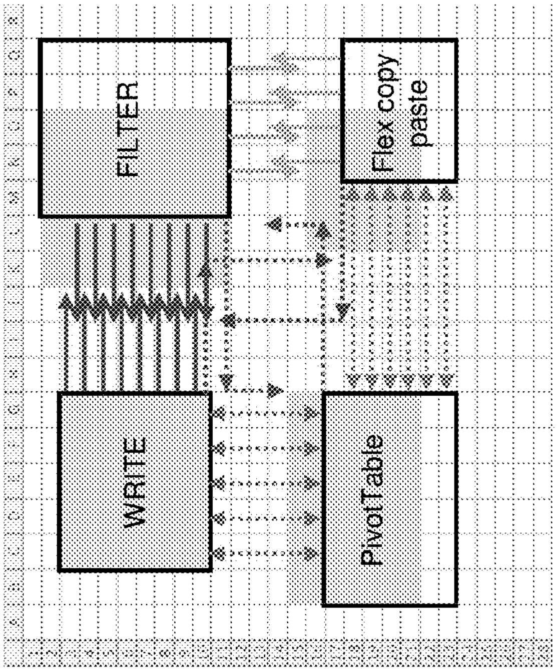

FIGS. 146A, 146B, and 146D examples our closest relative spatial distances technology using the most recent closest relative spatial distances (changing with flexes).

Figure 147:
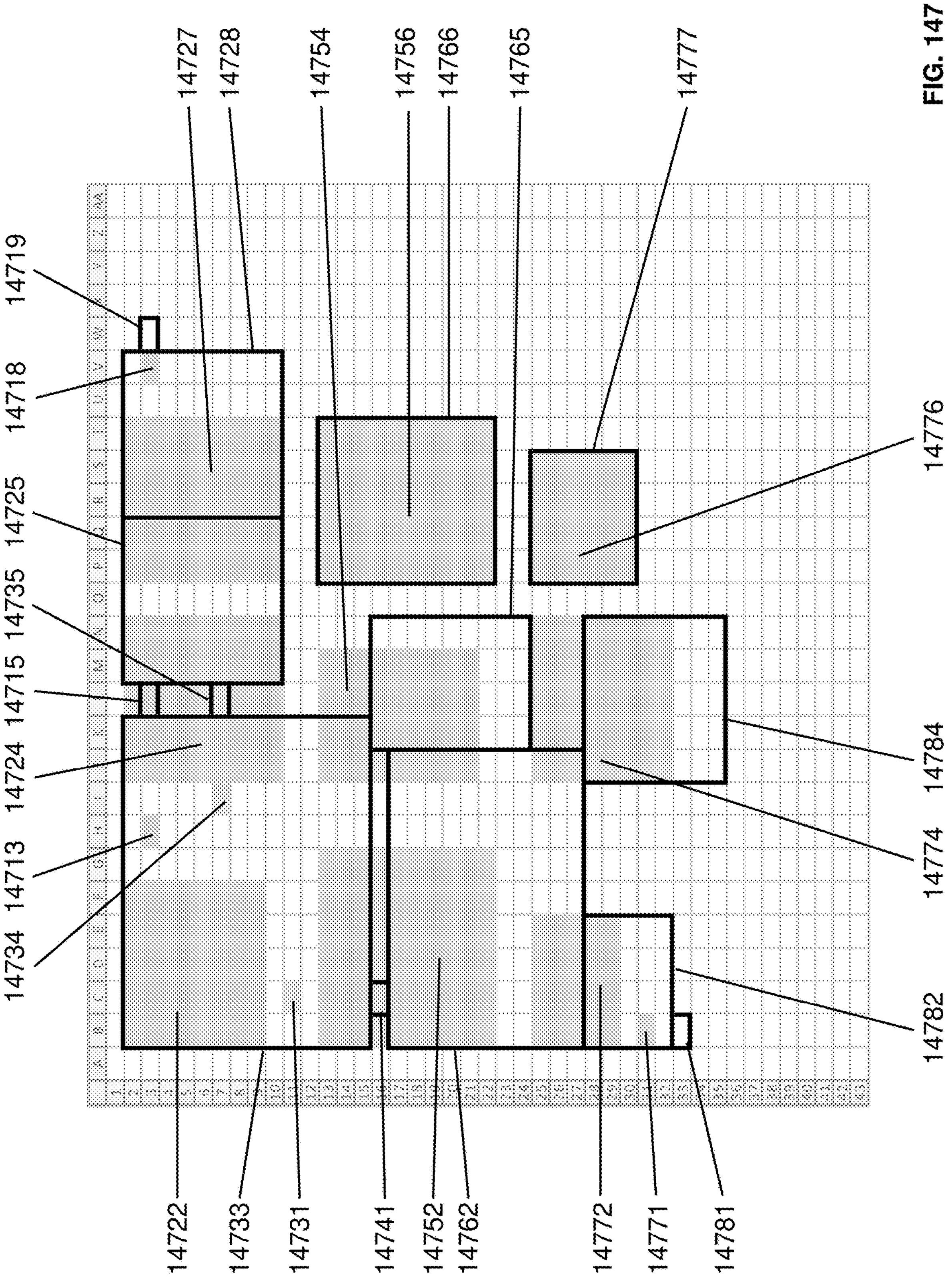

FIG. 147 examples a movement linked/connected embodiment where the flex displaces with no cell cushion any overlapping areas with a down and then across ordered progression for a combination of cells and flex ranges undergoing two flex range flexes.

Figure 148A:
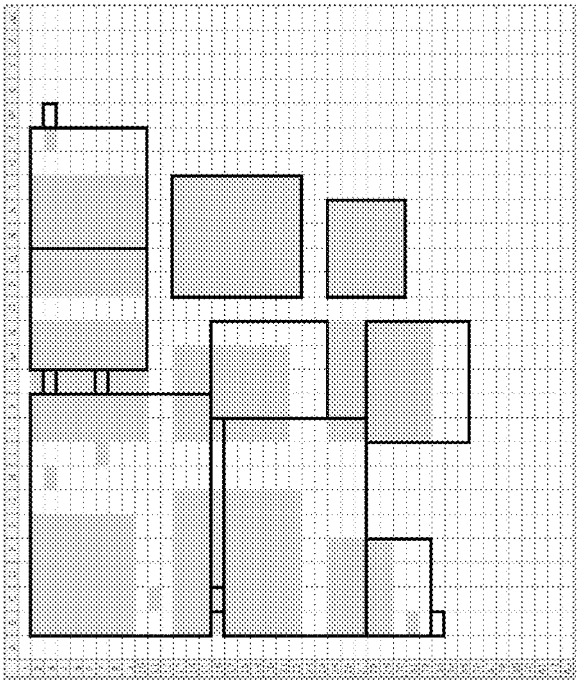
Figure 148B:
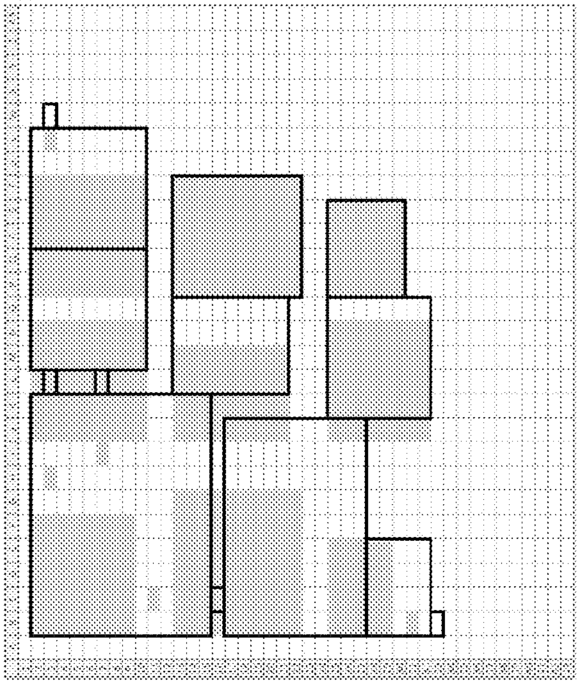

FIGS. 148A and 148B examples the side-by-side the impact of the down then across (FIG. 148A) and across then down (FIG. 148A) ordered displacement progressions for multiple flexes of areas including cells and flex ranges.

Figure 148C:
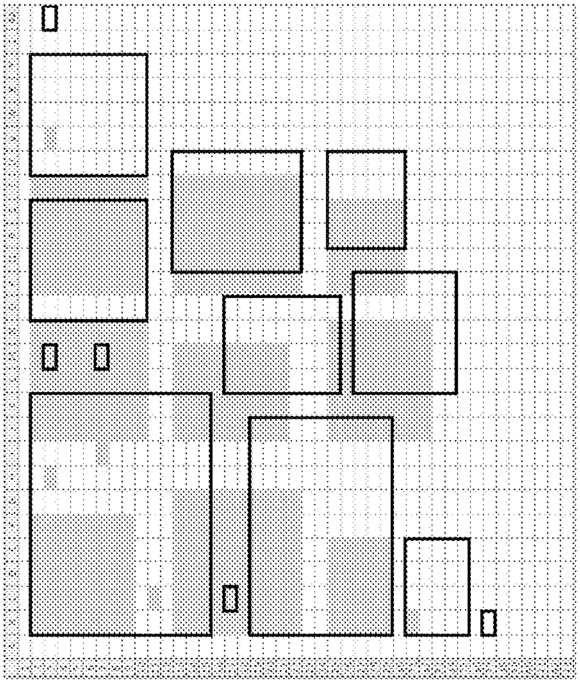
Figure 148D:
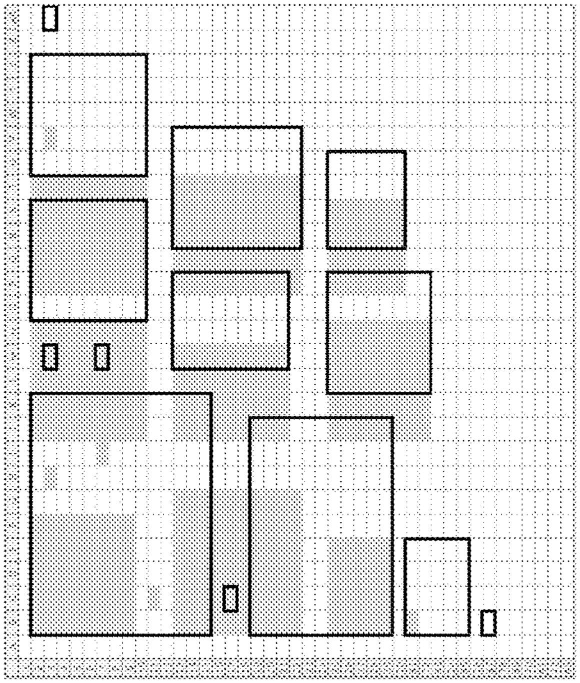

FIGS. 148C and 148D examples the impact of different displacement progression orders showing different outcomes from the same flex for the down then across progression in FIG. 148C and across then down progression in FIG. 148D for multiple simultaneous flexes for linked cells and flex ranges all with a one cell displacement cushion.

FIG. 149 depicts an example computer system that can be used to implement aspects of the technology disclosed.

DETAILED DESCRIPTION

The following detailed description is made with reference to the figures. Example implementations are described to illustrate the technology disclosed, not to limit its scope, which is defined by the claims. Those of ordinary skill in the art will recognize a variety of equivalent variations on the description that follows.

When spreadsheet applications were first created, they electronically emulated tabular paper spreadsheets. More recently, Microsoft Excel, Google Sheets, Apple Numbers, and others have dramatically increased the breadth of capabilities and usefulness of spreadsheets. Our spreadsheet technologies have increased the ability for users to easily created standalone or related analytics which flex their outputs based on user parameter inputs (e.g., a constraint/filter input into a WRITE_CALC_2D function). However flexing analytics can result in outputs overlapping with related or standalone cell content in the same worksheet requiring work by users to remove the overlap. Flexing analytics can also create problems with analyses employing all or part of the flexing range in related calculations, again requiring user work to alter the formulas proactively or reactively to account for the flex changes. Our disclosed technology eliminates that user corrective work by appropriately linking/connecting the flexing formulas and/or spatial relationships so that the changes are automatically propagated to linked cells. This coordinated linking/connecting capability is not available in any of the existing spreadsheets, as we will example next for the leading spreadsheets Microsoft Excel and Google Sheets.

Existing Spreadsheet Capabilities

First, we will example what we call flexing functions and capabilities and what is not. Not all cell movement is what we call flexing. Our flexing definition for purposes of this technology is a prebuilt function (e.g., FILTER) or capability (e.g., PivotTable) where a user has set up a formula or capability that changes (flexes) its range of cells it instantiates (populates) based on a user parameter input. That eliminates operations like insert or delete that move existing content without any later input driven ability to change (flex) the number of instantiated cells.

FIG. 1A through FIG. 1D examples prior art of insert and delete driven movement in a spreadsheet. The user does not setup a function or capability that instantiates values into cells but instead they only highlight cells (133 in FIG. 1A and 182 in FIG. 1C) they want to insert or remove (delete), click the operation ('Insert' 114 in FIG. 1A and 'Delete' 164 in FIG. 1C) and then see the resulting change in movement of other cells (as exampled by the cells 147 in FIG. 1B versus 143 in FIG. 1A, and 187 in FIG. 1D versus 184 in FIG. 1C). The movement is the result of inserting (138 in FIG. 1B) or deleting (182 in FIG. 1C) cells not flexing content of a function or capability.

Flexing is exampled by the spreadsheet function 'FILTER' which once setup instantiates a flexible range of cells based on formulaic (parameter) input. The example is done in a Microsoft Excel spreadsheet and works similarly in the other spreadsheets (e.g., Google Sheets). FIG. 2A and FIG. 2B examples one such 'FILTER' formula instantiating (populating) values from the cell range 272 based on the filter value in cell 'G1' 245. The 'G1' value of '0' 245 gives an output of eighteen cells 264 in FIG. 2A while the 'G1' value of '0.505' 249 gives an output of twenty-seven cells 278 in FIG. 2B. That change in number and values of the populated (instantiated) cells is an example of what we are calling flexing. In this example the user, a cancer researcher, has further added an average calculation of the 'Average=' in cell 'G12' (285 in FIG. 2A and 289 in FIG. 2B) for all the values meeting the filter value 'wt change=' in cell 'G1' (245 in FIG. 2A and 249 in FIG. 2B). What the researcher wanted was the average for the entire data set meeting the filter criteria. Specifically, a segment (265 in FIG. 2A and 279 in FIG. 2B) of the total flexing range (264 in FIG. 2A and 278 in FIG. 2B) which contains all the values meeting the filter criteria. However, because the normal SUM formula 233 in FIG. 2A has a static range specific to the first segment 265 in FIG. 2A when the range instantiated expands as in FIG. 2B the formula 237 did not expand. Thus, rather than getting the average of all nine values in 279 they got the average of the first six values 269 and would need to correct the formula (manually after the change), write a much more complicated formula (vulnerable to errors) to get the desired adjusting outcome or set the range to encompass all the possible outcomes thereby rendering that area unusable (difficult to do if you don't know the size of the output). Ideally the user would have linked/connected the regular formula so that it automatically adjusts for changes in the flex where the formula '=AVERAGE(G2:G7)' 233 in cell 'G12' 285 in FIG. 2A would automatically become '=AVERAGE(G2:G10)' in FIG. 2B in cell 'G12' 289 not staying '=AVERAGE (G2:G7)' 237. And then it would automatically accommodate any other flex change adjusting the formula range.

FIG. 3A and FIG. 3B examples another deficiency in the current spreadsheet capabilities, specifically the inability for the flexing to automatically adjust the spatial relationship of cells in the path of the flexes. In this Microsoft Excel example, the user starts in FIG. 3A with a 'wt change' input of '0' in cell 'G1' 345 instantiating the eighteen cell values 364 from the 'FILTER' formula 333 shown for cell 'E2' 353. When the user changes the filter input 'G1' to '1' 349 in FIG. 3B the flex range overlaps the 'Average' calculation in cell 'G12' 389 causing a '# DIV/0!' error in cell 'G12' 389 and resulting in a '#SPILL!' error for the formula 337 in cell 'E2' 357. Where the user clicks the help button and sees the information that the 'Spill range isn't blank' 368 in the error popup 378. Ideally the user would have liked the average formula to adjust its range as previously described and its cell location and 'Average=' label 385 to automatically shift out of the way of the filter function instantiated (populated) cell range. There is no way to do that in Microsoft Excel, Google Sheets, or any other spreadsheet and so the user is left to do it manually after they understand the problem.

Figure 4B:
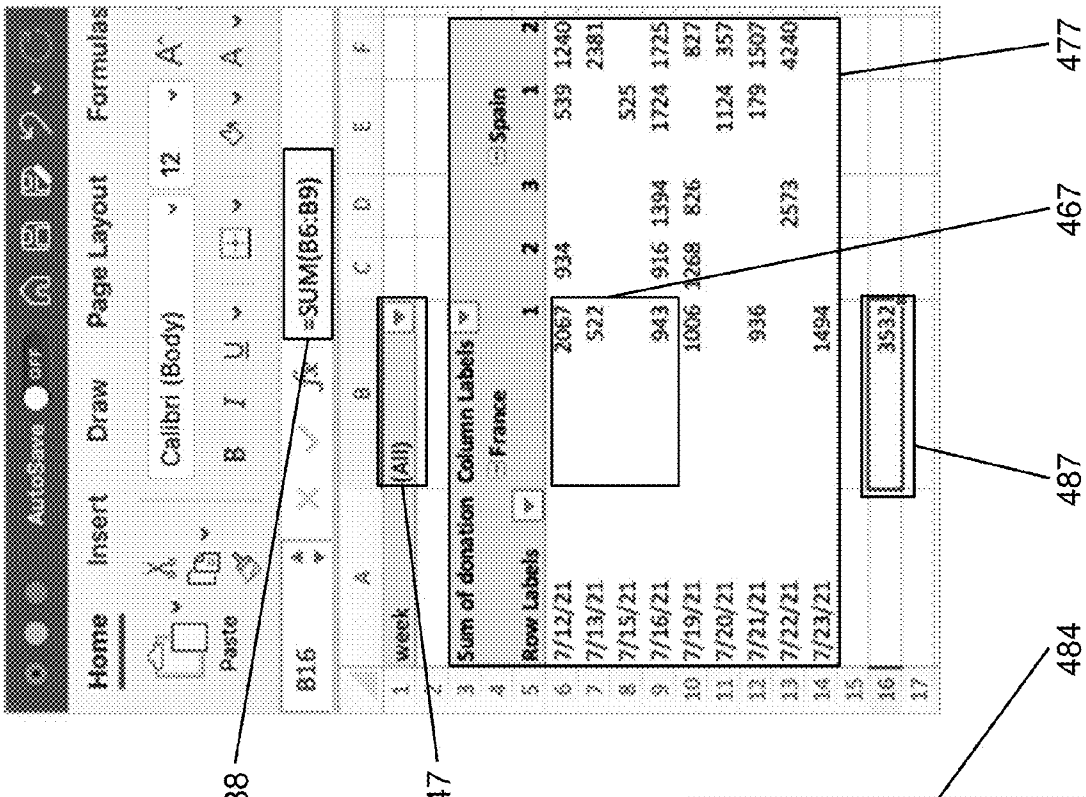
FIG. 4B Prior Art
Figure 4A:
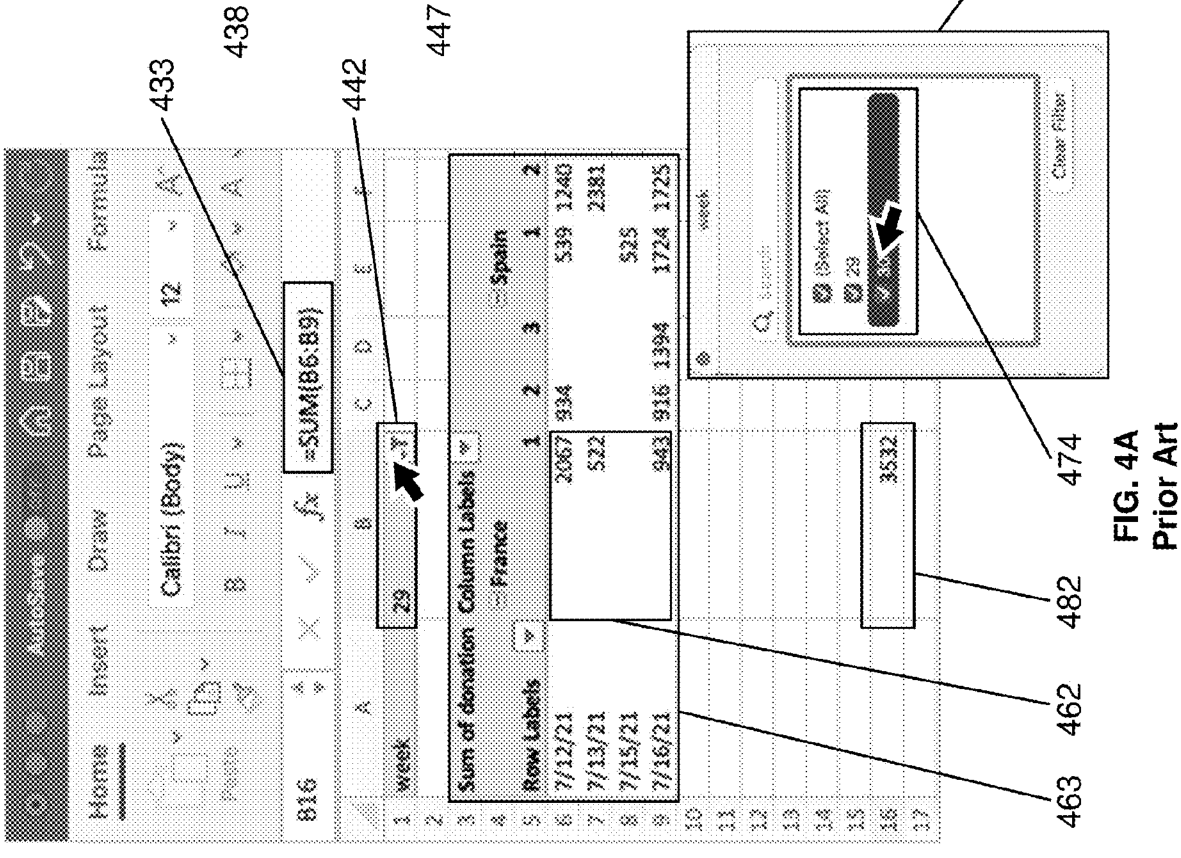
FIG. 4A Prior Art

FIG. 4A through FIG. 8B examples the lack of formulaic and spatial relationship (movement) linkage/connection abilities of Microsoft Excel and Google Sheets spreadsheet PivotTable capabilities. FIG. 4A and FIG. 4B examples a charity user who has setup a PivotTable for a small data set of two weeks of donations (the 29th and 30th weeks of the year) for two countries (France and Spain) with a total of five districts (1, 2 and 3 in France and 1 and 2 in Spain). In this example the user is using a PivotTable filter parameter 'week' (442 in FIG. 4A and 447 in FIG. 4B) to alter (flex) the cells and/or values instantiated by the PivotTable. Although the user could change one of the other PivotTable inputs to alter the cells and/or values instantiated. And like in the previously discussed FILTER function example there is no way in existing spreadsheets to link/connect a formula to a PivotTable segment or cell output for automated adjustment of the formula. In FIG. 4A the user has setup a PivotTable 463 with a 'week' filter 442 and a regular spreadsheet cell 'SUM' formula 433 of all the donations for the district '1' in 'France' in cell 'B16' 482. The user then clicks the 'week' filter (with value '29') 442 to open the filter popup 484 and adds week '30' 474 to get the new 'week' filter parameter '(All)' 447 in FIG. 4B. This flexes the PivotTable 477 in FIG. 4B by instantiating many more cells. However, the SUM formula 438 in cell 'B16' 487 has not changed (vs. 433 in FIG. 4A) as it still refers to the same four cells (467 in FIG. 4B and 462 in FIG. 4A) as its formula (438 in FIG. 4B and 433 in FIG. 4A) has not changed. With the current spreadsheet technology there is no feature to automatically link/connect the normal cell SUM formula to the change caused by the PivotTable flex, so the user automatically gets the new SUM of all the donations for the district '1' in 'France'. And, as we will later example, the manual workaround approach of adding additional functions in an attempt to make the formula dynamic creates a complicated formula which gives incorrect values in multiple different situations.

Figure 5A:
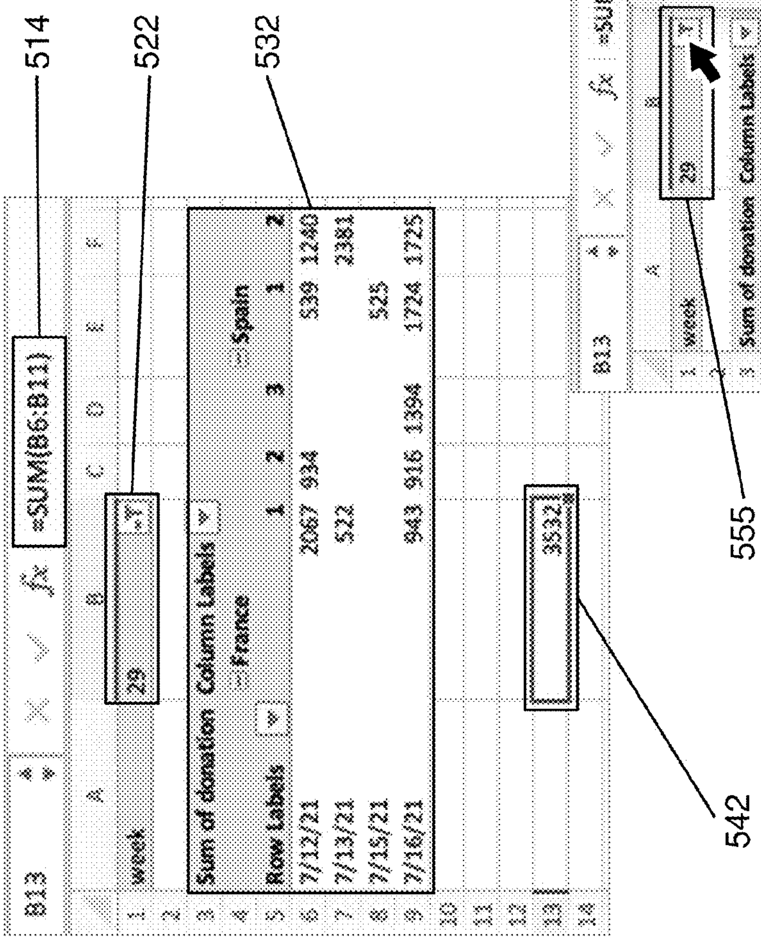
FIG. 5A Prior Art
Figure 5B:
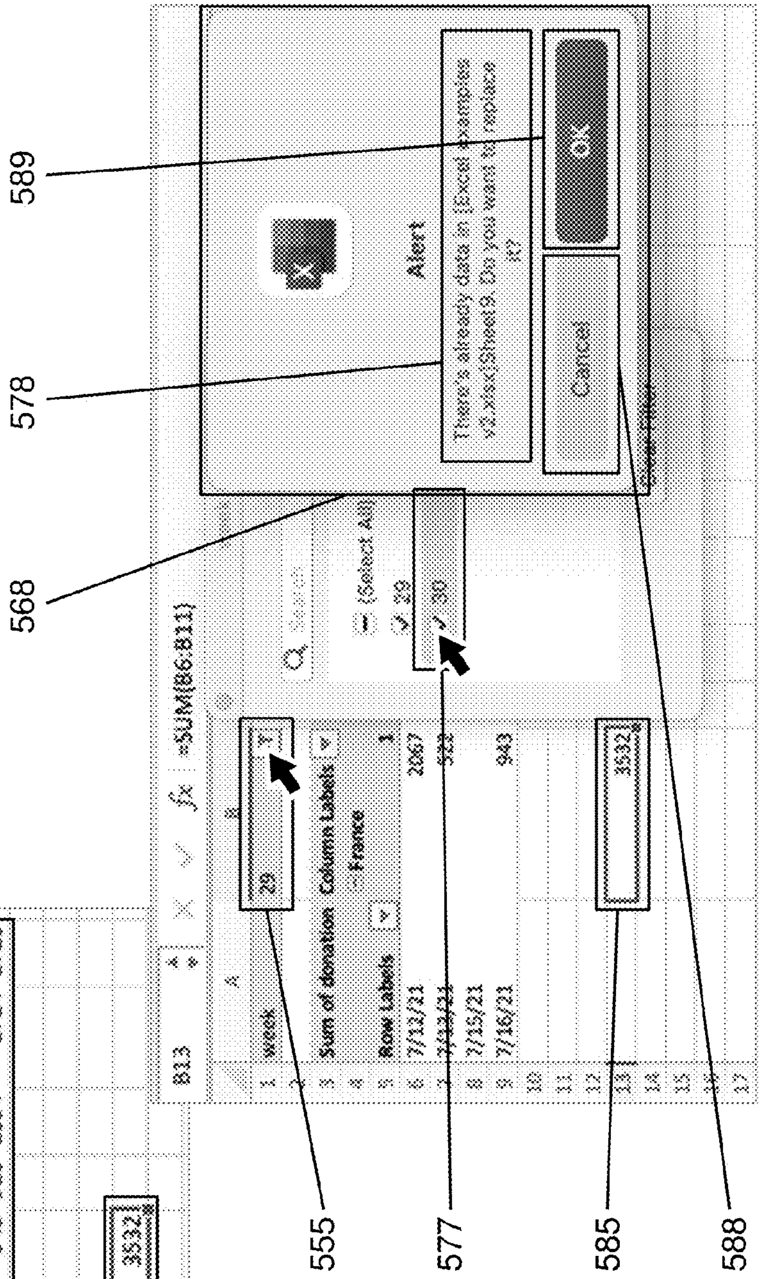
FIG. 5B Prior Art

FIG. 5A through FIG. 6B examples the current Microsoft Excel options when a PivotTable flex overlaps a cell with content. The overlap is not automatically avoided but instead the user is given the options to replace the content or not. FIG. 5A has the same PivotTable 532 as in FIG. 4A with the same 'week' filter 522 and the same regular cell SUM calculation 514 for donations in district '1' in 'France' but this time in cell 'B13' 542. So, when the user clicks the 'week' filter 555 (with value '29') in FIG. 5B and clicks (adds) '30' 577 they get the 'Alert' popup 568 informing the user that:

'There's already data in [Excel examples v2.xlsx]Sheet9. Do you want to replace it?' 578.

Thus, giving the user two options, neither of which automatically repositions the cell in question and alters its formula for the flex. FIG. 6A and FIG. 6B examples the two different outcomes. FIG. 6A examples if the user clicks the 'OK' 589 in FIG. 5B thereby replacing the SUM formula that was in cell 'B13' with content from the PivotTable 662. In this example that content is blank in cell 'B13' as shown in 662 and its formula 614 is blank with the previous regular cell SUM calculation gone and the filter has changed to '(A11)' 622. FIG. 6B examples the other outcome if the user clicks 'Cancel' 588 in FIG. 5B thereby rejecting the filter change and reverting to the 'week' filter value of '29' 657 and the unflexed PivotTable instantiation 677 retained with the regular cell SUM formula 648 and its value of '3532' in cell 'B13' 687 as they started before the attempted change. As described previously, Excel does not have a feature of the PivotTable or function doing the calculation that automatically adjusts the formula and cell positioning based on the flex of the PivotTable. So, in today's Microsoft Excel the user either loses the SUM calculation or reverts to the non-overlapping PivotTable state but has no automated setup adjusting the formula and its cell positioning for the flex change.

Figures 7A, 7B, 7C:
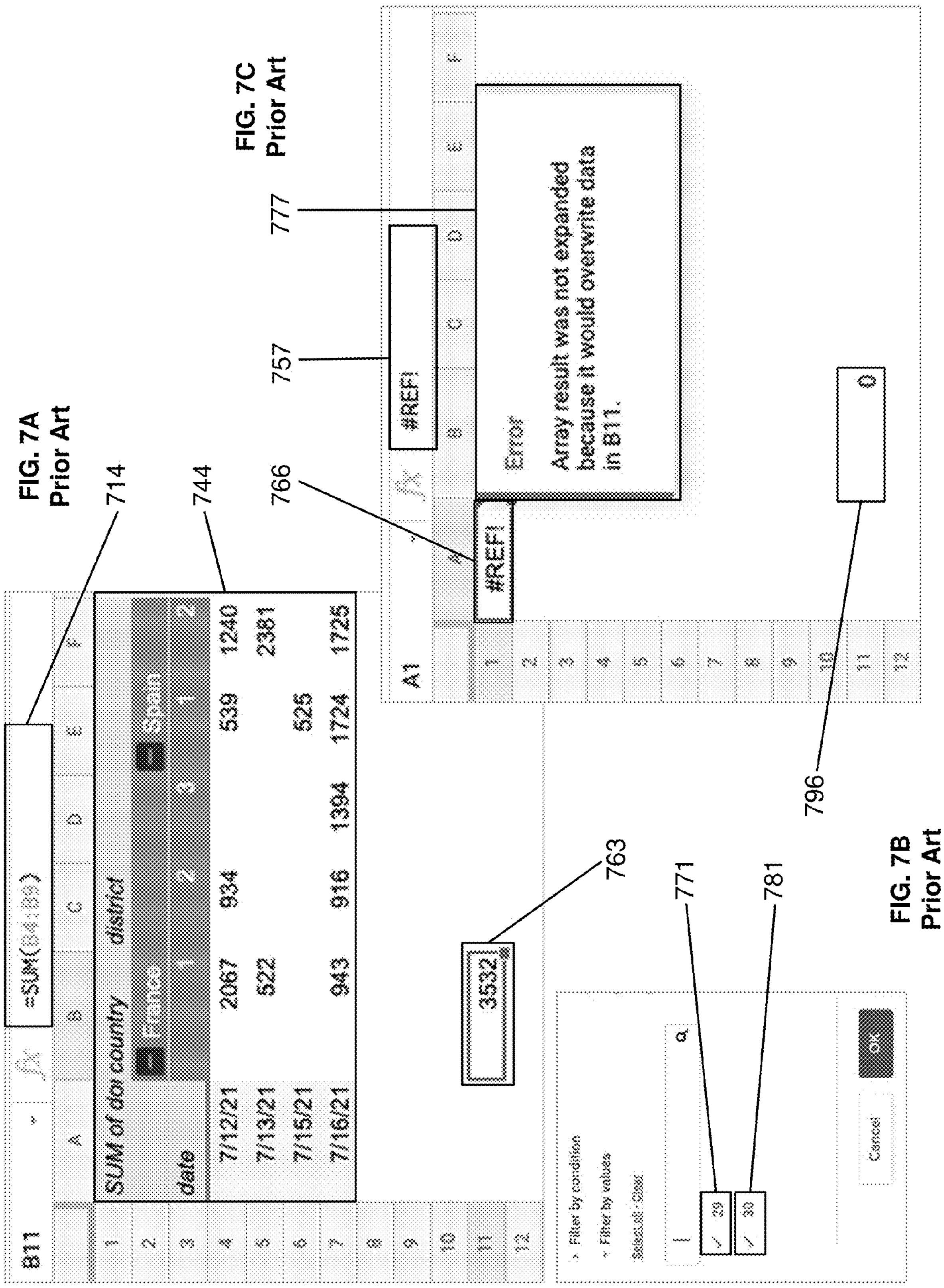
FIG. 7A Prior Art
FIG. 7B Prior Art
FIG. 7C Prior Art

FIG. 7A through FIG. 7C example the '#REF!' error that Google Sheets generates in the overwrite situation, and the lack of any linkage/connection capability in its PivotTable. In FIG. 7A the user has created a PivotTable 744 like the one (532) created in FIG. 5A. The user has also created a regular cell SUM formula 714 of the district '1' of 'France' in cell 'B11' 763. They next change the filters adding week '30' 781 to week '29' 771 as exampled in FIG. 7B. Unlike Microsoft Excel, Google Sheets does not give the user options but instead immediately generates the error value '#REF!' in cell 'A1' 766 and its formula bar formula 757 exampled in FIG. 7C. It also gives the user an 'Error' message 777 'Array result was not expanded because it would overwrite data in B11.'. And because all the cells referenced in the 'B11' SUM formula no longer have values, the value in 'B11' becomes '0' 796. Google Sheets has no PivotTable or function option allowing the user to setup a linkage/connection that would automatically eliminate the overwrite and automatically alter the regular SUM formula for the flexed values of 'France' district '1' (i.e., in this example expanding the range for the greater number of values instantiated by the flexing PivotTable).

Figure 8B:
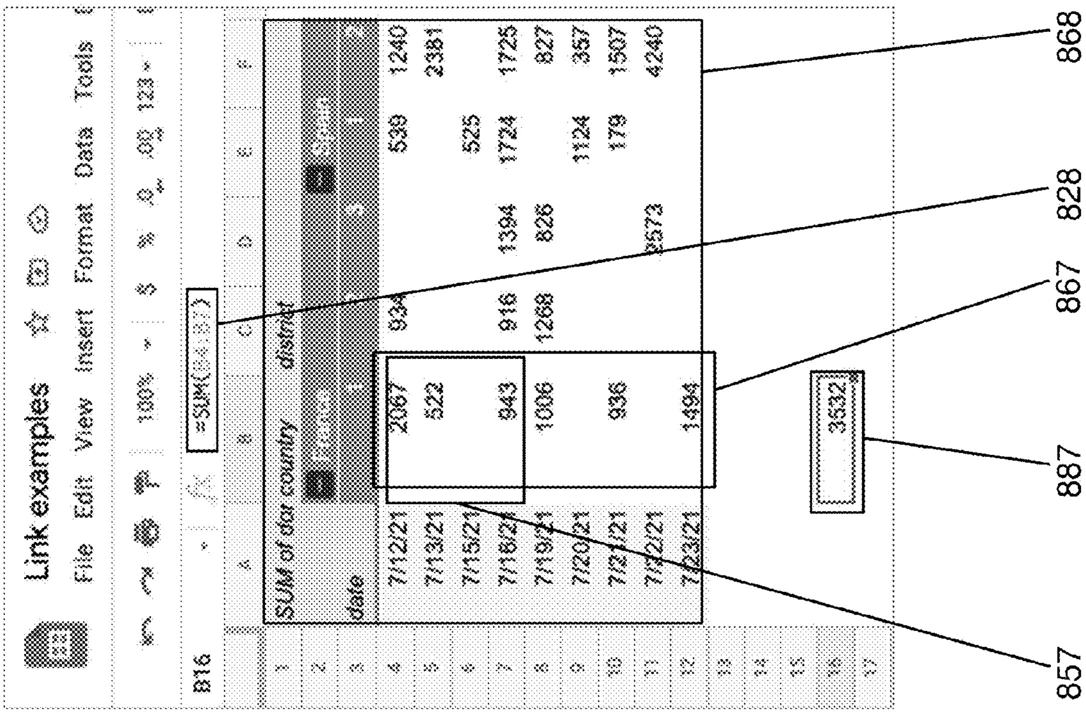
FIG. 8B Prior Art
Figure 8A:
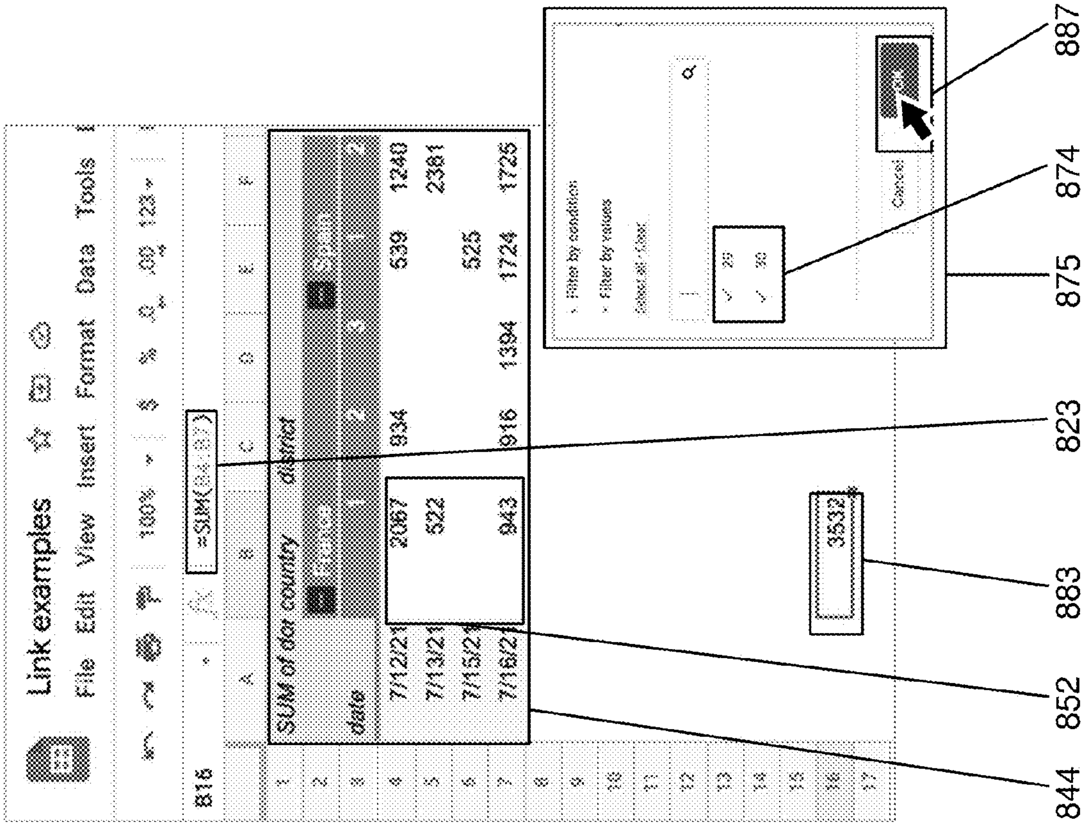
FIG. 8A Prior Art

FIG. 8A and FIG. 8B examples that there is no function or PivotTable linkage in Google Sheets that would automatically adjust a regular range or array function formula for a flex. Instead, the regular range or array function formulas referencing the flex area of the Google Sheets PivotTable are static when the PivotTable flexes. In FIG. 8A the user has the PivotTable 844 created as it was in FIG. 7A. The user has moved the regular cell SUM 763 (in FIG. 7A cell 'B11') of the district '1' of 'France' to cell 'B16' 883 outside the overlap area. They next change the filter parameters (settings) adding week '30' to week '29' 874 in the popup 875. When the use clicks 'OK' 887 the PivotTable flexes to the range 868 FIG. 8B. However, the SUM formula 828 for cell 'B16' 887 is unchanged having not expanded its range 857 (from its before range 852 in FIG. 8A) when the user would like it to instead have the full set of data for 'France' district '1' 867 as shown in FIG. 8B.

None of the existing spreadsheets have a regular range or array functions with an option or additional capability that spatially and/or formulaically creates a linkage/connection that automatically adjusts for flexing. Existing spreadsheets do have a combination of functions which when added to the formula can dynamically adjust that formula correctly for flexing in some situations. However, as we will example next, it does not work in many situations and makes the regular range function formula much more complicated to create adding multiple functions to the formula. And this approach does nothing to automatically accommodate the positional movement, for which existing spreadsheets have no automatic capability.

Existing Spreadsheet Offset and Count Formulas

Existing spreadsheet users can create dynamically adjusting formulas that work in some settings adding the OFFSET and COUNT functions to their typical range function (e.g., SUM, MIN, and MAX) formulas. However, as we will now example, those formulas become much more complicated and have multiple situations where they do not generate the desired value.

Figures 9A, 9B, 9C, 9D:
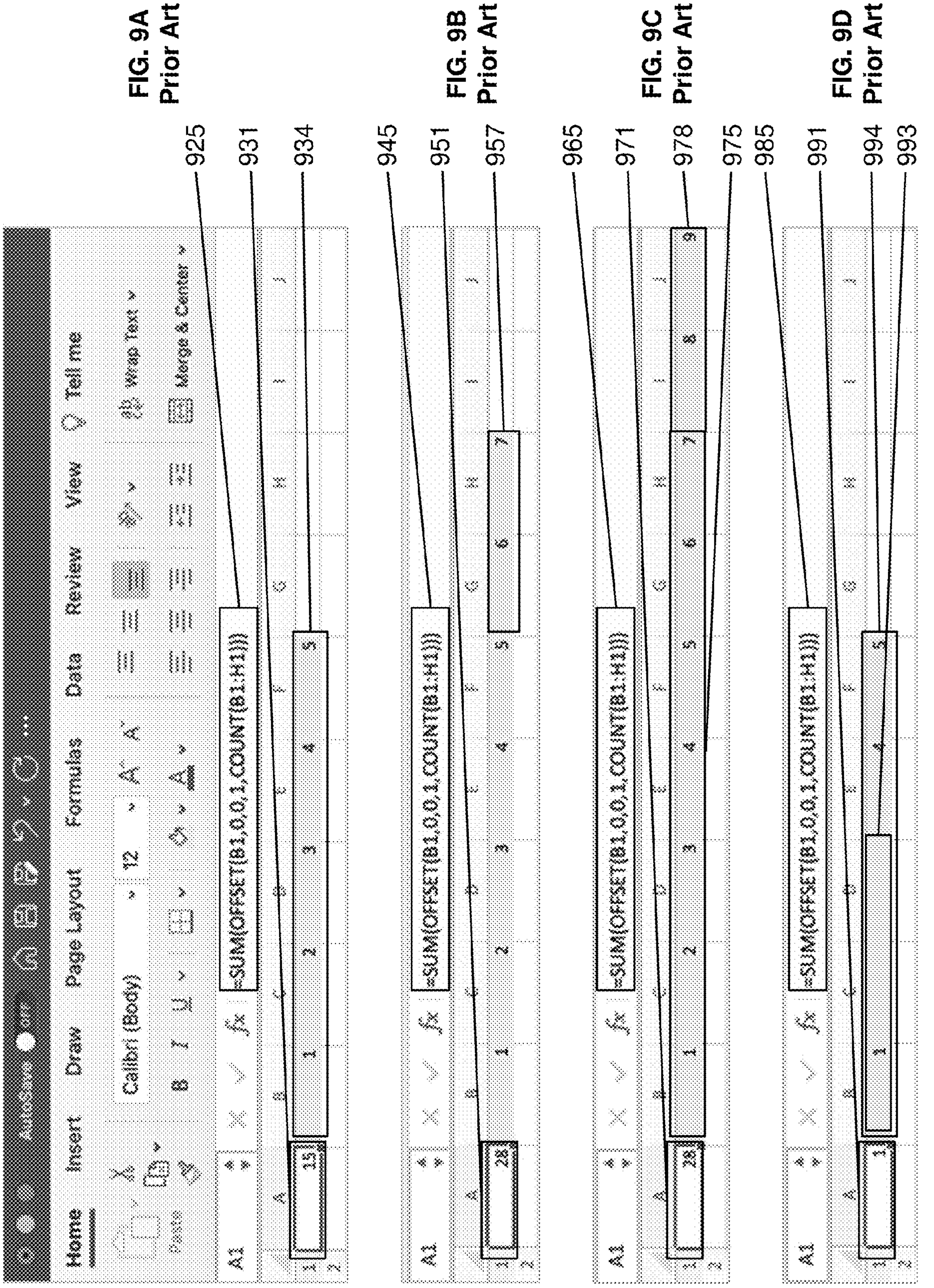
FIG. 9A Prior Art
FIG. 9B Prior Art
FIG. 9C Prior Art
FIG. 9D Prior Art

FIG. 9A through FIG. 9D example deficiencies (i.e., multiple added functions, range limitations and blank value handling problems) in the current spreadsheets approaches to formulaic linkage/connection. In FIG. 9A the user has modified a very simple SUM function formula in an attempt to make it dynamic. The SUM formula which otherwise would be '=SUM(B1:F1)' becomes:

'=SUM(OFFSET(*B*1,0,0,1,COUNT(*B*1:*H*1)))' 925

A substantially more complicated formula which then does correctly generate the desired flex value '28' 951 when two additional flex values are added 957 in FIG. 9B. However, when two additional flex values are added 978 in FIG. 9C the desired flex value of '45' (28+8+9) is not generated in cell 'A1' 971. Instead, it generates the value of '28' 971 because the formula 965 has extended beyond the COUNT range 'B1:H1' 975 and so the formula does not capture the desired full value. The formula is not truly dynamic because the user must put a fixed COUNT range beyond which the formula is no longer dynamic. Thus, exampling one major deficiency of this more complicated formulaic approach.

FIG. 9D examples another deficiency which is this approach does not correctly work if any of the values are blank or null because the COUNT in the formula 985 does not count them and then incorrectly sets the range for the function. In this example that "SUM' range 993 is two cells short of the desired range 994 thus generating an incorrect value of '1' 991 in cell 'A1', where the desired 'SUM' value is 10 (1+4+5).

Figure 10A:
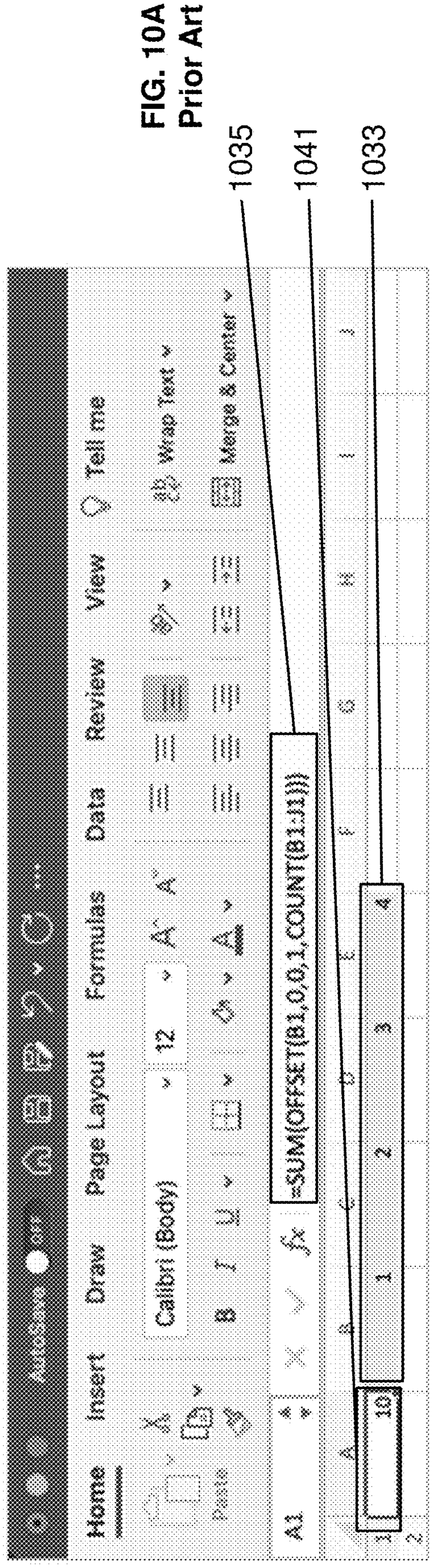
FIG. 10A Prior Art
Figure 10B:
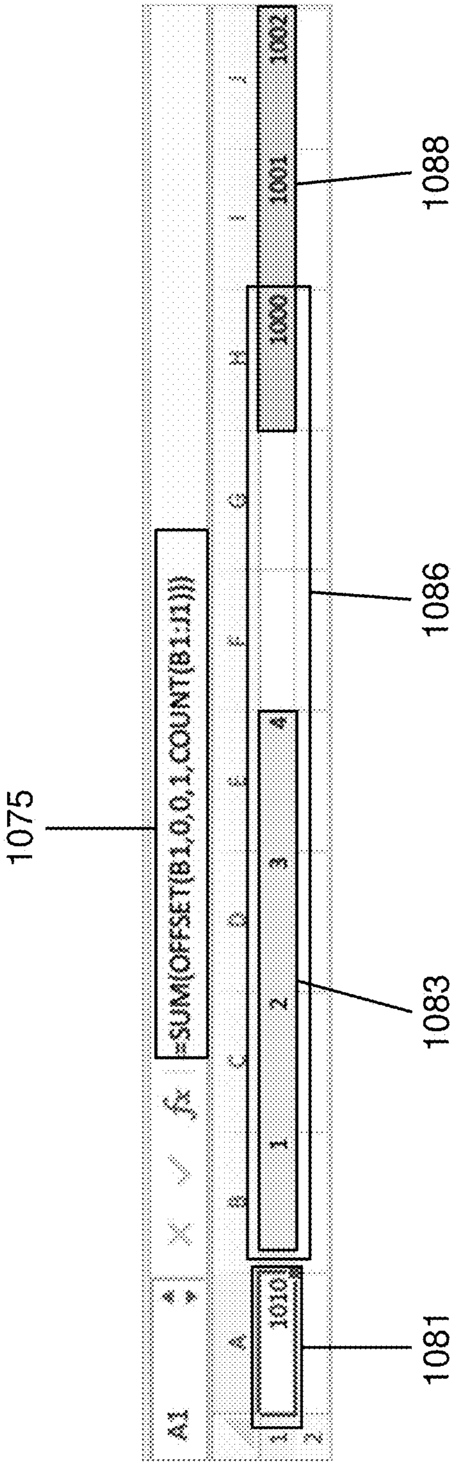
FIG. 10B Prior Art

FIG. 10A and FIG. 10B example an additional problem of range overextension with the OFFSET and COUNT approach of current spreadsheets formula linkages/connections. If the user tries to avoid the undershooting the COUNT range problem exampled in FIG. 9C by setting a much larger range, they open themselves up to an additional problem of something being populated in that range that causes their formula to overextend the range. If that occurs, as exampled in FIG. 10B, it can result in the range area larger than desired because the COUNT gives a value larger than desired. This is because the other values in the formula range 1088 in FIG. 10B are counted and extend the SUM range 1086 beyond the desired range of 1083 shown in FIG. 10A. The correct range 1033 generates the desired value in cell 'A1' of '10' (1+2+3+4=10) for the formula 1035 as shown in FIG. 10A. Whereas that current formula 1075 generates an incorrect value of '1010' (1+2+3+4+1000=1010) from the range 1086 in FIG. 10B. So current spreadsheet users need to worry about underextending and overextending the ranges in the COUNTs they need to add to their formulas.

Figure 11A:
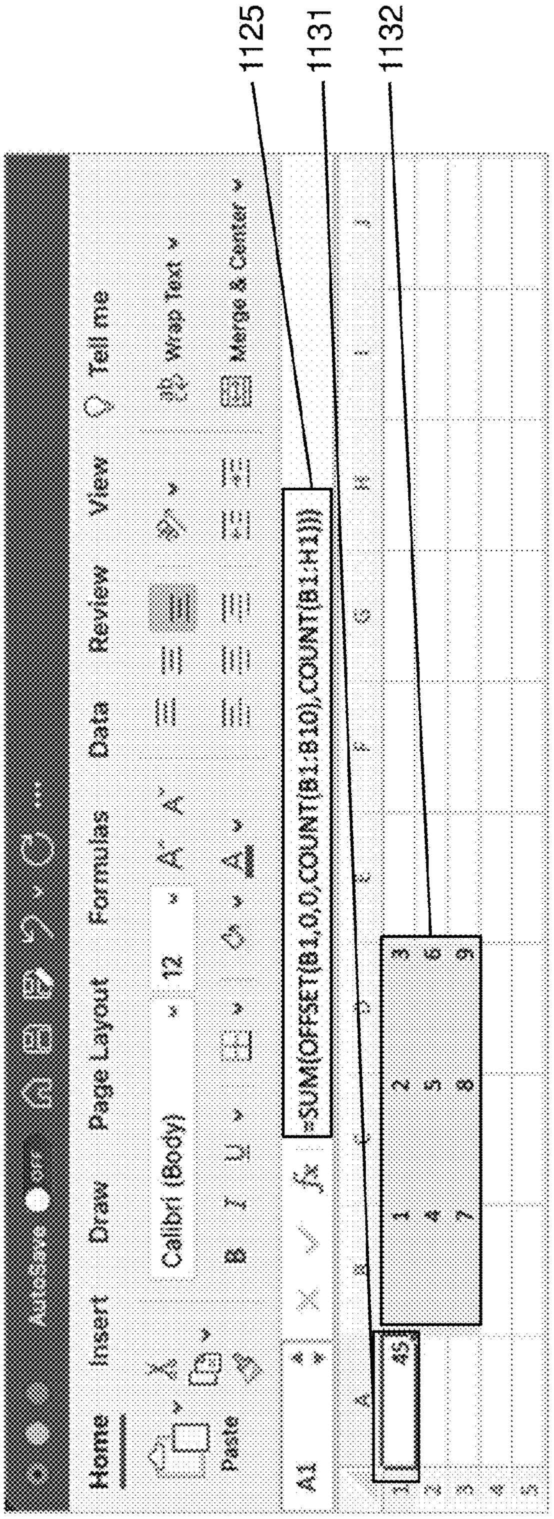
FIG. 11A Prior Art

FIG. 11A through FIG. 12B example the greater complexity and additional errors in current spreadsheets of linking/connecting functions to two-dimensionally flexing functions or capabilities. These examples use Microsoft Excel although other spreadsheets give the same outcome (e.g., Google Sheets). The complexity of the formulas is increased because of the need to use an OFFSET function with two additional arguments and the need to use multiple COUNT functions. FIG. 11A examples the difference between the simple '=SUM(B1:D3)' formula that instead turns into:

'=SUM(OFFSET(*B*1,0,0,COUNT(*B*1:*B*10),COUNT(*B*1:*H*1)))' 1125

Where the user has to get all the arguments correct to set up the dynamic formula linkage, but then is not guaranteed a correct answer due to the two-dimensional range and/or blank cell error causing problems (which is particularly prevalent in PivotTables or WRITE_CALC_2D flexing outputs which very frequently have blanks or nulls).

Figure 11B:
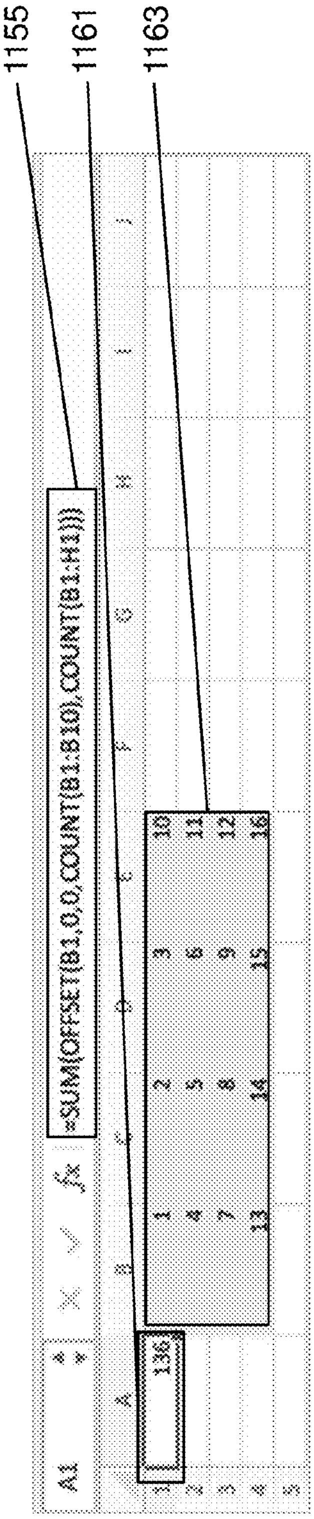
FIG. 11B Prior Art
Figure 11C:
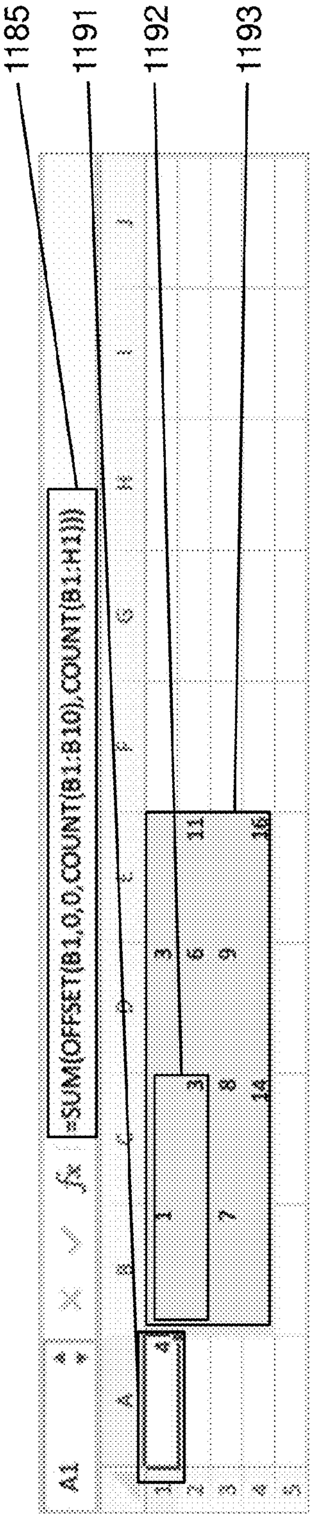
FIG. 11C Prior Art

FIG. 11B examples a successful flex calculation by the 'SUM' formula 1155 in cell 'A1' 1161 summing the range 1163. However, FIG. 11C examples an unsuccessful flex calculation by the same 'SUM' formula 1185 in cell 'A1' 1191 because the range of values 1193 (same size range as 1163 in FIG. 11B) contains blanks and therefore calculates the 'SUM' for the four-cell range 1192 rather than the desired sixteen-cell range 1193.

Figure 12A:
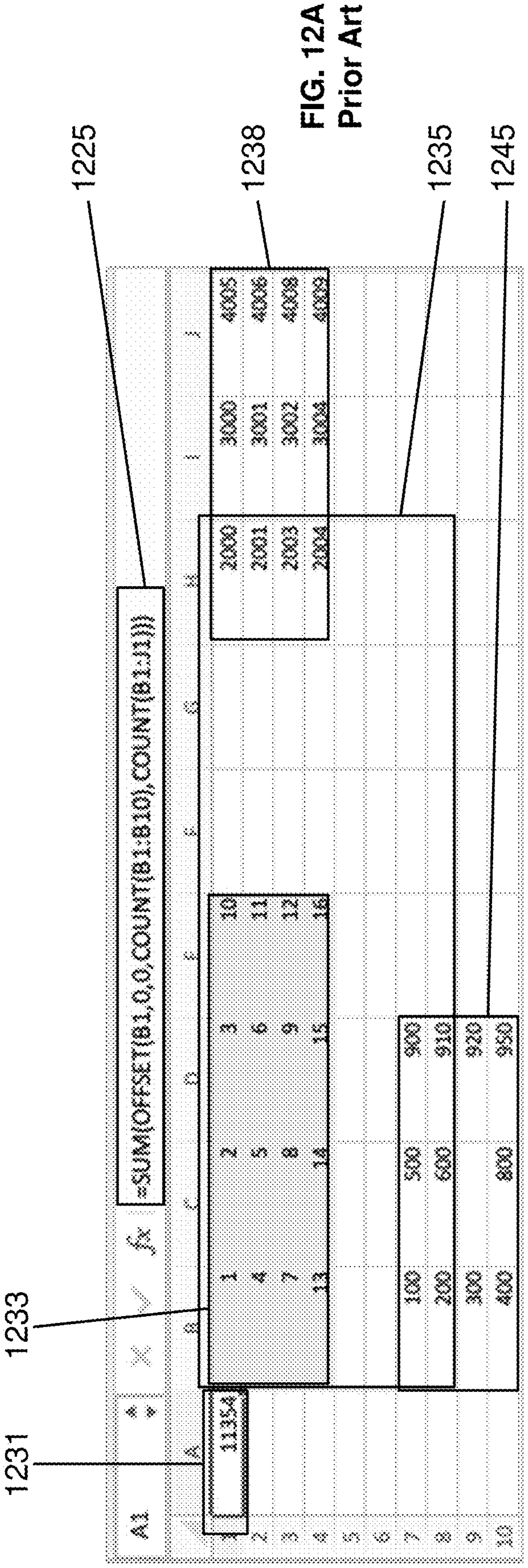
FIG. 12A Prior Art
Figure 12B:
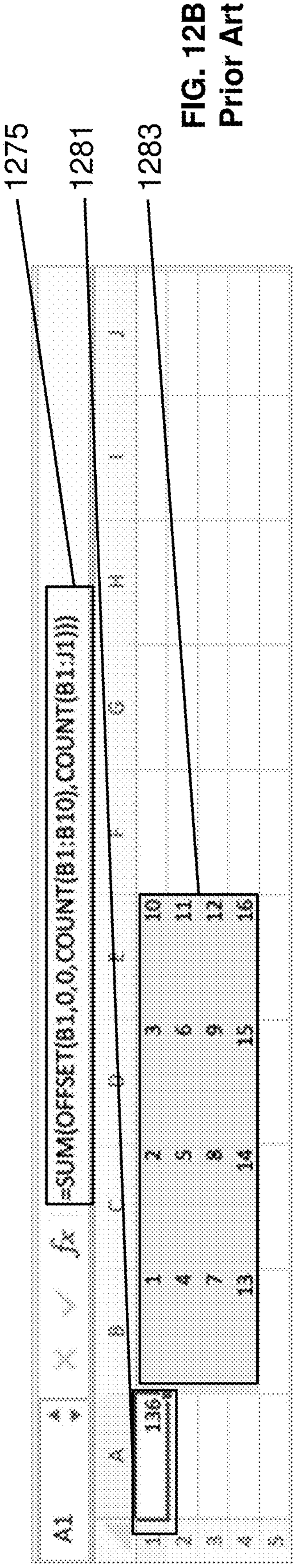
FIG. 12B Prior Art

FIG. 12A and FIG. 12B example the unsuccessful (FIG. 12A) and successful workings of the same combination SUM, OFFSET, COUNT and COUNT formula (1225 in FIG. 12A and 1275 in FIG. 12B). This is the two-dimensional problem of overextending the ranges on both vertical and horizontal dimensions. FIG. 12A examples the error problem driven by other values (1238 and 1245) in the two-dimensional 'COUNT' ranges causing the 'SUM' calculation to use the wrong range 1235 (rather than the correct range 1233). Therefore, getting the incorrect value '11354' in cell 'A1' 1231 in FIG. 12A (rather than the correct value of '136' as exampled in cell 'A1' 1281 in FIG. 12B). The two-dimensional formulas also have to be concerned with underextending each of the two-dimensions. The net result is the user has to worry about many more dimensions when writing these much more complicated formulas and if they get the formula right (right argument inputs, no overextension, no under extension) still does not get an answer they are sure is correct (because of the blank problems).

As we have exampled in FIG. 9A through FIG. 12B there is no 100% reliable way of flex linking/connecting a range formula in an existing spreadsheet. The current spreadsheet formula linkage makes any range function formula dramatically more complicated (adding multiple different functions into the formula) and works some of the time but not all the time. They are not truly dynamic because they have under and over extension limitations. While a particularly talented user may be able to create some form of additional terms using additional functions and the spreadsheet programming language (e.g., VBA for Microsoft Excel), this will then be well beyond the capabilities of a typical user and end up with a formula that looks nothing like the original range function formula, e.g., '=SUM(A1:F1)'.

We will now example our spreadsheet technology that delivers those automatic formula and movement flex adjusting capabilities without requiring the user to add additional functions and fill out additional arguments and gets the correct answer all the time. We will then further example how our technology allows users to simultaneously flex link cell formulas and cell movement without users having to use additional functions, without typing additional arguments, and have it work 100% of the time. Our technology coordinates movement and cell functional formulas for repeated flex changes driven by functions (e.g., FILTER, VLOOKUP, and WRITE) and/or capabilities (e.g., PivotTables and flex copy paste). For one set of flex changes or multiple separate or related changes. Embodiments of our technology automatically coordinate and accommodate the flex changes and support different levels of automating the application of the flex linkages/connections as we will begin to example next.

Automatic Adjustments

Embodiments of our disclosed technology automatically adjusts the location and/or formula of a cell based on its linkage/connection to range flexing functions and/or flexing capabilities. There are three different major families of our linkage/connection technology to one or more flex functions or capabilities, 1) formula only, 2) movement only, and 3) is the combination of formula and movement (both) linkage/connection. Within the movement and formula/movement families there are many different variants depending upon the type of movement linkage/connection. In situations where the movement linkage/connection is to one flex function or capability, the pre flex and post flex relative spatial positions (relative row and column spacing to the flex range) can be maintained. However, in situations where the movement linkage/connections are between multiple cell areas including more than one flex function or flex capability, then there are many situations where it is not possible to maintain all the same pre flex and post flex relative positions. Thus, our technology supports many algorithmic approaches to deciding the post flex relative positions which vary by sequencing of flexes, alignment of areas, coordination of movements and other movement differentiators. We will first example simple situations and movements and then example the more complicated embodiments of our technology.

Single Flex Linkage/Connections

To simply example our new linkage/connection technologies we will start with very simple flex capabilities and functions. A ‘flex copy paste’ (FIG. 13A and FIG. 13B) exampling flexing capabilities and a ‘WRITE_H’ (FIG. 13C and FIG. 13D) exampling flexing functions.

Figures 13A, 13B, 13C, 13D:
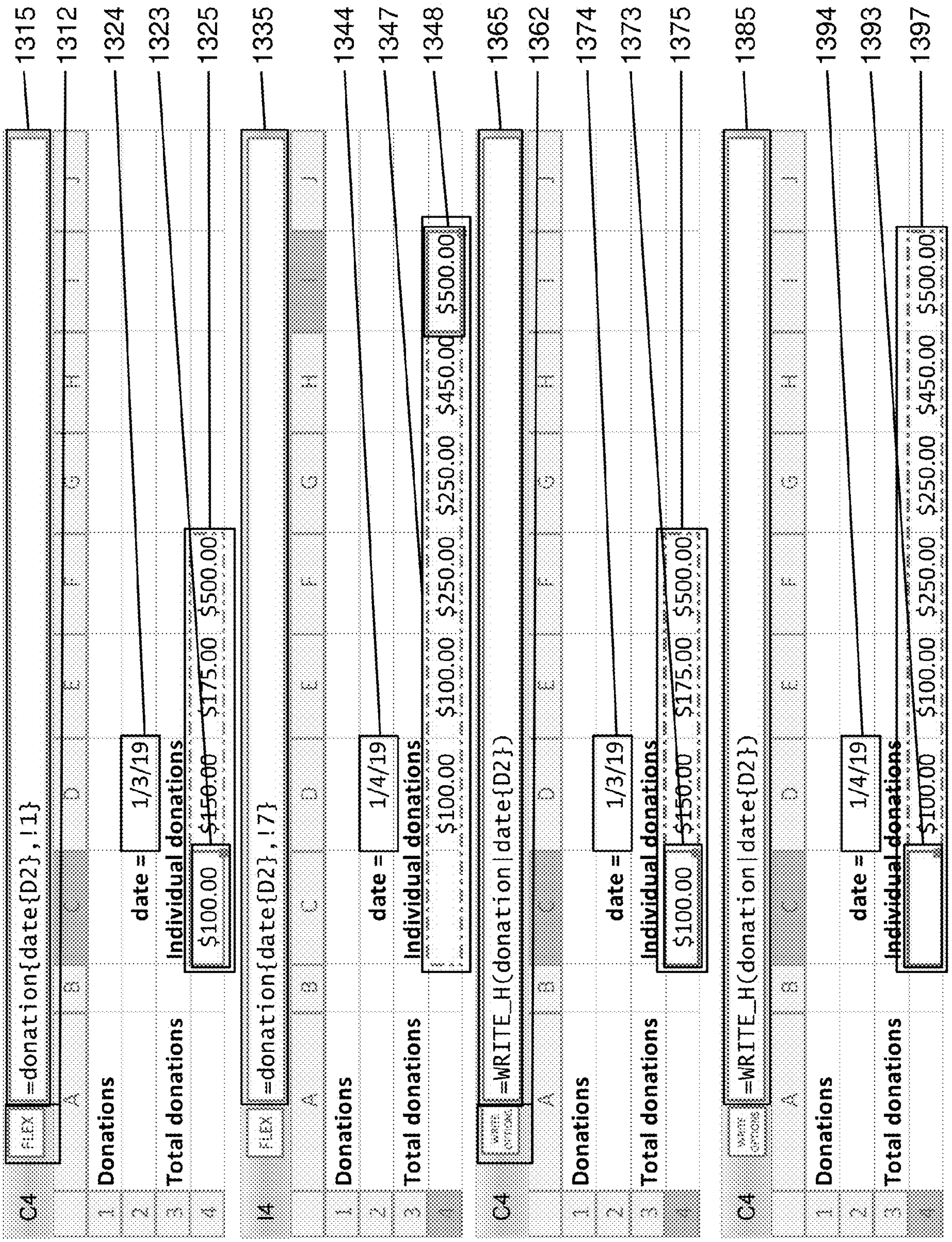

FIG. 13A and FIG. 13B example a ‘flex copy paste’ flexing upon the change of a donation date (input parameter) from ‘1/3/19’ 1324 in FIG. 13A to ‘1/4/19’ 1344 in FIG. 13B. In this ‘flex copy paste’ embodiment, subject of U.S. application Ser. No. 16/191,402, the ‘flex copy paste’ instantiated (populated) cells are outlined in a light blue dot dash line (1325 in FIG. 13A and 1347 in FIG. 13B) whenever the user is in (e.g., highlighted or double clicked into) one of the populated cells (e.g., 1323 in FIG. 13A and 1348 in FIG. 13B). In this embodiment it also outlines the formula bar formula in light blue (1315 in FIG. 13A and 1335 in FIG. 13B) and opens a ‘FLEX’ button 1312 in the formula bar. In this example the date change in the ‘flex copy pasted’ formulas (1315 in FIG. 13A and 1335 in FIG. 13B) results in flexing from four cells instantiated (populated) in FIG. 13A 1325 to seven cells instantiated (populated) in FIG. 13B 1347. This flexing capability will be used to example our new linkage/connection technologies.

In our technology the same flexing of values shown in FIG. 13A and FIG. 13B for a ‘flex copy paste’ can be achieved using one of our ‘WRITE_H’ functions. FIG. 13C and FIG. 13D example a ‘WRITE_H’ function flexing upon the same change of a donation date (input parameter) from ‘1/3/19’ 1374 in FIG. 13C to ‘1/4/19’ 1394 in FIG. 13D. In this ‘WRITE’ embodiment, subject of U.S. application Ser. No. 17/374,901, the ‘WRITE_H’ instantiated (populated) cells are outlined in a green dot dash line (1375 in FIG. 13C and 1397 in FIG. 13D) whenever the user is in (e.g., highlighted or double clicked into) one of the populated cells (e.g., 1373 and 1393). This embodiment also outlines the formula bar formula in green (1365 FIG. 13C and 1385 FIG. 13D) and opens a ‘WRITE OPTIONS’ button 1362 in the formula bar. In this example the date change via ‘D2’ (1374 FIG. 13C and 1394 FIG. 13D) in the ‘WRITE_H’ formulas (1365 FIG. 13C and 1385 FIG. 13D) results in flexing from four cells instantiated in FIG. 13C 1375 to seven cells instantiated in FIG. 13D 1397. This flexing capability will be used to example our new linkage/connection technologies.

Formula Only Single Flex Linkage

Figure 14A:
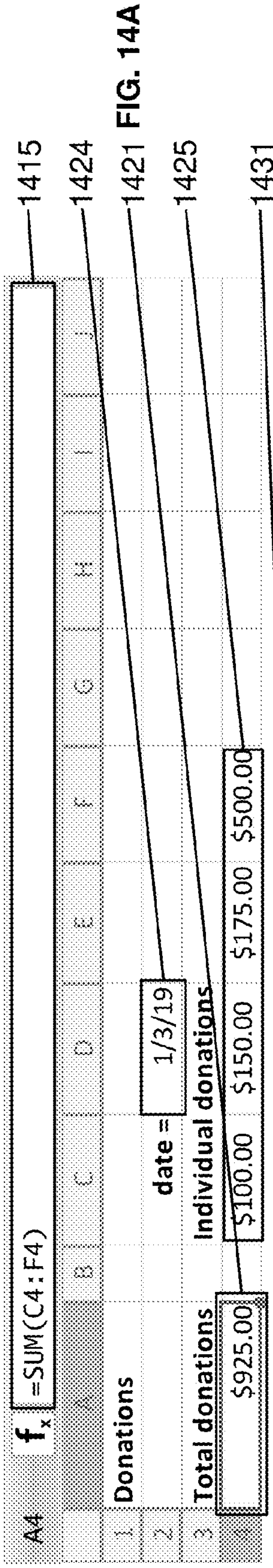
Figure 14B:
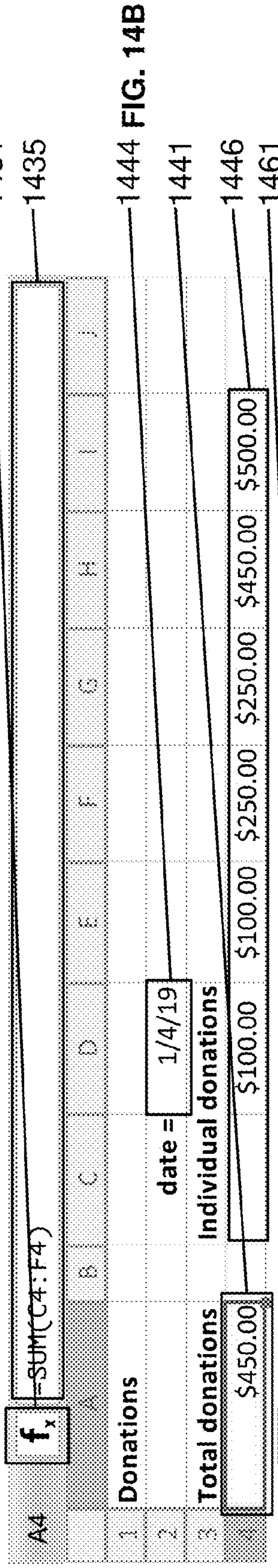

FIG. 14A through FIG. 14D examples the same formula with (1465 FIG. 14C/1485 FIG. 14D) and without (1415 FIG. 14A/1435 FIG. 14B) our formula only linkage/connection technology. FIG. 14A and FIG. 14B examples a ‘SUM(C4:F4)’ formula (1415 FIG. 14A/1435 FIG. 14B) without our linkage/connection technology doing its summation over a flex copy paste instantiated range. When the user changes the donation date from ‘1/3/19’ 1424 in FIG. 14A to ‘1/4/19’ 1444 in FIG. 14B the SUM formula 1415 value ‘$925.00’ 1421 in cell ‘A4’ in FIG. 14A changes to ‘$450.00’ 1441 in cell ‘A4’ in FIG. 14B because the instantiated (populated) values have changed but the formula (1415 FIG. 14A versus 1435 FIG. 14B) has not changed. What the user desired was the formula to flex with the content of the ‘flex copy paste’ to give them the daily total of the donations. So, they or our app automatically link/connect the formula to ‘flex copy paste’ in our technology as exampled in FIG. 14C. Then when the user changes the donation date (input parameter) from ‘1/3/19’ 1474 in FIG. 14C to ‘1/4/19’ 1494 in FIG. 14D the SUM formula value ‘$925.00’ in cell ‘A4’ 1471 in FIG. 14C automatically changes to ‘$1650.00’ in cell ‘A4’ 1491 in FIG. 14D because the formula (1465 FIG. 14C versus 1485 FIG. 14D) automatically changes. The formula has flexed from ‘SUM(C4:F4)’ 1465 in FIG. 14C to ‘SUM(C4:I4)’ 1485 in FIG. 14D as the flex space (instantiated) has changed from ‘C4:F4’ 1475 in FIG. 14C to ‘C4:I4’ 1496 in FIG. 14D. Giving a value change from ‘$965.00’ 1471 in FIG. 14C to ‘$1650.00’ 1491 in FIG. 14D in contrast to the without linkage result of a value change from ‘$965.00’ 1421 in FIG. 14A to ‘$450.00’ 1441 in FIG. 14B. Our new technology gives what the user wanted, the SUM calculation to always be the total of the ‘Individual donations’. While the user could in theory make the range on the SUM so large to encompass all the possible numbers of values, that means they can’t effectively use the space to the right of the formula and even then, they run the risk of not capturing all the values and having users populate something in the space that then gets erroneously included in the SUM. Our formula link/connect technology ensures the user always gets the summation they desire even when the range includes blanks or nulls and has cell values close by (as we will example later).

Figure 14C:
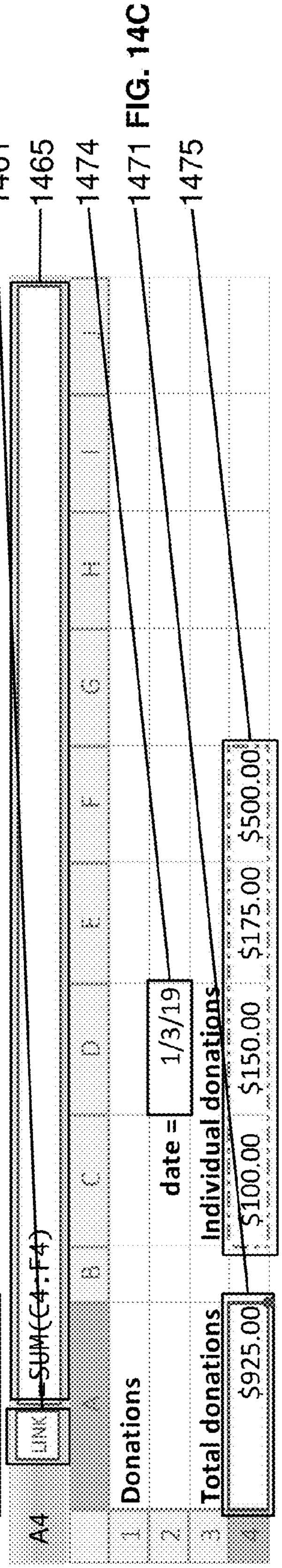
Figure 14D:
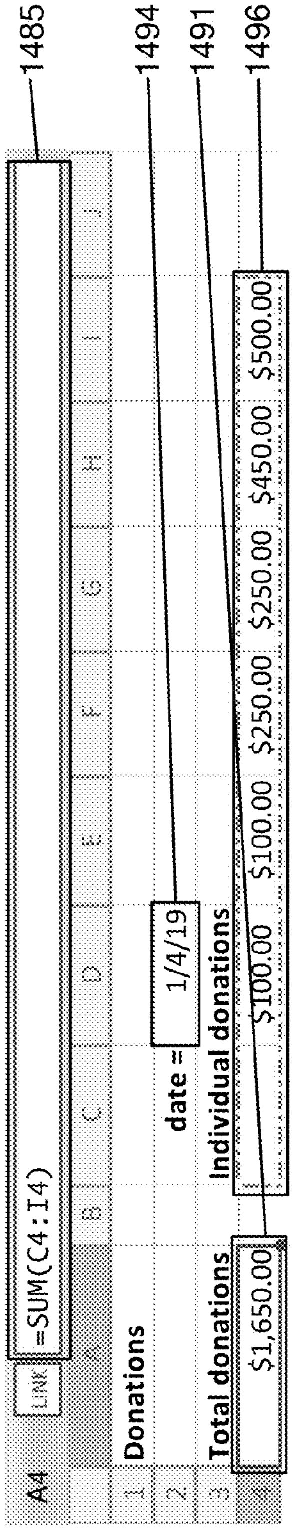

FIG. 14C and FIG. 14D example an embodiment of our linkage/connection technology where clicking into the linked cell (e.g., 1471 in FIG. 14C and 1491 in FIG. 14D)

outlines the clicked cell in purple (1471 in FIG. 14C and 1491 in FIG. 14D), outlines the formula bar formula in purple (1465 in FIG. 14C and 1485 in FIG. 14D), and exposes a purple 'LINK' button 1461. It also triggers the outlining of the linked/connected range (1475 in FIG. 14C and 1496 in FIG. 14D) which in this example is outlined with a light blue dot dash outline telling the user in this embodiment that the linkage/connection is to a 'flex copy paste' range.

Movement Only Single Flex Linkage

FIG. 15A through FIG. 15D examples the text cell 'Total=' with (1575 in FIG. 15C/1597 in FIG. 15D) and without (1525 in FIG. 15A/1545 in FIG. 15B) our movement only linkage/connection technology. In these examples the user puts a 'Total=' label in the second cell beyond the end of the 'flex copy paste' flexing list of 'Individual donations' as a first step toward then putting the SUM beside it. However, without our movement only linkage/connection technology that just results in an error, as exampled in FIG. 15A and FIG. 15B, when the user changes the donation flex copy paste date parameter from '1/3/19' 1524 in FIG. 15A to '1/4/19' 1544 in FIG. 15B. This is because the 'flex copy paste' range 1522 in FIG. 15A flexes to 1546 in FIG. 15B overwriting the 'Total=' label 1525 that was in cell 'F4' in FIG. 15A to give the '#ERROR!' message in cell 'F4' 1545 in FIG. 15B. However, when the user employs an embodiment of our technology to spatially position and coordinate (movement) link/connect the 'Total=' label 1575 to the 'flex copy paste' range 1572, then the donation flex copy paste date parameter change from '1/3/19' 1574 in FIG. 15C to '1/4/19' 1594 in FIG. 15D automatically shifts the 'Total=' label 1597 in FIG. 15D to the same relative position beyond the end of the flex range as it was before the flex (1575 in FIG. 15C in the second cell to the right of the range 1572). Thus, the user avoids an error and automatically gets the label where they want it, and in this embodiment the 'Total=' label will continue to stay where they want it (second cell to the right of end of the flex copy paste range) with any subsequent flex changes (expansions or contractions).

Formula and Movement (Both) Single Flex Linkage

FIG. 16A through FIG. 16D examples a SUM formula cell with (1675 in FIG. 16C/1697 in FIG. 16D) and without (1625 in FIG. 16A/1645 in FIG. 16B) our formula and movement (spatial positioning/coordination) linkage/connection technology. In these examples the user wants to put the summation calculation three cells to the right of the flex leaving room for an empty cell and then a 'Total=' text label in the cell next to the SUM. However, without our formula and movement (both) linkage/connection technology that just results in an error as exampled in FIG. 16A and FIG. 16B. When the user changes the donation date flex copy paste parameter from '1/3/19' 1624 in FIG. 16A to '1/4/19' 1644 in FIG. 16B, the flex copy paste range 1622 in FIG. 16A flexes to 1646 in FIG. 16B overwriting what was the SUM value '925.00' 1625 in cell 'G4' in FIG. 16A to give the '#ERROR!' message in cell 'G4' 1645 in FIG. 16B.

Figure 16A:
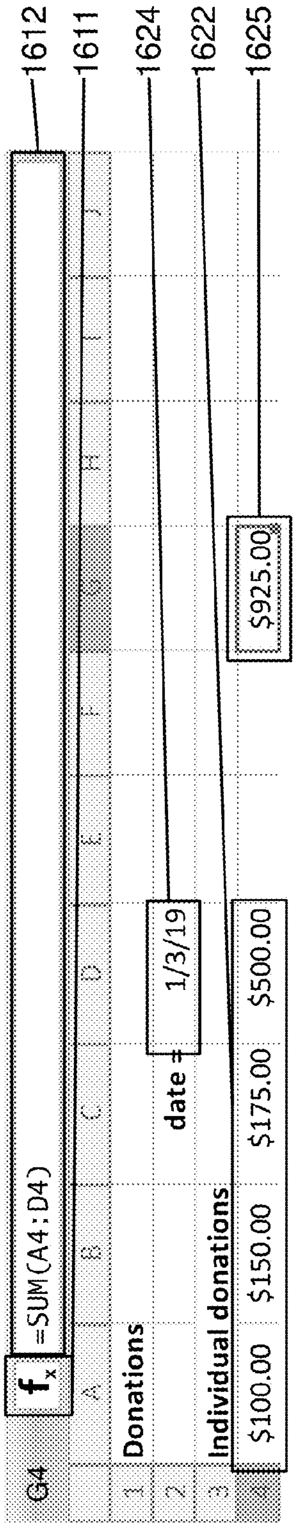
Figure 16B:
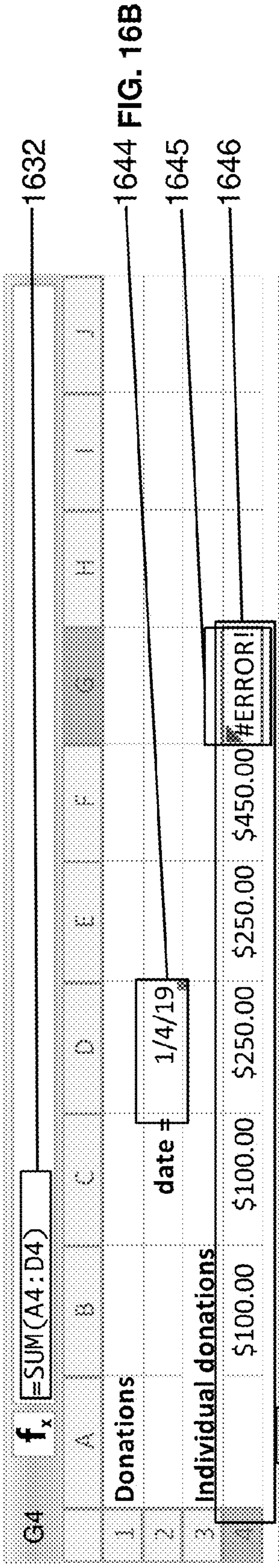
Figure 16C:
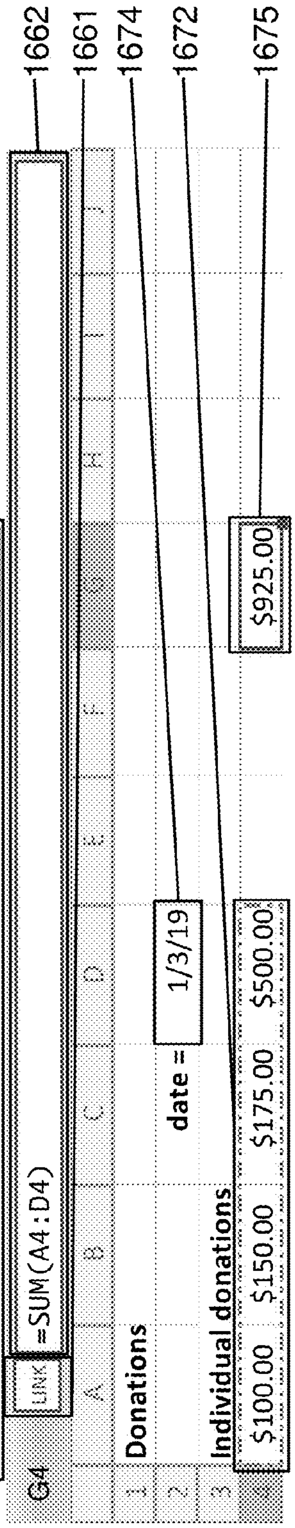
Figure 16D:
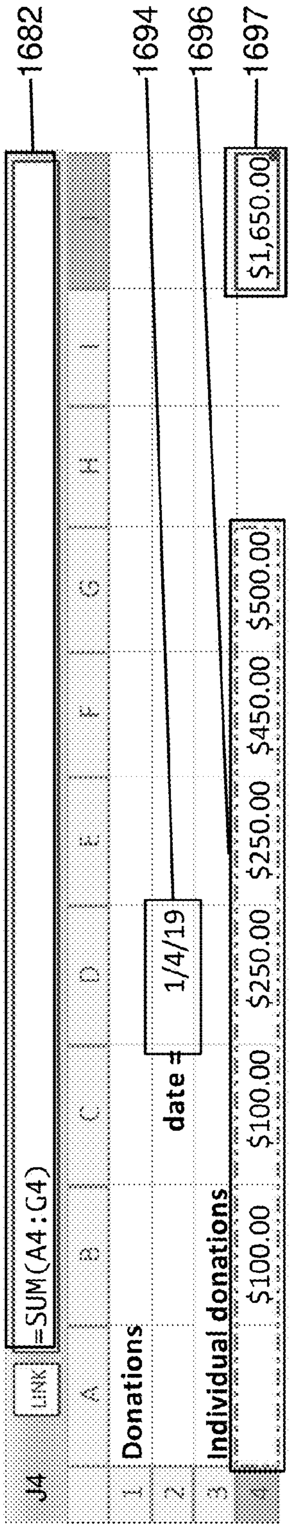
Figure 17A:
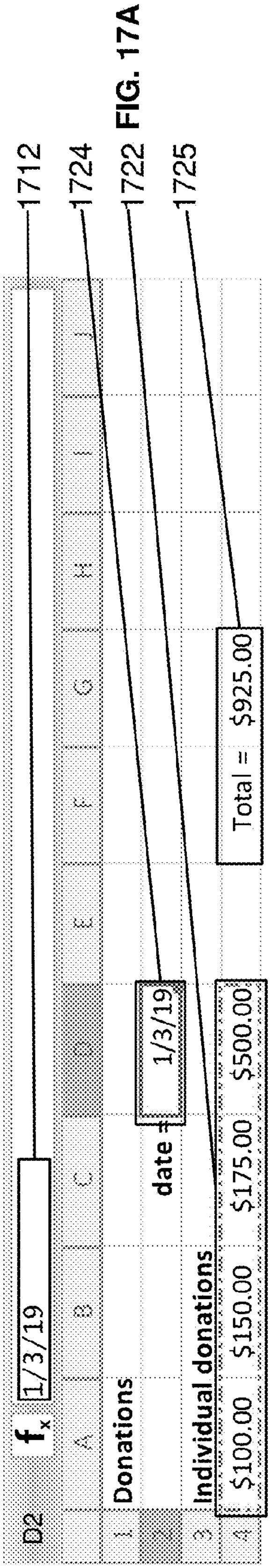
Figure 17B:
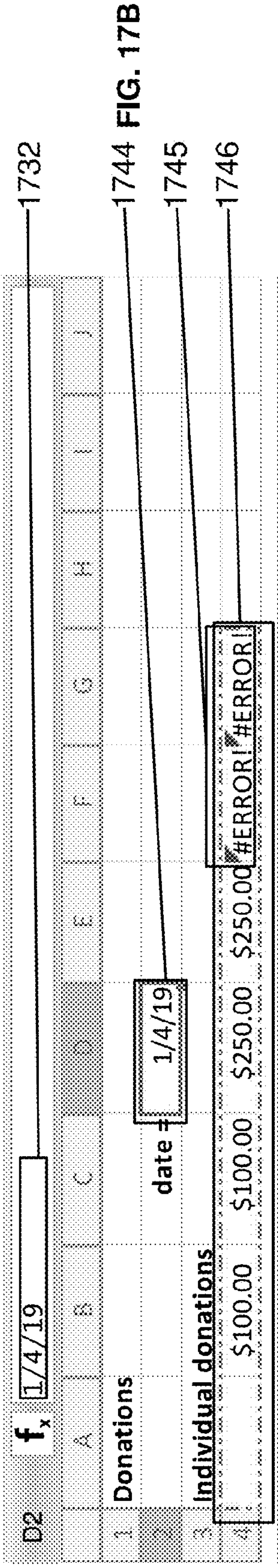
Figure 17C:
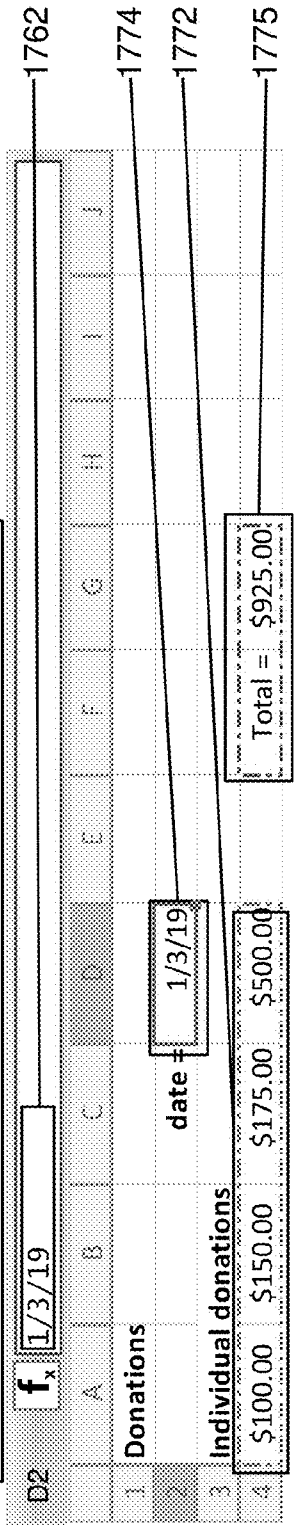
Figure 17D:
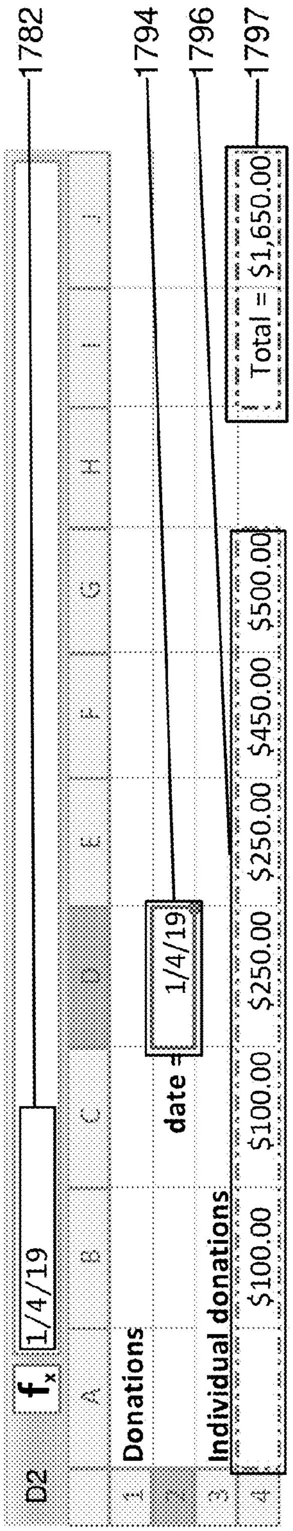

However, when the user uses our technology to formulaically and movement (spatially positioning) link/connect the formula in cell 'G4' 1675 to the flex copy paste range 1672, then the donation date change from '1/3/19' 1674 in FIG. 16C to '1/4/19' 1694 in FIG. 16D shifts the SUM in cell 'G4' 1675 in FIG. 16C to cell 'J4' 1697 in FIG. 16D. Our movement link/connect technology has automatically moved the cell 'G4' 1675 in FIG. 16C to the same relative (coordinated) position three cells to the right of the end of the extended 'flex copy paste' range 1696 to cell 'J4' 1697 in FIG. 16D. The formula part of our formula and movement link/connect technology changes the SUM formula '=SUM(A4:D4)' 1662 which was in cell 'G4' 1675 in FIG. 16C to '=SUM(A4:G4)' 1682 in cell 'J4' 1697 in FIG. 16D. In this embodiment adding the formula and movement linkage/connection via our technology has not altered the pre-flex formulas '=SUM(A4:D4)' which look identical unlinked/unconnected in FIG. 16A 1612 and linked/connected in FIG. 16C 1662. In this embodiment we have incorporated several visual identifiers, so the user knows the cell contents are linked/connected. One identifier is replacing the normal '$f_x$' button 1611 in FIG. 16A with the purple 'LINK' 1661 button in FIG. 16C and a second identifier is outlining the formula bar formula in purple 1662 in FIG. 16C rather than the normal gray 1612 in FIG. 16A. Another identifier is changing the outlining of the highlighted linked/connected cell to purple 1675 in FIG. 16C rather than the normal dark green 1625 in FIG. 16A. Finally, when the linked/connected cell is highlighted/opened it triggers the outlining of the flex (or flexes) it is connected to, in this example the blue dash dot outlining of cells 'A4' to 'D4' 1672 in FIG. 16C.

Note, our formula and movement linked/connected formulas do not require the addition of other functions and provide the correctly altered formula even when there are blanks or null flex values (e.g., FIG. 16D) and even when other values were previously in the flex range (e.g., FIG. 16C/FIG. 16D). This embodiment of our technology coordinates the movement so that spatial relationships are retained rather than the flex or flexes just pushing cells a minimum distance or overwriting them. Giving the user what they wanted, the daily total donations three cells from the end of the 'Individual donations' list.

Combined Single Flex Linkages

Our linkage/connection technologies support users making multiple different types of connections to a single flex. FIG. 17A through FIG. 17D example two cells with (1775 in FIG. 17C/1797 in FIG. 17D) and without (1725 in FIG. 17A/1745 in FIG. 17B) our linkage/connection technologies. In these examples the user wants to put a 'Total=' text label followed by a SUM calculation one cell beyond the 'Individual donations' flex range. This examples one cell with our movement only linkage/connection and another cell with our formula and movement linkage to the same flex range. However, without our linkage/connection technologies those cells give flex induced errors as exampled in FIG. 17B (after the flex) versus FIG. 17A (before the flex). When the user changes the donation date flex parameter from '1/3/19' 1724 in FIG. 17A to '1/4/19' 1744 in FIG. 17B the flex copy paste range 1722 in FIG. 17A flexes to 1746 in FIG. 17B to give the '#ERROR!' messages in cells 'F4' and 'G4' 1745 from the overwriting of both the 'Total=' label previously in cell 'F4' and the SUM value '925.00' previously in cell 'G4' in 1725 in FIG. 17A. However, in FIG. 17C when the user instead uses our technologies to formulaically and spatially coordination/positioning (movement) link/connect the SUM formula in cell 'G4' 1775 to the 'flex copy paste' range 1772 and movement links the 'Total=' cell 'F4' 1775, then the donation date change from '1/3/19' 1774 in FIG. 17C to '1/4/19' 1794 in FIG. 17D shifts the SUM previously in cell 'G4' to cell 'J4' 1797 in FIG. 15D and the 'Total=' text previously in cell 'F4' to cell '14' 1797. The automatic cell content movements by our technologies retains the same relative (coordinated) positions to the right of the flex range as they were before the flex (1797 in FIG. 17D versus 1775 in FIG. 17C). It also changes the SUM formula in cell 'J4' 1797 in FIG. 17D to '=SUM(A4:G4)' from '=SUM(A4:D4)' previously in cell "G4' 1775 in FIG.

17C (as exampled in FIG. 16D and FIG. 16C, respectively). Thus, exampling how more than one link/connection (e.g., cells 'F1' and 'G1' 1775) and more than one link/connection type (movement only and both) can be linked/connected to the same capability flex range (e.g., 1772).

Function Flex Linkage

FIG. 18A through FIG. 19D examples how the different linkage/connection types and their combinations work similarly for flexes produced by a function (e.g., WRITE_H) in our technology. Because these examples use the 'WRITE_H' function formula in FIG. 13C and FIG. 13D that delivers the same values as the 'flex copy paste' there is no need to repeat all the overwrite examples which are comparable to FIG. 14A/FIG. 14B, FIG. 15A/FIG. 15B, FIG. 16B/FIG. 16B, and FIG. 17A/FIG. 17B. Replacing the 'flex copy paste' flex with the 'WRITE_H' flex in these situations gives the same cell overwrite and/or static SUM calculation outcomes. So instead of repeating the same limitations of the existing technologies, we will only show the function driven flex changes employing our linkage/connection technology to example that our technology works the same way for function and capability delivered flexes.

Figure 18A:
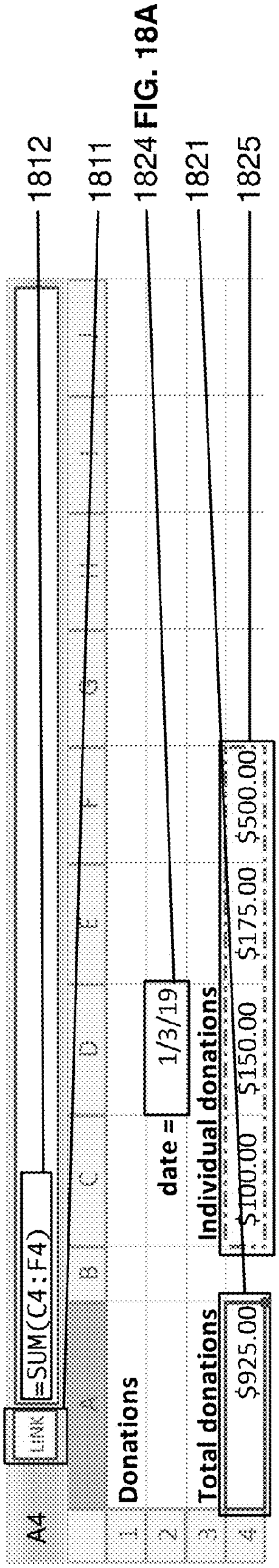
Figure 18B:
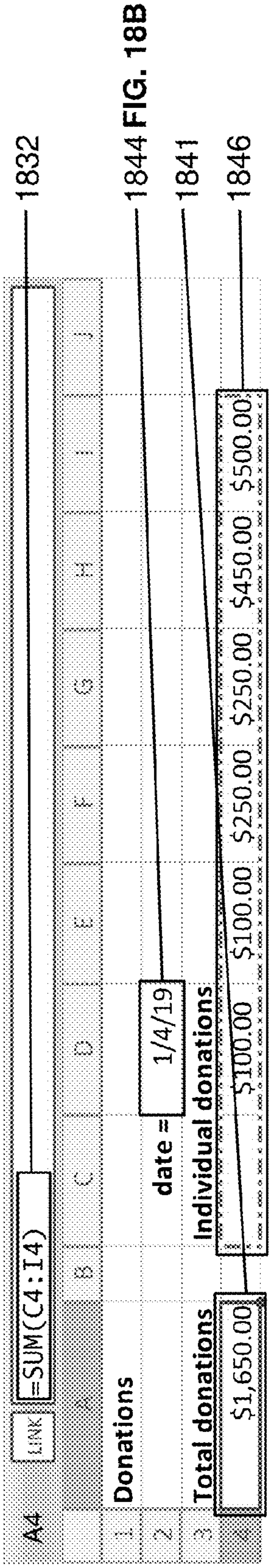

FIG. 18A and FIG. 18B examples the comparable situation to FIG. 14C and FIG. 14D, where what the user desired was the donations SUM formula 1812 to deliver the daily total of the donations. So, in this situation they linked/connected the SUM formula to the 'WRITE_H' generated range 1825. Then when the user changes the donation date from '1/3/19' 1824 in FIG. 18A to '1/4/19' 1844 in FIG. 18B both the SUM formula value and formula changes. The formula has flexed from '=SUM(C4:F4)' 1812 in FIG. 18A to '=SUM(C4:I4)' 1832 in FIG. 18B as the flex space has change from 'C4:F4' 1825 in FIG. 18A to 'C4:I4' 1846 in FIG. 18B. While the summation value changed from '$965.00' 1821 in FIG. 18A to '$1,650.00' 1841 in FIG. 18B. Thus, ensuring that the user always sums the total of all the 'Individual donations' no matter how many of them there are in our technology.

Figure 18C:
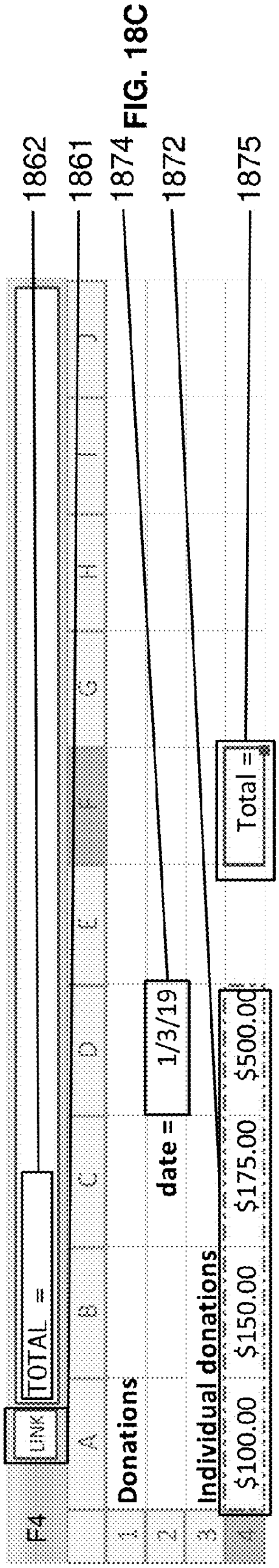
Figure 18D:
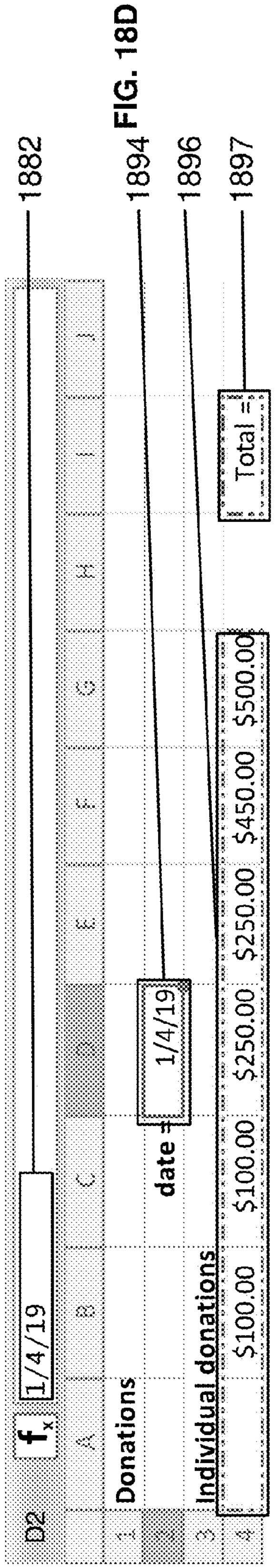

FIG. 18C through FIG. 18D examples the users placing a 'Total=' text label in the second cell beyond the end of the function flexing list of 'Individual donations' as a first step toward then putting the SUM beside it. Therefore, the user has spatially position (movement) linked/connected the 'Total=' text label 1875 in FIG. 18C one cell offset from the end of the 'WRITE_H' range 1872, so that when the user changes the donation date WRITE constrain parameter (input) from '1/3/19' 1874 in FIG. 18C to '1/4/19' 1894 in FIG. 18D our technology automatically shifts the 'Total=' text label to cell '14' 1897 in FIG. 18D (from cell 'F4' 1875 in FIG. 18C). Our technology coordinated its movement to the same relative position beyond the end of the extended flex range 1896 in FIG. 18D as it was before the flex change (1875 in the second cell to the right of the flex range 1872 in FIG. 18C). Thus, the user avoids an error and automatically gets the label where they want it, and it will continue to stay where they want it with any subsequent flex changes (e.g., expansion or contraction) in this embodiment.

Figure 19A:
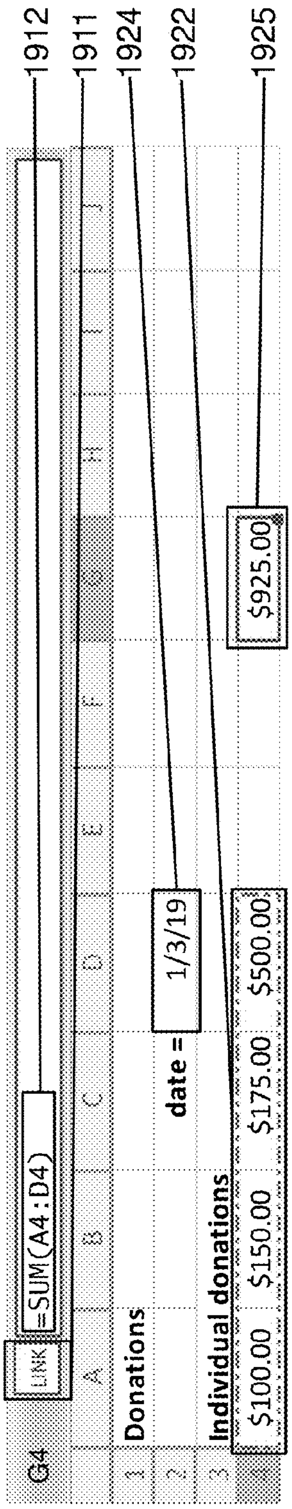
Figure 19B:
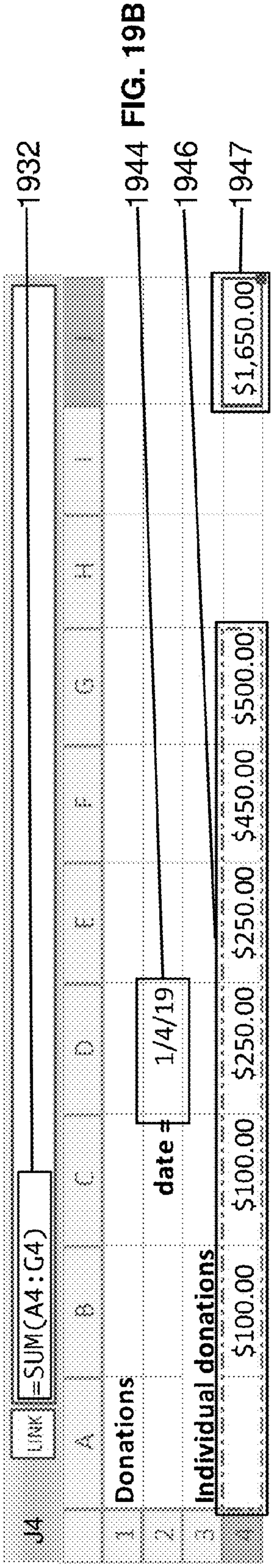

FIG. 19A and FIG. 19B examples our both formula and movement (spatial positioning) linkage/connection technology for function instantiated (populated) flexing. In these examples the user wants to put the SUM calculation three cells beyond the end of the 'WRITE_H' flex leaving room for a 'Total=' text label and a blank cell. When the user formulaically and spatially position links/connects the formula in cell 'G4' 1925 in FIG. 19A to the 'WRITE_H' range 1922, then the donation date parameter change in the constraint of the 'WRITE_H' from '1/3/19' 1924 in FIG. 19A to '1/4/19' 1944 in FIG. 19B shifts the SUM in cell 'G4' 1925 in FIG. 19A to cell 'J4' 1947 in FIG. 19B. Thus, automatically moving it 1947 to the same relative position three cells to the right of the flex range 1946 in FIG. 19B. But it also changes the SUM formula in cell 'J4' 1947 in FIG. 19B, changing from '=SUM(A4:D4)' 1912 in FIG. 19A before the flex, to '=SUM(A4:G4)' 1932 in FIG. 19B after the flex change. Thus, both formulaically and spatially (movement) accommodating the linked/connected changes from the function flex (WRITE_H).

Figure 19C:
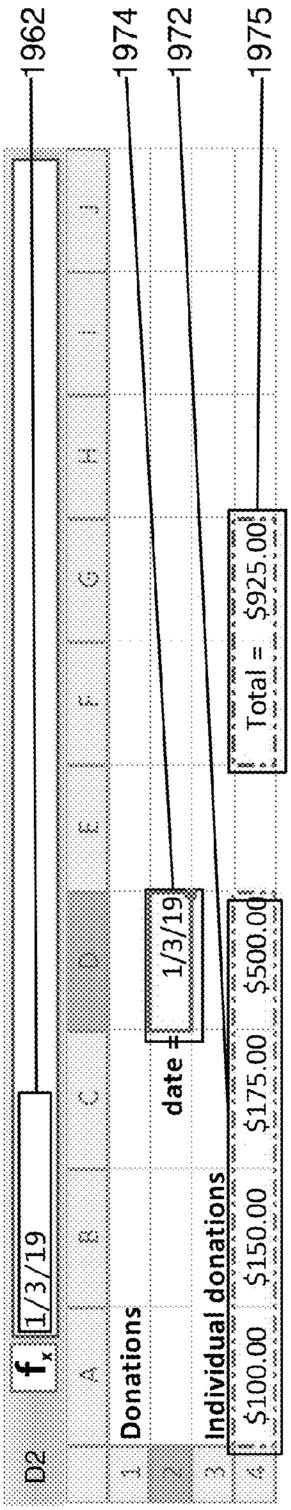
Figure 19D:
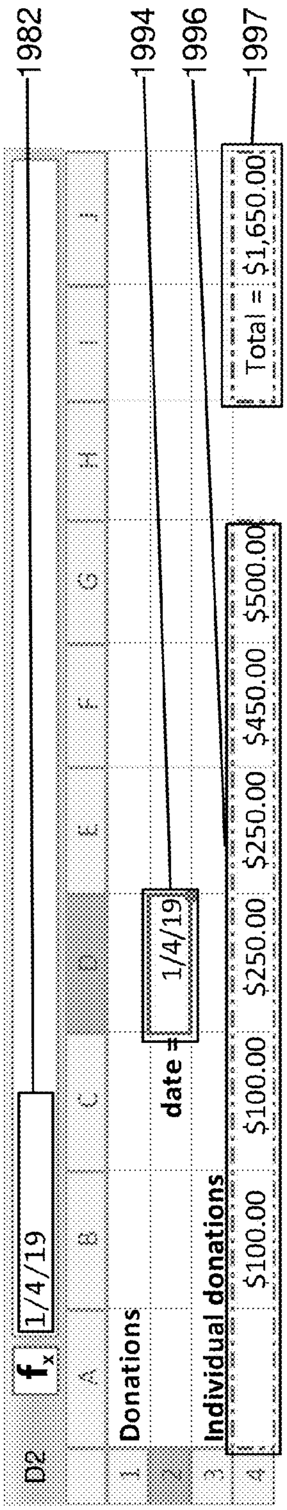

FIG. 19C and FIG. 19D example multiple cells with different types (e.g., movement only, movement and formula) of our linkage/connection technologies connected to the same flexing function. In these examples the user wants the SUM calculation three cells beyond end of the flex with the 'Total=' text label next to it. This examples one cell with movement only linkage/connection and another cell with both movement and formulaic linkage/connection to the same function (e.g., WRITE_H) flex range. In this example the user has both (formula and movement) linked/connected the SUM formula in cell 'G4' 1975 in FIG. 19C to the 'WRITE_H' range 1972 and then movement only linked/connected the 'Total=' text cell 'F4' 1975 to the same 'WRITE_H' range 1972. So, when the user changes the donation date constraint input (parameter) into the 'WRITE_H' from '1/3/19' 1974 in FIG. 19C to '1/4/19' 1994 in FIG. 19D our technologies automatically shifts the SUM in cell 'G4' 1975 in FIG. 19C to cell 'J4' 1997 in FIG. 19D and the 'Total=' text in cell 'F4' 1975 in FIG. 19C to cell '14' 1997 in FIG. 19D to the same relative positions to the right of the flex range as they were before the flex. It also changes the SUM formula in cell 'J4' in FIG. 19D to '=SUM(A4:G4)' from '=SUM(A4:D4)' prior to the flex in cell 'G4' in FIG. 19C (as previously shown in FIG. 19B and FIG. 19A, respectively). Thus, exampling how more than one link/connection (e.g., cells 'F4' and 'G4' 1975 in FIG. 19C) and more than one link type (e.g., movement and both) can be linked/connected to the same function flex range in our technologies.

Two-Dimensional Linkage

So far, our examples have shown one-dimensional flexing (e.g., changing the number of columns within a single row or changing the number of rows within a single column). However, our linkage/connection technology equally applies to two-dimensional flexing delivered by either functions and/or capabilities.

FIG. 20A and FIG. 20B examples a formula linkage to a two-dimensional flex function flex. FIG. 20A examples a formula '=MAX(B7:D8)' 2014 in cell 'C3' 2033 which is formula linked/connected to the body segment (cells 'B7' to 'D8') 2044 of the 'WRITE_CALC_2D' (subject of U.S. Provisional Patent Application No. 63/240,828) instantiating cells 'A5' to 'D8' 2043. That 'WRITE_CALC_2D' formula =WRITE_CALC_*2D*(date|state|SUM(donation)
|date{*C2* . . . *F2*})

has a 'date' constraint range populated by the dates in cell 'C2' 2023 and 'F2' 2025, that makes it easy for the user to change a 'date' parameter ('C2' or 'F2') to flex the 'WRITE' instantiated (populated) range. The user does that in FIG. 20B, changing the 'end date=' in cell 'F2' to '1/3/19' 2029 (from '1/2/19' 2025 in FIG. 20A), which expands the area 2047 instantiated by the 'WRITE' expanding its body to 'B7' through 'E9' 2048. Because the formula 2018 in cell 'C3' 2037 in FIG. 20B was formula linked/connected to that 'WRITE' body area (range), its formula automatically changes to '=MAX(B7:E9)' 2018 from '=MAX(B7:D8)' 2014 in FIG. 20A. This gives a different 'MAX=' value in cell 'C3' of '$3,460.00' 2037 from the '$3,200.00' 2033 value in FIG. 20A. The linked formula range automatically two-dimensionally flexed (adding more rows and columns) as the WRITE function flexed. Note, in this embodiment the formula linked/connected 'MAX' function range would contract if the user had instead done the operation in reverse order starting in FIG. 20B and then making the date change to end up with FIG. 20A.

FIG. 20C and FIG. 20D examples a combination of a movement only and both (formula and movement) linkage/connection to the same two-dimensional function flex. They employ the same 'WRITE_CALC_2D' formula as in FIG. 20A and FIG. 20B except in FIG. 20C the formula starts in cell 'A4' and instantiates the cells in 'A4' through 'D7' 2083. In this example the user has put the 'MAX=' text 2093 below the bottom corner of the 'WRITE' 2083/'WRITE' body 2084 and the MAX formula '=MAX(B6:D7)' 2064 one cell to the right in 'E8' 2094. The user then linked the text in cell 'D8' 2093 spatial positionally (movement only) to the body 2084 of the 'WRITE' (or all of the 'WRITE' 2083) and linked the cell 'E8' 2094 both formulaically and spatial positionally (movement) to the to the body 2084 of the 'WRITE'. Note, these linkages/connections could be done by the user or automatically by our application with both being further example later. Thus, when the user in FIG. 20D changed the 'end date=' in cell 'F2' to '1/3/19' 2079 from '1/2/19' 2075 in FIG. 20C it flexed the WRITE range 2087 and its body 2088. This automatically spatially shifted the 'MAX=' label to cell 'E9' 2098 in FIG. 20D and both spatially shifted and formulaically altered the cell 'F9' 2099 (formula 2068). Thus, exampling more than one linkage/connection change from a single functional two-dimension flex. It also exampled two different types of connection/linkage—one a movement only and the other both a movement and formula linkage/connection. It exampled movement linkages/connections to a specific segment (e.g., corner cell in this example) of a flex (the right bottom corner) and a formula linkage/connection to a segment of the flex, in this example the body of the 'WRITE_CALC_2D' function. Our technology supports formula connections to different segments of a flexing range including individual cells and mix and match combinations within the functional formula. Note, these movements and formula changes were correctly done despite the pre and post number of blank/null values within the flex ranges as well as no difference in the 'MAX' functional formula arguments relative to a normal spreadsheet non-auto flexing formula.

FIG. 21A and FIG. 21B examples a formula only linkage to a two-dimensional flex capability flex (e.g., flex copy paste). FIG. 21A examples a formula '=MAX(B7:D8)' 2114 in cell 'C3' 2122 which does the 'MAX' evaluation for the entire 'flex copy paste' range 2142. That flex copy paste is flexed by the data constraint change of the two 'WRITE' functions in cell ranges 'A7' to 'A8' 2141 and 'C5' to 'E5' 2132 that the 'flex copy paste' is connected to (per our U.S. application Ser. No. 16/191,402, titled "Methods and Systems for Connecting A Spreadsheet to External Data Sources with Ordered Formulaic Specification of Data Retrieved," filed 14 Nov. 2018, now U.S. Pat. No. 11,036,929, issued 15 Jun. 2021). The user does that in FIG. 21B, changing the 'end date=' in cell 'G2' to '1/3/19' 2129, which expands the area 2147 instantiated (populated) by the 'flex copy paste'. Because the formula 2118 in cell 'D3' 2127 in FIG. 21B was linked/connected to that area (range), its formula automatically changes to '=MAX(C6:F8)' 2118 from '=MAX(C6:F7)' 2114 in FIG. 21A. This gives a different 'MAX=' value of '$3,460.00' 2127 from the '$3,200.00' 2122 value in FIG. 21A. The linked formula range automatically two-dimensionally flexed (adding more rows and columns) as the 'flex copy paste' capability flexed.

FIG. 131A and FIG. 131B examples movement only linkages/connections between two flex ranges maintaining their relative spatial positioning. FIG. 131A examples two two-dimensional 'WRITE' function flex areas 13143 and 13173 which are movement linked/connected in our technology. In FIG. 131B when the user changes an input parameter, the end date in cell 'G2' 13129 to '1/4/19' (from '1/3/19' in 'G2' 13125 in FIG. 131A) both 'WRITE' function flex areas 13147 and 13177 flex and our technology automatically repositions 13177 to maintain its relative spatial position two rows below 13147.

Figure 22A:
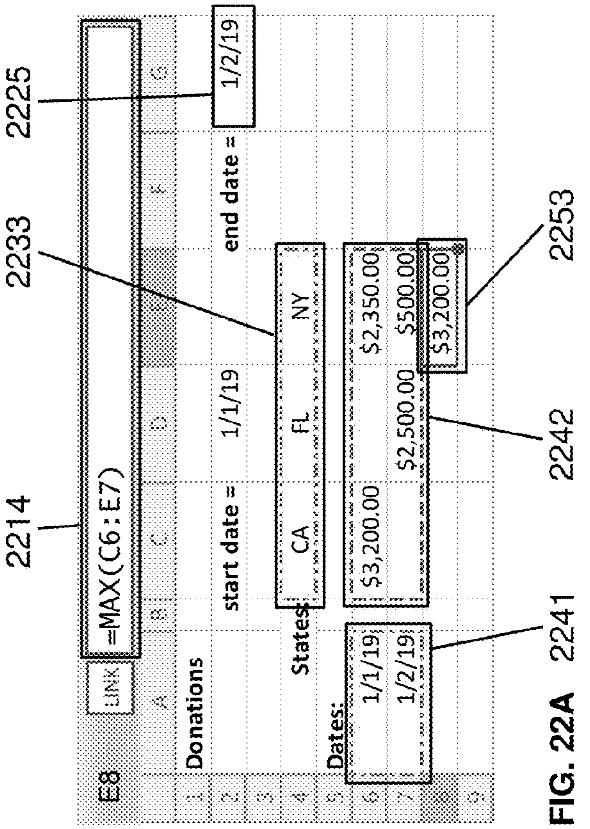
Figure 22B:
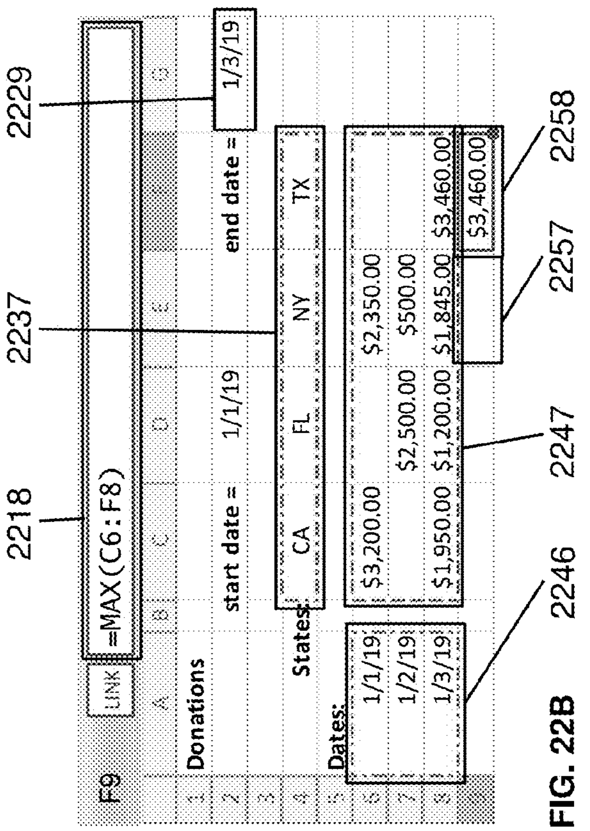

FIG. 22A through FIG. 22D examples movement only and movement and formula (both) linkages/connections to a two-dimensional 'flex copy paste' capability. In FIG. 22A a 'MAX' formula 2214 in cell 'E8' 2253 is both formulaically and positionally (movement) linked/connected to a two-dimensional 'flex copy paste' in cells 'C6' through 'E7' 2242. That 'flex copy paste' is the 'WRITE' variant dependent on the two WRITEs in cells 'A6' through 'A7' 2241 and in cells 'C4' through 'E4' 2233. Both of those WRITEs' have formulas with a date constraint that allows the user to easily flex them by changing either the start or end date (in cells 'D2' or 'G2'). Thus, the flexing of the 'flex copy paste' is synchronized with the flexing of the two 'WRITE' functions. In FIG. 22B the user triggers a flex by changing the end date in cell 'G2' 2229 to '1/3/19' (from '1/2/19' in 'G2' 2225 in FIG. 22A) causing both WRITEs (2246 and 2237) and then the flex copy paste range 2247 to expand in size. This then automatically causes the linked cell that was in 'E8' 2253 in FIG. 22A to positionally move to 'F9' 2258 in FIG. 22B and its formula '=MAX(C6:F8)' 2218 to automatically adjust (from '=MAX(C6:E7)' 2218 in FIG. 22A) for the expansion of the 'flex copy paste' area resulting in a different value '$3,460' 2258 (vs. '$3,200.00' 2253 before the change in FIG. 22A). A similar result would have occurred had the flex copy paste been the "data end" type which does not involve the WRITEs but directly uses the dates to populate the 'flex copy paste' range. This date change therefore employed our both movement and formula linkage/connection resulting in the automatic related spatial relationship retaining movement and the formulaic change of the cell summing the total donations for all the dates meeting the start and end date criteria. The formula looks like a regular 'MAX' range formula with no additional functions and generates the correct value when flexed despite the range containing cells with blank or null values. The cell moves in a spatially coordinated manner to stay directly below the bottom corner of the 'flex copy paste range' 2258 in FIG. 22B and is not just pushed down to the next open cell 'E9' 2257 below its previous position 'E8' (shown in FIG. 22A 2253).

Figure 22C:
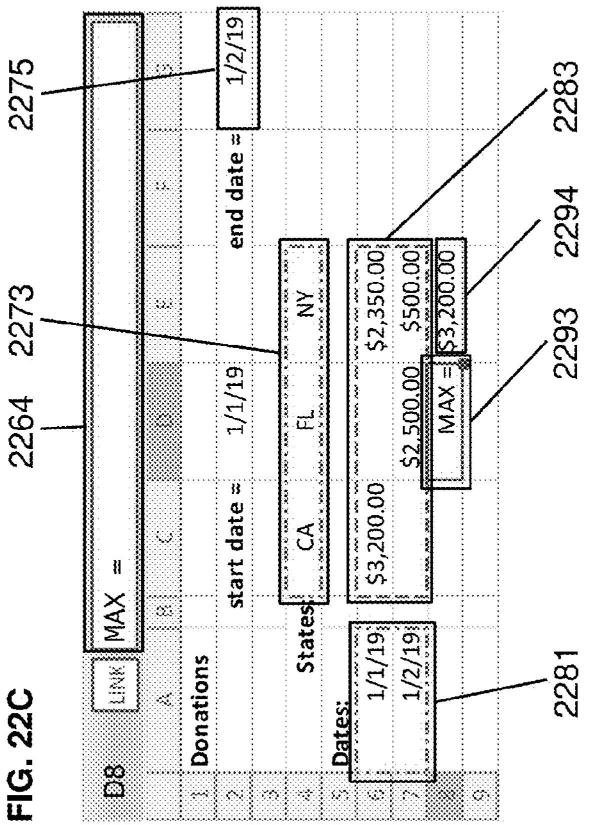
Figure 22D:
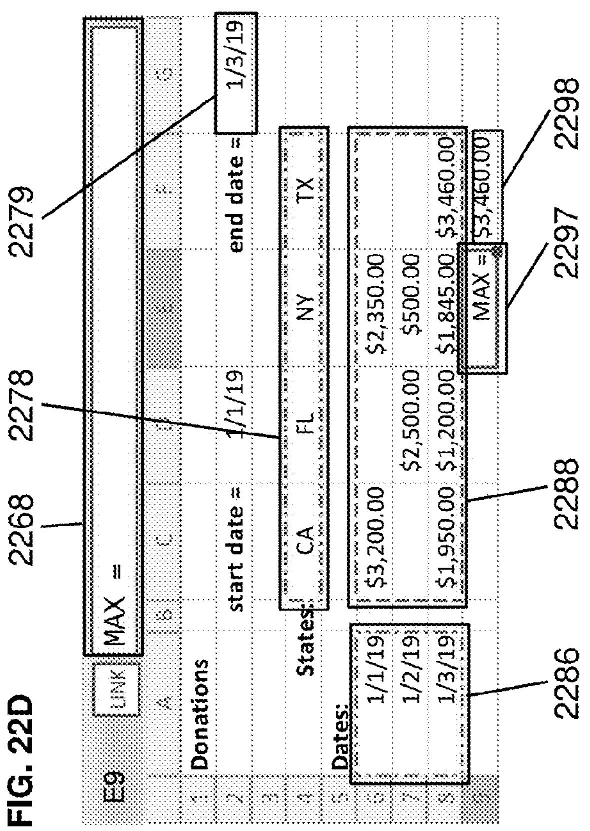

FIG. 22C and FIG. 22D examples the positional linkage addition of 'MAX=' text in cell 'D8' 2293 to what was in FIG. 22A. So, when the user changes the end date in cell 'G2' in FIG. 22D to '1/3/19' 2279 (from '1/2/19' in 'G2' 2225 in FIG. 22A) both cells 'E9' 2297 and 'F9' 2298 have positionally moved from 'D8' 2293 and 'E8' 2294 in FIG. 22C, respectively. This example added a cell with a movement only linkage/connection to a two-dimensional flex capability. The movement automatically triggered by the date change then maintained the related spatial position of the cell with the 'MAX=' text next to the linked/connected SUM cell and moving two-dimensionally (one cell column to the right and one row below). The flex does not just push the text cell out of its way but in this embodiment moves it in a manner retaining its spatial positioning relationships.

Two-Way Movement Linkage

Embodiments of our technology have one-way and two-way movement capabilities. One-way linkages/connections retain spatial relationships when there are flex expansions as exampled in FIG. 22A changing to FIG. 22B or FIG. 22C changing to FIG. 22D. In these setting the flex expansion resulted in movements retaining the relative spatial relationships of the linked/connected cells which would have been over-written (overlapped) by the flex expansion. And if the movement of the linked/connected cells only occurred during flex expansion we would call that a one-way (expansion only) embodiment. However, in the two-way embodiments of our technology linked/connected cells move to retain spatial relationships (e.g., complete spatial relationships, partial spatial relationships, alignments, and movement sequence driven relationships) despite cells not being overlapped by flexes that are contracting.

Figure 23A:
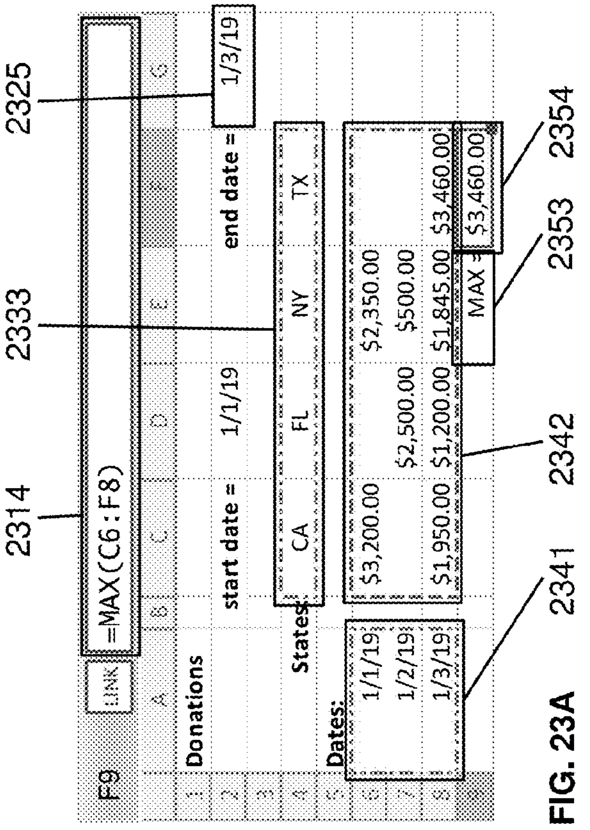
Figure 23B:
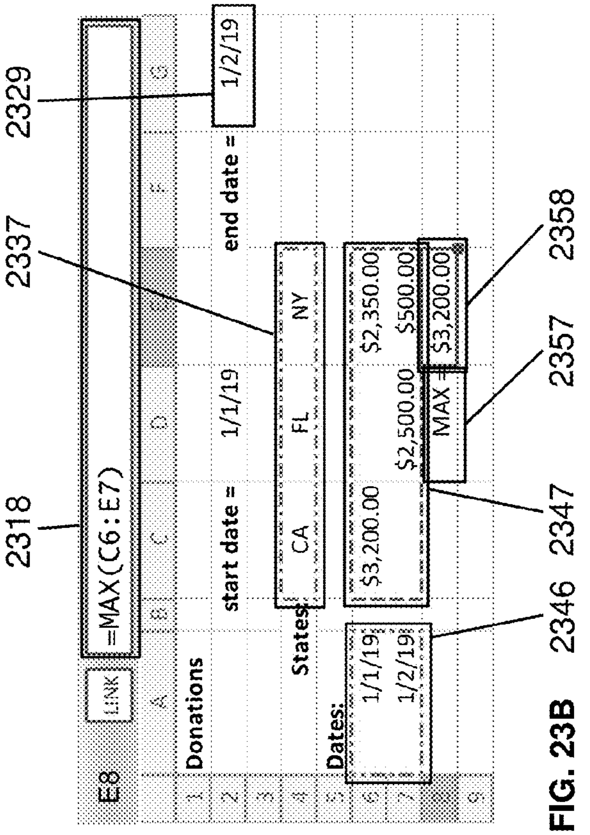

FIG. 23A through FIG. 23D examples contraction of our two-way expansion and contraction coordinated spatial positioning linkage/connection technology and contraction of our one-way expansion and contraction coordinated spatial positioning linkage/connection technology. Our two-way technology coordinates the movements when the changes do or do not result in an overlap of connected/linked cells. In FIG. 23A a 'MAX' formula 2314 in cell 'F9' 2354 is both formulaically and positionally linked/connected to a two-dimensional 'flex copy paste' in cells 'C6' through 'F8' 2342. That 'flex copy paste' is the 'WRITE' variant dependent on the two WRITEs in cells 'A6' through 'A8' 2341 and in cells 'C4' through 'F4' 2333. Both of those WRITEs' have formulas with a date constraint that allows the user to easily flex them by changing either the start or end date (in cells 'D2' or 'G2'). In FIG. 23B the user triggers a flex by changing the end date in cell 'G2' 2129 to '1/2/19' (from '1/3/19' in 'G2' 2325 in FIG. 23A) causing both WRITEs (2346 and 2337) and then the flex copy paste range 2347 to contract in size. This then automatically causes the linked cell 'E8' 2358 in FIG. 23B to positionally move and its formula '=MAX(C6:E7)' 2318 to automatically adjust (from '=MAX(C6:F8)' 2314 in FIG. 23A) for the contraction of the 'flex copy paste' area resulting in a different value '$3,200' 2358 (vs. '$3,460.00' 2354 before the change in FIG. 23A). A similar result would have occurred had the flex copy paste been the "data end" type which does not involve the WRITEs. This date change therefore employed our both movement and formula linkages/connections resulting in the automatic coordinated movement and formulaic change of the cell determining the 'MAX' of the donations for all the dates meeting the start and end date criteria. That movement took place because this embodiment of our technology retains the coordinated spatial positioning (in this example retention of relative spatial relationships) for both flex expansion and contraction (two-way). The formula looks like a regular 'MAX' range formula with no additional functions and generates the correct value when flexed despite the range containing cells with blank or null values. The cell 'E8' 2358 in FIG. 23B moves in a coordinated manner to stay directly below the bottom corner of the 'flex copy paste range' 2347 and therefore moves two-dimensionally from its previous position 'F9' 2354 in FIG. 23A to 'E8' 2358 in FIG. 23B retaining the same relative spatial relationship.

FIG. 23A and FIG. 23B also examples the two-way expansion and contraction coordinated spatial positioning linkage/connection technology without the formula linkage. The cell 'E9' 2353 in FIG. 23A moves to cell 'D8' 2357 in FIG. 23B with the contraction of the flex copy paste 2347. Thereby retaining its relative spatial positioning of one cell below the second from the bottom right cell in the flex copy paste before 2353 in FIG. 23A and after 2357 in FIG. 23B the flex copy paste flex contraction.

Figure 23C:
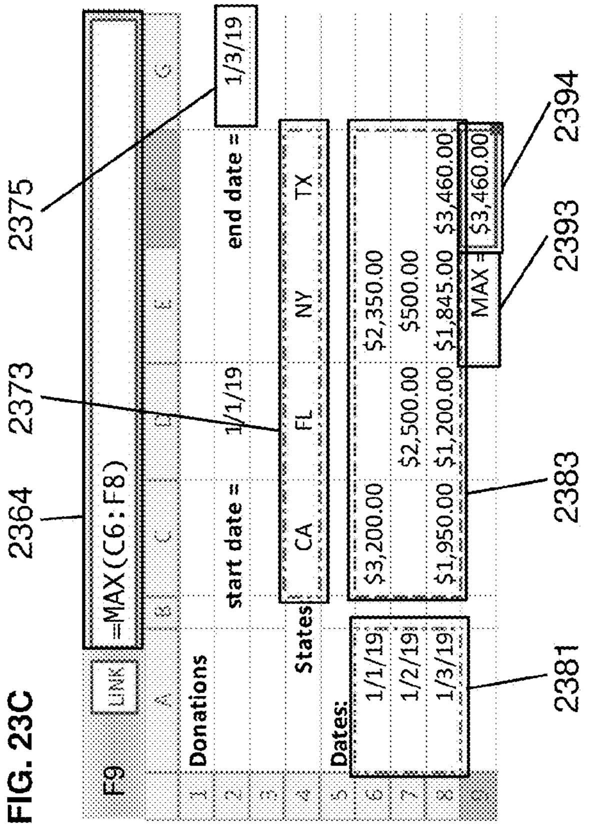
Figure 23D:
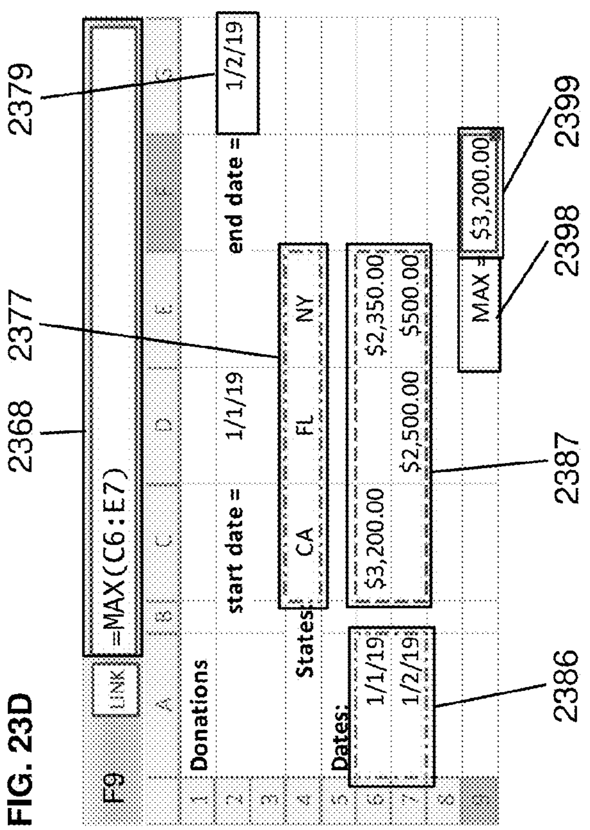

Our one-way expansion and contraction coordinated spatial positioning linkage/connection technology retains the relative spatial positioning for flex expansions but does not move the linked/connected cells or flex ranges for flex contractions as exampled in FIG. 23C and FIG. 23D. FIG. 23C and FIG. 23D examples that capability for both movement linked/connected cells and movement and formula linked/connected The movement linked/connected cell 'E9' 2393 holding the text 'MAX=' in FIG. 23C does not move from cell 'E9' 2398 in FIG. 23D when the user changes the end date in FIG. 23D to '1/2/19' 2379 from '1/3/19' 2375 in FIG. 23C causing the contraction of the flex areas. Likewise the movement and formula linked/connected cell 'F9' 2393 holding the formula '=MAX(C6:F8)' in FIG. 23C does not move when the user changes the end date in FIG. 23D to '1/2/19' 2379 from '1/3/19' 2375 in FIG. 23C. However, the formula does change from '=MAX(C6:F8)' 2364 in FIG. 23C to '=MAX(C6:E7)' 2368 in FIG. 23C because the formula linkage/connection does work for flex contractions thereby changing the range in the 'MAX' formula. In another embodiment of our technology the formula linkage/connection also does not change with contraction. In most situations users are likely to want the two-way implementations but in some specialized situations user may want the one-way implementations of our movement, formula and both movement and formula technologies.

One-Way and Two-Way Movement Linkage—Never Overlapping

Figure 24A:
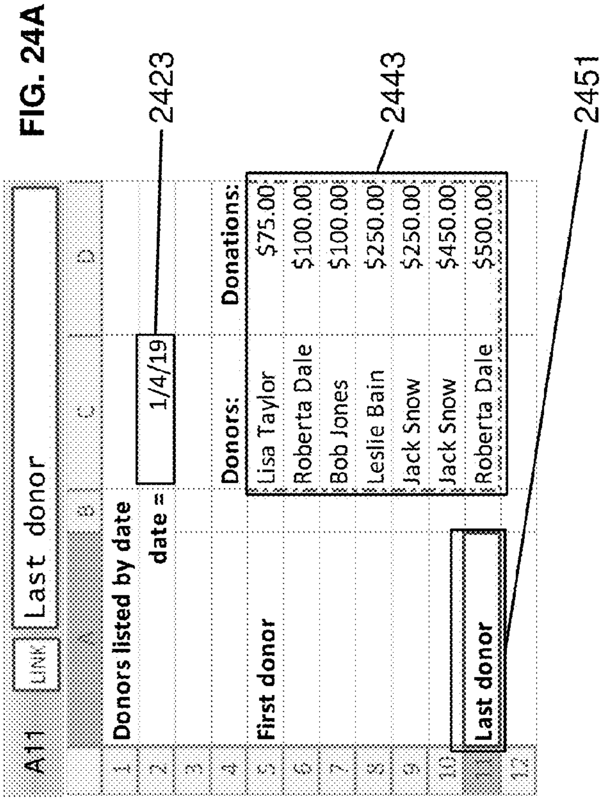
Figure 24B:
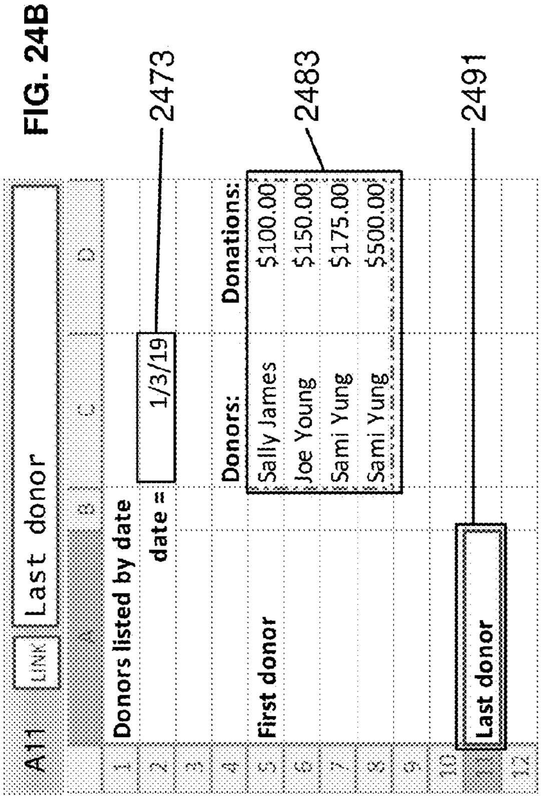
Figure 24C:
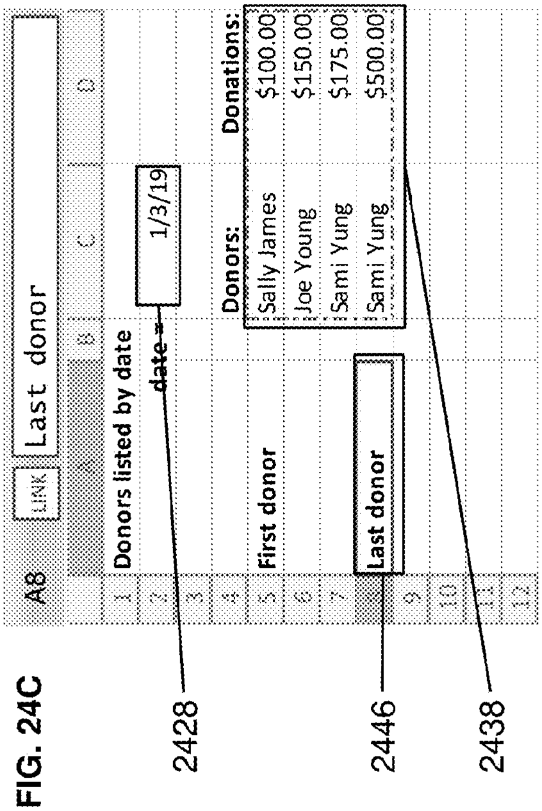

FIG. 24A through FIG. 24D examples our one-way (flex expansion only) and two-way (flex expansion and contraction) movement technologies working for a cell that is movement linked/connected and never in the path of the flex. FIG. 24B and FIG. 24C example the difference in contraction between a one-way (flex expansion) and two-way (flex expansion and contraction) linkage/connection in our technology for cell outside the path of the flex it is linked/connected to. FIG. 24A examples our charity user with a 'WRITE' function outputting all the donors and their donations on a specified day. They decided they wanted to add a 'Last donor' label two cells to the left of the last donor in the list each day. They do that as exampled in cell 'A11' 2451 but because they do not want to have to manually move it each time the length of the list changes they link/connect it to the bottom left corner of the 'WRITE' function instantiated (populated) area 2443. Note, this linkage could be done automatically by our application as will be described later.

However, in FIG. 24B when they change the date in cell 'C2' 2473 to '1/3/19' (from '1/4/19' 2423 in FIG. 24A), they realize that they selected the wrong coordinated movement type in that they selected the one-way (expansion only) and therefore the 'Last donor' label in cell 'A11' 2491 did not automatically move with the contraction of the 'WRITE' instantiated cell range 2483. So, in this embodiment they go back to the linkage/connection setup and change it to the two-way flex (both expansion and contraction) and then redo the date change in FIG. 24C. This time when they change the date in cell 'C2' 2428 in FIG. 24C to '1/3/19' (from '1/4/19'

2423 in FIG. 24A) the 'Last donor' label automatically moves to cell 'A8' 2446 (from cell 'A11' 2451 in FIG. 24A) coordinating it relative spatial positioning two cells to the left of the bottom left corner of the 'WRITE' instantiated range 2438. Thus, exampling how our two-way linkage/connection technology adjusts cell positions even when the cell is not within the path of the flex and maintains its coordinated spatial relationship (relative spatial positioning in this situation).

Figure 24D:
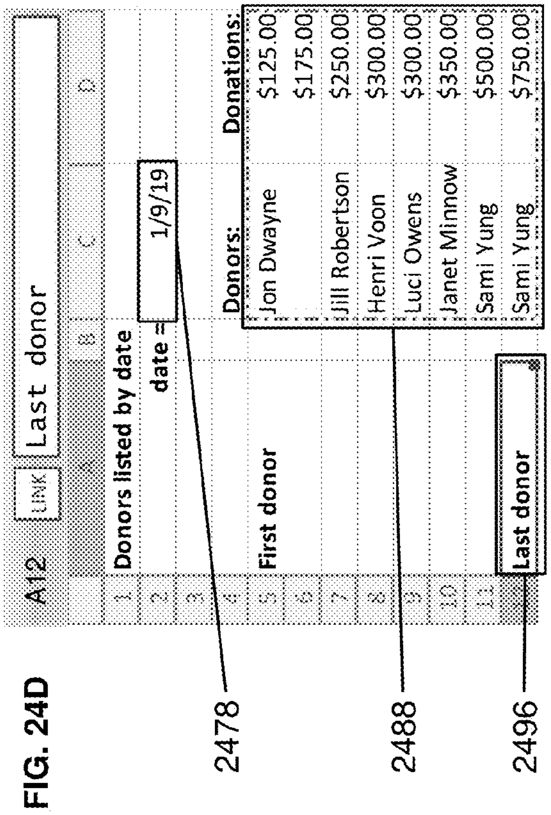

FIG. 24D then examples how our one-way or two-way linkage/connection technology coordinates the spatial positioning in a flex expansion situation (where one-way and two-way do the same thing) where the flex does not overlap the linked/connected cell. In this embodiment it could have been triggered from either FIG. 24B (one-way) or FIG. 24C (two-way) situations as both would automatically move the 'Last donor' label 2496 to cell 'A12' with the flex expansion of the 'WRITE' instantiated range 2488 when the user changed the date '1/9/19' 2478 in cell 'C2'. Therefore, in this embodiment our technology gives a user a choice as to whether they would like expansion only movement or whether they would like both expansion and contraction linked/connected movement. While the one-way technology does not appear to make sense in this situation, had the user instead made the text label say 'Most ever donors' then the one-way option would make sense.

Figure 25A:
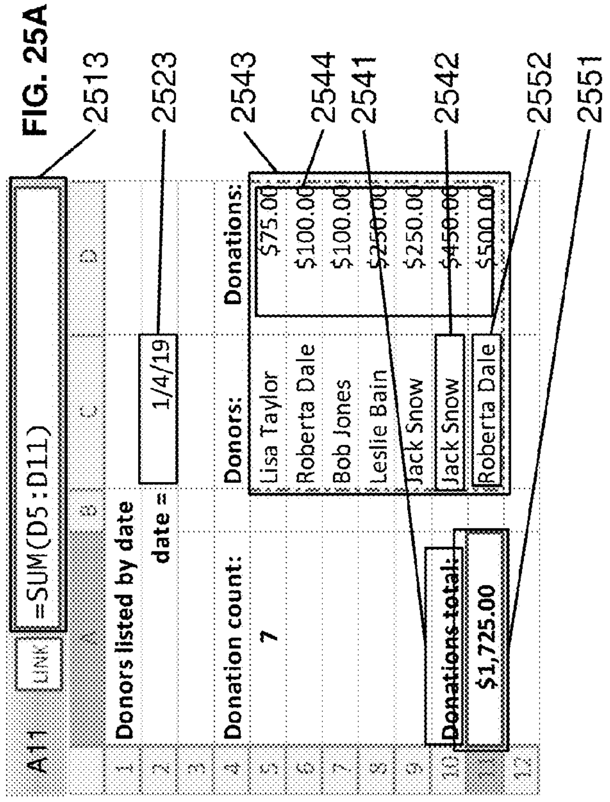
Figure 25B:
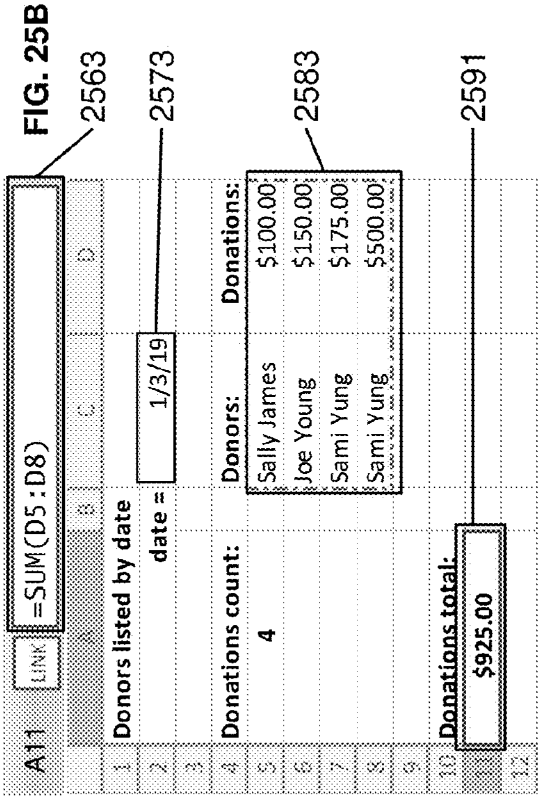
Figure 25C:
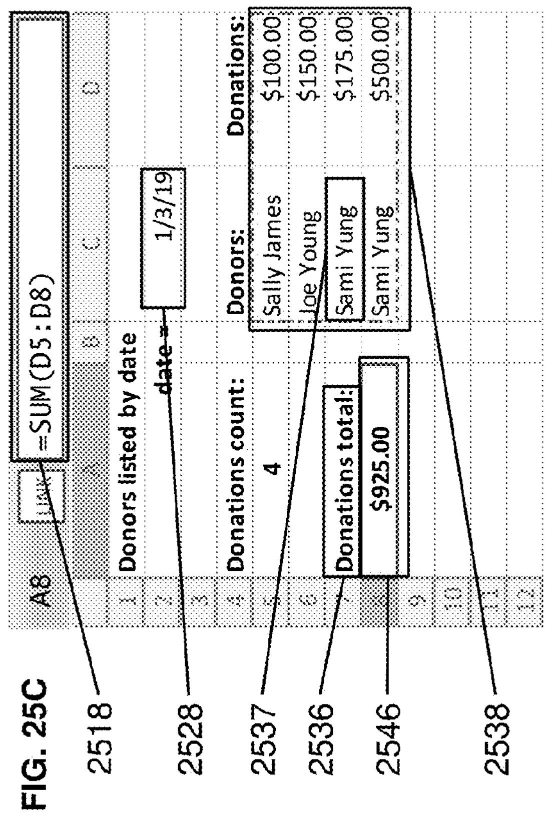

FIG. 25A through FIG. 25D examples our one-way (flex expansion) and two-way (flex expansion and contraction) technologies working for a cell never in the path of the flex that is both movement and formula linked/connected. FIG. 25B and FIG. 25C example the difference in contraction between a one-way (flex expansion) and two-way (flex expansion and contraction) linkage/connection in our technology for cell outside the path of the flex it is both formula and movement linked/connected. FIG. 25A examples our charity user with a 'WRITE' function outputting all the donors and their donations on a specified day. They decided they wanted to add a summation of the donations aligned to the bottom of the 'Donations' flex but two cell to the left of the WRITE instantiating the 'Donors:' and the 'Donations:' 2543. They do that as exampled in cell 'A11' 2551 but because they do not want to have to manually move it each time the length of the list changes, they movement link/connect it to the bottom left corner of the 'WRITE' function instantiated area 2543 and link the formula 2513 to the 'Donations' segment 'D5:D11' 2544 of the 'WRITE' flex 2543.

However, in FIG. 25B when they change the date in cell 'C2' 2573 to '1/3/19' (from '1/4/19' 2523 in FIG. 25A) they realize that they selected the wrong coordinated movement type in that they selected the one-way (expansion only) and therefore the 'Donations' summation formula 2563 in cell 'A11' 2591 did not automatically move with the contraction of the 'WRITE' instantiated cell range 2583. Despite the cell not moving with the contraction the formula 2563 did change with the contraction reflecting the new smaller range 'D5:D8' (versus the original range of 'D5:D11' in the pre-flex formula 2513 FIG. 25A). Our technology could also support the formula not changing for contractions but that is not the case in this example. So, in this embodiment they go back to the linkage/connection setup and change it to the two-way (both expansion and contraction flex) and then redo the date change in FIG. 25C. This time when they change the date in cell 'C2' 2528 to '1/3/19' (from '1/4/19' 2523 in FIG. 25A) the 'Donations' summation formula '=SUM9D5:D8)' 2518 in cell 'A8' 2591 automatically changes (from '=SUM9D5:D11)' 2513 in cell 'A11' 2551) to match the contracted segment in the 'WRITE' flex 2538 and moves with the contraction of the 'WRITE' instantiated cell range to 'A8' 2546 (from cell 'A11' 2551 in FIG. 25A) coordinating it relative spatial positioning two cells to the left of the bottom left corner of the 'WRITE' instantiated range 2538. Thus, exampling the difference between our one-way and two-way technologies for both formulaic and movement linkages/connections. It is also worth noting that the user in these examples changed the one-way to two-way selection for the 'Donations total:' text label above the SUM in the examples.

Figure 25D:
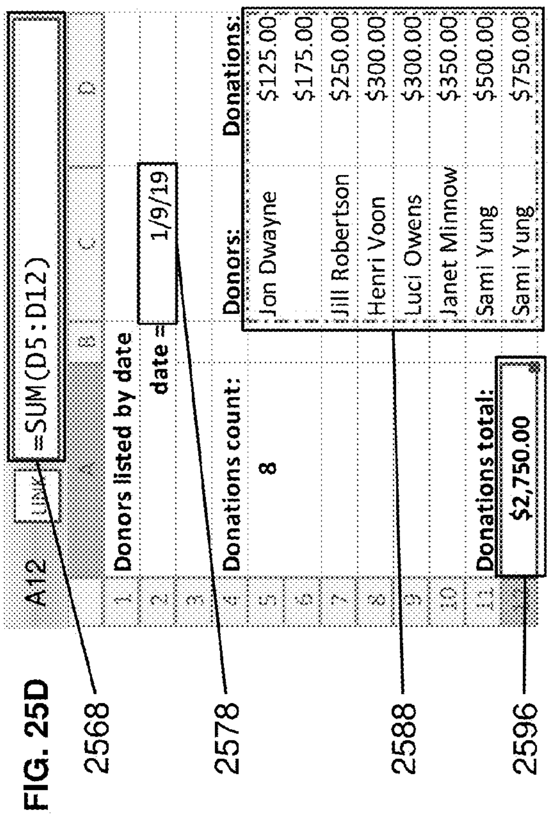

FIG. 25D then examples how our one-way or two-way linkage/connection technology coordinates the relative spatial positioning in a flex expansion situation where the flex does not overlap the linked/connected cell. In this embodiment it could have been triggered from either FIG. 25B (one-way) or FIG. 25C (two-way) situations as both would automatically move the donations SUM to cell 'A12' 2596 with the flex expansion of the 'WRITE' instantiated range 2588 when the user changed the date to '1/9/19' 2578 in cell 'C2'. Therefore, in this embodiment our technology gives a user a choice as to whether they would like expansion only movement or whether they would like both expansion and contraction linked/connected movement and formulas.

Our examples so far have been of spreadsheet capabilities using our 'flex copy paste' capability, however our linkage/connection technology works equally well with any of the other spreadsheet flexing capabilities such as the PivotTable or the Table capabilities (which requires a specialized atomized automatically adjusting range including only the table filtered values). Those capabilities are easily flexed by users changing filter parameter values as we will example next for a PivotTable.

PivotTable Capability Flex

FIG. 26A through FIG. 28B examples different types of our linkage/connection technology connected to a PivotTable flex capability. We are returning to the charity user who has data for donations in France and Spain for two weeks and has used a PivotTable to create a flex range of daily donation sums per country and district combinations with a filter of 'Week'.

Figure 26B:
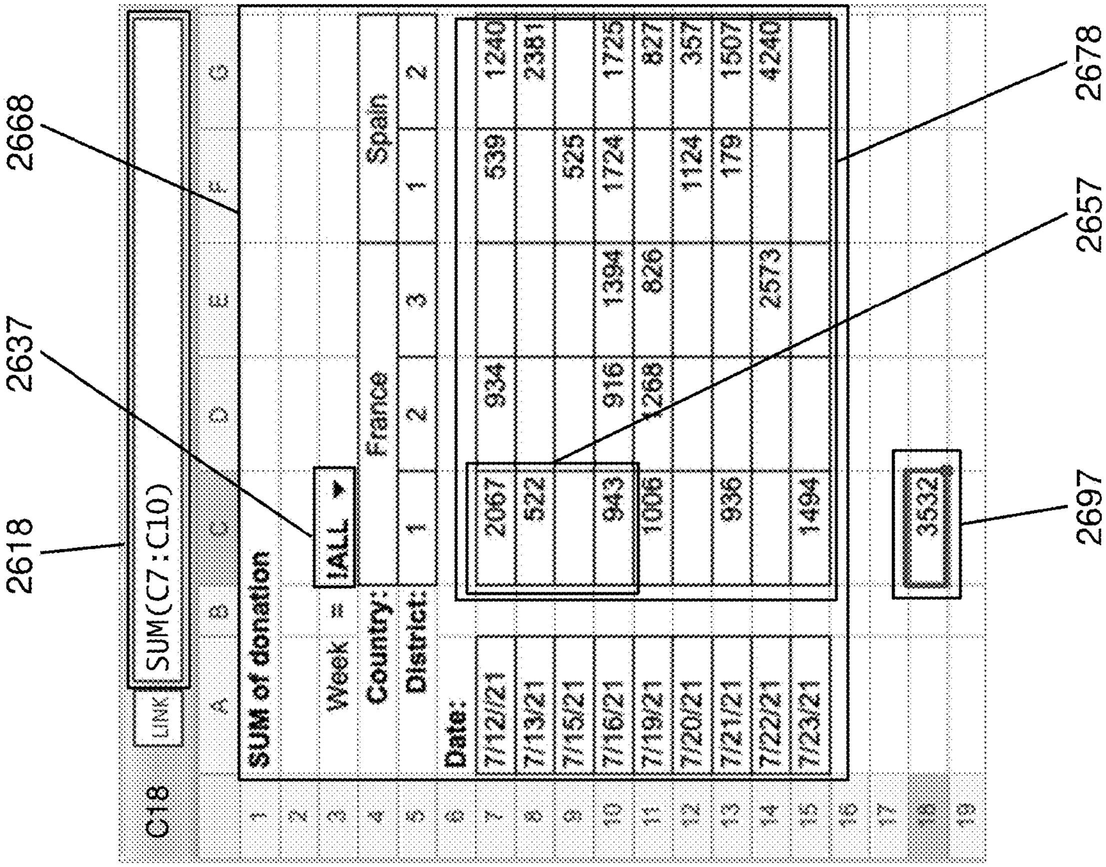
Figure 26A:
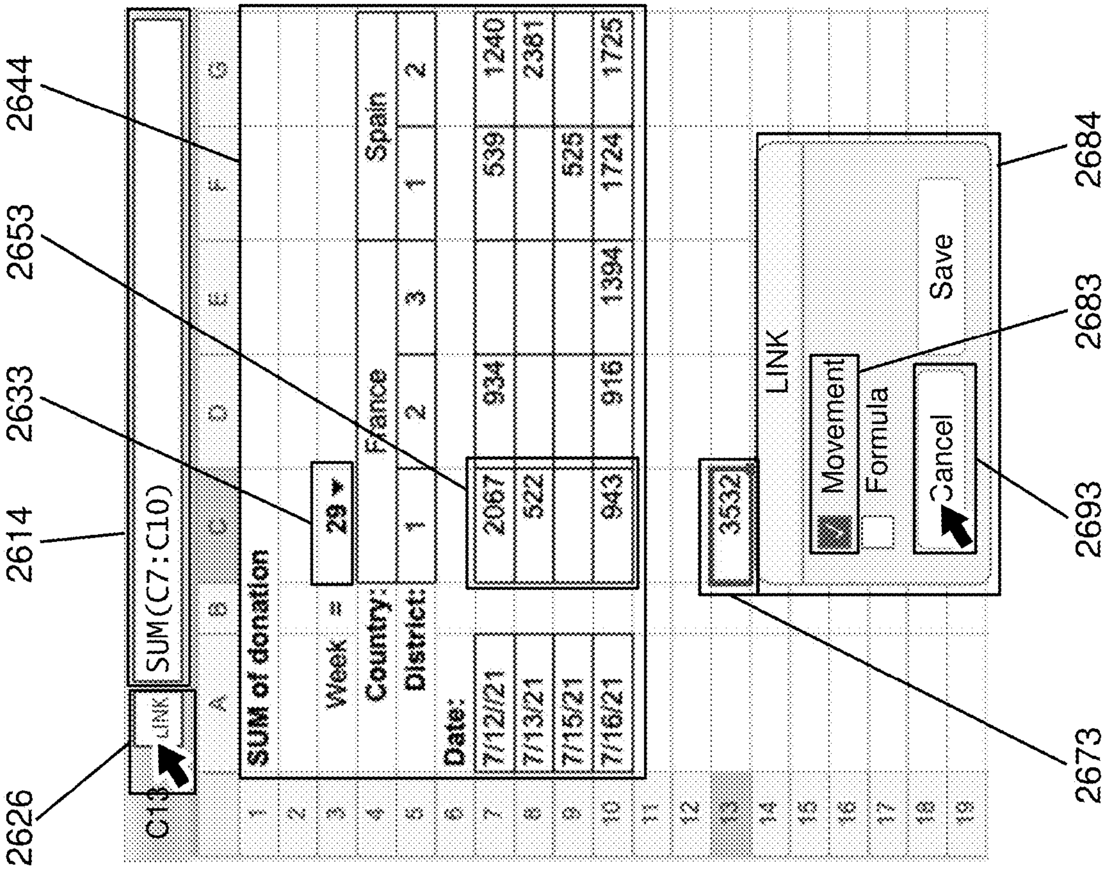

In FIG. 26A the user has decided they would like a sum of all the 'France' district '1' donations for the specified time period. They created this '=SUM(C7:C10)' formula 2614 in cell 'C13' 2673 and linked it to the PivotTable 2644 with our technology. However, they no longer remember what linkage they selected so in this embodiment they click the 'LINK' button 2612 to open the selection list panel 2684 and see that they selected only 'Movement' 2683. They decide they are fine with that, so they click 'Cancel' 2693 and then change the 'Week=' Pivot Table filter parameter to '!ALL' 2637 in FIG. 26B (from '29' 2633 in FIG. 26A). The PivotTable 2668 expands (flexes) and the movement linked cell automatically positionally moves to 'C18' 2697 in FIG. 26B (from 'C13' 2673 in FIG. 26A). Three cells below the lower left corner of the body 2678 of the PivotTable. However, the SUM formula '=SUM(C7:C10)' 2618 does not change (summing the previous total district '1' range 2657) and the user then realizes what they really wanted was to link the cell both positionally (movement) and formulaically (formula), so they proceed to do that as exampled in FIG. 27A.

Figure 27B:
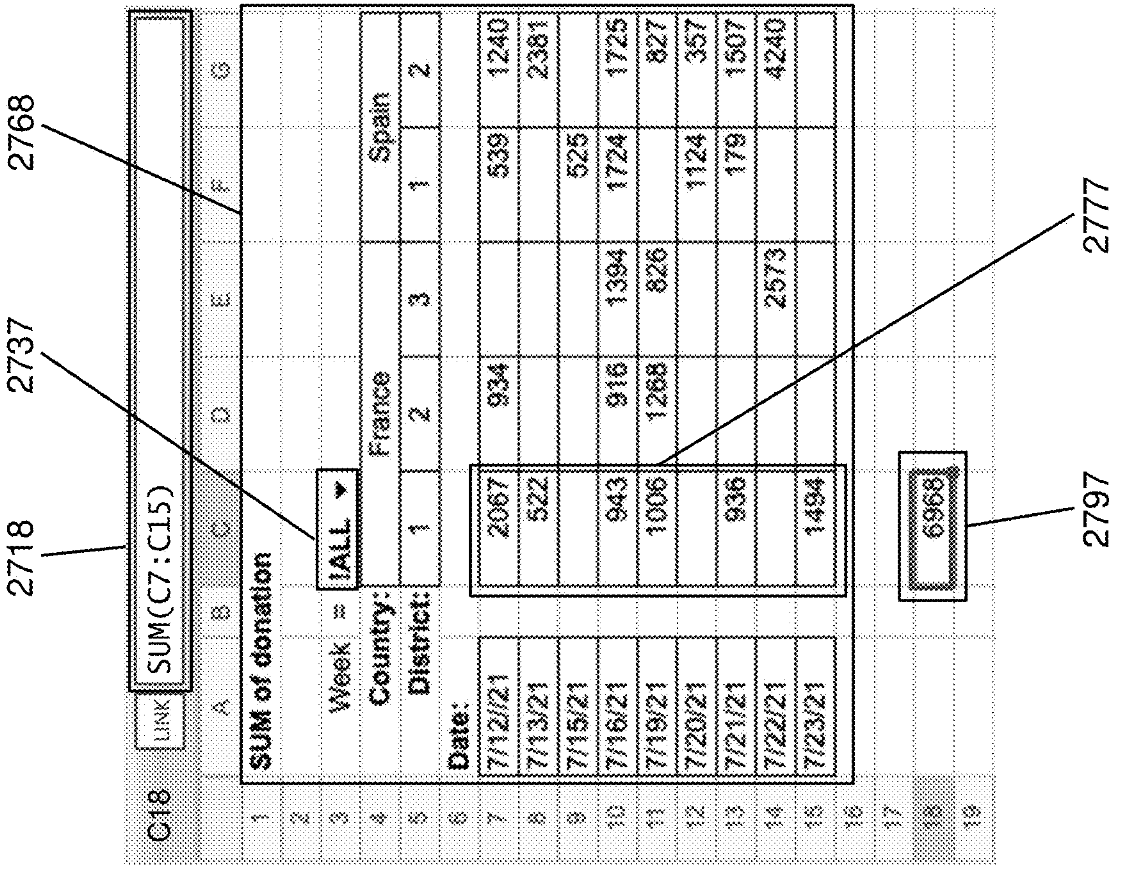
Figure 27A:
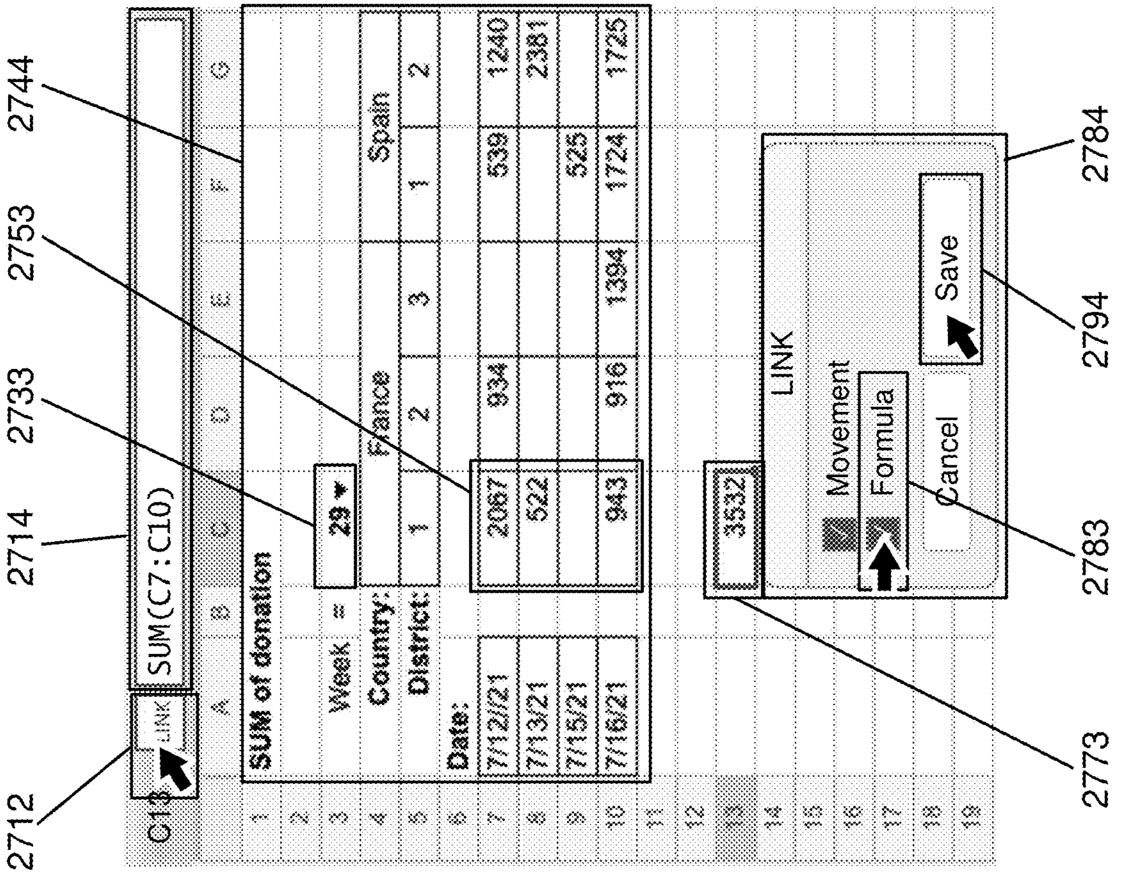

In FIG. 27A the user clicks the 'LINK' button 2712 to reopen the selection list panel 2784 and see that they need to click 'Formula' 'LINK' option as well and do so 2783. They then click 'Save' 2794. Then in FIG. 27B the user changes the 'Week=' to '!ALL' 2737 (from '29' 2733 in FIG.

27A) in the filter. The PivotTable 2768 expands (flexes) and the linked cell positionally moves to 'C18' 2797 (from 'C13' 2773 in FIG. 27A) and the formula '=SUM(C7:C15)' 2718 is automatically adjusted (versus the formula '=SUM(C7:C10)' 2714 in FIG. 27A) for the new larger 'France' district '1' range 2777 resulting in the value '6968' in cell 'C18' 2797 (versus the '3532' in cell 'C13' 2773 in FIG. 27A). Both the position and the formula have been automatically adjusted by our link/connect technology. The movement was coordinated to remain in the third cell below the lower left corner of the body of the PivotTable. The linked/connected summation formula looks like any normal cell range summation formula (e.g., with no extra functions or special arguments) yet it automatically adjusts the formula for changes in its linked/connected flex.

Figure 28B:
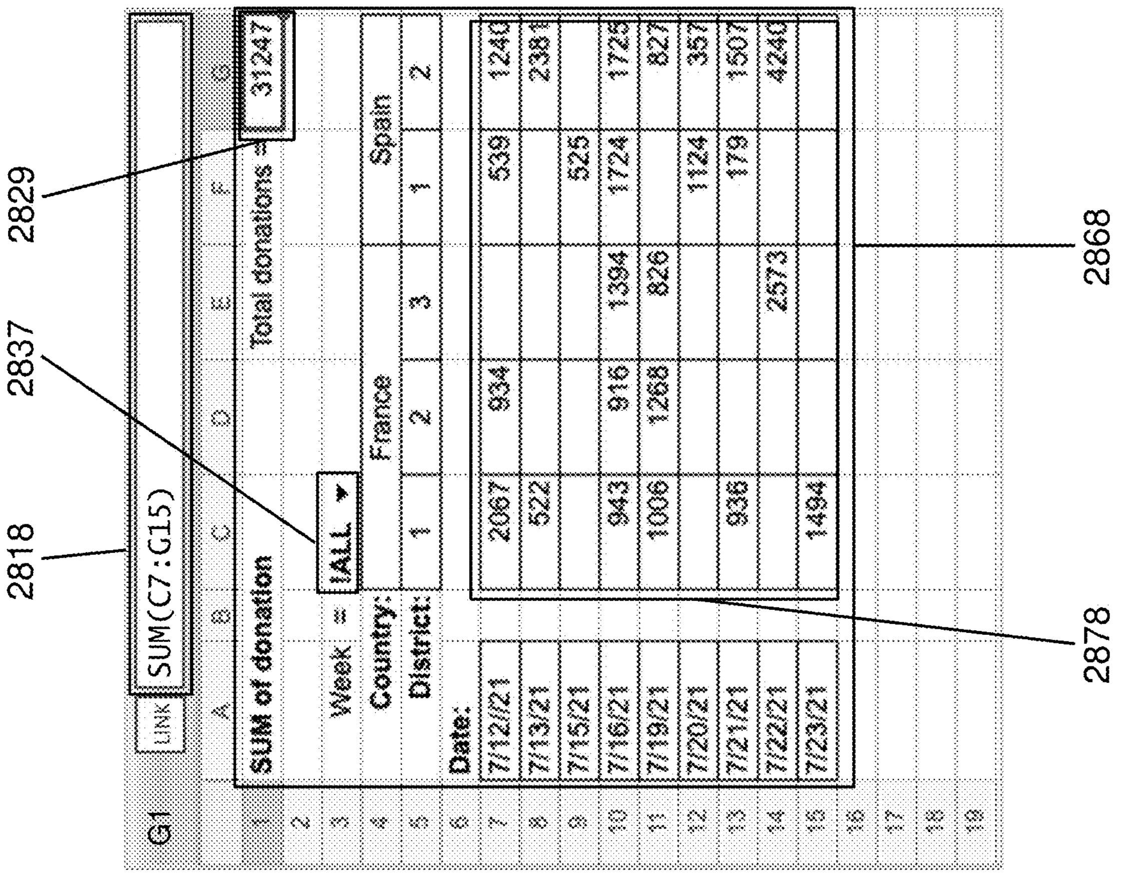
Figure 28A:
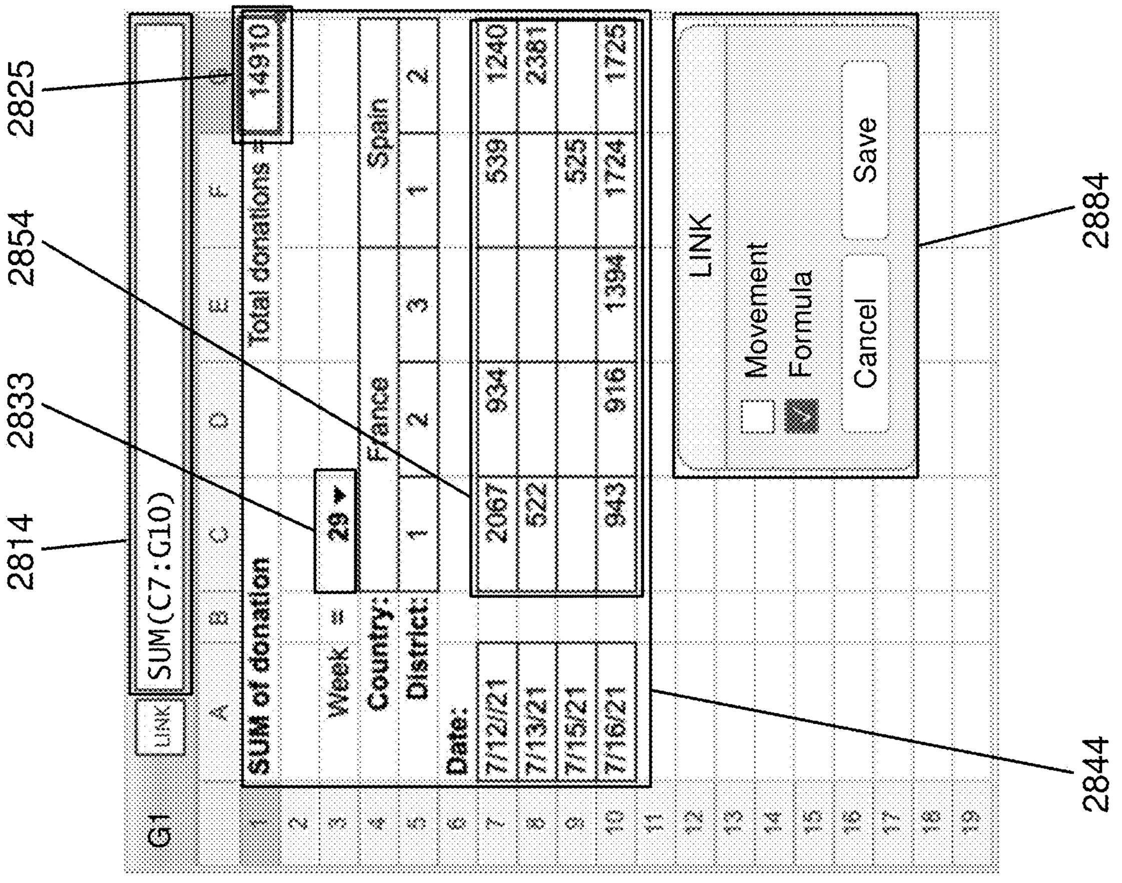

FIG. 28A and FIG. 28B example a formula only linkage to a two-dimensional PivotTable flex range. The charity user has put a total donations calculation formula 2814 in FIG. 28A into cell 'G1' 2825 and formulaically linked it (as shown in the 'LINK' popup 2884). So, when the user changes the 'Week=' to '!ALL' 2837 in FIG. 28B (from '29' 2833 in FIG. 28A) in the filter the PivotTable 2878 expands (flexes) and the formula '=SUM(C7:G15)' 2818 in cell 'G1' 2829 (from '=SUM(C7:G10)' 2814 in cell 'G1' 2825 in FIG. 28A) automatically adjusts for the expansion giving the value '31247' (vs. '14910' 2825 before the flex change). The linkage has automatically adjusted the cell range in the formula from the 26 cells 'C7' through 'G10' 2854 to the 45 cells 'C7' through 'G15' 2878 after. Exampling that our technology works for flexes generated by different capabilities.

We could example a user linking/connecting to the visible rows of a spreadsheet table and then flexing the visible rows of the table by filtering one or more of the table columns, however rather than continuing with more flex capability examples we will example an additional flex function.

FILTER Function Flex

So far, our flex function examples have used variants of our WRITE function, however there are a number of other spreadsheet functions that can flex. Most of them are categorized as 'Lookup and reference' functions, for example CHOOSECOLS, CHOOSEROWS, FILTER, TAKE and UNIQUE. Our link/connect capability works with all the spreadsheet functions that can flex as we will now example for the FILTER function.

FIG. 29A and FIG. 29B example a combination of a positional movement only and a formula and positional movement linkage/connection to a FILTER function flex range in our technology. In this example the cancer researcher wants an average weight change of the test results meeting the filter criteria using the same data used in FIG. 3A and FIG. 3B. FIG. 29A has the average weight change summation calculation formula 2914 in cell 'G9' 2965 and both 'Movement' and "Formula' linked it to the 'G' column of FILTER function output range 2934 as shown in the 'LINK' popup 2984. They have also 'Movement' linked the 'Average=' text in cell 'F9' 2964 to the movement of the cell 'G9' 2965. So, in FIG. 29B when the researcher changes the filter value to '1' 2929 (from '0' 2925 in FIG. 29A) both the 'Average=' text and the SUM positionally move to 'F15' 2978 and 'G15' 2979, respectively. The SUM calculation 2918 in 'G15' 2979 also automatically adjusts for the FILTER flex changing its range from 'G2:G7' 2934 in FIG. 29A to 'G2:G13' 2958 in FIG. 29B. These changes are reflected in the formula '=AVERAGE(G2:G7)' 2914 in FIG. 29A automatically changing to 2918 '=AVERAGE(G2:G13)' in FIG. 29B.

This example illustrates many capabilities of our link/connect technology. The formula link/connect to a segment (column 'G') of the FILTER flex output with 'AVERAGE' formulas (2914 and 2918) with arguments that look like a normal average function formulas. In this embodiment the user sees that one or more LINK exists for the highlighted cell 'G9' 2965 via the 'LINK' button 2912 and the purple outline 2914 in the formula bar in FIG. 29A and also sees the two checked linkages/connections in the popup 2984. The 'Movement' linkage/connection coordinates the relative spatial movement so that the summation cell stays in the second cell below the FILTER flex in column 'G'. The 'Average=' text label is indirectly linked/connected to the FILTER flex via the summation cell and our technology coordinates its movement so that its movement is adjusted to be in the cell to the left of the summation cell. With our two-way link/connect technology that coordinated movement would occur for flex contraction of the FILTER instantiated range.

The preceding examples have shown a small fraction of the different flex functions and flex capabilities that our linkage/connect technology works for. However, rather than exampling more one- or two-dimensional flex examples for different flex functions or capabilities, we will example some of our different linkage setup technologies before exampling our technologies for handling more complicated movement situations.

Linkage Setup

As we will example, our linkage/connection technology can be setup by both manual and automatic embodiments. It can be setup with both visible and invisible arguments, subject of U.S. Application No. 63/337,576, titled "Methods and Systems for Spreadsheet Function and Flex Copy-Paste Control of Formatting and Use of Selection List Panels," filed 2 May 2022. Linkages can be reverted or removed in a broad spectrum of different ways, some of which will be exampled.

Manual Linkage Setup

The manual setup of our linkage/connection technology of one or more cells linked/connected to one or more flex capability or function can be executed several ways. It can be started from a spreadsheet ribbon button or control, from a menu selection, from a UI selection or other mechanism. The selection of linkage/connection types(s) also can be done many ways, e.g., by a menu selection(s), selection list panel or other UI.

Manual Linkage Setup with Invisible Linkage Arguments

FIG. 34A through FIG. 34C examples manual linkage/connection setup via a ribbon button triggered popup selection panel, that instantiates the cell formula with invisible linkage/connection arguments. In this embodiment the user starts by highlighting/opening the cell or cells of interest, in this example cell 'A4' 3431 in FIG. 34A. They then click the 'LINK' ribbon button 3417 which opens a linkage/connection type selector popup 3456 in FIG. 34B. In this embodiment that selector offers all types of linkage/connection options 3456—'Formula, 'Movement' and 'Both'. In other embodiments our technology could screen those options for only the relevant ones, disabling or not showing those that are not relevant. For example, if the cell or cells do not contain a formula (e.g., just contain text) then our technology would disable or not show the 'Formula' option and therefore also disable or not show the 'Both' option. If there is no flexing function or capability on the worksheet, then our technology could disable or not show the 'Movement' option. And obviously, if one of the options is disabled or not shown then the 'Both' option would also be disabled or not shown.

In this example the user selects the 'Formula' 3446 link/connect option in FIG. 34B because their cell formula 3442 of cell 'A4' 3471 includes the range 'C4:F4' which is a 'flex copy paste' range and is the linkage/connection they desire. This delivers the formula 'LINK' (linkage/connection) with an invisible argument as exampled in FIG. 34C. In this embodiment the user sees the link/connection via the purple 'LINK' button 3481, the purple outlining of the cell 3491 (when it is highlighted/opened) and the purple outlining of the formula bar formula box 3487. They also see the linked/connected flex space 3494 outlined, in this embodiment, with the light blue dot dash indicating it is a 'flex copy paste' range. Note, the flex copy paste outlining could have been the blue dashed outlining shown in previous examples but in this embodiment used a different outlining. At this point the linked/connected cell's formula will automatically adjust for any changes in the flex space or segment of the flex space that it is linked/connected to. And the user sees the same 'SUM' formula 3482 in FIG. 34C that they started with 3442 in FIG. 34B before the link/connection, with no added functions or visible formula/argument changes to the 'SUM' formula.

Seeing and changing the linkage/connection in our technology can be done many different ways. FIG. 35A through FIG. 35C examples approaches for changing our formulaic, movement and both formulaic and movement linkages/connections. FIG. 35A examples the user clicking on the formula bar 'LINK' button 3512 to open a UI 3523 that displays the current link/connect setting 'Formula' 3522 and the other options for the selected cell 'A4' 3533. In this example and in this embodiment, the link/connect options which are not applicable ('Movement' and 'Both') are disabled and grayed out in the UI 3523. Those options are not available because there is nothing on this worksheet that can move ('Movement') cell 'A4' 3533 and therefore there is also no 'Both' option. So, the only other option is 'Unlink' 3521 which the user can select to remove the formula linkage/connection to the flex 3535. Note that in this embodiment that removal of the formula linkage/connection will not change the formula 3515 in the formula bar because there is no visible linkage/connection argument in the formula. In this embodiment the existence of the linkage/connection is done through other visuals, as previously described, for the user.

FIG. 35B examples the user clicking on the formula bar 'LINK' button 3542 to open a UI 3553 that displays the current link/connect setting 'Movement' 3552 and the other option of 'Unlink' 3551 for the selected cell 'C4' 3565. In this example only actionable options are shown in the UI 3553. The other options are not available because the text in cell 'C4' 3564 cannot be formulaically linked/connected and therefore there is also no 'Both' option. In this example there is no visible link/connect argument in the formula 3545 in the formula bar. The user has movement linked/connected cell 'C4' 3565 to the second to the last cell in the flex range 3564 above it to use as a label for the linked/connected calculation exampled in FIG. 35C.

FIG. 35C examples the user having added a formula and movement linked calculation of the total donations in cell 'D4' 3595. In this example the user has clicked on the formula bar 'LINK' button 3572 to open a UI 3583 that displays the current link/connect setting 'Both' 3581 and the other options of 'Unlink', 'Formula' or 'Movement'. The user has all these options available to them as cell 'D4' 3585 is currently both formula and movement linked/connected to the flex 3584. They have the full set of options should they want to make a change. There also is no visible linkage/connection argument in the formula 3575 in the formula bar so a change to unlink the cell would not change the SUM formula 3575. Although in this embodiment it would change other visible indications that the cell is linked (e.g., the purple 'LINK' button 3572, the purple outlining of the formula bar formula 3575, the purple outlining of the highlighted cell 'D4' 3595, and the light blue outlining of the linked flex 3584).

The UIs' displaying the link/connection argument value in FIG. 35A through FIG. 35C could be shown and triggered in different ways in our technology. For example, from the ribbon 'LINK' buttons 3519/3549/3579, from right click menus, other menus, and other UI selectors. Our technology also supports formulas with different types of visible link/connect arguments as we will example next, given all the previous examples had invisible link/connect formula arguments.

Manual Linkage Setup with Visible Linkage Arguments

FIG. 36A through FIG. 36C examples two different embodiments delivering different types of visible link/connect arguments. One where the visible argument is added directly into the regular formula and a second where it is visible in a switchable separate formula. FIG. 36A examples a visible link argument equivalent of FIG. 34C where the link argument 'LINK[FLEX_FORMULA(C4:F4)]' is added to the 'SUM' formula separated by a '|' in the formula 3624. Otherwise in this embodiment the 'LINK' button 3621, the purple highlighting of the linked/connected cell 3631, the purple highlighting of the formula bar formula 3624, and the outlining of the of the flex area involved in the link 3634 is similar to FIG. 34C. While there are several ways those other link/connect identifiers could be changed or omitted (particularly omitted given the visible argument), they were kept the same here to focus in on the visible formula difference.

FIG. 36B and FIG. 36C examples a different way of making visible the link argument without altering the regular 'SUM' formula arguments (or any other range or array function formula as exampled by the 'SUM'). In this embodiment the different arguments of the formula are made visible in two different formulas which are switched in this embodiment via the formula bar button. The purple '$f_x$' button 3641 shown in FIG. 36B lets the user know they are looking at the normal formula 3644 of a linked cell as does the same purple/light blue outlining outcomes (3671 and 3674) as FIG. 34C (3691 and 3694). However, the purple of the '$f_x$' button 3641 in FIG. 36B, in this embodiment, also informs the user that the cell is linked/connected. So, when the user clicks the purple '$f_x$' button 3641 that button changes to the purple '$f_L$' button 3681, exampled in FIG. 36C, telling the user they are now looking at the link formula 3684. Otherwise, the purple/light blue outlining outcomes (3691 and 3694) have not changed from those in FIG. 36B (3671 and 3674). In this embodiment the buttons, the 'LINK' ribbon bar and/or menu selections could also give the user the option to change or remove the link argument.

While FIG. 36A examples an embodiment of our technology where a link/connect argument is added to the normal range function formula. It makes the formula more complicated and thus potentially more confusing to users. FIG. 36B and FIG. 36C examples an embodiment of our technology with a mechanism for displaying a link/connect argument without making the regular range or array function formula more complicated by employing a separate switchable link/connect formula which is not visible when the regular formula is visible. Our technology supports multiple ways for the user to see that they have added a formula and/or movement link without making the regular formula content in the cell more complex (i.e., adding additional argument(s)).

FIG. 37A through FIG. 37C examples a menu link/connection setup embodiment paired with our switchable (regular and separate link argument formula) visible link/connect arguments. That menu UI could be accessed several ways, such as a right click or from a menu bar. In FIG. 37A the user right clicked initiated seeing the options 3743 including those to select a type of link/connect. In this example the user selected the 'Link Formulas' option 3733 to get the outcome in FIG. 37B. This transformed cell 'A4' 3732 in FIG. 37A from a regular cell with a regular formula 3714, to a linked/connected cell with the button change (3762) and purple/green outlining changes (3772, and 3774) previous described in FIG. 36B. The only difference is this example is the flex range is populated by a 'WRITE_H' so in this embodiment the outline around cells 'C4' to 'F4' is a green dot dash 3774, rather than the light blue of a 'flex copy paste' range (in these embodiments). The regular 'SUM' calculation formula 3764 in FIG. 37B is visibly unchanged from the pre-linkage formula 3714 in FIG. 37A and the same as in FIG. 36B 3644. However, in this embodiment the link argument 3784 in FIG. 37C

'FLEX_FORMULA[WRITE_$H(C4:F4)$])' triggered by the click 3762 in FIG. 37B identifies that the formula flex is linked to a 'WRITE_H' function as shown in FIG. 37C.

Manual Linkage Setup to Specific Flex Segment

Figures 38A, 38B, 38C, 38D:
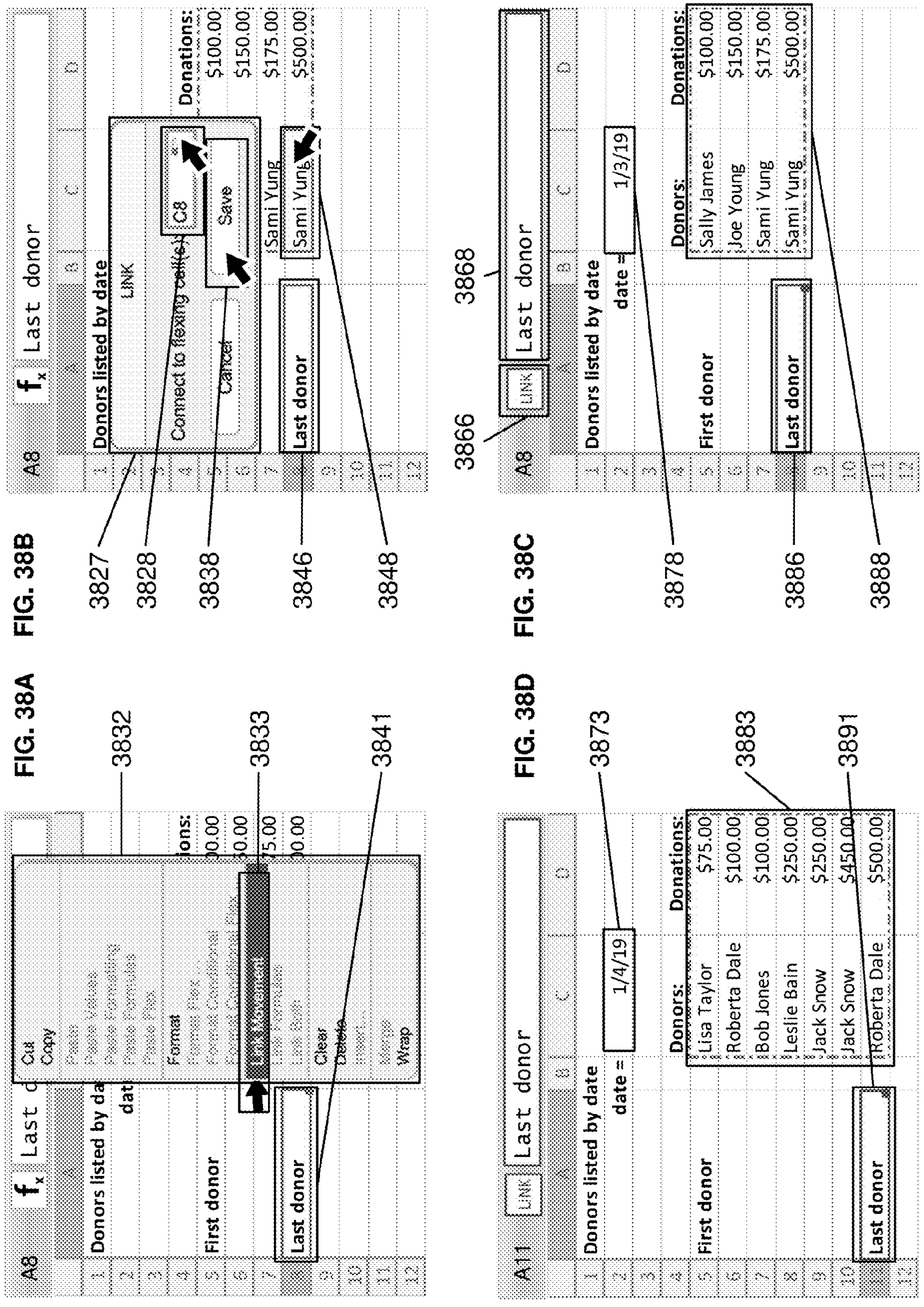
Figures 39A, 39B, 39C, 39D:
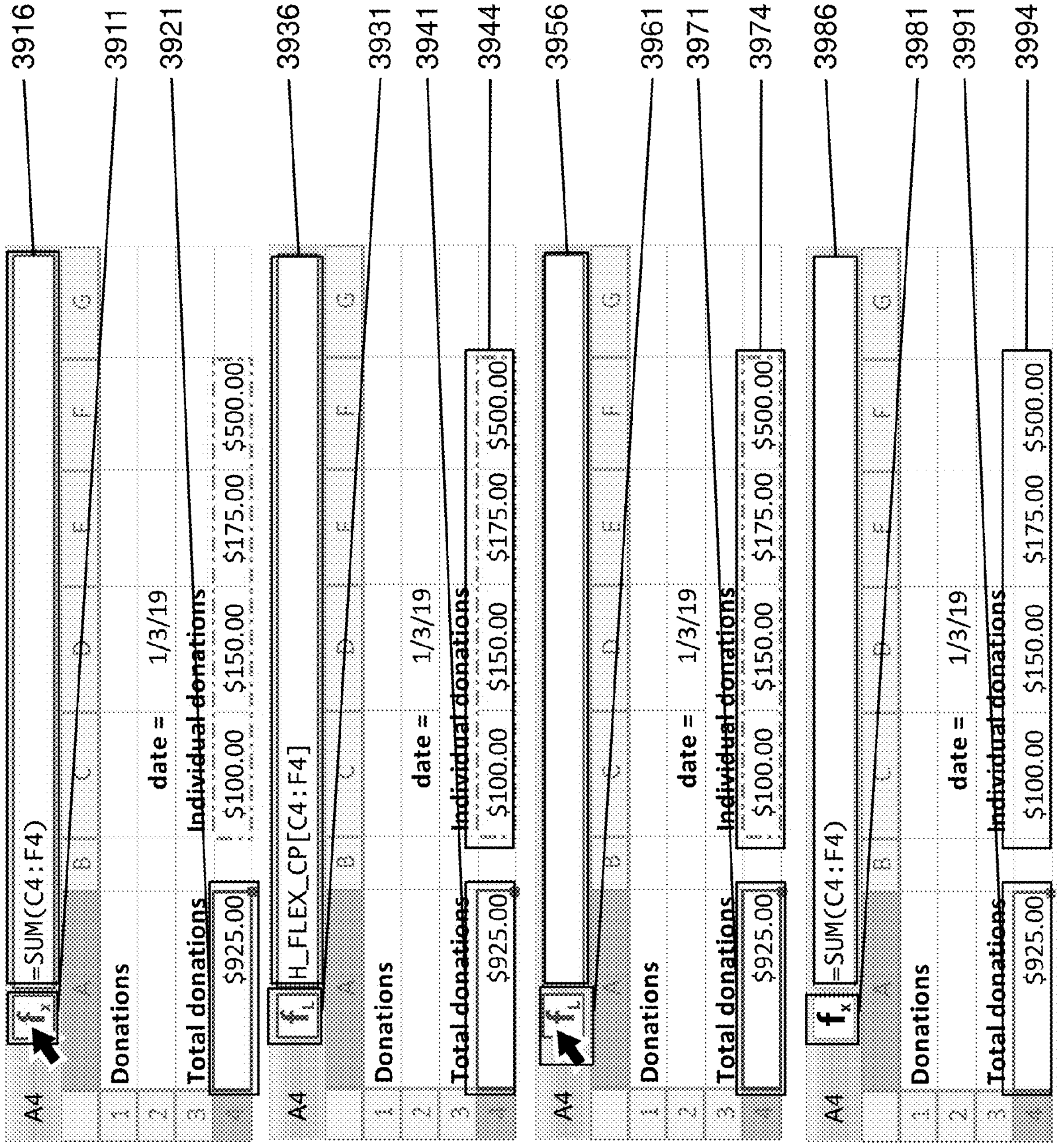

FIG. 38A through FIG. 38D examples a menu triggered link setup for a movement only link/connection with invisible link arguments connecting to a specific segment cell location within a flex range. In FIG. 38A the user right clicked, or menu initiated, seeing the options 3832 including those to select a type of link for cell 'A8' 3841. Note, in this embodiment the 'Link Formulas' and 'Link Both' options are disabled (grayed out) because they are not applicable to the text in cell 'A8' 3841. In this example the user selects the 'Link Movement' option 3833 to open the 'LINK' popup 3827 in FIG. 38B. Here the user selects a linkage to a single cell 'C8' 3848 via a click at the lower left edge of WRITE populated range (identified by its light green dot dash outline in this embodiment). This populates 'C8' 3828 into the popup 3827 after which the user clicks 'Save' 3838 to get the result in in FIG. 38C. In this embodiment they see the purple outlined selected cell 'A8' 3886 and the purple 'LINK' button 3866 and purple outlining in the formula bar 3868. The user then changes the date value in cell 'C2' from '1/3/19' 3878 in FIG. 38C to '1/4/19' 3873 in FIG. 38D. That flexes the WRITE from eight cells 3888 in FIG. 38C to fourteen cells 3883 in FIG. 38D automatically moving the linked label from cell 'A8' 3886 in FIG. 38C to cell 'A11' 3891 in FIG. 38D. This examples our technology coordinating the movement of a cell which is not in the potential expansion area of the flex range. It examples the linkage/connection of a cell two columns to the left (3886 in FIG. 38C and 3891 in FIG. 38D) of the lower left corner of the flex range (3888 in FIG. 38C and 3883 in FIG. 38D). Our technology coordinates the movement so that same relative row and column position (pre-flex) is maintained after the flex expansion. And with our two-way linkage/connection our technology would work the same way for flex contraction, for example if the user in FIG. 38D changed the date '1/4/19' 3873 back to '1/3/19' 3878 they would get the outcome in FIG. 38C.

While we could example many more ways to setup the different types of links/connects for single and multiple direct and indirect cascading linkages/connections with and without visible arguments, we will instead move on to removing those linkages/connections and then automatic application of the linkages/connections.

Link Removal

Just as there are many ways in our technology to setup the link/connection technology, there are numerous ways to remove them. FIG. 39A through FIG. 40C example two very different approaches, one removing a visible link argument and the other using a selector to remove an invisible link argument.

FIG. 39A through FIG. 39D examples the removal of a link/connection by removing the link/connect argument from the example shown in FIG. 36C. The user starts in FIG. 39A with the normal formula view of the linked cell 'A4' 3921. They then click on the purple '$f_x$' button 3911 and that button changes to the purple '$f_L$' button 3931, exampled in FIG. 39B. This changes the formula to the link argument 3936 but otherwise does not change the display of the linked value in cell 'A4' 3941 and the outlining 3944 of the cells that it is linked to. In this embodiment the user can then remove the link argument in the formula bar formula as done in FIG. 39C 3956. Once that removal is confirmed, in this embodiment, by clicking on the '$f_L$' button 3961 (or hitting enter), the formula is reverted to a non-linked/non-connected formula 3986 in FIG. 39D with a normal '$f_x$' button 3981 with the purple outlining gone—signifying that the linkage is gone. The cell 'A4' 3991 is no longer highlighted in purple but instead the normal dark green, and the flex copy paste range 3994 is no longer outlined because it is no longer linked/connected to the highlighted/opened cell 'A4' 3991. The user has removed that linkage/connection and now has a normal formula that will not adjust its range size with changes to the 'flex copy paste'.

FIG. 40A through FIG. 40C examples the removal of an invisible link argument using a selector popup triggered by a formula bar 'LINK' button, a ribbon 'LINK' button, or a menu selection. FIG. 40A examples the user clicking the formula bar 'LINK' button 4012 to open the selector popup 4022 which lists the potential link/connect actions of 'Remove the formula link' or 'Add movement link' for the highlighted cell 'A4' 4032. In this situation the user decides to click 'Remove the formula link' 4023 which delivers the outcome in FIG. 40C. The linkage purple outlining 4032 (in FIG. 40A) is replaced by the normal green 4092 (in FIG. 40C) and light blue dot dash outlining of the linked flex range 4034 (in FIG. 40A) disappears 4094 (in FIG. 40C). The formula bar purple 'LINK' button 4012 (in FIG. 40A) is replaced by the normal formula bar '$f_x$' button 4082 (in FIG. 40C). All showing the link/connection is gone.

FIG. 40B examples the user clicking the ribbon 'LINK' button 4048 to initiate the same operations, it opens the selector popup 4057 which similarly lists the potential actions of 'Remove the formula link' or 'Add movement link' for the highlighted cell 'A4' 4062. In this situation the user also decides to click 'Remove the formula link' 4047 which also delivers the outcome in FIG. 40C. The linkage purple outlining 4062 (in FIG. 40B) is replaced by the normal green 4092 (in FIG. 40C) and light blue dot dash outlining of the linked flex range 4064 (in FIG. 40B) disappears 4094 (in FIG. 40C). The formula bar purple 'LINK' button 4042 (in FIG. 40B) is replaced by the normal formula bar '$f_x$' button 4082 (in FIG. 40C). Again, showing that the linkage/connection is gone.

While there are several additional ways the linkage/connection removal actions could be initiated and executed, we will instead move on to exampling how our technology supports the automatic setting of linkages/connections.

Automatic Linkage Setup

Our linkage technology supports many different automated linkage/connection setups. It supports automatically setting up the different types of linkages/connections, setting them up for all different types of flexing, with direct or indirect linkages/connections, with visible or invisible arguments, for single or complex multi-dimensional linkages/connections. We will start with the simplest of situations to example the basic principles of how they work and then come back later to the complex multi-dimensional linkages/connections and there more complicated principles.

Automatic Linkage Setup—Invisible Argument(s)

FIG. 41A through FIG. 41C examples an automatic setup of a formulaic link/connect connected to a one-dimensional 'flex copy paste' with an invisible link/connect argument. The cell being linked ('A4') has no flex functions in its worksheet that could move it, so movement flex is not an option and the only option for this cell is formula linkage. The user is creating a 'Total donations' SUM in cell 'A4' 4131 in FIG. 41A and would like it to always sum the entire set of daily donations for the 'flex copy paste' range in its row. To do so they construct the formula 4113 like they normally would selecting the first cell of the range 'C4' 4132 then selecting to "F4' 4174 FIG. 41B adding the current end cell of the range 4174 into the formula 4153 for the formula in cell 'A4' 4171. The user then hits ENTER like they normally would except the difference is our technology sees the 'flex copy paste' range 4174 that the formula is connected to and therefore automatically sets up the formulaic linkage as shown in FIG. 41C. In this embodiment the linkage/connection is shown by the replacement of the formula bar '$f_x$' button 4151 (in FIG. 41B) with the purple 'LINK' button 4181 (in FIG. 41C), the green cell highlighting 4171 (in FIG. 41B) is replaced by the link purple 4191 (in FIG. 41C), the formula bar formula is outlined in purple 4187 (in FIG. 41C), and the linked 'flex copy paste' range is outlined in its light blue dot dash 4194 (in FIG. 41C). While these indications of linkage could be very different in different embodiments, the user is given a visual identification that the cell in question is linked/connected. In this example there is no visual linkage argument, and the 'SUM' formula looks otherwise like a regular 'SUM' formula, but as we will example next our automatic link/connect technology supports different versions of visual linkage/connect arguments.

Automatic Linkage Setup—Visible Argument(s)

FIG. 42A through FIG. 42C examples an automatic set up of a formulaic link/connect in our technology to a one-dimensional 'flex copy paste' delivering a visible link/connect argument. The user situation is identical to that in FIG. 41A through FIG. 41C. The user constructs the formula 4213 for cell 'A4' 4231 like they normally would selecting the first cell of the range 'C4' 4232 and then in FIG. 42B adding the current end cell of the range 4274 into the formula 4253 for the formula in cell 'A4' 4271. The user then hits ENTER like they normally would except the difference is our technology sees the 'flex copy paste' range 4274 that the formula is connected to and therefore automatically sets up the formulaic linkage as shown in FIG. 42C. In this embodiment our technology automatically populates the link/connect argument '|LINK[FLEX_FORM (C4:F4)]' 4284 in the formula 4283. It also automatically replaces the formula bar '$f_x$' button 4251 with the purple 'LINK' button 4281 (in FIG. 42C), replacing the green cell highlighting 4271 (in FIG. 42CB) with the link purple 4291 (in FIG. 42C), outlines the formula bar formula in purple 4283 (in FIG. 42C), and outlines the linked flex copy paste range in its light blue dot dash 4294 (in FIG. 42C). Thus, the user simply created the 'SUM' formula as they normally would, and our technology automatically sets up the formula linkage/connection.

Figures 43A, 43B, 43C, 43D:
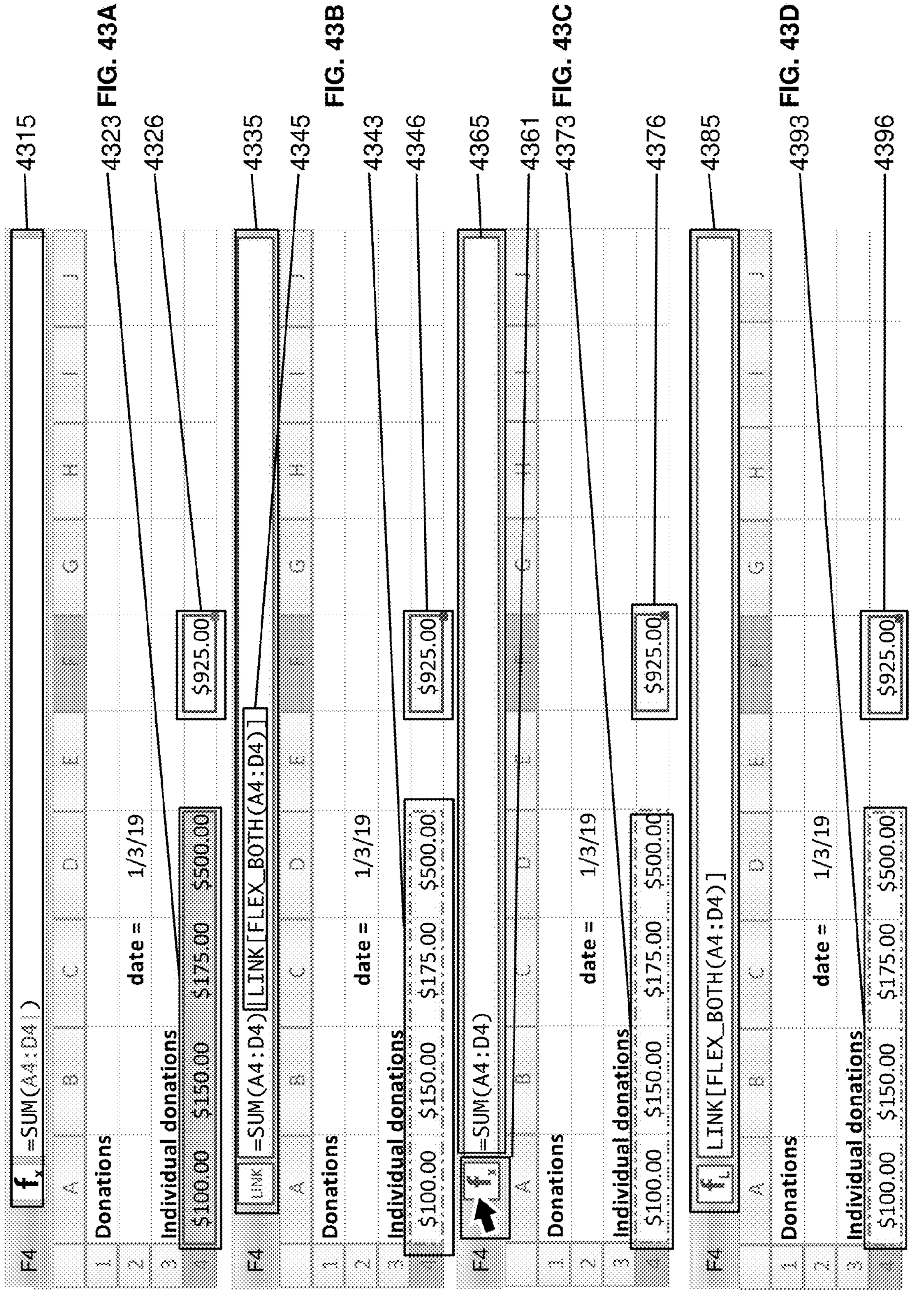

FIG. 43A and FIG. 43B examples an automatic set up of a formulaic and movement link/connect to a one-dimensional 'flex copy paste' with a visible linkage/connection argument. In FIG. 43A the user constructs the formula 4315 for cell 'F4' 4326 like they normally would selecting the cell range 'A4' to 'D4' 4323 into the '=SUM(A4"D4)' formula. However, when the user hits ENTER like they normally would our technology sees the 'flex copy paste' range 4323 that the formula is connected to and therefore automatically sets up the formulaic linkage as shown in FIG. 43B. Our technology also sees that cell 'F4' 4346 is in the potential path of the 'flex copy paste' 4343 in the same row and therefore automatically sets up the movement linkage/connection. In this embodiment both the linkage/connection settings are automatically shown in the link/connect argument '|LINK[FLEX_BOTH(A4:D4)]' 4345 in the formula 4335. The 'FLEX_BOTH' term in the argument tells the user that both linkages/connections have been set up. In this embodiment the linkage/connection is also automatically shown by the replacement of the formula bar '$f_x$' button 4315 (in FIG. 43A) with the purple 'LINK' button 4335 (in FIG. 43B), the replacement of the green cell highlighting 4326 (in FIG. 43A) by the link purple 4346 (in FIG. 43B), the formula bar formula outlined in purple 4335 (in FIG. 43B), and the linked 'flex copy paste' range outlined in its light blue dot dash 4343 (in FIG. 43B).

Figures 44A, 44B, 44C, 44D:
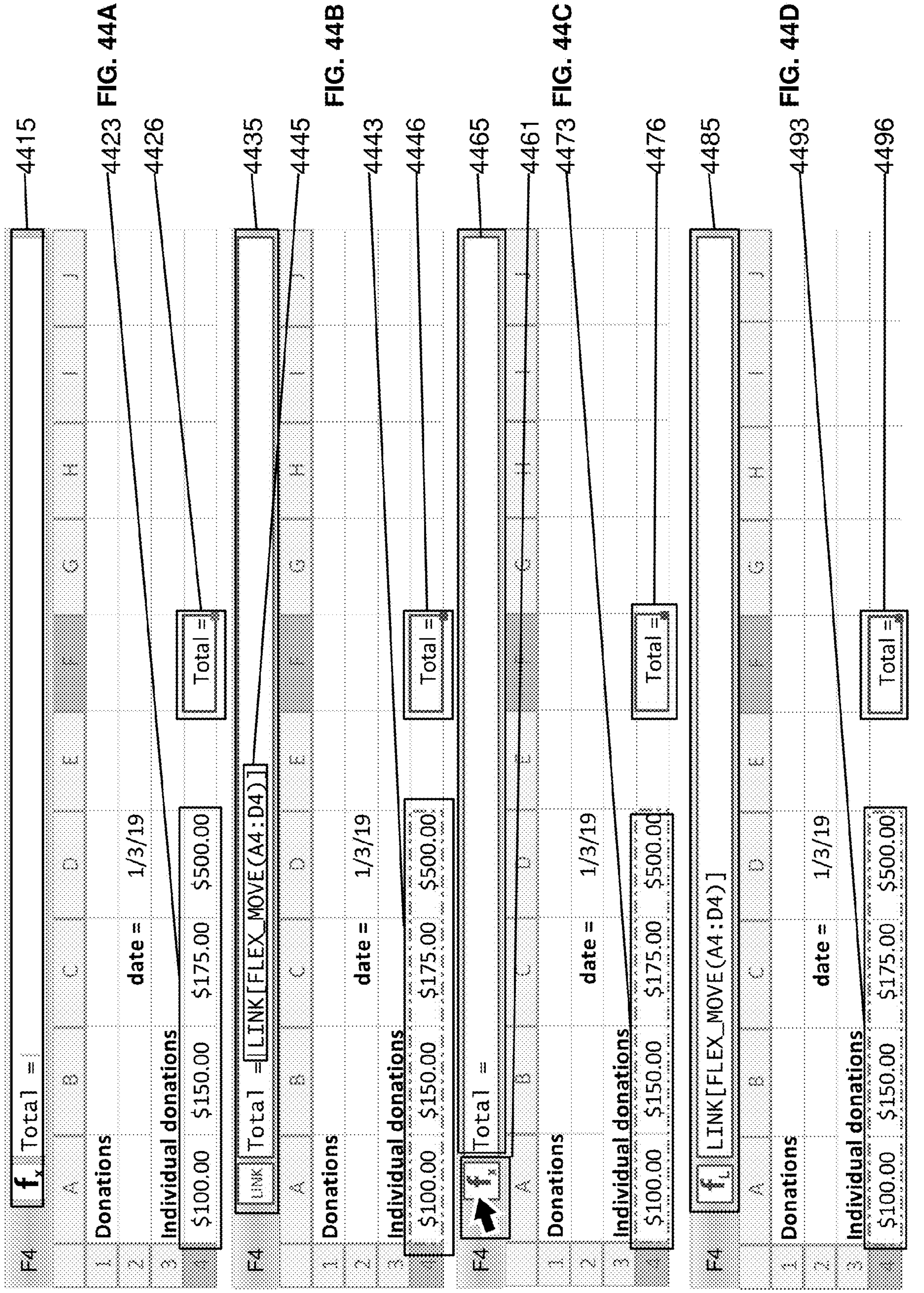

FIG. 44A and FIG. 44B examples an automatic set up in our technology of a movement only link/connect to a 'flex copy paste' delivering a visible linkage/connection argument. The user constructs the text 'Total=' formula 4415 for cell 'F4' 4426 like they normally would typing 'Total='. However, when the user hits ENTER like they normally would our technology sees the 'flex copy paste' 4423 that the formula is in the potential overlap zone (to the right of) and therefore automatically sets up the movement only linkage as shown in the link/connect argument '|LINK [FLEX_MOVE(A4:D4)]' 4445 in the formula 4435 in FIG. 44B. In this embodiment the 'FLEX_MOVE" term in the link/connect visible argument indicates that the link/connect is movement only. Our technology also automatically indicates linkage/connection by the replacement of the formula bar '$f_x$' button 4415 (in FIG. 44A) with the purple 'LINK' button 4435 (in FIG. 44B), the green cell highlighting 4426 (in FIG. 44A) replaced by the link purple 4446 (in FIG. 44B), the formula bar formula outlined in purple 4435 (in FIG. 44B), and the linked 'flex copy paste' range is outlined in its light blue dot dash 4443 All automatically done by the user simply inputting the text as they normally would do.

Automatic Linkage Setup—Switchable Visible Argument(s)

Figure 45A:
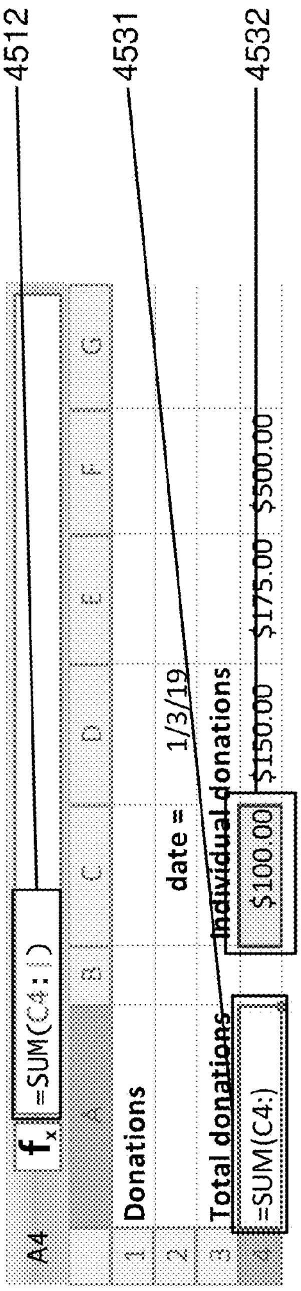
Figure 45B:
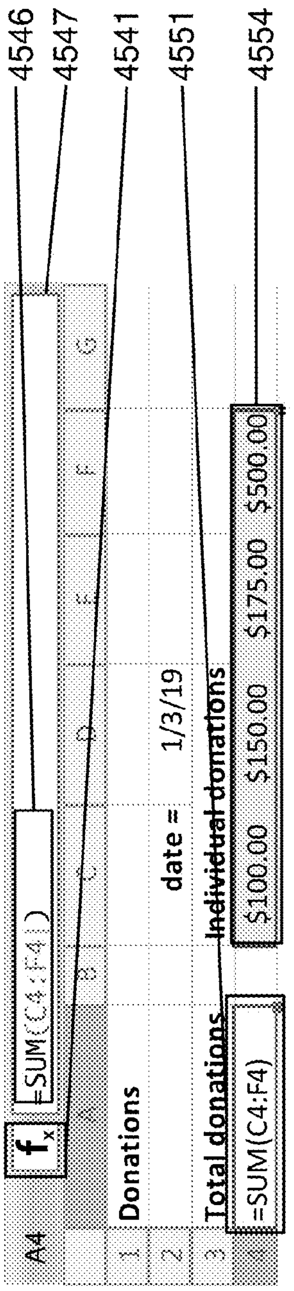
Figure 45C:
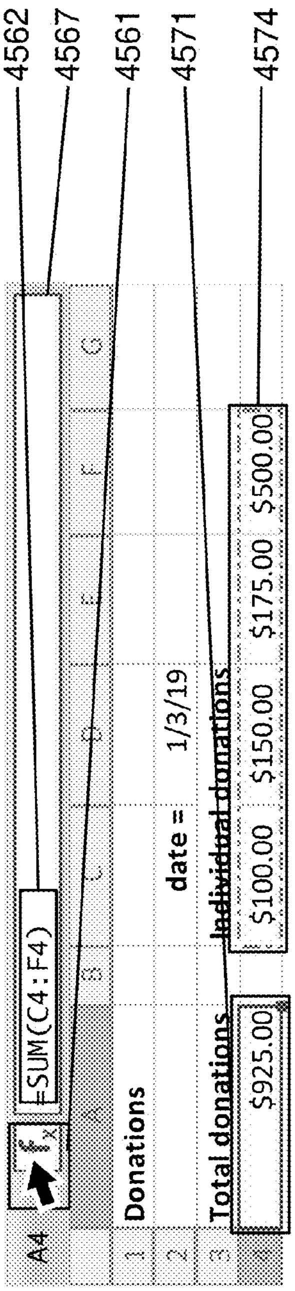
Figure 45D:
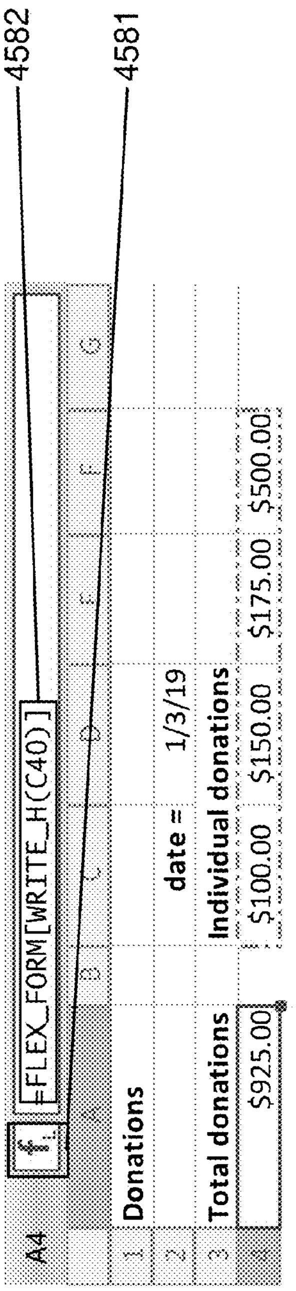

FIG. 45A through FIG. 45D examples an automatic set up of a formulaic link/connect to a one-dimensional 'flex copy paste' with a separately visible (switchable) linkage/connection argument. The user situation is identical to that in FIG. 41A through FIG. 41C except with a different embodiment of our technology. The user constructs the formula 4512 in cell 'A4' 4531 like they normally would selecting the first cell of the range 'C4' 4532 and then in FIG. 45B adding the rest of the range 4554 into the formula 4546 in cell 'A4' 4551. The user then hits ENTER like they normally would except the difference is our technology sees the 'flex copy paste' range 4554 that the formula is connected to and therefore automatically sets up the formulaic linkage as shown in FIG. 45C. In this example the linkage/connection is shown by the replacement of the formula bar black '$f_x$' button 4541 (in FIG. 45B) with the purple '$f_x$' button 4561 (in FIG. 45C), the green cell highlighting 4551 (in FIG. 45B) is replaced by the link purple 4571 (in FIG. 45C), the formula bar formula is outlined in purple 4567 (in FIG. 45C), and the linked flex copy paste range is outlined in its light blue dot dash 4574 (in FIG. 45C). However, the user can then click on the purple '$f_x$' button 4561 (in FIG. 45C) to replace the normal 'SUM' formula 4562 (in FIG. 45C) with the linkage argument 4582 (in FIG. 45D) and switch the purple '$f_x$' button 4561 (in FIG. 45C) to the purple '$f_L$' button 4581 (in FIG. 45D) that in this embodiment tells the user they are looking at the linkage argument. In this embodiment our technology automatically created this switchable link/connect argument view when the user hit ENTER in FIG. 45B to create the 'SUM' formula in FIG. 45C. That 'SUM' formula looks just like a regular 'SUM (C4:F4)' formula 4562 but has been automatically linked by our technology to the flex range with the switchable formula that makes that link/connect argument 4582 (in FIG. 45D) visible.

FIG. 43A, FIG. 43C and FIG. 43D examples the automatic set up of a formula and movement link/connect to a 'flex copy paste' with a separately visible (switchable) linkage/connection argument. When the user hits ENTER in FIG. 43A instead of getting the result previously exampled in FIG. 43B, we example a different embodiment where they get a switchable linkage/connection argument shown FIG. 43C. In FIG. 43C they see the regular 'SUM' formula 4365 they are used to seeing. However rather than the usual black '$f_x$' button 4315 in FIG. 43A they sec the purple '$f_x$' button 4361 (in FIG. 43C), the green cell highlighting 4326 in FIG. 43A is replaced by the link purple 4376 outlining (in FIG. 43C), the formula bar formula is outlined in purple 4365 (in FIG. 43C), and the linked flex copy paste range is outlined in its light blue dot dash 4373 (in FIG. 43C). However, the user can then click on the purple '$f_x$' button 4361 in FIG. 43C to replace the normal formula 4365 with the linkage argument 4385 (in FIG. 43D) and switch the purple '$f_x$' button 4361 in FIG. 43C to the purple '$f_L$' button 4385 (in FIG. 43D) that in this embodiment tells the user they are looking at the linkage argument. In this embodiment our technology automatically created this switchable link/connect argument view when the user hit ENTER in FIG. 43A to create the 'SUM' formula in FIG. 43C. That 'SUM' formula looks just like a regular 'SUM(A4:D4)' formula 4365 but has been automatically linked both formulaically and movement wise by our technology to the flex range with the switchable formula that makes that link/connect argument 4385 (in FIG. 43D) visible.

FIG. 44A, FIG. 44C and FIG. 44D examples the automatic set up of a movement link/connect to a 'flex copy paste' with a separately visible switchable linkage/connection argument. In this example when the user then hits ENTER in FIG. 44A instead of getting the result previously exampled in FIG. 44B, we example a different embodiment where they get a switchable linkage/connection argument in FIG. 44C. In FIG. 44C they see the regular 'Total=' text formula 4465 they are used to seeing. However rather than the usual black '$f_x$' button 4415 in FIG. 44A they see the purple '$f_x$' button 4461 (in FIG. 44C), the green cell highlighting 4426 in FIG. 44A is replaced by the link purple 4476 outlining (in FIG. 44C), the formula bar formula is outlined in purple 4465 (in FIG. 44C), and the linked flex copy paste range is outlined in its light blue dot dash 4473 (in FIG. 44C). However, the user can then click on the purple '$f_x$' button 4461 in FIG. 44C to replace the normal formula 4465 with the linkage argument 4485 (in FIG. 44D) and switch the purple '$f_x$' button 4461 in FIG. 44C to the purple '$f_L$' button 4485 (in FIG. 44D) that in this embodiment tells the user they are looking at the linkage argument. In this embodiment our technology automatically created this switchable link/connect argument view when the user hit ENTER in FIG. 44A to create the 'Total=' text formula in FIG. 44C. That 'Total=' text formula 4465 in FIG. 44C looks just like a regular 'Total=' text formula but has been automatically linked movement (only) wise by our technology to the flex range with the switchable formula that makes that link/connect argument 4485 in FIG. 44D visible.

Figure 46A:
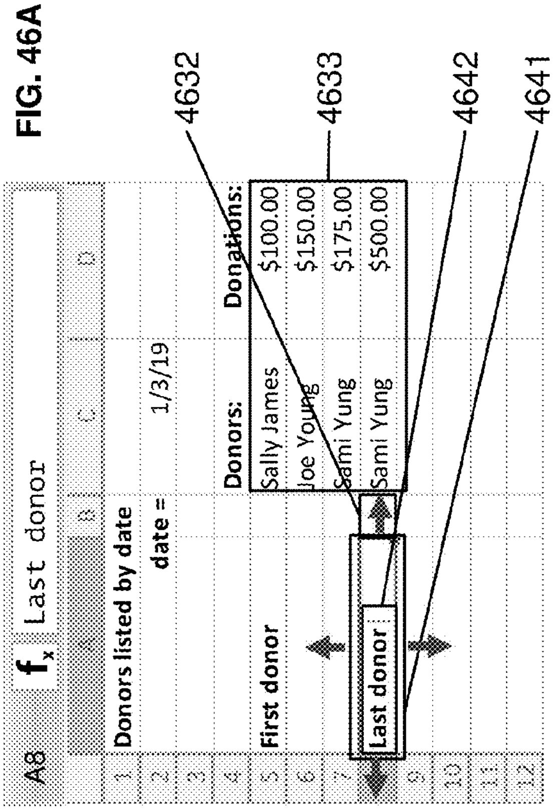
Figure 46B:
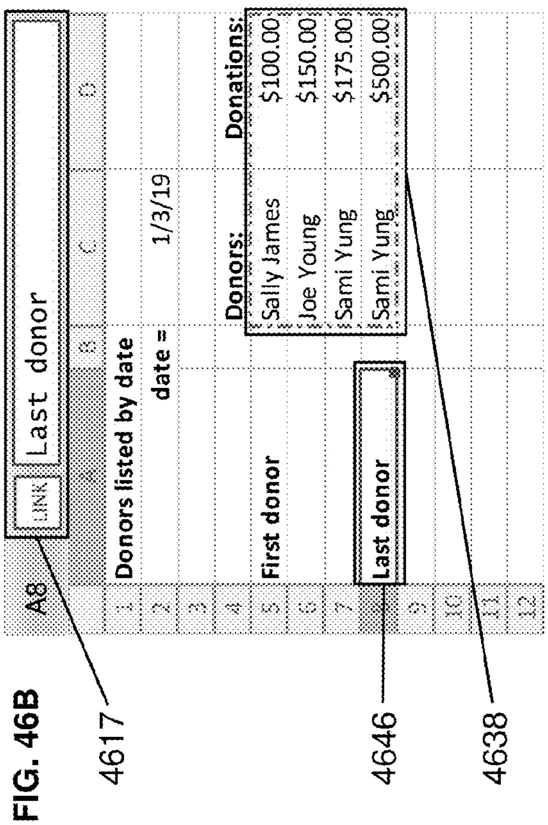

FIG. 46A through FIG. 46D examples an automatic set up of a movement link/connection to a WRITE with an invisible link/connect argument and its usage. In this embodiment our technology automatically checks for flex areas above and below, to the left and right of the cell or cells being entered. In this example there are no cells to the left and no flex ranges directly above or below the cell being entered in 'A8' 4641 in FIG. 46A, so the automatic linkage/connection is to the 'WRITE' flex range in cells 'C5' through 'D8' 4633 to the right 4632. Which is then instantiated in FIG. 46B when the user hits 'ENTER' in FIG. 46A for the 'Last donor' text 4642 in cell 'A8' 4641. In this embodiment, like many of the previous ones, the cell 'A8' 4646 in FIG. 46B is then highlighted in purple, the linked/connected flex range 4638 is highlighted with light green dot dashes (used for WRITEs) and the formula bar has a purple 'LINK' button and a purple boundary border for the formula 4617. In situations where there are multiple flex ranges above/below and left/right then different embodiments would automatically movement link to all of them, have an algorithmic direct linkage selection process (described later), or present options to the user for their selection for connection/linkage. This would then allow our application or the user to easily setup multiple linkages/connections and potentially different types of connections.

Figure 46D:
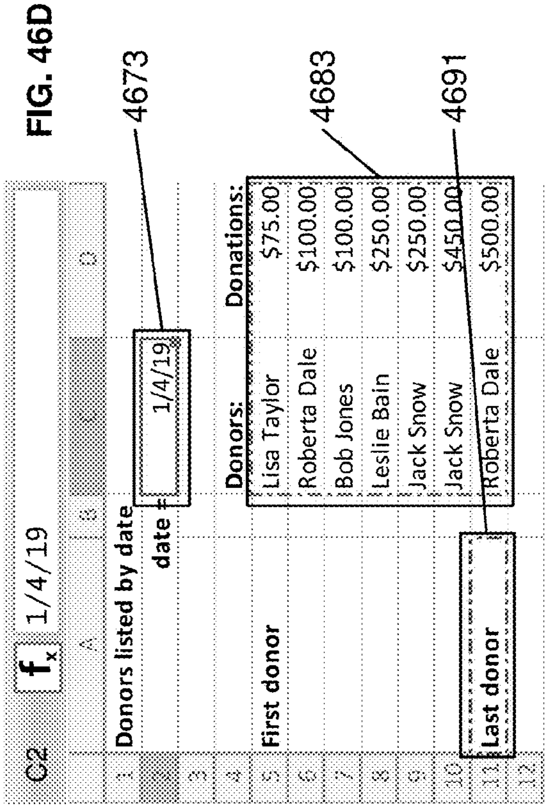
Figure 46C:
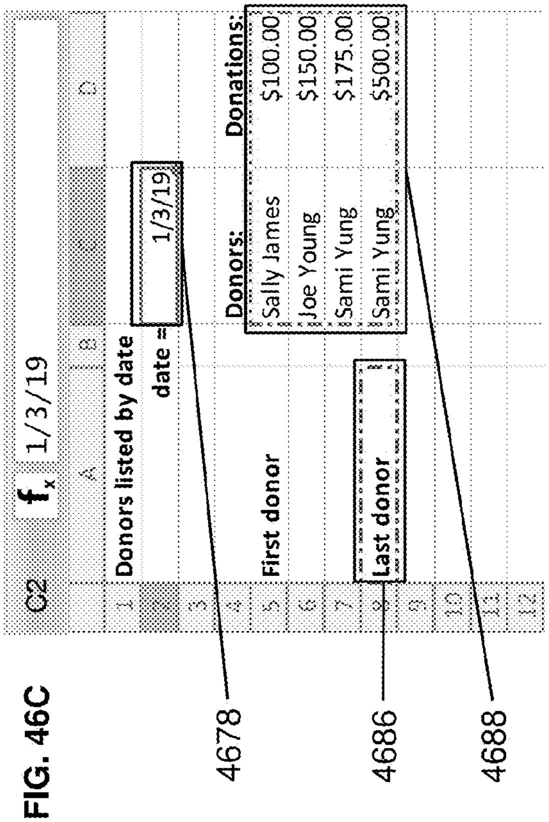

FIG. 46C and FIG. 46D then examples the functioning of the linkage/connection when the user changes the date input (parameter) from '1/3/19' 4678 in FIG. 46C to 1/4/19' 4673 in FIG. 46D. This flexes the WRITE range from 4 rows 4688 in FIG. 46C to seven rows 4683 in FIG. 46D automatically moving the 'Last Donor' text from cell 'A8' 4686 in FIG. 46C to cell 'A11' 4691 in FIG. 46D. Thus, the linkage/connection works as previously exampled once automatically setup. And as previously described our technology or users has the option of one-way or two-way linkages/connections.

Automatic Linkage Setup—Multiple Connections

FIG. 47A and FIG. 47B examples the simultaneous automatic set up of a formula link/connect connection to two flex ranges (one a capability and the other a function) and a movement link/connect to three different flex ranges (i.e., two different types of 'WRITEs' and one 'flex copy paste'), all done with invisible linkage arguments. Note, as we will example later the movement linkage/connection to the three different flex ranges can be many different ways (e.g., direct/indirect, closest distance, bumpers, and displacement as exampled later) which are all supported by the automatic linkage set up exampled in FIG. 47A and FIG. 47B. In FIG. 47A the charity user is in the final stages of creating a summation formula 4713 in cell 'F14' 4785 summing the twelve cells outlined in blue 4754 and the twelve cells outlined in red 4774 matching the color coding of the formula 4713. When the user clicks 'ENTER', with in this example the cursor 4714 at the end of the formula, they get the outcome in FIG. 47B. Our technology has automatically linked/connected the formula to the body 4757 of the 'WRITE_CALC_2D' 4747 flex range and to the 'flex copy paste' range 4777 (which is flexed by the 'WRITE_V' 4776 and the horizontal headings 4737 of the 'WRITE_CALC_2D' 4747). The cell 'F14' value '$16, 834.06' is highlighted in purple indicating in this embodiment it is linked/connected. It has been movement linked/connected to the flex copy paste range 4777 and to the 'WRITE_CALC_2D' flex range 4747 and the WRITE_V' 4776 flex range. Its formula bar button has been changed in this embodiment from the '$f_x$' 4711 in FIG. 47A to the purple 'LINK' 4715 button and its formula bar formula outlined in purple 4717 in FIG. 47B. All this was automatically done by our technology upon the entering of the formula.

FIG. 48A and FIG. 48B examples the automatic set up of a movement link/connect cell to three flex ranges (i.e., two different types of 'WRITEs' and one 'flex copy paste') with invisible link/connect arguments. The charity user has decided to add a 'Net donations=' label in cell 'E14 4884 beside the calculation they created in cell 'F14' 4789 in FIG. 47B (now 'F14' 4885 in FIG. 48A). When the user hits ENTER, they get the result in FIG. 48B. Because the cell 'E14' 4887 has no formula the automatic linkage/connection is movement only and is connected to flex ranges (4877, 4876, and 4857). In some of our movement link/connect technologies, covered later, cell 'E14' 4887 would automatically connect to the other occupied cells in the worksheet including for example cell 'F14' 4888. Also, in this embodiment the formula bar button has been changed from '$f_x$' 4811 in FIG. 48A to the purple 'LINK' 4816 button in FIG. 48B and its formula bar formula outlined in purple 4817 in FIG. 48B. All this was automatically done by our technology upon the entering of the formula.

Before we example even more complicated link/connect situations handled by our technology, we will example an automatic link/connect removal variant.

Additional Link Removal

Figure 49A:
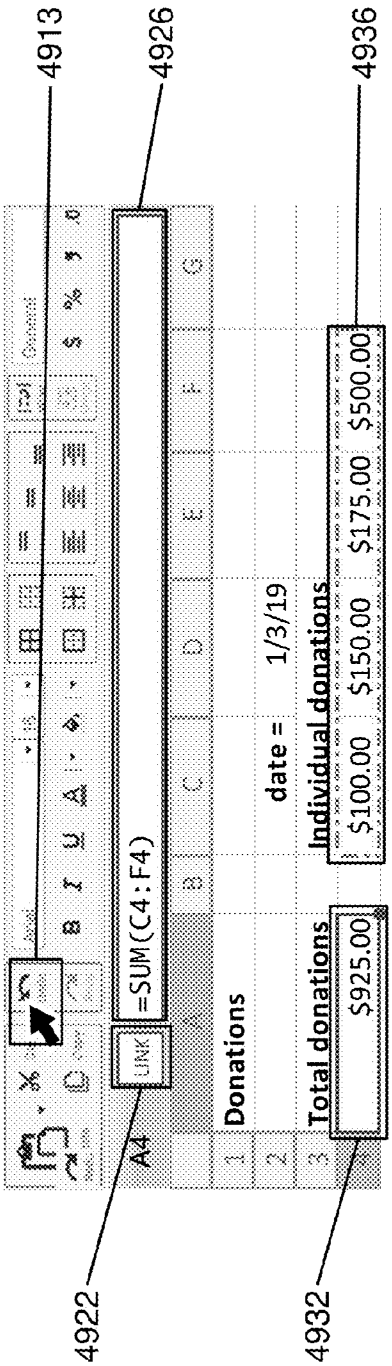

While our otherwise exampled menu and ribbon selector ways of removing linkages/connections apply to automatic linkages, our automated link/connect technology creates additional variants. FIG. 49A through FIG. 50B example an additional UI driven approach for removing automatically set up links/connections through a new variant of UNDO. FIG. 49A examples the automatically instantiated link/connection in cell 'A4' 4932 just after it was created in FIG. 41C. However, the user has decided they would like to remove the link/connection, and in this embodiment, they click the 'UNDO' button 4913 (or types the UNDO shortcut or triggers UNDO in a menu) to get the result in FIG. 49C where the link/connection is gone. This is shown by the purple cell highlighting 4932 in FIG. 49A being replaced by the normal dark green cell highlighting 4992 in FIG. 49C, the linked 'flex copy paste' light blue dot dash outlining 4936 in FIG. 49A is gone 4996 in FIG. 49C, the 'LINK' button 4922 in FIG. 49A being replaced by the '$f_x$' button 4982 in FIG. 49C, and the purple outlining of the formula bar formula 4926 in FIG. 49A being gone 4986 in FIG. 49C. So, the "UNDO' does not undo the creation of the formula, as it normally would, but instead removes the automatic link/connect leaving the formula as a normal unlinked 'SUM'.

Figure 49B:
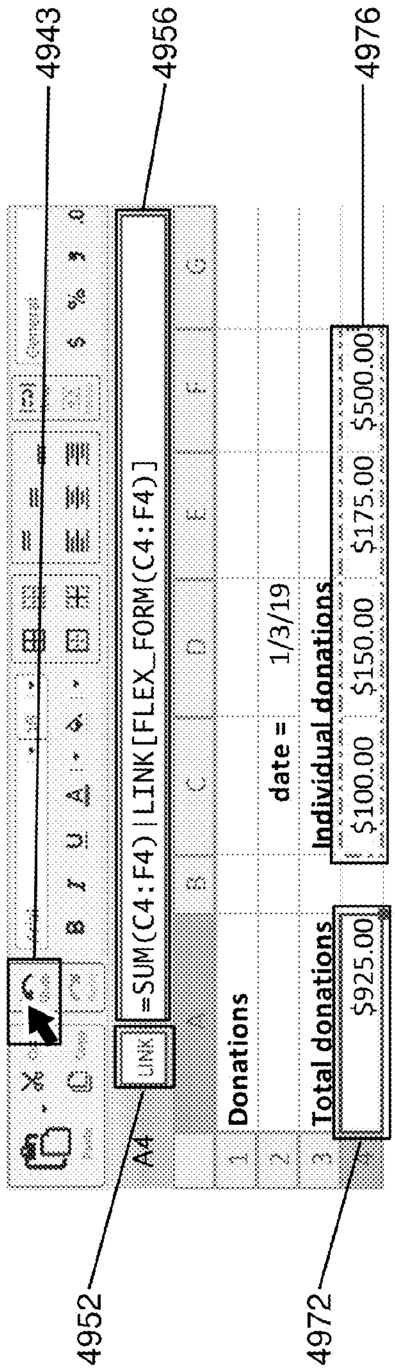
Figure 49C:
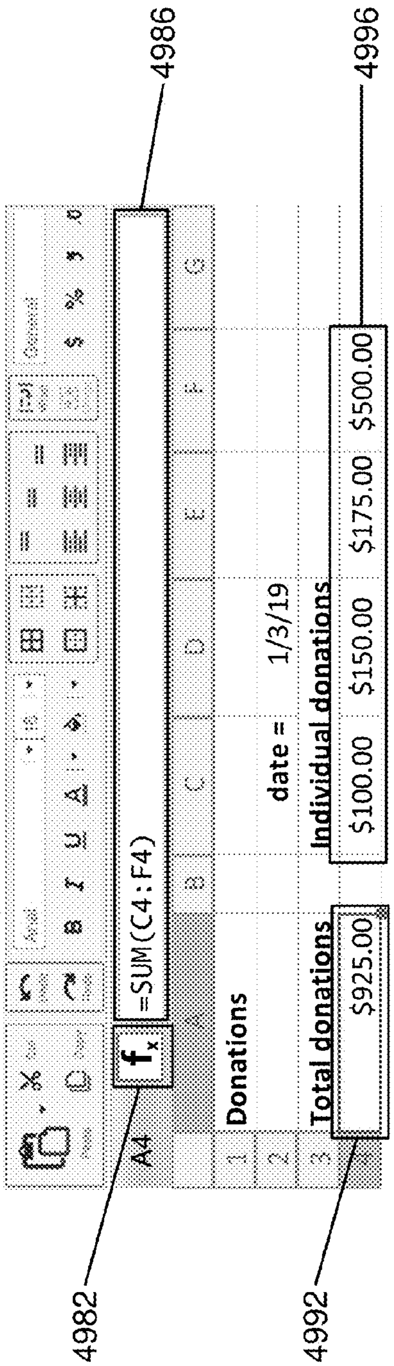

FIG. 49B and FIG. 49C examples the removal of an automatically instantiated link/connection in cell 'A4' 4972 in FIG. 49B for a formula like that in FIG. 42C (just after the creation of the automatic link/connection). When the user clicks the 'UNDO' button 4943 in FIG. 49B (or types the UNDO shortcut or triggers UNDO in a menu), they get the result in FIG. 49C where the link/connection is gone. This is shown by the purple cell highlighting 4972 in FIG. 49B being replaced by the normal dark green cell highlighting 4992 in FIG. 49C, the linked 'flex copy paste' light blue dot dash outlining 4976 in FIG. 49B is gone 4996 in FIG. 49C, the 'LINK' button 4952 in FIG. 49B being replaced by the '$f_x$' button 4982 in FIG. 49C, and the purple outlining of the formula bar formula 4956 in FIG. 49B being gone 4986 in FIG. 49C. While different embodiments could have used different indicators to the user that the link/connect is gone, the user is given visual confirmation that the automatic link has been removed by the link/connection argument being gone and other visual identifiers.

Figure 50A:
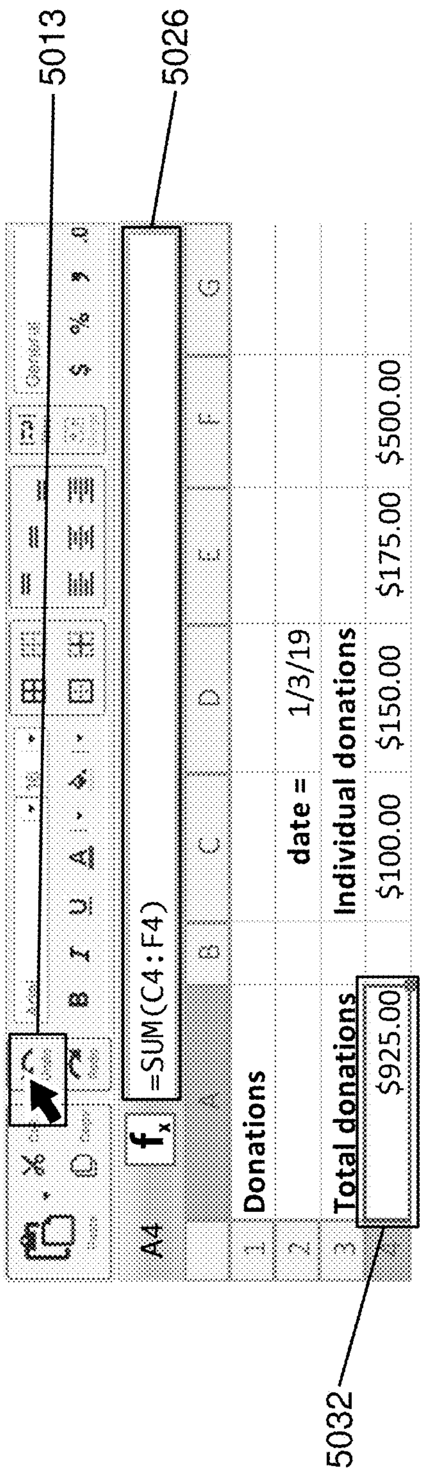
Figure 50B:
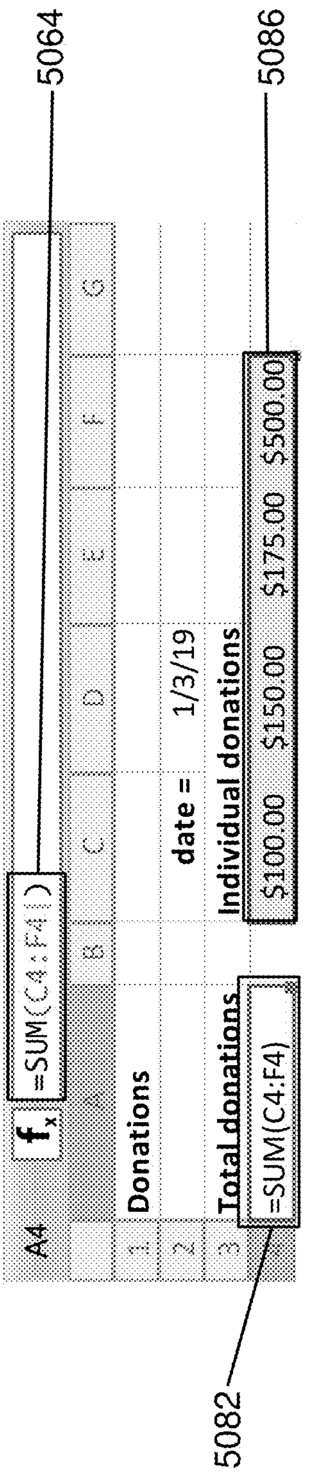

FIG. 50A and FIG. 50B examples what happens if the user triggers the UNDO an additional time (e.g., by clicking the ribbon, clicking a menu selection or the shortcut) 5013 in FIG. 50A in this embodiment. It then does the typical UNDO of the entry of the formula 5026 for the formula in cell 'A4' 5032 in FIG. 50A. The result is in FIG. 50B, which is the formula 5064 right before the user hits ENTER to save the formula and trigger the automatic linkage/connection in FIG. 41B (for FIG. 49A/C) or FIG. 42B (for FIG. 49B/C). The formula is still showing in the cell 'A4' 5082 and the range in the SUM is highlighted in blue 5086 and color coded in the formula as in FIG. 41B or FIG. 42B. So, our technology separated the 'UNDO' action into two actions, first removing the automatic linkage/connection and then the second reverting the formula back to its pre-ENTER state 5064 (equivalent to 4153 in FIG. 41B or 4253 in FIG. 42B).

Different Movement Linkages/Connections

At this point we will begin to differentiate movement linkages/connections as our technology supports many different types resulting in different post-flex relative spatial positioning. Some displace cells in the path of flex expansion, others maintain pre-flex relative spatial positionings post-flex. Still others work for more complicated settings where multiple simultaneous flexes make it impossible to maintain all the pre-flex relative spatial positionings post-flex. Different embodiments of our technology also work differently for flex expansions versus flex contractions. We will start with one of the simpler embodiments that works when there is a single flex range and then example different ways our technology works handling the more complicated multiple flex situations.

Single Flex Maintaining all Relative Spatial Relationships

We have already exampled many different types of single flex situations maintaining post-flex the pre-flex row and column relative spatial relationships between the linked cell and its closest cell in the flex range. This is exampled for movement only linkages/connections in FIG. 15C/FIG. 15D, FIG. 18C/FIG. 18D, FIG. 20C/FIG. 20D (2093/2098), FIG. 25A/FIG. 25C/FIG. 25D, FIG. 26A/FIG. 26B, and FIG. 38A/FIG. 38B/FIG. 38C/FIG. 38D. And this is exampled for movement and formula combination linkages/connections in FIG. 16C/FIG. 16D, FIG. 19A/FIG. 19B, FIG. 20C/FIG. 20D (2094/2099), FIG. 27A/FIG. 27B, and FIG. 29A/FIG. 29B.

Note, retaining the closest cell relationship is pretty straightforward when that cell is at a corner of the flex range but can require some additional logic when it is not. FIG. 25A, FIG. 25C, and FIG. 25D are a good example of this where the 'Donations total:' in cell 'A10' 2541 in FIG. 25A is movement linked/connected to cell 'C10' 2542 which can be thought of one cell above the bottom left corner of the flex range 2543 or five cells below the top left corner of the flex range 2543. In this embodiment our technology retains the relationship to the closest corner that flexes and therefore the bottom left corner of the flex range 2543 as shown by the location of 'Donations total' in cell 'A7' 2536 in FIG. 25C across from cell 'C7' 2537 after the flex contraction. Alternatively the spatial relationship can be thought of as one cell above and two cells to the left of the of the nearest corner cell of the flex range that flexes. That would deliver the same results in FIG. 25A, FIG. 25C, and FIG. 25D.

FIG. 51 conceptually examples a single flex range with movement linkages/connections to eight cells pre and post flex. The eight gray shaded cells 5113, 5115, 5141, 5143, 5145, 5161, 5163, and 5165 are movement linked/connected to the gray-shaded flex range area 5122. When that flex area 5122 flexes as shown by the black outline area 5133 our linkage/connection technology in this embodiment automatically moves the eight linked/connected cells to the locations with the black outlines 5116, 5117, 5151, 5155, 5157, 5181, 5185, and 5187. Each of those cells has retained its pre-flex row and column relative spatial spacing to the closest flexing corner cell of the post flex area 5133 as exampled by the pre-flex row and column red arrow 5163 for cell 5165 relative to the flex area 5122 being the same distances as the post-flex moved cell 5187 row and column red arrow 5175 relative to the post-flex area 5133 flexing corner cell. Note, it could also be the spatial relationship to the closest flexing corner cell of the flex range where ties go to the corner lowest and most to the right or some other such tiebreaker.

FIG. 52 examples a similar situation of our technology where instead of eight individual gray shaded cells there are eight flex areas 5224, 5226, 5252, 5254, 5256, 5272, 5274, and 5276 movement linked/connected to the flex area 5222. When flex area 5222 flexes as shown in by the black outline area 5233 our linkage/connection technology in this embodiment automatically moves the eight linked/connected flex areas to the locations with the black outlines 5227, 5228, 5262, 5266, 5268, 5282, 5286, and 5288. Each of those flex areas has retained its pre-flex row and column relative spatial spacing to the closest part of the post flex area 5133 as exampled by the pre-flex row and column red arrow 5263 from the pre-flex corner of the gray area 5276 relative to the pre-flex gray flex area 5222 being the same distances as the post-flex moved corner of the black outlined post-flex flex area 5288 row and column red arrow 5275 relative to the post-flex area 5233. Provided there are no unlinked/unconnected cells in the new spaces our technology works as described. If there are cells in any of the new relocatable cell/area locations then our technology can generate an error, stop the operation, move that cell or cells out of the way or give the user other options such as linking/connecting that cell or cells.

In this single flex situation, the relative spatial relationship between the flexing range area and the other flex range areas can be maintained. However, what is apparent from this example is the relative spatial relationships between the other flex range areas are not maintained. For example, post-flex the black outlined flex range 5266 is eight columns from the black outlined flex range 5262, while pre-flex the gray flex range 5254 is two columns from the gray outlined flex range 5252. Thus, showing that in many situations when multiple flex range areas are movement linked/connected together it is impossible to retain the exact relative spatial relationships between all the areas. Therefore, we will example different movement coordination approaches of our technology for those situations after discussing settings where multiple flexes can retain both spatial relationships for all the linked/connected cells to the multiple flex areas.

Multiple Flexes Maintaining all Relative Spatial Relationships

FIG. 53A and FIG. 53B example the movement linkage of two different flex areas and a relocatable cell retaining post-flex the pre-flex row and column relative spatial relationships between both flexes and between both flexes and the relocatable cell. In FIG. 53A the relocatable cell 'F8' 5364 containing the text 'Net donations' is movement linked/connected by our technology to two flex areas 5353 and 5373. Those two flex areas are 'WRITE' functions which can be flexed by the 'start date' and 'end date' cell values. When the charity user changes the 'end date' in cell 'G2' from '1/2/19' to '1/3/19' 5329 in FIG. 53B the 'Net donations' which was in cell 'F8' 5364 in FIG. 53A is automatically moved to cell 'G9' 5367 in FIG. 53B by our technology. This embodiment of our technology retains all the row and column relative spatial relationships as exampled by comparing the red '0 column, 2 rows' pre-flex relative spatial relationship 5372 between the two flexes 5353/5373 in FIG. 53A being the same post-flex 5376 in FIG. 53B between the two flexes 5357/5377, by comparing the pink '1 column, 1 row' pre-flex relative spatial relationship 5345 between the flex 5353 and the relocatable cell 5364 in FIG. 53A being the same post-flex 5359 in FIG. 53B between the flex 5357 and the relocatable cell 5367 in FIG. 53B, and by comparing the light blue '1 column, 1 row' pre-flex relative spatial relationship 5385 between the flex 5373 and the relocatable cell 5364 in FIG. 53A being the same post-flex 5389 in FIG. 53B between the flex 5377 and the relocatable cell 5367 in FIG. 53B.

FIG. 54A and FIG. 54B example the combined formula and movement linkage of two different flex areas and a relocatable cell retaining post-flex the pre-flex row and column relative spatial relationships between both flexes and between both flexes and the relocatable cell. In FIG. 54A the relocatable cell 'F9' 5474 containing a SUM formula is movement and formula linked/connected by our technology to two flex 5453 areas and 5473. Those two flex areas are 'WRITE' functions which can be flexed by the 'start date' and 'end date' cell values. When the charity user changes the 'end date' in cell 'G2' from '1/2/19' 5425 to '1/3/19' 5429 in FIG. 54B the SUM formula which was in cell 'F9' 5474 in FIG. 54A is automatically moved to cell 'G10' 5479 in FIG. 54B by our technology. This embodiment of our technology retains all the row and column relative spatial relationships as exampled by comparing the red '0 column, 2 rows' pre-flex relative spatial relationship 5472 between the two flexes 5453/5473 in FIG. 54A being the same post-flex 5476 in FIG. 54B between the two flexes 5457/5477, by comparing the pink '1 column, 2 rows' pre-flex relative spatial relationship 5445 between the flex 5453 and the relocatable cell 5474 in FIG. 54A being the same post-flex 5459 in FIG. 54B between the flex 5457 and the relocatable cell 5479 in FIG. 54B, and by comparing the light blue '1 column, 0 row' pre-flex relative spatial relationship 5485 between the flex 5473 and the relocatable cell 5474 in FIG. 54A being the same post-flex 5489 in FIG. 54B between the flex 5477 and the relocatable cell 5479 in FIG. 54B.

FIG. 145A and FIG. 145B examples the combined movement and formula linkage of two different flex areas and a relocatable cell nearby but not in the flex expansion or shrinkage paths retaining post-flex the pre-flex row and column relative spatial relationships between both flexes and between both flexes and the relocatable cell. In FIG. 145A the relocatable cell 'A8' 14561 containing text "Net donations" is movement linked/connected by our technology to two flex areas 14553 and 14573. Those two flex areas are 'WRITE' functions which can be flexed by the 'start date' and 'end date' cell values. When the charity user changes the 'end date' in cell 'E2' from '1/2/19' 14523 to '1/3/19' 14528 in FIG. 145B the text which was in cell 'A8' 14561 in FIG. 145A is automatically moved to cell 'A9' 14566 in FIG. 145B by our technology. This embodiment of our technology retains all the row and column relative spatial relationships as exampled by comparing the red '0 column, 2 rows' pre-flex spatial relationship 14564 between the two flexes 14553/14573 in FIG. 145A being the same post-flex 14579 in FIG. 145B between the two flexes 14558/14588, by comparing the pink '1 column, 1 row' pre-flex spatial relationship 14541 between the flex 14553 and the relocatable cell 'A8' 14561 in FIG. 145A being the same post-flex 14546 in FIG. 145B between the flex 14558 and the relocatable cell 'A9' 14566 in FIG. 145B, and by comparing the light blue '1 column, 1 row' pre-flex spatial relationship 14581 between the flex 14573 and the relocatable cell 'A8' 14561 in FIG. 145A being the same post-flex 14586 in FIG. 145B between the flex 14588 and the relocatable cell 'A9' 14566 in FIG. 145B. Exampling how our technology does not need to flex expansion or contraction (shrinkage) overlap the linked/connected areas in order to move them.

Multiple Flex Situations not Maintaining all Relative Spatial Relationships

As we referenced before in many multiple flex situations it is impossible to retain all the row and column relative spatial relationships. This can occur even when only one of the multiple linked/connected flex areas flexes (changes the cells it populates). FIG. 55 examples one such situation with seven relocatable cells movement linked/connected to two flex areas flexing only one of the flex areas. The seven gray shaded cells 5513, 5515, 5543, 5545, 5561, 5563, and 5565 are movement linked/connected to both the flex area 5522 and 5542. In this example the gray shaded flex area 5522 flexes to what is shown as the black outlined area 5533. The seven linked/connected cells are relocated as shown by the black outlined cells 5516, 5517, 5555, 5557, 5581, 5585, and 5587 to maintain post-flex their pre-flex row and column relative spatial relationships with that flex area 5533. However, that then breaks the row and column spatial relationship between six of those seven cells and the second flex which has relocated from 5542 (gray cell area pre-flex) to 5552 (black outlined cell area are post-flex). These spatial relationships are illustrated by the blue arrows 5532 and 5564 being the pre-flex relative spatial relationships and the post-flex spatial relationships being the red arrows 5565 and 5575. None of the exampled corresponding blue spatial relationship arrows between the before flex range 5542 and the relocatable cells are the same as the corresponding red spatial relationship arrows post-flex from the same flex range 5552. So, it is impossible to retain the exact spatial relationships from one of the flex ranges (5522/5533) to the seven-movement linked/connected cells while retaining the exact spatial relationships from the other flex range (5542/5552) to all those same seven movement linked/connected cells in this example.

This same spatial relationship problem occurs if the cells in FIG. 55 are replaced by linked/connected cell flex areas or combinations of flex ranges and relocatable cells. FIG. 56 conceptually examples one such situation with nine flex ranges with movement linkages/connections to each other pre and post flex with one of the flex ranges flexing. The seven gray shaded cell areas 5624, 5627, 5644, 5646, 5672, 55674, and 5676 are movement linked/connected to both the flex area 5622 and 5642. In this example the gray shaded flex area 5622 flexes to what is shown as the black outlined area 5633. The eight linked/connected flex ranges are relocated as shown by the black outlined areas 5626, 5628, 5662, 5666, 5668, 5682, 5686, and 5688 to maintain post-flex their pre-flex row and column relative spatial relationships with that flex area 5533. However, that then breaks the row and column spatial relationship between the flex range area 5662 (pre-flex 5642) and six of the other seven flex ranges 5626, 5628, 5666, 5668, 5686, and 5688. This is illustrated by the blue arrows 5632 and 5664 being the pre-flex relative spatial relationships between the flex range area 5642 and the six flex ranges 5624, 5627, 5644, 5646, 5674, and 5676 and the red arrows 5665 and 5675 being the post-flex relative spatial relationships between the flex range area 5642 and the corresponding six flex ranges 5626, 5628, 5666, 5668, 5686, and 5688. The six exampled corresponding blue and red spatial connections between the before and after flex areas are not the same. All of the red arrow spatial relationships are longer than their corresponding blue arrows. In this situation it is impossible to maintain all the relative spatial relationships between each of the movement connected/linked areas.

Therefore, as we will example next how our technology supports a number of different embodiments for determining how to spatially coordinate the cell or cell area movements when it is impossible to maintain all the relative row and column spatial relationships of the movement linked areas.

Ordered Progression Link Movement—Down then Across Displacement

FIG. 57 examples a movement linked/connected embodiment where the flex displaces any overlapping areas with a down and then across ordered progression. It examples the same two flex and seven movement linked areas as FIG. 56, although all of the areas could be flexing areas or any subset of them replaced by relocatable cells. As before, the pre-flex areas are the gray shaded cells and the post-flex areas are the dark outlined cells. In this example only the area 5722 flexes and it becomes 5733. This flex then directly overlays the pre-flex area 5724, 5752, and 5754 and will therefore displaces them. Because the order in this embodiment is to displace down then across our technology first displaces 5752 and 5754 to 5762 and 5765 respectively. Those displaced areas then displace 5772 and 5774 to 5782 and 5784 respectively. At that point the first downward displacements are done but had there been more overlapped range areas below these areas they would be displaced until there are no more overlapped linked areas or the lower boundary of the linked space is reached. At that point progression returns to the top and moves across. In this example the original flex range 5722 flex to 5733 displaces (moves) 5724 to 5725. At that point the progression moves down to areas that were pre-flex below 5724 or pre-flex below where 5725 now is. Those are the pre-flex areas 5756 and 5776 which are then checked for displacement by the flex, which in example has no impact and so they stay in the same places as 5766 (pre-flex 5756) and 5777 (pre-flex 5776). At that point the progression moves back to the top to the displacement of 5727 pre-flex to 5728 post-flex. As there are no remaining areas the ordered progression link movements are done. This embodiment supported a down then across ordered displacement with no cell cushion between the displacements. In this embodiment the flex displacements do not need to be one to the other contiguous as they were in this example. They can be separate groups of flex displacements triggered by the same parameter change not impacting each other, which all follow the down then across one ordered displacement progression. A different embodiment would handle each overlapping area separately overlaying a down and across displacement progression for the group followed by a down and across displacement progression within each group.

FIG. 147 examples a movement linked/connected embodiment where the flex displaces with no cell cushion any overlapping areas with a down and then across ordered progression for a combination of cells and flex ranges undergoing two same parameter change flex range flexes. In this example only the area 14722 and area 14752 flexes to become 14733 and 14762, respectively. The first flex of 14722 to 14733 directly overlays the pre-flex cell areas 14713, 14734, 14731, and pre-flex flex ranges 14724, 14752, and 14754 and will therefore displaces them. Because the order in this embodiment is to displace down then across our technology first displaces 14731, 14752, and 14754 to 14741 (displacement of 14731), 14762 (displaced flexed area for 14752) and 14765 (displacement of 14754) respectively. The displacement and flex of 14752 to become 14762 then displaces down 14772 and 14774 to 14782 and 14784 respectively. The displaced flex range 14782 (14772 pre-flex) then displaces 14771 (pre-flex) to 14781 (post-flexes). At that point the first set of downward displacements is done but had there been more overlapped areas below these areas they would be displaced until the linked contents within the lower boundary of the linked space is reached (which could be the lowest cell or area in an automatically movement linked/connected embodiment). At that point progression returns to the top and moves across. In this example the original flex range 14722 flex to 14733 displaces (moves) 14713 to 14715 and 14734 to 14735. Flex range 14754 is also then displaced by the flex of 14752 to become 14762 which moves 14754 one column to the right to where it is shown. At this point there is no downward displacements so 14715 and 14735 displace 14724 to 14725. Again, there is no downward displacement below so 14725 displaces 14727 to 14728. At that point there is no downward displacements so 14728 does the next across displacement, displacing 14718 to 14719. At that point there are no remaining linked/connected areas, so the ordered progression link movements are done. This embodiment supported a down then across ordered displacement with no cell cushion between the displacements. In this embodiment the displacements do not need to be one to the other as they were in this example. They can be separate groups of simultaneous displacements not impacting each other which all follow the down then across one ordered displacement progression.

Ordered Progression Link Movement—Across then Down Displacement

FIG. 58 examples an ordered progression movement linked/connected embodiment where the flex displaces any overlapping areas with no cell cushion with an across then down ordered progression. It examples the same nine movement linked areas as FIG. 56 and FIG. 57, where in this example they are all flex ranges but any of them could be relocatable cells. As before, the pre-flex areas are the gray shaded cells and the post-flex areas are the dark outlined cells. FIG. 58 examples the same flex of area 5822 becoming 5833 as FIG. 57. This flex then directly overlays the pre-flex area 5824, 5852, and 5854 and will therefore displaces them. Because the order in this embodiment is to displace across then down our technology first displaces 5824 and 5854 to 5825 and 5865 respectively. Those displaced areas then continue to displace across moving 5827 and 5856 to 5828 and 5866 respectively. At that point the first across displacement is done having hit the right boundary of the linked space and the first down displacement moves 5852 to 5862. At this point both 5874 and 5876 are to the non-overlapping right of 5862 and so no across displacement takes place. The next down displacement takes place where 5862 displaces what was 5872 pre-flex to 5882. With no more across or down areas all the displacements are complete. Our embodiment has supported an across then down ordered displacement with no cell cushion displacements.

Ordered Progression Link Movement—Simultaneous Across and Down Displacement

FIG. 59 examples an ordered progression movement linked/connected embodiment where the flex displaces any overlapping areas with no cushion with a simultaneous across and down ordered progression. It examples the same nine movement linked areas as FIG. 56, FIG. 57, and FIG. 58, where again any or all areas could be individual relocatable cells. As before, the pre-flex areas are the gray shaded cells and the post-flex areas are the dark outlined cells. In this example only the area 5922 flexes and it becomes 5933 as similarly exampled in FIG. 57, and FIG. 58. This flex then directly overlays the pre-flex area 5924, 5952, and 5954 and will therefore displaces them. Because the order in this embodiment is to displace simultaneously across and down our technology first displaces 5924, 5952 and 5954 to 5925, 5962 and 5865 respectively. Those displaced areas then displace 5927, 5972, 5974, 5976 and 5856 to 5928, 5973, 5975, 5988 and 5968 respectively. At that point all the displacements are done, and in this example every area has moved. Note, had an area not been overlapped it would not have moved. This embodiment of our technology has supported a simultaneous across and down ordered displacement with no cell cushion between the displacements.

FIG. 60A through FIG. 60C shows side-by-side the impact of the different displacement progression orders exampled in FIG. 57, FIG. 58, and FIG. 59. FIG. 60A shows the down then across progression from FIG. 57, FIG. 60B the across then down progression in FIG. 58, and FIG. 60C the simultaneous across and down progression in FIG. 59. This makes it easy to see the difference in outcomes for the same flex with the different progressions. These different linked/connected coordinated movements work for more complicated flex situations, such as the examples FIG. 148A and FIG. 148B, and for very complicated flex situations as example in FIG. 61 where all nine of the linked/connected areas are flex areas and flex simultaneously.

Our different progression displacements works similarly when the linked/connected areas are a mix of flex ranges and individual cells as previously exampled in FIG. 147. For comparative purposes FIG. 147 is repeated as FIG. 148A where FIG. 148A and FIG. 148B examples the side-by-side the impact of the down then across (FIG. 148A) and across then down (FIG. 148A) ordered displacement progressions for multiple flexes of areas including cells and flex ranges. Thereby giving a side-by-side view of the differences in the outcomes for the same flexes based on the different progressions.

FIG. 61 examples a movement linked/connected embodiment of nine flex areas where the simultaneous flex of all nine flex areas displaces any overlapping areas with a down then across ordered progression. As before, the pre-flex areas are the gray shaded cells and the post-flex areas are the dark outlined cells. In this example all nine areas simultaneously flex. In this embodiment the flex movements start from the upper left corner and go down then across. The flex of 6122 becoming 6133 displaces 6162 (pre-flex 6152) and 6165 (pre-flex 6154) downward but they do not displace anything below them. However, the progression continues down and 6172 flexes to become 6173 but does not overlay anything below it and there are no downward flex displacements below them. So now our technology does its first across with 6133 displacing 6125 (pre-flex 6124) which displaces nothing below it. Our technology then progresses down to 6165 (pre-flex 6154) which was displaced across by 6162 (pre-flex 6152) but displaces nothing down, so it moves to 6173 (pre-flex 6172) which displaces 6175 (pre-flex 6174). There are no further down areas, so our technology moves to the top again and the displacement of 6138 (pre-flex 6127) by 6125 (pre-flex 6124). The flex of 6138 then moves down to displace 6167 (pre-flex 6156). That ends the displacement as neither 6167 nor 6175 displace the last remaining area 6176 that flexes to become 6188. Our technology supports different embodiments of ordered progressions even within a down then across (or the across and down or simultaneous across and down embodiments) within the sub order in very complicated flex situations. It is likely pretty rare to have a large number of proximate non-synchronized simultaneous, but it can occur. And in situations of flexes following one after the other each will be resolved before progressing to the next one. However, we exampled a pretty complicated case of nine simultaneous flexes to demonstrate our technology can handle it.

Rather than exampling more different variants of the progression orders, we will move on to exampling the impact in our technology of adding a cell cushion to the linked/connected movement.

Ordered Progression Link Movement—One Cell Cushion

Figure 62:
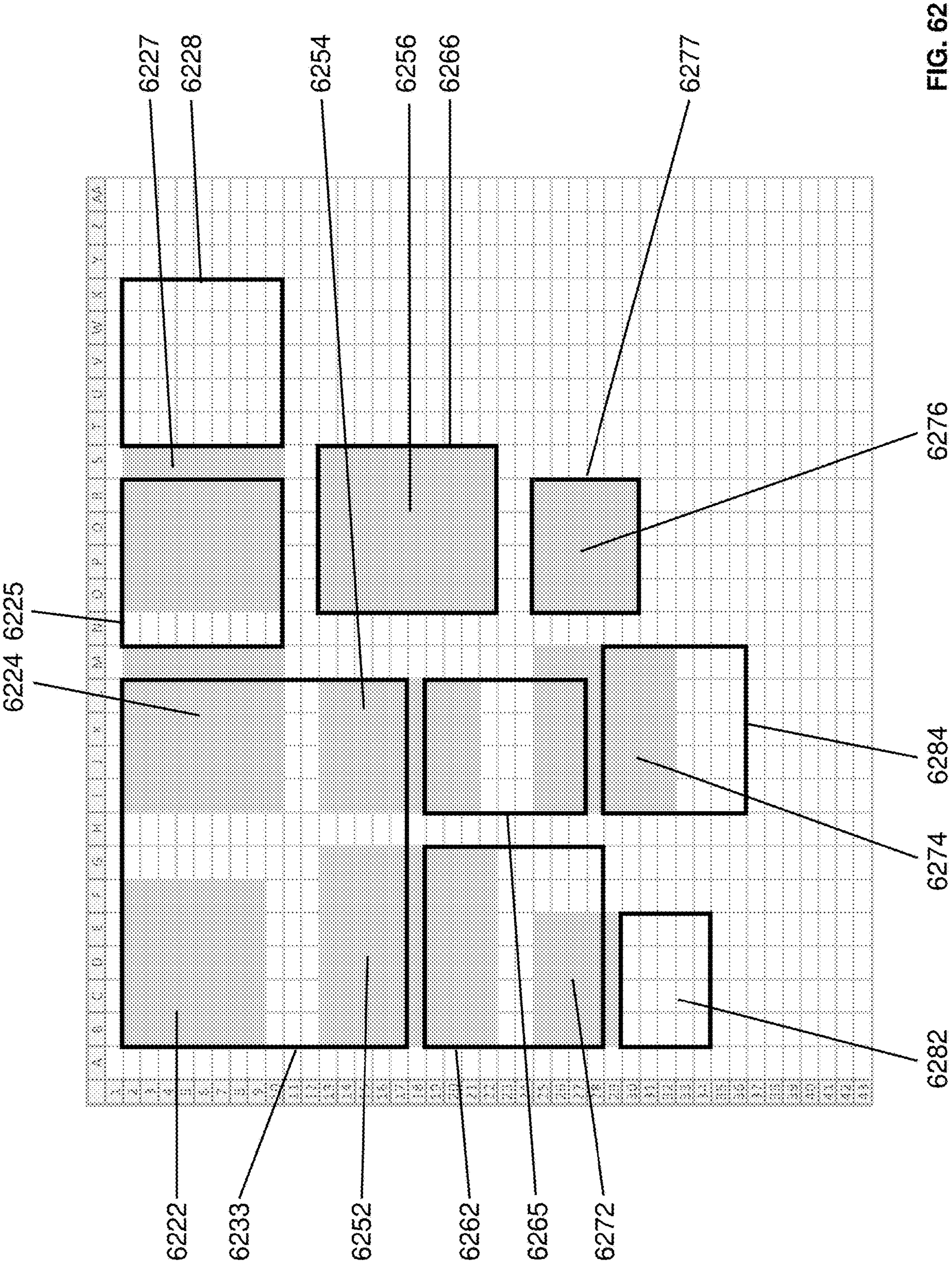
Figure 63C:
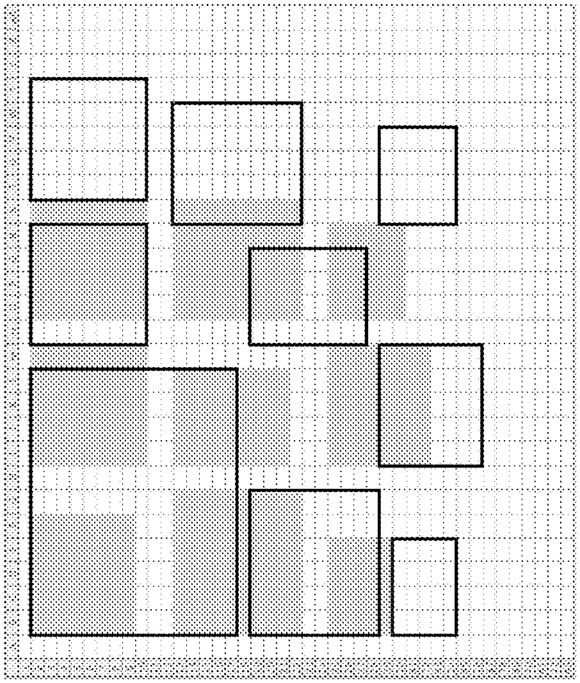

FIG. 62 through FIG. 63C example different ordered progression linked/connected movement down and across embodiments with a one cell cushion. FIG. 62 examples the same nine movement linked areas as FIG. 56 through FIG. 60C with the same single flex. As before, the pre-flex areas are the gray shaded cells and the post-flex areas are the dark outlined cells. In this example only the area 6222 flexes and it becomes 6233. This flex then directly overlays the pre-flex area 6224, 6252, and 6254 and will therefore displaces them. Because the order in this embodiment is to displace down then across our technology first displaces 6252 and 6254 to 6262 and 6265 respectively with a one cell cushion. Those displaced areas then continue the down displacing 6272 and 6274 to 6282 and 6284 respectively with a one cell cushion. At that point the downward displacement is done but had there been more flex range areas below these areas they would be displaced until the lower boundary of the linked space is reached. At that point progression returns to the top and moves across. In this example the original flex range 6222 flex to 6233 displaces (moves) 6224 to 6225 with a one cell cushion. At that point the progression moves down to areas that were pre-flex below 6224 or pre-flex below where 6225 now is. Those are the pre-flex areas 6256 and 6276 which are then checked for displacement by the flex, which in example has no impact and so they stay in the same places as 6266 (pre-flex 6256) and 6277 (pre-flex 6276). At that point the progression moves back to the top to the displacement of 6227 pre-flex to 6228 post-flex with a one cell cushion. As there are no remaining areas the ordered progression link movements are done. This embodiment supported a down then across ordered displacement with a one cell cushion between the displacements. In this embodiment the displacements do not need to be one to the other as they were in this example. They can be separate groups of displacements not impacting each other which all follow the down then across one ordered displacement progression. Note, there are different overlapping ordering ways to interpret the down then across progression and our technology supports different interpretations just like it supports different ordering ways of across then down and simultaneous progressions.

Figure 63A:
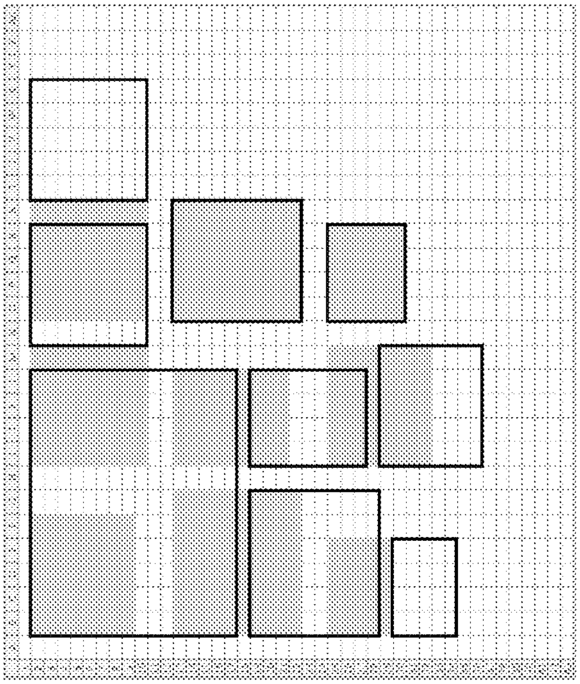
Figure 63B:
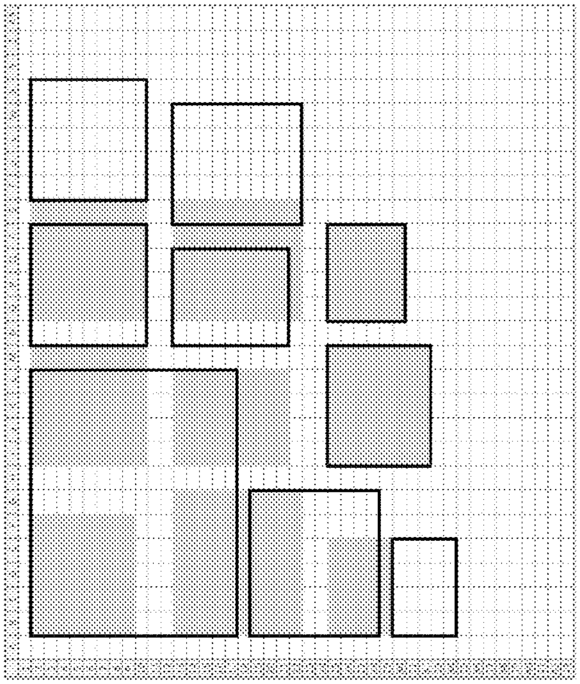

FIG. 63A through FIG. 63C examples the impact of different displacement progression orders showing different outcomes from the same flex for the down then across progression in FIG. 63A (what was exampled in FIG. 62), the across then down progression in FIG. 63B, and the simultaneous across and down progression in FIG. 63C all with a one cell displacement cushion. These are similar to the comparisons in FIG. 60A through FIG. 60C except with a one cell displacement cushion.

FIG. 148C and FIG. 148D examples the impact of different displacement progression orders showing different outcomes from the same flex for the down then across progression in FIG. 148C and across then down progression in FIG. 148D for multiple simultaneous flexes for linked cells and flex ranges all with a one cell displacement cushion. Comparing FIG. 148C to FIG. 148A and FIG. 148D to FIG. 148B shows the impact of the one cell cushion on the displacements. Rather than exampling more different cushions or other sequences of ordered progressive movement displacement link/connect embodiments, we will move to a spatial coordination approach supported by our technology that allows the user to set alignments they would like to retain after the flex movements.

Aligned Link Movement

Figure 64B:
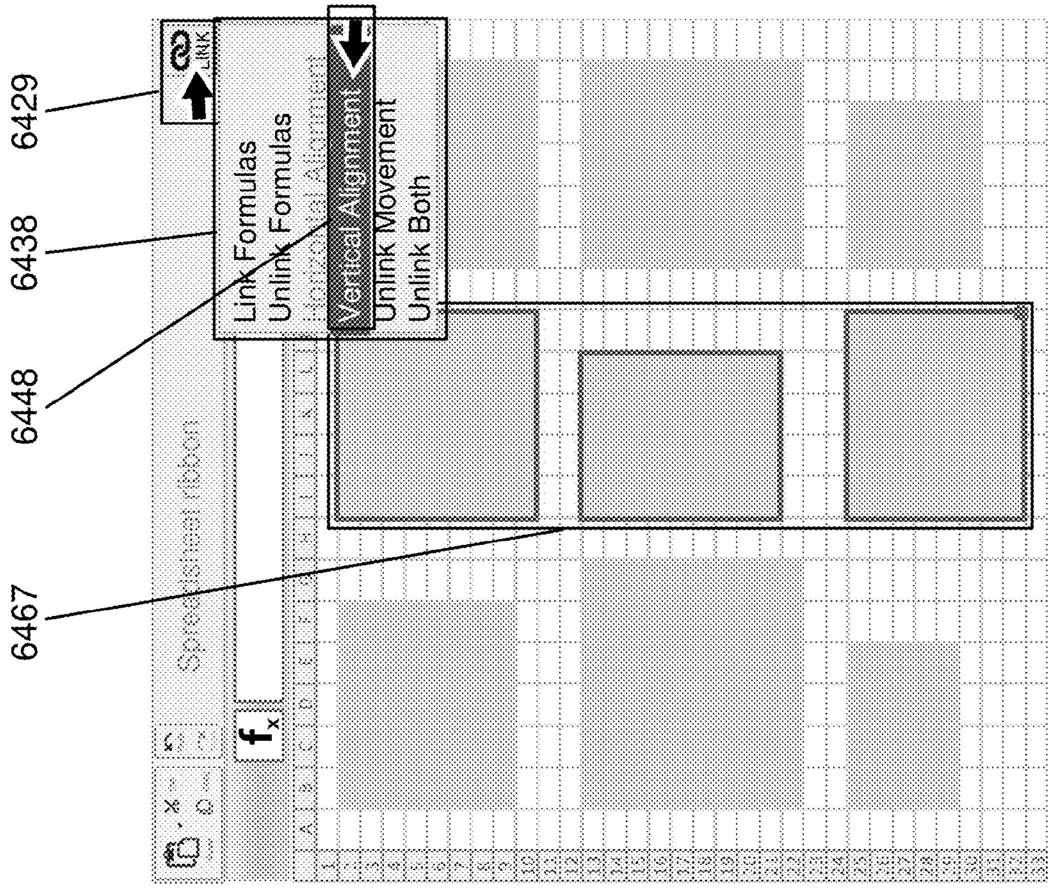
Figure 64A:
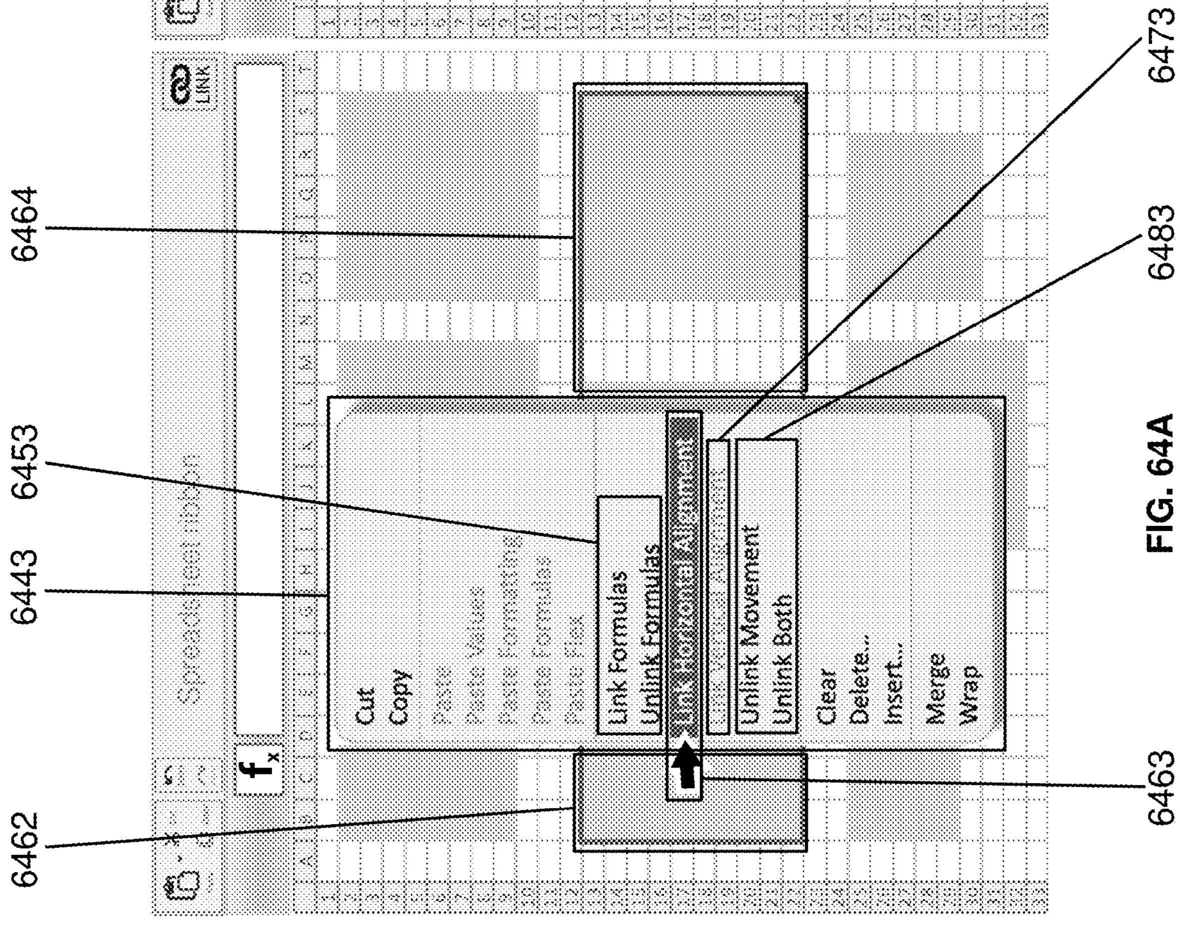

FIG. 64A through FIG. 70 example different embodiments of our alignment coordinated movement linkage/connection technology. The spreadsheet user wants to retain vertical and/or horizontal alignments of linked/connected areas post-flex. FIG. 64A and FIG. 64B example different manual ways in our technology to horizontally and vertically link areas together for flex movements. In FIG. 64A the user has obtained a popup 6443, via a right click menu or a ribbon menu, that gives them a set of 'Link' and 'Unlink' options 6453 and 6483. In FIG. 64A it also gives the user the option to horizontally align the three areas highlighted in 6462, 6464 and under the popup, which is the option they clicked 6463. Our technology did gray out one option 6473 to vertically align the selection, because our embodiment was intelligent enough to realize the linked areas highlighted were not vertical, and therefore not a candidate to link vertically. Our technology also supports a less intelligent embodiment where the vertical option were not grayed out (disabled). FIG. 64B examples another way for the user set up align movement linkages/connections. The user has obtained a popup 6438, by clicking a ribbon 'LINK' button 6429, that gives them the popup 6438 with a set of 'Link' and 'Unlink' options. It also gives the user the option to vertically align ('Vertical alignment') the three areas highlighted in 6467, which they clicked 6448. There are of course other ways our technology can support the manual selection of what to align vertically or horizontally as well as automatic ways our technology could set alignments along the lines of our previous examples. Therefore, rather than further exampling ways to set the alignments we will example different embodiments of how our alignment technologies work.

Figure 65:
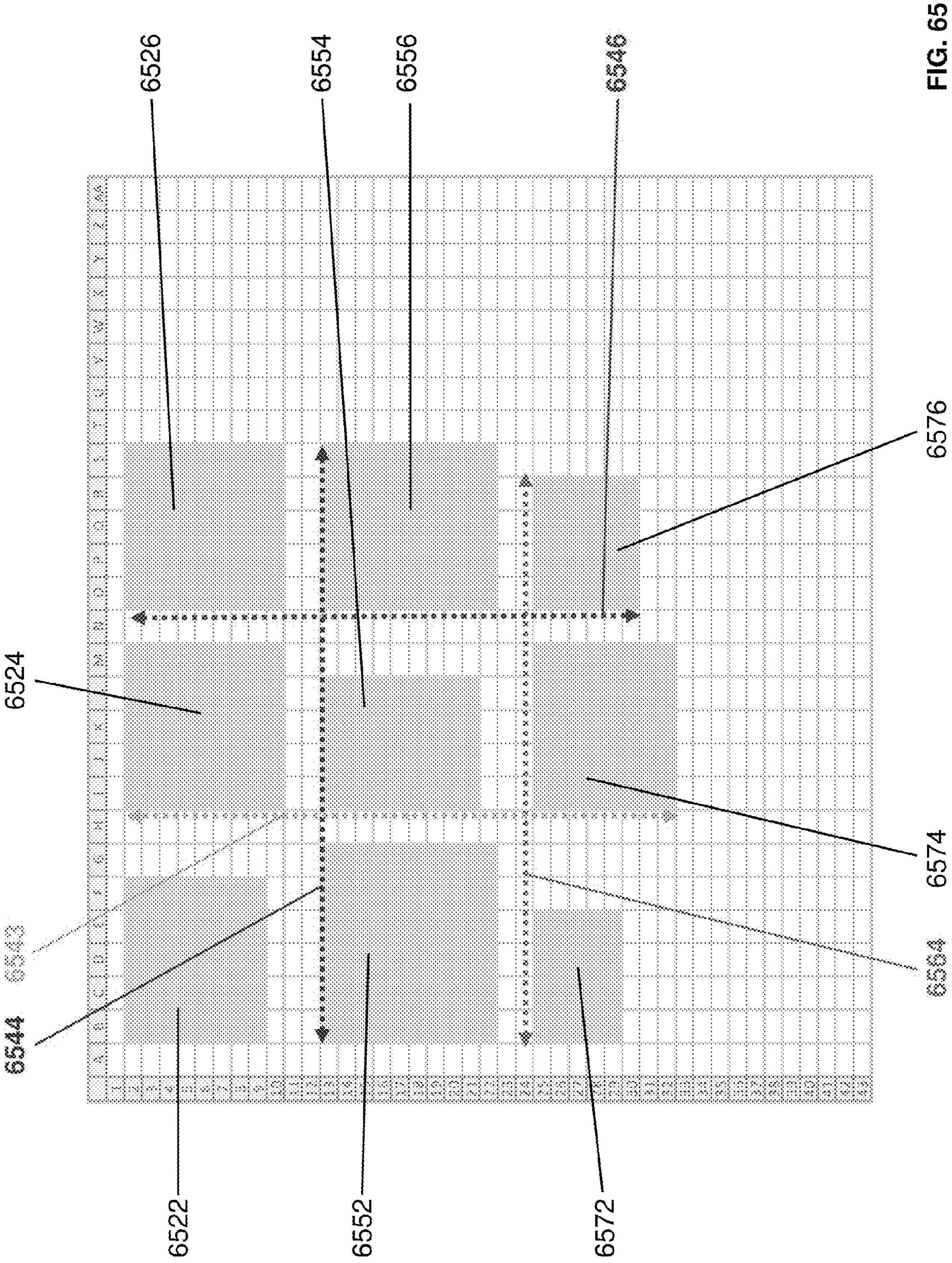

FIG. 65 illustrates the two vertical and two horizontal alignments that the user has set up for the nine linked/connected areas. These areas nine areas 6522, 6524, 6526, 6552, 6554, 6556, 6572, 6574, and 6576 could be all be flexes or a subset of them flexes, our technology works for any of the combinations. The blue horizontal dotted line 6544 illustrates a horizontal linkage like the one in FIG. 64A set up for the three areas 6552, 6554 and 6556. The green horizontal dotted line 6564 illustrates a horizontal linkage for the three areas 6572, 6574 and 6576. The red vertical dotted line 6546 illustrates a vertical linkage like the one in FIG. 64B set up for the three areas 6526, 6556 and 6576. The pink vertical dotted line 6543 illustrates a vertical linkage for the three areas 6524, 6554 and 6574.

Figure 66:
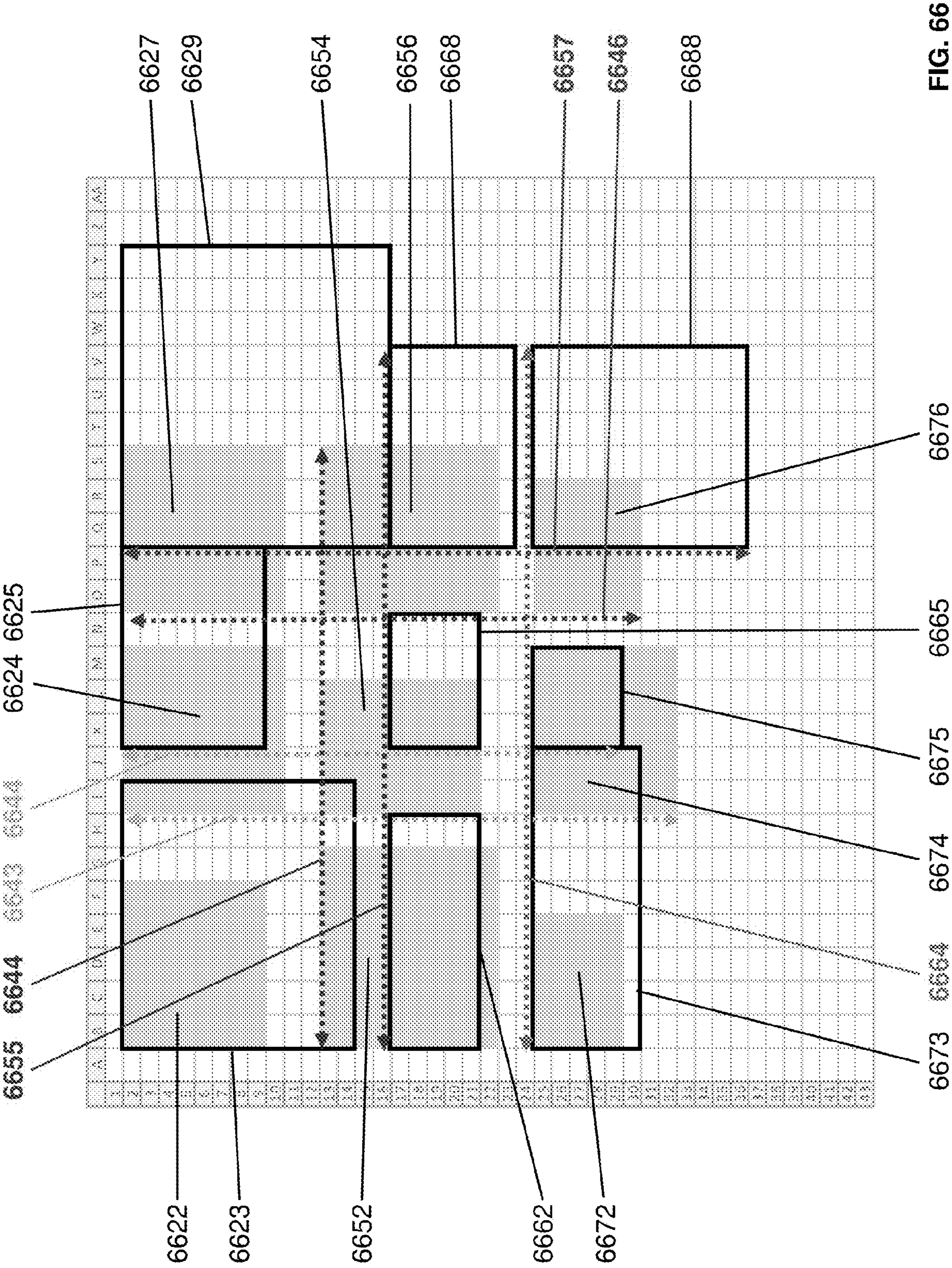

FIG. 66 illustrates a very complicated flex scenario where the nine areas in FIG. 65 are flex areas and simultaneously flex like they flexed in FIG. 61. However, due to our alignment capability the movement link/connect coordination will deliver a very different outcome retaining in this example the four sets of alignments the user setup. Our technology automatically ensures there is no overlap of the linked/connected areas but goes further to automatically retain the alignments. As before, the pre-flex areas are the gray shaded cells and the post-flex areas are the dark outlined cells. The pre-flex pink vertical dotted line 6643 illustrates the vertical linkage for the three areas 6624, 6654 and 6674 and the pink dotted line 6644 illustrates the post-flex alignment of the three areas 6625 (pre-flex 6624), 6665 (pre-flex 6654), and 6675 (pre-flex 6674). Our alignment technology automatically shifted the two areas 6625 and 6665 to align with the displaced area 6675. The pre-flex red vertical dotted line 6646 illustrates the vertical linkage for the three areas 6627, 6656 and 6676 and the red dotted line 6657 illustrates the post-flex alignment of the three areas 6629 (pre-flex 6627), 6668 (pre-flex 6656), and 6688 (pre-flex 6676). Our alignment technology automatically shifted the two areas 6668 and 6688 to align with the displaced area 6629. The pre-flex blue horizontal dotted line 6644 illustrates the horizontal linkage for the three areas 6652, 6654 and 6656 and the blue dotted line 6655 illustrates the post-flex alignment of the three areas 6662 (pre-flex 6652), 6665 (pre-flex 6654), and 6668 (pre-flex 6656). Our alignment technology automatically shifted the two areas 6662 and 6665 to align with the displaced area 6668. The pre-flex green horizontal dotted line 6664 illustrates the horizontal linkage for the three areas 6672, 6674 and 6676 while the same green dotted line 6664 illustrates the post-flex alignment of the three areas 6673 (pre-flex 6672), 6675 (pre-flex 6674), and 6688 (pre-flex 6676). So, while 6673, 6675 and 6688 flexed and moved, nothing changed their pre-flex horizontal alignment.

Aligned Link Movement with Minimum Cushion

Figure 67:
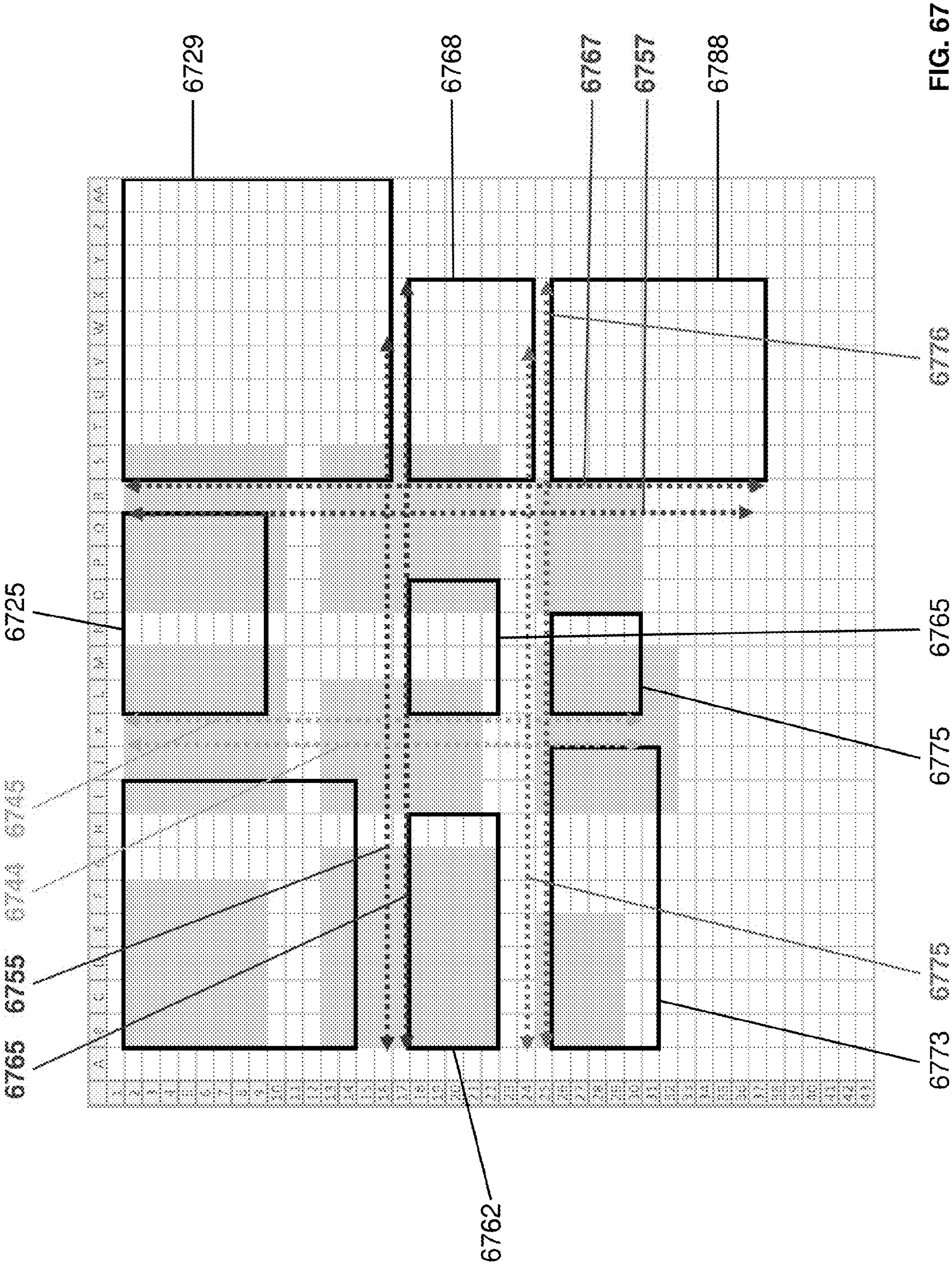

As with other embodiments, the align linked/connected movement can be supported with spacing cushions in our technologies. FIG. 67 examples the same flexes and alignments as in FIG. 66 but with an embodiment with a minimum one cell overlap cushion. Thus, the pink vertical alignment 6745 of areas 6725, 6765 and 6775 delivered by this embodiment is one cell to the right of the pink alignment 6744 which was delivered in FIG. 66. The red vertical alignment 6767 of areas 6729, 6768 and 6788 delivered by this embodiment is then two cells to the right of the red vertical alignment 6757 which was delivered in FIG. 66. The blue horizontal alignment 6765 of areas 6762, 6765 and 6768 delivered by this embodiment is then one cell below the blue horizontal alignment 6755 which was delivered in FIG. 66. The green horizontal alignment 6776 of areas 6773, 6775 and 6788 delivered by this embodiment is one cell below the green horizontal alignment 6775 which was delivered in FIG. 66. It is only one cell below, not a cumulative two cells below, because the green horizontal alignment in FIG. 66 was not overlaid by the flexes and so the impact in FIG. 67 is just one cell not two. While the minimum cushion could be any set distance (e.g., two cells or one row cell and two column cells) it could also be a variable distance dependent on the pre-flex spacing of the alignments as exampled next.

Aligned Link Movement with Variable Minimum Cushion

FIG. 68A and FIG. 68B examples embodiments of our technology where the minimum cushion is determined by a function of the separation between the aligned areas and the cells or boundary to their left for vertical and above for horizontal linked/connected alignments. FIG. 68 has the four alignments exampled in FIG. 65 plus two more illustrated by the light blue alignment 6831 between the left column boundary and the three areas 6822, 6832 and 6842 and the light green alignment 6815 between the top row boundary and the three areas 6822, 6824 and 6827. These last two alignments are put in place in case functions or capabilities are used that can flex to the left or flex up, respectively. Our link/connect movement technologies can use the closest or the farthest separation of an alignment to its adjacent cells to set the minimum cushion. So, for example for the pink alignment 6833 the closest separation would generate a minimum cushion of one column and the farthest separation would set a minimum cushion of three columns. The red alignment 6836 would generate a closest separation minimum cushion of one column and a farthest separation minimum cushion of two columns. The blue alignment 6825 would generate a closest separation minimum cushion of one row and a farthest separation minimum cushion of three rows. The green alignment 6845 would generate a closest separation minimum cushion of two rows and a farthest separation minimum cushion of three rows. The light blue alignment 6831 would set both a closest and farthest separation minimum cushion of one column while the light green alignment 6815 would set both a closest and farthest separation minimum cushion of one row. Our technology would support the closest and farthest values staying the originally specified values as the farthest values could increase over successive flexes.

FIG. 68B examples an embodiment where vertical alignment is set to deliver a minimum cushion that is the farthest of original separations, and the horizontal alignments is set to deliver the closest original separations (when the horizontal linkage was setup). This delivers after the flexes a light blue minimum cushion 6871 of one column, a pink cushion 6874 of three columns minimum, a red cushion 6878 of two columns minimum, a light green cushion 6855 of one row minimum, a blue cushion 6876 of one row minimum, and a green cushion 6886 of two rows minimum.

FIG. 132A and FIG. 132B examples the same cell row or column separation distances as FIG. 68A and FIG. 68B but with different farthest and closest separation minimum selections by the user or default settings within the application. In FIG. 132A the light blue alignment 13231 would set both a closest and farthest minimum cushion of one column, while the pink alignment 13233 would set closest separation minimum cushion of one column and a farthest separation minimum cushion of three columns. and the red alignment 13236 would generate a closest separation minimum cushion of one column and a farthest separation minimum cushion of two columns. Like in FIG. 68A, in FIG. 132A the light green alignment 13215 would set both a closest separation minimum and farthest separation minimum cushion of one row, while the blue alignment 13225 would generate a closest separation minimum cushion of one row and a farthest separation minimum cushion of three rows, and the green alignment 13245 would generate a closest separation minimum cushion of two rows and a farthest separation minimum cushion of three rows.

FIG. 132B examples an embodiment where vertical alignment is set to deliver a minimum cushion that is the closest of the previous separations, and the horizontal alignments is set to deliver the minimum cushion which is the farthest of the previous separations (pre-flex). This delivers after the flexes a light blue minimum cushion 13271 of one column, a pink minimum cushion 13274 of one column, a red minimum cushion 13277 of one column, a light green minimum cushion 13255 of one row, a blue minimum cushion 13276 of three rows, and a green minimum cushion 13286 of three rows.

Imperfect Alignment Link Movement

Figure 69:
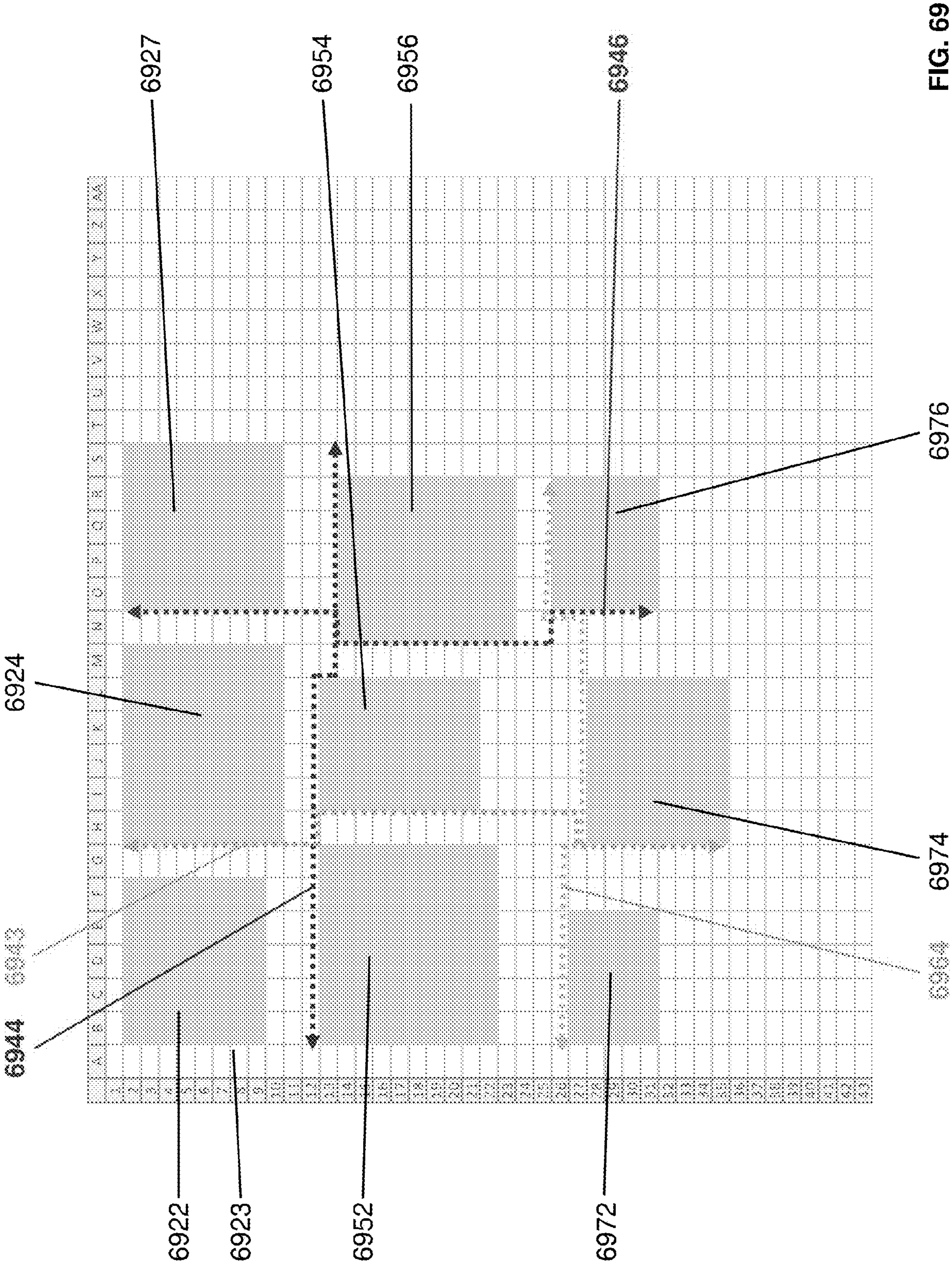

Thus far our examples of alignment showed areas starting with straight line vertical or horizontal alignment. However, our technology supports the alignment of areas with non-straight line (imperfect) alignment as exampled in FIG. 69. FIG. 69 examples a user having manually, or the application automatically set up two vertical and two horizontal link/connect alignments. Note, in this example there are no flexes used that can flex up or to the left so there is no need to setup the cell heading facing alignments but had there been any our technology could retain that alignment (whether straight or non-straight). The pink vertical alignment 6943 is of linked/connected areas 6924, 6954 and 6974 while the red vertical alignment 6946 is of linked/connected areas 6927, 6956 and 6976. The blue horizontal alignment 6944 is of linked/connected areas 6952, 6954 and 6956 while the green horizontal alignment 6964 is of linked/connected areas 6972, 6974 and 6976. There are many reasons a user may want what looks like an imperfect alignment, such as aligning the bodies of the different flex types or aligning particular headings. No matter the reason, our technology supports retaining the pre-flex alignment post-flex as exampled in FIG. 70.

Figure 70:
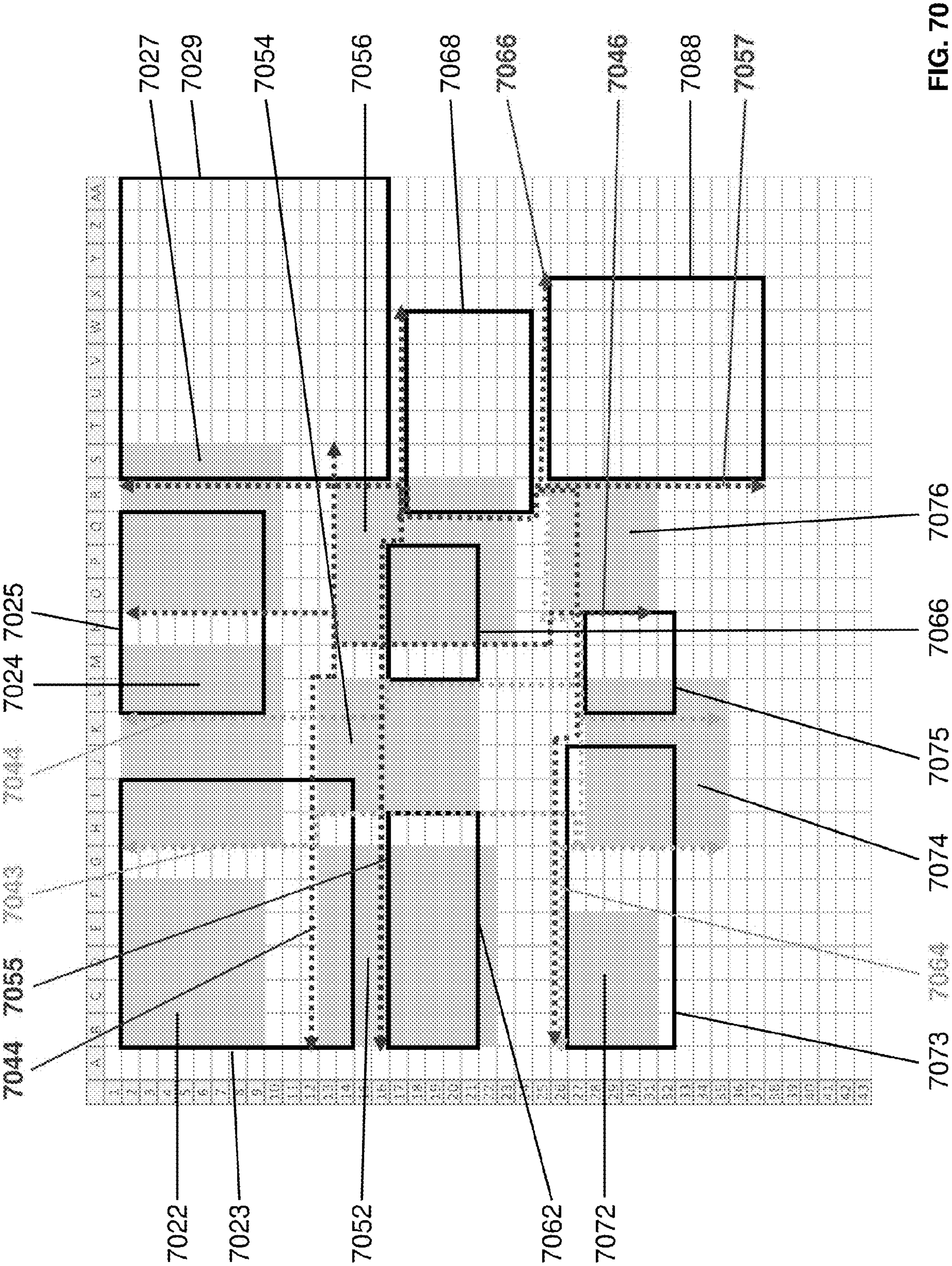
Figure 71A:
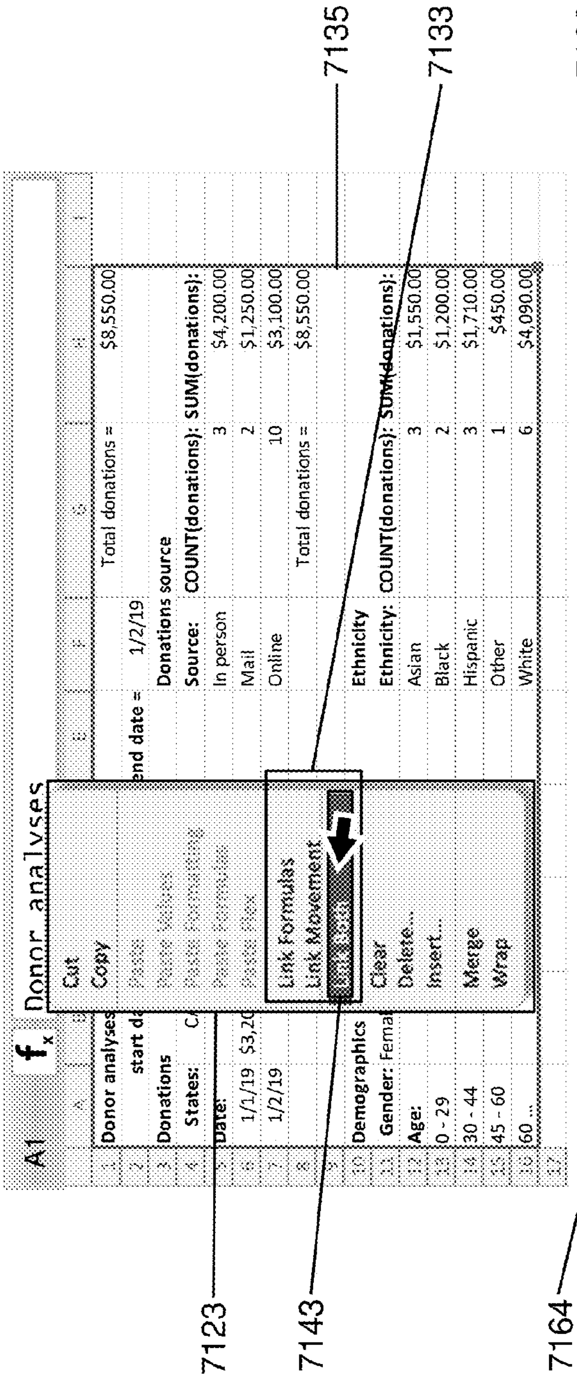
Figure 71B:
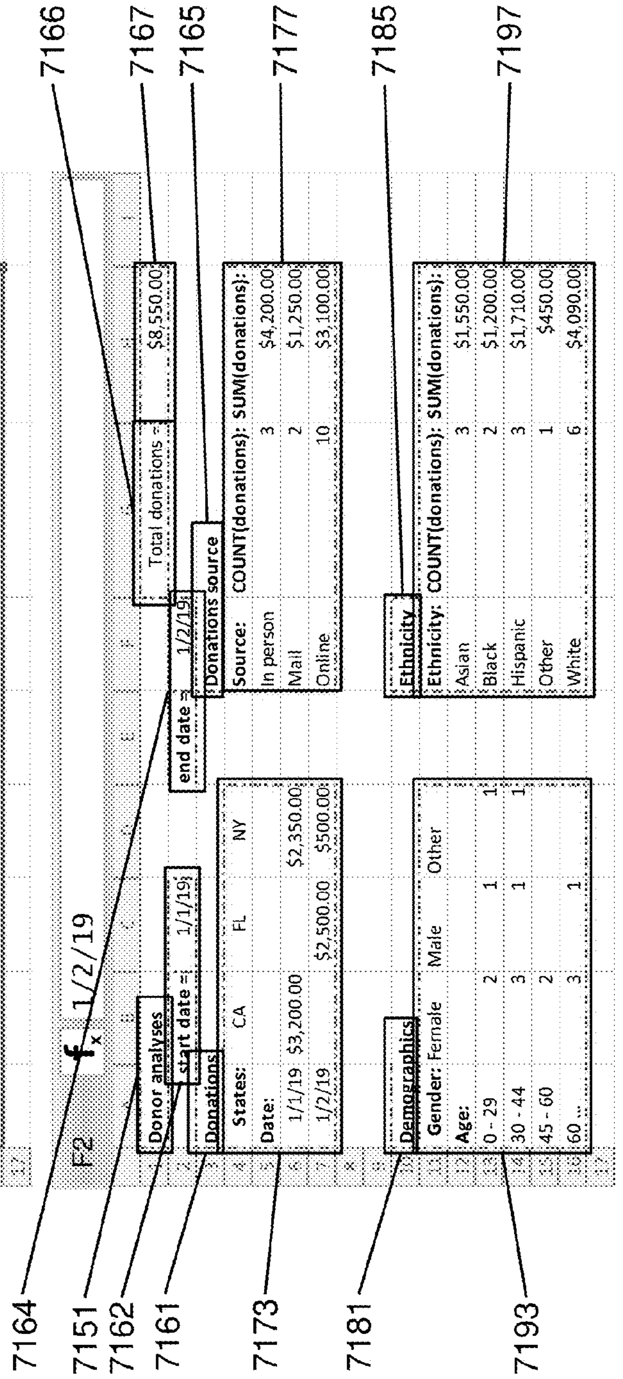
Figure 72A:
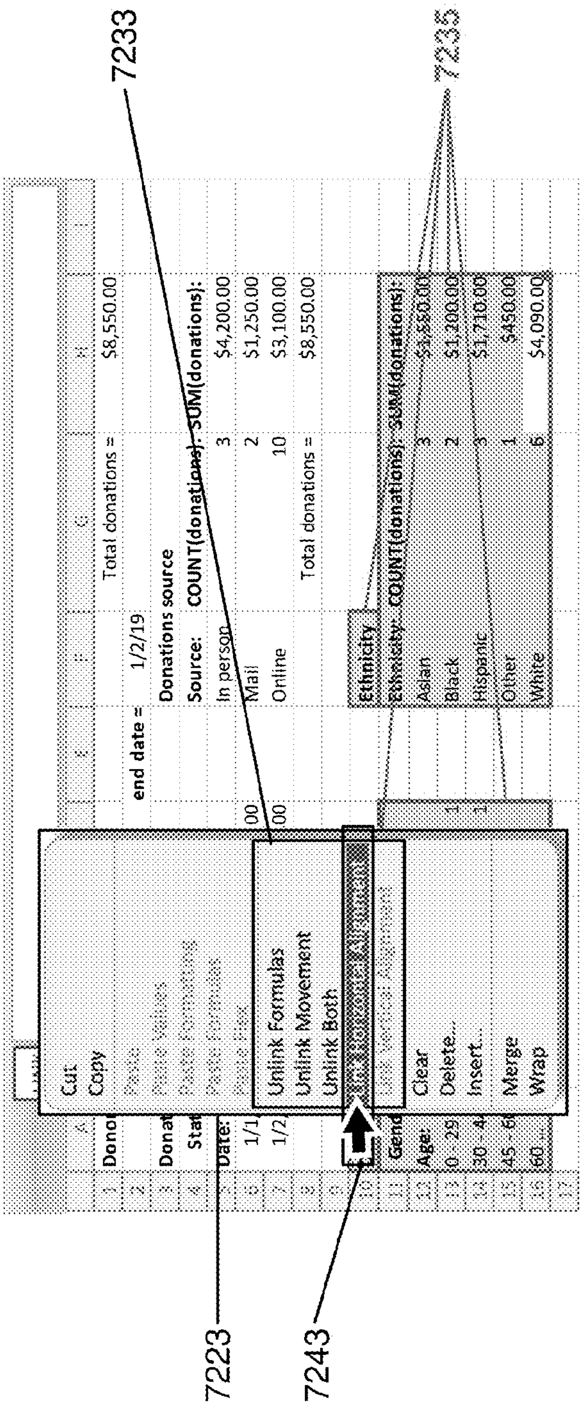
Figure 72B:
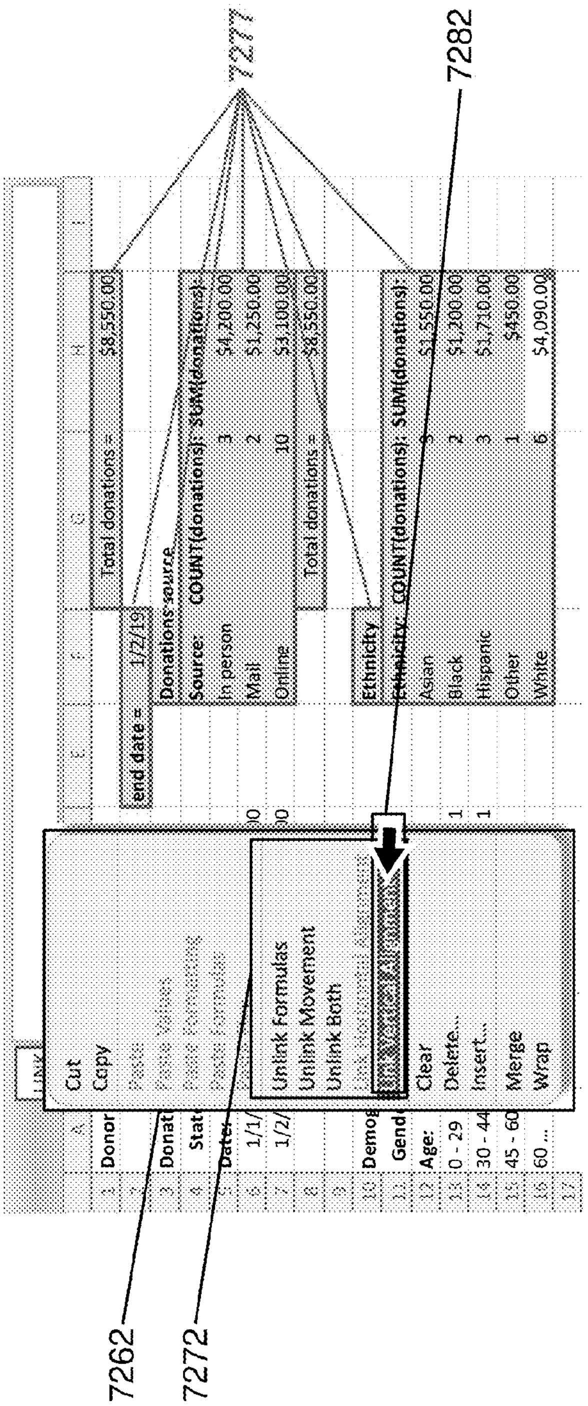

FIG. 70 examples the nine linked/connected flex areas with the four alignments exampled in FIG. 69 undergoing nine simultaneous flex range area flexes (7022 to 7023, 7024 to 7025, 7027 to 7029, 7052 to 7062, 7054 to 7066, 7056 to 7068, 7072 to 7073, 7074 to 7075, and 7076 to 7088) retaining through our technology the four alignments with a minimum one unoccupied cell cushion. As with many examples before, the pre-flex areas are the gray shaded cells and the post-flex areas are the dark outlined cells. Each of the vertical pre-flex alignments, pink 7043 and red 7046, are maintained post-flex with a one column cell unoccupied minimum cushion, giving the post-flexes pink 7044 and red 7057 alignments. Each of the horizontal pre-flex alignments, blue 7044 and green 7064, are maintained post-flex with a one row cell unoccupied minimum cushion, blue, giving the post flexes blue 7055 and green 7066 alignments. As we discussed previously, the minimum cushion exampled in FIG. 70 as one row or column cell, could be set may different ways with the power of these embodiments of our technology being in the ability to automatically retain perfect or imperfect alignments post flex.

FIG. 133A and FIG. 133B example different manual ways in our technology to horizontally and vertically link imperfectly aligned areas together for flex movements. In FIG. 133A the user has obtained a popup 13343, via a right click or ribbon menu, that gives them a set of 'Link' and 'Unlink' options 13353 and 13383. In FIG. 133A it also gives the user the option to horizontally align the three imperfectly aligned areas highlighted 13362, 13363, and 13364, which is the option they clicked 13363. Our technology did gray out one option 'Link Vertical Alignment' 13373 to vertically align the selection, because this embodiment was intelligent enough to realize the linked areas highlighted were not vertical (one above the other and so on), and therefore not a candidate to link vertically. FIG. 133B examples another way for the user to align movement linkages/connections. The user has clicked a ribbon 'LINK' button 13329 that gives them the popup 13338 with a set of 'Link' and 'Unlink' options. It also gives the user the option to vertically align ('Vertical alignment') the three areas highlighted 13347, 13367, and 13387, which they clicked 13348. There are of course other ways our technology can support the manual selection of what to align vertically or horizontally as well as automatic ways our technology could set alignments using rules to infer which flex ranges and cells to align. However, rather than further exampling ways to set the alignments we will example different embodiments of how our alignment technologies work for flex contractions.

FIG. 134A and FIG. 134B examples two vertical and two horizontal movement link/connect alignments which retain their aligned one cell minimum cushion during flex contractions. In FIG. 134A the user has setup two vertical alignments (pink 13462 and red 13464) and two horizontal alignments (blue 13453 and green 13473). The user in FIG. 134B makes a change that simultaneously contraction flexes all nine flex areas. In this embodiment our technology automatically retains the one cell minimum separation of the vertically and horizontally aligned areas as shown by the two vertical alignments (pink 13466 and red 13468) and two horizontal alignments (blue 13457 and green 13467). In another embodiment the minimum cushion for each alignment could have been the closest or farthest separation at time of alignment embodiment or at pre-flex.

FIG. 135A and FIG. 135B examples two vertical and two horizontal movement link/connect alignments which retain their alignment but not their separation distance during flex contractions. In FIG. 135A the user has setup two vertical alignments (pink 13562 and red 13564) and two horizontal alignments (blue 13553 and green 13573). The user in FIG. 135B makes a change that simultaneously contraction flexes all nine flex areas. In this embodiment our technology automatically retains the vertical and horizontal alignments of the areas as shown by the two vertical alignments (pink 13566 and red 13568) and two horizontal alignments (blue 13557 and green 13577). However, what this embodiment does not do is to retain the separation between the alignment and the areas to the left (for vertical alignment) or the areas above (for horizontal alignments). This is a variant of what we have previously called one-way differentiating the movement behavior for flex contractions from flex expansions.

Thus far our imperfect alignment examples have been more conceptual showing the key concepts of how our technology works. We will now move to a more detailed example.

Imperfect Alignment Link Movement—Detailed Example

FIG. 71A through FIG. 73B examples the setup and use of our vertical and horizontal alignment coordinated movement link/connect technology in a more detailed example displaying all the cell contents. The charity user has setup four different flexing analyses with a number of labels, inputs, and calculations that they would like to formula (as applicable) and movement link/connect. They do so by highlighting the cell range 'A1' to 'H16' 7135 and then right clicking to get a menu 7123 giving them the link/connect options 7133. All those options are applicable here and the user could have selected any one of them opting in this example to click 'Both' (movement and formula) 7143.

Note, in another embodiment the setup of the formula (as applicable) and movement link/connects could have been automatic as the user created the cell or flex range content. This then delivers the movement or formula and movement linked/connect group of four flexes (7173, 7193, 7177, and 7197), ten date or text cells (7151, 7162, 7164, 7166, 7161, 7165, 7181, and 7185), and a 'SUM' calculation cell 7167.

The user then decides that they would like to set a horizontal and vertical alignment to be maintained during the flexes. Therefore, in FIG. 72A the user highlights the cells 'A10' through 'H16' 7235 (or individually selects the cells with contents) and right clicks to get the menu 7223 where they see a set of link related options 7233 from which they click (select) 'Link Horizontal Alignment' 7243 to maintain the horizontal alignment of the highlighted cells after flexes. The user then highlights the cells 'E1' through 'H16' 7277 in FIG. 72B (or individually selects the cells with contents) and right clicks to get the menu 7262 where they see a set of link related options 7272 from which they click (select) 'Link Horizontal Alignment' 7282 to maintain the horizontal alignment of the highlighted cells after flexes. The user is now ready for changes in their analyses that will flex the results while retaining their desired horizontal and vertical alignments.

Figure 73A:
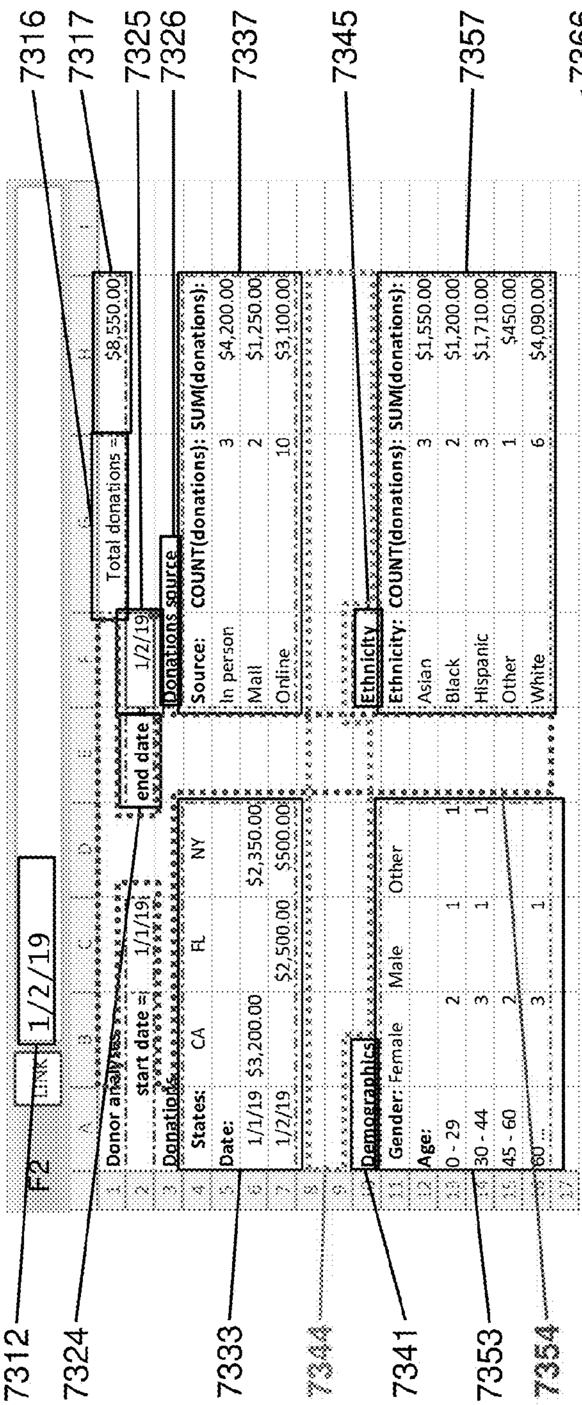
Figure 73B:
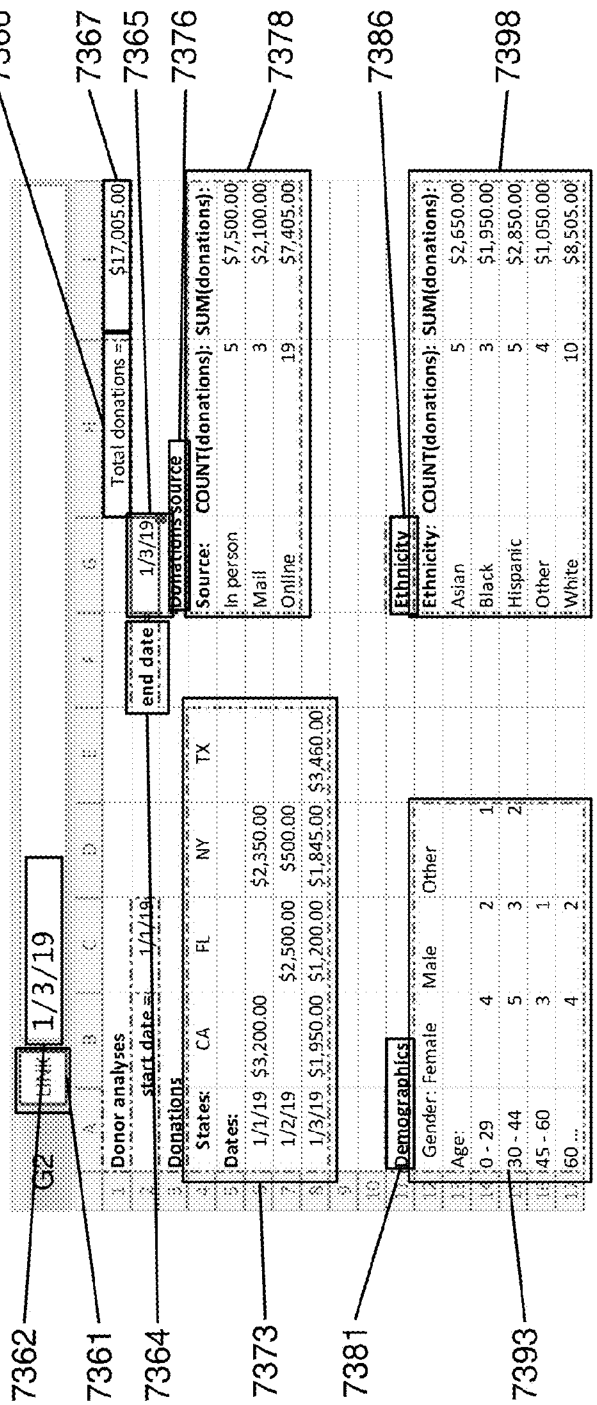

FIG. 73A through FIG. 73B examples the flexing of the linked/aligned cells by the user changing the end date parameter of their analyses from '1/2/19' 7325 in FIG. 73A to '1/3/19' 7365 in FIG. 73B. Because not all the flexes flex in a similar (synchronized) way this makes it impossible to maintain exactly all the previous spatial relationships. The flex lack of width (number of columns populated) synchronization in the flex of 7373 and 7393 in FIG. 73B relative to 7333 and 7353 in FIG. 73A means the spatial relationship of either 7373 or 7393 to 7378 and 7398 in FIG. 73B will not be what it was in FIG. 73A. However, in this embodiment the user has employed our horizontal and vertical linkage/connect movement coordination with a minimum cushion of the closest previous spacing. That minimum cushion is one column for the vertical alignment 7354 (from cell 'D2') and two rows for the horizontal alignment 7344 (from cells 'A8/A9' or 'F8/F9'). Note, our closest and farthest separation evaluations go from occupied cell to occupied cell ignoring row or column situations where there are no occupied-to-occupied cells as exampled illustratively by red separation 7354 not widening for the rows '8' and '9' and the blue separation 7344 not widening for the column 'E' (which has not content below 'E3').

So, the flex in FIG. 73B of the 'WRITE' in 7373 not only moves 7381 and 7393 retaining the two-row minimum cushion but also moves 7386 and 7398 so they stay horizontally aligned with 7381 and 7393. The 'WRITE' flex in 7373 also moves 7376 and 7378 retaining the one column cushion but also moves 7366, 7367, 7364, 7365, 7386, and 7398 so they stay vertically aligned with 7376 and 7378. In parallel our technology also automatically does the formulaic linkage/connect for the 'SUM' formula in cell 'I1' 7367. As previously mentioned there could have been more than one simultaneous flex and the flexes could be from any flex function or capability and our technology would have automatically coordinated the cell movements to maintain the alignments and cushions.

Rather than doing more detailed examples we will move onto other embodiments of our movement and formula linkage/connect technology.

Indirect and Direct Link Movement

Another embodiment of our movement link/connect technology automatically retains both the row and column relative spatial relationships of directly linked areas while cascading movements from the indirectly linked areas as exampled in FIG. 74A and FIG. 74B. The cascaded movements retain the row and column relative spatial relationships of directly linked areas propagating directly linked/connected movements through to the indirectly linked areas. The net result is the spatial relationships of the directly linked areas stay the same while the spatial relationships of indirectly linked areas can change due to the indirect cascading (propagation) of flexes. The embodiment in FIG. 74A automatically sets up movement linkages/connections for any area below or to the left or right of a flex area to the closest flex area where in the event of a tie in cell distance it links according to the rule set in FIG. 143. Note, a different variant of the rules in FIG. 143 could handle linkages/connections to areas above as well as different variants can be supported by our technology. Our technology also automatically formula links/connects to flex areas according to the cell formulas. However, in another embodiment the direct linkages/connections could be manually set by the user. In either situation post setup our technology functions the same way for the same settings. In FIG. 74A there are two direct movement linkages/connections between cell areas, one illustratively exampled by the light blue arrow between the cell 'D14' 7483 and the flex range area in cells 'A9' through 'E12' 7463 and the second illustratively exampled by the five red-colored arrows between the flex range in cells 'A9' through 'E12' 7463 and the flex range in cells 'A4' through 'E7' 7453. Each of those direct linkage/connection movement relative row and column spatial relationships do not change (7459 in FIG. 74B vs. 7455 in FIG. 74A, and 7479 in FIG. 74B vs. 7475 in FIG. 74A) with the flexes created in FIG. 74B by changing the 'end date' input of '1/2/19' 7425 in FIG. 74A to '1/3/19' 7429. However, the indirect movement linkages/connection of cell 'D14' 7483 in FIG. 74A to the flex range area in cells 'A4' through 'E7' 7453 is via the flex range area in cells 'A9' through 'E12' 7463 such that the flex of 7457 (pre-flex 7453 in FIG. 74A) in FIG. 74B directly moves the flex range 7477 (pre-flex 7463 in FIG. 74A) thereby indirectly moving 'E16' 7488 (pre-flex 7483 in FIG. 74A) via the direct movement by 7477 (pre-flex 7463 in FIG. 74A). The result is that 'E16' 7488 (pre-flex 7483) maintains its relative spatial relationship to 7477 (pre-flex 7463 in FIG. 74A) but changes its relative spatial relationship to 7457 (pre-flex 7453 in FIG. 74A).

FIG. 74A and FIG. 74B when operated in the reverse order of starting in FIG. 74B and changing the 'end date' input of '1/3/19' 7429 to '1/2/19' 7425 in FIG. 74A automatically shrinks the flexes giving the result in FIG. 74A. In FIG. 74A all the direct movement linkages/connections (7455 in FIG. 74A vs. 7459 in FIG. 74B, and 7475 in FIG. 74A vs. 7479 in FIG. 74B) stay the same as in FIG. 74B despite the flexes shrinking. In this embodiment our technology works the same way whether the flexes are expanding, shrinking, or doing combinations of expanding and shrinking.

FIG. 75A and FIG. 75B example our direct and indirect linked/connected movement technology working for a combined formula and movement linkage/connection. In FIG. 75A there are two direct movement linkages/connections between cell areas, one illustratively exampled by the light blue arrow between the cell 'E14' 7583 and the flex range area 7563 and the second illustratively exampled by the five red-colored arrows between the flex range 7563 and the flex range 7553. Each of those direct linkage/connection movement relative row and column spatial relationships do not change (7559 in FIG. 75B vs. 7555 in FIG. 75A, and 7587 in FIG. 75B vs. 7575 in FIG. 75A) with the flexes created in FIG. 75B by changing the 'end date' input of '1/2/19' 7525 in FIG. 75A to '1/3/19' 7529. However, the indirect movement linkages/connections of cell 'E14' 7583 in FIG. 75A to area 7553 cascades in FIG. 75B through the area 7557 (pre-flex 7553 in FIG. 75A) direct link flex movement of the flex area 7577 (pre-flex 7463 in FIG. 75A) that then direct link moves 'F16' 7588 for both the flex of flex range 7577 (pre-flex 7563 in FIG. 75A) and the flex of flex range area 7557 (pre-flex 7553 in FIG. 75A). The formulaic link/connection also automatically changes the formula 7513 in cell 'E14' in FIG. 75A to reflect the flexes in the formula 7517 in cell 'F16' in FIG. 75B. Thus, both the movement and formula automatic changes have been executed by our technology.

FIG. 75A and FIG. 75B when operated in the reverse order of starting in FIG. 75B and changing the 'end date' input of '1/3/19' 7529 to '1/2/19' 7525 in FIG. 75A automatically shrinks the flexes giving the result in FIG. 75A for both the movement and formulaic linkages/connections. In FIG. 75A all the direct movement linkages/connections (7555 in FIG. 75A vs. 7559 in FIG. 75B, and 7575 in FIG. 75A vs. 7587 in FIG. 75B) stay the same as in FIG. 75B despite the flexes shrinking. In this embodiment our technology works the same way for both movements and formulaic changes whether the flexes are expanding, shrinking (contracting), or doing combinations of expanding and shrinking.

FIG. 136A and FIG. 136B example our direct and indirect linked/connected movement technology working for a combined formula and movement linkage/connection where the indirectly linked area is a flex range. In FIG. 136A there are two direct movement linkages/connections between cell areas, one illustratively exampled by the three light blue arrows between the flex range area 13683 and the flex range area 13663 and the second illustratively exampled by the five red-colored arrows between the flex range 13663 and the flex range 13633. Each of those direct linkage/connection movement relative row and column spatial relationships do not change (13659 in FIG. 136B vs. 13655 in FIG. 136A, and 13679 in FIG. 136B vs. 13675 in FIG. 136A) with the flexes created in FIG. 136B by changing the 'end date' input of '1/2/19' 13625 in FIG. 136A to '1/3/19' 13629. However, the indirect movement linkages/connections of flex range area 13683 in FIG. 136A to the flex range area 13633 cascades via the area 13663. The area 13637 (pre-flex 13633 in FIG. 136A) flex movement in FIG. 136B through its direct link (13659) to the flex area 13677 (pre-flex 13663) indirectly moves the flex range area 13687 (pre-flex 13683 in FIG. 136A). So, 13687 (pre-flex 13683 in FIG. 136A) is moved for both the flex of area 13637 (pre-flex 13633 in FIG. 136A) and 13677 (pre-flex 13663 in FIG. 136A). The formulaic link/connection also automatically changes the formulas in the flex range area 13683 in FIG. 136A to reflect the flexes as exampled in the formula 13617 in cell 'F16' in FIG. 136B relative to the formula 13613 in cell 'E14' in FIG. 136A. Thus, both the movement and formula automatic changes have been executed by our technology.

FIG. 136A and FIG. 136B when operated in the reverse order of starting in FIG. 136B and changing the 'end date' input of '1/3/19' 13629 to '1/2/19' 7425 in FIG. 136A automatically shrinks the flexes giving the result in FIG. 136A. In FIG. 136A all the direct movement linkages/connections (13655 in FIG. 136A vs. 13659 in FIG. 136B and 13675 in FIG. 136A vs. 13679 in FIG. 136B) stay the same as in FIG. 136B despite the flexes shrinking. In this embodiment our movement technology when combined with formulaic linkages/connections (in both) works the same way whether the flexes are expanding, shrinking, or doing combinations of expanding and shrinking.

Indirect and Direct Link Movement—More Linkages and Cascading

Our direct link movement technology supports many more direct linkages and the cascading of flexes through those linkages. FIG. 137A and FIG. 137B example four different movement linkages where one of the linked cells is both movement and formula linked/connected. In this example the user could have manually or automatically linked/connected the different areas to create the four different links. The red arrow illustrates the movement connection/link 13721 between the 'WRITE_V' populated area 13741 and the 'WRITE_H' populated area 13733. The four light blue arrows illustrating the links 13725 to/from the 'WRITE_H' populated area 13733 and the 'flex copy paste' populated area 13742. The one pink arrow illustrating the link 13753 to/from the 'flex copy paste' populated area 13742 and the cell 'E7' 13743. Note, this direct link could be to the second from the right last lower cell of the 'flex copy paste' 13742 (as it is in 13753) or it could be shown differently going to the right lower corner cell of the 'flex copy paste' 13742 resulting in an illustrative link of 1 column 1 row rather than 13753. The one dark blue arrow illustrating the link 13755 to/from the right lower corner 'flex copy paste' populated cell in area 13742 and the cell 'F7' 13745. That cell is also formula linked/connected to the 'flex copy paste' populated area 13742.

In FIG. 137B the user changes an input into the 'WRITE_V' formula 13718 adding an additional field 'contact' 13717 which then flexes the 'WRITE_V' populated area 13776 (pre-flex change 13741 in FIG. 137A) resulting in changes to the positions of all the linked/connected areas via direct or indirectly cascaded direct movements. That flex directly moves the 'WRITE_H' 13738 (pre-flex 13733 in FIG. 137A) retaining the same relative spatial positioning 13726 (pre-flex 13721 in FIG. 137A). Then the 'WRITE_H' 13738 directly moves the 'flex copy paste' populated area 13778 one column to the right (pre-flex 13742 in FIG. 137A). The flex copy paste' populated area 13778 then directly moves what was cells 'E7' 13743 and 'F7' 13745 in FIG. 137A for both its direct link/connection movement of one column to the right and then its flex to the much larger populated area 13778 directly moving them to cells 'F18' 13798 and 'G18' 13799. Thereby automatically retaining post-flex both of their pre-flex relative spatial positions 13797 (pre-flex 13753 in FIG. 137A) and 13789 (pre-flex 13755 in FIG. 137A). Also automatically retaining the formulaic linkage/connection in cell 'G18' 13799. Thus, exampling more cascaded linkages/connections and multiple direct linkages.

Our direct (and indirect) movement linkage/connection technology handles much more complicated flex situations that can be setup manually or automatically. FIG. 30A and FIG. 30B example two 'WRITE_CALC_2D' formulas, two text cells and one calculation cell that have been directly and indirectly cascading linked/connected by our technology. In FIG. 30A the (first) WRITE, which populates cells 'A4' through 'F8' 3043, has the cell 'A9' 3051 and the (second) WRITE, which populates cells 'A10' through 'F14' 3073, directly movement (positionally) linked/connected to it. Then the SUM calculation in 'F16' 3085 is directly linked positionally (movement-wise) to the (second) WRITE 3073 and indirectly linked positionally (movement-wise) to the (first) WRITE 3043 by cascading (indirect) linkage. Formulaically the SUM is linked to segments (body) of both WRITEs via the formula 3014:

'=SUM($C6$:$F8$)−SUM($C12$:$F14$)'

As its formula 3014 sums the body (3054 and 3066) of both WRITEs. The 'Net donation=" text in cell 'E16' 3084 is directly positionally linked/connected to cell 'F16' 3085 and then through it indirectly cascading linked to both WRITEs. Or it could be directly linked to the flex range area 3073. FIG. 30B examples what happens when the user changes the 'end date' to '1/4/19' 3029 (from '1/3/19' 3025 in FIG. 30A) causing both WRITEs to automatically flex. Then because of our linkage/connection technology causing those changes to automatically positionally cascade as shown in the results 3066, 3077, 3099, and 3098 in FIG. 30B. Coordinating through our link/connect technology the previous spatial relationships for the row and column changes induced by the flexes. In this example retaining the both the relative row and column spatial relationships for direct linkages and being moved rows by the indirect movement linkages/connections (e.g., cell 'G18' 3099 in FIG. 30B indirectly linked to the WRITE populating cells 'A4' through 'G9' 3058). The calculation formula 3018 in cell 'G18' 3099 is automatically adjusted for both of the WRITE flexes (3047 and 3077 and the related flexes of their bodies 3058 and 3078) and recalculates to '$21,262.79' 3099 automatically adjusting to use the body of both WRITE range segments 3058 and 3078. Thus, our linkage/connection technology supports multiple combinations of direct, and indirect cascading linkages. The cascading capabilities of our technology work for combinations of other different types of flexing functions and capabilities by themselves or mixed as we will example next.

FIG. 31A and FIG. 31B example two flex copy paste capabilities, three WRITE functions, two text cells and one multiple SUM calculation cell that have been directly and/or cascading movement linked/connected by our technology. In different embodiments of our technology those movement links/connections could be automatically instantiated (automatically employing rule sets like those exampled in FIG. 143), manually set by a user, or semi-automatically set by user selection of areas followed by a ruleset like the one in FIG. 143. In FIG. 31A the (first) 'flex copy paste', which populates cells 'C6' through 'F8' 3154, has the cell 'C9' 3162 and the (second) 'flex copy paste' which populates cells 'C10' through 'F12' 3174, directly positionally (movement) linked to it. The (third) 'WRITE' which populates cells 'A10' through 'A12' 3171 is directly movement linked/connected to the (second) 'WRITE' which populates cells 'A6' through 'A8' 3151. Then the SUM calculation formula 3114 in 'F14' 3185 is directly linked positionally to the (second) 'flex copy paste' 3174 and indirectly linked positionally to the (first) flex copy paste 3154 and all the 'WRITEs' (3134, 3151, and 3171) by cascade. Formulaically the SUM is directly linked to both flex copy pastes via the formula 3114:

'=SUM($C6$:$F8$)−SUM($C10$:$F12$)'

As its formula 3114 sums both flex copy paste ranges (3154 and 3174). The 'Net donation=" text in cell 'E14' 3184 is directly positionally linked/connected to cell 'F14' 3185 and then indirectly through it cascading linked to both flex copy pastes and all the WRITEs. Note, in another embodiment this cell 'E14' 3184 is directly positionally linked/connected to the lower right corner cell of the flex range 3174. FIG. 31B examples when the user changes the 'end date' to '1/4/19' 3129 (from '1/3/19' 3125 in FIG. 31A) causing all three of the 'WRITEs' (3138, 3156 and 3186) driving the flex copy pastes to automatically flex then causing the 'flex copy pastes' (3158 and 3188) to flex. However, because of our linkages/connections technology the 'WRITEs' and 'flex copy paste' flexes directly and indirectly cascade movements not overlapping themselves and other cells as shown in the results 3138, 3156, 3158, 3177, 3186, 3188, 3199, and 3198. Our link/connect technology coordinates the movements so that the spacing between WRITEs, the flex copy pastes, the text cells and the summation cell all adjust their relative positions in both row and/or column positions retaining their directly linked/connected coordinated relationships. The calculation formula 3118 in cell 'G16' 3199 is automatically adjusted by our link/connect technology for both 'flex copy paste' flexes and recalculates to '$21,262.80' 3199. In this example the user did not link/connect the Text fields 'States' and 'Dates' because they did not anticipate changing the 'WRITEs' in a way that would shift them, however as we will example later, they could have done that as there are changes to the 'WRITEs' that would add a second column or row to them making linking/connecting those movable cell areas helpful.

With our two-way (expansion and contraction) movement linkage coordination capability, if the user changed the 'end date' of '1/4/19' in cell 'G2' 3129 in FIG. 31B back to '1/3/19' they would get the result shown in FIG. 31A. Where all the directly linked coordinate movement relationships would be maintained with the flex contractions. In this example the indirect linkages/connections retain at least one of their pre-flex row or column relative spatial cell distances post-flex, although that is because the flexes are synchronized (i.e., coordinated in direction and distance of flex movement).

Our formula and movement link/connect technology also supports more types of indirect movement connections through another cell or cells to the flex range or flex ranges. FIG. 32A examples this in the situation where the movement link/connect connection for cell 'F15' 3285 is made indirectly through cell 'F14' 3275 which has the movement link/connect connections to the flex ranges 3273, 3271, 3254, 3251 and 3234. Cell 'F15' 3285 is a formulaically linked/connected to a flex range 3254 which is not the most proximate flex range. Cell 'E15' 3284 is directly movement linked/connected to cell 'F15' another indirectly linked/connected movement cell. Alternatively in another embodiment all the non-flex range cells could be linked to the closest flex-range thus cells 'E14' 3274, 'F14' 3275, 'E15' 3284, and 'F15' 3285 could all be movement linked the bottom right corner of the 'flex copy paste' range area 3273. Either embodiment would deliver the same flex outcome as exampled next.

FIG. 32B exampled where the flexes of 3256 (pre-flex 3251 in FIG. 32A), 3238 (pre-flex 3234 in FIG. 32A), 3258 (pre-flex 3254 in FIG. 32A), 3286 (pre-flex 3271 in FIG. 32A), and 3288 (pre-flex 3273 in FIG. 32A), directly and indirectly moves cells 'F17' 3298 (pre-flex 3284 in FIG. 32A), 'G17' 3299 (pre-flex 'F15' 3285 in FIG. 32A), 'F16' 3297 (pre-flex 3274 FIG. 32A), and 'G16' 3289 (pre-flex 'F14' 3275 in FIG. 32A) in unison. While all the other flex ranges and connected cells also move in a coordinated manner as shown for 3238, 3256, 3258, 3277, 3286, and 3288. Our technologies handle multiple layers of direct and indirect cascading movement linkages/connections as we will further example next with more complicated situations.

Indirect and Direct Link Movement—More Complicated Linkages

Our linkage/connection technology handles substantially more complexity in both movement and formula links/connections. FIG. 33A and FIG. 33B example multiple ‘flex copy pastes’, multiple ‘WRITEs’ multiple text fields and multiple SUM calculation cells, some side-by-side others spatially offset, some directly linked/connected with others indirectly cascading linked/connected by our technology. These movement links/connections connect flexing functions and capabilities directly and indirectly cascading both across and down. The formula links/connections connect cells (areas) and ranges and flex ranges (areas) to flex ranges (areas). Note, while we example the SUM function frequently our technology formulaically links any applicable spreadsheet prebuilt function.

In FIG. 33A, clicking into the in cell ‘E13’ 3383 in this embodiment triggers colored boundary borders around all the flex ranges/areas (3332, 3341, 3342, 3343, 3361, 3362, 3363, and 3372) that ‘E13’ is directly and indirectly (cascading) linked to. In this embodiment those boundary borders are color and boundary border type coded (blue dashes for flex copy paste and green dot dashes for WRITEs) for the different flex functions or capabilities. In this embodiment the other cells linked/connected to those flex ranges are not outlined despite there being a number of them that will move (e.g., 3362 and 3382) with the flex functions and capabilities flexes. FIG. 33B examples how all the linked cells (3338, 3339, 3356, 3358, 3359, 3376, 3367, 3378, 3379, 3386, 3387, 3388, 3397, 3398, and 3389) are automatically adjusted when the user changes the end date parameter to ‘1/4/19’ 3328 (from ‘1/2/19’ 3330 in FIG. 33A). Values are also recalculated in each of the formulaically linked cells resulting in a very large number of automatically moved and recalculated cells with no overlap or calculational errors and in this situation maintenance of their directly linked/connected relative spatial relationships.

Our linkage/connection technology automatically executes what would be a very time-consuming manual process to correctly reposition all the cells and correctly reconnect all the changed formulas (e.g., 3314 transformed to 3318) between FIG. 33A and FIG. 33B. Our technology has automatically coordinated all the linked/connected cells maintaining the prior row and column spatial relationships for direct linkages/connection post-flex through all the cascading indirect linkages. It has automatically changed the linked formulas for flex range and segments of flex range changes. And it will continue to do that for any further changes causing one or more flex changes.

While we could example different combinations of flexing capabilities and functions linked together in different ways and in different combinations. In the interest of conciseness, the combinations of flexing capabilities and functions and different types of linkages disclosed in this application are not repeated in all the different combinations that can contemplated by a user. The reader will understand how those combinations can be combined and therefore we example the setup of the linkages/connections involving direct and indirect cascading movement linkages/connections.

Indirect and Direct Link Movement—Setup

FIG. 76A and FIG. 76B examples a semi-automatic setup where user selects a range of cells for linkage/connection and our system then determines the direct movement linkages/connections for eight flexes, seven text cells and two calculation cells employing linkage logic like that exampled in FIG. 143. In FIG. 76A the charity user has built a set of analyses containing several flexing ‘WRITE’ functions and ‘flex copy paste’ capabilities. They have also intermixed cells with text and two cells with a calculation that they would like to adjust both movement and formula wise with the flexing functions/capabilities. In this example after they have built the different formulas and done the ‘flex copy pastes’, they highlight the entire range 7662 and click the ‘LINK’ button 7615 on the ribbon (although that could have been done many ways through menus, a shortcut, or other UIs). They then are presented with a dropdown menu 7625 giving them the applicable linkage/connection options, in this situation ‘Formula’, ‘Movement’ or ‘Both’. In this example the charity user would like to link everything for movement and where applicable also link formulas, so they select ‘Both’ 7635. This then delivers the result in FIG. 76B where is this embodiment our technology highlights all the linkages/connections anytime a user is in anyone of the linked cells. There are many ways our technology could have done that, for example a purple dot dash outline around the whole area. However, in this embodiment our technology highlights each of the flex ranges in their particular highlighting, green dot dash for WRITEs (7647, 7656, and 7666), blue dash for flex copy pastes (7657, 7658, 7667, 7668, and 7687) and purple dot dash for the rest of the cells (7648, 7645, 7654, 7655, 7665, 7677, 7686, 7697, 7698, and 7688) with active linkages/connections. What is meant here by active linkages is cells which have some flex linkage/connection that can change its position in the grid or change its formula. Some of which are subtle such as ‘Dates’ 7654 which can be moved down a row if the WRITE populating 7647 populates two rows instead of the one it does now, moving ‘Dates’ and ‘Donations . . . ’ etc. down a row. ‘States’ 7645 can also be moved from cell ‘B4’ if a parameter change results in the ‘WRITE_V” populating 7656 instantiating two columns instead of one, thereby moving ‘States’ one column to the right. Our technology knows and accommodates the different flex alternatives of the different functions and capabilities. Our technology also knows that when a user selects ‘Both’ 7635 for a multiple link situation to only apply the formula to those cells which contain formulas for flex ranges like cells ‘F12’ 7688 and ‘E13’ 7698 which contain flexing formulas.

FIG. 77A and FIG. 77B examples the automatic setup of both formula and direct and indirect movement links/connections employing linkage logic like that exampled in FIG. 143. In FIG. 77A the user is creating the ‘SUM’ formula 7722 in cell ‘E13’ 7773. but has not yet completed the formula as shown by the cursor 7723 at the end of the formula 7722, However, when the user hits enter not only does it complete the formula but both formula and movement links/connects the formula/cell automatically using linkage logic like that exampled in FIG. 143. In this embodiment when the user then moves back into the cell as shown in 77B it exposes all the movement and formula linked cells via their color-coded dot dash boarders (e.g., purple for individual cells, blue for ‘flex copy paste ranges’ and green for ‘WRITEs’). It also shows the ‘LINK’ formula bar button 7726 replacing the regular cell ‘$f_x$’ button 7722 and purple outlining the formula bar formula area 7727 indicating that the cell ‘E13’ 7777 is now linked/connected. In this situation both formula and movement linked/connected.

Rather than exampling more examples of direct (and indirect) cascading movement coordinated linkages/connections, we will example another method of movement linkage supported by our technology.

Bumper Movement Linkage

We tag line our next version of movement coordinated linkage/connection technology “bumper” as that is an easy visualization of how it works. Visualize that our technology puts the equivalent of an invisible bumper (boundary border) around each flex range and then our bumper movement linkage/connection technology automatically resizes and retains those bumpers during the flexes.

FIG. 78A and FIG. 78B example the invisible bumpers (boundary borders) around the four gray shaded flex functions/capabilities bumper movement linked/connected with our technology. The bumpers have been color-coded and displayed in two figures for case of viewing, realizing that all four are created together by the actions doubly displayed from highlighting the range 7837/7857, clicking the "LINK' button 7824/7829 and in the UI selector 7823/7828 clicking 'Movement' 7833/7838. Each bumper extends outward from its flex range until it encounters another flex range or encounters the edge of the area linked/connected. In FIG. 78A that is the area highlighted 7837 and in FIG. 78B that is the area highlighted 7857. FIG. 78A and FIG. 78B also show the width of each of the bumpers as shown by the color-coded dotted lines and their color-coded bumper cell measurements green 7843 for the 'WRITE' 7842, blue 7863 for the 'flex copy paste' 7864, pink 7847 for the 'FILTER' 7848, and red 7867 for the 'PivotTable' 7866. In another embodiment where the linkages/connections are automatically setup the bumper boundary borders that have no flex area defining edge stop one cell beyond the flex area as also exampled in FIG. 78A and FIG. 78B where all the boundary borders not defined by another flex are one cell wide. Those no flex range defined boundaries could be set in other ways with different distances, as there is nothing for them to relocate.

FIG. 79A through FIG. 79C illustratively examples the bumper setup of FIG. 78A and FIG. 78B and two different flex outcomes resulting from different flexes. FIG. 79A examples the creation of all four bumpers (7962, 7942, 7963, and 7943) color-coded to their respective flex function/capability by the user highlighting the range 7937, clicking the "LINK' button 7924 and in the UI selector 7923 clicking 'Movement' 7933 as was exampled in FIG. 78A and FIG. 78B. FIG. 79B then examples the user having made some input parameter change causing the 'WRITE' to flex from its gray shaded pre-flex size to its post-flex black outline 7926. The bumpers (7916, 7918, 7945, and 7947) then coordinate the movements of the linked/connected functions/capabilities moving the 'PivotTable' 7955, the 'FILTER' 7919, and the 'flex copy paste' 7948, so that none of the flex range occupied cells encroach the bumpers. Our technology automatically coordinates the linked/connected movements as if those color-coded bumpers (boundary borders) existed. Note, the bumpers push the linked/connected areas just far enough that the connected area is just beyond the bumper.

FIG. 79C examples the flex of the 'WRITE' 7966 and the 'PivotTable' 7985 combined with the WRITE' 7966 movement of the 'PivotTable' 7985 employing the sets of bumpers (7986, 7987, 7967, and 7978) to reposition the three black outlined areas, 'PivotTable' 7985, 'FILTER' 7968 and 'flex copy paste' 7989. Whether it is a single flex or multiple simultaneous flexes, our "bumper" (boundary border) coordinated movement technology adjusts the movements as if the bumpers were there. It is worth noting that our "bumper" coordinated movement technology can be applied together with our formula linkage/connection technologies as exampled by the 'Both' option 7943 available to the user in FIG. 79A. This would setup both our "bumper" coordinated movement technology and our formula linkage/connection technology for the applicable highlighted cells.

Our 'bumper' movement link/connect technology works equally as well when the flex changes are contractions and a mixture of contractions and expansions as exampled in FIG. 138A through FIG. 138C. FIG. 138A examples the creation of all four bumpers (green 13852, pink 13863, blue 13883, and red 13882) color-coded to their respective flex function/capability by the user highlighting the range 13837, clicking the "LINK' button 13824 and in the UI selector 13823 clicking 'Movement' 13833. FIG. 138B then examples the user having made some input parameter change causing the 'WRITE' to flex expand from its gray shaded pre-flex size to its post-flex black outline 13826 and the 'flex copy paste' to flex contract (shrink) from its gray shaded pre-flex size to its post-flex black outline 13855. The bumpers (13816, 13818, 13845, and 13847) then coordinate the movements of the linked/connected functions/capabilities moving the 'PivotTable' 13855, the 'FILTER' 13819, and the 'flex copy paste' 13848, so that none of the flex range occupied cells encroach the bumpers. Our technology automatically coordinates the linked/connected movements as if those color-coded bumpers (boundary borders) existed.

FIG. 138C examples the flex contraction (shrinkage) of the 'WRITE' 13866 and no flex change in the other flex areas. The 'bumpers' (border boundaries) 13876, 13886, 13878, and 13888 keeping contact with the areas 13866, 13896, 13868, and 13899 and thereby repositioning the 'flex copy paste' 13896 and the 'FILTER' 13868, areas. Thus, exampling how our technology can handle flex contractions with our 'bumper' movement technology.

Bumper Movement Linkage—Bumper Sizing

There are several variants of our 'bumper' coordinated movement technology. One embodiment is where the "bumpers" sizes stay as the originally set size even after movements that would allow bumpers (e.g., the pink illustrative boundary border 7919 in FIG. 79B could extend three more cells down to 'flex copy paste' flex 7948). A second embodiment being where they resize after each flex and so in the before mentioned example the pink bumper would be resized to go three additional cells down so it would total '9' 7938 cells down rather than the current '6' 7928.

FIG. 80A through FIG. 80C examples the difference on a flex outcome of our bumper driven coordinated movement approach using originally set "bumper" distances versus more recently resized "bumper" distances. To keep the example simple the subsequent flex movements have only changed one bumper dimension, the horizontal dimension between the 'PivotTable' (8051 pre-flex, 8061 post-flex) and the 'flex copy paste' (8053 pre-flex, 8063 post-flex) has gone from '3' cells 8052 originally to '4' cells 8062 as shown in FIG. 80A. So, the original 'PivotTable' bumper is the one in the lighter shade of red 8042 while the currently resized "bumper' is the darker red 8033. In this example the gray shaded cells are the original state when the links/connections were created and the purple outlines in FIG. 80A were created by subsequent flexes. FIG. 80B examples a subsequent set of simultaneous flexes done with the original "bumper" distances (the gray shaded cell areas) and using the 'bumper' 8042 in FIG. 80A. While FIG. 80C examples the same set of simultaneous flexes done with the most recent "bumper" distances (the purple outlined cell areas) using the 'bumper' 8033 in FIG. 80A. The difference is the wider four cell 8076 (versus the three cell narrower 8036) PivotTable' 8075, and 'flex copy paste' 8078 bumpers (8076 wider versus 8045 narrower red bumpers and 8087 versus 8047 narrower blue bumper) result in the different movement of the 'FILTER' range (8067 wider versus 8017 narrower bumper) and the 'flex copy paste' range (8078 wider versus 8037 narrower bumper). Thus, changing the outcomes of the bumper coordinated linked/connected movements.

Bumper Movement Linkage—Flex Progressive Order

Figure 81B:
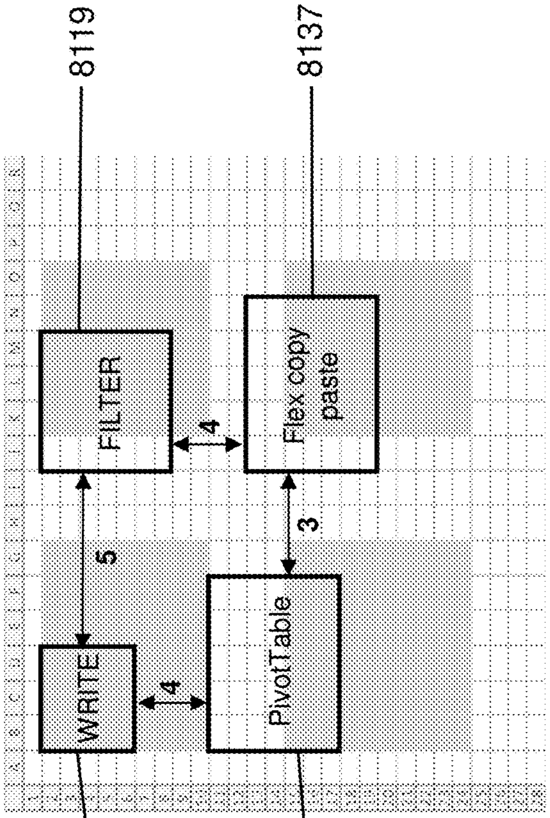
Figure 81C:
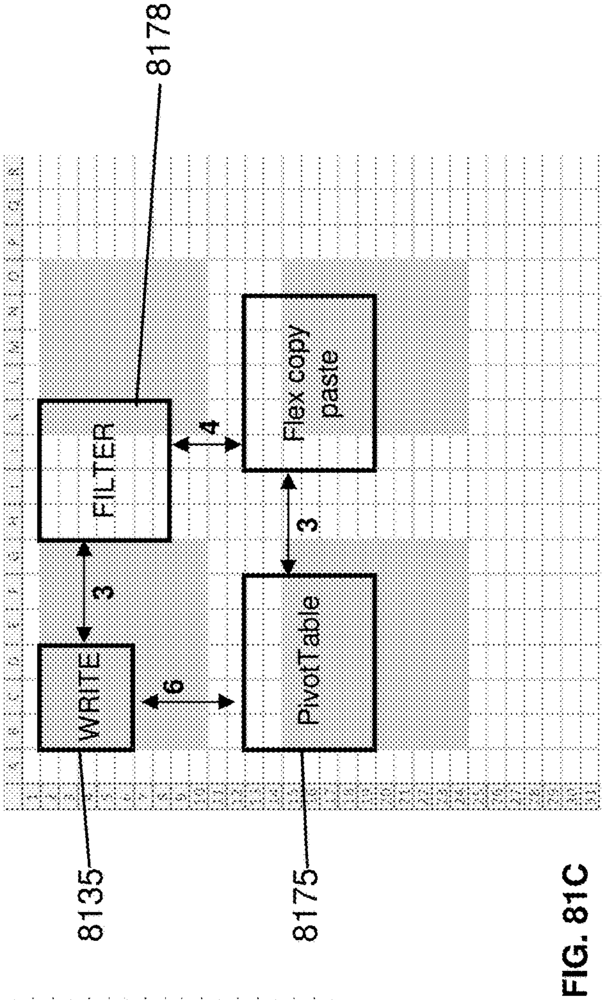
Figure 81A:
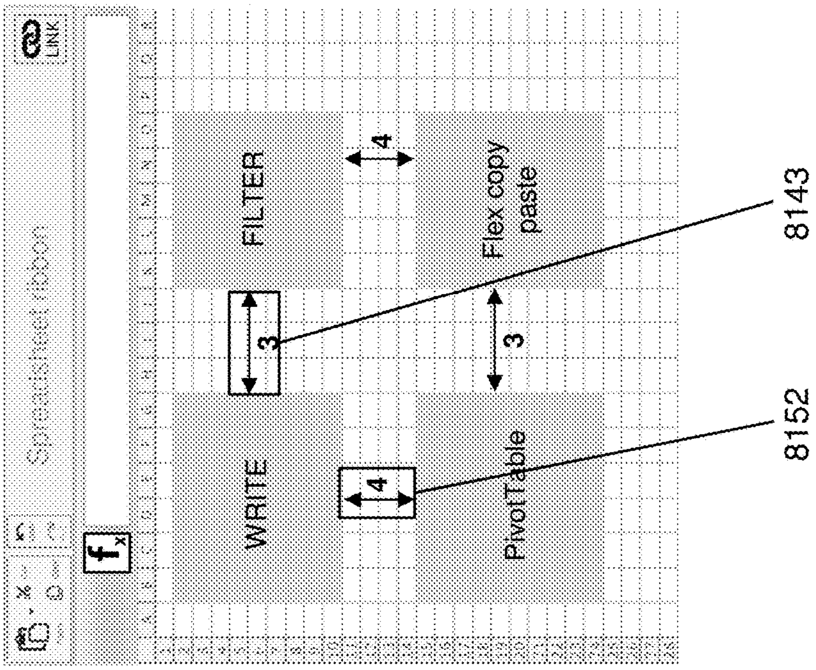

Other factors also come into play with the non-synchronized flexes and particularly when they are simultaneous. FIG. 81A through FIG. 83D example the impact of flex progressive order with 'bumper' coordinated movement in our link/connect technology. In these examples we are using the originally set "bumper" distances as exampled in FIGS. 80B and 81A. FIG. 81B examples a complicated set of four simultaneous flexes where the application of the flexes progress down then across (as detailed in FIG. 82A through FIG. 82D) while FIG. 81C examples the same four simultaneous flexes where the application of the flexes and their bumpers goes across then down (as detailed in FIG. 83A through FIG. 83D). The end result is different movements of the 'FILTER' (8178 in FIG. 81C versus 8119 in FIG. 81B) and 'PivotTable' (8175 in FIG. 81C versus 8135 in FIG. 81B) cells. The order of the flexes drives then the positioning of the flexes and their "bumpers" giving the difference in outcomes.

Figure 82A:
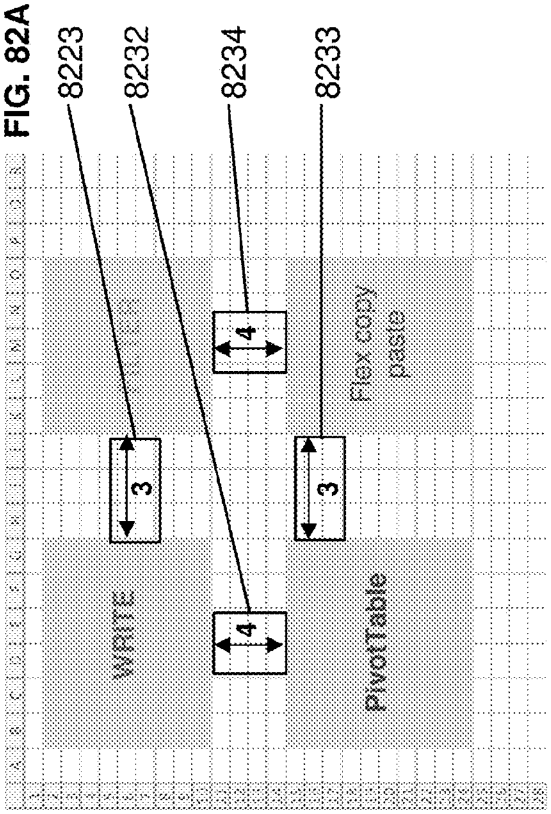
Figure 82B:
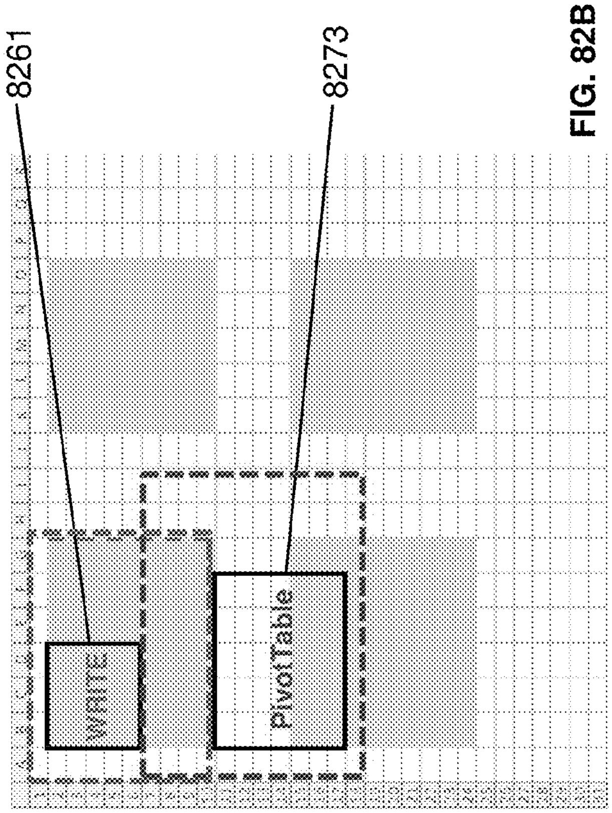
Figure 82C:
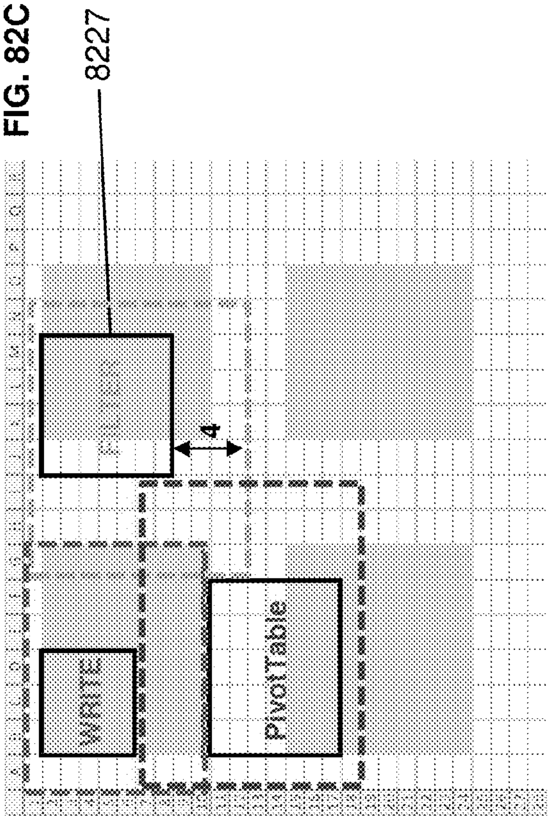
Figure 82D:
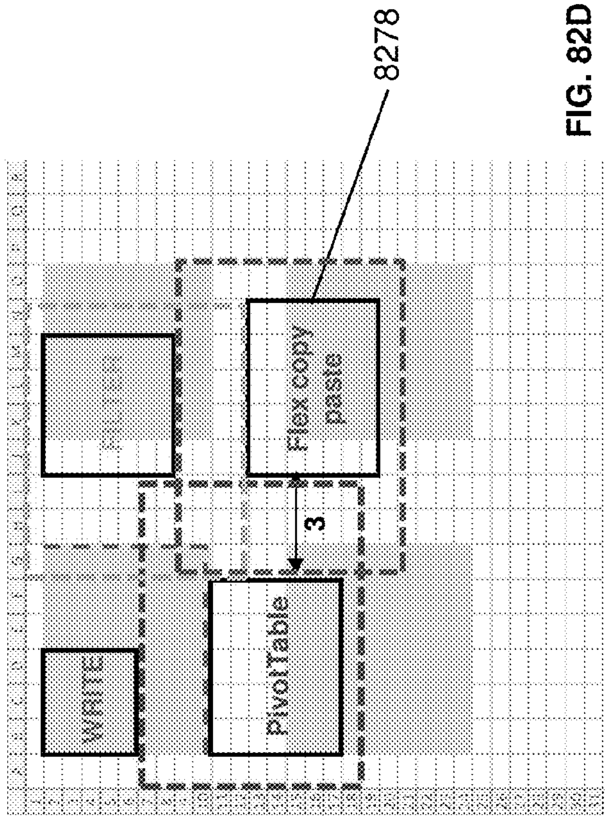

FIG. 82A through FIG. 82D illustratively examples the step-by-step application of the simultaneous flexes and the "bumpers" with a progressive order of down then across movements. FIG. 82A examples the distances (8223, 8232, 8234, and 8233) used to create the "bumpers". FIG. 82B examples the first two flexes down (8261 and 8273) and their "bumpers' positioning the 'PivotTable' cells area 8273. FIG. 82C examples adding the next flex (8227), which is across, and all the flex "bumpers' positioning the 'FILTER' cells area 8227. FIG. 82D then examples adding the final flex (8278), which is down, and all the 'bumpers" positioning the 'flex copy paste' cells area 8278.

Figure 83A:
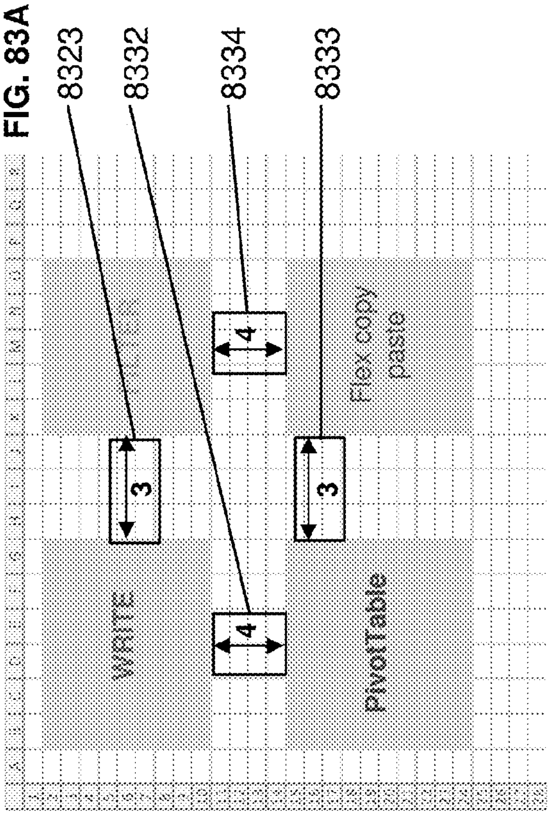
Figure 83B:
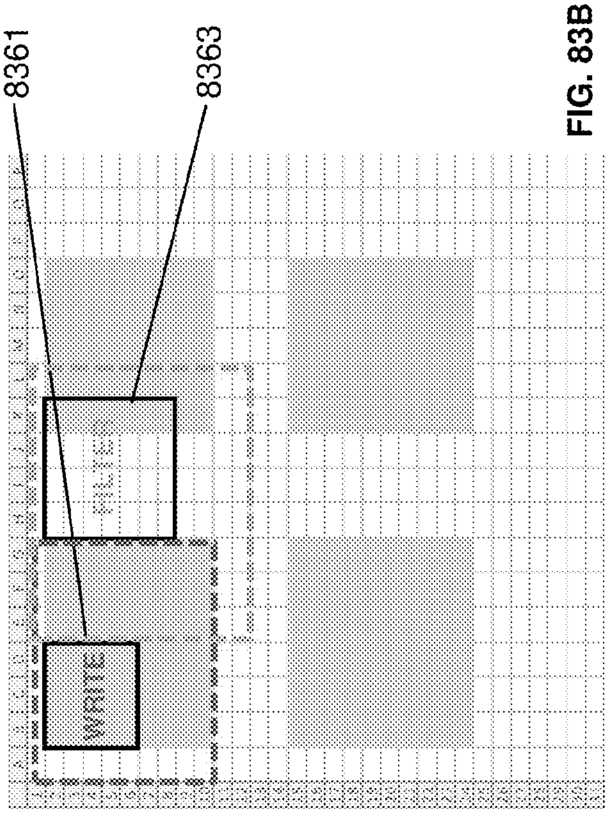
Figure 83C:
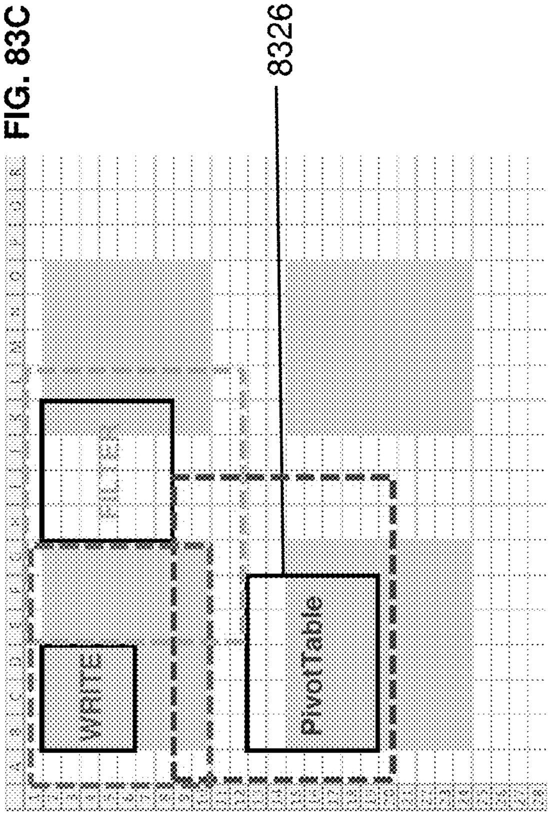
Figure 83D:
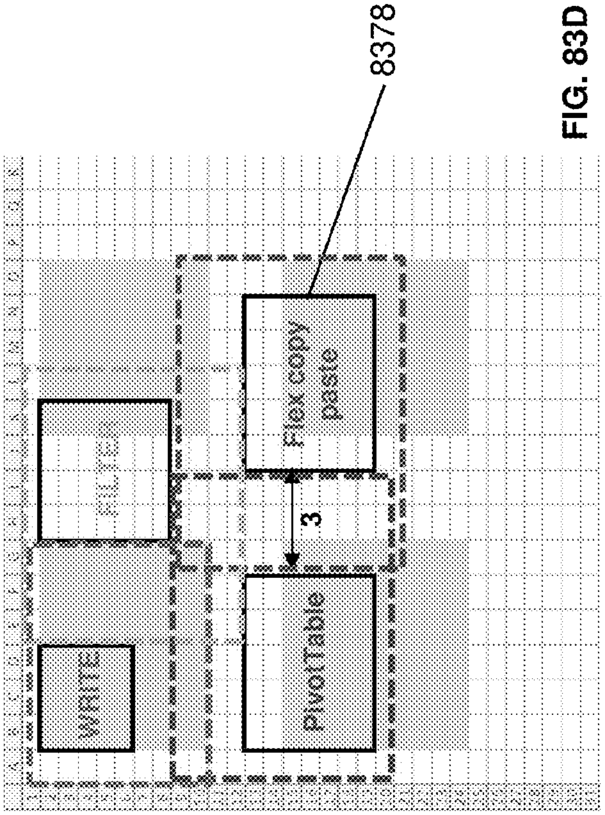

FIG. 83A through FIG. 83D illustratively examples the step-by-step application of the simultaneous flexes and the "bumpers" with a progressive order of across then down. FIG. 83A examples the distances (8323, 8332, 8334, and 8333) used to create the "bumpers". FIG. 83B examples the first two flexes across (8361 and 8363) and their "bumpers' positioning the 'FILTER' cells area 8363. FIG. 83C examples adding the next flex (8326), which is down, and all the flex "bumpers' positioning the 'PivotTable' cells area 8326. FIG. 83D then examples adding the final flex the 'flex copy paste' (8378), which is across, and all the 'bumpers" positioning the 'flex copy paste' cells area 8378.

Returning to FIG. 81B and FIG. 81C shows the difference in the automatic movement outcomes for the same simultaneous flexes employing two different progressions. As described previously, other progressions (e.g., simultaneous down and across) are supported by our technology in these embodiments for "bumper" movement linkages/connections.

Bumper Movement Linkage—One-Way or Two-Way Bumpers

So far, the 'bumper" algorithmically coordinated link/connect movement has employed what we have previously labelled two-way movement linkages/connections. However, our technologies support several combinations of the capabilities and FIG. 84A through FIG. 84C examples the difference of our technology using our one-way versus two-way "bumper" linkage/connect movements.

FIG. 84A examples the pre-flex linked/connected movement spacing of the four flex range areas shaded in gray. FIG. 84B examples the pre-flex gray shaded ranges and the black outlined post-flex ranges employing our one-way bumper coordinated linkage/connection movement technology. The one-way technology employs the "bumpers" for flex expansion but not for flex contraction. As such each of the flexes contracts in place as shown by 'WRITE' 8416 (post) versus 8427 (pre), 'PivotTable' 8436 (post) versus 8446 (pre), 'FILTER' 8418 (post) versus 8428 (pre), and 'flex copy paste' 8438 (post) versus 8448 (pre). FIG. 84C examples the same flexes as FIG. 84B with pre-flex gray shaded ranges and the black outlined post-flex ranges employing our two-way bumper coordinated linkage/connection movement technology. Upon flex contraction in FIG. 84C the "bumper" driven movement is undertaken resulting in a very different set of movements shown by "WRITE' 8466 (post) versus 8477 (pre), 'PivotTable' 8486 (post) versus 8496 (pre), 'FILTER' 8467 (post) versus 8478 (pre), and 'flex copy paste' 8487 (post) versus 8498 (pre). The 'FILTER' flex range 8467 positioning ends up vertically positioning via its bumper 8475 the 'PivotTable' 8486 and 'flex copy paste' 8487 ranges while the 'PivotTable', 'FILTER' and 'flex copy paste' "bumpers" (8488, 8475, and 8489) drive the 'flex copy paste' 8487 positioning.

There are many other variants of our "bumper" coordinated linkage/connection movement technology and some of the variants of it that can be supported by our other coordinated linkage/connection movement technologies. However, rather than exampling more mix and match combinations we will example the minimum distance movement embodiments of our technology.

Closest Distance Movement Linkage

Our closest cell area minimum row and column spatial distance movement linkage technologies automatically ensures that the spatial distance between linked cells or cell ranges (e.g., flex ranges) is a minimum of the distance at time of linkage or in other embodiments the current pre-flex distances between the closest area cell or cells. In these embodiments the exact relative spatial distances will be maintained unless overridden by having to meet another movement linkage relative relationship, then our technology will ensure that at least the row and column spatial distance will be maintained and where required it is exceeded in the direction of the row and/or column distance. These linkages can be a full three hundred and sixty degrees in direction as will be later exampled.

We start with a simple example and then move to application of this technology to more complicated examples. FIG. 85A through FIG. 85C illustratively examples the closest cells linkage/connection relative row and column spatial relationships pre-flex for the 'Movement' linkage of four flex-ranges (areas). Then FIG. 86A through FIG. 86E examples how a flex of those areas works in this embodiment with examples of how it does not work for clarification.

FIG. 85A examples the manual set up of the 'Movement' linkage/connection of the four flex areas contained with the highlighted cells 'A1' through 'P25' 8537 containing a 'WRITE' flex function 8541, a 'FILTER' flex function 8543, a 'PivotTable' flex capability 8561, and a 'Flex copy paste' flex capability 8563. The user initiated it by clicking a ribbon 'LINK' button 8524 and then selecting the 'Movement' option 8533 in the popup 8523. Had there been potential formula linkages the user also could have selected the 'Both' option 8532 which would have automatically led to movement linkages/connections we will now example as well as formula linkages/connections. In a different embodiment, the linkages/connections could have been automatically setup as previously exampled.

FIG. 85B and FIG. 85C illustratively example different closest cell row and column relative spatial relationships between the linked/connected areas. FIG. 85B examples the closest cell connections from the 'FILTER' function area (range) 8518 to the other linked/connected areas. The purple arrows 8517 illustrate the back-and-forth connection between the 'FILTER' flex function 8518 and the 'WRITE' flex function 8516 which are relatively spatially distanced by '0' rows and '3' columns. There are nine closest cells indicated by the nine purple arrows and the double arrow indicates each direction (the equivalent of an arrow each direction). Specifically, the 'FILTER' is three columns to the right of the 'WRITE' while the 'WRITE' is three columns to the left of the 'FILTER' area. While all the closest cells are on the same rows. The five pink arrows 8539 illustrate the back-and-forth connection between the 'FILTER' flex function 8516 and the 'flex copy paste' capability area 8548 which are relatively spatially distanced by '4' rows and '0' columns. The pink double arrows represents an arrow each direction. Specifically, the 'FILTER' 8515 is four rows above the 'flex copy paste' 8548 while the 'flex copy paste' 8548 is four rows below the 'FILTER' area 8518. While all the closest cells are on the same columns therefore the '0' column 8539. Finally, there is only one set of closest cells for the 'FILTER' 8515 to 'PivotTable' 8537 movement linkage/connection relative spatial relationship of '4' rows and '3' columns 8537. Again, the double arrow represents an arrow each direction.

FIG. 85C illustratively examples the remaining movement linkage/connection relative spatial relationships. The six green arrows 8576 illustrate the back-and-forth connection between the 'PivotTable' flex capability 8567 and the 'WRITE' flex function 8566 which are relatively spatially distanced by '4' rows and '0' column 8576. The ten light blue arrows 8598 illustrate the back-and-forth connection between the 'PivotTable' flex capability 8567 and the 'flex copy paste' capability 8599 which are relatively spatially distanced by '0' rows and '3' columns 8598. Finally, there is only one set of closest cells for the 'WRITE' 8566 to 'flex copy paste' 8599 movement linkage/connection relative spatial relationship of '4' rows and '3' columns 8577. Again, the double arrow represents an arrow each direction. Having now illustratively exampled in FIG. 85B and FIG. 85C all six of the different area linkages set up in FIG. 85A, we will example their automatic movements responding to a flex change.

FIG. 86A through FIG. 86C illustratively examples how a flex of the 'WRITE' area works in this embodiment showing each of the closest cell relative spatial relationships post-flex. FIG. 86A examples the three sets of arrows where the post-flex closest cells relative spatial relationships are the same as the pre-flex, the same as they were in FIG. 85B and FIG. 85C pre-flex. For ease of representation these arrows stay double headed (versus showing each one as an arrow both directions) and represent the movements automatically done by our technology when the flex of the 'WRITE' area 8622 moves the 'PivotTable' 8642 (by green arrows 8632), moves the 'FILTER' area 8624 (by purple arrows 8623), and moves the 'flex copy paste' area 8644 (by red arrow 8633). These movements result in making the other relative spatial relationships post-flex greater than pre-flex as illustratively exampled in FIG. 86B and FIG. 86C. These are the spatial relationships that are superseded by the ones in FIG. 86A and are therefore greater than their original setup (or pre-flex in other embodiments) spatial distances. Thus, ensuring that the relative spatial distances are equal to or greater post-flex versus the original spatial distances when the linkages/connections were created (or pre-flex in other embodiments). In this example the pre-flex is the original relative spatial relationships, so they are same. But in a subsequent flexes the relative spatial distances illustrated in FIG. 86B and FIG. 86C would show a difference for the pre-flex and the original pre-flex, because some of the pre-flex are spatially farther apart than when the linkages/connections were created.

The ten light blue arrows 8683 in FIG. 86B examples the 'PivotTable' area 8682 to 'flex copy paste' area 8684 pre-flex relative spatial relationships which are the same row wise (in the same rows) but are now greater by two columns. The five pink arrows 8674 examples the 'FILTER' area 8664 to 'flex copy paste' area 8684 pre-flex relative spatial relationships which are the same column wise (in the same columns) but are now greater by three rows. The ten light blue arrows 8647 in FIG. 86C examples the 'flex copy paste' area 8648 to 'PivotTable' area 8637 pre-flex relative spatial relationships which are the same row wise (in the same rows) but are now greater by two columns (greater meaning more in direction of the arrow from one area pointed to the other). The five pink arrows 8638 examples the 'flex copy paste' area 8648 to 'FILTER' area 8628 pre-flex relative spatial relationships which are the same column wise (in the same columns) but are now greater by three rows. The brown arrow 8636 examples the 'PivotTable area 8637 to 'FILTER' area 8628 pre-flex relative spatial relationships which is three columns and four rows, and you can see that the actual distance is greater by two columns and three rows. The brown arrow 8637 examples the opposite relationship of the 'FILTER' area 8628 to 'PivotTable area 8637 pre-flex relative spatial relationships which is three columns and four rows, and you can see that the actual distance is greater by two columns and three rows (in the direction of the arrow).

FIG. 86D and FIG. 86E examples two somewhat less obvious examples of how the minimum relative spatial distance works on both dimensions. Even if the areas do not overlap both the relative spatial distances apply. In FIG. 86D both area 8666 and area 8677 are movement linked/connected with the brown arrows 8666 representing the relative spatial distance. In this situation the two-column distance has not been satisfied so our technology would move area 8677 in FIG. 86D to 8679 as shown in FIG. 86E so that it 8679 at least satisfies the two-column spacing 8678 relative to area 8668. In FIG. 86D both area 8687 and area 8696 are movement linked/connected with the brown arrows 8686 representing the relative spatial distance. In this situation the three-row distance has not been satisfied so our technology would automatically move area 8696 in FIG. 86D to 8698 as shown in FIG. 86E so that it 8698 at least satisfies the three-row spacing 8688 relative to area 8689.

Closest Distance Movement Linkage—Multiple Flexes

FIG. 87A through FIG. 87C examples multiple flexes, which could be simultaneous or sequential using our formula and closest distance movement link/connect technology. FIG. 87A examples the manual set up of the 'Formula' and 'Movement' linkage/connection of the four flex areas contained with the highlighted cells 'A1' through 'P25' 8737 containing a 'WRITE' flex function 8741, a 'FILTER' flex function 8743, a 'PivotTable' flex capability 8761, and a 'Flex copy paste' flex capability 8763. The user initiated it by clicking a ribbon 'LINK' button 8724 and then selecting the 'Both' option 8732 in the popup 8723. In a different embodiment, the linkages/connections could have been automatically setup as previously exampled.

FIG. 87A illustratively examples the different closest cell row and column relative spatial relationships between the linked/connected areas. The eight purple arrows 8742 illustrate the back-and-forth connection between the 'FILTER' flex function 8743 and the 'WRITE' flex function 8741 which are relatively spatially distanced by '0' rows and '3' columns. The five pink arrows 8753 illustrate the back-and-forth connection between the 'FILTER' flex function 8743 and the 'flex copy paste' capability area 8763 which are relatively spatially distanced by '4' rows and '0' columns 8753. The brown arrow 8772 illustratively examples the movement linkage/connection between the 'FILTER' area 8743 and the 'PivotTable' area 8761 with a relative spatial relationship of '3' rows and '3' columns 8772. The five green arrows 8751 illustrate the back-and-forth movement connection between the 'PivotTable' flex capability area 8761 and the 'WRITE' flex function area 8741 which are relatively spatially distanced by '4' rows and '0' columns 8751. Note, the spatial relationship also includes the first cell of the 'WRITE' flex function area 8741 is closest to the second cell of the 'PivotTable' flex capability area 8761 and will maintain that relationship post flexes. The six light blue arrows 8753 example the back-and-forth connection between the 'PivotTable' flex capability area 8761 and the 'flex copy paste' capability area 8763 which are relatively spatially distanced by '0' rows and '4' columns 8753. Noting that that relationship starts not with the top row of the 'PivotTable' area 8761 but one row down from the top and will maintain that relationship post flexes. Finally, there is only one set of closest cells for the 'WRITE' 8741 to 'flex copy paste' 8763 movement linkage/connection relative spatial relationship of a red arrow '5' rows and '4' columns 8752. As in all the previous illustrations, the double arrow represents an arrow each direction.

FIG. 87B and FIG. 87C illustratively examples how a flex of the 'WRITE' and 'FILTER' areas works in this embodiment showing each of the closest cell relative spatial relationships post-flex. The two sets of arrows where the post-flex closest cells relative spatial relationships are the same as the pre-flex ones are shown in FIG. 87B. For case of illustration those arrows stay double headed representing two arrow the opposite directions directly overlapping. One set are the eleven purple arrows 8728 that automatically moves the 'FILTER' area 8719 adjusting for the flex of the 'WRITE' area 8716. The second set are the four pink arrows 8739 that shift the 'flex copy paste' area 8769 down and to the right. The 'PivotTable' 8747 is then positioned by multiple sets of single row or column relative spatial relationships with all three of the other areas. Its row positioning is driven by its minimum distances row-wise from the 'FILTER' area by brown 8737 and 8738 as well as the light blue arrow row position 8768 in FIG. 87B and 8798 shown in FIG. 87C (one row below the top row of 'PivotTable' 8761 in FIG. 87A, 8747 in FIG. 87B, and 8797 in FIG. 87C). The 'PivotTable' 8747 column alignment is driven by its green arrow column alignment 8736 in FIG. 87B and 8787 shown in FIG. 87C alignment with the 'WRITE' area 8716 in FIG. 87B and 8767 shown in FIG. 87C). These alignments lead to the row separations of the green arrows 8736 (in FIG. 87B) and 8787 (in FIG. 87C), the column separation of the light blue arrows 8768 (in FIG. 87B) and 8798 (in FIG. 87C), the column separation of brown arrows 8737 (in FIG. 87B) and 8738 (in FIG. 87B), and the row and column separation of red arrows 8778 and 8788 shown in FIG. 87C. The outcome is where possible the relative spatial relationships are automatically maintained and when not possible a distance greater is maintained by our closest distance movement linkage/connection technology.

Closest Distance Movement Linkage—Setting of Closest Relative Spatial Distances

One embodiment sets the minimum closest relative spatial distances as those at the time of the linkage creation (not changing with flexes) as exampled in the series of flexes in FIG. 146A through FIG. 146C. Another embodiment updates the coordinated relative spatial distances for each successive flex using the last values for the minimum closest spatial distances for the next flex as exampled in FIG. 146A, FIG. 146B and FIG. 146D.

FIG. 146A illustratively examples the minimum closest relative spatial distances at the time of linkage/connection creation. FIG. 146B examples flex changes to the 'WRITE' and the 'FILTER' areas where the solid illustrative two headed purple, two headed pink, dual sets of one headed light blue arrows, and dual sets of one headed green arrows representing the minimum closest spatial distances positioning the all the areas. Note, the two sets of light blue one headed arrows determine the row positioning of the 'PivotTable' in FIG. 146B while the two sets of green one headed arrows determine the column positions of the 'PivotTable'. FIG. 146B also illustratively examples with the dotted green 14687, red 14652, brown 14637, and light blue 14687 arrows how the minimum closest relative spatial distances would change if they were to update (change) with each flex. The difference become very apparent in comparing the outcomes in FIG. 146C and FIG. 146D for the situation of then changing the flex parameter back to what it originally was in FIG. 146A. If you do that with the minimum closest spatial distances staying at those at time of setup our technology delivers the outcome in FIG. 146C, which is identical to FIG. 146A. However, if the minimum closest spatial distances update (change) with each flex as exampled by the dotted green 14687, red 14652, brown 14637, and light blue 14687 arrows in FIG. 146B then changing the parameter input back to how it was in FIG. 146A gives the result in FIG. 146D, which is very different than what was in FIG. 146A. That is because the updated (change) minimum green, red, brown, and light blue closest spatial distances change the positioning of the 'FILTER', 'flex copy paste' and 'PivotTable' areas as shown by their dark black outlined positions being very different than the original gray shades cells.

Closest Distance Movement Linkage—Three-Hundred-and-Sixty-Degree Linkage

Our closest distance movement linkage technology handles dramatically more complicated movement linkages/connections including three hundred- and sixty-degree linkages. Those rapidly become very complicated to illustratively example, so we will largely stay with our area examples and do one full blown example after the more conceptual examples.

FIG. 88 illustratively examples eight flex areas (8822, 8825, 8827, 8842, 8847, 8872, 8875, and 8877) which have been closest distance movement linked/connected to one flex area 8845 with our technology. It examples the three-hundred-and-sixty-degree movement linkages/connections for the flex area '5' 8845 to the other eight areas with the color coded illustrative double headed arrows (8833, 8834, 8836, 8844, 8856, 8863, 8864, and 8866). Each of these arrows connects the closest cell or cells for the other eight areas to area '5' 8845. It also illustratively examples the closest distance movement link/connect 8824 from area '1' 8822 to area '2' 8825. As described previously each of these linkages/connections has a row and a column distance component which will be automatically retained or exceeded in the event of a flex. The values are exceeded as required to retain another movement linkage/connection related spatial distance. And like described before the doubled headed arrows represent two linkages, one going each of the two ways between the areas. As also described below the retained/exceeded distance values can be the original values when the linkages/connections were established or can be from the last flex depending upon embodiment. For this example, we will use the double headed distances in FIG. 88 as the distance values to be retained or exceeded.

FIG. 89 examples a simultaneous flex of seven of the nine flex areas, those other than area '3' 8927/8929 and area '4' 8953/8962 which did not flex but were moved by the flexes. Our closest movement linkage/connection technology automatically positions all of the flex areas and we have illustratively added the color-coded linkage/connection relative spatial distance arrows (8963, 8964, 8934, 8944, 8924, 8965, 8946, 8956, 8957, 8987, 8985, and 8973) for area '5' 8965 to all the other areas post-flex (8923, 8935, 8929, 8962, 8968, 8993, 8985, and 8999) and for linking/connecting area '1' 8923 to area '2' 8935. As with our previous more conceptual examples the gray cells are the pre-flex areas (numbered '1' to '9' with gray numbers), the bold outlined areas are the automatically positioned post-flex areas (numbered '1' to '9' with black numbers), the doubled headed arrows represent two arrows (one going each way), and the single headed arrows represent directional row and column distances that are the minimum distances to be retained or exceeded. We have not attempted to put all the closest relative spatial distances from every area to area on FIG. 89 as it would become very complicated to look at. However, we will example at least one distance or set of distances that results in the positioning of each area post the flexes.

We start explaining the flex induced automatic closest distance linkage/connection movements with the flex of area '1' from 8922 to 8923 which then moves area '2' from 8925 to 8935 via the dark red two-headed relative spatial distance arrows 8924. These in combination with the pink two-headed relative spatial distance arrows 8965 position area '5' post-flex 8965 (moving it from its pre-flex position of 8954). The column positioning of '5' post-flex 8965 is also determined by the column relative spatial distance of the two bright green arrows 8934 and 8944 positioning area '5' 8965 relative to area '1' 8923. Then the column positioning of area '3' post-flex 8929 is determined by the column relative spatial distance of the two orange arrows 8946 and 8956 positioning area '3' 8929 (four columns to the right) relative to area '5' 8965 post the flexes. Area '3' 8929 is also column positioned by its relative spatial positioning to area '6' 8968, which is driven by the green double-headed arrows 8957 illustrating the area '5' 8965 to area '6' 8968 relative spatial positioning post the flexes. The row positioning of '6' 8968 is driven by its row relative spatial positioning green double-headed arrows 8957 to area '5' 8965 post the flexes (i.e., zero row offset). Area '9' post-flex positioning 8999 is determined by the red double-headed column and row relative spatial distance 8987 as well as its column positioning (i.e., zero column offset) relative to area '6' 8968 (exampled in FIG. 91) and its row positioning (i.e., zero row offset) relative to area '8' 8995 post the flexes (exampled in FIG. 91). However, that row positioning of area '8' 8995 post the flexes is determined by the dark green double-headed arrows 8985 representing the '5' 8965 to area '8' 8995 relative spatial distance. The column positioning of '8' 8995 post the flexes is also determined by the dark green double-headed 8985 arrows representing the '5' 8965 to area '8' 8995 relative spatial distance (i.e., zero column offset). The post flexes column and row positioning of area '7' 8993 is determined by the light blue double-headed arrow relative spatial distances 8973 from area '5' 8965. The column positioning of area '7' 8993 is also determined by its unshown row alignment with '8' 8995 post the flexes (exampled in FIG. 91). The post flexes row positioning of area '4' 8962 is determined by the bright blue arrows row relative spatial distances 8963 and 8964 from area '5' 8965 (i.e., zero row offset). The post flexes column spacing between '4' 8962 and area '5' 8965 has been driven by other movements as indicated by those bright blue arrows 8963 and 8964 being two sets of one direction arrows rather than one set of two direction (two-headed) arrows. FIG. 89 has shown at least one example of how our closest distance movement linkage/connection technology automatically determines the positioning of nine areas relative to each other post flexes, going from the gray shaded cell areas pre-flexes 8922, 8925, 8927, 8953, 8954, 8957, 8972, 8974, and 8978 to the black outlined post-flexes positionings 8923, 8935, 8929, 8962, 8965, 8968, 8993, 8995, and 8999.

Figure 91:
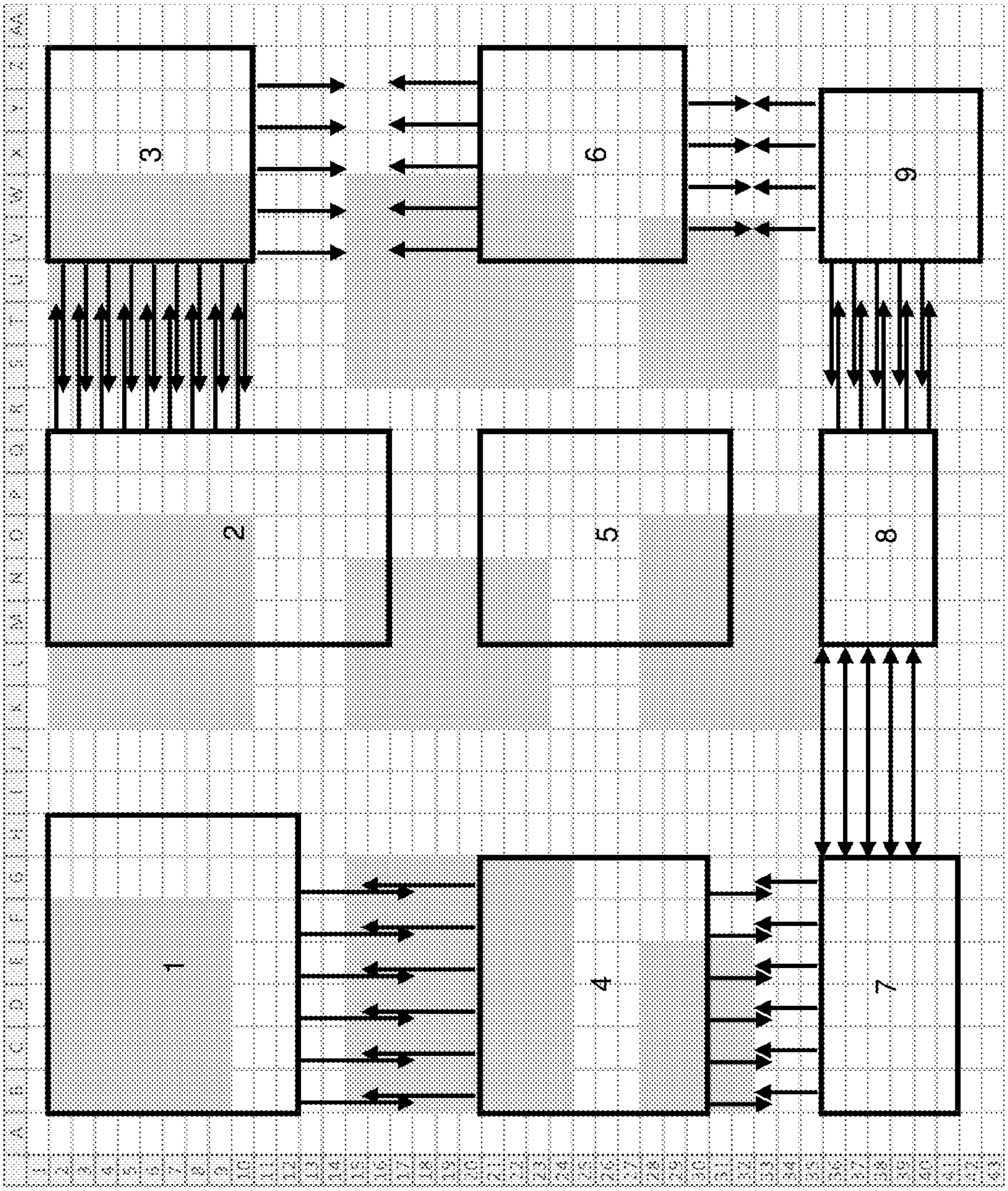
Figure 92:
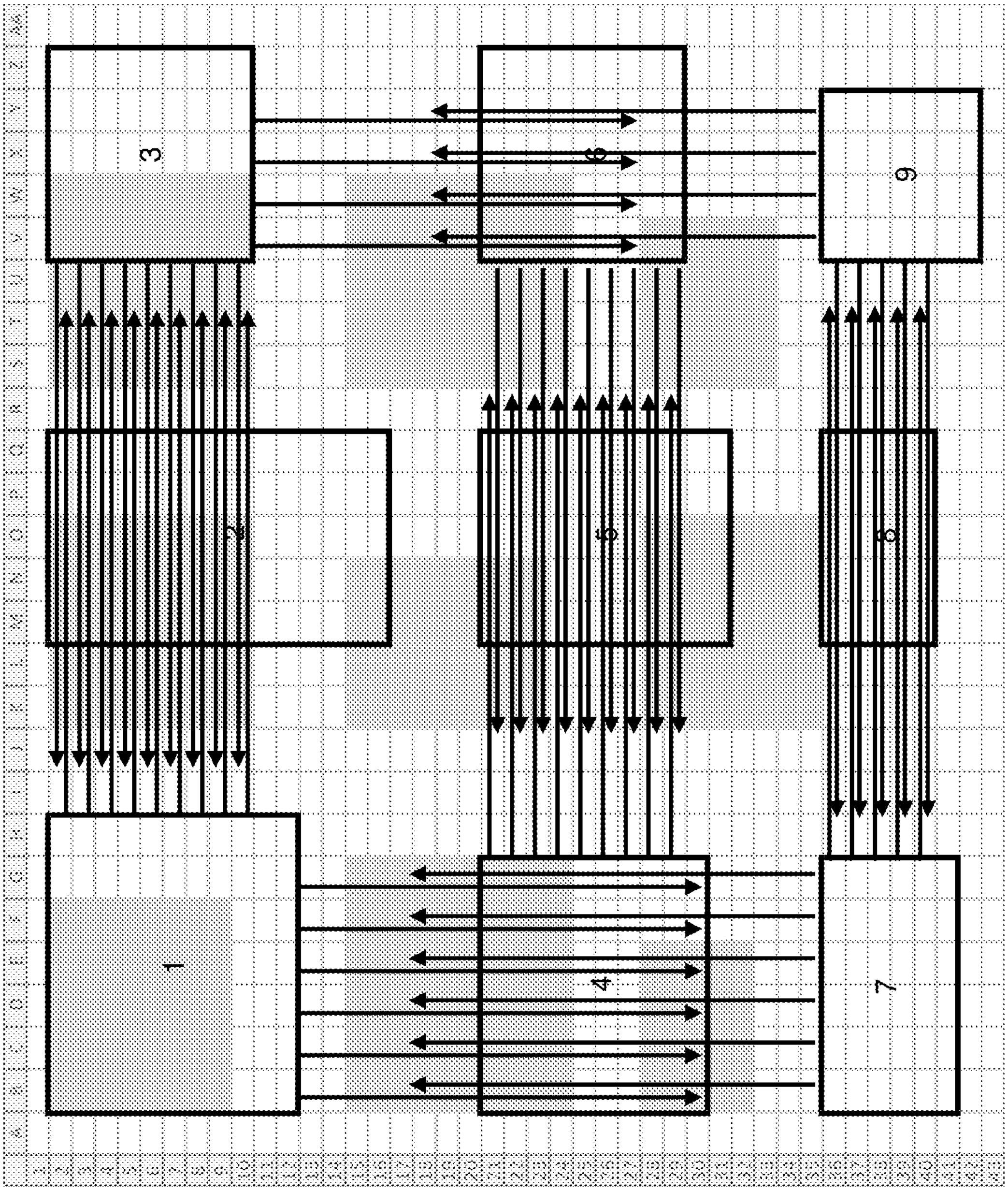
Figure 93:
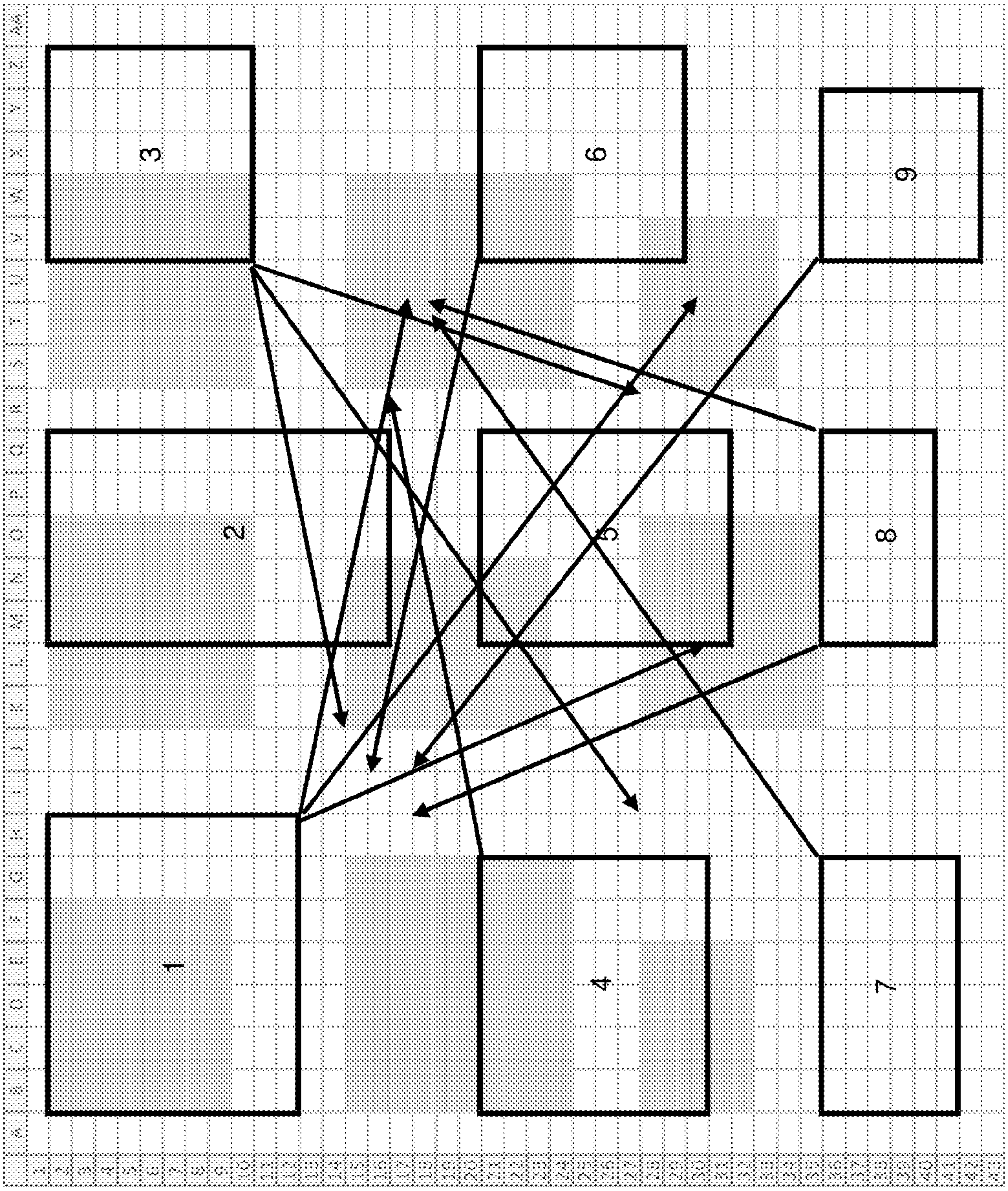

FIG. 90 through FIG. 93 illustratively examples the pre-flexes and post-flexes shortest distance movement linkage/connection relative spatial distances not shown in FIG. 88 and FIG. 89. The additional pre-flexes shortest distance movement linkage/connection relative spatial distances are shown by the double arrows in FIG. 90. Because of the greater complexity of the post-flexes shortest distance movement linkage/connection relative spatial distances, they are shown in FIG. 91 through FIG. 93. FIG. 91 illustratively examples the additional side-by-side (horizontally and vertically) area post-flexes shortest distance movement linkage/connection relative spatial distances with one arrow each direction and the single arrows representing the direction of the linkage/connection. FIG. 92 illustratively examples the additional one area remote (one removed through another area) side-by-side (horizontally and vertically) area post-flexes shortest distance movement linkage/connection relative spatial distances with the single arrows representing the direction and distance of the minimum linkage/connection. Recognizing that each arrow represents both a row and a column relative spatial distance, even when that value is zero. FIG. 93 illustratively examples the additional tangential (not one area directly or remotely side-by-side) area post-flexes shortest (minimum) distance movement linkage/connection relative spatial distances with the single arrows representing the direction of the linkage/connection. All the post-flexes shortest (minimum) distance movement linkage/connection relative spatial distances in FIG. 91 through FIG. 93 are consistent with the post-flexes positioning of the nine areas as shown in FIG. 89.

The examples in FIG. 88 through FIG. 93 have been done for nine areas which start and end with straight top edge vertical alignment and straight left edge horizontal alignment, our closest distance movement linkage/connection technology handles much more complicated three hundred-and sixty-degree alignments as we will example next.

Closest Distance Movement Linkage—More Complicated Alignments

FIG. 94 through FIG. 99 examples our closest distance movement linkage technology handling nine flex areas starting and automatically maintaining vertically and horizontally non-straight aligned relationships. Because of the complexity involved in examples showing all the areas and link/connection relative spatial relationships pre and post flexes, we will do another example using more conceptual areas before moving to cell specific examples.

Figure 94:
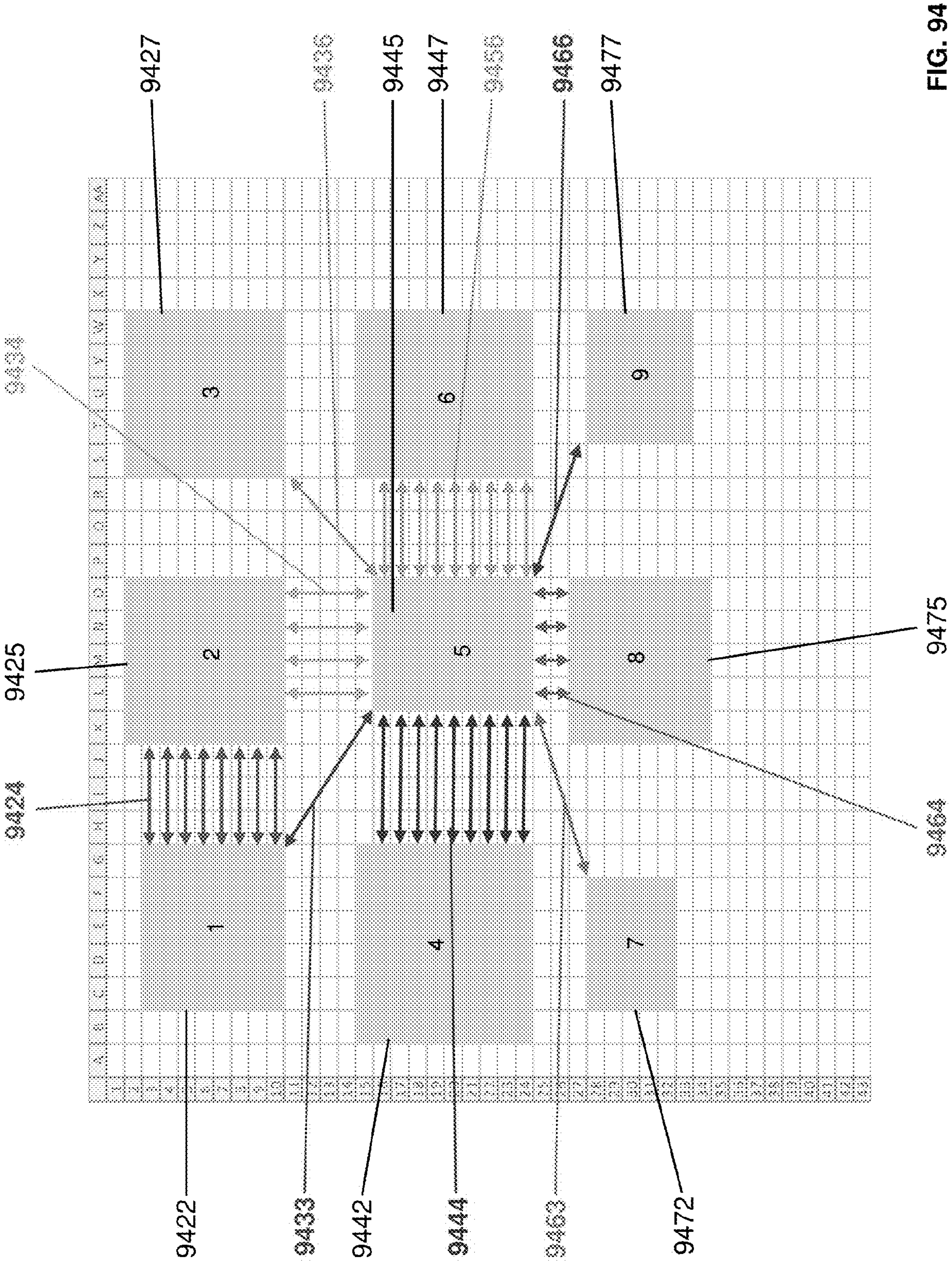

FIG. 94 illustratively examples nine flex non-vertically and horizontally straight aligned areas (9422, 9425, 9427, 9442, 9445, 9447, 9472, 9475, and 9477) which have been closest distance movement linked/connected with our technology. It examples the three-hundred-and-sixty-degree movement linkages/connections for the flex area '5' 9445 to the other eight areas with the color coded illustrative double headed arrows (9433, 9434, 9436, 9456, 9466, 9464, 9463, and 9444). Each of these arrows connects the closest cell or cells for the other eight areas to area '5' 9445. It also illustratively examples the closest distance/minimum movement link/connect 9424 from area '1' 9422 to area '2' 9425. As described previously each of these linkages/connections has a row and a column distance component which will be automatically retained or exceeded in the event of a flex movement. And as previously described, the cell offsets, e.g., the pink arrows 9434 between area '2' 9425 and areas '5' 9445, are automatically minimally retained by our technology during flexes. The values are exceeded as required to retain another movement linkage/connection related minimum spatial distance. And like described before the doubled headed arrows represent two linkages, one going each of the two ways between the areas. As also described below the retained/exceeded distance values can be the original values when the linkages/connections were established or can be from the last flex depending upon embodiment. For this example, we will use the distances in FIG. 94 as the relative spatial relationship values to be retained or exceeded.

Figure 95:
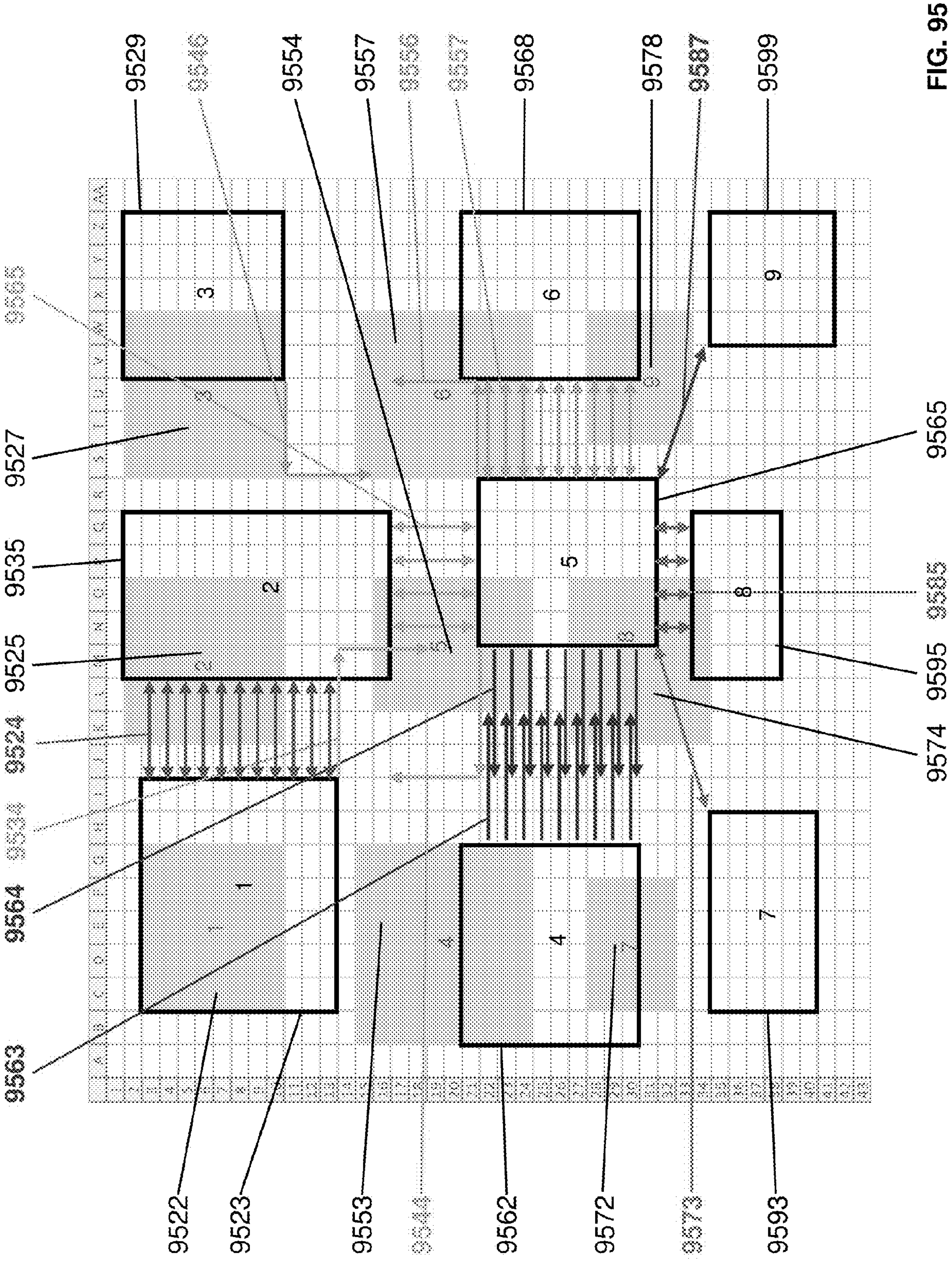
Figure 96:
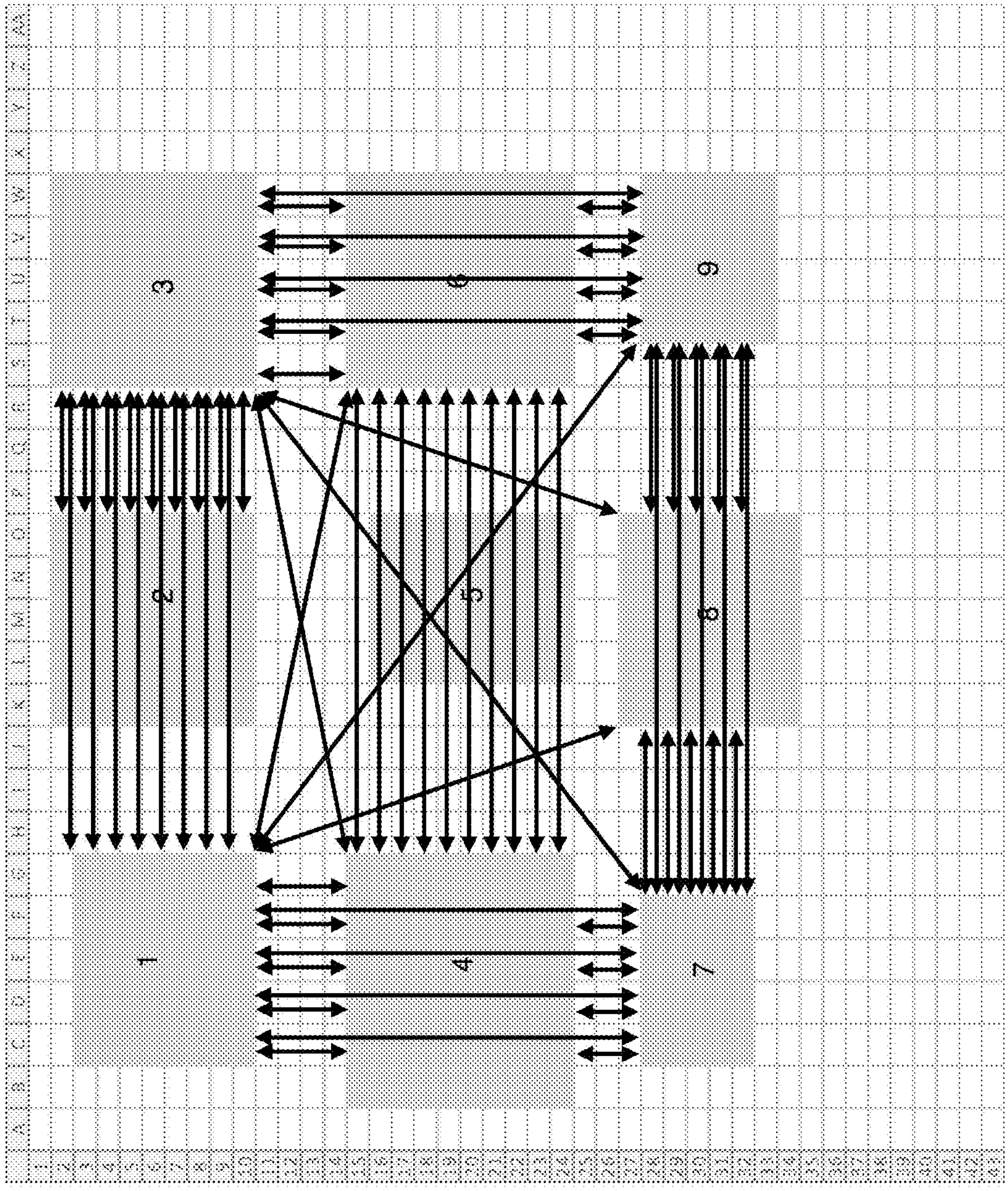

FIG. 95 examples a simultaneous flex of seven of the nine flex areas, those areas other than area '3' 9529 and area '4' 9562 which did not flex. Our closest movement linkage/connection technology automatically positions all of the flex areas and we have illustratively added the color-coded movement linkage/connection relative spatial distance arrows (9563, 9564, 9544, 9534, 9524, 9565, 9546, 9556, 9557, 9587, 9585, and 9573) for post-flex area '5' 9565 to all the other areas post-flex (9523, 9535, 9529, 9562, 9568, 9593, 9595, and 9599) and for linking/connecting area '1' 9523 to area '2' 9535. As with our previous more conceptual examples the gray cells are the pre-flex areas (numbered '1' to '9' with gray numbers), the bold outlined areas are the automatically positioned post-flex areas (numbered '1' to '9' with black numbers), the doubled headed arrows represent two arrows (one going each way), and the single headed arrows represent directional row and column distances that are the minimum distances. We have not attempted to put all the closest relative spatial distances from every area to area on FIG. 95 as it would become very complicated to look at. However, the remaining closest relative spatial distances from every area to area are exampled pre and post flexes in FIG. 96 (pre-flex), 97 (post-flex), 98 (post-flex), and FIG. 99 (post-flex).

We start explaining the flex induced automatic closest distance linkage/connection movements with the flex of area '1' from 9522 to 9523 which then moves area '2' from 9525 to 9535 via the dark red double-headed relative spatial distance arrows 9524. These in combination with the pink double-headed relative spatial distance arrows 9565 position area '5' 9565 post-flex (moving it from its pre-flex position of 9554). The column positioning of '5' post-flex 9565 is also determined by the column relative spatial distance of the two bright green arrows 9534 and 9544 positioning area '5' 9565 relative to area '1' 9523. Then the column positioning of area '3' post-flex 9529 is determined by the column relative spatial distance of the two orange arrows 9546 and 9556 positioning area '3' 9529 relative to area '5' 9565 post the flexes. Area '3' 9529 is also column positioned by its relative spatial positioning to area '6' 9568 (as exampled in FIG. 97), which is positioned by the green double-headed arrows 9557 illustrating the area '5' 9565 to area '6' 9568 relative spatial positioning post the flexes. The row positioning of '6' 9568 is driven by its row relative spatial positioning green double-headed arrows 9557 to area '5' 9565 post the flexes. Area '9' post-flex positioning 9599 is determined by the red column and row relative spatial distance 9587 as well as its column positioning relative to area '6' 9568 (exampled in FIG. 97 noting the one cell column offset) and its row positioning relative to area '8' 9595 post the flexes (exampled in FIG. 97 noting the one cell row offset). However, that row positioning of area '8' 9595 post the flexes is determined by the dark green arrows representing the '5' 9565 to area '8' 9595 post-flexes relative spatial distance. The column positioning of '8' 9595 post the flexes is also determined by the dark green double-headed arrows representing the '5' 9565 to area '8' 9595 relative minimum spatial distance. The post flexes column and row positioning of area '7' 9593 is determined by the light blue double headed relative spatial distances 9573 from area '5' 9565. The column positioning of area '7' 9593 is also determined by its row alignment with '8' 9595 post the flexes (exampled in FIG. 97 noting the one cell row offset). The post flexes row positioning of area '4' 9562 is determined by the bright blue arrows row relative spatial distances 9563 and 9564 (noting the one cell row offset) from area '5' 9565. The post flexes column spacing between '4' 9562 and area '5' 9565, as previously described, has been driven by other movements as indicated by those bright blue arrows 9563 and 9564 being two sets of one direction arrows rather than one set of two direction (two-headed) arrows. FIG. 95 has shown at least one example of how our closest distance movement linkage/connection technology automatically determines the positioning of nine areas relative to each other post flexes, going from the gray shaded cell areas pre-flexes 9522, 9525, 9527, 9553, 9554, 9557, 9572, 9574, and 9578 to the black outlined post-flexes positionings 9523, 9535, 9529, 9562, 9565, 9568, 9593, 9595, and 9599.

Figure 97:
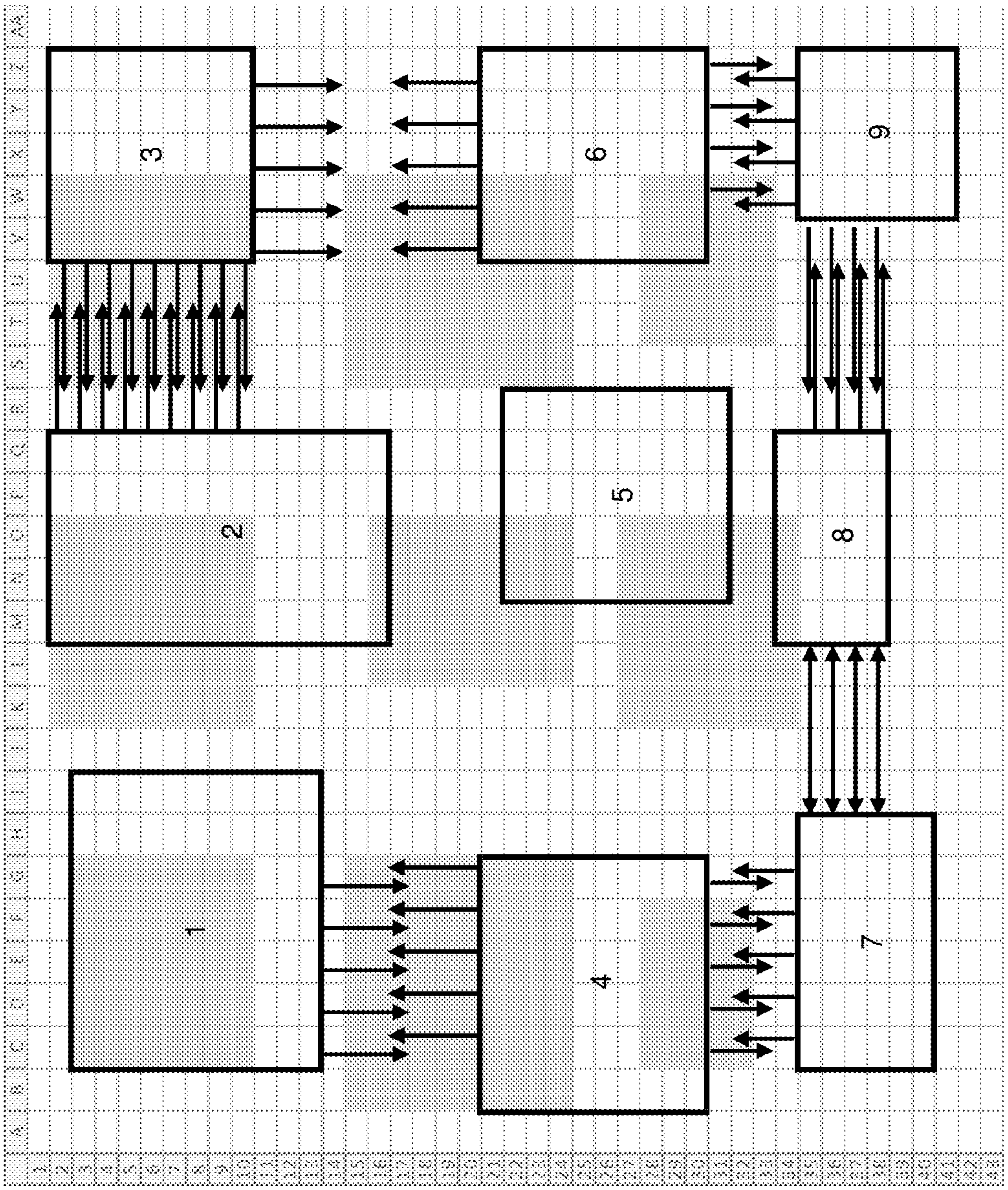
Figure 98:
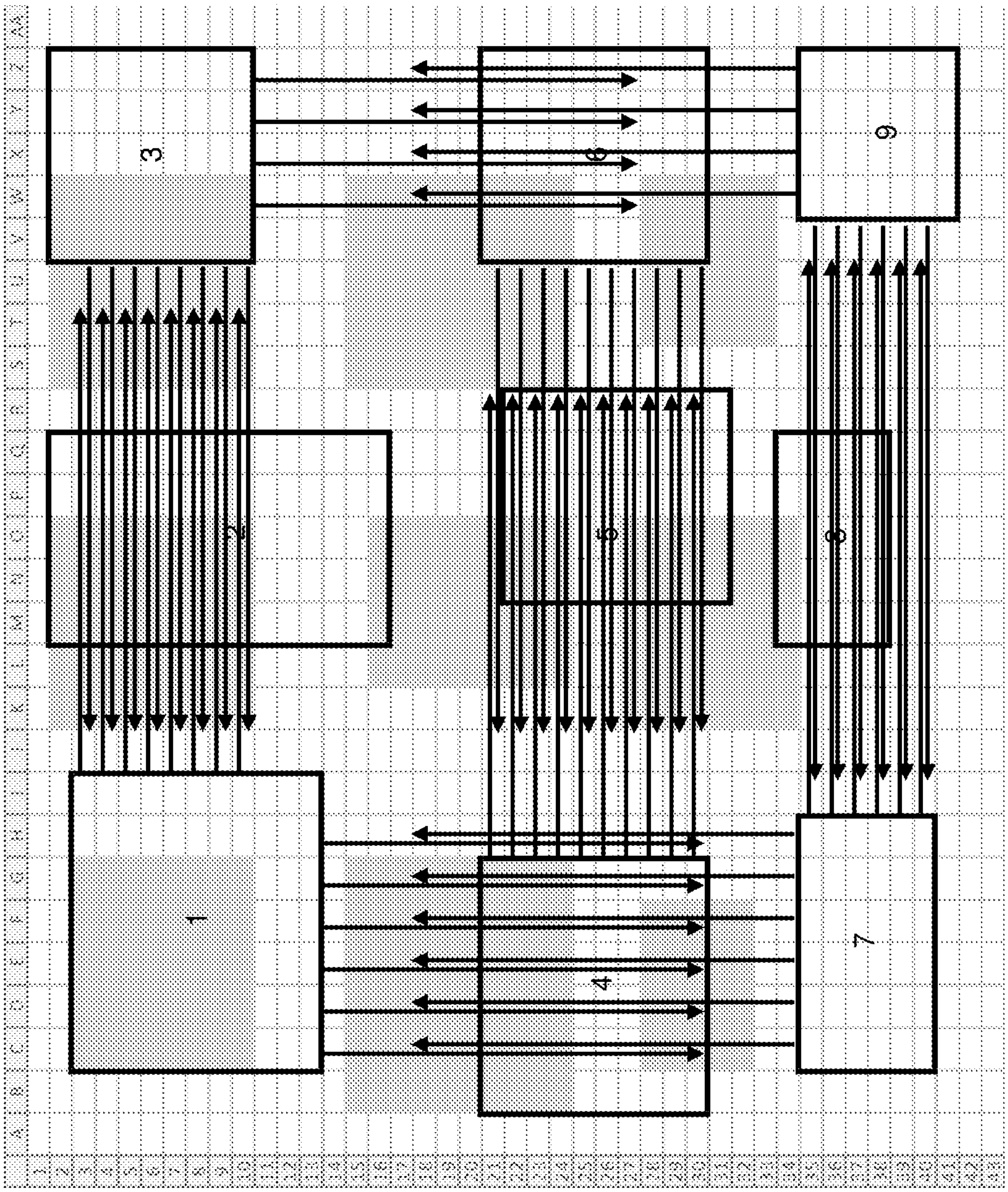
Figure 99:
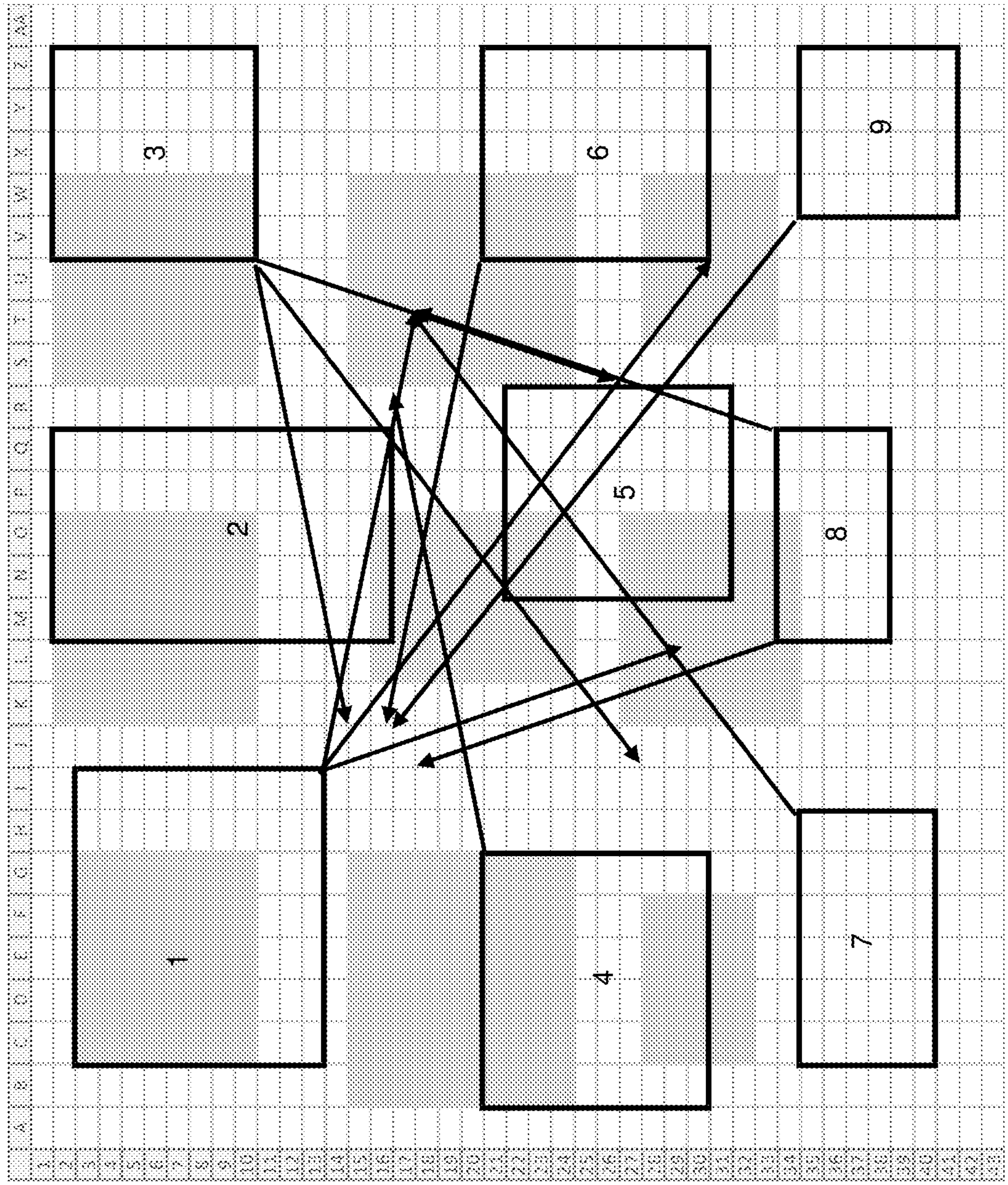

FIG. 96 through FIG. 99 illustratively examples the pre-flexes and post-flexes shortest distance movement linkage/connection relative spatial distances not shown in FIG. 94 and FIG. 95. The additional pre-flexes shortest distance movement linkage/connection relative spatial distances are shown by the double arrows in FIG. 96. Because of the greater complexity of the post-flexes shortest distance movement linkage/connection relative spatial distances, they are shown in FIG. 97 through FIG. 99. FIG. 97 illustratively examples the additional side-by-side (horizontally and vertically) area post-flexes shortest distance movement linkage/connection relative spatial distances with two arrows representing both directions and each single arrow representing the direction and minimum distance of the linkage/connection. FIG. 98 illustratively examples the additional one area remote (i.e., one area in between) side-by-side (horizontally and vertically) area post-flexes shortest distance movement linkage/connection relative spatial distances with the single arrows representing the direction and minimum distance of the linkage/connection. Recognizing that each arrow represents both a row and a column relative spatial distance, even when that value is zero (e.g., straight up or straight across). FIG. 99 illustratively examples the additional tangential (not one area directly or remotely side-by-side) area post-flexes shortest distance movement linkage/connection relative spatial distances with the single arrows representing the direction and minimum distance of the linkage/connection. All the post-flexes shortest (minimum) distance movement linkage/connection relative spatial distances in FIG. 97 through FIG. 99 are consistent with the post-flexes positioning of the nine areas as shown in FIG. 95.

The examples in FIG. 94 through FIG. 99 have been done for nine areas which automatically maintain vertically and horizontally non-straight aligned relationships using our closest distance movement linkage/connection technology. Noting that our technology automatically retains post-flex the pre-flex vertical and horizontal alignments whether they are straight like the exampled in FIG. 88 through FIG. 93 or have offsets like exampled in FIG. 94 through FIG. 99. We will now do a more detailed example for a mix of different cell types and flex ranges for both movement and movement and formula linkages/connections employing our closed distance movement linkage/connection technology.

Closest Distance Movement Linkage—Detailed Example

FIG. 100 examples the charity user manually setup movement and formula links/connects 10051 for a large set of cells 'A3' to 'K23' 10064 and two cells 'H1' and 'I1' 10017 while deciding not to include the cells 'B2' through 'F2' 10023 and also not including the cell 'A1' 10011. In a different embodiment our automatically linking/connecting technology could have automatically linked/connected all the cells in the worksheet in FIG. 100. And then allow the user to decide to unlink/disconnect the cells in 10023 and 10011.

FIG. 101 illustratively examples the minimum/closest distance movement linkage/connection relative spatial relationships between the flex range in cells 'E12' through 'F14' 10165 and all the other cells or flex ranges linked/connected. Given the number of closest distance movement linkage/connection relative spatial relationships, we color coded them for easier tracing of the numbering and comparisons pre and post flexes. The burnt red double arrow 10132 illustratively movement connects cell 'A3' to the example flex range 'E12' through 'F14' 10165, as does the orangey-yellow double arrow 10143 for cell 'E3', as does the purple-blue double arrow 10145 for cell 'H3', as does the turquoise double arrow 10137 for cell 'H1', as does the brown double arrow 10139 for cell 'I1', as does the light purple double arrow 10156 for cell 'H11', as does the black double arrow 10154 for cell 'E11', as does the bright red double arrow 10176 for cell 'H20', as does the grey double arrow 10174 for cell 'E20', as does the sandy-yellow double arrow 10172 for cell 'A19', and as does the light green double arrow 10152 for cell 'A10'. The dark blue double arrow 10142 illustratively movement connects cell range 'A4' through 'D7' to the example flex range 'E12' through 'F14' 10165, as does the bright green double arrow 10146 for cell range 'H4' through 'J4', as does the orange double arrow 10148 for cell range 'H6' through 'J7', as does the violet double arrow 10175 for cell range 'H21' through '122', and as does the light blue double arrow 10173 for cell range 'A20' through 'C23'. Where the range-to-range closest distance movement linkage/connection is from single corner cells. The two dark green double headed arrows 10144 illustratively movement connects/links cell range 'E4' through 'G4' to the example flex range 'E12' through 'F14' 10165, as does the two pink double arrows 10155 for cell range 'E6' through 'G7', as does the three lime green double arrows 10166 for cell range 'H12' through 'K17', as does the two dark gray double arrows 10185 for cell range 'E21' through 'F23', and as does the three bright blues double arrows 10164 for cell range 'A11' through 'C16'. These multiple arrow connections/linkages can change in their number based on how the flexes alter the number of closest distance shared cells.

We will example in detail in FIG. 102 through FIG. 105 how these closest distance movement linkage/connection relative spatial relationships shown in FIG. 101 change with a set of simultaneous flexes, maintaining the coloring in FIG. 101, and then example the remaining changes in the closest distance movement linkage/connection relative spatial relationships between all the other connected areas in FIG. 106 through FIG. 111.

In FIG. 102 the charity user has triggered multiple recalculations and flexes by changing the 'end date' in cell 'F2' 10215 to '1/3/19' from '1/2/19' 10115 in FIG. 101. This triggered five flexes 10222, 10226, 10236, 10228, and 10238 which move all the linked/connected cells and cell ranges other than cell 'A3' 10211. As mentioned above, we will first illustratively example the post-flexes closest distance movement linkage/connection relative spatial relationships of the flex area now in cells 'F13' through "G16' 10265, then in less detail example the other post-flexes closest distance movement linkage/connection relative spatial relationships of all the other linked/connected areas.

FIG. 102 examples the three double arrows closest distance movement linkage/connection relative spatial relationships (10242, 10254, and 10255) that movement position the flex area now in cells 'F13' through "G16' 10265. In this particular example the two double headed arrows closest distance movement linkage/connection relative spatial relationships (10274 and 10285) below cells 'F13' through "G16' 10265 position the cells in 'A22' and 'A23' through 'G25' 10295. Recognizing that in other situations areas below can be the ones positioning areas above them. FIG. 102 also examples how the formula linkage/connection works together with the closest distance movement linkage/connection technology as cell 'L1' 10218 has both automatically moved from cell 'I1' 10117 in FIG. 101 and automatically recalculated using the larger flex range 10238 which has also moved from where it was in in FIG. 101 (cells 'H6' through "J7').

FIG. 103 examples the other straight up and down or across closest distance movement linkage/connection relative spatial relationships (10343, 10344, 10357, and 10354) for the flex area now in cells 'F13' through "G16' 10365. The number of multiple movement linkages/connections between two ranges can flex with the flexes as exampled by the four linkages/connection each in 10357 and 10354 which were three linkages/connections each 10164 and 10166 pre-flex in FIG. 101.

FIG. 104 and FIG. 105 examples the other tangential closest distance movement linkage/connection relative spatial relationships 10432, 10445, 10446, 10454, 10476, 10475, 10473, 10472, and 10452 in FIGS. 104 and 10537, 10539, and 10554, in FIG. 105 for the flex area now in cells 'F13' through "G16' 10465 in FIGS. 104 and 10565 in FIG. 105. All of these illustrative movement linkages/connections are separate arrows showing that at least one minimum spatial distance has been exceeded, however they example that all minimum row and column distances have been automatically delivered by our technology.

FIG. 106 through FIG. 128 illustratively example most of the additional pre- and post-flexes closest distance movement linkage/connection relative spatial relationships set up in FIG. 100. Given the very large number of these movement linkages/connections they are not individually referenced and uniquely color differentiated. Instead, the dual arrows in each FIG. 113 through FIG. 128 are color coded to show which arrows go together (i.e., are the two parts of the same relationship). These colors have no relationship to the colors in FIG. 101 through FIG. 105. FIG. 106 through FIG. 111 illustratively example most of the additional pre-flexes closest distance movement linkage/connection relative spatial relationships. While FIG. 112 through FIG. 128 illustratively example most of the additional post-flexes closest distance movement linkage/connection relative spatial relationships.

Figure 106:
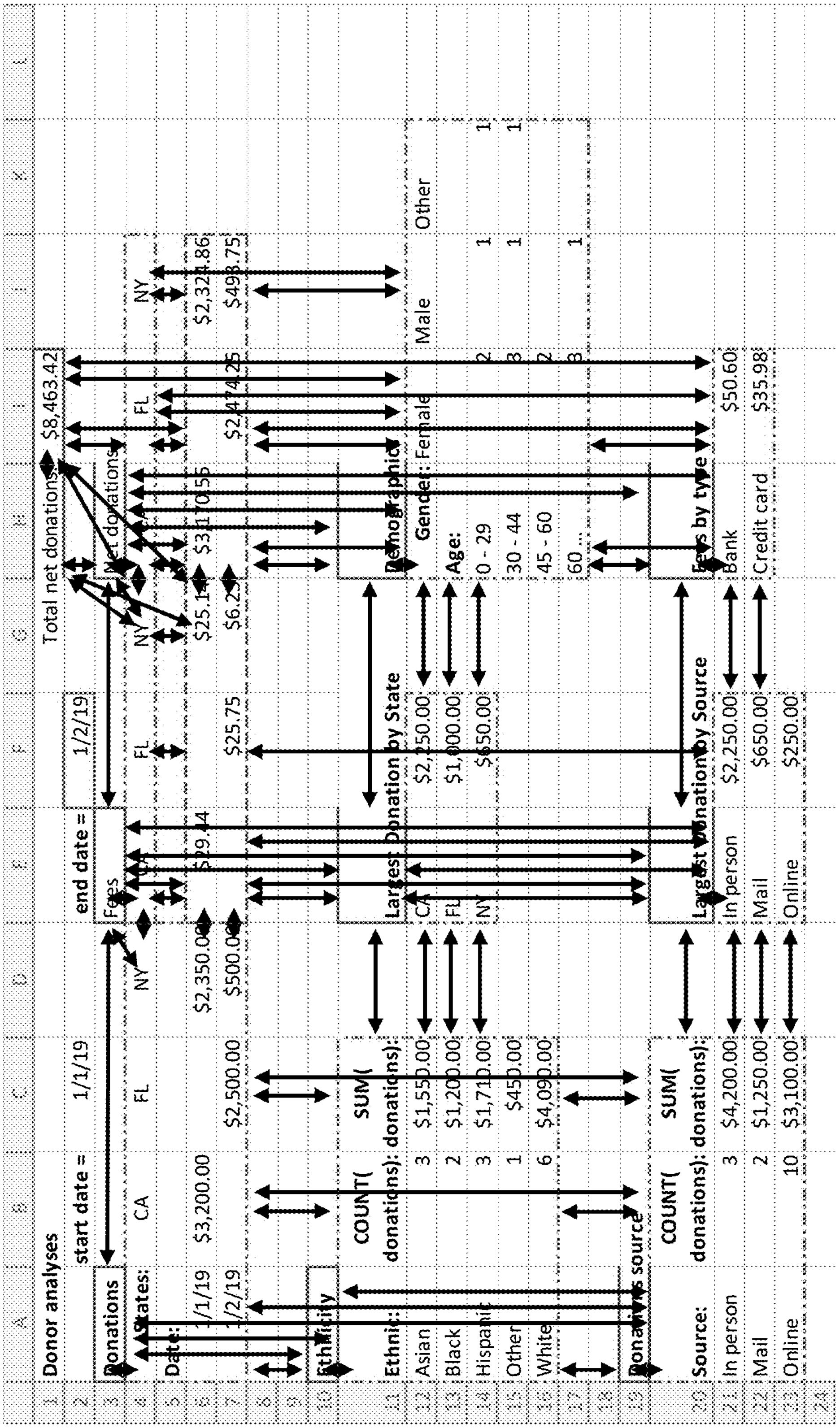
Figure 107:
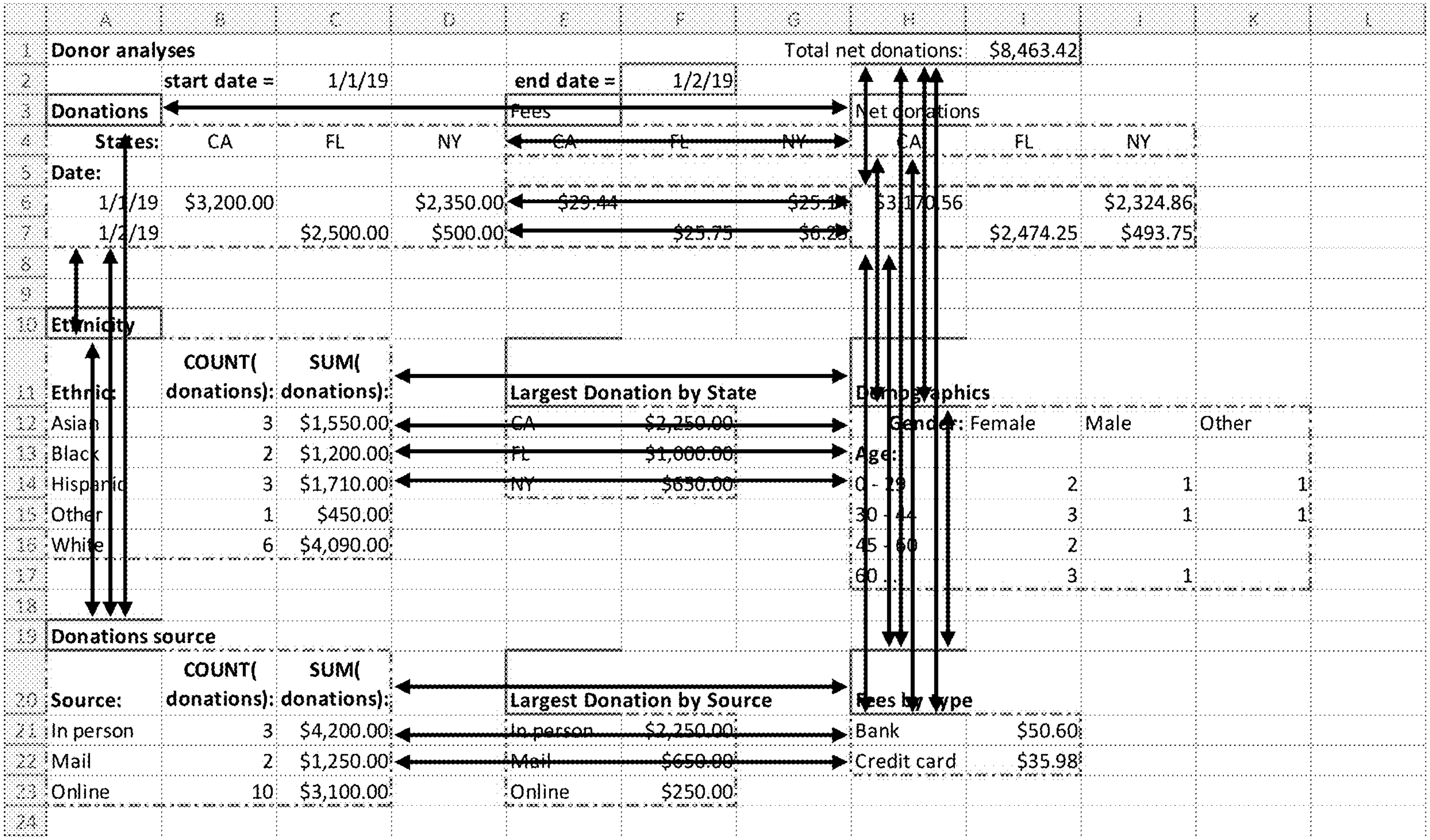
Figure 108:
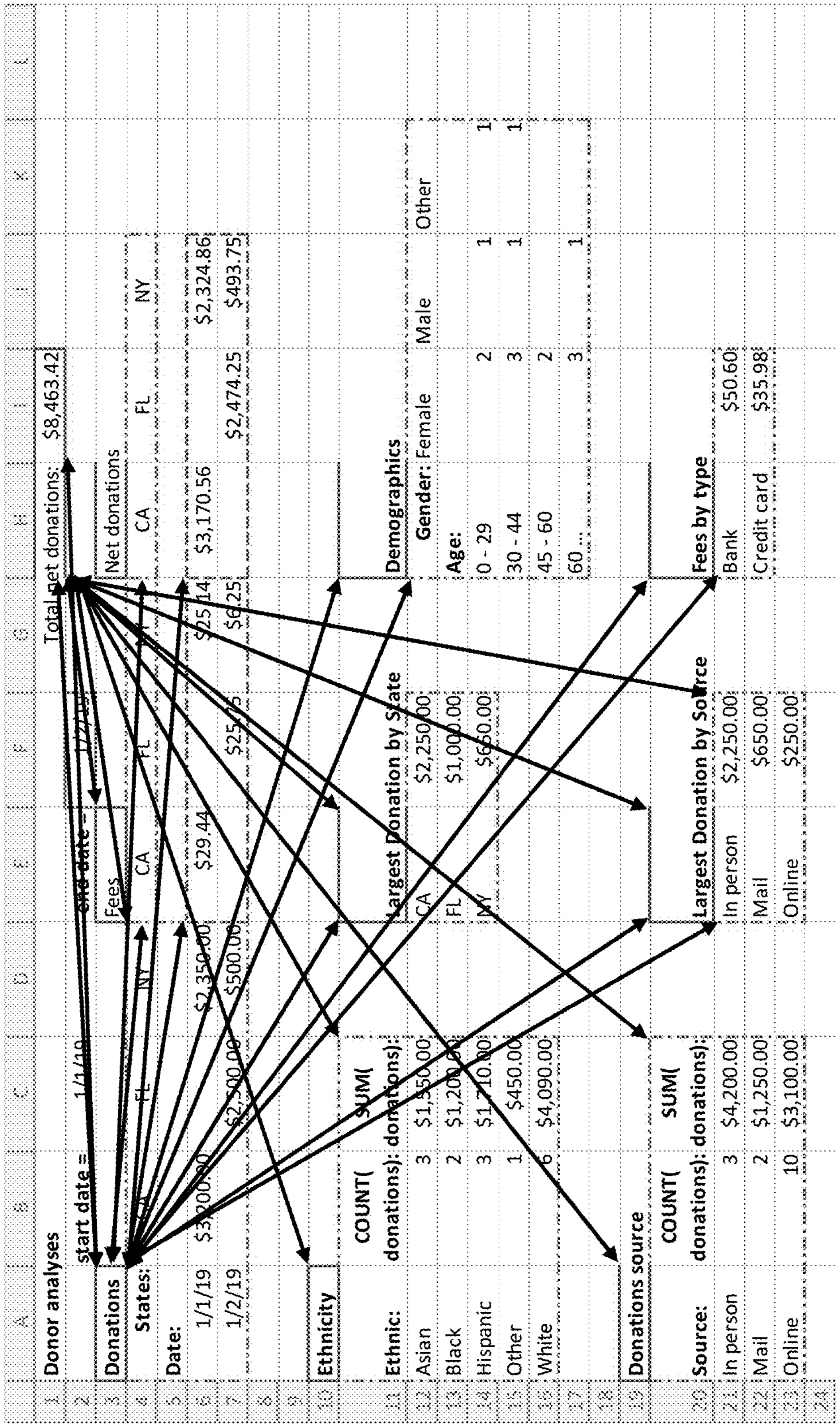
Figure 109:
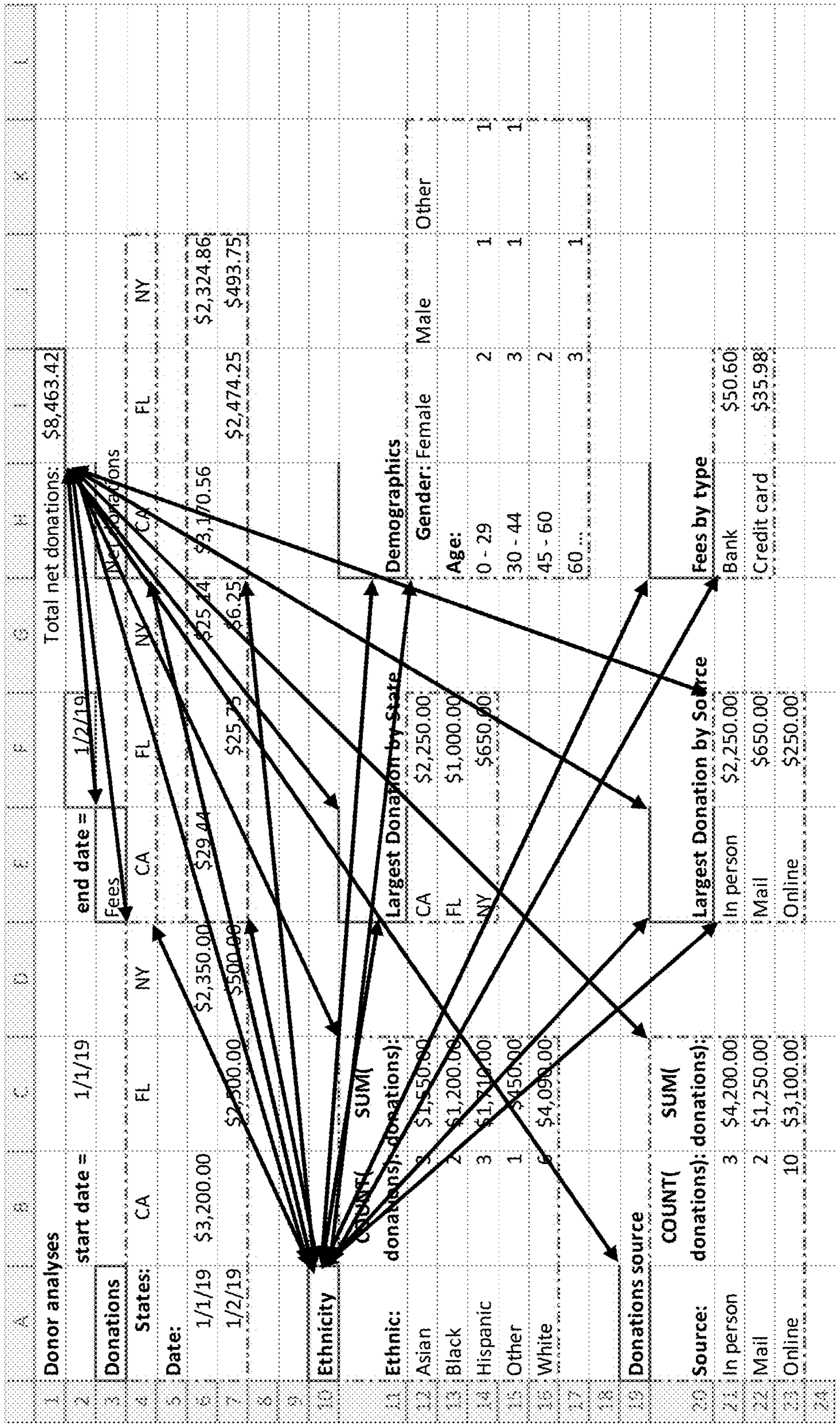
Figure 110:
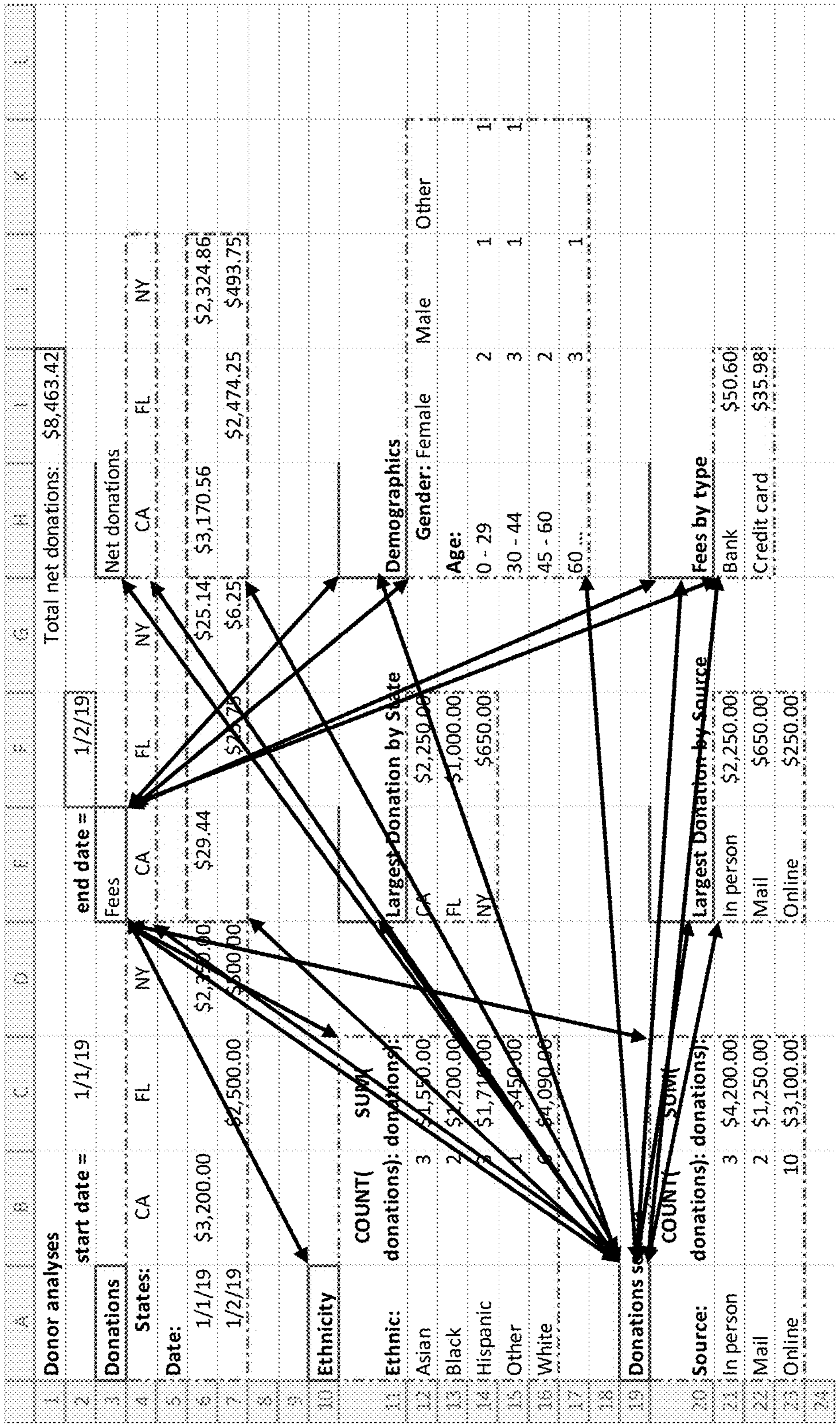
Figure 111:
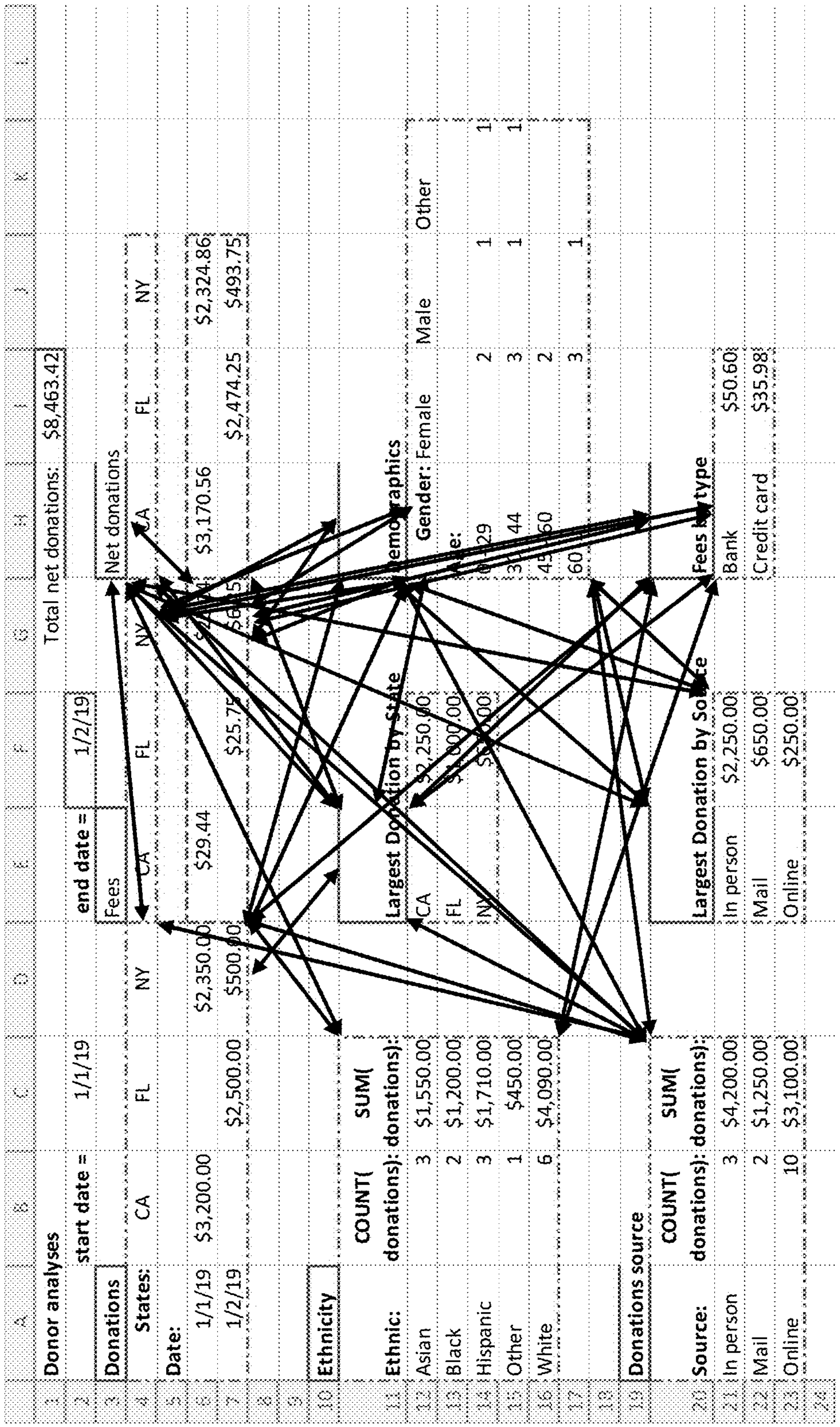

FIG. 106 and FIG. 107 illustratively example a number of the other same row and same column closest distance movement linkage/connection relative spatial relationships not exampled in FIG. 101. They example adjacent and through other flex area relative spatial relationships. FIG. 108 through FIG. 111 illustratively example a number of the other tangential closest distance movement linkage/connection relative spatial relationships not exampled in FIG. 101. Note, since these were all relationships pre-flex all of them where double-headed arrows. Once we move to the post flex any of the relationships where one or more of the minimum row or column spatial relationship distances are exceeded results in two single headed arrow originating at its closest cell location.

Figure 112:
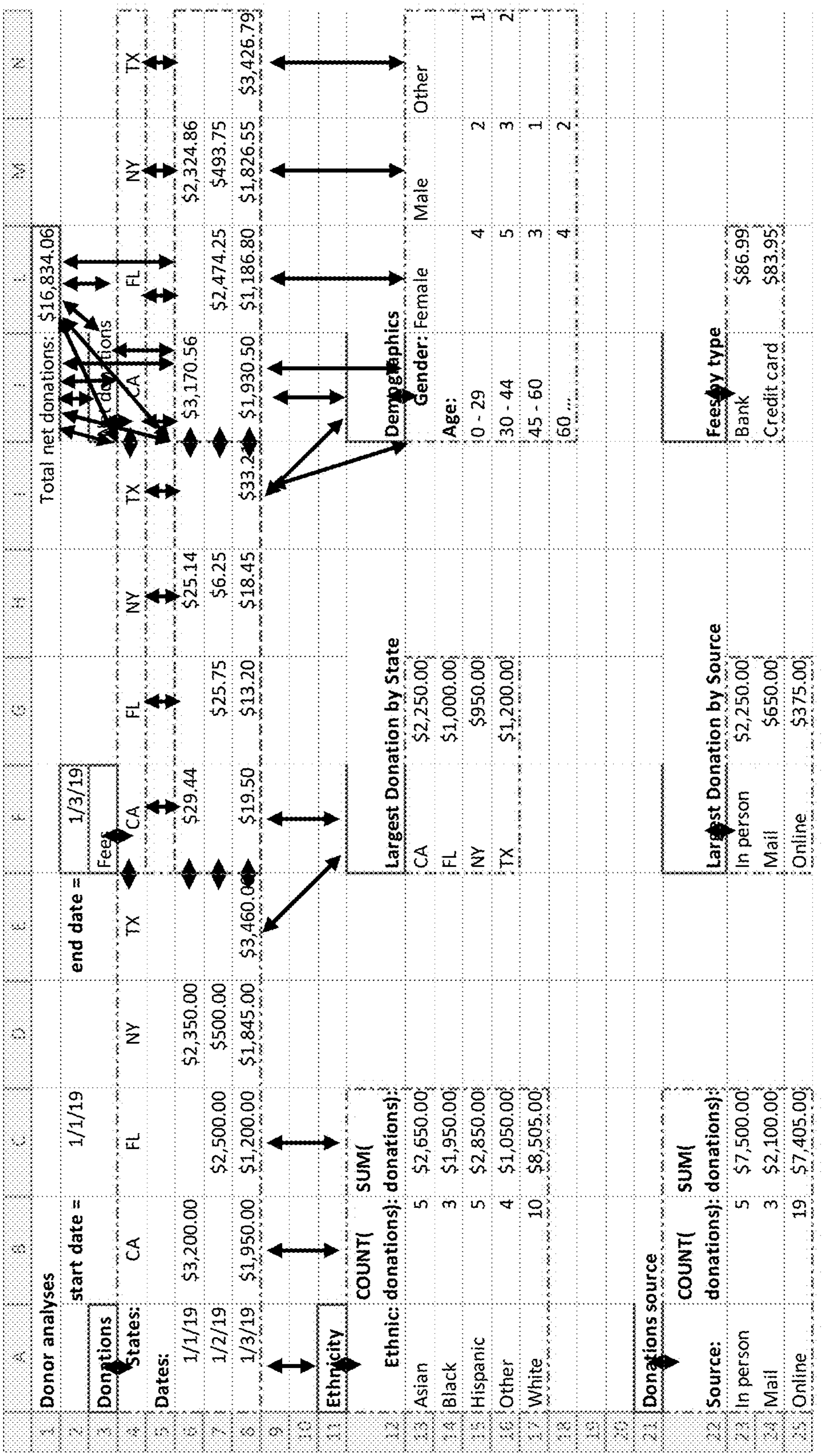

FIG. 112 examples a number of the other (not exampled in FIG. 102) double headed post-flex arrow linkages/connections which determine locations of cell areas after the flexes. This is post the user changing the 'end date' from '1/2/19' to '1/3/19' thereby triggering the multiple simultaneous flexes which then automatically repositions the linked/connected areas. These double headed arrows, when combined with those in FIG. 102, illustratively position all of the linked/connected areas. FIG. 113 through FIG. 128 illustratively example other resulting spatial relationships which exceed their respective minimum distances.

Figure 113:
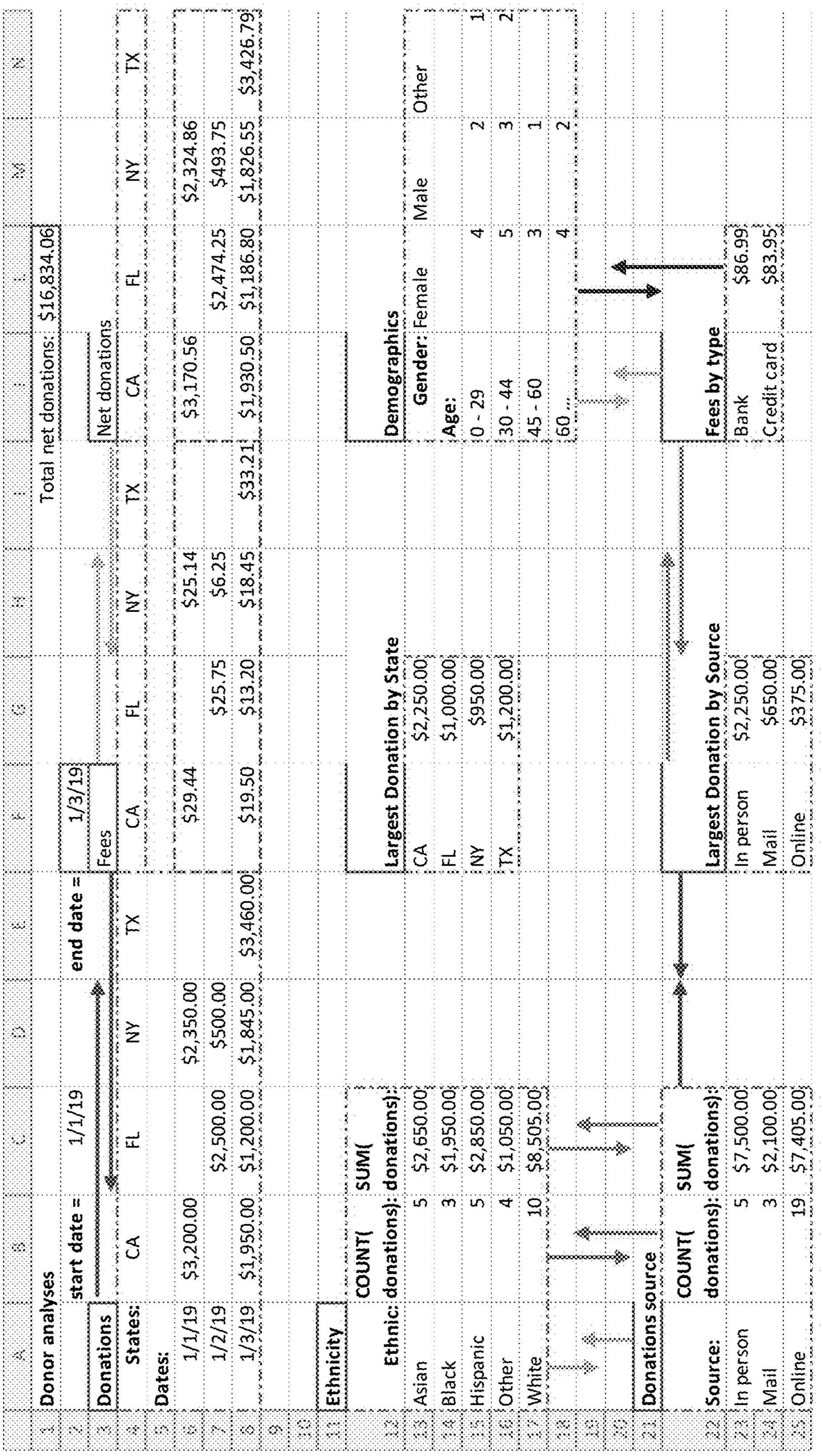
Figure 114:
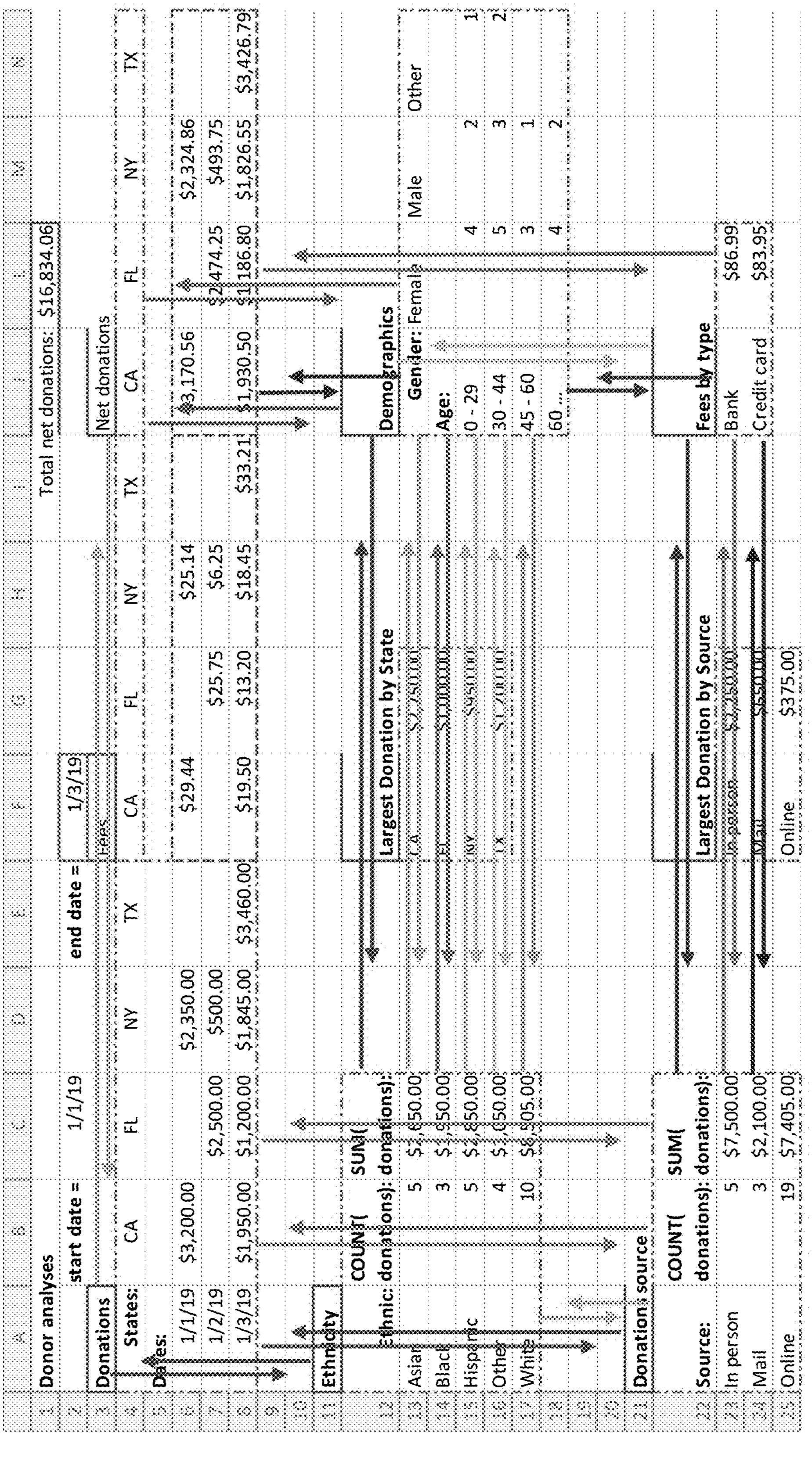
Figure 115:
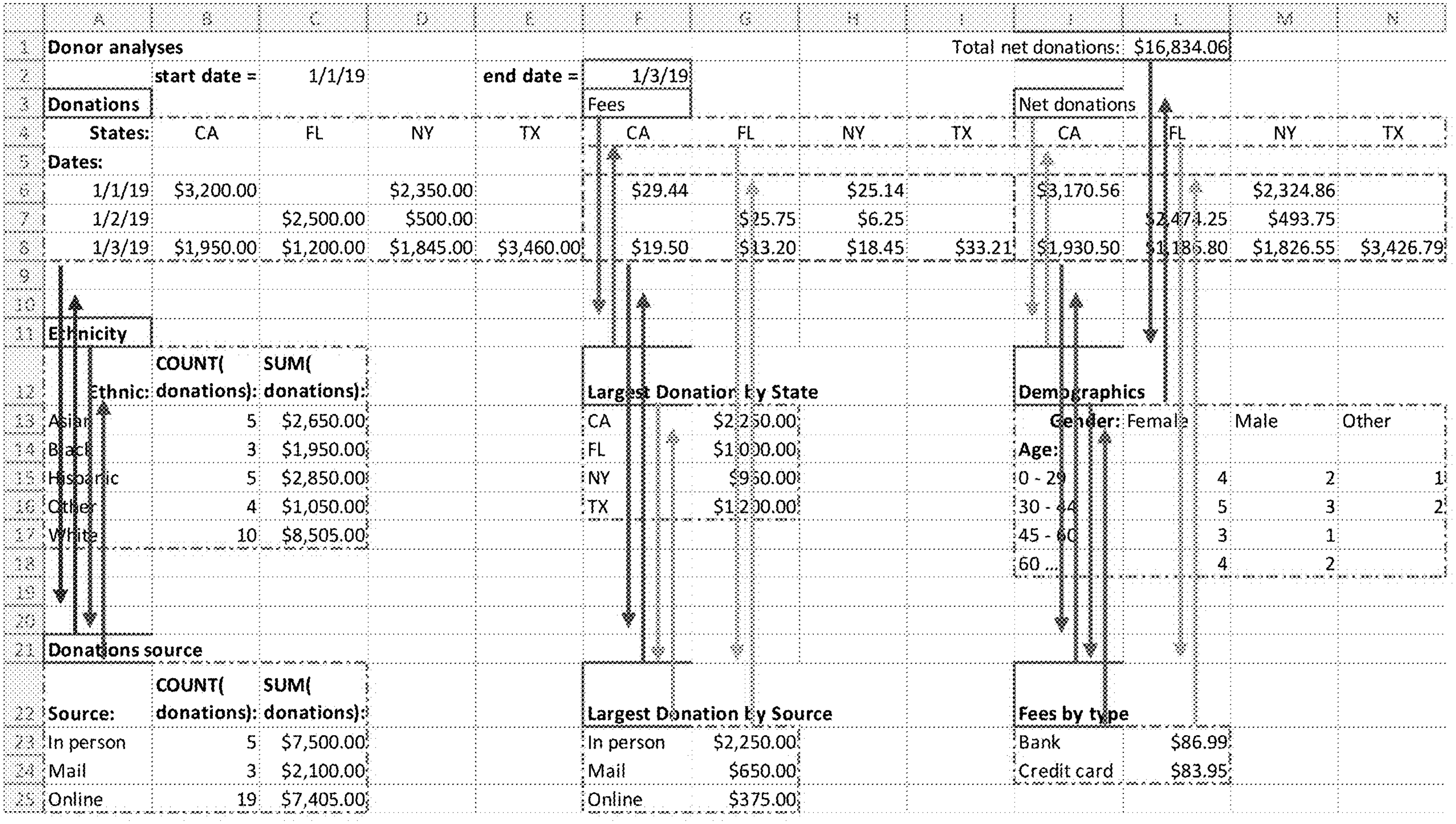
Figure 116:
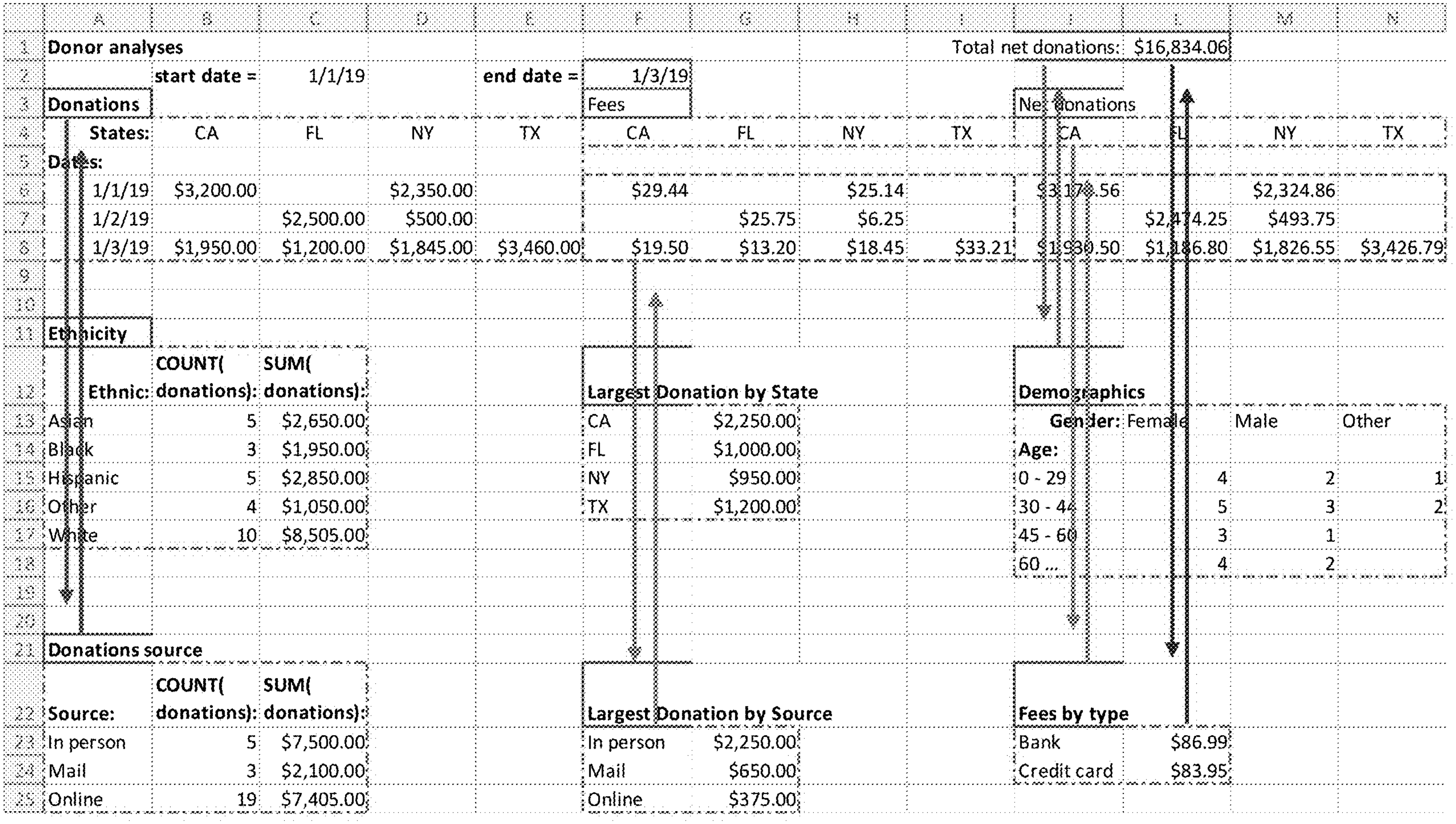
Figure 118:
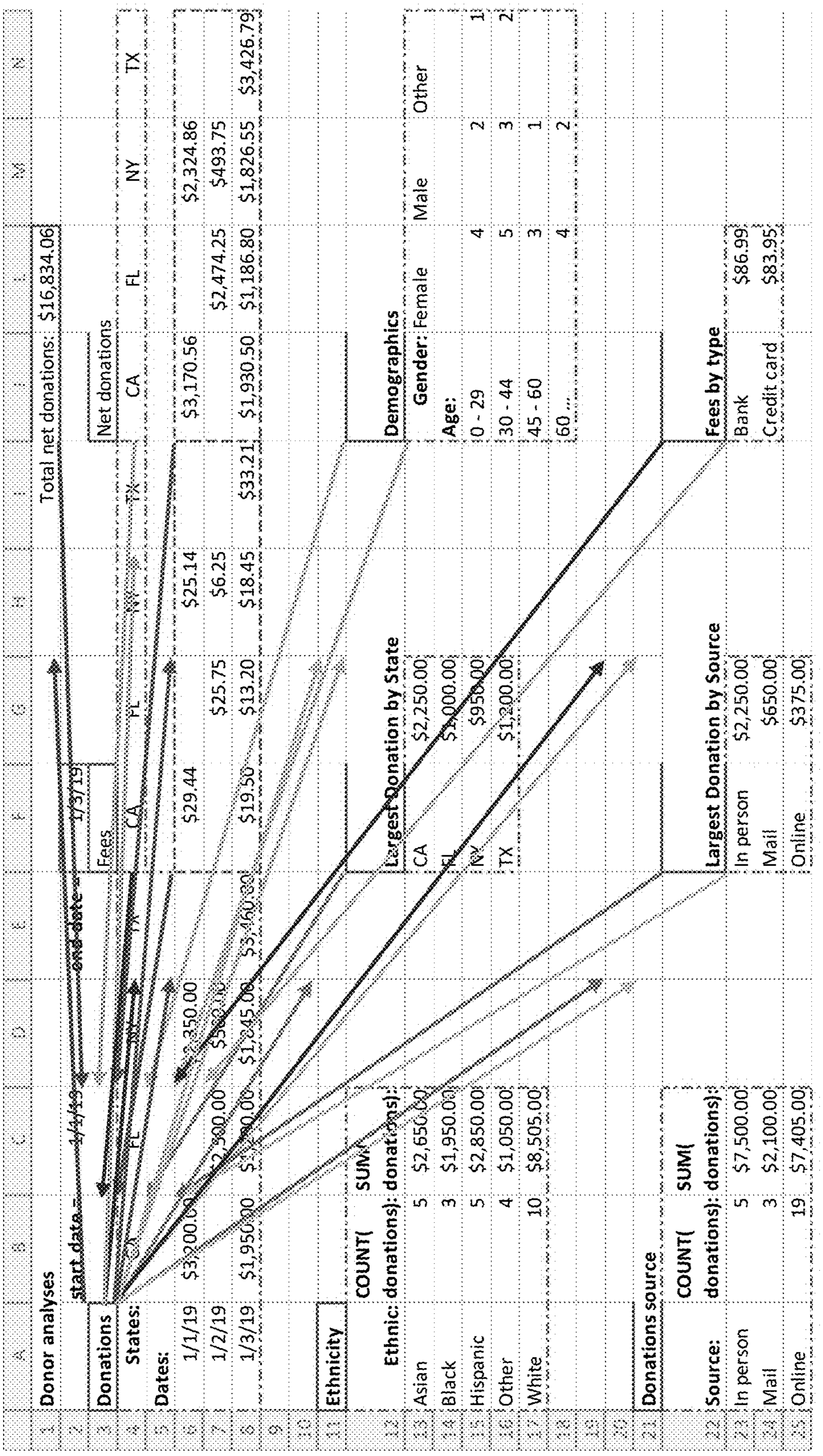
Figure 119:
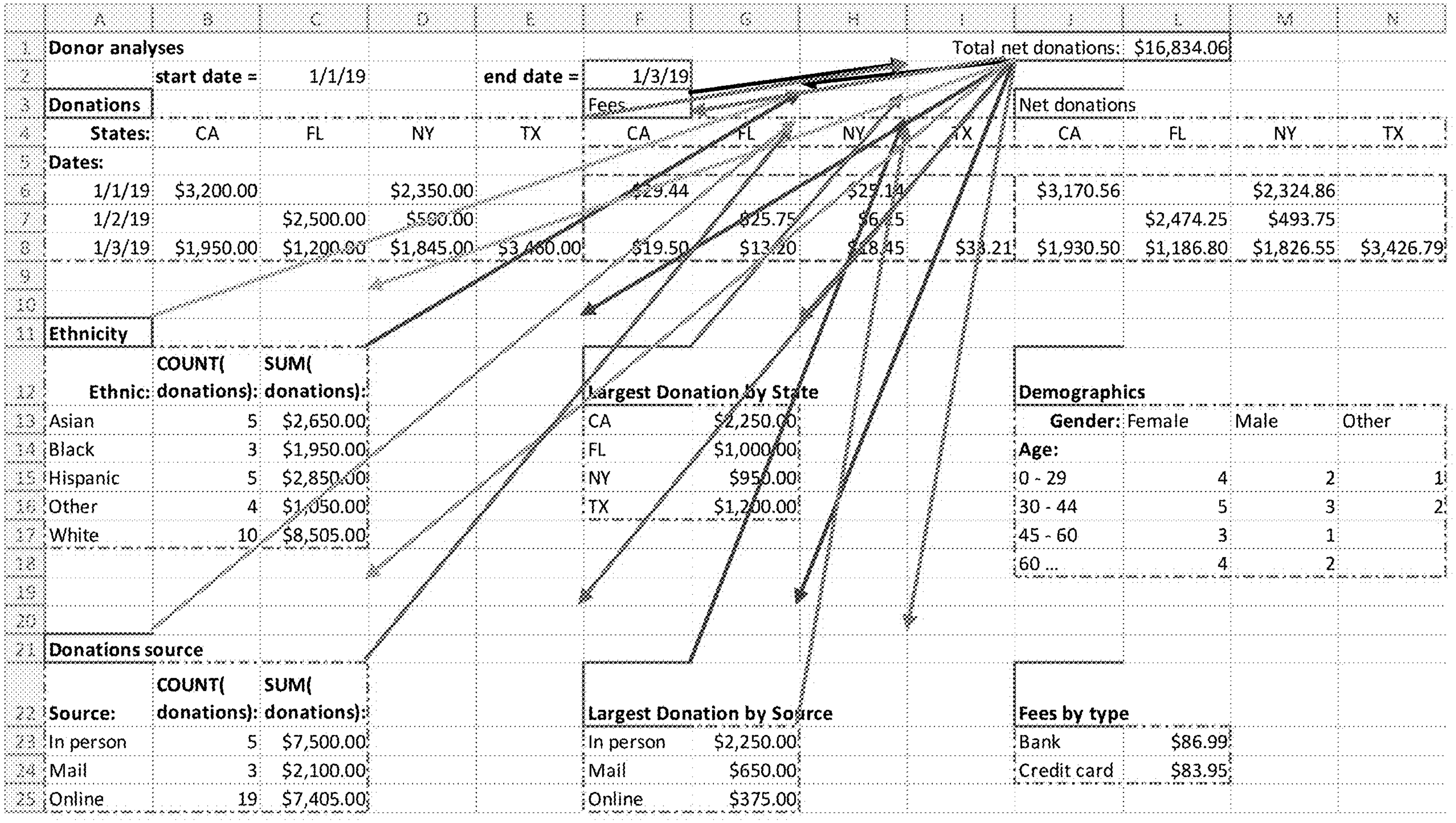
Figure 120:
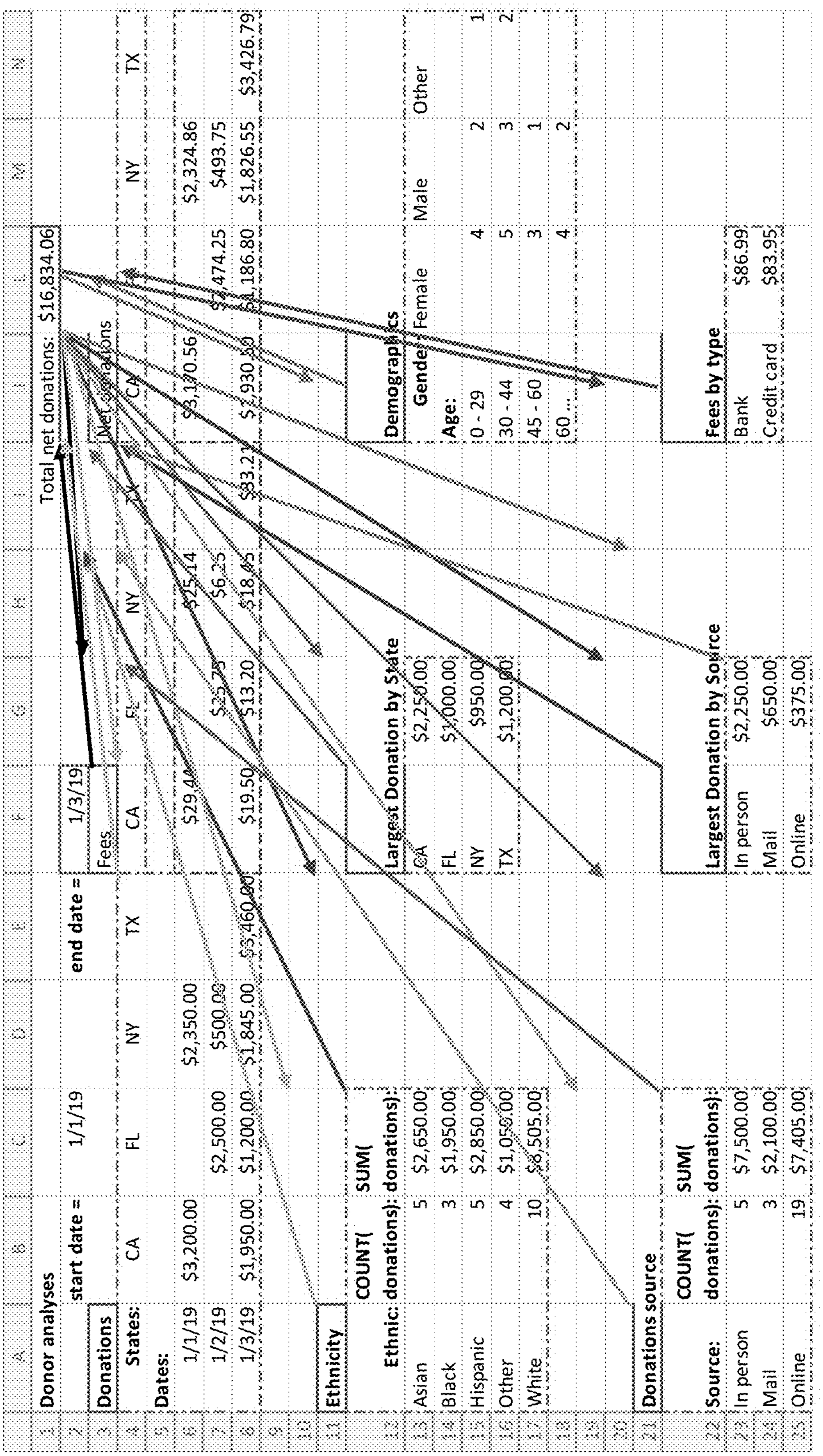
Figure 121:
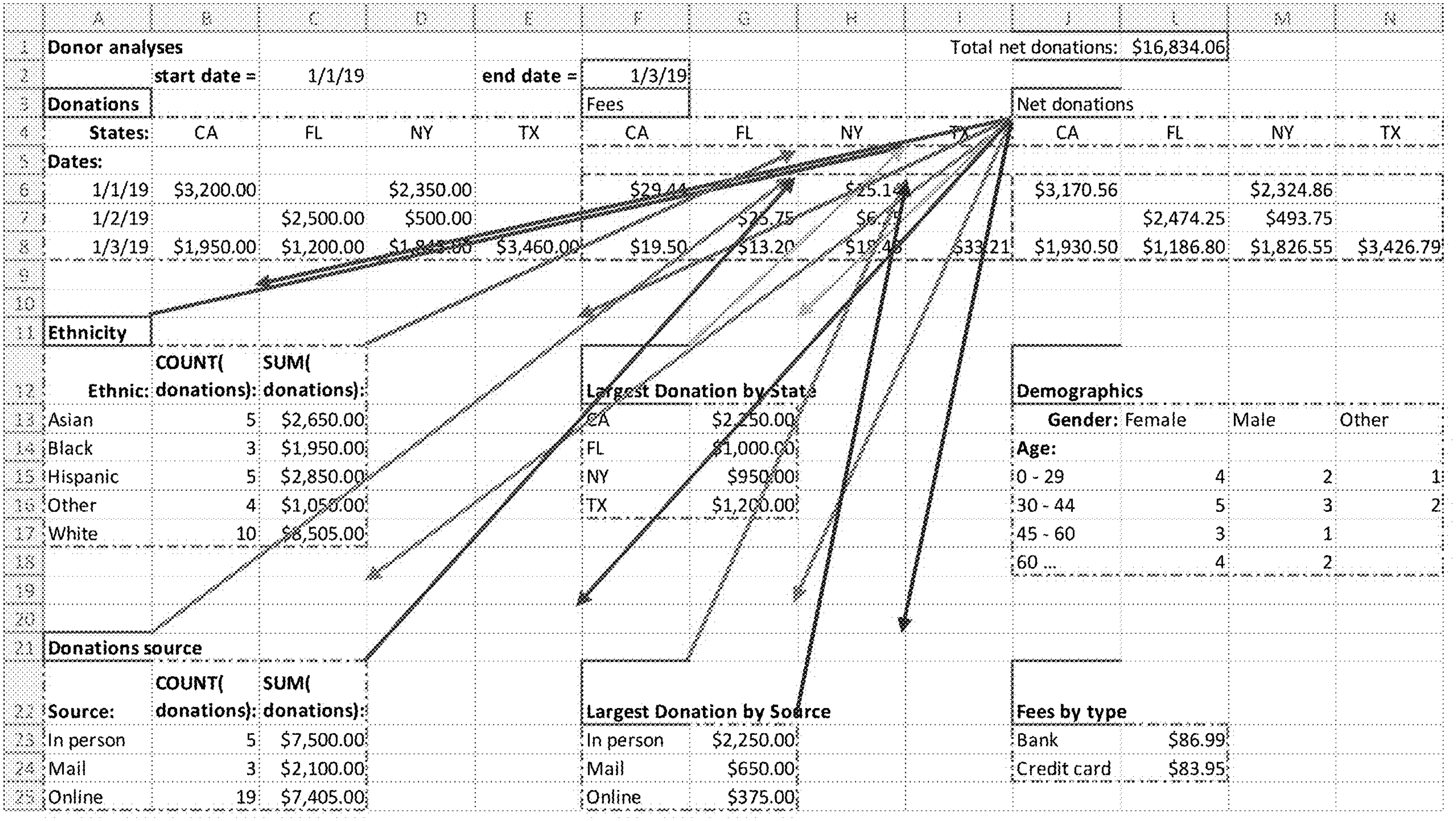
Figure 122:
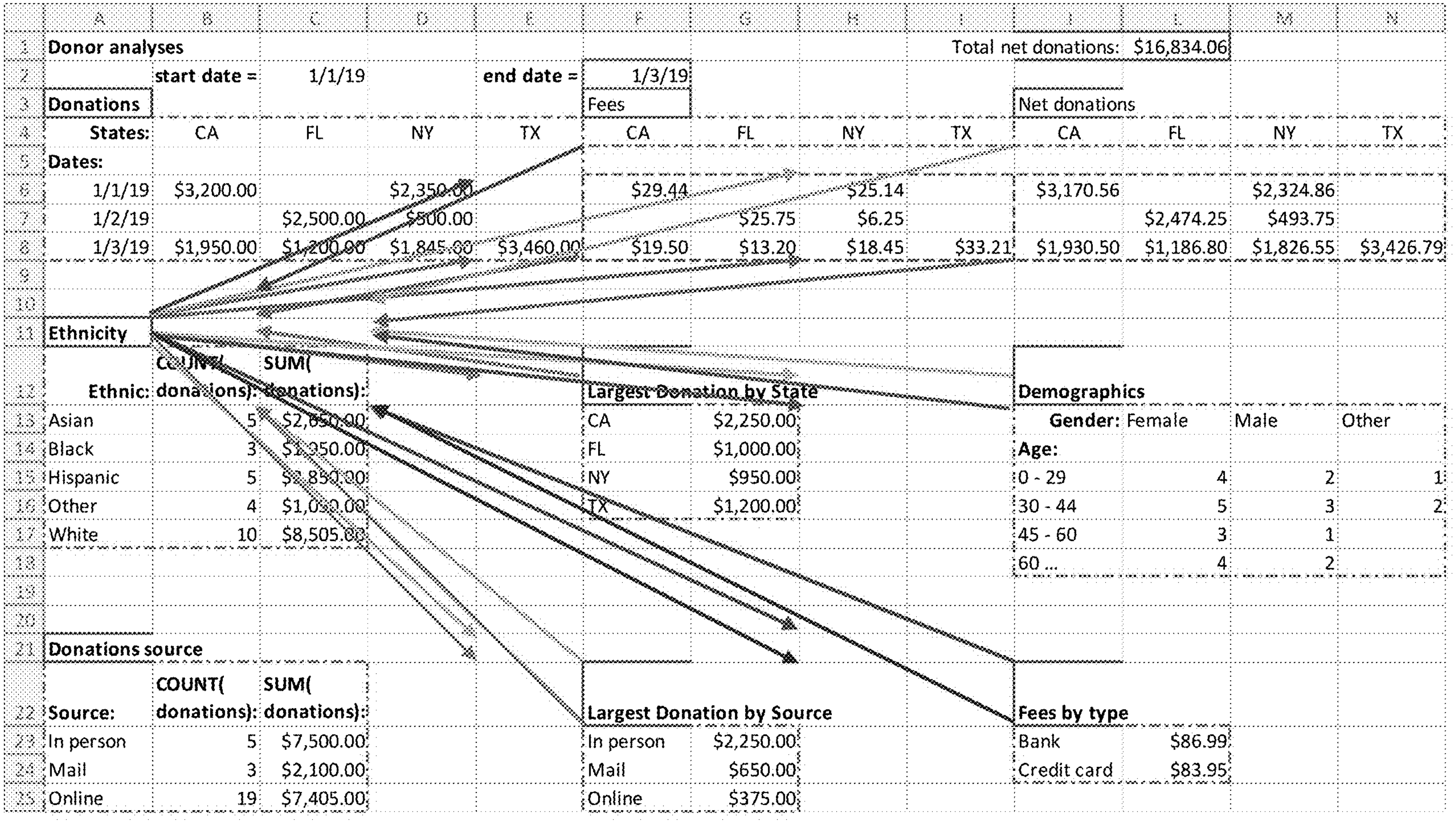
Figure 123:
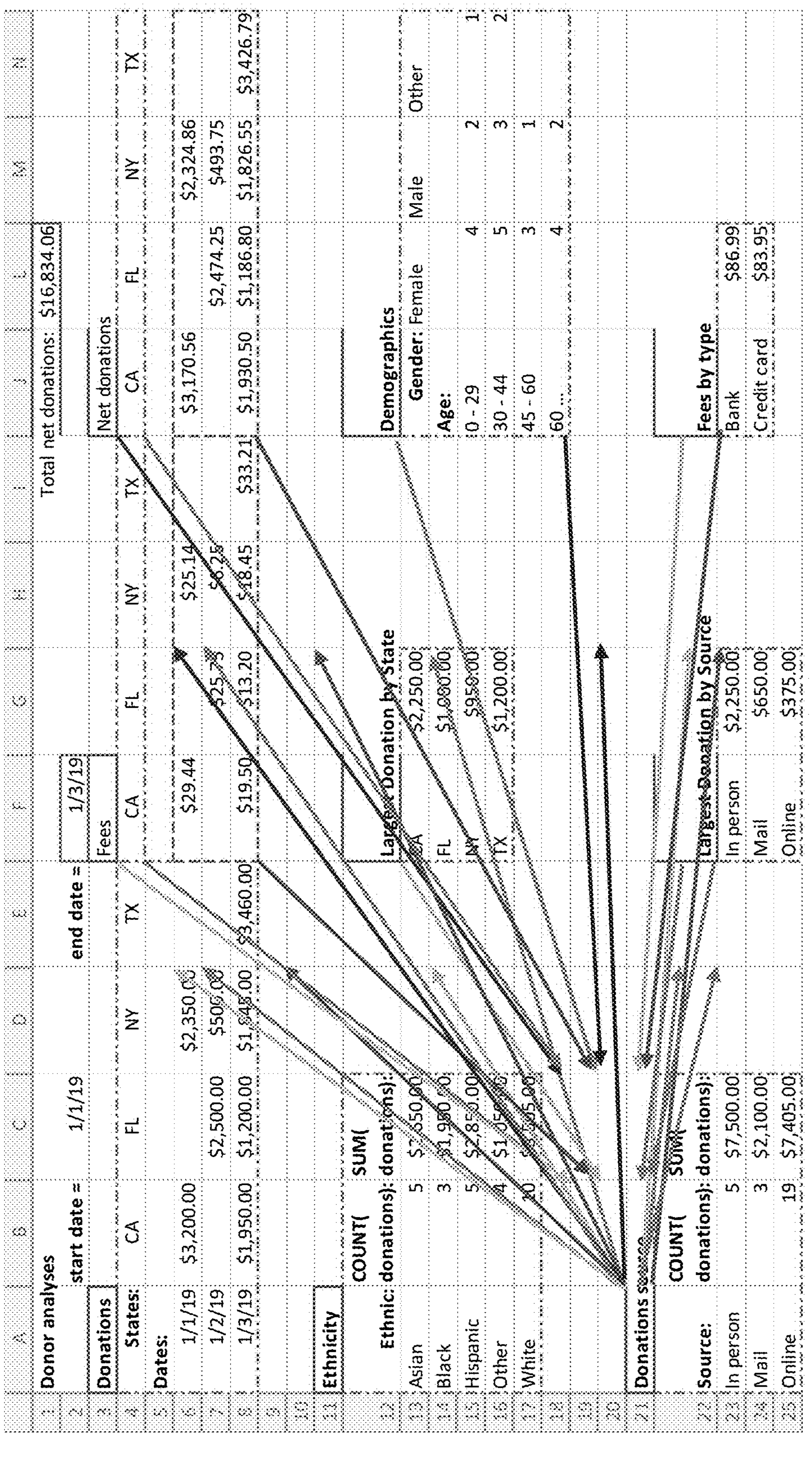
Figure 124:
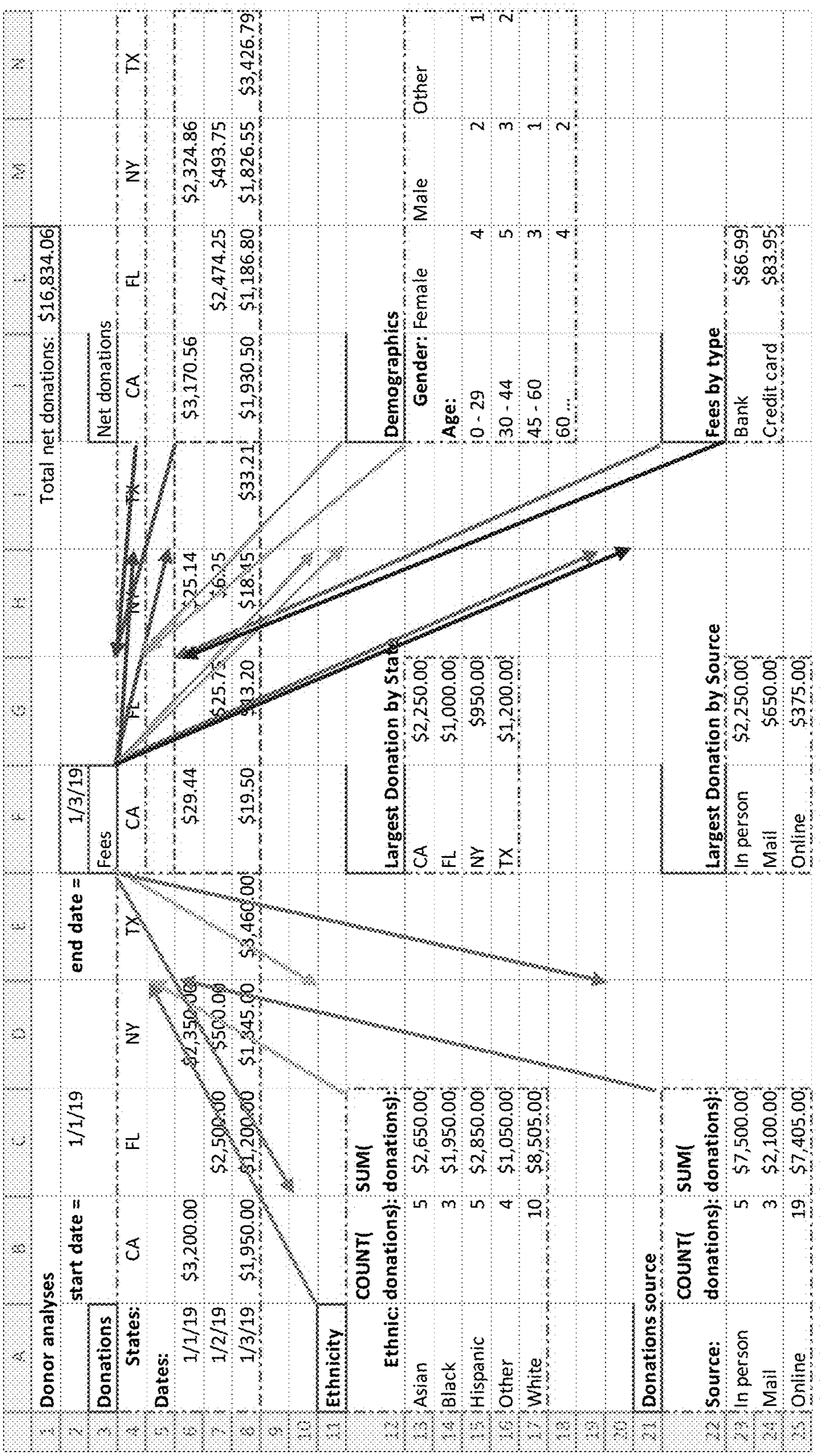
Figure 125:
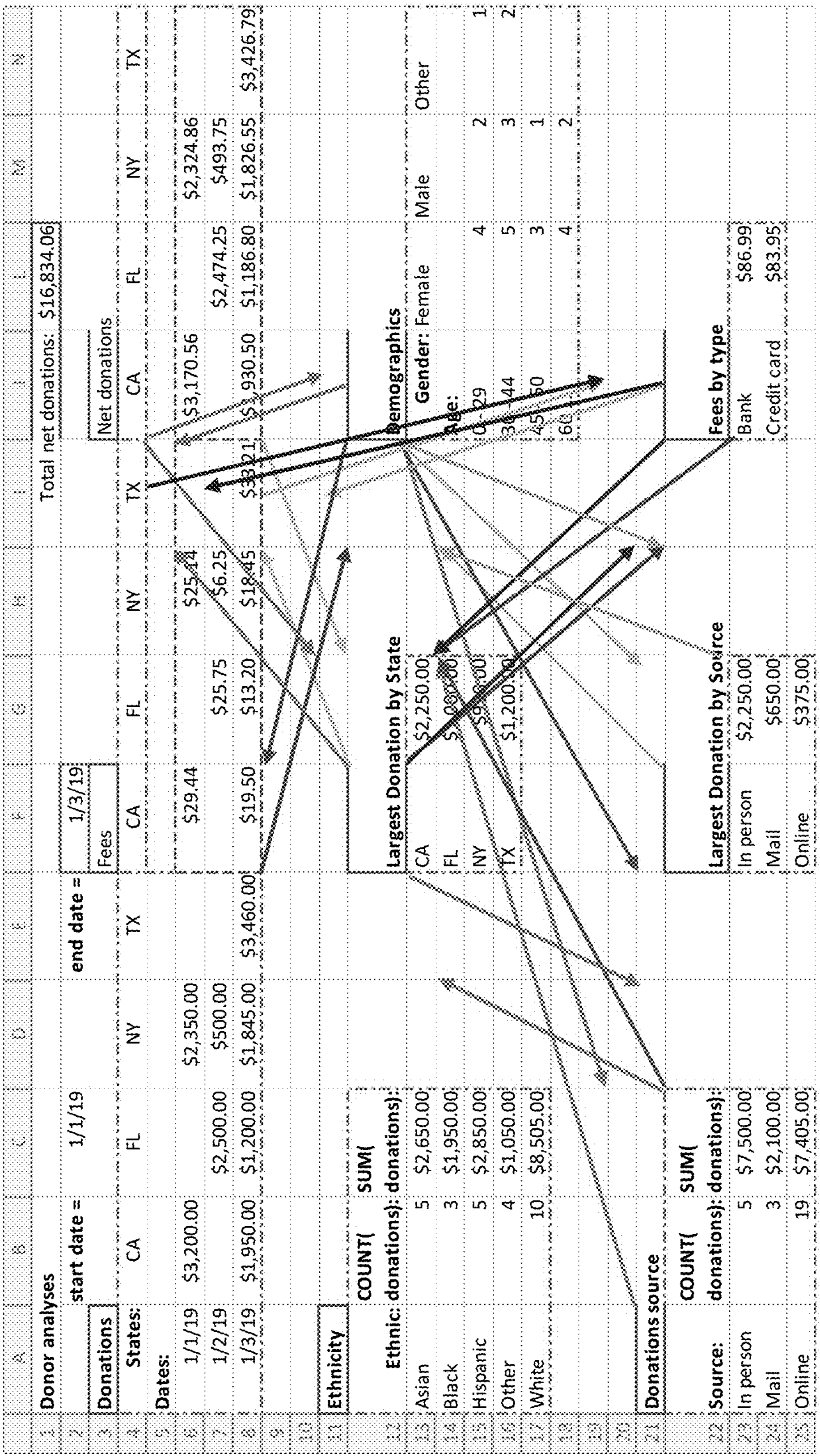
Figure 126:
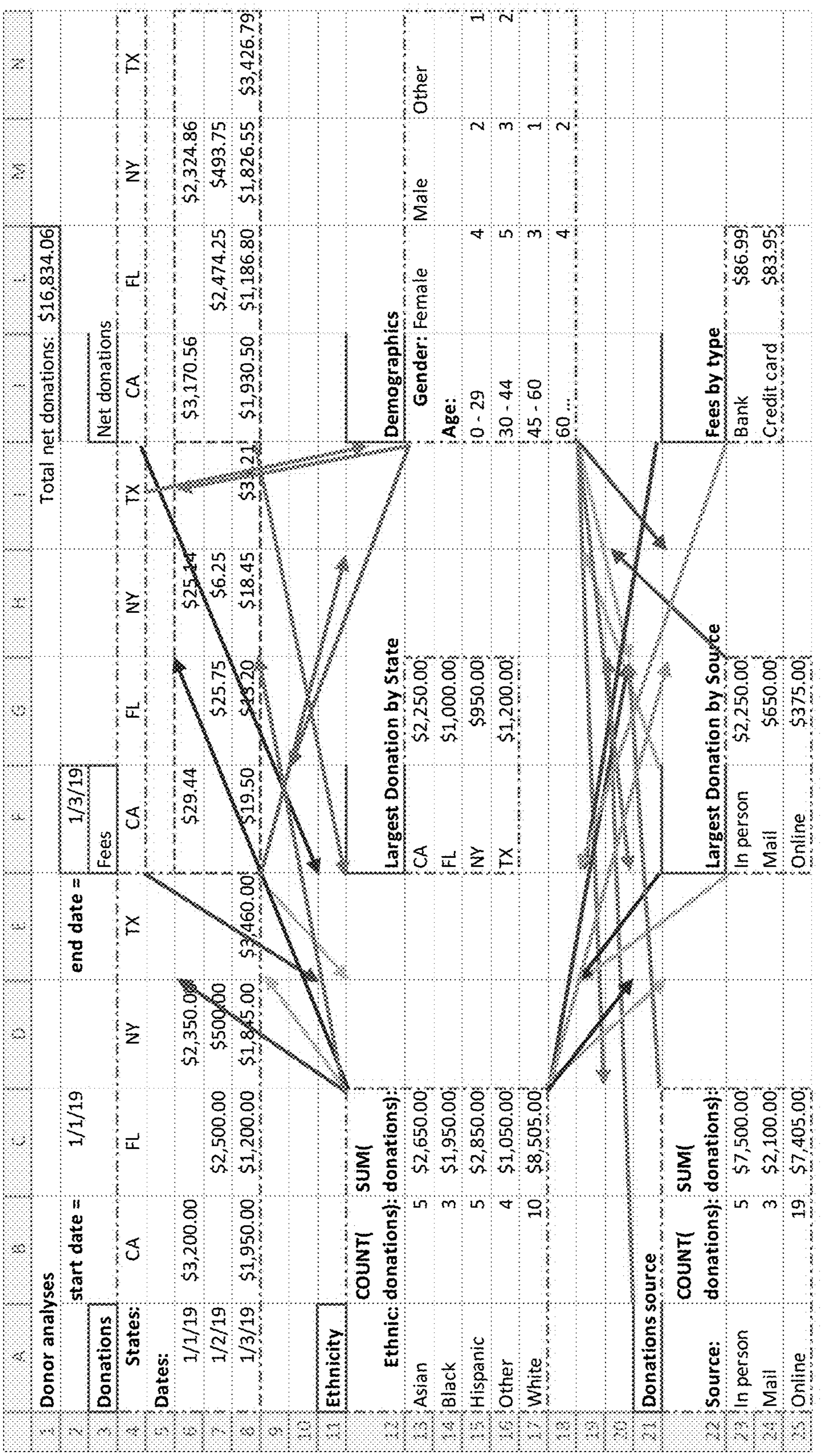
Figure 127:
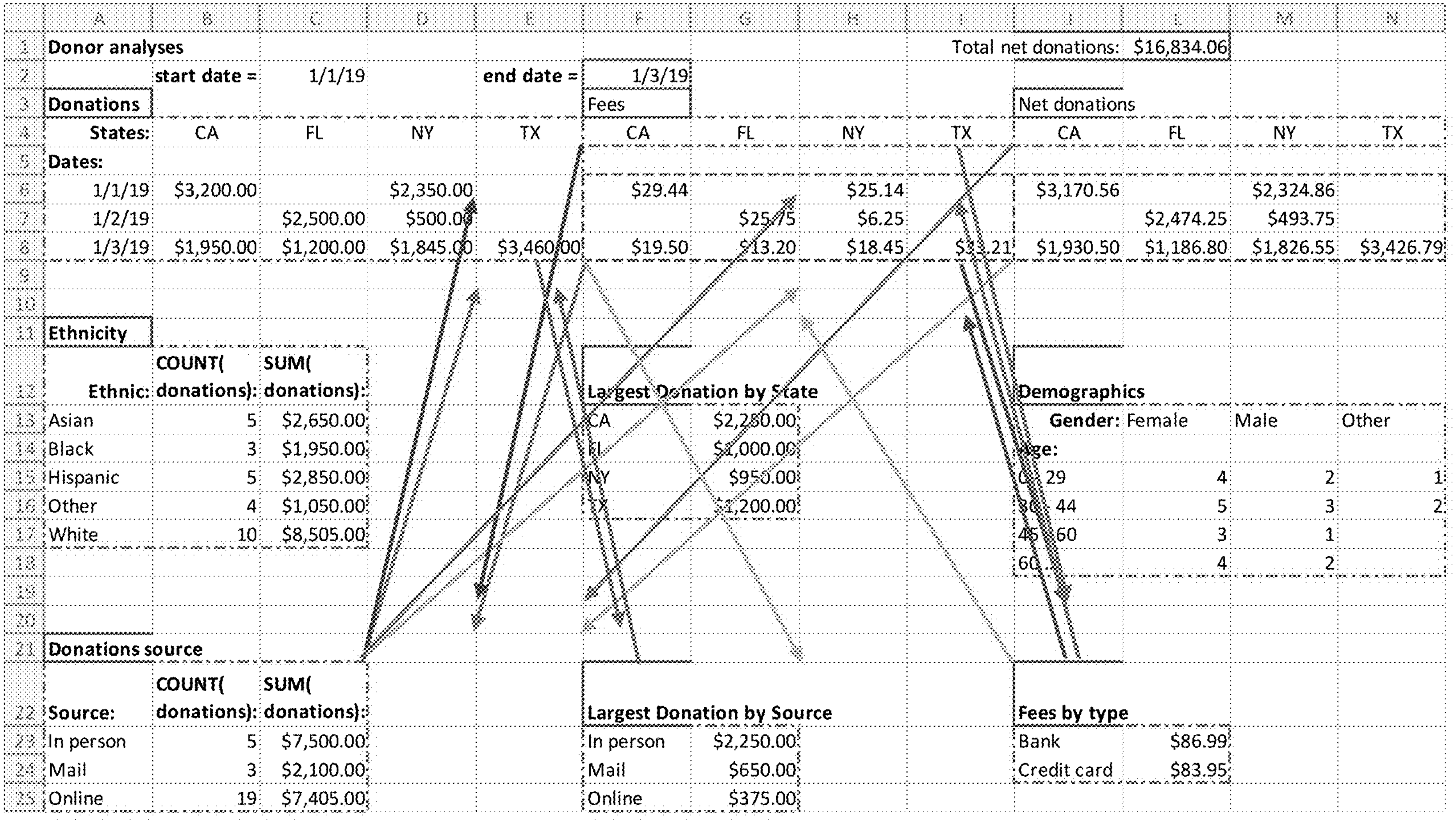
Figure 128:
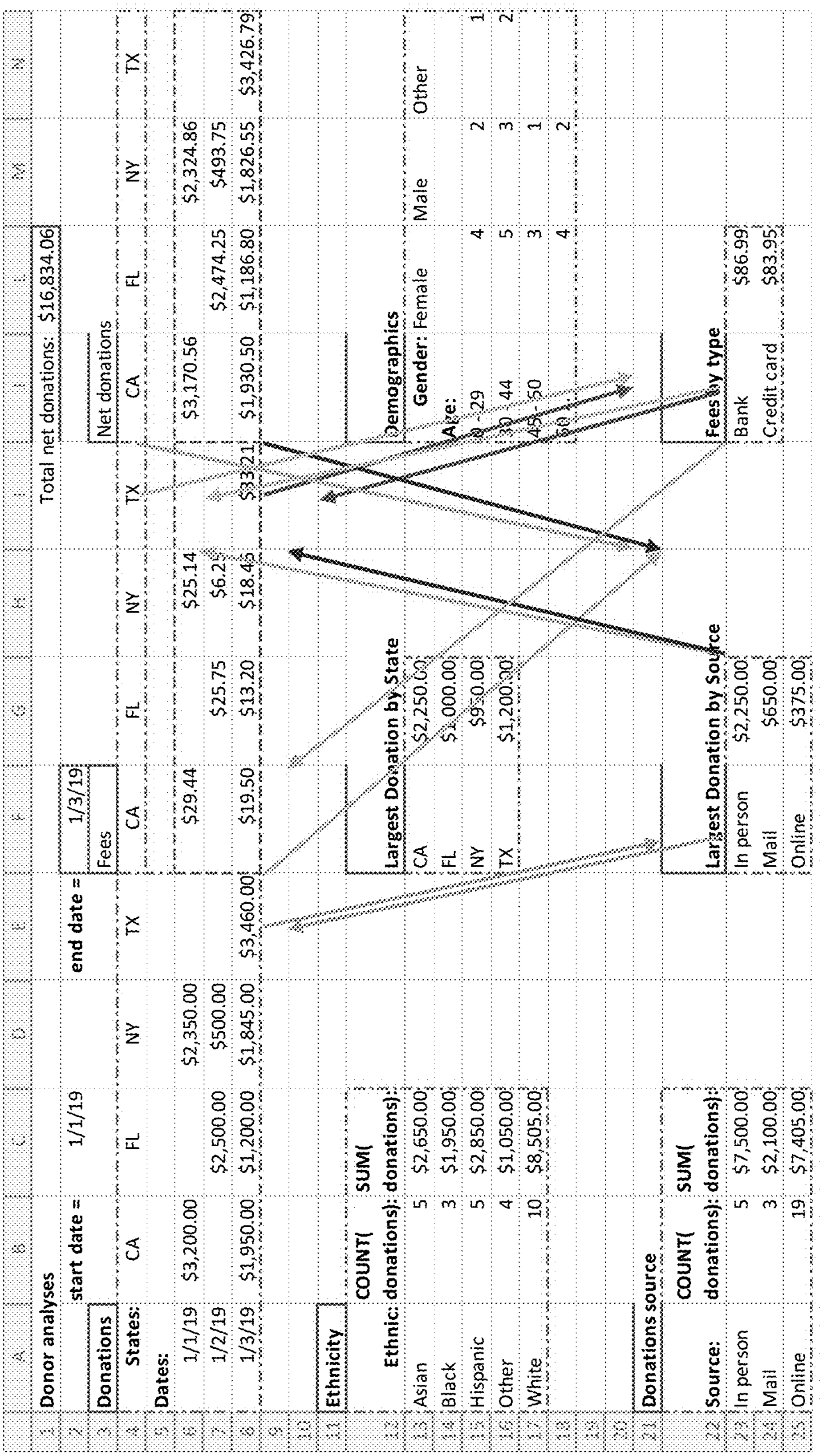

FIG. 113 examples the straight up and down arrow or straight sideways (across) linkages/connections exceeding the minimum spatial distances with no other area in-between the two areas connected. FIG. 114 examples the straight up and down arrow or straight sideways (across) linkages/connections exceeding the minimum spatial distances with one other area in-between the two areas connected. FIG. 115 examples the straight up and down or straight sideways (across) arrow linkages/connections exceeding the minimum spatial distances with two other areas in-between the two areas connected. FIG. 116 examples the straight up and down or straight sideways (across) arrow linkages/connections exceeding the minimum spatial distances with three other areas in-between the two areas connected. FIG. 117 examples the straight up and down or straight sideways (across) arrow linkages/connections exceeding the minimum spatial distances with four or more other areas in-between the two areas connected. There is no real importance to groupings shown in the various figures, they were simply separated because they did not easily fit on fewer figures and were separated to make them more understandable. FIG. 118 through FIG. 128 examples some of the other tangential linkages/connections exceeding the minimum spatial distances. Like all the previous examples of separate arrows they are color coded to illustrate the paired spatial relationships, but they are not color coded to match the examples in FIG. 101 through FIG. 105.

The sheer volume of figures (FIG. 101 through FIG. 128) illustrating most of if not all the pre- and post-flexes for our closest distance movement linkage/connection relative spatial relationships technology examples the value of automating this capability. Once set up, either manually or automatically, our technology can automatically maintain tens to thousands or more minimum spatial relationships. Rather than exampling more mix and match combinations of the previously exampled movement and formula linkage/connection features with our closest distance technology variant, we will example how user grouping can alter the automatic coordination of the movements in our technology.

Linkage Groups

As we have previously exampled, the order of flexes can alter the linkage/connection automatic movements in our technology. What we will label grouping is a mechanism for the user to alter the progression of flexes and movements in our technology and thereby potentially alter the outcomes. Our technology works such that relocatable flexes and relocatable cells which are linkage/connection grouped together resolve their movements and then act like a single area to other flexes and their flex induced automatic movements. Our technology also handles successive grouping of linkages/connections. FIG. 129A through FIG. 130B examples how a first linkage/connection group and successive linkage setups (groupings) can alter the automatic positional linked/connected movement upon flexing. In this example the user wants the 'PivotTable' and the 'Flex copy paste' to retain their relationship no matter what happens above each of them. Therefore, in this embodiment exampled in FIG. 129A the user highlights 12964 (as indicated by the green highlight outline) both of their ranges ('PivotTable' 12961 and 'Flex copy paste' 12963) and clicks the "LINK' button 12924 and in the UI selector 12923 clicking 'Movement' 12933 to setup the group linkage between the two. In this embodiment it will maintain the spatial relationship between two areas ('3' columns zero rows 12962). The user then sets up the second group of linkages in FIG. 129B by highlighting the range 12957 (as indicated by the green highlight outline), clicking the "LINK' button 12939 and in the UI selector 12928 clicking 'Movement' 12938. That range includes the previous linkage/connection group 12968 (the 'PivotTable' 12966 and the 'flex copy paste' 12969 in this embodiment highlighted with the purple line), the 'WRITE' 12946 and the 'FILTER' 12949. However, instead of treating the previous linkage group 12968 as its component parts this embodiment of our technology is going to treat it as one element relative to the 'WRITE' 12946 and the 'FILTER' 12949 flexes. Therefore, under all situations this embodiment will maintain the light blue '3' columns and zero rows offset 12967 between the PivotTable' 12966 and 'Flex copy paste' 12969 and it will deal with 'WRITE' 12946 and 'FILTER' 12949 offsets 12956 and 12958 against the link/connect group 12968.

In other embodiments, our group technology supports linkages using our different movement coordination technologies (e.g., closest distance, direct linkages, bumpers and ordered progressions), In each of those group embodiment variants the first group will not be individually altered by the movement of the flexes added by subsequent groups. Those flexes may alter where the group is positioned but will not alter the coordinated movements within the group. The same continues if the user adds an additional group with additional flexes, they can alter where the preceding groups are moved but not the coordinated movements within the preceding groups.

Figure 129B:
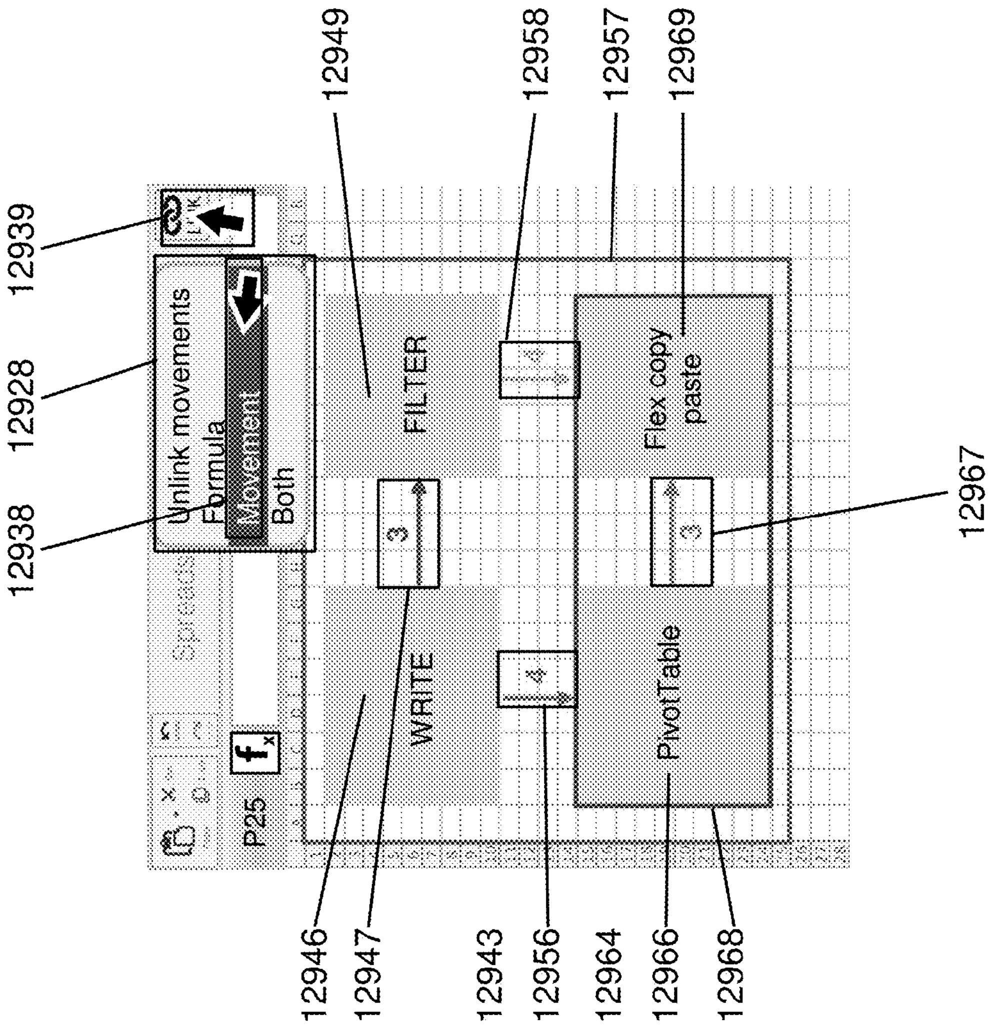
Figure 129A:
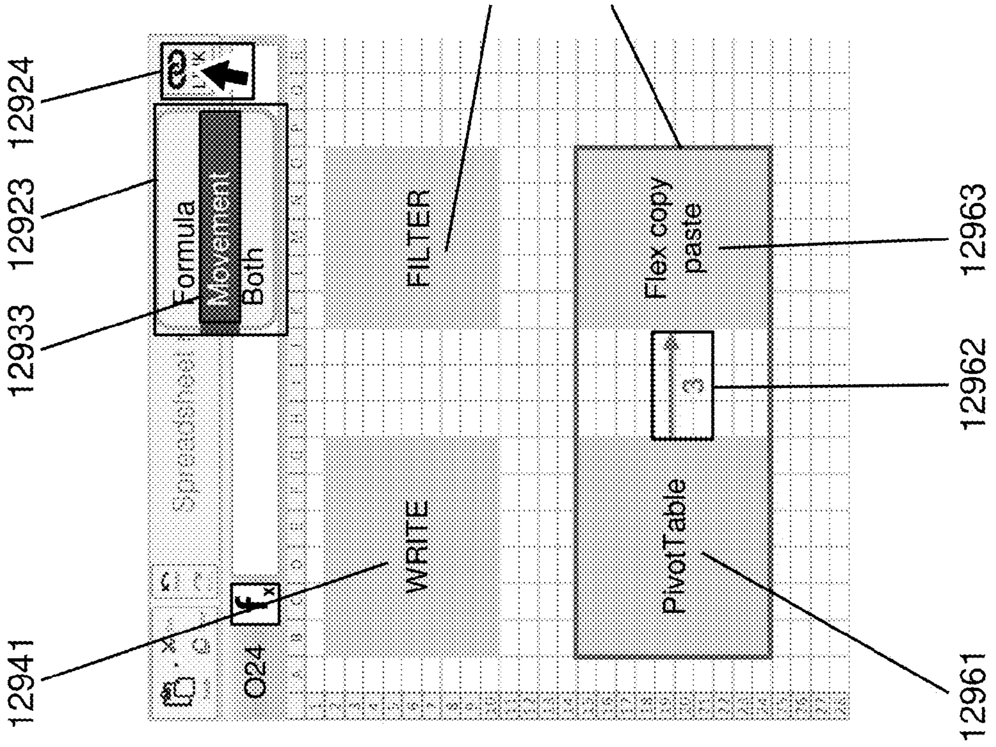
Figure 130B:
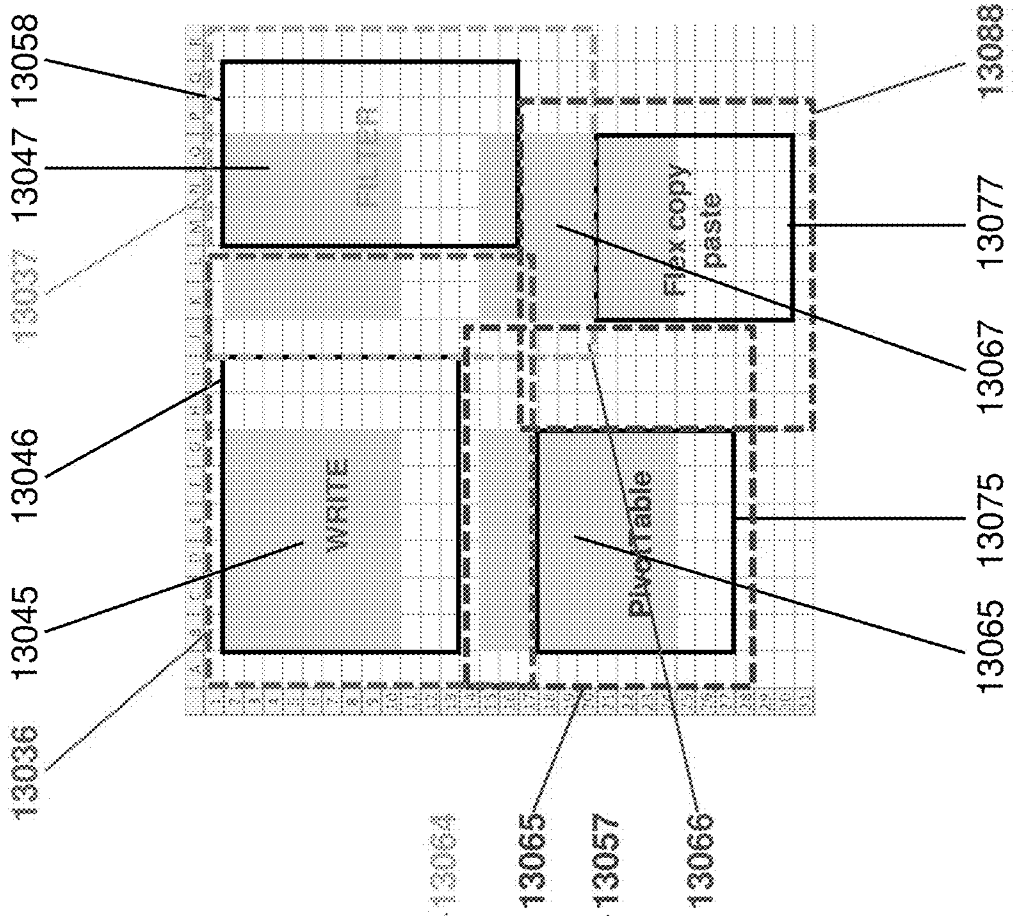
Figure 130A:
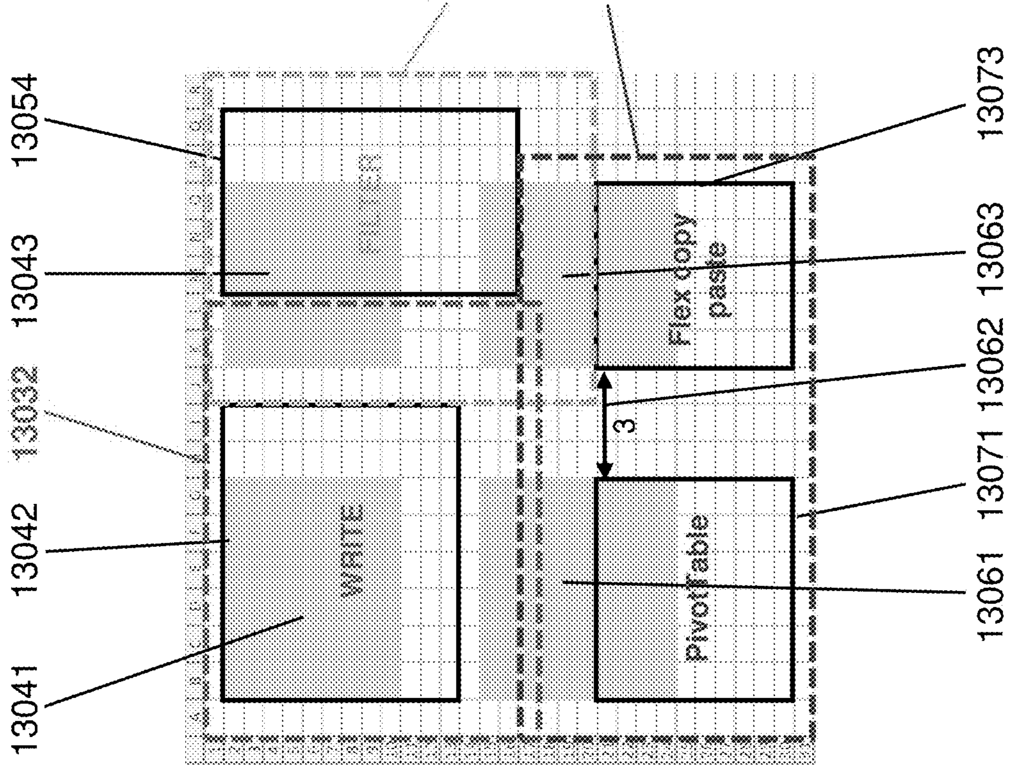

FIG. 130A and FIG. 130B examples the different outcomes in the successively grouped linkages versus a single set of linkages for the same function and capability flexes. FIG. 130A examples the successive linkages setup in FIG. 129A and FIG. 129B post a set of user induced flexes. In FIG. 130A because the post-flex black outlined 'PivotTable' 13071 (13061 pre flex) and black outlined post flex 'Flex copy paste' 13073 (13063 pre flex) are grouped together they move down in unison offset to the pink bumper 13064 which moves both the 'PivotTable' 13071 and 'Flex copy paste' 13073. They (the 'PivotTable' 13071 and 'Flex copy paste' 13073) maintain their pre-flex relative separation of '3' columns and zero rows 13062 offset between them and have single rec bumper 13057 showing they are grouped. This is outcome is different than the non-group altered linkages result shown in FIG. 130B. There, the black outlined post-flex 'PivotTable' 13075 (13065 pre-flex) is not aligned with the black outlined post-flex 'Flex copy paste' 13077 (13067 pre-flex). As the location of the 'PivotTable' 13075 is set by the green bumper 13036 and the red bumper 13065 while the position of the 'Flex copy paste' 13077 is set by the red bumper 13065, the pink bumper 13037, and the blue bumper 13088. Thus, the successive group linkages alter the automatically executed flex positional movements. They are consistent with the coordinated movements but alter them by making some of the application of the coordination apply to grouped combinations of linked/connect areas as a whole rather than by themselves.

Multiple Groups Movements

FIG. 139A through FIG. 139C examples the simultaneous application of movement linkages to four groups (which have no pre-existing across group linkages) at one time in our technology and then their flexing response in two different situations. Each group has multiple flexes and cells which have been movement linked/connected together in a group of linked cells and flexes such as those exampled in FIG. 100 through FIG. 128 if the range 10064 in FIG. 100 had been group linked/connected. To visually example the movement linkages of the four flexing groups being linked, we have exampled each of group more conceptually by gray shaded cells for the group of cells they first instantiate and then black outlines for what they later instantiate post flexing. As exampling four groups with the complexity of linkages/connections flexing like in FIG. 100 through FIG. 128 in a filing figure would be unreadable. Note, we have downsized the number of cells within each group relative to what was shown in FIG. 100 to make the cell separations easier to see as cell separations on much larger groups would be harder to see differences.

In the FIG. 139A embodiment of our technology the user sets up closest distance movement linkages across the four groups by highlighting the range 13937, clicking the "LINK' button 13924 and in the UI selector 13933 clicking 'Link movements' 13943. However, the grouping capability works with many of the other movement link/connect so it could have been an embodiment using other types of our movement link/connect technologies (e.g., bumper, direct, or ordered progression). Because the range 13937 contained four linkage/connection groups with many movement and formula links within those groups, the user has the option to unlink all the formulas ('Unlink formulas'), unlink all movements ('Unlink movements') or unlink all formulas and movements ('Unlink both'). The user also has the option to 'Link movements' 13943 across the groups. Because there is at least one unlinked/unconnected flex formula in the highlighted range 13937, e.g., across the groups or created within the groups post them being made a group, then the 'Link formulas' 13923 and 'Link both' 13952 options are enabled. FIG. 139A also illustratively examples a color-coded summarized version of the closest distance spatial relationships of each of the linked groups 13942, 13951, 13952, 13953, 13962, and 13972, where instead of showing all the cell-to-cell arrows for the purple 13942, green 13951, light blue 13972, and pink 13953 arrows only one is shown.

It is worth noting at this point that that our coordinated movement linkage/connection works very similarly for a group as was exampled for individual flex functions/capabilities and cells linked/connected. However, the big difference is the group is first doing its own coordinated movement(s) and then the across group coordinated movement linkages/connections further moves the appropriate groups as a whole. So, envision in a complicated situation with several simultaneous changes within multiple groups that first the flex impacts and movements are done within the groups (e.g., as exampled in FIG. 101 through FIG. 128) and then the coordinated movements occur between the groups (e.g., as partially exampled in FIG. 130A for the group of the PivotTable 13061 and the 'Flex copy paste' 13073). These examples (in FIG. 139A through FIG. 139C) simplify the within groups impacts to be shown by the gray shading (pre-flex) moving to the black outlined cells (post-flex). Then the movement of the black outlined cells is determined by the group to group coordinated movements.

Group movements can encounter the same set of problems that individual flexes encounter, namely that there are situations where it is impossible to maintain all the previously set spatial relationships. Therefore, embodiments of our group to group coordinated movement linkage/connection technology employ similar related spatial relationship approaches as those previously exampled for flex range to flex range(s) and/or cell(s). For example, our closest distance technology used in FIG. 139A through FIG. 139C.

FIG. 139B examples a flex situation where 'Group 1' 13916 flexes to become a larger range 13917 while the other groups are not changing the number of cells they instantiate. In this example it is impossible to retain all the fixed spatial relationships (row and column cell distances) to the other three groups as fulfilling red double-headed arrow 13938 makes it impossible to retain the fixed spatial relationships for the 13928/13937, 13947/13948, and 13929/13939. Instead, what was done in FIG. 139B by our linkage/connection technology was our closed distance coordinated spatial relationships (previously exampled in FIG. 85A through FIG. 128) ensuring a minimum of all the original spatial distances were ensured in the post flex coordinated relationships, in this situation between the groups. No linked groups (and therefore cells) are closer than they previously were, however, some are more distant because of the inability to exactly meet each previous spatial distance.

FIG. 139C examples a simultaneous flex of 'Group 1' 13966 and 'Group 2' 13969 expanding to larger ranges 13967 and 13979, respectively. This, like the previous example, makes it impossible to retain all the fixed spatial relationships (row and column cell distances) as fulfilling two (purple 13968, and pink 13989) relationships and the horizontal part ('3' columns) of red 13977 and red 13988 makes it impossible to retain the fixed spatial relationships for brown 13997/13998, blue 13987/13997, and the vertical ('4' rows) part of red 13977/13988. Instead, what was done in FIG. 139C by our closest distance linkage/connection technology for the groups was applying the) coordinated spatial relationship ensuring a minimum of the original spatial distances. No linked cells are closer than they previously were, however, some are more distant because of the inability to exactly meet each previous spatial distance. This is just one of the approaches supported by our technology which coordinates the movements of the linked/connected groups (and cells). Others of our previously described coordinated movement technologies also apply to the group flexes as we will example next.

Multiple Groups Movements—Bumpers

For example, what we have labelled the "bumper" approaches are applicable to groups. There are several variants and sub variants of how our 'bumper' coordinated movement technology works, we will example for groups one variant with two sub variants. Those sub variants are where the "bumpers" sizes stay as the originally set size or where the "bumpers" resize bumper widths after each flex. FIG. 140A through FIG. 140C example the post-flex difference between using the originally set "bumper" distances between groups versus using a resize after a previous flex set "bumper" distances. To keep the example simple the subsequent flex movements have only changed one group-to-group bumper dimension, the horizontal dimension between 'Group 3' (14051 pre-flex, 14061 post-flex) and 'Group 4' (14053 pre-flex, 14063 post-flex). It has gone from '3' cells 14052 originally for the gray shaded groups to '4' cells 14062 now as shown in FIG. 140A for the black outlined groups. FIG. 140B examples a set of simultaneous group flexes done with the original "bumper" distances while FIG. 140C examples the same set of simultaneous group flexes done with the most recent group-to-group "bumper" distances. The difference is the wider Group 3' 14075, and 'Group 4' 14078 bumpers red 14085 and blue 14087 in FIG. 140C versus the narrower bumpers red 14045 and blue 14047 respectively in FIG. 140B. These larger bumper empty cell boundaries result in the greater movement of the 'Group 2' range 14067 in FIG. 140C (versus 14017 in FIG. 140B) and the 'Group 4' range 14078 in FIG. 140C (versus 14037 in FIG. 140B). Thus, changing the outcomes of the bumper (boundary) coordinated group linked/connected movements.

Rather than repeating for groups more of our types of coordination linkage/connection technology type examples, we are going to move to the impact of successive grouping of groups on movement in our technology.

Multiple Successive Linkage Group Groupings

Our technology handles successive overlapping grouping of group linkages. FIG. 141A through FIG. 142B examples how successive group linkage setups can alter the automatic positional linked/connected movement upon flexing. In this example the user wants 'Group 3' and 'Group 4' to retain their spatial relationship no matter what happens above each of them. Therefore, in this embodiment exampled in FIG. 141A the user highlights the cells 14164 (within the green outline) including both 'Group 3' 14161 and 'Group 4' 14163 and clicks the "LINK' button 14124 and in the UI selector 14133 clicks 'Link movements' 14143 to setup the first group linkage/connection. Note, it could have required a Link group selection but in this embodiment linking previously unlinked groups results in linking them as a group. In this embodiment it will maintain the closest spatial relationship of '3' 14162 between the groups, however our technology supports other coordination variants (e.g., bumpers). The user then sets up the second group of linkages in FIG. 141B by highlighting the cell range 14157 (within the green outline), then clicking the "LINK' button 14139 and in the UI selector 14138 clicking 'Link movements' 14148. That range includes the previous multiple groups grouping 14168 ('Group 3' 14166 and 'Group 4' 14169). However, instead of treating the previous group linkage 14168 as its component groups our technology is going to treat it as one element relative to 'Group 1' 14146 and 'Group 2' 14149. Therefore, under all situations this embodiment will maintain the light blue '3' offset 14167 between 'Group 3' 14166 and 'Group 4' 14169 and it will deal with the 'Group 1' 14146 and 'Group 2' 14149 closest distances green 14156 and pink 14158 against the linked group 14168 outlined in purple.

Figure 142B:
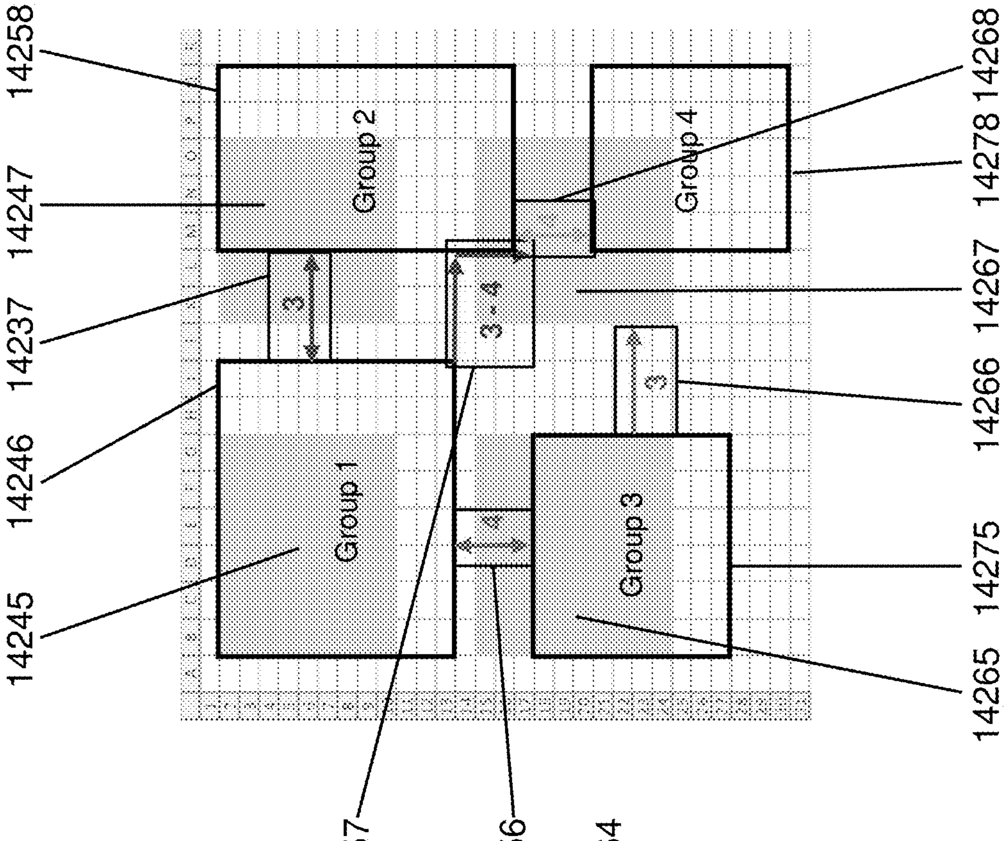
Figure 142A:
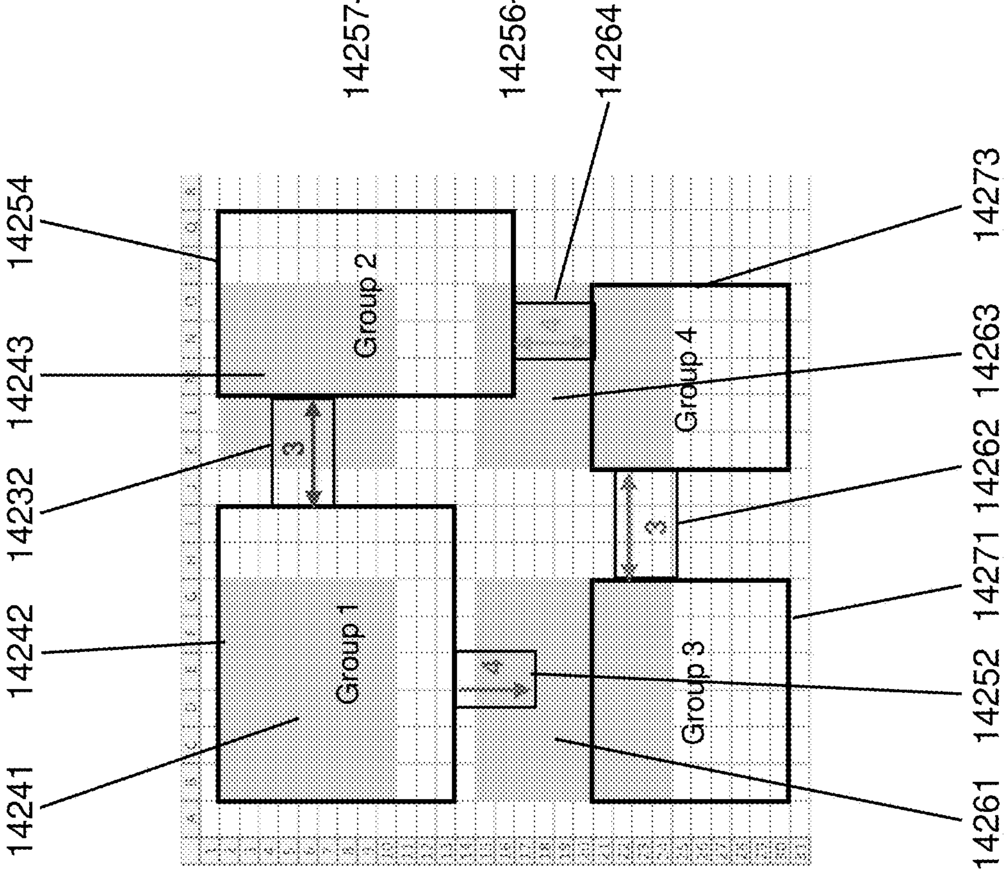

FIG. 142A and FIG. 142B examples the different outcomes in the successively grouped linkages versus a single set of group linkages for the same flexes. FIG. 142A examples the successive linkages setup in FIG. 141A and FIG. 141B after a set of user induced simultaneous flexes. Because the post-flex black outlined 'Group 3' 14271 (14261 pre flex) and post flex black outlined 'Group 4' 14273 (14263 pre flex) are grouped together they move down in unison offset to the pink '4' 14264 which supersedes the green '4' 14252 offset. Note, both of the '4' values there are '4' rows and '0' columns. They maintain the light blue '3' 14262 (3 columns 0 rows) offset between 'Group 3' 14271 and Group 4' 14273. This is very different than the single set of group linkages (meaning no grouping of groups) result shown in FIG. 142B. There, the black outlined post flex "Group 3' 14275 (14265 pre flex) is offset vertically by the green '4' 14256 while the black outlined post flex 'Group 4' 14278 (14267 pre flex) is offset horizontally and vertically by the pink '4' 14268. So, "Group 3' and 'Group 4' no longer align vertically, and their horizontal distance is also no longer the light blue '3' 14266 because that was superseded by the red horizontal '3' columns of the red '3-4' ('3' columns, '4' rows) 14257 and the alignment with the pink '4' 14268. Thus, the successive group linkages alter the automatically executed flex positional movements. While we have exampled two successive group groupings here our technology supports many more successive group groupings. And many mix and match combinations of linkages/connections within groups and across groups.

In the interest of conciseness, the combinations of features disclosed in this application are not repeated with each of the other features and in all the possible combinations. The reader will understand how features identified in this section can readily be combined with sets of other features. We will therefore move on to describing one of many example computer systems that can be used for our technology.

Computer System

FIG. 149 is a block diagram of an example computer system, according to one implementation. Computer system 14910 typically includes at least one processor 14914 which communicates with a number of peripheral devices via bus subsystem 14912. These peripheral devices may include a storage subsystem 14924 including, for example, memory devices and a file storage subsystem, user interface input devices 14938, user interface output devices 14920, and a network interface subsystem 14916. The input and output devices allow user interaction with computer system 14910. Network interface subsystem 14916 provides an interface to outside networks, including an interface to communication network 14985, and is coupled via communication network 14985 to corresponding interface devices in other computer systems or in the cloud and usable for cloud applications.

User interface input devices 14938 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 14910 or onto communication network 14985.

User interface output devices 14920 may include a display subsystem, a printer, or non-visual displays such as audio output devices. The display subsystem may include a touch screen, a flat-panel device such as a liquid crystal display (LCD), a projection device, a cathode ray tube (CRT), or some other mechanism for creating a visible image. The display subsystem may also provide a non-visual display such as via audio output devices. In general, use of the term "output device" is intended to include all possible types of devices and ways to output information from computer system 14910 to the user or to another machine or computer system.

Storage subsystem 14924 stores programming and data constructs that provide the functionality of some or all of the modules and methods described herein. These software modules are generally executed by processor 14914 alone or in combination with other processors.

Memory 14926 used in the storage subsystem can include a number of memories including a main random-access memory (RAM) 14930 for storage of instructions and data during program execution and a read only memory (ROM) 14932 in which fixed instructions are stored. A file storage subsystem 14928 can provide persistent storage for program and data files, and may include a hard disk drive, SSD, a tape drive, an optical drive, or removable media cartridges. The modules implementing the functionality of certain implementations may be stored by file storage subsystem 14928 in the storage subsystem 14924, or in other machines accessible by the processor.

Bus subsystem 14912 provides a mechanism for letting the various components and subsystems of computer system 14910 communicate with each other as intended. Although bus subsystem 14912 is shown schematically as a single bus, alternative implementations of the bus subsystem may use multiple busses.

Computer system 14910 can be of varying types including a workstation, server, computing cluster, blade server, server farm, or any other data processing system or computing device. Due to the ever-changing nature of computers and networks, the description of computer system 14910 depicted in FIG. 149 is intended only as one example. Many other configurations of computer system 14910 are possible having more or fewer components than the computer system depicted in FIG. 149.

Some Particular Implementations

Some particular implementations and features are described in the following discussion.

Formula Link Implementations

One implementation is a method for automatically adjusting the formula of a spreadsheet cell range or array prebuilt function based on its connection to range flexing functions and/or capabilities. Therefore, when users change input parameters into flexing functions, such as WRITE_V or FILTER, or flexing capabilities, such as PivotTable or flex copy paste, our new technology automatically adjusts the formula for any cell range flex (change) of the formulaically linked/connected instantiated cells. That flex function or flex capability change in the number of cell they instantiate (populate) can be induced by a change in the underlying data used within the flexing function or flexing capability and/or by a change in a parameter input into the flexing function or flexing capability. So, with that change in the flex the prebuilt range or array formula is automatically updated for the change in the number of cells instantiated by the flex capability as exampled in FIG. 14C and FIG. 14D with our linkage/connection technology in contrast to FIG. 14A and FIG. 14B without our linkage/connection technology. FIG. 14C and FIG. 14D exampled our linkage/connection technology working for a spreadsheet capability flex (‘flex copy paste’) while FIG. 18A and FIG. 18B examples our formula linkage/connection technology for a function flex (‘WRITE_H’). FIG. 20A and FIG. 20B examples our formula linkage/connection technology working for a two-dimensional flex. FIG. 30A and FIG. 30B examples our formula linkage/connection technology successfully working for a cell formula with two or more formula linkages/connections to flex functions. While FIG. 31A and FIG. 31B examples our formula linkage/connection technology successfully working for a cell formula with two or more formula linkages/connections to flex capabilities. And our technology supports formula linkages/connections within the same cell formula to both flexing functions and flexing capabilities. Our formulaic linkage/connection technology works for many different spreadsheet prebuilt range or array functions, e.g., functions exampled in FIG. 144, linked/connected to a flexing range created by a spreadsheet flexing function or flexing capability. The prebuilt range or array function can be connected/linked to the all or part (e.g., a segment) of a flexing range without needing to add additional functions (e.g., OFFSET or COUNT) as arguments to the range or array prebuilt functions (e.g., SUM, MAX, MIN, and STDEV).

This method and other embodiments or implementations of the technology disclosed can include one or more of the following features and/or features described in connection with additional methods disclosed. For example, this technology can be combined with all of the different movement linkage/connection technologies described herein. In the interest of conciseness, the combinations of features disclosed in this application are not individually enumerated in the preferred embodiments and are not repeated with each of the other features. The reader will understand how features identified in the following preferred embodiments can readily be combined with sets of other features in preferred embodiments.

Formula Link Implementations—Range or Array Functional Formulas

Many embodiments of our technology do not alter the range or array function formula. In those embodiments the visible arguments (parameters) of a linked/connected formula and an unlinked/connected formula are the same. Other mechanisms, such as formula bar buttons (controls) and formula bar/cell outlining (e.g., color or line type), differentiate the linked/connected formula from one that is unlinked/connected as exampled in FIG. 14C and FIG. 14D (versus FIG. 14A and FIG. 14B) or FIG. 16C and FIG. 16D (versus FIG. 16A and FIG. 16B) as well as numerous other figures throughout the filing.

Embodiments of our technology do not generate incorrect flex range changes in the formulas because of blank or null values being within the populated cells in the flex ranges (cells returned by the flex functions or capabilities) as exampled in FIG. 14D, FIG. 18B, FIG. 20B and FIG. 28B. Embodiments of our technology also do not generate incorrect flex range because of cells containing values proximate to the flex range or ranges as exampled in FIG. 33A and FIG. 33B.

Formula Link Implementations—Range or Array Functions

Our formula linkage/connection technology works for a broad number of ‘statistical’ range or array prebuilt spreadsheet functions as exampled in the list in FIG. 144 and exampled in use for the ‘MAX’ function in FIG. 20A through FIG. 20D. Our technology also supports multiple different ‘math and trigonometry’ range or array prebuilt spreadsheet functions as exampled in the list in FIG. 144 and exampled in use for the ‘SUM’ function in FIG. 14C and FIG. 14D.

Formula Link Implementations—Types of Flexes

Each of our embodiments works where the flexing range(s) is produced by one or more multi-cell populating functions, such as our WRITE_V and WRITE_CALC_2D or a typical spreadsheet FILTER function. Note, the WRITE_V and WRITE_CALC_2D are part of what we now describe as the WRITE family of functions which are the new prebuilt functions which are described in our filings U.S. application Ser. No. 16/191,402, titled "Methods and Systems for Connecting A Spreadsheet to External Data Sources with Ordered Formulaic Specification of Data Retrieved," filed 14 Nov. 2018, now U.S. Pat. No. 11,036,929, issued 15 Jun. 2021, U.S. application Ser. No. 17/374,901, titled "Method and System for Improved Ordering of Output from Spreadsheet Analytical Functions," filed 13 Jul. 2021, and U.S. application Ser. No. 17/903,934, titled "Method and System for Improved 2d Ordering of Output from Spreadsheet Analytical Functions," filed 6 Sep. 2022. And note, the FILTER function is a typical spreadsheet FILTER function as exampled in Excel in FIG. 2A through FIG. 3B. FIG. 18A and FIG. 18B examples our formula linkage/connect technology working with a 'WRITE_H' function flex while FIG. 20A through FIG. 20D examples it working for a segment (the body of results not including the row and column headings and row of blank cells below the horizontal headings) of a 'WRITE_CALC_2D' (two-dimensional populating) function flex. FIG. 29A and FIG. 29B example our formula linkage/connection working with a FILTER function. Our technology works with all the flex capable spreadsheet functions (e.g., Lookup and reference functions such as CHOOSECOLS, CHOOSEROWS, TAKE, and UNIQUE).

Each of our embodiments works where the flexing range(s) is produced by one or more spreadsheet flexing capabilities, such as a PivotTable or one of our 'flex copy paste' capabilities. Note where our "Flex copy paste" capability is described in our filing U.S. application Ser. No. 16/191,402, titled "Methods and Systems for Connecting A Spreadsheet to External Data Sources with Ordered Formulaic Specification of Data Retrieved," filed 14 Nov. 2018, now U.S. Pat. No. 11,036,929, issued 15 Jun. 2021. FIG. 14C and FIG. 14D examples our formula linkage/connection technology working with a one-dimensional 'flex copy paste' capability while FIG. 21A and FIG. 21B examples it working with a two-dimensional 'flex copy paste' capability. Each of our applicable embodiments works where the flexing range(s) is from a PivotTable as exampled in FIG. 28A and FIG. 28B. Our technology works with all the flex-capable 'capabilities' (e.g., Table) and any mix and match combination of them and flex capable 'functions' for one or multiple formula linkages/connections.

As previously exampled our formula linkage/connection technology works for both one and two-dimensional flex linkages/connections as exampled in FIG. 14C and FIG. 14D and FIG. 18A and FIG. 18B for one-dimensional flex linkages/connections and in FIG. 20A through FIG. 20D for two-dimensional linkages/connections. Embodiments of our technology support cell formulas including both one and two-dimensional linkages/connections, where for example part of the formula flexes one-dimensionally and another part flexes two-dimensionally. Our technology supports all the different mix and match combinations of flexing functions, capabilities, one-dimensional and/or two-dimensional.

Formula Link Implementations—Types of Connections

Each of our embodiments supports many different types of linkage connections. One is where the linkage connection is to the entire flexing range as exampled in FIG. 14C and FIG. 14D for one-dimensional flex linkages/connections and in FIG. 21A and FIG. 21B for two-dimensional linkages/connection.

Another linkage/connection is to a segment of the flexing range which could be a single cell within a bigger range or an entire row or column in a larger two-dimensional range.

FIG. 20A and FIG. 20B example a formulaic linkage/connection of the formula (2014 in FIG. 20A and 2018 in FIG. 20B) to one segment (the WRITE body—2044 in FIG. 20A and 2048 in FIG. 20B) of a 'WRITE_CALC_2D' function. FIG. 28A and FIG. 28B example a formulaic linkage/connection of the formula (2814 in FIG. 28A and 2818 in FIG. 28B) to one segment (2854 in FIG. 28A and 2878 in FIG. 28B) of a 'PivotTable' capability. Note, a segment supported by our technology can be any part of the flexing area of flex capability or function. Frequently it would be the results section of PivotTable or WRITE family of functions results output excluding any headings and purposely empty rows or columns. However, as exampled in FIG. 26A/B and FIG. 29A/B it can be one specified row or column of the flexing results. Our technology supports cell or segment linkages to any mix and match applicable flex capabilities and functions and their segments (down to a single cell).

Our technology supports multiple connections and multiple types of connections within a single formula as exampled in FIG. 47B where the multiple 'SUM' formula contains a segment of a 'WRITE' 4757 and the entire range of a 'flex copy paste' 4777. Our technology supports mix and match combinations of types of linkage connections within a single formula.

Formula Link Implementations—Manual Linkage

Our linkage/connection technology supports several ways for the user to manually setup the linkages/connections using a control or controls separate from the arguments (parameter list) in the range or array function as exampled in FIG. 34A through FIG. 35C and FIG. 37A through FIG. 37C. It supports ribbon, menu, and other modes (controls) of initiating the setting of the types of linkages/connections (i.e., formula, movement, or both). A single cell formula may contain multiple formulaic linkages/connections at once as exampled in FIG. 47A and FIG. 47B for the formula 4717. And as would have been exampled in FIG. 85A had the user selected 'Formula' 8512 or 'Both' 8532.

Our technology implementations also support the manual connection/linkage being made for a group as exampled in in FIG. 129A, or FIG. 129B had the user selected 'Formula' or 'Both' in the popups 12923 or 12928, respectively. It would have set up the formulaic linkages/connections within and across the flex functions in the group at once. Our technology also supports linking/connecting formulas in and across groups as examples by the 'Link formulas' option 13923 and 'Link both' option 13952 in FIG. 139A.

Formula Link Implementations—Automatic Linkage

Our technology also supports many different implementations of automatic linkage/connection to flexing ranges, as exampled in FIG. 41A through FIG. 45D. It supports the automatic linkage/connection setup of different types of formulaic linkages/connections to one or more flex ranges. Those automatic formula linkages/connections work with visible and invisible linkage/connection arguments within the range or array function. They work with the linkage/connection being visible in a separate control (e.g., button) and/or with other indications (e.g., different color outlines of the cell or formula bar formula).

In a related implementation, FIG. 47A and FIG. 47B examples the automatic connection to multiple flexes at one time. While these examples are connections/linkages to two flex ranges, our technology implementations support automatic setup of connections/linkages to many more flex ranges (areas).

While our automatic connections can be reverted by several manual processes involving ribbon buttons, menus and/or popups, our technology supports a new variant of 'UNDO' for removing automatically made linkages/connections, as exampled in FIG. 49A through FIG. 50B. In this variant of 'UNDO' the first 'UNDO' action (e.g., click, shortcut or menu selection) does not revert the cell action that led to the automatic linkage/connection, but instead retains the cell action (e.g., completing a formula or text in the cell) and removes the automatic linkage/connection. Then in this embodiment if the user does a second 'UNDO' action they get the typical 'UNDO' response of undoing the completion of the formula or text entered in the cell.

Formula Link Implementations—Visible and Invisible Arguments

Implementations of our technology support either visible or invisible linkage/connection arguments (parameters) in the range or array formula. Our implementations support different variants of the visible linkage/connection where the text argument is visible in the regular cell formula, as exampled in FIGS. 36A and 42C, or in a switchable regular formula and separate link/connect formula argument, as exampled in FIG. 36B and FIG. 36C, FIG. 37B and FIG. 37C, and in FIG. 45C and FIG. 45D. In this variant the regular range or array formula is unchanged from an unlinked/connected comparable formula. Our technology supports other variants of the visible arguments displaying the argument as text directly in the regular cell formula or alternative cell formulas, including the second formula disclosed in our filing U.S. Application No. 63/337,576, titled "Methods and Systems for Spreadsheet Function and Flex Copy-Paste Control of Formatting and Use of Selection List Panels," filed 2 May 2022. These alternative cell formulas support all the different implementations including the manual and automatically instantiated linkages/connections.

Our formula link/connect technology also supports other modes than the formula to indicate the formula is connected/linked something we often describe as an invisible argument. These linkage/connection indicators are visible in the selection list panel or some other visual (e.g., button control, color-coding of the formula bar, cell highlight or other identifier) but not reproduced as text in an argument or arguments of the cell formula as exampled in FIG. 35A where the link/connect status of 'Formula' 3522 is visible in the selection list panel 3523 but is not visible in the formula 3515. Where linkage/connection is visible in the formula bar control 3512 used to access the status list/selection list panel 3523. Where the 'LINK' button 3512 and the selection list panel 3523 can all be thought of as part of the linkage/connection control. The setup of these invisible links/connects are also as exampled for manual setup in FIG. 34A through FIG. 34C and for automatic setup in FIG. 41A through FIG. 41C.

These visible and invisible linkage/connection arguments support all the different implementations including the manual and automatically instantiated linkages/connections, the grouping, grouping of groups, and the other applicable features discussed herein.

Formula Link Implementations—Other Implementations

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

Flex Movement Link Implementations

Figure 15A:
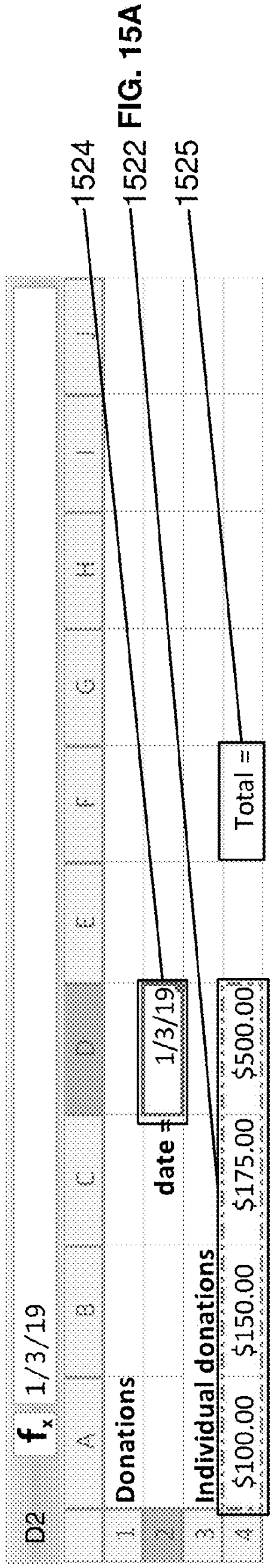
Figure 15B:
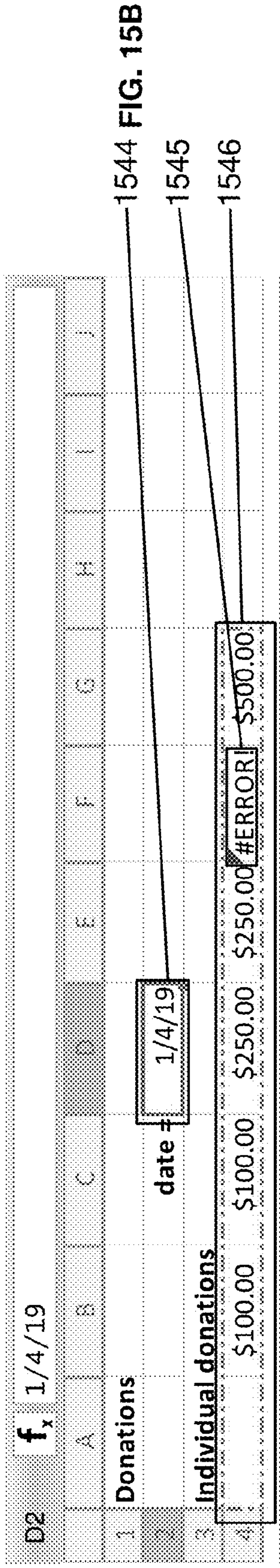
Figure 15C:
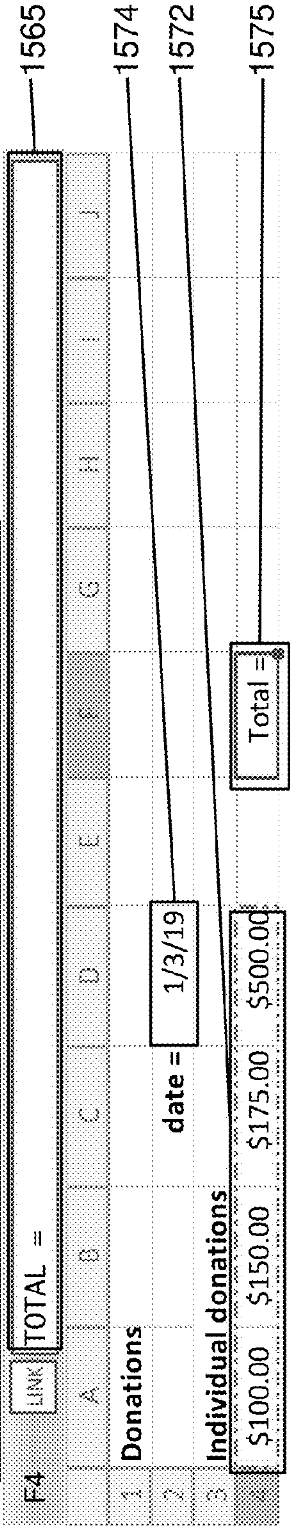
Figure 15D:
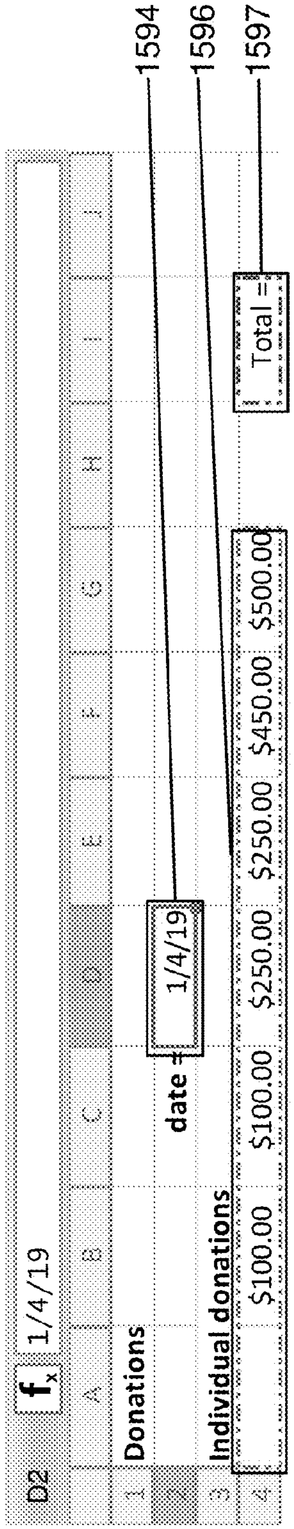

Another implementation is a method for automatically adjusting the location of a relocatable cell or a range of cells based on its connection to range flexing function(s) and/or range flexing capabilities. Therefore, when users change parameter inputs into functions, such as WRITE_V or FILTER, or capabilities, such as PivotTable or flex copy paste, our new technology automatically adjusts the cell location for any cell range flex (change) of the instantiated cells. Data changes flexing the function or capability range also automatically adjusts the cell location for any cell range flex (change) of the instantiated cells in our new technology. So, the cell or cells location(s) are automatically updated as exampled in FIG. 15C and FIG. 15D with our movement linkage/connection technology in contrast to FIG. 15A and FIG. 15B without our movement linkage/connection technology. FIG. 15C and FIG. 15D exampled our movement linkage/connection technology working for a spreadsheet capability flex ('flex copy paste') while FIG. 18C and FIG. 18D examples our movement linkage/connection technology working with a function flex ('WRITE_H'). FIG. 20C 2093 and FIG. 20D 2098 examples our movement linkage/connection technology working for a two-dimensional flex. The linkage/connection or linkages/connections are cell spatial positions where the automatic spatial position(s) adjustments are coordinated for the flex change to retain the same relative row and column spatial position to the closest cell in the flex range pre and post sort.

These methods and other embodiments or implementations of the technology disclosed can include one or more of the following features and/or features described in connection with additional methods disclosed. In the interest of conciseness, the combinations of features disclosed in this application are not individually enumerated and are not necessarily repeated with each of the other features. The reader will understand how features identified in this section and other sections can readily be combined with sets of other features for the different embodiments.

Flex Movement Link Implementations—Coordination Situations

Our technologies supports the coordination of movement linkages/connections in many different situations. One embodiment maintains the relative spatial relationship between the cell or cells linked/connected to the flex range when that flex range shrinks as exampled in FIG. 23A flexing to give FIG. 23B, FIG. 15D flexing to give FIG. 15C, or FIG. 18D flexing to give FIG. 18C. They then maintain the relative row and column spatial relationships between the cell or cells linked/connected to the flex range when that flex range expands as exampled in FIG. 20C flexing to give FIG. 20D, FIG. 15C flexing to give FIG. 15D, or FIG. 18C flexing to give FIG. 18D.

Embodiments of our technology maintains the relative spatial relationship between the cell or cells linked/connected to the flex range when that flex range expands or shrinks where at no point before or after the flexing is the cell or cells within the flex range. The situations exampled as in FIG. 24A, FIG. 24C, and FIG. 24D, as exampled in FIG. 38A through FIG. 38D, and as exampled in FIG. 46A through FIG. 46D are where the linked/connected cell would never be in the flex path of the flex function or capability to which they are connected, yet they are still moved by their flex changes.

Embodiments of our technology maintains the relative spatial relationship between the cell or cells linked/connected to the flex range when that cell or cells are themselves a flex range as exampled in FIG. 131A and FIG. 131B. Where the relative spatial relationship can be for multiple cells closest to each other in the two flex ranges and the number of closest cells can change with the flexes.

Our technologies supports many different types of movement linkages/connections with different variants of the spatial relationships retained after the movement. This embodiment delivers in almost all situations the same row and column offset (relative spatial relationship) to the nearest cell in flex range. An exception is the embodiment where changes are not made when the flex shrinks as exampled in FIG. 24A, FIG. 24B and FIG. 24D where during flex shrinkage the relative spatial relationships are not maintained (FIG. 24B) while during expansion (FIG. 24D) they are. This capability we labelled "one-way" ensures no overlap of cells, coordinated spatial relationships for flex expansions and unchanged positions for flex contractions. Other exceptions include situations where other flexes make it impossible to retain the relative spatial relationship wherein this embodiment gives way to other embodiments that handle those situations. Note, in two-dimensional flex range situations a change can be both an expansion and contraction if for example the number of rows instantiated increases, but the number of columns decreases. Thus, if a one-way embodiment is employed there the row and column changes will be handled differently.

Many embodiments of our technology support automatically coordinated movement adjustments done for flex expansions and contractions (shrinkages) as exampled in combination of FIG. 23A, FIG. 23C and FIG. 23D. This capability we labelled "two-way" ensures no overlap of cells and coordination of spatial positioning retaining prior relationships where possible.

Flex Movement Link Implementations—Types of Flexes

Each of our movement link/connect embodiments works where the flexing range(s) is produced by one or more multi-cell populating functions, such as a WRITE_H, WRITE_CALC_2D or FILTER. FIG. 18C and FIG. 18D, and FIG. 24A through FIG. 24D examples this for different "WRITE' function flexes. FIG. 29A 2964 and FIG. 29B 2978 examples our movement linkage/connection technology working with a flex from a FILTER function. Our technology works with all the other flex capable spreadsheet functions (e.g., Lookup and reference functions such as CHOOSECOLS, CHOOSEROWS, FILTER, TAKE, and UNIQUE as well as our complete family of WRITE functions, as described herein).

Each of our embodiments works where the flexing range(s) is produced by one or more spreadsheet flexing capabilities, such as a PivotTable or one of our 'flex copy paste' capabilities. FIG. 15C and FIG. 15D examples our movement linkage/connection technology working with a one-dimensional 'flex copy paste' capability while FIG. 23A and FIG. 23B example it working with a two-dimensional 'flex copy paste' capability. Each of our applicable embodiments works where the flexing range(s) is a PivotTable as exampled in FIG. 26A and FIG. 26B. Our technology works with all the flex-capable 'capabilities' and any mix and match combination of them and flex capable 'functions' for one or multiple movement linkages/connections.

As previously exampled our formula linkage/connection technology works for both one and two-dimensional flex linkages/connections as exampled in FIG. 15C/FIG. 15D, and FIG. 18C/FIG. 18D for one-dimensional flex linkages/connections and in FIG. 22C 2293/FIG. 22D 2297 and FIG. 23A 2353/FIG. 23B 2357 for two-dimensional linkages/connections. Our technology supports all the different mix and match combinations of flexing functions, capabilities, one-dimensional and/or two-dimensional.

Single Flex Movement Link Implementations—Manual Linkage

Our linkage/connection technology supports several ways for the user to manually setup the linkages/connections with one such approach exampled in FIG. 38A through FIG. 38D. It supports ribbon, menu, and other modes of initiating the setting of the types of linkages/connections (i.e., formula, movement, or both). Our technology supports the user inputting a linkage/connection-specific argument (parameter) into the regular cell formula or setting up a linkage/connection specific formula (not included in the regular formula) that therefore does not alter the regular cell formula.

Single Flex Movement Link Implementations—Automatic Linkage

Our technology also supports many different implementations of automatic movement linkage/connection set up to flexing ranges, as exampled in FIG. 44A through FIG. 44D, and FIG. 46A through FIG. 46D. Those automatic movement linkages/connections work with visible and invisible linkage/connection arguments, direct and indirect connections and flex function and flex capabilities. Note, invisible linkage/connection arguments is saying that the linked/connected formula and a non-linkage/non-connected formula looks the same there is no visible difference. Most of those invisible embodiments indicate the presence of the link/connection in some other way (e.g., a visible control or differentiated cell and formula bar outlining).

While our automatic connections can be reverted by several manual processes involving ribbon buttons, menus and/or popups, our technology supports a new variant of 'UNDO' for removing automatically made linkages/connections, as exampled in FIG. 49A through FIG. 50B. In this variant of 'UNDO' the first 'UNDO' action (e.g., click, shortcut or menu selection) does not revert the cell action that led to the automatic linkage/connection, but instead retains the cell action (e.g., completing a formula or text in the cell) and removes the automatic linkage/connection. Then in this embodiment if the user does a second 'UNDO' action they get the typical 'UNDO' response of undoing the completion of the formula or text entered in the cell.

Single Flex Movement Link Implementations—Visible and Invisible Arguments

Implementations of our technology support either visible or invisible movement linkage/connection arguments. Our implementations support different variants of the visible linkage/connection where the text argument is visible in the regular cell formula, as exampled in FIG. 44B, or in a switchable regular formula or link/connect formula, as exampled in FIG. 44C and FIG. 44D. Our technology supports other variants of the visible arguments displaying the argument as text directly in the regular cell formula or alternative cell formulas, including the second formula disclosed in our filing U.S. Application No. 63/337,576, titled "Methods and Systems for Spreadsheet Function and Flex Copy-Paste Control of Formatting and Use of Selection List Panels," filed 2 May 2022. These alternative cell formulas support all the different implementations including the manual and automatically instantiated linkages/connections.

Our movement link/connect technology also supports invisible linkage/connection arguments which are visible in the selection list panel or some other visual (e.g., button, color-coding or other identifier) but not reproduced as text in an argument or arguments of the cell formula as exampled in FIG. 35B where the link/connect status of "Movement' 3552 is visible in the selection list panel 3553 but is not visible in the formula 3545. These invisible links/connects can also be automatically set in our technology as exampled in FIG. 46A through FIG. 46D.

Flex Movement Link Implementations—Other Implementations

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

Multi-Flex Movement Link Implementations

Another implementation is a method for automatically adjusting the location of a cell or cells (possibly a range of cells or flex range) based on its connection to two or more range flexing function(s) and/or range flexing capabilities. Therefore, when users change inputs into functions, such as WRITE_V or FILTER, or capabilities, such as PivotTable or flex copy paste, our new technology automatically adjusts the cell location for any cell range flex (change) that instantiates a different set of cells. So, the relocatable linked cell or cells location(s) are automatically updated as exampled in FIG. 53A and FIG. 53B with our movement linkage/connection technology retaining the cell's relative spatial relationship (row and column) to each of the flex ranges (5345/5359 and 5385/5389) while also retaining the relative row and column spatial relationship between the two flex ranges (5372/5376).

These methods and other embodiments or implementations of the technology disclosed can include one or more of the following features and/or features described in connection with additional methods disclosed. In the interest of conciseness, the combinations of features disclosed in this application are not individually enumerated and are not necessarily repeated with each of the other features. The reader will understand how features identified in this section and other sections can readily be combined with sets of other features for the different embodiments.

Multi-Flex Movement Link Implementations—Coordination Situations

Our technologies supports the coordination of movement linkages/connections in many different situations. One embodiment maintains the relative spatial relationship between the cell or cells linked/connected to the flex ranges when at least one of the flex ranges shrinks as exampled in FIG. 53B flexing to give FIG. 53A. The relocatable areas then maintain the relative spatial relationships between the linked/connected to the flex areas when at least one of the flex ranges expands as exampled in FIG. 53A flexing to give FIG. 53B.

Embodiments of our technology maintains the relative spatial relationship between the cell or cells linked/connected to the flex ranges when at least one of those flex ranges expands or shrinks where at no point before or after the flexing is the cell or cells within the flex range. The cell or cells are nearby but not within any of the flex ranges as exampled in FIG. 145A, and FIG. 145B.

Our technologies supports many different types of movement linkages/connections with different variants of the spatial relationships retained after the movement. This embodiment delivers in almost all situations the same row and column offset (relative spatial relationship) to the nearest cell in flex range. An exception is the embodiment where changes are not made when the flex shrinks as exampled in FIG. 24A, FIG. 24B and FIG. 24D where during flex shrinkage the relative spatial relationships are not maintained (FIG. 24B) while during expansion (FIG. 24D) they are. This is also exampled in FIG. 84B where all the areas are flex ranges and there are more than three of them. This capability we labelled "one-way" ensures no overlap of cells, coordinated spatial relationships for flex expansions and unchanged positions for flex contractions. Other exceptions include situations where other flexes make it impossible to retain the relative spatial relationship wherein this embodiment gives way to other embodiments that handle those situations.

Many embodiments of our technology support automatically coordinated movement adjustments done for flex expansions and contractions (shrinkages) as exampled in flex situations of FIG. 53A flex expanding to FIG. 53B and FIG. 53B flex contracting (shrinking) to FIG. 53A. This capability we labelled "two-way" ensures no overlap of cells and coordination of spatial positioning retaining prior relationships where possible.

Multi-Flex Movement Link Implementations—Types of Flexes

Each of our movement link/connect embodiments works where the flexing range(s) is produced by one or more multi-cell populating functions, such as a WRITE_H, WRITE_CALC_2D or FILTER. FIG. 53A through FIG. 54B and FIG. 145A and FIG. 145B examples this for different "WRITE' function flexes. FIG. 29A 2964 and FIG. 29B 2978 previously exampled our movement linkage/connection technology working with a flex from a FILTER function which is similarly applicable in these embodiments. Our technology works with all the other flex capable spreadsheet functions (e.g., Lookup and reference functions such as CHOOSECOLS, CHOOSEROWS, FILTER, TAKE, and UNIQUE as well as all of our family of WRITE functions, as described herein).

Each of our embodiments works where the flexing range(s) is produced by one or more spreadsheet flexing capabilities, such as a PivotTable or one of our 'flex copy paste' capabilities. FIG. 15C and FIG. 15D examples our movement linkage/connection technology working with a one-dimensional 'flex copy paste' capability while FIG. 23A and FIG. 23B example it working with a two-dimensional 'flex copy paste' capability. Each of our applicable embodiments works where the flexing range(s) is PivotTable as exampled in FIG. 26A and FIG. 26B. Our technology works with all the other flex-capable 'capabilities' and any mix and match combination of them and flex capable 'functions' for one or multiple movement linkages/connections.

As previously exampled our formula linkage/connection technology works for both one and two-dimensional flex linkages/connections as exampled in FIG. 15C/FIG. 15D, and FIG. 18C/FIG. 18D for one-dimensional flex linkages/connections and in FIG. 22C/FIG. 22D and FIG. 23A/FIG. 23B for two-dimensional linkages/connections. Our technology supports all the different mix and match combinations of flexing functions, capabilities, one-dimensional and/or two-dimensional.

Multi-Flex Movement Link Implementations—Manual Linkage

Our linkage/connection technology supports several ways for the user to manually setup the linkages/connections with one such approach as previously exampled in FIG. 38A through FIG. 38D. Our technology supports ribbon, menu, and other modes of manually initiating the setting of the types of linkages/connections (i.e., formula, movement, or both).

Our technology also supports the manual setting of multiple linkages/connections at one time as exampled in FIG. 76A and FIG. 76B. It supports that for all our different types of linkages/connections (e.g., 'Formula', 'Movement' and 'Both').

Multi-Flex Movement Link Implementations—Automatic Linkage

Our technology also supports many different implementations of automatic movement linkage/connection set up to flexing ranges, as previously exampled in FIG. 44A through FIG. 44D, and FIG. 46A through FIG. 46D. Those automatic movement linkages/connections work with visible and invisible linkage/connection arguments, direct and indirect connections and flex function and flex capabilities.

While our automatic connections can be reverted by several manual processes involving ribbon buttons, menus and/or popups, our technology supports a new variant of 'UNDO' for removing automatically made linkages/connections, as exampled in FIG. 49A through FIG. 50B. In this variant of 'UNDO' the first 'UNDO' action (e.g., click, shortcut or menu selection) does not revert the cell action that led to the automatic linkage/connection, but instead retains the cell action (e.g., completing a formula or text in the cell) and removes the automatic linkage/connection. Then in this embodiment if the user does a second 'UNDO' action they get the typical 'UNDO' response of undoing the completion of the formula or text entered in the cell.

Multi-Flex Movement Link Implementations—Visible and Invisible Arguments

Implementations of our multiple flex technology support either visible or invisible movement linkage/connection arguments. Our implementations support different variants of the visible linkage/connection where the text argument is visible in the regular cell formula, as previously exampled in FIG. 44B, or in a switchable regular formula or link/connect formula, as exampled in FIG. 44C and FIG. 44D. Our technology supports other variants of the visible arguments displaying the argument as text directly in the regular cell formula or alternative cell formulas, including the second formula disclosed in our filing U.S. Application No. 63/337,576, titled "Methods and Systems for Spreadsheet Function and Flex Copy-Paste Control of Formatting and Use of Selection List Panels," filed 2 May 2022. These alternative cell formulas support all the different implementations including the manual and automatically instantiated linkages/connections.

Our multiple flex movement link/connect technology also supports invisible linkage/connection arguments which are visible in the selection list panel or some other visual (e.g., button control, color-coding of the cell or formula bar formula or other identifier) but not reproduced as text in an argument or arguments of the cell formula as exampled in FIG. 35B where the link/connect status of "Movement' 3552 is visible in the selection list panel 3553 but is not visible in the formula 3545. These invisible links/connects can also be automatically set in our technology as exampled in FIG. 46A through FIG. 46D.

Multi-Flex Movement Link Implementations—Other Implementations

Other implementations of our multiple flex technologies may include a non-transitory computer readable storage medium storing instructions executable by a processor to perform any of the methods described above. Yet another implementation may include a system including memory and one or more processors operable to execute instructions, stored in the memory, to perform any of the methods described above.

Alignment Movement Link Implementations

Another implementation ensures the vertical and/or horizontal alignment of user specified relocatable cells and/or flex ranges. It is a method for automatically adjusting the location of multiple relocatable cell or flex range areas retaining their relative column alignments for vertically linked/connected areas in a spreadsheet and/or their relative row alignments for horizontally linked/connected areas post at least one area flex expansion or contraction. Where the pre-flex vertically linked relative column locations for each area has been determined and is relatively maintained post-flex. Where the pre-flex horizontally linked relative row locations for each area has been determined and is relatively maintained post-flex. Where the movements induced by those flex cell instantiation changes ensure no overlaps of areas. And where the flexing is done by at least one spreadsheet flexing function or flexing capability as exampled in FIG. 64A through FIG. 73B, and FIG. 132A through FIG. 135B.

There are many different embodiments of the flex alignment with different spatial relocations. One such embodiment is exampled in FIG. 66 where our technology ensures no overlap of linked/connected areas and maintains the specified vertical and/or horizontal alignments with no offset between areas. It moves areas only so far as to ensure no overlap and then to maintain the vertical and/or horizontal alignments. Another embodiment of our alignment movement technology automatically ensures flex driven movements maintain a one cell horizontal or vertical spacing between areas as exampled in FIG. 67 6765/6755 and 6775/6776 for horizontally linked/connected areas and as exampled by 6744/6745 and 6757/6767 for vertically linked areas.

Another embodiment of our alignment movement linked/connected technology automatically ensures the spacing is the minimum pre-flex or time of linkage setup spacing for the aligned areas post flexes expanding into and/or shrinking from them as exampled in FIG. 68A and FIG. 68B 6876 and 6886 for horizontally linked/connected areas and as exampled by FIG. 132A and FIG. 132B 13274 and 13277 for vertically linked areas. Similarly other embodiments of our alignment movement linked/connected technology automatically ensures the spacing is the maximum pre-flex or time of linkage spacing for the aligned areas post flexes expanding into and/or shrinking from them as exampled in FIG. 132A and FIG. 132B 13276 and 13286 for horizontally linked/connected areas and as exampled by FIG. 68A and FIG. 68B 6874 and 6878 by for vertically linked areas. As previously mentioned, these different embodiments can be mixed and matched together as was exampled in the blending of minimums and maximums in FIG. 68A/FIG. 68B and FIG. 132A/FIG. 132B.

Our alignment movement linked/connected technologies handle alignments that are perfectly (straight leading edge) vertically or horizontally aligned as exampled in FIG. 64A through FIG. 68B and alignments that are imperfect as exampled in FIG. 69 and FIG. 70 and FIG. 133A through FIG. 135B. Our technology also supports combinations of straight and imperfectly aligned alignments as exampled in FIG. 71A through FIG. 73B. And as previously stated these different embodiments work with combinations of the other features described herein.

Alignment Movement Link Implementations—Coordination Situations

Our alignment movement link/connect technologies supports the coordination of movement linkages/connections in many different situations. One embodiment maintains the relative spatial relationship vertical and/or horizontal alignments between the cell or cells linked/connected to the flex ranges when at least one of the flex ranges shrinks as exampled in FIG. 134A flexing to give FIG. 134B. In that example our technology has employed the minimum distance embodiment or the minimum one row or column embodiments for the shrinking of the flex ranges and the vertical and horizontal alignments, exampling the mix and match feature capabilities of our technology.

Embodiments of our technology maintains the horizontal and/or vertical alignment of the linked/connected areas when at least one of the flex ranges expands or shrinks where at no point before or after the flexing is the area or areas within the flex range. The area or areas are nearby but not within any of the flex ranges as exampled in FIG. 73A, and FIG. 73B 7316/7366, 7317/7367, 7324/7364, and 7325/7365.

Our technologies supports many different types of movement linkages/connections with different variants of the spatial relationships retained after the alignment movement(s). This embodiment delivers in all situations the same horizontal and/or vertical alignments. However, there are situations where the spatial distances between the alignments are altered as exampled in the flex shrinks in FIG. 135A and FIG. 135B where during flex shrinkage the relative spatial vertical and horizontal alignments are maintained but the offset to other area relationships are not maintained (e.g., the spacing between alignments and their areas to the right becomes more empty cells for the vertically alignments 13566 and 13568 in FIG. 135B). This capability we labelled "one-way" ensures no overlap of cells, coordinated spatial relationships for flex expansions and unchanged positions for flex contractions.

Many embodiments of our technology support automatically coordinated movement adjustments done for flex expansions and contractions (shrinkages) as exampled in FIG. 65 through FIG. 70 where flexes are both expanding and shrinking with alignment movement. This capability we labelled "two-way" ensures no overlap of cells and coordination of spatial positioning alignments retaining embodiment specific relationships.

Alignment Movement Link Implementations—Types of Flexes

Each of our alignment movement link/connect embodiments works where the flexing range(s) is produced by one or more multi-cell populating functions, such as a WRITE_H, WRITE_CALC_2D or FILTER. FIG. 73A and FIG. 73B examples this for different "WRITE' function flexes. FIG. 64A through FIG. 70 and FIG. 133A through FIG. 135B examples our movement linkage/connection technology working with any type of flex which would include a FILTER function or any of the other flex capable spreadsheet functions (e.g., Lookup and reference functions such as CHOOSECOLS, CHOOSEROWS, FILTER, TAKE, and UNIQUE and all of the family of WRITE functions, as described herein). These examples would also include where the flexing range(s) is produced by one or more spreadsheet flexing capabilities, such as a PivotTable, Table, or one of our 'flex copy paste' capabilities. Our technology works with all the other flex-capable 'capabilities' and any mix and match combination of them and flex capable 'functions' for one or multiple movement linkages/connections.

Our alignment movement linkage/connection technology works for both one and two-dimensional flex linkages/connections as previously exampled and exampled in FIG. 64A through FIG. 73B and FIG. 133A through FIG. 135B. Our technology supports all the different mix and match combinations of flexing functions, capabilities, one-dimensional and/or two-dimensional.

Alignment Movement Link Implementations—Manual Linkage

Our alignment linkage/connection technology supports several ways for the user to manually setup the alignment linkages/connections as exampled in FIG. 64A and FIG. 64B, FIG. 72A and FIG. 72B, and FIG. 133A and FIG. 133B. Our technology supports ribbon, menu, and other modes of manually initiating the setting of the types of linkages/connections (i.e., formula, movement, or both). It supports that for all our different types of linkages/connections (e.g., 'Formula', 'Alignment, and 'Both'). The alignment movement linkage/connection can work within other movement linkages/connections or set up by itself.

Alignment Movement Link Implementations—Automatic Linkage

Our alignment technology also supports many different implementations of automatic movement linkage/connection set up to flexing ranges, with different algorithmic approaches to determining what to align. For example, the algorithm could align link/connect flex ranges above each other or mostly above each other (with imperfect alignment) for vertical alignment linkages and to the right or mostly to the right (with imperfect alignment) for horizontal alignment linkages. Those algorithms could then associate the other populated cells to the closest aligned set of vertical and/or horizontal flexes. The algorithm could vary those linkages by a direction in the event of ties (e.g., tie goes to the right in vertical alignment and tie goes to below in horizontal alignment). Those automatic movement linkages/connections work with visible and invisible linkage/connection arguments, direct and indirect connections and flex function and flex capabilities.

While our automatic connections can be reverted by several manual processes involving ribbon buttons, menus and/or popups, our technology supports a new variant of 'UNDO' for removing automatically made linkages/connections, as exampled in FIG. 49A through FIG. 50B. In this variant of 'UNDO' the first 'UNDO' action (e.g., click, shortcut or menu selection) does not revert the cell action that led to the automatic linkage/connection, but instead retains the cell action (e.g., completing a formula or text in the cell) and removes the automatic linkage/connection. Then in this embodiment if the user does a second 'UNDO' action they get the typical 'UNDO' response of undoing the completion of the formula or text entered in the cell.

Alignment Movement Link Implementations—Visible and Invisible Arguments

Implementations of our multiple flex technology support either visible or invisible movement linkage/connection arguments. Our implementations support different variants of the visible linkage/connection where the text argument is visible in the regular cell formula, as previously exampled in FIG. 44B, or in a switchable regular formula or link/connect formula, as exampled in FIG. 44C and FIG. 44D. Our technology supports other variants of the visible arguments displaying the argument as text directly in the regular cell formula or alternative cell formulas, including the second formula disclosed in our filing U.S. Application No. 63/337,576, titled "Methods and Systems for Spreadsheet Function and Flex Copy-Paste Control of Formatting and Use of Selection List Panels," filed 2 May 2022. These alternative cell formulas support all the different implementations including the manual and automatically instantiated linkages/connections.

Our multiple flex movement link/connect technology also supports invisible linkage/connection arguments/set ups which are visible in the selection list panel (accessible by a control) or some other visual (e.g., button, color-coding or other identifier) but not reproduced as text in an argument or arguments of the cell formula 7362 as exampled in FIG. 73B where the link/connect status of is visible in the purple 'LINK' formula ribbon button 7361 (which can also be a control for accessing the link/connect set up) but is not visible in the formula 7362. These invisible links/connects in the function formula can also be automatically set in our technology as previously exampled.

Alignment Movement Link Implementations—Other Implementations

Other implementations of our multiple flex technologies may include a non-transitory computer readable storage medium storing instructions executable by a processor to perform any of the methods described above. Yet another implementation may include a system including memory and one or more processors operable to execute instructions, stored in the memory, to perform any of the methods described above.

Closest Distance Movement Linkage Implementations

Another implementation is a method for automatically adjusting the location of areas based on their connection to multiple range flexing function(s) and/or capabilities and other areas. Our closest distance movement linkage/connection technologies automatically ensures that the row and column relative spatial distance between linked cell areas (e.g., cells or flex ranges) is a minimum of the pre-flex distances (e.g., at time of linkage or the latest pre-flex) between all the area-to-area closest cell or cells. Note, where an area can be a single cell (holding a value or formula) or a range of cells instantiated by a flex or non-flexing function or capability. In these implementations the exact relative spatial distances will be maintained unless overridden by having to meet another movement linkage relative minimum relationship. At that point our technology will ensure that the row and column relative spatial distance is exceeded in the direction of the row or/and column distance resulting in a relative spatial distance that exceeds that linkage/connection in the row and column offset directions. Thus, ensuring areas are never closer than their pre-flex (e.g., at time of linkage or the latest pre-flex) separations.

To accomplish this closest distance movement linkage automatic flexing our technology determines the pre-flex (e.g., at time of linkage or the latest pre-flex) relative row and column spatial separation distances between the closest cell or cells for each area to each area. Then one or more area containing a flexing function (e.g., FILTER, WRITE_V, WRITE_CALC, or WRITE_CALC_2D) and/or flexing capability (e.g., PivotTable, Table or flex copy paste) flexes (changes) the cells it populates (instantiates) with returned values and our technology automatically spatially relocates, as needed, the linked/connected areas to ensure that a minimum of the pre-flex or time of linkage set up row and column spatial distances are maintained. Moving distances farther in the direction of the relative spatial directions when necessary to accommodate another relative spatial minimum relationship as exampled for relatively simple situations in FIG. 85A through FIG. 87C and in FIG. 146A through FIG. 146D, and for much more complicated examples in FIG. 88 through FIG. 99 and in FIG. 100 through FIG. 128.

These methods and other embodiments or implementations of the technology disclosed can include one or more of the following features and/or features described in connection with additional methods disclosed. In the interest of conciseness, the combinations of features disclosed in this application are not individually enumerated and are not necessarily repeated with each of the other features. The reader will understand how features identified in this section and other sections can readily be combined with sets of other features for the different embodiments.

Closest Distance Movement Linkage Implementations—Coordination Situations

Our technologies supports the coordination of movement linkages/connections in many different situations. One embodiment of our closest distance movement linkage/connection technology ensures post-flex the largest number of areas with the pre-flex or at instantiation combination of row and column exact relative spatial positions while ensuring the other area-to-area relative spatial distances exceed the pre-flex or at instantiation combination of row and column relative spatial positions. This is exampled in FIG. 86A through FIG. 86C where FIG. 86A examples the three post-flex areas to areas ('WRITE' 8622 to 'FILTER' 8624, 'WRITE' 8622 to 'PivotTable' 8642, and WRITE' 8622 to 'Flex copy paste' 8644) with the pre-flex or at instantiation combination of row and column exact relative spatial positions 8623, 8632, and 8633. FIG. 86B and FIG. 86C examples the areas to areas where the post-flex relative spatial positions exceed the pre-flex or at instantiation combination of row and column exact relative spatial positions.

Another embodiment of our closest distance movement linkage/connection technology ensures post-flex the largest number of closest cells within the areas with the pre-flex or at instantiation combination of row and column exact relative spatial positions while ensuring the other closest cell area to area relative spatial distances exceed the pre-flex or at instantiation combination of row and column relative spatial positions. This is exampled in FIG. 86A through FIG. 86C where FIG. 86A examples the sixteen post-flex closest cells to cells area to area (represented by the nine purple arrows 8623, six dark green arrows 8632, and one red arrow 8633) with the pre-flex or at instantiation combination of row and column exact relative spatial positions. FIG. 86B and FIG. 86C examples with the pink, light blue and brown arrows the closest cells to cells area to area where the post-flex relative spatial positions exceed the pre-flex or at instantiation combination of row and column exact relative spatial positions.

Closest Distance Movement Linkage Implementations—Coordination Relative Spatial Distance Setting Our closest distance movement linkage/connection technologies supports different coordination relative spatial distance setting. One embodiment sets the relative spatial distances as those at the time of the linkage creation as exampled in the series of flexes in FIG. 146A through FIG. 146C. Another embodiment updates the coordinated relative spatial distances for each successive flex using the last values for the minimum spatial distances for the next flex as exampled in FIG. 146A, FIG. 146B and FIG. 146D.

Embodiments of our technology maintains the relative spatial relationship between the cell or cells linked/connected to the flex ranges when at least one of those flex ranges expands or shrinks where at no point before or after the flexing is the cell or cells within the flex range. The cell or cells are nearby but not within any of the flex ranges as exampled in FIG. 145A, and FIG. 145B.

Closest Distance Movement Linkage Implementations—Types of Flexes

Each of our closest distance movement link/connect embodiments works where the flexing range(s) is produced by one or more multi-cell populating functions, such as a WRITE_H, WRITE_CALC_2D or FILTER. FIG. 100 through FIG. 128 and FIG. 85A through FIG. 87C examples this for different "WRITE' function flexes. FIG. 85A through FIG. 87C example our closest distance movement linkage/connection technology working with a flex from a FILTER function. Our technology works with all the other flex capable spreadsheet functions (e.g., Lookup and reference functions such as CHOOSECOLS, CHOOSEROWS, FILTER, TAKE, and UNIQUE as well as the complete family of WRITE functions, as described herein).

Each of our embodiments works where the flexing range(s) is produced by one or more spreadsheet flexing capabilities, such as a PivotTable or one of our 'flex copy paste' capabilities. FIG. 85A through FIG. 87C and FIG. 146A through FIG. 146D examples our movement linkage/connection technology working with both PivotTables and flex copy pastes. Our technology works with all the other flex-capable 'capabilities' and any mix and match combination of them and flex capable 'functions' for one or multiple movement linkages/connections for one- or two-dimensional flexes.

Closest Distance Movement Linkage Implementations—Manual Linkage

Our closest distance movement linkage/connection technology supports several ways for the user to manually setup the linkages/connections with one such approach exampled in FIG. 85A (e.g., ribbon initiated, "Movement" selection) and another approach exampled in FIG. 100 (e.g., menu initiated, "Both" selection). Our technology supports ribbon, menu, and other modes of manually initiating the setting of the types of linkages/connections (i.e., formula, movement, or both).

Our technology also supports the manual setting of multiple linkages/connections at one time as exampled in FIG. 85A and FIG. 100. It supports that for all our different types of linkages/connections (e.g., 'Formula', 'Movement' and 'Both').

Closest Distance Movement Linkage Implementations—Automatic Linkage

Our closest distance movement technology also supports many different implementations of automatic movement linkage/connection set up to flexing ranges, as previously exampled in FIG. 44A through FIG. 44D, and FIG. 46A through FIG. 46D. Any one of the examples in FIG. 86A through FIG. 99, and FIG. 101 through FIG. 128 could have had the setup of the closest distance movement or both movement and formula linkage/connection automatically done by our application as cells or flex ranges were created in the sheet. Embodiments of our technology could link/connect all the content of a worksheet as it is created thereby ensuring flexes never overlap content. All those automatic movement linkages/connections work with visible and invisible linkage/connection arguments, and flex function and flex capabilities. And as discussed next, even with automatic linkage/connection setup a user can elect to unlink/disconnect an area.

While our automatic connections can be reverted by several manual processes involving ribbon buttons, menus and/or popups, our technology supports a new variant of 'UNDO' for removing automatically made linkages/connections, as exampled in FIG. 49A through FIG. 50B. In this variant of 'UNDO' the first 'UNDO' action (e.g., click, shortcut or menu selection) does not revert the cell action that led to the automatic linkage/connection, but instead retains the cell action (e.g., completing a formula or text in the cell) and removes the automatic linkage/connection. Then in this embodiment if the user does a second 'UNDO' action they get the typical 'UNDO' response of undoing the completion of the formula or text entered in the cell.

Closest Distance Movement Linkage Movement Link Implementations—Visible and Invisible Arguments Implementations of our multiple flex technology support either visible or invisible movement linkage/connection arguments. Our implementations support different variants of the visible linkage/connection where the text argument is visible in the regular cell formula, as previously exampled in FIG. 44B, or in a switchable regular formula or link/connect formula, as exampled in FIG. 44C and FIG. 44D. Our technology supports other variants of the visible arguments displaying the argument as text directly in the regular cell formula or alternative cell formulas, including the second formula disclosed in our filing U.S. Application No. 63/337,576, titled "Methods and Systems for Spreadsheet Function and Flex Copy-Paste Control of Formatting and Use of Selection List Panels," filed 2 May 2022. These alternative cell formulas support all the different implementations including the manual and automatically instantiated linkages/connections.

Our multiple flex movement link/connect technology also supports invisible linkage/connection arguments which are visible in the selection list panel or some other visual (e.g., button, color-coding or other identifier) but not reproduced as text in an argument or arguments of the cell formula as exampled in FIG. 35B where the link/connect status of "Movement' 3552 is visible in the selection list panel 3553 but is not visible in the formula 3545. These invisible links/connects can also be automatically set in our technology as exampled in FIG. 46A through FIG. 46D. The linkages/connections can be visible in a control somewhere in the application such as the 'LINK' button visible in the formula bar (e.g., 4617 in FIGS. 46 and 4922 in FIG. 49) or a selection list panel/control (e.g., 3523 in FIG. 35A and 8523 in FIG. 85A) accessed via that 'LINK' button, a ribbon button and/or menu selections.

Closest Distance Movement Linkage Implementations—Other Implementations

Other implementations of our multiple flex technologies may include a non-transitory computer readable storage medium storing instructions executable by a processor to perform any of the methods described above. Yet another implementation may include a system including memory and one or more processors operable to execute instructions, stored in the memory, to perform any of the methods described above.

Direct and Indirect Movement Link Implementations

Another implementation is a method for automatically adjusting the location of two or more cells or flex ranges based on maintaining relative row and column spatial relationships through cascading flex driven direct movement links/connections as exampled in FIG. 74A through FIG. 75B for three linked/connected areas and for progressively more connected/linked areas in FIG. 136A through FIG. 137B and then FIG. 30A through FIG. 33B. FIG. 74A and FIG. 74B examples a third relocatable area directly linked/connected to a second relocatable area, where that second relocatable area is directly linked/connected to a first area, where the first and second areas happen to be flex ranges. Our technology then automatically determines the relative spatial position of the second area to the first area and for the third area to second area, thereby determining the pre-flex relative relationships of each of the direct linkages/connections. When any of the directly linked areas flex our technology ensures that the direct linkage/connection pre-flex spatial row and column relationships are maintained post-flex. Thus in FIG. 74B the flex of area one moves area two which in turn moves area three, the flex of area two simply further moves area three which has its location adjusted for both the movement of area two (cascading indirectly area one's flex to area three) and by the flex of area two. FIG. 75A and FIG. 75B examples this same set of movements for an area three cell which is also formula linked to areas one and two. Thus, showing our direct and indirect movement link/connect technology works together with our formula link/connect technology.

FIG. 136A through FIG. 137B and FIG. 30A through FIG. 33B example progressively more complicated direct and indirect cascading movement (and formula) linkage/connections with different types of cells and flexes (i.e., functions and capabilities). As embodiments of our technology can handle a large number of direct and indirectly linked/connected areas.

Direct and Indirect Movement Link Implementations—Coordination Situations

Embodiments of our technology ensure the coordinated adjustment of the directly linked spatial relationships for both flex expansions and contractions as exampled by FIG. 74A flex expanding to give FIG. 74B and FIG. 74B flex contracting (shrinking) to give FIG. 74B. The same would be true for FIG. 75A flex expanding to give FIG. 75B and FIG. 75B flex contracting (shrinking) to give FIG. 75B, FIG. 31A flex expanding to give FIG. 31B and FIG. 31B flex contracting (shrinking) to give FIG. 31B, and for FIG. 33A flex expanding to give FIG. 33B and FIG. 33B flex contracting (shrinking) to give FIG. 33B.

Another embodiment of our technology supports automatically coordinated movement adjustments of a cell or cells not in the overlap path of a flex range as exampled in FIG. 76B 7654 and 7645 which are not in the expansion or contraction range of any of the flex ranges yet can be moved by them. Similar to what was previously exampled in FIG. 38A through FIG. 38D where movement is driven by a range flexing which could never overlap the cell moving. This non-overlapped cell coordination capability of our linkage/connection technology examples one of the many ways our technology coordinates movements rather than simply displacing overlapped flex expansions.

Direct and Indirect Movement Link Implementations—Connection Types

Embodiments of our direct and indirect movement link/connect technologies support different connection types. Connections can be determined by our application applying logic like area-to-area closest proximity, flex to flex closest proximity followed by cell to flex closest proximity. There can be directional overlays to the linkage logic as previously described with an order to the up, down, and side-to-side directions in proximity ties as exampled in FIG. 143. FIG. 74A and FIG. 74B examples linkages/connections between the closest areas although the same result could have been accomplished by the user specifying each of the direct linkages.

Direct and Indirect Movement Link Implementations—Types of Flexes

Each of our movement link/connect embodiments works where the flexing range(s) is produced by one or more multi-cell populating functions, such as a WRITE_H, WRITE_CALC_2D or FILTER. FIG. 74A through FIG. 77B, FIG. 30A through FIG. 33B, and FIG. 136A through FIG. 137B examples this for different "WRITE' function flexes. Our direct and indirect movement technology works with all the other flex capable spreadsheet functions (e.g., Lookup and reference functions such as CHOOSECOLS, CHOOSEROWS, FILTER, TAKE, and UNIQUE as well as all of the WRITE family of functions) as previously exampled for other movement embodiments.

Each of our direct and indirect movement embodiments works where the flexing range(s) is produced by one or more spreadsheet flexing capabilities, such as a PivotTable or one of our 'flex copy paste' capabilities. FIG. 136A through FIG. 137B and FIG. 31A through FIG. 33B examples our direct and indirect movement linkage/connection technology working with 'flex copy paste' capabilities. Each of our applicable embodiments works where the flexing range(s) is PivotTable as exampled in FIG. 24A and FIG. 24B. Our direct and indirect movement technology works with all the other flex-capable 'capabilities' and any mix and match combination of them and flex capable 'functions' for one or multiple movement linkages/connections.

Direct and Indirect Movement Link Implementations—Manual Linkage

Our linkage/connection technology supports several ways for the user to manually setup the direct and indirect movement linkages/connections. It supports ribbon, menu, and other modes of initiating the setting of the types of linkages/connections (i.e., formula, movement, or both). As previously mentioned, users can specify each direct link/connection establishing the links entirely manually. Users can semi-automatically set the direct and indirect links/connections as exampled in FIG. 76A and FIG. 76B where the user specifies a set of cells 7662 (in FIG. 76A) to be direct and indirectly linked/connected and then our technology applies a rule set like those in FIG. 143 to determine which areas are directly linked to which areas within the selected cells.

Our technology implementations also support the manual movement connection/linkage being made for a group as exampled in in FIG. 76A and FIG. 76B. Our movement linkage/connection technology also supports the manual linkage/connection of multiple groups, as exampled in FIG. 139A, and/or groups of groups, as exampled in FIG. 141B.

Direct and Indirect Movement Link Implementations—Automatic Linkage

Our direct and indirect movement technology also supports many different implementations of automatic movement linkage/connection to flexing ranges, as exampled in FIG. 136A and FIG. 137B and FIG. 77A and FIG. 77B without FIG. 76A and FIG. 76B where our application automatically assigns direct linkages while the user is creating each cell and flex using an automated ruleset like the one exampled in FIG. 143. Those automatic movement linkages/connections work with visible and invisible linkage/connection arguments, direct and indirect connections and flex function and flex capabilities.

While our automatic connections can be reverted by several manual processes involving ribbon buttons, menus and/or popups, our technology supports a new variant of 'UNDO' for removing automatically made linkages/connections, as previously exampled in FIG. 43A through FIG. 44B. In this variant of 'UNDO' the first 'UNDO' action (e.g., click, shortcut or menu selection) does not revert the cell action that led to the automatic linkage/connection, but instead retains the cell action (e.g., completing a formula or text in the cell) and removes the automatic linkage/connection. Then in this embodiment if the user does a second 'UNDO' action they get the typical 'UNDO' response of undoing the completion of the formula or text entered in the cell.

Direct and Indirect Movement Link Implementations—Visible and Invisible Arguments Implementations of our technology support either visible or invisible movement linkage/connection arguments. Our implementations support different variants of the visible linkage/connection where the text argument is visible in the regular cell formula, as previously exampled in FIG. 44B, or in a switchable regular formula or link/connect formula, as exampled in FIG. 44C and FIG. 44D (and showing the formula '$f_x$' button 4461 and '$f_L$' button 4485). Our technology supports other variants of the visible arguments displaying the argument as text directly in the regular cell formula or alternative cell formulas, including the second formula disclosed in our filing U.S. Application No. 63/337,576, titled "Methods and Systems for Spreadsheet Function and Flex Copy-Paste Control of Formatting and Use of Selection List Panels," filed 2 May 2022. These alternative cell formulas support all the different implementations including the manual and automatically instantiated linkages/connections.

Our movement link/connect technology also supports invisible linkage/connection arguments which are visible in the selection list panel or some other visual (e.g., button, color-coding or other identifier) but not reproduced as text in an argument or arguments of the cell formula as exampled in FIG. 31A 3114 and FIG. 32B 3218 and exampled in FIG. 35B where the link/connect status of "Movement' 3552 is visible in the selection list panel 3553 but is not visible in the formula 3545. These invisible links/connects can also be automatically set in our technology as exampled in FIG. 46A through FIG. 46D.

These visible and invisible linkage/connection arguments support all the different implementations including the manual and automatically instantiated linkages/connections, the grouping, grouping of groups, and the other applicable features discussed herein.

Direct and Indirect Movement Link Implementations—Other Implementations

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

Ordered Progression Movement Link Implementations

Another implementation is a method for automatically adjusting the location of multiple relocatable areas of cells and/or flex ranges, ensuring no overlap of cells through an ordered progression displacement. Our ordered progression movement technologies locate all the linked/connected cell areas containing at least one flex range and at least one other area containing a cell or flex range. In many situations that will be multiple cells and multiple flex ranges. When one or more of the flex ranges simultaneously flex expand, instantiating more cells, then those flex expansion and movements follow across and down expansions spatially relocating any overlapped linked area as exampled in FIG. 57 through FIG. 63C and FIG. 147 through FIG. 148D. Those across and down expansion spatial relocations can be done in a across then down progressive order as exampled in FIG. 57, FIG. 60A, FIG. 147, FIG. 148A, and FIG. 148C, a down then across progressive order flex and spatial relocation as exampled in FG. 58, FIG. 60B, FIG. 148B, and FIG. 148D, or a simultaneous down and across progressive order flex spatial relocation as exampled in FIG. 59 and FIG. 60C.

Ordered Progression Movement Link Implementations—Cushioning

Other embodiments of our ordered progression movement link/connect technologies have different cushion around the linked/connected cell areas. The examples in FIG. 57 through FIG. 61 and FIG. 147 through FIG. 148B have no cushion, where there are no empty cells placed between the displaced areas and the area displacing them. The examples in FIG. 62 through FIG. 63C, 148C, and FIG. 148D have a single cell row and/or column empty cell displacement cushion between the area displaced and the area doing the displacement. That displacement cushion could be any number of rows or columns as set by the application or selected by the user.

Ordered Progression Movement Link Implementations—Types of Flexes

As previously described for other embodiments all of our movement link/connect embodiments works where the flexing range(s) is produced by one or more multi-cell populating functions, such as a WRITE_H, WRITE_CALC_2D or FILTER. Our technology works with all the other flex capable spreadsheet functions (e.g., Lookup and reference functions such as CHOOSECOLS, CHOOSEROWS, FILTER, TAKE, and UNIQUE as well as all of the family of WRITE functions as described herein).

Each of our embodiments works where the flexing range(s) is produced by one or more spreadsheet flexing capabilities, such as a PivotTable or one of our 'flex copy paste' capabilities. Our technology works with all the other flex-capable 'capabilities' and any mix and match combination of them and flex capable 'functions' for one or multiple movement linkages/connections.

Our ordered progression movement (displacement) link examples FIG. 57 through FIG. 63C and FIG. 147 through FIG. 148D where for undisclosed flex functions and flex ranges because they work for all of them.

Ordered Progression Movement Link Implementations—Manual Linkage

As previously described for other embodiments all of our movement link/connect embodiments supports several ways for the user to manually setup the linkages/connections. It supports ribbon, menu, and other modes of initiating the setting of the types of linkages/connections (i.e., formula, movement, or both).

Ordered Progression Movement Link Implementations—Automatic Linkage

As previously described for other embodiments all of our movement link/connect embodiments also supports many different implementations of automatic movement linkage/connection to flexing ranges. It supports the automatic linkage/connection setup of cell contents as they are created whether they are created one at a time or copy pasted to create many at a time. Those automatic movement linkages/connections work with flex function and flex capabilities. The existence of the ordered progression movement displacement links/connections can be visible to user in any of the manners described herein and can also just be done with embodiments with no visible markings as just part of what the spreadsheet automatically docs.

While our automatic connections can be reverted by several manual processes involving ribbon buttons, menus and/or popups, our technology supports a new variant of 'UNDO' for removing automatically made linkages/connections, as exampled in FIG. 43A through FIG. 44B. In this variant of 'UNDO' the first 'UNDO' action (e.g., click, shortcut or menu selection) does not revert the cell action that led to the automatic linkage/connection, but instead retains the cell action (e.g., completing a formula or text in the cell) and removes the automatic linkage/connection. Then in this embodiment if the user does a second 'UNDO' action they get the typical 'UNDO' response of undoing the completion of the formula or text entered in the cell.

Ordered Progression Movement Link Implementations—Visible and Invisible Arguments Implementations of our technology support either visible or invisible movement linkage/connection arguments. Our implementations support different variants of the visible linkage/connection where the text argument is visible in the regular cell formula, as previously exampled in FIG. 44B, or in a switchable regular formula or link/connect formula, as exampled in FIG. 44C and FIG. 44D. Our technology supports other variants of the visible arguments displaying the argument as text directly in the regular cell formula or alternative cell formulas, including the second formula disclosed in our filing U.S. Application No. 63/337,576, titled "Methods and Systems for Spreadsheet Function and Flex Copy-Paste Control of Formatting and Use of Selection List Panels," filed 2 May 2022. These alternative cell formulas support all the different implementations including the manual and automatically instantiated linkages/connections.

Our multiple flex movement link/connect technology also supports invisible linkage/connection arguments which are visible in the selection list panel or some other visual (e.g., button, color-coding or other identifier) but not reproduced as text in an argument or arguments of the cell formula as exampled in FIG. 35B where the link/connect status of "Movement' 3552 is visible in the selection list panel 3553 but is not visible in the formula 3545. These invisible links/connects can also be automatically set in our technology as exampled in FIG. 46A through FIG. 46D.

Ordered Progression Movement Link Implementations—Other Implementations

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

Bumper (Boundary Border) Movement Link Implementations

Another implementation of our technologies is a method for automatically adjusting the location of linked/connected flex range areas by effectively creating a flex range free boundary border (bumper) around each flex range area, expanding or contracting the perimeter of that boundary border (bumper) without changing its distance to other flex ranges and then relocating as necessary flex range areas to maintain those post-flex flex range free boundary borders as exampled in FIG. 78A through FIG. 79C.

This method and other embodiments or implementations of the technology disclosed can include one or more of the following features and/or features described in connection with additional methods disclosed. In the interest of conciseness, the combinations of features disclosed in this application are not individually enumerated and are not repeated with each of the other features. The reader will understand how features identified in this section can readily be combined with sets of other features.

Bumper (Boundary Border) Movement Link Implementations—Coordination Situations

Our bumper/boundary border movement link/connect technology supports many different types of movement linkages/connections. An embodiment of our technology supports automatically coordinated movement adjustments done for flex expansions but not flex contractions as exampled in FIG. 84A and FIG. 84B. This capability we labelled "one-way" ensures no overlap of cells, coordinated spatial relationships for flex expansions and coordination relative to previous positions for flex contractions.

Another embodiment of our technology supports automatically coordinated movement adjustments done for flex expansions, contractions, and mixtures of the two as exampled in FIG. 78A through FIG. 83C, FIG. 84C and FIG. 138A through FIG. 138C. This capability we labelled "two-way" ensures no overlap of cells and bumper coordination of spatial positioning retaining prior relationships for both flex expansions and contractions.

Bumper (Boundary Border) Movement Link Implementations—Coordination Setting

Our technology supports different setting of the bumper/boundary border spatial relationships which will be maintained post-flex. In those settings when flexes result in a change of the pre-flex bumper spatial relationship, the ongoing pre-flex bumper widths (spatial relationships) to be used could be the original values when the linkage was instantiated, as exampled in FIG. 80A and FIG. 80B, or the most recent pre-flex value which has been changed by previous flexes from the original value, as exampled in FIG. 80A and FIG. 80C.

Bumper (Boundary Border) Movement Link Implementations—Coordination Order

Another embodiment, for multiple simultaneous flex situations in our technology, employees an ordered progression approach as previously exampled in FIG. 57 through FIG. 63C (where the "bumpers" replace the cushion or non-cushion). In those situations, the result can differ by the order of the flex changes as exampled for a down then across application of the flexes in FIG. 82A through FIG. 82D, as exampled for a across then down application of the flexes in FIG. 83A through FIG. 83D.

Bumper (Boundary Border) Movement Link Implementations—Groups

Implementations of our bumper/boundary border movement technologies support the alteration of the linked/connected movements via the creation of grouped connections/linkages. Think of the Group objects capability of Microsoft PowerPoint (or other presentation applications) applied to spreadsheet cells for the purpose of movements. However, in our technology the grouped movement is done automatically by our application, is done in a coordinated way potentially across multiple groups and retains the different spatial relationships such as the bumpers during movement thereby automating numerous manual presentation application activities within a spreadsheet.

In our technology once the cells are grouped for movement purposes, they react like a group rather than individual cells, as exampled in FIG. 129A through FIG. 130A. Those movement linkages/connections are altered by a grouping or multiple groupings but otherwise follow our coordinated spatial movement approaches (e.g., bumpers/boundary borders).

In our technology group to group bumper movements are spatially coordinated as exampled in the different embodiments in FIG. 141A through FIG. 142B (where the groups would have shared bumpers). These grouped movements then can vary by the different progressions of across and down bumper displacements.

Our technology supports different setting of the group bumper/boundary border spatial relationships which will be maintained post-flex. In those settings when group flexes result in a change of the pre-flex bumper spatial relationship, the ongoing pre-flex group bumper widths (spatial relationships) to be used could be the original value when the group linkage was instantiated, as exampled in FIG. 140A and FIG. 140B, or the most recent pre-flex value which has been changed by previous flexes from the original value, as exampled in FIG. 140A and FIG. 140C.

Bumper (Boundary Border) Movement Link Implementations—Types of Flexes

Each of our bumper/boundary border movement link/connect embodiments works where the flexing range(s) is produced by one or more multi-cell populating functions, such as a WRITE_H, WRITE_CALC_2D or FILTER. FIG. 78A through FIG. 84C examples this for different "WRITE" and 'FILTER' function flexes. Our technology works with all the other flex capable spreadsheet functions (e.g., Lookup and reference functions such as CHOOSECOLS, CHOOSEROWS, FILTER, TAKE, and UNIQUE as well as the complete family of our WRITE functions, defined herein).

Each of our embodiments works where the flexing range(s) is produced by one or more spreadsheet flexing capabilities, such as a PivotTable or one of our 'flex copy paste' capabilities. FIG. 78A through FIG. 84C examples our bumper/boundary border movement linkage/connection technology working with 'flex copy paste' and PivotTable capabilities. Our technology works with all the other flex-capable 'capabilities' (e.g., spreadsheet tables) and any mix and match combination of them and flex capable 'functions' for one or multiple movement linkages/connections.

Bumper (Boundary Border) Movement Link Implementations—Manual Linkage

Our bumper/boundary border linkage/connection technology supports several ways for the user to manually setup the linkages/connections as exampled in FIG. 78A through FIG. 79C. It supports ribbon, menu, and other modes of initiating the setting of the types of linkages/connections (i.e., formula, movement, or both). Each movement linkage/connection, whether one for cell, a range of cells or many groups of cells, can be to multiple flexes at one time.

Our technology implementations also support the manual movement connection/linkage being made for a group as exampled in in FIG. 138A through FIG. 138C. Our movement linkage/connection technology also supports the manual linkage/connection of multiple groups, as exampled for a different embodiment in FIG. 139A.

Bumper (Boundary Border) Movement Link Implementations—Automatic Linkage

Our bumper/boundary border technology also supports many different implementations of automatic movement linkage/connection to flexing ranges, as previously exampled for other embodiments. It supports the automatic linkage/connection setup as the cell (individual or flex ranges) contents are created or for many if they are copy paste created. Those automatic movement linkages/connections work with visible and invisible linkage/connection arguments and flex function and flex capabilities.

While our automatic connections can be reverted by several manual processes involving ribbon buttons, menus and/or popups, our technology supports a new variant of 'UNDO' for removing automatically made linkages/connections, as previously exampled in FIG. 49A through FIG. 50B. In this variant of 'UNDO' the first 'UNDO' action (e.g., click, shortcut or menu selection) does not revert the cell action that led to the automatic linkage/connection, but instead retains the cell action (e.g., completing a formula or text in the cell) and removes the automatic linkage/connection. Then in this embodiment if the user does a second 'UNDO' action they get the typical 'UNDO' response of undoing the completion of the formula or text entered in the cell.

Bumper (Boundary Border) Movement Link Implementations—Visible and Invisible Arguments Implementations of our bumper/border boundary movement technology support either visible or invisible movement linkage/connection arguments, as previously exampled for other embodiments. Our technology supports other variants of the visible arguments displaying the argument as text directly in the regular cell formula or alternative cell formulas, including the second formula disclosed in our filing U.S. Application No. 63/337,576, titled "Methods and Systems for Spreadsheet Function and Flex Copy-Paste Control of Formatting and Use of Selection List Panels," filed 2 May 2022. These alternative cell formulas support all the different implementations including the manual and automatically instantiated linkages/connections.

These visible and invisible linkage/connection arguments support all the different implementations including the manual and automatically instantiated linkages/connections, the grouping, grouping of groups, and the other applicable features discussed herein.

Bumper (Boundary Border) Movement Link Implementations—Other Implementations

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

Formula and Movement Link Implementations

Up until this point in our preferred implementations we have laid out either formula link/connect implementations or movement link/connect implementations not combinations of the two. However, within the filing figures we have many examples where different variants of our movement link/connect technologies are combined with our formula link/connect technologies. Rather than laying out preferred implementations for all the combinations of formula and movement link/connect implementations, we will example one such combination. Although all our other movement link/connect implementations can be combined with our formula link/connect technologies in a similar manner.

We will example a method for combining our formula link/connect technologies with the first of our movement link/connect technologies. This implementation automatically adjusts the location and formula of a cell based on its connection to range flexing function(s) and/or capabilities. Therefore, when users change input parameters into functions, such as WRITE_V or FILTER, or capabilities, such as PivotTable or flex copy paste, our combined movement and formula link/connect technology automatically adjusts the formula and location for any cell range flex (change) of the instantiated cells. So, at least one cell's location and its range or array functional formula is automatically updated as exampled in FIG. 16C and FIG. 16D, in contrast to FIG. 16A and FIG. 16B without our formula and movement linkage/connection technology where neither the location nor the formula are updated. FIG. 16C and FIG. 16D exampled our linkage/connection technology working for a spreadsheet capability flex ('flex copy paste') while FIG. 19A and FIG. 19B example our formula and movement combined linkage/connection technology working with a function flex ('WRITE_H'). FIG. 20C and FIG. 20D and FIG. 22A and FIG. 22B example our formula and movement linkage/ connection technology working with a two-dimensional flex. In these implementations the movement part of the combination linkage/connection technology retains the relative cell spatial position (although other of our movement linkage/connection technologies work when retaining relative cell spatial positions is not possible). Additionally, the formula part of the formula and movement linkage/connection or linkages/connections automatically adjusts the formula for the formula part of the cell range flex (change) or cell ranges flexes. These formula changes are automatically executed by our technology without adding additional functions to the formula (e.g., adding OFFSET and COUNT as arguments in SUM, MIN, MAX, STDEV) as exampled in FIG. 16C, FIG. 16D, FIG. 20C, FIG. 20D, FIG. 22C and FIG. 22D. These changes also correctly work when the instantiated flex range includes blank or null values as exampled in FIG. 16C, FIG. 19B, FIG. 20D and FIG. 22D.

Our combined movement and formula link/connect implementations also correctly work when there are cells in the adjacent cells which are expanded into post-flex or shrink collapse into the pre-flex area post-flex as exampled in FIG. 33A and FIG. 33B (with collapsing exampled with FIG. 33B becoming FIG. 33A).

This method and other embodiments or implementations of the technology disclosed can include one or more of the following features and/or features described in connection with additional methods disclosed. In the interest of conciseness, the combinations of features disclosed in this application are not individually enumerated and are not repeated with each of the other features. The reader will understand how features identified in this section can readily be combined with sets of other features and how these combinations can be replicated with our different movement link/connect technologies.

Formula and Movement Link Implementations—Range or Array Functions

Our formula linkage/connection technology works for a broad number of 'statistical' range or array prebuilt spreadsheet functions when combined with the movement link/connection. This is exampled in use for the 'MAX' function in FIG. 22A and FIG. 22B and exampled in use for the 'AVERAGE' function in FIG. 29A and FIG. 29B. Our technology also supports multiple different 'math and trigonometry' range or array prebuilt spreadsheet functions as exampled in the list in FIG. 144 and exampled in use for the 'SUM' function in FIG. 16C, FIG. 16D, FIG. 25A, FIG. 25B, FIG. 30A and FIG. 30B.

Formula and Movement Link Implementations—Coordination Situations

Our formula and movement link/connect technology supports many different types of movement linkages/connections (e.g., expansion, contraction, potential overlaps, and not potential overlaps) with different variants of the spatial relationships retained after the movement. Our linkage/connection technology ensures that the movement and formula linked/connected cells and ranges do not overlap each other as numerously exampled for many of the different movement types throughout the filing figures. FIG. 16C, FIG. 16D, FIG. 19A, FIG. 19B, FIG. 20C, FIG. 20D, FIG. 25A and FIG. 34C example movements linkages/connections which retain the relative spatial relationship to the closest cell in the flex range while also automatically executing the formula linkage/connection.

An implementation of our formula and movement link/connect technology supports automatically coordinated movement and formula adjustments done for flex expansions but not flex contractions as exampled in FIG. 25A 2551/2513, FIG. 25B 2591/2563, and FIG. 25D 2596/2568. It is also exampled in FIG. 84B for a different movement linkage/connection implementation. This capability we labelled "one-way" ensures no overlap of cells and coordinated relationships in a more absolute sense (relative to the original positions of the cells) for contraction flexes.

Another embodiment of our formula and movement link/connect technology supports automatically coordinated movement and formula adjustments done for flex expansions and contractions as exampled in FIG. 25A 2551/2513, FIG. 25C 2546/2518, and FIG. 25D 2596/2568. It is also exampled in FIG. 84C for a different movement linkage/connection implementation. This capability we labelled "two-way" ensures no overlap of cells and the retention of spatial relationships when possible although when not possible uses one of our other technologies for the coordination of non-exact spatial relationship linked/connected movements. In parallel it adjusts the connected/linked formula for flex expansion and contraction and any shifts of positions that take place.

Another embodiment of our formula and movement link/connect technology supports automatically coordinated movement and formula adjustments of a cell or cells not in the flex overlap path, as exampled in FIG. 25A through FIG. 25D. This capability of our formula and movement linkage/connection technology examples one of the many ways our technology coordinates movements rather than simply displacing overlapped flex expansions while simultaneously adjusting formulas.

Formula and Movement Link Implementations—Coordination Setting

In many of our movement linkage/connection implementation types it is impossible to retain all of spatial relationships, therefore making it important to know which relationships to retain (e.g., the spatial relationships at the time of the linkage/connection or the spatial relationships before the last flex). Thus, there are different variants or variants where the user can select what spatial relationship to maintain/minimally retain (e.g., the most recent relationship or the relationship when the linkage/connect was first setup). However, in the implementation that maintains all spatial relationships discussed here that is not an issue because the relative spatial relationship does not change.

Formula and Movement Link Implementations—Connection Types

Our formula and movement linkage/connection technology supports many different types of connections, e.g., situations where the formula connection is to different cells or ranges of cells than the movement linkage/connection. In some situations, the movement link/connect connection is to a specific cell position within the flex range as exampled in FIG. 25A, FIG. 25C, and FIG. 25D where the movement connection/link is to the lower left corner cell 2552 of the flex space. Which is different than the formula connection/link which is to a segment 2544 of the total flex space 2543. In other situations, the movement link/connection may be said to be connected to the entire flex space or the last cell to the right (depending upon how you look at what moves the connection) as exampled in FIG. 16C/FIG. 16D, and FIG. 19A/FIG. 19B while in those examples the formula link/connection is to the entire flex space.

Implementations of our technology are such that the movement and formula links/connections are definitely to a segment of the flex range as exampled in FIG. 27A/FIG. 27B, and FIG. 29A/FIG. 29B. Implementations of our formula and movement link/connect technology support situations where there are different formula and movement connections for the same cell as exampled in FIG. 20C/FIG. 20D where the formula is linked to a segment (range 2084/2088) while the movement linkage/connection for the cell 2094/2099 is an offset from the lower right corner of the flex range 2083/2087. Our technology supports implementations with numerous different combinations of movement and formula linkages/connections to one or more flex ranges. The number of connections for each can vary for a given cell formula as the movement and formula connections/links vary across our different implementations.

Formula and Movement Link Implementations—Coordination Order

Another embodiment of our formula and movement link/connect technology for multiple simultaneous flex situations in our technology, employs an order progression as exampled in FIG. 57 through FIG. 63B. In those situations, the movement result can differ by the order of our application implementing the flex changes as exampled for the difference in down then across, across then down or simultaneous down/across results. While this is not applicable to an embodiment that retains its movement relative spatial relationships it is applicable to other embodiments.

Formula and Movement Link Implementations—Types of Flexes

Each of our formula and movement link/connect embodiments works where the flexing range(s) is produced by one or more multi-cell populating functions, such as a WRITE_V, WRITE_CALC_2D or FILTER. FIG. 19A through FIG. 19D, and FIG. 20C/FIG. 20D examples this for 'WRITE' function flexes. FIG. 29A 2965 and FIG. 29B 2979 examples this for different "FILTER' function flexes. Our technology works with all the other flex capable spreadsheet functions (e.g., Lookup and reference functions such as CHOOSECOLS, CHOOSEROWS, TAKE, and UNIQUE as well as all of the WRITE function family).

Each of our embodiments works where the flexing range(s) is produced by one or more spreadsheet flexing capabilities, such as a PivotTable or one of our 'flex copy paste' capabilities. FIG. 16C and FIG. 16D examples our formula and movement linkage/connection technology working with a one-dimensional 'flex copy paste' capability, while FIG. 23A and FIG. 23B example it working with a two-dimensional 'flex copy paste' capability. Each of our applicable embodiments works where the flexing range(s) is a PivotTable as exampled in FIG. 27A and FIG. 27B. Our technology works with all the other flex-capable 'capabilities' and any mix and match combination of them and flex capable 'functions' for one or multiple formula and movement linkages/connections.

As previously exampled our formula linkage/connection technology works for both one and two-dimensional flex linkages/connections as exampled in FIG. 16C/FIG. 16D and FIG. 19A/FIG. 19B for one-dimensional flex linkages/connections, and exampled in FIG. 20C/FIG. 20D, FIG. 23A/FIG. 23B, and FIG. 33A/FIG. 33B for two-dimensional linkages/connections. Our technology supports all the different mix and match combinations of flexing functions, capabilities, one-dimensional and/or two-dimensional as exampled in FIG. 30A through FIG. 31B and the other multiple flex functions formula and movement linked/connected examples.

Formula and Movement Link Implementations—Manual Linkage

Our formula and movement linkage/connection technology supports several ways for the user to manually setup the linkages/connections, with one mode exampled in FIG. 27A 2794 and FIG. 27B. Our technology supports ribbon, menu, and other modes of initiating the setting of the types of linkages/connections (i.e., formula, movement, or both). Each formula and movement linkage/connection, whether one for cell, a range of cells or many different cells, can be to multiple flexes at one time as exampled in FIG. 100 through FIG. 128.

Formula and Movement Link Implementations—Automatic Linkage

Our formula and movement link/connect technology also supports many different implementations of automatic linkage/connection to flexing ranges, as exampled in FIG. 43A through FIG. 43D (including auto populating formula arguments like 4345 in FIG. 43B). It supports the automatic linkage/connection setup of multiple formula and movement link/connect connections at one time as exampled in FIG. 47A and FIG. 47B. Those automatic formula and movement linkages/connections work with visible and invisible linkage/connection arguments and with all flex functions and flex capabilities.

While our automatic connections can be reverted by several manual processes involving ribbon buttons, menus and/or popups, our formula and movement link/connect technology supports a new variant of 'UNDO' for removing automatically made linkages/connections, as exampled in FIG. 49A through FIG. 50B. In this variant of 'UNDO' the first 'UNDO' action (e.g., click, shortcut or menu selection) does not revert the cell action that led to the automatic linkage/connection, but instead retains the cell action (e.g., completing a formula or text in the cell) and removes the automatic linkage/connection. Then in this embodiment if the user does a second 'UNDO' action they get the typical 'UNDO' response of undoing the completion of the formula or text entered in the cell.

Formula and Movement Link Implementations—Visible and Invisible Arguments

Implementations of our technology support either visible or invisible movement linkage/connection arguments. Our implementations support different variants of the visible linkage/connection where the text argument is visible in the regular cell formula, as exampled in FIG. 43B, or in a switchable regular formula or link/connect formula argument, as exampled in FIG. 43C and FIG. 43D. Our technology supports other variants of the visible arguments displaying the argument as text directly in the regular cell formula or alternative cell formulas, including the second formula disclosed in our filing U.S. Application No. 63/337,576, titled "Methods and Systems for Spreadsheet Function and Flex Copy-Paste Control of Formatting and Use of Selection List Panels," filed 2 May 2022. These alternative cell formulas support all the different implementations including the manual and automatically instantiated linkages/connections.

Our formula and movement link/connect technology also supports invisible linkage/connection arguments which are visible in the selection list panel, other control, or some other visual (e.g., button, color-coding or other identifier) but not reproduced as text in an argument or arguments of the cell formula as would be exampled in FIG. 35C where the link/connect status of 'Both' 3581 is visible in the selection list panel 3583 but is not visible in the formula 3575. These invisible links/connects are also as exampled in FIG. 16C, 16D, and FIG. 47B.

These visible and invisible linkage/connection arguments support all the different implementations including the manual and automatically instantiated linkages/connections, the grouping, grouping of groups, and the other applicable features discussed herein.

Formula and Movement Link Implementations—Other Implementations

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

Mix and Match Combinations—Other Implementations

Our formula link/connect technology can be combined with all of our other movement link/connect technologies. Given there are many of those in the interest of conciseness, the combinations of all of our movement and our formula linkage/connect technologies disclosed in this application are not individually enumerated and are not repeated for combinations across the independent claims. The reader will understand how embodiments identified in this filing can readily be combined with other embodiments in this filing.

All Implementations

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope the claims that follow our clauses.

Clauses

Formula Link Claims

1. A method for automatically adjusting input to a range or array prebuilt function in a spreadsheet cell based on its connection to at least one range flexing function or flexing capability, wherein the spreadsheet is loaded on hardware and configured to interact with a user when the spreadsheet is running, wherein the spreadsheet cell contains at least one range or array prebuilt function with a specified range or array, the method including:
- connecting the specified range or array of an argument in the range or array prebuilt function to at least one cell flexing range;
- wherein the cell flexing range is produced by a flexing function or flexing capability
- wherein the flexing function or flexing capability instantiates the cell flexing range with a changeable number of values in separate cells determined by evaluating a parameter that is input to the flexing function or flexing capability;
- upon a change in the number of values, resulting from an alteration of the parameter that is input to the flexing function or flexing capability or a reevaluation of the parameter, automatically altering the specified range or array that is input to the range or array prebuilt function.

2. The method of clause 1, wherein the range or array prebuilt function is connected to the cell flexing range without adding function(s) to the prebuild range or array functional formula(s) argument(s).

Formula Link—Range or Array Function Formulas

3. The method of clause 1, wherein visible argument(s) supplied to the connected range or array function formula are not different than the visible argument(s) supplied to an unconnected version of the connected range or array formula.

4. The method of clause 1, wherein blank or null values within the cell flexing range do not lead to an incorrect range or array specification.

5. The method of clause 1, wherein values in cells adjacent to the cell flexing range do not lead to an incorrect range or array specification.

Formula Link—Range or Array Function Types

6. The method of clause 1, wherein the formula linked range or array function is a statistical function.

7. The method of clause 1, wherein the formula linked range or array function is a math or trigonometry function.

Formula Link—Types of Flexes

8. The method of clause 1, wherein the flexing range(s) is produced by one or more spreadsheet multi-cell populating functions.

9. The method of clause 1, wherein the flexing range(s) is produced by one or more spreadsheet flexing capabilities.

10. The method of clause 9, wherein the flexing capability is one of our flex copy paste capabilities.

11. The method of clause 1, wherein the flexing capability is a spreadsheet PivotTable or Table.

12. The method of clause 1, wherein the flexing is one-dimensional.

13. The method of clause 1, wherein the flexing is two-dimensional.

Formula Link—Types of Connections

14. The method of clause 1, wherein the flexing connection is to the entire flexing range.

15. The method of clause 1, wherein the flexing connection is to a segment of the flexing range.

Formula Link—Manual Linkage

16. The method of clause 1, wherein the connection to the flexing range is set manually by the user.

17. The method of clause 16, wherein the manual connection is made for multiple connections at one time.

Formula Link—Automatic Linkage

18. The method of clause 1, wherein the connection to the flexing range is automatically done by the application.

19. The method of clause 18, wherein the automatic connection is made for multiple connections at one time.

20. The method of clause 19, wherein the automatic connection can be reverted to non-flexing by a ribbon action, shortcut or other UI control.

Formula Link—Visible/Invisible Arguments

21. The method of clause 1, wherein the connection argument(s) are configured by inserting text of a first argument into the formula or into a separate formula in the spreadsheet cell.

22. The method of clause 1, wherein the connection argument specification(s) are visible in the selection list panel and not reproduced as text in an arguments of the formula in the spreadsheet cell.

Formula Link—Non-Method Claims Formula Link

23. A non-transitory computer readable memory, the memory impressed with computer instructions that, when executed on hardware, cause the hardware to carry out the method of any of clauses 1-22.

24. A system including processing hardware coupled to memory, the memory impressed with computer instructions that, when executed, cause the hardware to carry out the method of any of clauses 1-22.

25. A system including a spreadsheet feature for automatically adjusting a range or array prebuilt function in a spreadsheet cell based on its connection to at least one range flexing function or flexing capability, wherein the spreadsheet is loaded on hardware and configured to interact with a user when the spreadsheet is running, including:
- a spreadsheet cell containing at least one range or array prebuilt function with a specified range or array connected to at least one cell flexing range;

the cell flexing range is produced by a flexing function or flexing capability wherein the flexing function or flexing capability instantiates the cell flexing range with a changeable number of values in separate cells determined by evaluating a parameter that is input to the flexing function or flexing capability;

wherein a change in the number of values, responsive to an altered parameter or evaluation of the parameter, automatically alters the specified range or array in the range or array prebuilt function.

26. The system of clause 25, wherein the range or array prebuilt function is connected to the cell flexing range without adding function(s) to the prebuild range or array functional formula(s) argument(s)

Movement Link Clauses—Same Spatial Relationship

26. A method for automatically adjusting a location of a relocatable cell in a spreadsheet loaded on hardware and configured to interact with a user when the spreadsheet is running, based on connection of the relocatable cell to range flexing functions and/or flexing capabilities, including:

determining a first position of the relocatable cell, wherein the relocatable cell is connected to a cell flexing range;

wherein a flexing range is produced by a flexing function or flexing capability;

wherein the connection represents a row and column distance spatial positional relationship between the relocatable cell and the closest instantiated cell in the flexing range;

where the relocatable cell is automatically spatially relocated to a second position with a change in the flexing range produced by the flexing function or flexing capability due to a change in the underlying data and/or of a parameter of the flexing function or flexing capability that changes the number and/or location of returned cells;

where the relocated cell second position row and column relative spatial positional relationship maintains the connection to the closest instantiated cell in the flexing range post-flex as pre-flex.

Same Spatial Relationship—Coordination Situations

27. The method of clause 26, wherein the second position that resulted from the change in the flexing range is within an area of cells instantiated as the flexing range before the change.

28. The method of clause 26, wherein the second position that resulted from the change in the flexing range is adjacent to but not within an area of cells instantiated by the flexing range before or after the change.

29. The method of clause 26, wherein the relocatable cell includes a second range of relocatable cells instantiated by a second flexing function or flexing capability.

30. The method of clause 26, wherein the coordinated adjustments are done only for flex cell instantiation expansions.

31. The method of clause 26, wherein the coordinated adjustments are done for both flex cell instantiation expansions and contractions.

Same Spatial Relationship—Types of Flexes

32. The method of clause 26, wherein the flexing range is produced by one or more spreadsheet multi-cell populating functions.

33. The method of clause 26, wherein the flexing range is produced by one or more spreadsheet flexing capabilities.

34. The method of clause 33, wherein the flexing capability is one of our flex copy paste capabilities.

35. The method of clause 26, wherein the flexing capability is a PivotTable.

36. The method of clause 26, wherein the flexing is one-dimensional.

37. The method of clause 26, Wherein the Flexing is Two-Dimensional.

Same Spatial Relationship—Manual Linkage

38. The method of clause 26, wherein the connection to the flexing range is set manually by the user.

Same Spatial Relationship—Automatic Linkage

39. The method of clause 26, wherein the connection to the flexing range is automatically done by the application.

40. The method of clause 39, wherein the automatic connection can be reverted to non-flexing by a ribbon action, shortcut or other UI control.

Same Spatial Relationship—Visible/Invisible Arguments

41. The method of clause 26, wherein the connection argument(s) are configured by inserting text of a first argument into the formula or into a separate formula in the spreadsheet cell.

42. The method of clause 26, wherein the connection argument specification(s) are visible in the selection list panel and/or other identifier and not reproduced as text in an arguments of the formula in the spreadsheet cell.

Same Spatial Relationship—Non-Method Claims

43. A non-transitory computer readable memory, the memory impressed with computer instructions that, when executed on hardware, cause the hardware to carry out the method of any of claims 26-42.

44. A system including processing hardware coupled to memory, the memory impressed with computer instructions that, when executed, cause the hardware to carry out the method of any of claims 26-42.

45. A system including a spreadsheet feature for automatically adjusting the location of a relocatable cell based on its connection to range flexing functions and/or flexing capabilities, wherein the spreadsheet is loaded on hardware and configured to interact with a user when the spreadsheet is running, including:

determining a first position of the relocatable cell, wherein the relocatable cell is connected to a cell flexing range;

wherein a flexing range is produced by a flexing function or flexing capability;

wherein the connection represents a row and column distance spatial positional relationship between the relocatable cell and the closest instantiated cell in the flexing range;

where the relocatable cell is automatically spatially relocated to a second position with a change in the flexing range produced by the flexing function or flexing capability due to alteration of a parameter or evaluation of a parameter of the flexing function or flexing capability;

where the relocated cell second position row and column spatial positional relationship has the same connection to the closest instantiated cell in the flexing range post-flex as pre-flex.

Movement Link Clauses—Multiple Same Spatial Relationship

46. A method for automatically adjusting a location of a third relocatable cell, relative to a first and second linked flex range, in a spreadsheet loaded on hardware and configured to interact with a user when the spreadsheet is running, including:

determining relative cell locations, relative to each other, of a first area that is a cell flexing range, a second area that is a relocatable cell flexing range and a third area that is a relocatable cell;

wherein each cell flexing is produced by a flexing function or flexing capability and instantiating a plurality of returned cells; and responsive to a change in cells contained in one or more of the first and second areas, due to a change in the underlying data and/or of a parameter of the flexing function or flexing capability that changes the number and/or location of returned cells, automatically spatially relocating the second and third areas as necessary to retain the row and column relative spacings between each of the three areas.

Multiple Same Spatial Relationship—Coordination Situations

47. The method of clause 46, wherein the third area position that resulted from the change in the flexing ranges is within an area of cells instantiated by one of the flexing ranges before the change.

48. The method of clause 46, wherein the third area position that resulted from the change in the flexing ranges is adjacent to but not within an area of cells instantiated by the flexing ranges before or after the change.

49. The method of clause 46, wherein the coordinated adjustments are done only for flex cell instantiation expansions.

50. The method of clause 46, wherein the coordinated adjustments are done for both flex cell instantiation expansions and contractions.

Multiple Same Spatial Relationship—Types of Flexes

51. The method of clause 46, wherein the flexing range is produced by one or more spreadsheet multi-cell populating functions.

52. The method of clause 46, wherein the flexing range is produced by one or more spreadsheet flexing capabilities.

53. The method of clause 46, wherein the flexing capability is one of our flex copy paste capabilities.

54. The method of clause 46, wherein the flexing capability is a PivotTable.

Multiple Same Spatial Relationship—Manual Linkage

55. The method of clause 46, wherein the connection to the flexing range is set manually by the user.

56. The method of clause 55, wherein the manual connection is made for multiple connections at one time.

Multiple Same Spatial Relationship—Automatic Linkage

57. The method of clause 46, wherein the connection to the flexing range is automatically done by the application.

58. The method of clause 57, wherein the automatic connection is made for multiple connections at one time.

59. The method of clause 57, wherein the automatic connection can be reverted to non-flexing by a ribbon action, shortcut or other UI control.

Multiple Same Spatial Relationship—Visible/Invisible Arguments

60. The method of clause 46, wherein the connection argument(s) are configured by inserting text of a first argument into the formula or into a separate formula in the spreadsheet cell.

61. The method of clause 46, wherein the connection argument specification(s) are visible in the selection list panel and/or other identifier and not reproduced as text in an arguments of the formula in the spreadsheet cell.

Multiple Same Spatial Relationship—Non-Method Claims

62. A non-transitory computer readable memory, the memory impressed with computer instructions that, when executed on hardware, cause the hardware to carry out the method of any of claims 46-61.

63. A system including processing hardware coupled to memory, the memory impressed with computer instructions that, when executed, cause the hardware to carry out the method of any of claims 46-61.

64. A system automatically adjusting a location of a third relocatable cell, relative to a first cell flexing range of multiple rows and columns and relative to a second cell flexing range of multiple rows and columns, wherein the second cell flexing range includes second relocatable cells positioned relative to the first cell flexing range, in a spreadsheet loaded on hardware and configured to interact with a user when the spreadsheet is running, including:

determining the relative cell locations to each other of a first area that is a cell flexing range, a second area that is a relocatable cell flexing range and a third area that is a relocatable cell;

wherein each cell flexing is produced by a flexing function or flexing capability and instantiating a plurality of returned cells; and responsive to a change in one or more of the first and second areas, due to a change in the underlying data and/or of a parameter of the flexing function or flexing capability that changes the number and/or location of returned cells, automatically spatially relocating the second and third areas as necessary to retain the row and column relative spacings between each of the three areas.

Movement Link Clauses—Vertical and Horizontal Alignment

65. A method for automatically adjusting locations of multiple relocatable areas of cells or flex ranges, relative to each other, and retaining a relative column alignment of areas vertically linked and/or retaining a relative row alignment of areas horizontally linked, in a spreadsheet loaded on hardware and configured to interact with a user when the spreadsheet is running, including:

determining the relative column locations between each area vertically linked;

determining the relative row locations between each area horizontally linked;

wherein each cell flexing is produced by a flexing function or flexing capability and instantiating a plurality of returned cells; and responsive to a change in one or more of flex function in a linked area, due to a change in the underlying data and/or of a parameter of the flexing function or flexing capability that changes the number and/or location of returned cells, automatically spatially relocating as needed the vertically linked areas to retain column relative spacings between each of the areas, automatically spatially relocating as needed the horizontally linked areas to retain row relative spacings between each of the areas, ensuring no overlap of the areas.

66. The method of clause 65, wherein the automatic spatial relocation ensures a spacing of at least one row between horizontally linked areas 67. The method of clause 65, wherein the automatic spatial relocation ensures a spacing of at least one column between vertically linked areas 68. The method of clause 65, wherein the automatic spatial relocation ensures that each post flex minimum horizontal spacing is the minimum row spacing at the time of linkage or pre-flex.

69. The method of clause 65, wherein the automatic spatial relocation ensures that each post flex minimum vertical spacing is the minimum column spacing at the time of linkage or pre-flex.

70. The method of clause 65, wherein the automatic spatial relocation ensures that each post flex minimum horizontal spacing is the maximum row spacing at the time of linkage or pre-flex.

71. The method of clause 65, wherein the automatic spatial relocation ensures that each post flex minimum vertical spacing is the maximum column spacing at the time of linkage or pre-flex.

Vertical and Horizontal Alignment—Coordination Situations

72. The method of clause 65, wherein at least one area position that resulted from the change in the flexing range is within an area of cells instantiated as the flexing range before the change.

73. The method of clause 65, wherein at least one position that resulted from the change in the flexing range is adjacent to but not within an area of cells instantiated by a flexing range(s) before or after the change.

74. The method of clause 65, wherein the coordinated adjustments are done only for flex cell instantiation expansions.

75. The method of clause 65, wherein the coordinated adjustments are done for both flex cell instantiation expansions and contractions.

Vertical and Horizontal Alignment—Types of Flexes

76. The method of clause 65, wherein the flexing range is produced by one or more spreadsheet multi-cell populating functions.

77. The method of clause 65, wherein the flexing range is produced by one or more spreadsheet flexing capabilities.

78. The method of clause 77, wherein the flexing capability is one of our flex copy paste capabilities.

79. The method of clause 65, wherein the flexing capability is a PivotTable.

Vertical and Horizontal Alignment—Manual Linkage

80. The method of clause 65, wherein the connection to the flexing range(s) is set manually by the user.

Vertical and Horizontal Alignment—Automatic Linkage

81. The method of clause 65, wherein the horizontal and vertical alignment linkages are automatically done by the application.

82. The method of clause 65, wherein the automatic connection can be reverted to non-flexing by a ribbon action, shortcut or other UI control.

Vertical and Horizontal Alignment—Visible/Invisible Arguments

83. The method of clause 65, wherein the connection argument(s) are configured by inserting text of a first argument into the formula or into a separate formula in the spreadsheet cell.

84. The method of clause 65, wherein the connection argument specification(s) are visible in the selection list panel and/or other identifier and not reproduced as text in an arguments of the formula in the spreadsheet cell.

Vertical and Horizontal Alignment—Non-Method Claims

85. A non-transitory computer readable memory, the memory impressed with computer instructions that, when executed on hardware, cause the hardware to carry out the method of any of claims 65-84.

86. A system including processing hardware coupled to memory, the memory impressed with computer instructions that, when executed, cause the hardware to carry out the method of any of claims 65-84.

87. A system for automatically adjusting the location of multiple relocatable areas of cells or flex ranges, relative to each other retaining the relative column alignment of areas vertically linked and/or retaining the relative row alignment of areas horizontally linked, in a spreadsheet loaded on hardware and configured to interact with a user when the spreadsheet is running, including:

- determining the relative column locations between each area vertically linked;
- determining the relative row locations between each area horizontally linked;
- wherein each cell flexing is produced by a flexing function or flexing capability and
  - instantiating a plurality of returned cells; and
- responsive to a change in one or more of flex function in a linked area,
  - due to a change
    - in the underlying data and/or
    - of a parameter of the flexing function or flexing capability
  - that changes the number and/or location of returned cells,
- automatically spatially relocating as needed the vertically linked areas to retain column relative spacings between each of the areas,
- automatically spatially relocating as needed the horizontally linked areas to retain row relative spacings between each of the areas,
- ensuring no overlap of the areas.

Closest Distance Movement Linkage

88. A method for automatically adjusting locations of multiple relocatable areas of cells or flex ranges, relative to each other retaining a minimum of their pre-flex relative row and column relative spatial distances between their closest point(s) post-flex(es), in a spreadsheet loaded on hardware and configured to interact with a user when the spreadsheet is running, including:

- determining the pre-flex relative row and column locations relative spatial distances between closest cells for each linked area;
- wherein each cell flexing is produced by a flexing function or flexing capability and instantiating a plurality of returned cells;
- wherein the returned cells are in a range or array of cells;
- responsive to a change
  - in the underlying data and/or
  - of a parameter of the flexing function or flexing capability
- that changes the number and/or location of returned cells
  - automatically spatially relocating, as needed, the multiple relocatable areas linked to the linked area to ensure their closest cells relative row and column spatial distances are equal or greater than the pre-flex distances.

Closest Distance Movement Linkage—Coordination Situations

89. The method of clause 88, wherein as many of the area-to-area post-flex closest cells relative row and column combination spatial distances as possible equal the pre-flex distances 90. The method of clause 88, wherein as many of the closest cells area-to-area post-flex relative row and column combination spatial distances as possible equal the pre-flex distances Closest Distance Movement Linkage—Relative Spatial Distance Setting 91. The method of clause 88, wherein the pre-flex relative row and column locations spatial distances between the closest cells for each linked area are those at the linkage instantiation.

92. The method of clause 88, wherein the pre-flex relative row and column locations spatial distances between the closest cells for each linked area are those from the previous flex.

Closest Distance Movement Linkage—Types of Flexes

93. The method of clause 88, wherein the flexing range is produced by one or more spreadsheet multi-cell populating functions.

94. The method of clause 88, wherein the flexing range is produced by one or more spreadsheet flexing capabilities.

95. The method of clause 88, wherein the flexing capability is one of our flex copy paste capabilities.

96. The method of clause 88, wherein the flexing capability is a PivotTable.

Closest Distance Movement Linkage—Manual Linkage

97. The method of clause 88, wherein the linkages to the other areas are set manually by the user.

98. The method of clause 97, wherein the manual connection is made for multiple connections at one time.

Closest Distance Movement Linkage—Automatic Linkage

99. The method of clause 88, wherein the linkages are automatically done by the application.

100. The method of clause 88, wherein the automatic connection can be reverted to non-flexing by a ribbon action, shortcut or other UI control.

Closest Distance Movement Linkage—Visible/Invisible Arguments

101. The method of clause 88, wherein the connection argument(s) are configured by inserting text of a first argument into the formula or into a separate formula in the spreadsheet cell.

102. The method of clause 88, wherein the connection argument specification(s) are visible in the selection list panel and/or other identifier and not reproduced as text in an arguments of the formula in the spreadsheet cell.

Closest Distance Movement Linkage—Non-Method Claims

103. A non-transitory computer readable memory, the memory impressed with computer instructions that, when executed on hardware, cause the hardware to carry out the method of any of claims 88-102.

104. A system including processing hardware coupled to memory, the memory impressed with computer instructions that, when executed, cause the hardware to carry out the method of any of claims 88-102.

105. A system for automatically adjusting the location of multiple relocatable areas of cells or flex ranges, relative to each other retaining a minimum of their pre-flex relative row and column relative spatial distance between their closest point(s) post-flex(es), in a spreadsheet loaded on hardware and configured to interact with a user when the spreadsheet is running, including:

determining the pre-flex relative row and column locations relative spatial distances between the closest cells for each linked area;

wherein each cell flexing is produced by a flexing function or flexing capability and instantiated in cells holding values; and responsive to a change in one or more of flex function in a linked area, automatically spatially relocating, as needed, the linked areas to ensure their closest cells relative row and column spatial distances are equal or greater than the pre-flex distances Direct and Indirect Movement Linkages 106. A method for automatically adjusting a location of a third and second area where the third relocatable cell or flex range area relative to a relocatable second cell or flexing range which is directly linked to one additional flexing area where the relative spatial distances are maintained for the direct linkages and the movements are cascaded to the indirect linkages, in a spreadsheet loaded on hardware and configured to interact with a user when the spreadsheet is running, including:

directly linking the third relocatable cell or relocatable flex range area to the second relocatable cell or relocatable flex range area;

directly linking the second area to a first flex range area;

determining pre-flex a relative row and column location of the third area relative to the second area;

determining pre-flex a relative row and column location of the second area relative to the first area;

wherein each cell flexing is produced by a flexing function or flexing capability and instantiated in cells holding values; and responsive to at least one flex change in the first area automatically spatially relocating the directly linked second area to retain the row and column relative spacings between the direct linked first and second areas, automatically cascading the automatically spatially relocating of the second area through to spatially relocating the directly linked third area.

107. The method of clause 106, wherein the there are additional direct linkages that automatically retain their pre-flex row and column relative relationships post-flex.

Direct and Indirect Movement Linkages—Coordination Situations

108. The method of clause 106, wherein the coordinated adjustments are done for both flex expansions and contractions.

109. The method of clause 106, wherein the coordinated adjustments are done for cells not overlapped by the flex ranges.

Direct and Indirect Movement Linkages—Connection Types

110. The method of clause 106, wherein the area-to-area linkage is determined by the closest cell or cells and tie breaking rules.

111. The method of clause 106, wherein the area-to-area linkage is made by user specification.

Direct and Indirect Movement Linkages—Types of Flexes

112. The method of clause 106, wherein the flexing range is produced by one or more spreadsheet multi-cell populating functions.

113. The method of clause 106, wherein the flexing range is produced by one or more spreadsheet flexing capabilities.

114. The method of clause 106, wherein the flexing capability is one of our flex copy paste capabilities.

115. The method of clause 106, wherein the flexing capability is a PivotTable.

Direct and Indirect Movement Linkages—Manual Linkage

116. The method of clause 106, wherein the linkages to the other areas are set manually by the user.

117. The method of clause 106, wherein the linkages to the other areas are set semi-automatically by the user.

118. The method of clause 106, wherein the user specifies the cells to link and our technology employees a ruleset to determine the direct linkages/connections.

Direct and Indirect Movement Linkages—Automatic Linkage

119. The method of clause 106, wherein the linkages are automatically done by the application applying a ruleset to determine the direct linkages/connections.

120. The method of clause 106, wherein the automatic connection can be reverted to non-flexing by a ribbon action, shortcut or other UI control.

Direct and Indirect Movement Linkages—Visible/Invisible Arguments

121. The method of clause 106, wherein the connection argument(s) are configured by inserting text of a first argument into the formula or into a separate formula in the spreadsheet cell.

122. The method of clause 106, wherein the connection argument specification(s) are visible in the selection list panel and/or other identifier and not reproduced as text in an arguments of the formula in the spreadsheet cell.

Direct and Indirect Movement Linkages—Non-Method Claims

123. A non-transitory computer readable memory, the memory impressed with computer instructions that, when executed on hardware, cause the hardware to carry out the method of any of claims 106-122.

123. A system including processing hardware coupled to memory, the memory impressed with computer instructions that, when executed, cause the hardware to carry out the method of any of claims 106-122.

124. A system for automatically adjusting a location of a third and second area where the third relocatable cell or flex range area relative to a relocatable second cell or flexing range which is directly linked to one additional flexing area where the relative spatial distances are maintained for the direct linkages and the movements are cascaded to the indirect linkages, in a spreadsheet loaded on hardware and configured to interact with a user when the spreadsheet is running, including:

- directly linking the third relocatable cell or relocatable flex range area to the second relocatable cell or relocatable flex range area;
- directly linking the second area to first flex range area;
- determining pre-flex the relative row and column location of the third area relative to the second area;
- determining pre-flex the relative row and column location of the second area relative to the first area;
- wherein each cell flexing is produced by a flexing function or flexing capability and instantiated in cells holding values; and
- responsive to at least one flex change in one or more of the linked areas automatically spatially relocating the directly linked areas to retain the row and column relative spacings between the direct linked areas,
- automatically cascading the direct linked spatial relocations through the directly linked areas.

Ordered Progression Movement

125. A method for automatically adjusting the location of multiple relocatable areas of cells or flex ranges, ensuring no overlap of cells through an ordered down and across displacement, in a spreadsheet loaded on hardware and configured to interact with a user when the spreadsheet is running, including:

- determining the relocatable spreadsheet cell and flex range areas in the movement linked cell space;
- wherein each cell flexing is produced by a flexing function or flexing capability and instantiated in cells holding values; and
- responsive to a change in one or more of flex function in a linked cell space,
  - automatically spatially relocating areas overlapped by flex changes to ensure no cell overlaps,
  - with an ordered progression of flexes and movements determining the displacements.

Ordered Progression Movement—Progression Order

126. The method of clause 125, wherein the ordered progression of movements starts in the left upper corner of the linked cell space and moves down areas flexing and displacing any areas below the flex or flexes to the bottom of the linked space followed by returning to the top and pushing or moving one flex to the right flexing and displacing any areas below the flex or flexes to the to the bottom of the linked space and then repeating the across one flex area and down pattern until all linked areas have seen any impact.

127. The method of clause 125, wherein the ordered progression of movements starts in the left upper corner of the linked cell space and moves across areas flexing and displacing any areas to the right of the flex or flexes to the right boundary of the linked space followed by returning to the left one flex below and flexing and displacing any areas to the right of the flex or flexes to the right boundary of the linked space and then repeating the down one flex area and across pattern until all linked areas have seen any impact.

128. The method of clause 125, wherein the ordered progression of movements starts in the left upper corner of the linked cell space and is simultaneously down and across displacements.

Ordered Progression Movement—Cushioning

129. The method of clause 125, wherein the displacements have no empty cell cushions.

130. The method of clause 125, wherein the displacements have row and column empty cell cushions.

131. The method of clause 125, wherein the row and column empty cell cushions are one cell.

Ordered Progression Movement—Types of Flexes

132. The method of clause 125, wherein the flexing range is produced by one or more spreadsheet multi-cell populating functions.

133. The method of clause 125, wherein the flexing range is produced by one or more spreadsheet flexing capabilities.

134. The method of clause 133, wherein the flexing capability is one of our flex copy paste capabilities.

135. The method of clause 133, wherein the flexing capability is a PivotTable.

Ordered Progression Movement—Manual Linkage

136. The method of clause 125, wherein the connection to the flexing range is set manually by the user.

137. The method of clause 136, wherein the manual connection is made for multiple connections at one time.

Ordered Progression Movement—Automatic Linkage

138. The method of clause 125, wherein the connection to the flexing range is automatically done by the application.

139. The method of clause 138, wherein the automatic connection is made for multiple connections at one time.

140. The method of clause 138, wherein the automatic connection can be reverted to non-flexing by a ribbon action, shortcut or other UI control.

Ordered Progression Movement—Visible/Invisible Arguments

141. The method of clause 125, wherein the connection argument(s) are configured by inserting text of a first argument into the formula or into a separate formula in the spreadsheet cell.

142. The method of clause 125, wherein the connection argument specification(s) are visible in the selection list panel and/or other identifier and not reproduced as text in an arguments of the formula in the spreadsheet cell.

Ordered Progression Movement—Non-Method Claims

143. A non-transitory computer readable memory, the memory impressed with computer instructions that, when executed on hardware, cause the hardware to carry out the method of any of claims 125-142.

144. A system including processing hardware coupled to memory, the memory impressed with computer instructions that, when executed, cause the hardware to carry out the method of any of claims 125-142.

146. A system for automatically adjusting the location of multiple relocatable areas of cells or flex ranges, ensuring no overlap of cells through an ordered down and across displacement, in a spreadsheet loaded on hardware and configured to interact with a user when the spreadsheet is running, including:

determining the relocatable spreadsheet cell and flex range areas in the movement linked cell space;

wherein each cell flexing is produced by a flexing function or flexing capability and instantiated in cells holding values and responsive to a change in one or more of flex function in a linked cell space, automatically spatially relocating areas overlapped by flex changes to ensure no cell overlaps, with an ordered progression of flexes and movements determining the displacements.

Bumper Movement Linkages

147. A method for automatically adjusting the location of linked flex areas after at least one area flex, in a spreadsheet loaded on hardware and configured to interact with a user when the spreadsheet is running, including:

defining virtual boundaries around first, second and third relocatable flex range areas and extending toward other flex range areas, wherein the virtual boundaries are largest rectangles of cells that are not occupied by any flex range area;

wherein each cell flexing is produced by a flexing function or flexing capability and instantiated in cells holding values; and responsive to at least one flex change in one or more of the first area automatically spatially relocating the second and third areas to keep the virtual boundaries of the first, second and third areas not occupied by any flex range area.

148. The method of clause 147, wherein the boundary coordinated adjustments are done only for flex expansions.

149. The method of clause 147, wherein the boundary coordinated adjustments are done for both flex expansions and contractions.

150. The method of clause 147, wherein the coordinated adjustments are done for cells not overlapped by the flex ranges.

Bumper Movement Linkages—Coordination Setting

151. The method of clause 147, wherein the pre-flex boundary empty cell row and/or column widths are those at the connection instantiation.

152. The method of clause 147, wherein the pre-flex boundary empty cell row and/or column widths are those of the prior value(s).

Bumper Movement Linkages—Coordination Order

153. The method of clause 147, wherein flex progression displacement is some combination of across and down.

154. The method of clause 153, wherein flex progression displacement is an across then down order starting in the upper left corner of the linked space.

155. The method of clause 153, wherein flex progression displacement is a down then across order starting in the upper left corner of the linked space.

156. The method of clause 147, wherein the flex movements within a group are resolved before flex movements outside the group are applied to the group as a whole.

157. The method of clause 156, wherein overlapping group linkages treat previous group linkages as a whole as opposed to their individual groups.

158. The method of clause 156, wherein the group pre-flex boundary empty cell row and/or column widths are those at the connection instantiation.

159. The method of clause 156, wherein the group pre-flex boundary empty cell row and/or column widths are those of the prior value(s).

Bumper Movement Linkages—Types of Flexes

160. The method of clause 147, wherein the flexing range is produced by one or more spreadsheet multi-cell populating functions.

161. The method of clause 147, wherein the flexing range is produced by one or more spreadsheet flexing capabilities.

162. The method of clause 161, wherein the flexing capability is one of our flex copy paste capabilities.

163. The method of clause 147, wherein the flexing capability is a PivotTable.

Bumper Movement Linkages—Manual Linkage

164. The method of clause 147, wherein the connection to the flexing range is set manually by the user.

165. The method of clause 164, wherein the manual connection is made for multiple connections at one time.

166. The method of clause 165, wherein the manual connection is made for a group.

167. The method of clause 166, wherein the manual connection is made for multiple groups and/or groups of groups.

Bumper Movement Linkages—Automatic Linkage

168. The method of clause 147, wherein the connection to the flexing range is automatically done by the application.

169. The method of clause 168, wherein the automatic connection is made for multiple connections at one time.

170. The method of clause 168, wherein the automatic connection can be reverted to non-flexing by a ribbon action, shortcut or other UI control.

Bumper Movement Linkages—Visible/Invisible Arguments

171. The method of clause 147, wherein the connection argument(s) are configured by inserting text of a first argument into the formula or into a separate formula in the spreadsheet cell.

172. The method of clause 147, wherein the connection argument specification(s) are visible in the selection list panel and/or other identifier and not reproduced as text in an arguments of the formula in the spreadsheet cell.

Bumper Movement Linkages—Non-Method Claims

173. A system for automatically adjusting the location of linked flex areas after at least one area flex, in a spreadsheet loaded on hardware and configured to interact with a user when the spreadsheet is running, including:

defining virtual boundaries around first, second and third relocatable flex range areas and extending toward other flex range areas, wherein the virtual boundaries are largest rectangles of cells that are not occupied by any flex range area;

wherein each cell flexing is produced by a flexing function or flexing capability and instantiated in cells holding values; and responsive to at least one flex change in one or more of the first area automatically spatially relocating the second and third areas to keep the virtual boundaries of the first, second and third areas not occupied by any flex range area.

174. A non-transitory computer readable memory, the memory impressed with computer instructions that, when executed on hardware, cause the hardware to carry out the method of any of claims 147-172.

175. A system including processing hardware coupled to memory, the memory impressed with computer instructions that, when executed, cause the hardware to carry out the method of any of claims 147-172.

Combination of Formula and Movement Links

176. A method for automatically adjusting a formula and location of a relocatable cell in a spreadsheet loaded on hardware and configured to interact with a user when the spreadsheet is running, based on connection of the relocatable cell and its formula to range flexing functions and/or flexing capabilities, including:

connecting a specified range or array of an argument in the range or array prebuilt function to at least one cell flexing range and determining a first position of the relocatable cell containing that function, wherein the relocatable cell is movement connected to a cell flexing range;

wherein a flexing range is produced by a flexing function or flexing capability;

wherein the movement connection represents a row and column distance spatial positional relationship between the relocatable cell and the closest instantiated cell in the flexing range;

automatically spatially relocating the relocatable cell to a second position and automatically altering its functional formula for a change in the flexing range produced by the flexing function or flexing capability due to alteration of a parameter or evaluation of a parameter of the flexing function or flexing capability;

wherein the relocated cell second position row and column relative spatial positional relationship maintains the connection to the closest instantiated cell in the flexing range post-flex as pre-flex and the functional formula adjusts for change in the instantiated range.

177. The method of clause 176, wherein the connected range or array function formula argument(s) are not different than an unconnected function formula argument(s).

178. The method of clause 176, wherein blank or null values within the flex range does not lead to an incorrect range or array specification.

179. The method of clause 176, wherein values in adjacent cells does not lead to an incorrect range or array specification.

180. The method of clause 176, wherein the formula linked range or array function is a statistical function.

181. The method of clause 176, wherein the formula linked range or array function is a math or trigonometry function.

182. The method of clause 176, wherein the coordinated adjustments are done only for flex expansions.

183. The method of clause 176, wherein the coordinated adjustments are done for both flex expansions and contractions.

184. The method of clause 176, wherein the coordinated adjustments are done for cells not overlapped by the flex ranges.

185. The method of clause 176, wherein the flexing connections are to the entire flexing range.

186. The method of clause 176, wherein the flexing connections are to a segment of the flexing range.

187. The method of clause 176, wherein the formula flexing connection is different than the movement flexing connection.

188. The method of clause 176, wherein the flexing range is produced by one or more spreadsheet multi-cell populating functions.

189. The method of clause 176, wherein the flexing range is produced by one or more spreadsheet flexing capabilities.

190. The method of clause 176, wherein the flexing capability is one of our flex copy paste capabilities.

191. The method of clause 176, wherein the flexing capability is a PivotTable.

192. The method of clause 176, wherein the flexing is one-dimensional.

193. The method of clause 176, wherein the flexing is two-dimensional.

194. The method of clause 176, wherein the connection to the flexing range is set manually by the user.

195. The method of clause 194, wherein the manual connection is made for multiple connections at one time.

196. The method of clause 176, wherein the connection to the flexing range is automatically done by the application.

197. The method of clause 196, wherein the automatic connection is made for multiple connections at one time.

198. The method of clause 196, wherein the automatic connection can be reverted to non-flexing by a ribbon action, shortcut or other UI control.

199. The method of clause 176, wherein the connection argument(s) are configured by inserting text of a first argument into the formula or into a separate formula in the spreadsheet cell.

200. The method of clause 176, wherein the connection argument specification(s) are visible in the selection list panel and not reproduced as text in an arguments of the formula in the spreadsheet cell.

201. A system for automatically adjusting the formula and location of a relocatable cell in a spreadsheet loaded on hardware and configured to interact with a user when the spreadsheet is running, based on connection of the relocatable cell and its formula to range flexing functions and/or flexing capabilities, including:

connecting the specified range or array of an argument in the range or array prebuilt function to at least one cell flexing range and determining a first position of the relocatable cell containing that function, wherein the relocatable cell is movement connected to a cell flexing range;

wherein a flexing range is produced by a flexing function or flexing capability;

wherein the movement connection represents a row and column distance spatial positional relationship between the relocatable cell and the closest instantiated cell in the flexing range;

where the relocatable cell is automatically spatially relocated to a second position and automatically alters its functional formula for a change in the flexing range produced by the flexing function or flexing capability due to alteration of a parameter or evaluation of a parameter of the flexing function or flexing capability;

where the relocated cell second position row and column relative spatial positional relationship maintains the connection to the closest instantiated cell in the flexing range post-flex as pre-flex and the functional formula adjusts for change in the instantiated range.

202. A non-transitory computer readable memory, the memory impressed with computer instructions that, when executed on hardware, cause the hardware to carry out the method of any of claims 176-200.

203. A system including processing hardware coupled to memory, the memory impressed with computer instructions that, when executed, cause the hardware to carry out the method of any of claims 176-200.

We claim as follows:

1. A method for automatically adjusting input to a range or array prebuilt function in a spreadsheet cell, including:

the range or array prebuilt function in a cell of the spreadsheet is linked to a range flexing function or flexing capability;

applying the flexing function or flexing capability to underlying data and instantiating a plurality of returned cells;

wherein the returned cells are in a range or array of cells; and responsive to a change in the underlying data or of a parameter of the flexing function or flexing capability that changes the number or location of returned cells, automatically changing the input to the range or array prebuilt function to match the changed number of returned cells.

2. The method of claim 1, wherein the linking of the range or array prebuilt function to the returned cells in the range or array of cells returned by range flexing function or flexing capability is automatic and not dependent on entering parameters in a parameter list of the range or array prebuilt function.

3. The method of claim 1, further including:

the range or array prebuilt function is linked to two or more range flexing functions or flexing capabilities that return at least first and second numbers of returned cells; and using both the first and second numbers of returned cells when automatically changing the input.

4. The method of claim 1, wherein the linked range or array prebuilt function has a parameter list that is unchanged in count or meaning of parameters in the parameter list between a linked and an unlinked version of the range or array prebuilt function.

5. The method of claim 1, further including automatically establishing the link and showing a control separate from the cell that indicate establishment of the link.

6. The method of claim 5, wherein the automatic connection can be reverted to non-flexing by a ribbon action, shortcut or other UI control.

7. The method of claim 1, further including manually establishing the link using a control separate from text in the cell in the spreadsheet that contains the range or array prebuilt function.

8. The method of claim 1, wherein the returned cells in the range or array include null cell and all of the instantiated returned cells are processed correctly by the range or array prebuilt function.

9. The method of claim 1, wherein the formula linked range or array function is a statistical function.

10. The method of claim 1, wherein the formula linked range or array function is a math or trigonometry function.

11. The method of claim 1, further including the range flexing function and the range flexing function instantiating the returned cells as a result of applying one of our WRITE family of functions, a FILTER function or any other spreadsheet multi-cell populating functions.

12. The method of claim 1, further including the flex capability, wherein the flex capability is one of FLEX COPY PASTE or PivotTable.

13. The method of claim 1, wherein the changing the input is one-dimensional.

14. The method of claim 1, wherein the changing the input is two-dimensional.

15. The method of claim 1, wherein the flexing connection is to the entire flexing range.

16. The method of claim 1, wherein the flexing connection is to a body of data within the flexing range.

17. The method of claim 1, wherein the linked range or array prebuilt function has an added parameter in the cell that specifies the link to the range flexing function or flexing capability.

18. The method of claim 1, wherein a formula bar controllably switches between viewing text that defines the range or array prebuilt function and text that defines the link from the range or array prebuilt function to the range flexing function or flexing capability.

19. A non-transitory computer readable memory, the memory impressed with computer instructions that, when executed on hardware, cause the hardware to carry out the actions of a method for automatically adjusting input to a range or array prebuilt function in a spreadsheet cell, including:

the range or array prebuilt function in a cell of the spreadsheet is linked to a range flexing function or flexing capability;

applying the flexing function or flexing capability to underlying data and instantiating a plurality of returned cells;

wherein the returned cells are in a range or array of cells; and responsive to a change in the underlying data or of a parameter of the flexing function or flexing capability that changes the number of returned cells, automatically changing the input to the range or array prebuilt function to match the changed number of returned cells.

20. The non-transitory computer readable medium of claim 19, wherein the linking of the range or array prebuilt function to the returned cells in the range or array of cells returned by range flexing function or flexing capability is automatic and not dependent on entering parameters in a parameter list of the range or array prebuilt function.

21. The non-transitory computer readable medium of claim 19, further including:

the range or array prebuilt function is linked to two or more range flexing functions or flexing capabilities that return at least first and second numbers of returned cells; and using both the first and second numbers of returned cells when automatically changing the input.

22. The non-transitory computer readable medium of claim 19, wherein the linked range or array prebuilt function has a parameter list that is unchanged in count or meaning of parameters in the parameter list between a linked and an unlinked version of the range or array prebuilt function.

23. The non-transitory computer readable medium of claim 19, further including automatically establishing the link and showing a control separate from the cell that indicate establishment of the link.

24. A system including processing hardware coupled to memory, the memory impressed with computer instructions that, when executed, cause the hardware to carry out the method for automatically adjusting input to a range or array prebuilt function in a spreadsheet cell, including:

the range or array prebuilt function in a cell of the spreadsheet is linked to a range flexing function or flexing capability;

applying the flexing function or flexing capability to underlying data and instantiating a plurality of returned cells;

wherein the returned cells are in a range or array of cells; and responsive to a change in the underlying data or of a parameter of the flexing function or flexing capability that changes the number of returned cells, automatically changing the input to the range or array prebuilt function to match the changed number of returned cells.

25. The system of claim 24, wherein the linking of the range or array prebuilt function to the returned cells in the range or array of cells returned by range flexing function or flexing capability is automatic and not dependent on entering parameters in a parameter list of the range or array prebuilt function.

26. The system of claim 24, further including:

the range or array prebuilt function is linked to two or more range flexing functions or flexing capabilities that return at least first and second numbers of returned cells; and using both the first and second numbers of returned cells when automatically changing the input.

27. The system of claim 24, wherein the linked range or array prebuilt function has a parameter list that is unchanged in count or meaning of parameters in the parameter list between a linked and an unlinked version of the range or array prebuilt function.

28. The system of claim 24, further including automatically establishing the link and showing a control separate from the cell that indicate establishment of the link.

* * * * *